(12) United States Patent
Hejlsberg et al.

(10) Patent No.: US 6,920,461 B2
(45) Date of Patent: Jul. 19, 2005

(54) APPLICATION PROGRAM INTERFACE FOR NETWORK SOFTWARE PLATFORM

(75) Inventors: Anders Hejlsberg, Seattle, WA (US); Blaine J. Dockter, Bellevue, WA (US); Dax H. Hawkins, Seattle, WA (US); Giovanni M. Della-Libera, Seattle, WA (US); Jun Fang, Sammamish, WA (US); Luca Bolognese, Redmond, WA (US); Mark P. Ashton, Kent, WA (US); Mark A. Boulter, Redmond, WA (US); Omri Gazitt, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 0 days.

(21) Appl. No.: 09/902,560

(22) Filed: Jul. 10, 2001

(65) Prior Publication Data

US 2003/0167277 A1 Sep. 4, 2003

(51) Int. Cl.[7] ............................................... G06F 17/30
(52) U.S. Cl. ............................... 707/103 R; 707/104.1; 707/101
(58) Field of Search ................................. 707/101, 203, 707/250, 1, 100, 104.1; 709/200, 217, 227, 316; 717/100, 104.1, 108; 395/604

(56) References Cited

U.S. PATENT DOCUMENTS

| | | | |
|---|---|---|---|
| 5,218,699 A | 6/1993 | Brandle et al. | |
| 5,430,876 A | 7/1995 | Schreiber et al. | |
| 5,689,700 A | 11/1997 | Miller et al. | |
| 5,748,962 A | 5/1998 | Brechtel et al. | |
| 5,761,494 A * | 6/1998 | Smedley et al. | ............... 707/4 |
| 5,822,580 A | 10/1998 | Leung | |
| 5,903,753 A | 5/1999 | Bramnick et al. | |
| 5,937,406 A * | 8/1999 | Balabine et al. | ............ 707/100 |
| 5,956,509 A | 9/1999 | Kevner | |
| 6,061,743 A | 5/2000 | Thatcher et al. | |
| 6,175,878 B1 | 1/2001 | Seaman et al. | |
| 6,209,124 B1 | 3/2001 | Vermeire et al. | |
| 6,256,678 B1 | 7/2001 | Traughber et al. | |
| 6,275,871 B1 | 8/2001 | Reinfelder et al. | |
| 6,282,581 B1 | 8/2001 | Moore et al. | |
| 6,298,354 B1 | 10/2001 | Saulpaugh et al. | |
| 6,349,343 B1 * | 2/2002 | Foody et al. | ............... 709/316 |
| 6,353,830 B1 * | 3/2002 | Yee et al. | ................... 707/102 |
| 6,360,266 B1 * | 3/2002 | Pettus | ....................... 709/227 |
| 6,418,448 B1 * | 7/2002 | Sarkar | .................... 707/104.1 |
| 6,442,548 B1 * | 8/2002 | Balabine et al. | ............. 707/10 |
| 6,446,253 B1 * | 9/2002 | Mellmer | ..................... 717/100 |
| 2002/0099687 A1 * | 7/2002 | Krishnaprasad et al. | ....... 707/1 |
| 2002/0169679 A1 | 11/2002 | Neumayer | |
| 2003/0051236 A1 | 3/2003 | Pace et al. | |
| 2003/0074206 A1 | 4/2003 | Hoffman et al. | |
| 2003/0084120 A1 | 5/2003 | Egli | |

OTHER PUBLICATIONS

Lam et al.; .NET Framework Essentials Jun. 2001 O'Reilly pp. 1–32.

Meyer; Microsoft; NET is coming [Microsoft Web Services platform] IEEE Computer vol.: 34 Issue: 8 Aug. 2001 pp 92–97.

Cheng et al.; "XML and DB2" IEEE Data Engineering 2000. Proceedings 16th International Conference on Feb. 29–Mar. 3, 2000 pp 569–573.

Flanagan; "Java in a Nutshell" O'Reilly & Associates 1996 pp. 193–200, 237–253 267–270 339–342.

(Continued)

Primary Examiner—Charles Rones
Assistant Examiner—Neveen Abel-Jalil
(74) Attorney, Agent, or Firm—Microsoft Corporation; Lee & Hayes

(57) ABSTRACT

An application program interface (API) provides a set of functions for application developers who build Web applications on Microsoft Corporation's .NET™ platform.

31 Claims, 4 Drawing Sheets

OTHER PUBLICATIONS

Flanagan; "Java foundation classes in a Nutshell" O'Reilly 9–1000 Chapters 1–2.

Gould; "Develop n–tier applications using J2EE" Java World Dec. 2000 pp. 1–10.

Deitel & Deitel, Java™ How to Program book, Prentice Hall, Third edition, 1999 (pp. 7–29, 698–699, 714–717, 876–878, 936–977, 980–998, 1002–1046).

Tim O'Reilly, The Network Really Is the Computer, The O'Reilly Network at (http://www.oreilyynet.com) Jun. 8, 2000, pp. 1–11.

The Java tm 2 Enterprise Edition Developer's Guide, v1.2.1, May 2000, Sun Microsystems, Palo Alto Ca. U.S.A., chapter 1; pp. 1–10 & pp. 152–155.

Bill Shannon, Java tm 2 Platform Enterprise Edition Specification, v1.2, Sun Microsystems, Palo Alto , Ca. U.S.A., Dec. 17, 1999, pp. 2–1 thru 2–7 & 6–1.

Java tm Platform, Standard Edition, v1.2.2 API Specification, 1993–1999 Sun Microsystems, Inc. in the U.S.A. and other Countries. Palo Alto, Ca. U.S.A, pp. 1–4.

* cited by examiner

APPLICATION PROGRAM INTERFACE FOR NETWORK SOFTWARE PLATFORM

TECHNICAL FIELD

This invention relates to network software, such as Web applications, and to computer software development of such network software. More particularly, this invention relates to an application program interface (API) that facilitates use of a network software platform by application programs and computer hardware.

BACKGROUND

Very early on, computer software came to be categorized as "operating system" software or "application" software. Broadly speaking, an application is software meant to perform a specific task for the computer user such as solving a mathematical equation or supporting word processing. The operating system is the software that manages and controls the computer hardware. The goal of the operating system is to make the computer resources available to the application programmer while at the same time, hiding the complexity necessary to actually control the hardware.

The operating system makes the resources available via functions that are collectively known as the Application Program Interface or API. The term API is also used in reference to a single one of these functions. The functions are often grouped in terms of what resource or service they provide to the application programmer. Application software requests resources by calling individual API functions. API functions also serve as the means by which messages and information provided by the operating system are relayed back to the application software.

In addition to changes in hardware, another factor driving the evolution of operating system software has been the desire to simplify and speed application software development. Application software development can be a daunting task, sometimes requiring years of developer time to create a sophisticated program with millions of lines of code. For a popular operating system such as Microsoft Windows®, application software developers write thousands of different applications each year that utilize the operating system. A coherent and usable operating system base is required to support so many diverse application developers.

Often, development of application software can be made simpler by making the operating system more complex. That is, if a function may be useful to several different application programs, it may be better to write it once for inclusion in the operating system, than requiring dozens of software developers to write it dozens of times for inclusion in dozens of different applications. In this manner, if the operating system supports a wide range of common functionality required by a number of applications, significant savings in applications software development costs and time can be achieved.

Regardless of where the line between operating system and application software is drawn, it is clear that for a useful operating system, the API between the operating system and the computer hardware and application software is as important as efficient internal operation of the operating system itself Over the past few years, the universal adoption of the Internet, and networking technology in general, has changed the landscape for computer software developers. Traditionally, software developers focused on single-site software applications for standalone desktop computers, or LAN-based computers that were connected to a limited number of other computers via a local area network (LAN). Such software applications were typically referred to as "shrink wrapped" products because the software was marketed and sold in a shrink-wrapped package. The applications utilized well-defined APIs to access the underlying operating system of the computer.

As the Internet evolved and gained widespread acceptance, the industry began to recognize the power of hosting applications at various sites on the World Wide Web (or simply the "Web"). In the networked world, clients from anywhere could submit requests to server-based applications hosted at diverse locations and receive responses back in fractions of a second. These Web applications, however, were typically developed using the same operating system platform that was originally developed for standalone computing machines or locally networked computers. Unfortunately, in some instances, these applications do not adequately transfer to the distributed computing regime. The underlying platform was simply not constructed with the idea of supporting limitless numbers of interconnected computers.

To accommodate the shift to the distributed computing environment being ushered in by the Internet, Microsoft Corporation is developing a network software platform known as the ".NET" platform (read as "Dot Net"). The platform allows developers to create Web services that will execute over the Internet. Such a dynamic shift requires a new ground-up design of an entirely new API.

In response to this challenge, the inventors developed a unique set of API functions for Microsoft's .NET™ platform.

SUMMARY

An application program interface (API) provides a set of functions for application developers who build Web applications on a network platform, such as Microsoft Corporation's .NET™ platform.

BRIEF DESCRIPTION OF THE DRAWINGS

The same numbers are used throughout the drawings to reference like features.

BRIEF DESCRIPTION OF ACCOMPANYING COMPACT DISC

Accompanying this specification is a compact disc that stores a compiled HTML help file identifying the API (application program interface) for Microsoft's .NET™ network platform. The file is named "cpref.chm" and was created on Jun. 8, 2001. It is 30.81 Mbytes in size. The file can be executed on a Windows®-based computing device (e.g., IBM-PC, or equivalent) that executes a Windows®-brand operating system (e.g., Windows® NT, Windows® 98, Windows® 2000, etc.). The compiled HTML help file stored on the compact disk is hereby incorporated by reference.

Additionally, the APIs contained in the compiled HTML help file are also provided in approximately 100 separate text files named "NamespaceName.txt". The text files comply with the ASCII format.

The compact disc itself is a CD-ROM, and conforms to the ISO 9660 standard.

DETAILED DESCRIPTION

This disclosure addresses an application program interface (API) for a network platform upon which developers can build Web applications and services. More particularly, an exemplary API is described for the .NET™ platform created by Microsoft Corporation. The .NET™ platform is a software platform for Web services and Web applications implemented in the distributed computing environment. It represents the next generation of Internet computing, using open communication standards to communicate among loosely coupled Web services that are collaborating to perform a particular task.

In the described implementation, the .NET™ platform utilizes XML (extensible markup language), an open standard for describing data. XML is managed by the World Wide Web Consortium (W3C). XML is used for defining data elements on a Web page and business-to-business documents. XML uses a similar tag structure as HTML; however, whereas HTML defines how elements are displayed, XML defines what those elements contain. HTML uses predefined tags, but XML allows tags to be defined by the developer of the page. Thus, virtually any data items can be identified, allowing Web pages to function like database records. Through the use of XML and other open protocols, such as Simple Object Access Protocol (SOAP), the .NET™ platform allows integration of a wide range of services that can be tailored to the needs of the user. Although the embodiments described herein are described in conjunction with XML and other open standards, such are not required for the operation of the claimed invention. Other equally viable technologies will suffice to implement the inventions described herein.

As used herein, the phrase application program interface or API includes traditional interfaces that employ method or function calls, as well as remote calls (e.g., a proxy, stub relationship) and SOAP/XML invocations.

Exemplary Network Environment

Figure 1:
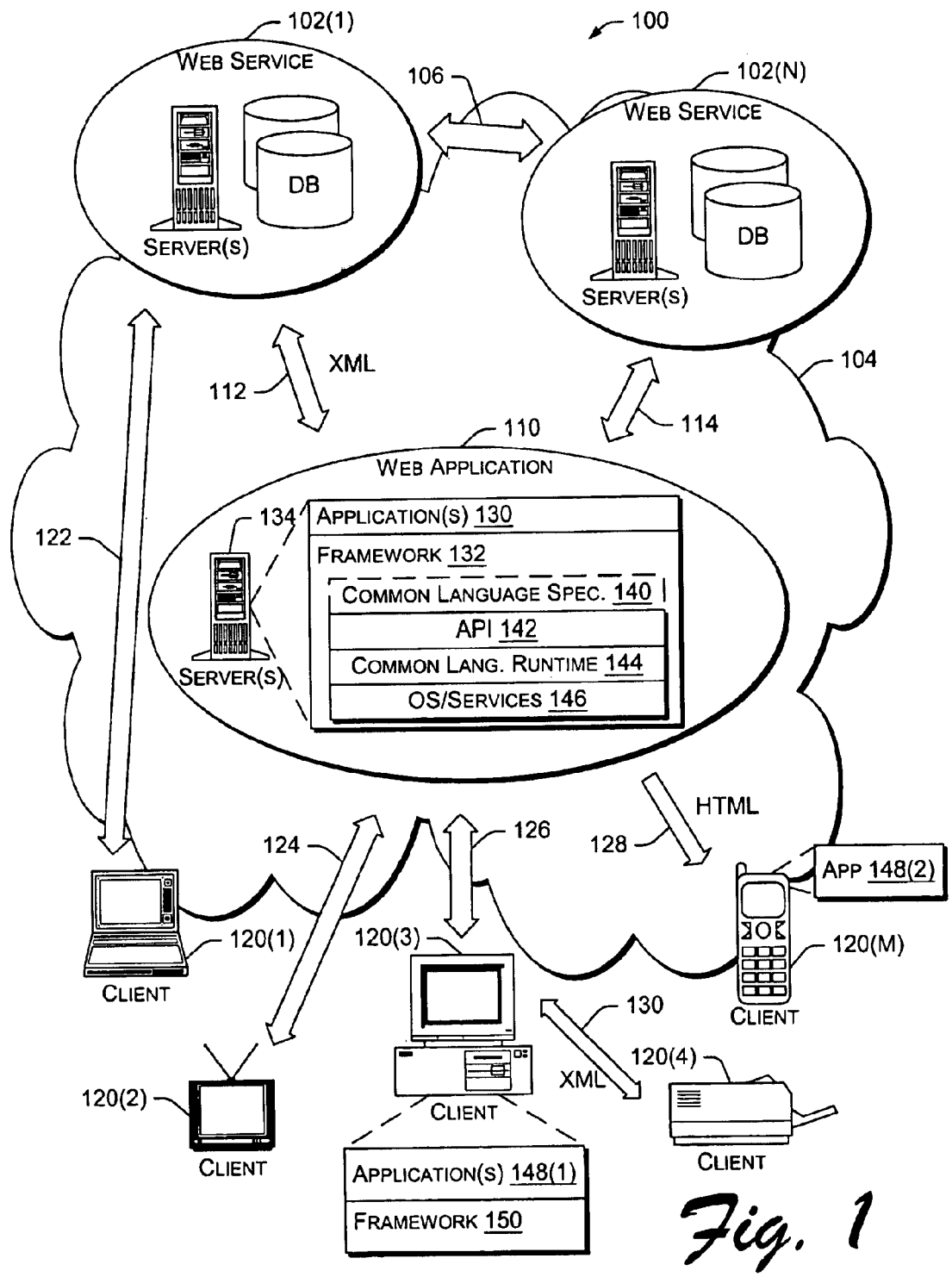
FIG. 1 illustrates a network architecture in which clients access Web services over the Internet using conventional protocols.

FIG. 1 shows a network environment 100 in which a network platform, such as the .NET™ platform, may be implemented. The network environment 100 includes representative Web services 102(1), . . . , 102(N), which provide services that can be accessed over a network 104 (e.g., Internet). The Web services, referenced generally as number 102, are programmable application components that are reusable and interact programmatically over the network 104, typically through industry standard Web protocols, such as XML, SOAP, WAP (wireless application protocol), HTTP (hypertext transport protocol), and SMTP (simple mail transfer protocol) although other means of interacting with the Web services over the network may also be used, such as Remote Procedure Call (RPC) or object broker type technology. A Web service can be self-describing and is often defined in terms of formats and ordering of messages.

Web services 102 are accessible directly by other services (as represented by communication link 106) or a software application, such as Web application 110 (as represented by communication links 112 and 114). Each Web service 102 is illustrated as including one or more servers that execute software to handle requests for particular services. Such services often maintain databases that store information to be served back to requesters. Web services may be configured to perform any one of a variety of different services. Examples of Web services include login verification, notification, database storage, stock quoting, location directories, mapping, music, electronic wallet, calendar/scheduler, telephone listings, news and information, games, ticketing, and so on. The Web services can be combined with each other and with other applications to build intelligent interactive experiences.

The network environment 100 also includes representative client devices 120(1), 120(2), 120(3), 120(4), . . . , 120(M) that utilize the Web services 102 (as represented by communication link 122) and/or the Web application 110 (as represented by communication links 124, 126, and 128). The clients may communicate with one another using standard protocols as well, as represented by an exemplary XML link 130 between clients 120(3) and 120(4).

The client devices, referenced generally as number 120, can be implemented many different ways. Examples of possible client implementations include, without limitation, portable computers, stationary computers, tablet PCs, televisions/set-top boxes, wireless communication devices, personal digital assistants, gaming consoles, printers, photocopiers, and other smart devices.

The Web application 110 is an application designed to run on the network platform and may utilize the Web services 102 when handling and servicing requests from clients 120. The Web application 110 is composed of one or more software applications 130 that run a top a programming framework 132, which are executing on one or more servers 134 or other computer systems. Note that a portion of Web application 110 may actually reside on one or more of clients 120. Alternatively, Web application 110 may coordinate with other software on clients 120 to actually accomplish its tasks.

The programming framework 132 is the structure that supports the applications and services developed by application developers. It permits multi-language development and seamless integration by supporting multiple languages. It supports open protocols, such as SOAP, and encapsulates the underlying operating system and object model services. The framework provides a robust and secure execution environment for the multiple programming languages and offers secure, integrated class libraries.

The framework 132 is a multi-tiered architecture that includes an application program interface (API) layer 142, a common language runtime (CLR) layer 144, and an operating system/services layer 146. This layered architecture allows updates and modifications to various layers without impacting other portions of the framework. A common language specification (CLS) 140 allows designers of various languages to write code that is able to access underlying library functionality. The specification 140 functions as a contract between language designers and library designers that can be used to promote language interoperability. By adhering to the CLS, libraries written in one language can be directly accessible to code modules written in other languages to achieve seamless integration between code modules written in one language and code modules written in another language. One exemplary detailed implementation of a CLS is described in an ECMA standard created by participants in ECMA TC39/TG3. The reader is directed to the ECMA web site at www.ecma.ch.

The API layer 142 presents groups of functions that the applications 130 can call to access the resources and services provided by layer 146. By exposing the API functions for a network platform, application developers can create Web applications for distributed computing systems that make full use of the network resources and other Web services, without needing to understand the complex interworkings of how those network resources actually operate or are made available. Moreover, the Web applications can be written in any number of programming languages, and translated into an intermediate language supported by the common language runtime 144 and included as part of the common language specification 140. In this way, the API layer 142 can provide methods for a wide and diverse variety of applications.

Additionally, the framework 132 can be configured to support API calls placed by remote applications executing remotely from the servers 134 that host the framework. Representative applications 148(1) and 148(2) residing on clients 120(3) and 120(M), respectively, can use the API functions by making calls directly, or indirectly, to the API layer 142 over the network 104.

The framework may also be implemented at the clients. Client 120(3) represents the situation where a framework 150 is implemented at the client. This framework may be identical to server-based framework 132, or modified for client purposes. Alternatively, the client-based framework may be condensed in the event that the client is a limited or dedicated function device, such as a cellular phone, personal digital assistant, handheld computer, or other communication/computing device.

Developers' Programming Framework

Figure 2:
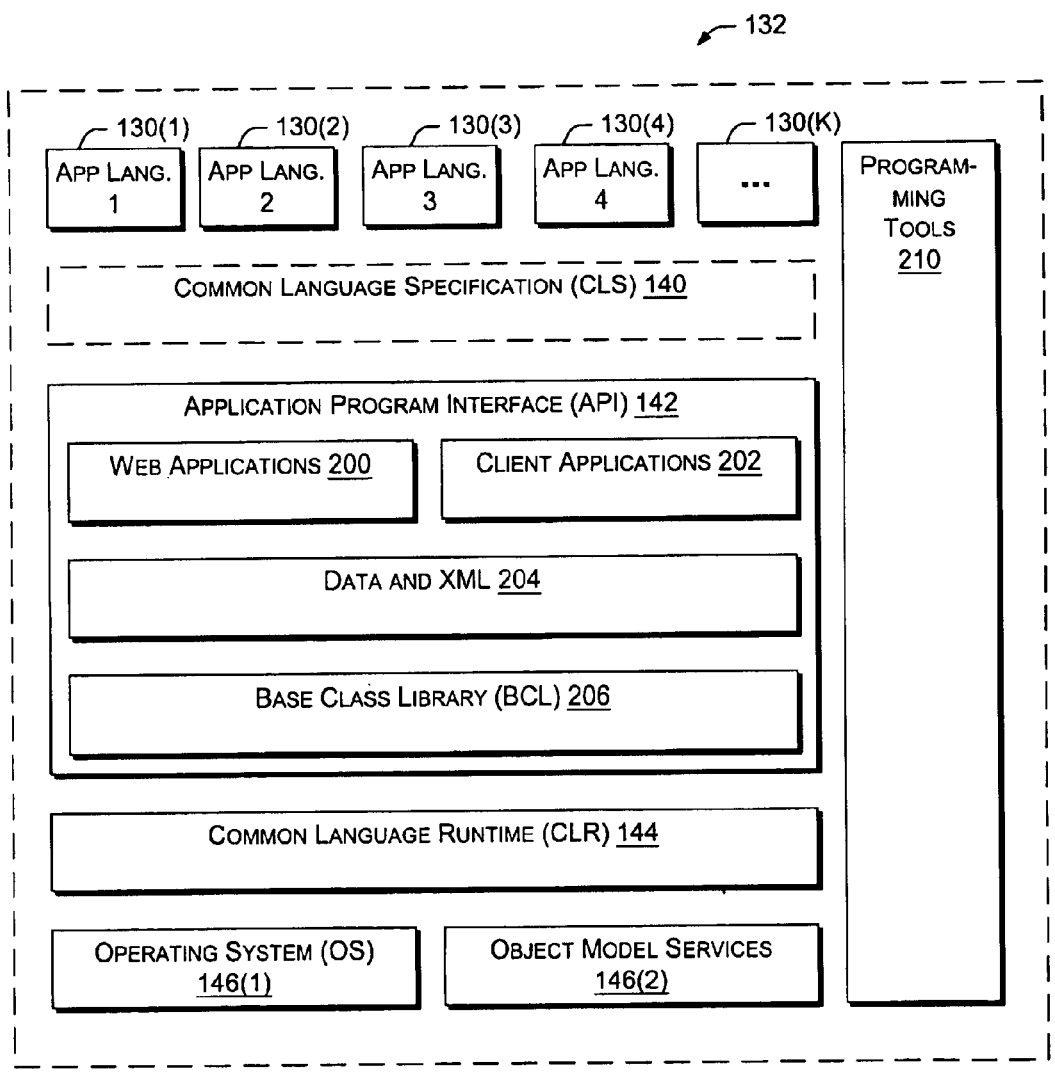
FIG. 2 is a block diagram of a software architecture for Microsoft's .NET™ platform, which includes an application program interface (API).

FIG. 2 shows the programming framework 132 in more detail. The common language specification (CLS) layer 140 supports applications written in a variety of languages 130(1), 130(2), 130(3), 130(4), . . . , 130(K). Such application languages include Visual Basic, C++, C#, COBOL, Jscript, Perl, Eiffel, Python, and so on. The common language specification 140 specifies a subset of features or rules about features that, if followed, allow the various languages to communicate. For example, some languages do not support a given type (e.g., an "int*" type) that might otherwise be supported by the common language runtime 144. In this case, the common language specification 140 does not include the type. On the other hand, types that are supported by all or most languages (e.g., the "int[ ]" type) is included in common language specification 140 so library developers are free to use it and are assured that the languages can handle it. This ability to communicate results in seamless integration between code modules written in one language and code modules written in another language. Since different languages are particularly well suited to particular tasks, the seamless integration between languages allows a developer to select a particular language for a particular code module with the ability to use that code module with modules written in different languages. The common language runtime 144 allow seamless multi-language development, with cross language inheritance, and provide a robust and secure execution environment for the multiple programming languages. For more information on the common language specification 140 and the common language runtime 144, the reader is directed to co-pending applications entitled "Method and System for Compiling Multiple Languages", filed Jun. 21, 2000 (Ser. No. 09/598,105) and "Unified Data Type System and Method" filed Jul. 7, 2000 (Ser. No. 09/613,289), which are incorporated by reference.

The framework 132 encapsulates the operating system 146(1) (e.g., Windows®-brand operating systems) and object model services 146(2) (e.g., Component Object Model (COM) or Distributed COM). The operating system 146(1) provides conventional functions, such as file management, notification, event handling, user interfaces (e.g., windowing, menus, dialogs, etc.), security, authentication, verification, processes and threads, memory management, and so on. The object model services 146(2) provide interfacing with other objects to perform various tasks. Calls made to the API layer 142 are handed to the common language runtime layer 144 for local execution by the operating system 146(1) and/or object model services 146(2).

The API 142 groups API functions into multiple namespaces. Namespaces essentially define a collection of classes, interfaces, delegates, enumerations, and structures, which are collectively called "types", that provide a specific set of related functionality. A class represents managed heap allocated data that has reference assignment semantics. A delegate is an object oriented function pointer. An enumeration is a special kind of value type that represents named constants. A structure represents static allocated data that has value assignment semantics. An interface defines a contract that other types can implement.

By using namespaces, a designer can organize a set of types into a hierarchical namespace. The designer is able to create multiple groups from the set of types, with each group containing at least one type that exposes logically related functionality. In the exemplary implementation, the API 142 is organized into four root namespaces: a first namespace 200 for Web applications, a second namespace 202 for client applications, a third namespace 204 for data and XML, and a fourth namespace 206 for base class libraries (BCLs). Each group can then be assigned a name. For instance, types in the Web applications namespace 200 are assigned the name "Web", and types in the data and XML namespace 204 can be assigned names "Data" and "XML" respectively. The named groups can be organized under a single "global root" namespace for system level APIs, such as an overall System namespace. By selecting and prefixing a top level identifier, the types in each group can be easily referenced by a hierarchical name that includes the selected top level identifier prefixed to the name of the group containing the type. For instance, types in the Web applications namespace 200 can be referenced using the hierarchical name "System-.Web". In this way, the individual namespaces 200, 202, 204, and 206 become major branches off of the System namespace and can carry a designation where the individual namespaces are prefixed with a designator, such as a "System." prefix.

The Web applications namespace 200 pertains to Web based functionality, such as dynamically generated Web pages (e.g., Microsoft's Active Server Pages (ASP)). It supplies types that enable browser/server communication. The client applications namespace 202 pertains to drawing and client side UI functionality. It supplies types that enable drawing of two-dimensional (2D), imaging, and printing, as well as the ability to construct window forms, menus, boxes, and so on.

The data and XML namespace 204 relates to connectivity to data sources and XML functionality. It supplies classes, interfaces, delegates, and enumerations that enable security, specify data types, and serialize objects into XML format documents or streams. The base class libraries (BCL) namespace 206 pertains to basic system and runtime functionality. It contains the fundamental types and base classes that define commonly-used value and reference data types, events and event handlers, interfaces, attributes, and processing exceptions.

In addition to the framework 132, programming tools 210 are provided to assist the developer in building Web services and/or applications. One example of the programming tools 200 is Visual Studio™, a multi-language suite of programming tools offered by Microsoft Corporation.

Root API Namespaces

Figure 3:
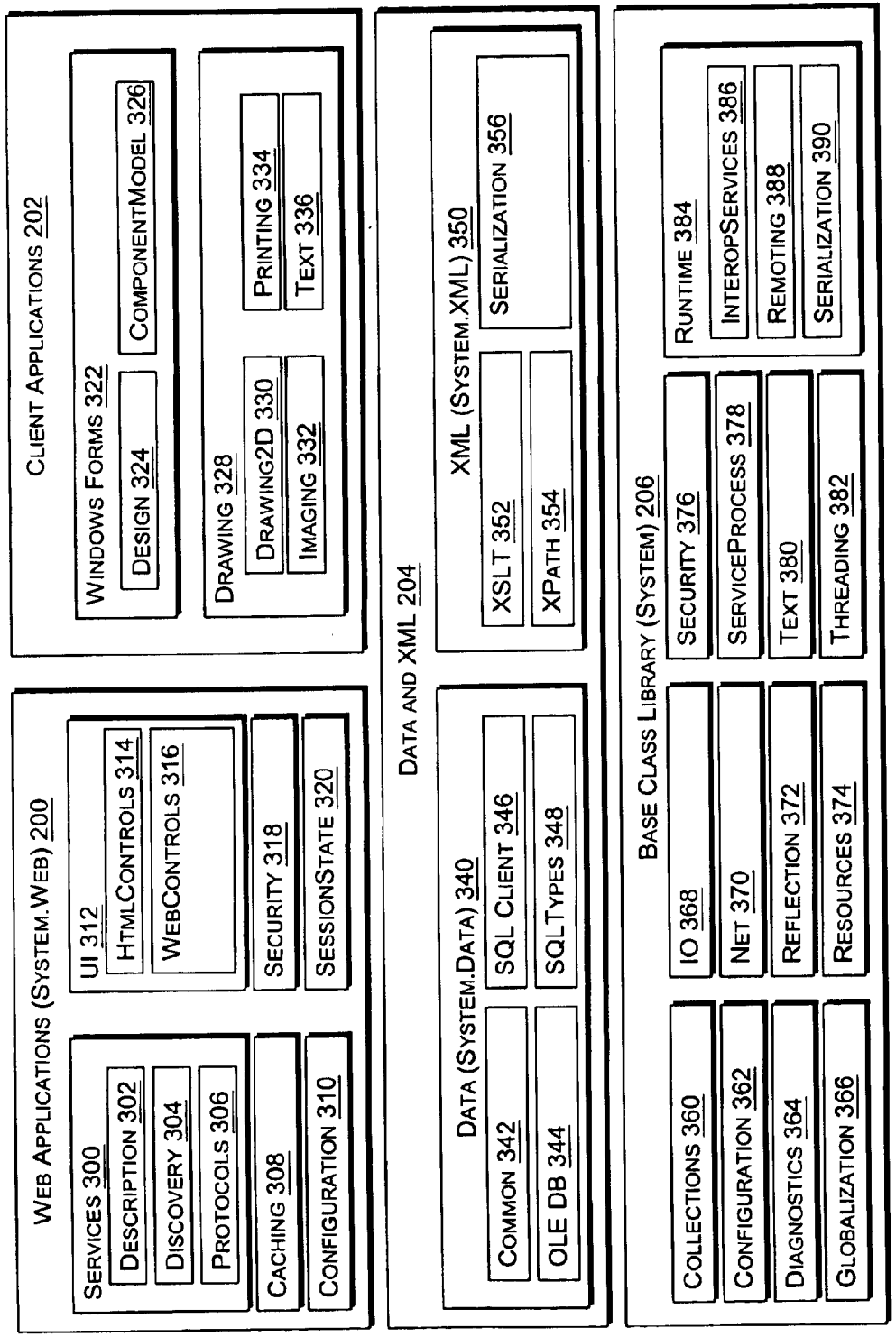
FIG. 3 is a block diagram of unique namespaces supported by the API, as well as function classes of the various API functions.

FIG. 3 shows the API 142 and its four root namespaces in more detail. In one embodiment, the namespaces are identified according to a hierarchical naming convention in which strings of names are concatenated with periods. For instance, the Web applications namespace 200 is identified by the root name "System.Web". Within the "Sytem.Web" namespace is another namespace for Web services, identified as "System.Web.Services", which further identifies another namespace for a description known as "System.Web.Services.Description". With this naming convention in mind, the following provides a general overview of selected namespaces of the API 142, although other naming conventions could be used with equal effect.

The Web applications namespace 200 ("System.Web") defines additional namespaces, including:

A services namespace 300 ("System.Web.Services") containing classes that enable a developer to build and use Web services. The services namespace 300 defines additional namespaces, including a description namespace 302 ("System.Web.Services.Description") containing classes that enable a developer to publicly describe a Web service via a service description language (such as WSDL, a specification available from the W3C), a discovery namespace 304 ("System.Web.Services.Discovery") containing classes that allow Web service consumers to locate available Web Services on a Web server, and a protocols namespace 306 ("System.Web.Services.Protocols") containing classes that define the protocols used to transmit data across a network during communication between Web service clients and the Web service itself.

A caching namespace 308 ("System.Web.Caching") containing classes that enable developers to decrease Web application response time through temporarily caching frequently used resources on the server. This includes ASP.NET pages, web services, and user controls. (ASP.NET is the updated version of Microsoft's ASP technology.) Additionally, a cache dictionary is available for developers to store frequently used resources, such as hash tables and other data structures.

A configuration namespace 310 ("System.Web.Configuration") containing classes that are used to read configuration data in for an application.

A UI namespace 312 ("System.Web.UI") containing types that allow developers to create controls and pages that will appear in Web applications as user interfaces on a Web page. This namespace includes the control class, which provides all web based controls, whether those encapsulating HTML elements, higher level Web controls, or even custom User controls, with a common set of functionality. Also provided are classes which provide the web forms server controls data binding functionality, the ability to save the view state of a given control or page, as well as parsing functionality for both programmable and literal controls. Within the UI namespace 312 are two additional namespaces: an HTML controls namespace 314 ("System.Web.UI.HtmlControls") containing classes that permit developers to interact with types that encapsulates html 3.2 elements create HTML controls, and a Web controls namespace 316 ("System.Web.UI.WeblControls") containing classes that allow developers to create higher level Web controls.

A security namespace 318 ("System.Web.Security") containing classes used to implement security in web server applications, such as basic authentication, challenge response authentication, and role based authentication.

A session state namespace 320 ("System.Web.SessionState") containing classes used to access session state values (i.e., data that lives across requests for the lifetime of the session) as well as session-level settings and lifetime management methods.

The client applications namespace 202 is composed of two namespaces:

A windows forms namespace 322 ("System.Windows.Forms") containing classes for creating Windows®-based client applications that take full advantage of the rich user interface features available in the Microsoft Windows® operating system, such as the ability to drag and drop screen elements. Such classes may include wrapped APIs available in the Microsoft Windows® operating system that are used in a windowing UI environment. Within this namespace are a design namespace 324 ("System.Windows.Forms.Design") that contains classes to extend design-time support for Windows forms and a component model namespace 326 ("System.Windows.Forms.ComponentModel") that contains the windows form implementation of the general component model defined in System.ComponentModel. This namespace contains designer tools, such as Visual Studio, which offer a rich experience for developers at design time.

A drawing namespace 328 ("System.Drawing") containing classes for graphics functionality. The drawing namespace 328 includes a 2D drawing namespace 330 ("System.Drawing.Drawing2D") that contains classes and enumerations to provide advanced 2-dimmensional and vector graphics functionality, an imaging namespace 332 ("System.Drawing.Imaging") that contains classes for advanced imaging functionality, a printing namespace 334 ("System.Drawing.Printing") that contains classes to permit developers to customize printing, and a text namespace 336 ("System.Drawing.Text") that contains classes for advanced typography functionality.

The data and XML namespace 204 is composed of two namespaces:

A data namespace 340 ("System.Data") containing classes that enable developers to build components that efficiently manage data from multiple data sources. It implements an architecture that, in a disconnected scenario (such as the Internet), provides tools to request, update, and reconcile data in multiple tier systems. The data namespace 340 includes a common namespace 342 that contains types shared by data providers. A data provider describes a collection of types used to access a data source, such as a database, in the managed space. The data namespace 340 also includes an OLE DB namespace 344 that contains types pertaining to data used in object-oriented databases (e.g., Microsoft's SQL Server), and a SQL client namespace 346 that contains types pertaining to data used by SQL clients. The data namespace also includes a SQL types namespace 348 ("System.Data.SqlTypes") that contains classes for native data types within Microsoft's SQL Server. The classes provide a safer, faster alternative to other data types. Using the objects within this namespace helps prevent type conversion errors caused in situations where loss of precision could occur. Because other data types are converted to and from SQL types behind the scenes, explicitly creating and using objects within this namespace results in faster code as well.

An XML namespace 350 ("System.XML") containing classes that provide standards-based support for processing XML. The supported standards include XML (e.g., version 1.0), XML Namespaces (both stream level and DOM), XML Schemas, XPath expressions, XSL/T transformations, DOM Level 2 Core, and SOAP (e.g., version 1.1). The XML namespace 350 includes an XSLT namespace 352 ("System.XML.Xsl") that contains classes and enumerations to support XSLT (Extensible Stylesheet Language Transformations), an Xpath namespace 354 ("System.XML.Xpath") that contains an XPath parser and evaluation engine, and a serialization namespace 356 ("System.XML.Serialization") that contains classes used to serialize objects into XML format documents or streams.

The base class library namespace 206 ("System") includes the following namespaces:

A collections namespace 360 ("System.Collections") containing interfaces and classes that define various collections of objects, such as lists, queues, arrays, hash tables and dictionaries.

A configuration namespace 362 ("System.Configuration") containing classes and interfaces that allow developers to programmatically access configuration settings and handle errors in configuration files.

A diagnostics namespace 364 ("System.Diagnostics") containing classes that are used to debug applications and to trace code execution. The namespace allows developers to start system processes, read and write to event logs, and monitor system performance using performance counters.

A globalization namespace 366 ("System.Globalization") containing classes that define culture-related information, including the language, the country/region, the calendars in use, the format patterns for dates, currency and numbers, and the sort order for strings.

An I/O namespace 368 ("System.IO") containing the infrastructure pieces to operate with the input/output of data streams, files, and directories. This namespace includes a model for working with streams of bytes, higher level readers and writers which consume those bytes, various constructions or implementations of the streams (e.g., FileStream and MemoryStream) and, a set of utility classes for working with files and directories.

A net namespace 370 ("System.Net") providing an extensive set of classes for building network-enabled application, referred to as the Net Class Libraries (NCL). One element to the design of the Net Class Libraries is an extensible, layered approach to exposing networking functionality. The NCL stack contains three basic layers. A base layer (System.Net.Socket) provides access to an interface to TCP/IP, the communications protocol of UNIX networks and the Internet. One example of such an interface is the "WinSock API" from Microsoft Corporation. The next layer is the Transport Protocol classes, which support such transport protocols as TCP and UDP. Developers may write their own protocol classes to provide support for protocols such as IGMP and ICMP. The third layer is the Web request, which provides an abstract factory pattern for the creation of other protocol classes. The NCL provides implementations for Hyper Text Transport Protocol (HTTP).

A reflection namespace ("System.Reflection") 372 containing types that provide a managed view of loaded types, methods, and fields, with the ability to dynamically create and invoke types.

A resources namespace 374 ("System.Resources") containing classes and interfaces that allow developers to create, store and manage various culture-specific resources used in an application.

A security namespace 376 ("System.Security") supporting the underlying structure of the security system, including interfaces, attributes, exceptions, and base classes for permissions.

A service process namespace 378 ("System.ServiceProcess") containing classes that allow developers to install and run services. Services are long-running executables that run without a user interface. They can be installed to run under a system account that enables them to be started at computer reboot. Services whose implementation is derived from processing in one class can define specific behavior for start, stop, pause, and continue commands, as well as behavior to take when the system shuts down.

A text namespace 380 ("System.Text") containing classes representing various types of encodings (e.g., ASCII, Unicode, UTF-7, and UTF-8), abstract base classes for converting blocks of characters to and from blocks of bytes, and a helper class that manipulates and formats string objects without creating intermediate instances.

A threading namespace 382 ("System.Threading") containing classes and interfaces that enable multi-threaded programming. The threading namespace includes a ThreadPool class that manages groups of threads, a Timer class that enables a delegate to be called after a specified amount of time, and a Mutex class for synchronizing mutually-exclusive threads. This namespace also provides classes for thread scheduling, wait notification, and deadlock resolution.

A runtime namespace 384 ("System.Runtime") containing multiple namespaces concerning runtime features, including an interoperation services namespace 386 ("System.Runtime.InteropServices") that contains a collection of classes useful for accessing COM objects. The types in the InteropServices namespace fall into the following areas of functionality: attributes, exceptions, managed definitions of COM types, wrappers, type converters, and the Marshal class. The runtime namespace 384 further includes a remoting namespace 388 ("System.Runtime.Remoting") that contains classes and interfaces allowing developers to create and configure distributed applications. Another namespace within the runtime namespace 384 is a serialization namespace 390 ("System.Runtime.Serialization") that contains classes used for serializing and deserializing objects. Serialization is the process of converting an object or a graph of objects into a linear sequence of bytes for either storage or transmission to another location.

The data namespace ("System.Data") contains classes that allow developers to build components to manage data from various data sources. The data namespace provides tools to request, update, and reconcile data in multiple tier systems. As discussed above, the data namespace 340 includes a common namespace 342 ("System.Data.Common"), an OLE DB namespace 344 ("System.Data.OleDb"), an SQL client namespace 346 ("System.Data.SqlClient"), and an SQL Types namespace 348 ("System.Data.SqlTypes").

The data namespace 340 contains various classes, including a constraint class that contains rules to maintain the integrity of data in a data table. A data column class provides the fundamental components for creating the schema of a data table. This schema is built by adding together one or more data column objects. A data column collection class defines the schema of a data table and determines the type of data each data column can contain. A data relation class is used to relate two data table objects to one another through data column objects.

The data namespace 340 also includes a data row class that provides a primary component of the data table. A data row collection contains the actual data for the data table. A data row change event and a data column change event occur when a change is made to a data row's value or a data column's value, respectively.

The common namespace 342 contains types shared by multiple data providers. The common namespace 342 also includes various classes, such as a data adapter class that allows for the exchange of data between a data source and a data set. A data column mapping class maps column names from a data source to corresponding column names in a data table. A data table mapping class maps data returned from a query of a data source to a data table.

The OLE DB namespace 344 includes a command builder class that automatically generates SQL statements for data table updates and a connection class that provides connections to a data source, such as a network server.

The SQL client namespace 346 also includes a command builder class. Additionally, the SQL client namespace includes a connection class that represents a unique session to an SQL server data source and a data adapter class that exchanges data between a data set and an SQL server for retrieving and saving data.

The SQL Types namespace contains classes for native data types within Microsoft's SQL Server.

Using these classes helps prevent type conversion errors caused in situations where loss of precision could occur. Other data types are converted to and from SQL types (behind the scenes), such that explicitly creating and using objects in the data namespace results in faster code. Specific details regarding the System.Data namespace are provided below.

System.Data
 Description
  The System.Data namespace consists mostly of the classes that constitute the ADO.NET architecture. The ADO.NET architecture enables you to build components that efficiently manage data from multiple data sources. In a disconnected scenario (such as the Internet), ADO.NET provides the tools to request, update, and reconcile data in multiple tier systems. The ADO.NET architecture is also implemented in client applications, such as Windows Forms, or HTML pages created by ASP.NET.

AcceptRejectRule enumeration (System.Data)
 Description
  Determines the action that occurs when the System.Data.DataSet.AcceptChanges or System.Data.DataTable.RejectChanges method is invoked on a System.Data.DataTable with a System.Data.ForeignKeyConstraint.
  Changes to a System.Data.DataTable are not final until you call the System.Data.DataTable.AcceptChanges method. At that time, constraint-related errors can occur because any System.Data.ForeignKeyConstraint objects associated with a System.Data.DataTable are activated to allow deletions and edits to occur freely. Prior to that time, System.Data.ForeignKeyConstraint objects are inactive. When the System.Data.ForeignKeyConstraint becomes activated, and errors occur, System.Data.AcceptRejectRule is called to determine the next course of action.
  [C#] public const AcceptRejectRule Cascade;
  [C++] public: const AcceptRejectRule Cascade;
  [VB] Public Const Cascade As AcceptRejectRule
  [JScript] public var Cascade: AcceptRejectRule;
 Description
  Changes are cascaded across the relationship.
  [C#] public const AcceptRejectRule None;
  [C++] public: const AcceptRejectRule None;
  [VB] Public Const None As AcceptRejectRule
  [JScript] public var None: AcceptRejectRule;
 Description
  No action occurs.
  Methods:
  CommandBehavior enumeration (System.Data)
   ToString
  Description
   Specifies a description of the results and the affect on the database of the query command.
   The System.Data.CommandBehavior values are used by the System.Data.IDbCommand.ExecuteReader method of System.Data.IDbCommand and any classes derived from it.
    ToString
    [C#] public const CommandBehavior CloseConnection;
    [C++] public: const CommandBehavior CloseConnection;
    [VB] Public Const CloseConnection As CommandBehavior
    [JScript] public var CloseConnection: CommandBehavior;
   Description
    When the command is executed, the associated Connection object is closed when the associated DataReader object is closed.
    ToString
    [C#] public const CommandBehavior Default;
    [C++] public: const CommandBehavior Default;
    [VB] Public Const Default As CommandBehavior
    [JScript] public var Default: CommandBehavior;
    ToString
    [C#] public const CommandBehavior KeyInfo;
    [C++] public: const CommandBehavior KeyInfo;
    [VB] Public Const KeyInfo As CommandBehavior
    [JScript] public var KeyInfo: CommandBehavior;
   Description
    The query returns column and primary key information. The query is executed without any locking on the selected rows. When using System.Data.CommandBehavior.KeyInfo, the SQL Server .NET Data Provider appends a FOR BROWSE clause to the statement being executed. The user should be aware of potential side effects, such as interference with the use of SET FMTONLY ON statements. See SQL Server Books Online for more information.
    ToString
    [C#] public const CommandBehavior SchemaOnly;

[C++] public: const CommandBehavior SchemaOnly;
[VB] Public Const SchemaOnly As CommandBehavior
[JScript] public var SchemaOnly: CommandBehavior;
Description
  The query returns column information only and does not affect the database state.
  ToString
[C#] public const CommandBehavior SequentialAccess;
[C++] public: const CommandBehavior SequentialAccess;
[VB] Public Const SequentialAccess As CommandBehavior
[JScript] public var SequentialAccess: CommandBehavior;
Description
  The results of the query are read sequentially to the column level. This allows an application to read large binary values using the GetChars or GetBytes methods of a .NET data provider. Execution of the query may affect the database state.
  ToString
[C#] public const CommandBehavior SingleResult;
[C++] public: const CommandBehavior SingleResult;
[VB] Public Const SingleResult As CommandBehavior
[JScript] public var SingleResult: CommandBehavior;
Description
  The query returns a single result. Execution of the query may affect the database state.
  ToString
[C#] public const CommandBehavior SingleRow;
[C++] public: const CommandBehavior SingleRow;
[VB] Public Const SingleRow As CommandBehavior
[JScript] public var SingleRow: CommandBehavior;
Description
  The query is expected to return a single row. Execution of the query may affect the database state. Some .NET data providers may, but are not required to, use this information to optimize the performance of the command. When you specify System.Data.CommandBehavior.SingleRow with the System.Data.OleDb.OleDbCommand.ExecuteReader method of the System.Data.OleDb.OleDbCommand object, the OLE DB .NET Data Provider performs binding using the OLE DB IRow interface if it is available. Otherwise, it uses the IRowset interface. If your SQL statement is expected to return only a single row, specifying System.Data.CommandBehavior.SingleRow can also improve application performance.
  CommandType enumeration (System.Data)
  ToString
Description
  Specifies how a command string is interpreted.
  When the System.Data.IDbCommand.CommandType property is set to StoredProcedure, set the System.Data.IDbCommand.CommandText property to the name of the stored procedure. The command executes this stored procedure when you call System.Data.IDbCommand.ExecuteReader.
  ToString
[C#] public const CommandType StoredProcedure;
[C++] public: const CommandType StoredProcedure;
[VB] Public Const StoredProcedure As CommandType
[JScript] public var StoredProcedure: CommandType;
Description
  The name of a stored procedure.
  ToString
[C#] public const CommandType TableDirect;
[C++] public: const CommandType TableDirect;
[VB] Public Const TableDirect As CommandType
[JScript] public var TableDirect: CommandType;
Description
  A table name whose columns are all returned (OLE DB .NET Data Provider only).
  ToString
[C#] public const CommandType Text;
[C++] public: const CommandType Text;
[VB] Public Const Text As CommandType
[JScript] public var Text: CommandType;
Description
  A SQL text command.
  ConnectionState enumeration (System.Data)
  ToString
Description
  Returns the current state of the connection to a data source.
  The System.Data.ConnectionState values are used by the System.Data.OleDb.OleDbConnection.State property of the System.Data.OleDb.OleDbConnection and System.Data.SqlClient.SqlConnection objects.
  ToString
[C#] public const ConnectionState Broken;
[C++] public: const ConnectionState Broken;
[VB] Public Const Broken As ConnectionState
[JScript] public var Broken: ConnectionState;
Description
  The object is broken. This can occur only after the connection has been opened. A connection in this state may be closed and then re-opened.
  ToString
[C#] public const ConnectionState Closed;
[C++] public: const ConnectionState Closed;
[VB] Public Const Closed As ConnectionState
[JScript] public var Closed: ConnectionState;
Description
  The object is closed.
  ToString
[C#] public const ConnectionState Connecting;
[C++] public: const ConnectionState Connecting;
[VB] Public Const Connecting As ConnectionState
[JScript] public var Connecting: ConnectionState;
Description
  The object is connecting.
  ToString
[C#] public const ConnectionState Executing;
[C++] public: const ConnectionState Executing;
[VB] Public Const Executing As ConnectionState
[JScript] public var Executing: ConnectionState;
Description
  The object is executing a command.
  ToString
[C#] public const ConnectionState Fetching;
[C++] public: const ConnectionState Fetching;
[VB] Public Const Fetching As ConnectionState
[JScript] public var Fetching: ConnectionState;
Description
  Data is being retrieved.
  ToString
[C#] public const ConnectionState Open;
[C++] public: const ConnectionState Open;
[VB] Public Const Open As ConnectionState
[JScript] public var Open: ConnectionState;
Description
  The object is open.
  Constraint class (System.Data)
  ToString
Description
  Represents a constraint that can be enforced on one or more System.Data.DataColumn objects.

A constraint is a rule used to maintain the integrity of the data in the System.Data.DataTable. For example, when you delete a value that is used in one or more related tables, a System.Data.ForeignKeyConstraint determines whether the values in the related tables are also deleted, set to null values, set to default values, or whether no action occurs. A System.Data.UniqueConstraint, on the other hand, simply ensures that all values within a particular table are unique. For more information, see.

Constructors:
Constraint
Example Syntax:
ToString
[C#] protected Constraint( );
[C++] protected: Constraint( );
[VB] Protected Sub New( )
[JScript] protected function Constraint( );
  Properties:
  _DataSet
  ToString
[C#] protected internal virtual DataSet_DataSet {get;}
[C++] internal: _property virtual DataSet* get_DataSet( );
[VB] Overridable Protected Friend ReadOnly Property_ DataSet As DataSet
[JScript] package function get_DataSet( ): DataSet;
Description
  Gets the System.Data.DataSet to which this constraint belongs.
  ConstraintName
  ToString
[C#] public virtual string ConstraintName {get; set;}
[C++] public: _property virtual String* get_ ConstraintName( );public: _property virtual void set_ ConstraintName(String*);
[VB] Overridable Public Property ConstraintName As String
[JScript] public function get ConstraintName( ): String;public function set ConstraintName(String);
Description
  The name of a constraint in the System.Data.Constraint-Collection
  The System.Data.ConstraintCollection is returned by the System.Data.DataTable.Constraints property of the System-.Data.DataTable class.
  ExtendedProperties
  ToString
[C#] public PropertyCollection ExtendedProperties {get;}
[C++] public: _property PropertyCollection* get_ ExtendedProperties( );
[VB] Public ReadOnly Property ExtendedProperties As PropertyCollection
[JScript] public function get ExtendedProperties( ): PropertyCollection;
Description
  Gets the collection of customized user information.
  Use the System.Data.DataTable.ExtendedProperties to add custom information to a System.Data.DataTable. Add information with the Add method. Retrieve information with the Item method.
  Table
  ToString
[C#] public abstract DataTable Table {get;}
[C++] public: _property virtual DataTable* get_Table ( )=0;
[VB] MustOverride Public ReadOnly Property Table As DataTable
[JScript] public abstract function get Table( ): DataTable;

Description
  Gets the System.Data.DataTable to which the constraint applies.
  CheckStateForProperty
[C#] protected void CheckStateForProperty( );
[C++] protected: void CheckStateForProperty( );
[VB] Protected Sub CheckStateForProperty( )
[JScript] protected function CheckStateForProperty( );
Description
  SetDataSet
[C#] protected internal void SetDataSet(DataSet dataSet);
[C++] protected public: void SetDataSet(DataSet* dataSet);
[VB] Protected Friend Dim Sub SetDataSet(ByVal dataSet As DataSet)
[JScript] package function SetDataSet(dataSet: DataSet);
Description
  Sets the constraint's System.Data.DataSet. The System-.Data.DataSet to which this constraint will belong.
  ToString
[C#] public override string ToString( );
[C++] public: String* ToString( );
[VB] Overrides Public Function ToString( ) As String
[JScript] public override function ToString( ): String;
Description
  Gets the System.Data.Constraint.ConstraintName, if there its one, as a string.
Return Value: The string value of the System.Data.Constraint.ConstraintName
  ConstraintCollection class (System.Data)
  ToString
Description
  Represents a collection of constraints for a System.Data-.DataTable.
  The System.Data.ConstraintCollection is accessed through the System.Data.DataTable.Constraints property.
  Count
  IsReadOnly
  IsSynchronized
  Item
  ToString
Description
  Gets the System.Data.Constraint from the collection with the specified name.
  The System.Data.ConstraintCollection.Contains (System.Stiring) method can be used to test for the existence of a specific constraint. The System.Data.Constraint.ConstraintName of the constraint to return.
  Item
  ToString
[C#] public virtual Constraint this[int index] {get;}
[C++] public: _property virtual Constraint* get_Item(int index);
[VB] Overridable Public Default ReadOnly Property Item (ByVal index As Integer) As Constraint
[JScript] returnValue=ConstraintCollectionObject.Item (index); Gets the specified System.Data.Constraint
Description
  Gets the System.Data.Constraint from the collection at the specified index.
  The System.Data.ConstraintCollection.Contains (System.String) method can be used to test for the existence of a specific constraint. The index of the constraint to return.
  List
  ToString
[C#] protected override ArrayList List {get;}
[C++] protected: _property virtual ArrayList* get_List( );
[VB] Overrides Protected ReadOnly Property List As Array-List

[JScript] protected function get List( ): ArrayList;
Description
Gets the list of objects contained by the collection.
SyncRoot
ToString
Description
Occurs when the System.Data.ConstraintCollection is changed through additions or removals.
For more information about handling events, see.
Add
[C#] public void Add(Constraint constraint);
[C++] public: void Add(Constraint* constraint);
[VB] Public Sub Add(ByVal constraint As Constraint)
[JScript] public function Add(constraint: Constraint); Adds a constraint to the System.Data.ConstraintCollection.
Description
Adds the specified constraint to the collection.
If the collection is successfully changed by adding or removing constraints, the System.Data.ConstraintCollection.CollectionChanged event occurs. The System.Data.Constraint to add.
Add
[C#] public virtual Constraint Add(string name, DataColumn column, bool primaryKey);
[C++] public: virtual Constraint* Add(String* name, DataColumn* column, bool primaryKey);
[VB] Overridable Public Function Add(ByVal name As String, ByVal column As DataColumn, ByVal primaryKey As Boolean) As Constraint
[JScript] public function Add(name: String, column: DataColumn, primaryKey: Boolean): Constraint;
Description
Constructs a new System.Data.UniqueConstraint, using the specified System.Data.DataColumn, and adds it to the collection.
The System.Data.ConstraintCollection.CollectionChanged event occurs if the constraint is added successfully. The name of the System.Data.UniqueConstraint. The System.Data.DataColumn affected by the constraint. Indicates whether the column is a primary key column.
Add
[C#] public virtual Constraint Add(string name, DataColumn primaryKeyColumn, DataColumn foreignKeyColumn);
[C++] public: virtual Constraint* Add(String* name, DataColumn* primaryKeyColumn, DataColumn* foreignKeyColumn);
[VB] Overridable Public Function Add(ByVal name As String, ByVal primaryKeyColumn As DataColumn, ByVal foreignKeyColumn As DataColumn) As Constraint
[JScript] public function Add(name: String, primaryKeyColumn: DataColumn, foreignKeyColumn: DataColumn): Constraint;
Description
Constructs a new System.Data.ForeignKeyConstraint, with the specified parent and child columns, and adds the constraint to the collection.
A System.Data.ForeignKeyConstraint and System.Data.UniqueConstraint are both created and added automatically when a System.Data.DataRelation is added to a System.Data.DataSet object's System.Data.DataRelationCollection. The System.Data.ForeignKeyConstraint (which gets the same name as the System.Data.DataRelation) is added to the child table's System.Data.ConstraintCollection, and the System.Data.UniqueConstraint is added to the parent table's System.Data.ConstraintCollection. The name of the System.Data.UniqueConstraint. The primary key System.Data.DataColumn. The foreign key System.Data.DataColumn.
Add
[C#] public virtual Constraint Add(string name, DataColumn[ ] columns, bool primaryKey);
[C++] public: virtual Constraint* Add(String* name, DataColumn* columns[ ], bool primaryKey);
[VB] Overridable Public Function Add(ByVal name As String, ByVal columns( ) As DataColumn, ByVal primaryKey As Boolean) As Constraint
[JScript] public function Add(name: String, columns: DataColumn[ ], primaryKey: Boolean): Constraint;
Description
Constructs a new System.Data.UniqueConstraint using the specified array of System.Data.DataColumn objects, and adds it to the collection.
The System.Data.ConstraintCollection.CollectionChanged event occurs if the constraint is added succesfully. The name of the System.Data.UniqueConstraint. An array of System.Data.DataColumn objects that are affected by the constraint. Indicates whether the columns are primary key columns.
Add
[C#] public virtual Constraint Add(string name, DataColumn[ ]primaryKeyColumns, DataColumn[ ] foreignKeyColumns);
[C++] public: virtual Constraint* Add(String* name, DataColumn* primaryKeyColumns[ ], DataColumn* foreignKeyColumns[ ]);
[VB] Overridable Public Function Add(ByVal name As String, ByVal primaryKeyColumns( ) As DataColumn, ByVal foreignKeyColumns( ) As DataColumn) As Constraint
[JScript] public function Add(name: String, primaryKeyColumns: DataColumn[ ], foreignKeyColumns: DataColumn[ ]): Constraint;
Description
Constructs a new System.Data.ForeignKeyConstraint, with the specified parent columns and child columns, and adds the constraint to the collection.
A System.Data.ForeignKeyConstraint and a System.Data.UniqueConstraint are created automatically when you add a System.Data.DataRelation to a System.Data.DataSet. In that case, adding a second System.Data.ForeignKeyConstraint on the same columns will result in an exception. To avoid this, use the System.Data.ForeignKeyConstraint constructor to create the System.Data.ForeignKeyConstraint and test it against existing collection members with the System.Data.ForeignKeyConstraint.Equals(System.Object) method. The name of the System.Data.UniqueConstraint. An array of System.Data.DataColumn objects that are the primary key columns. An array of System.Data.DataColumn objects that are the foreign key columns.
AddRange
[C#] public void AddRange(Constraint[ ] constraints);
[C++] public: void AddRange(Constraint* constraints[ ]);
[VB] Public Sub AddRange(ByVal constraints( ) As Constraint)
[JScript] public function AddRange(constraints: Constraint[ ]);
Description
Copies the elements of the specified System.Data.ConstraintCollection array to the end of the collection. An array of System.Data.ConstraintCollection objects to add to the collection.

CanRemove
[C#] public bool CanRemove(Constraint constraint);
[C++] public: bool CanRemove(Constraint* constraint);
[VB] Public Function CanRemove(ByVal constraint As Constraint) As Boolean
[JScript] public function CanRemove(constraint: Constraint): Boolean;
Description
Indicates if a System.Data.Constraint can be removed.
Return Value: Generates an exception if the System.Data.Constraint can't be removed from collection. Otherwise, true if the System.Data.Constraint can be removed.
When a System.Data.DataRelation is added to a System.Data.DataSet, a System.Data.ForeignKeyConstraint and System.Data.UniqueConstraint are added automatically to the parent table and the child table. The System.Data.UniqueConstraint is applied to the parent table's primary key column, and the System.Data.ForeignKeyConstraint is applied to the child table's foreign key column. In that case, attempting to remove the System.Data.UniqueConstraint will cause an exception to be thrown because the System.Data.ForeignKeyConstraint must be removed first. To avoid this, use the System.Data.ConstraintCollection.CanRemove (System.Data.Constraint) to determine if a System.Data.UniqueConstraint can be removed. The System.Data.Constraint to be tested for removal from the collection.

Clear
[C#] public void Clear( );
[C++] public: void Clear( );
[VB] Public Sub Clear( )
[JScript] public function Clear( );
Description
Clears the collection of any System.Data.Constraint objects.
The System.Data.ConstraintCollection.CollectionChanged occurs if this action is succesful.

Contains
[C#] public bool Contains(string name);
[C++] public: bool Contains(String* name);
[VB] Public Function Contains(ByVal name As String) As Boolean
[JScript] public function Contains(name: String): Boolean;
Description
Indicates whether the System.Data.Constraint, specified by name, exists in the collection.
Return Value: true if the collection contains the specified constraint; otherwise, false.
Use the System.Data.ConstraintCollection.Contains (System.String) method to determine if the specified System.Data.Constraint exists before attempting to remove it from the collection. You can also use the System.Data.ConstraintCollection.CanRemove (System.Data.Constraint) method to determine if a System.Data.Constraint can be removed. The System.Data.Constraint.ConstraintName of the constraint.

IndexOf
[C#] public int IndexOf(Constraint constraint);
[C++] public: int IndexOf(Constraint* constraint);
[VB] Public Function IndexOf(ByVal constraint As Constraint) As Integer
[JScript] public function IndexOf(constraint: Constraint): int;
Description
Gets the index of the specified System.Data.Constraint.
Return Value: The index of the System.Data.Constraint if it is in the collection; otherwise, −1.
Use the System.Data.ConstraintCollection.IndexOf (System.Data.Constraint) method to return an index to be used with either the System.Data.ConstraintCollection.Contains(System.String) or System.Data.ConstraintCollection.Remove (System.Data.Constraint) method. The System.Data.Constraint to search for.

IndexOf
[C#] public virtual int IndexOf(string constraintName);
[C++] public: virtual int IndexOf(String* constraintName);
[VB] Overridable Public Function IndexOf(ByVal constraintName As String) As Integer
[JScript] public function IndexOf(constrainsName: String): int; Gets the index of the specified System.Data.Constraint.
Description
Gets the index of the System.Data.Constraint, specified by name.
Return Value: The index of the System.Data.Constraint if it is in the collection; otherwise, −1.
Use the System.Data.ConstraintCollection.IndexOf (System.Data.Constraint) method to return an index to be used with either the System.Data.ConstraintCollection.Contains(System.String) or System.Data.ConstraintCollection.Remove (System.Data.Constraint) method. The name of the System.Data.Constraint.

OnCollectionChanged
[C#] protected virtual void OnCollectionChanged (CollectionChangeEventArgs ccevent);
[C++] protected: virtual void OnCollectionChanged (CollectionChangeEventArgs* ccevent);
[VB] Overridable Protected Sub OnCollectionChanged (ByVal ccevent As CollectionChangeEventArgs)
[JScript] protected function OnCollectionChanged(ccevent: CollectionChangeEventArgs);
Description
Raises the System.Data.ConstraintCollection.CollectionChanged event.
Raising an event invokes the event handler through a delegate. For more information, see. A System.ComponentModel.CollectionChangeEventArgs that contains the event data.

Remove
[C#] public void Remove(Constraint constraint);
[C++] public: void Remove(Constraint* constraint);
[VB] Public Sub Remove(ByVal constraint As Constraint)
[JScript] public function Remove(constraint: Constraint);
Removes a System.Data.Constraint from the System.Data.ConstraintCollection.
Description
Removes the specified System.Data.Constraint from the collection.
Use the System.Data.ConstraintCollection.Contains (System.String) method to determine if the collection contains the target System.Data.Constraint. The System.Data.Constraint to remove.

Remove
[C#] public void Remove(string name);
[C++] public: void Remove(String* name);
[VB] Public Sub Remove(ByVal name As String)
[JScript] public function Remove(name: String);
Description
Removes the constraint, specified by name, from the collection. Use the System.Data.ConstraintCollection.Contains(System.String) method to determine if the collection contains the target System.Data.Constraint. The name of the System.Data.Constraint to remove.

RemoveAt
[C#] public void RemoveAt(int index);
[C++] public: void RemoveAt(int index);
[VB] Public Sub RemoveAt(ByVal index As Integer)
[JScript] public function RemoveAt(index: int);
Description
   Removes the constraint at the specified index from the collection.
   The System.Data.ConstraintCollection.IndexOf (System.Data.Constraint) method returns the index of a given System.Data.Constraint. The index of the System.Data.Constraint to remove.
   ConstraintException class (System.Data)
   ToString
Description
   Represents the exception that is thrown when attempting an action that violates a constraint.
   ConstraintException
   Example Syntax:
   ToString
[C#] public ConstraintException( );
[C++] public: ConstraintException( );
[VB] Public Sub New( )
[JScript] public function ConstraintException( ); Initializes a new instance of the System.Data.ConstraintException class.
Description
   Initializes a new instance of the System.Data.ConstraintException class.
   ConstraintException
   Example Syntax:
   ToString
[C#] public ConstraintException(string s);
[C++] public: ConstraintException(String* s);
[VB] Public Sub New(ByVal s As String)
[JScript] public function ConstraintException(s: String);
Description
   Initializes a new instance of the System.Data.ConstraintException class with the specified string. The string to display when the exception is thrown.
   ConstraintException
   Example Syntax:
   ToString
[C#] public ConstraintException(SerializationInfo info, StreamingContext context);
[C++] public: ConstraintException(SerializationInfo* info, StreamingContext context);
[VB] Public Sub New(ByVal info As SerializationInfo, ByVal context As StreamingContext)
[JScript] public function ConstraintException(info: SerializationInfo, context: StreamingContext); Initializes a new instance of the System.Data.ConstraintException class.
Description
   Initializes a new instance of the System.Data.ConstraintException class. The data necessary to serialize or deserialize an object. Description of the source and destination of the specified serialized stream.
   HelpLink
   HResult
   InnerException
   Message
   Source
   StackTrace
   TargetSite
   DataColumn class (System.Data)
   ToString
Description
   Represents the schema of a column in a System.Data.DataTable.
   The System.Data.DataColumn is the fundamental building block for creating the schema of a System.Data.DataTable. You build the schema by adding one or more System.Data.DataColumn objects to the System.Data.DataColumnCollection. For more information, see.
   DataColumn
   Example Syntax:
   ToString
[C#] public DataColumn( );
[C++] public: DataColumn( );
[VB] Public Sub New( )
[JScript] public function DataColumn( ); Initializes a new instance of the System.Data.DataColumn class.
Description
   Initializes a new instance of a System.Data.DataColumn class.
   When created, a new System.Data.DataColumn object has no default System.Data.DataColumn.ColumnName or System.Data.DataColumn.Caption. When added to a System.Data.DataColumnCollection, however, a default name ("Column1", "Column2", etc.) is given to the column.
   DataColumn
   Example Syntax:
   ToString
[C#] public DataColumn(string columnName);
[C++] public: DataColumn(String* columnName);
[VB] Public Sub New(ByVal columnName As String)
[JScript] public function DataColumn(columnName: String);
Description
   Inititalizes a new instance of the System.Data.DataColumn class using the specified column name.
   By default, the name given to a column becomes the System.Data.DataColumn.Caption property value. A string that represents the name of the column to be created. If set to null or an empty string (""), a default name will be given when added to the columns collection.
   DataColumn
   Example Syntax:
   ToString
[C#] public DataColumn(string columnName, Type dataType);
[C++] public: DataColumn(String* columnName, Type* dataType);
[VB] Public Sub New(ByVal columnName As String, ByVal dataType As Type)
[JScript] public function DataColumn(columnName: String, dataType: Type);
Description
   Inititalizes a new instance of the System.Data.DataColumn class using the specified column name and data type. A string that represents the name of the column to be created. If set to null or an empty string (""), a default name will be given when added to the columns collection. A supported System.Data.DataColumn.DataType.
   DataColumn
   Example Syntax:
   ToString
[C#] public DataColumn(string columnName, Type dataType, string expr);
[C++] public: DataColumn(String* columnName, Type* dataType, String* expr);
[VB] Public Sub New(ByVal columnName As String, ByVal dataType As Type, ByVal expr As String)

[JScript] public function DataColumn(columnName: String, dataType: Type, expr: String);
Description
Initializes a new instance of the System.Data.DataColumn class using the specified name, data type, and expression. A string that represents the name of the column to be created. If set to null or an empty string (""), a default name will be given when added to the columns collection. A supported System.Data.DataColumn.DataType. The expression used to create this column. For more details, see the System.Data.DataColumn.Expression property.
  DataColumn
  Example Syntax:
  ToString
[C#] public DataColumn(string columnName, Type dataType, string expr, MappingType type);
[C++] public: DataColumn(String* columnName, Type* dataType, String* expr, MappingType type);
[VB] Public Sub New(ByVal columnName As String, ByVal dataType As Type, ByVal expr As String, ByVal type As MappingType)
[JScript] public function DataColumn(columnName: String, dataType: Type, expr: String, type: MappingType);
Description
Initializes a new instance of the System.Data.DataColumn class using the specified name, data type, expression, and value that determines whether the column is an attribute.

The type argument sets the System.Data.DataColumn.ColumnMapping property. The property specifies how a System.Data.DataColumn is mapped when a System.Data.DataSet is transformed into an XML document. For example, if the the column is named "fName," and the value it contains is "Bob," and type is set to MappingType.Attribute, the XML element would be: For more details on how columns are mapped to elements or attributes, see the System.Data.DataColumn.ColumnMapping property. A string that represents the name of the column to be created. If set to null or an empty string (""), a default name will be given when added to the columns collection. A supported System.Data.DataColumn.DataType. The expression used to create this column. For more details, see the System.Data.DataColumn.Expression property. One of the System.Data.MappingType values.
  AllowDBNull
  ToString
[C#] public bool AllowDBNull {get; set;}
[C++] public: __property bool get_AllowDBNull( );public: __property void set_AllowDBNull(bool);
[VB] Public Property AllowDBNull As Boolean
[JScript] public function get AllowDBNull( ): Boolean function set AllowDBNull(Boolean);
Description
Gets or sets a value indicating whether null values are allowed in this column for rows belonging to the table.
  AutoIncrement
  ToString
[C#] public bool AutoIncrement {get; set;}
[C++] public: __property bool get_AutoIncrement( );public: __property void set_AutoIncrement(bool);
[VB] Public Property AutoIncrement As Boolean
[JScript] public function get AutoIncrement( ): Boolean function set AutoIncrement(Boolean);
Description
Gets or sets a value indicating whether the column automatically increments the value of the column for new rows added to the table.

If the type of this column is not Int16, Int32, or Int64 when this property is set, the System.Data.DataColumn.DataType property is coerced to Int32. An exception is generated if this is a computed column (that is, the System.Data.DataColumn.Expression property is set.) The incremented value is used only if the row's value for this column, when added to the columns collection, is equal to the default value.
  AutoIncrementSeed
  ToString
[C#] public long AutoIncrementSeed {get; set;}
[C++] public: __property __int64 get_AutoIncrementSeed( );public: __property void set_AutoIncrementSeed(__int64);
[VB] Public Property AutoIncrementSeed As Long
[JScript] public function get AutoIncrementSeed( ): long function set AutoIncrementSeed(long);
Description
Gets or sets the starting value for a column that has its System.Data.DataColumn.AutoIncrement property set to true.
  AutoIncrementStep
  ToString
[C#] public long AutoIncrementStep {get; set;}
[C++] public: __property __int64 get_AutoIncrementStep( );public: __property void set_AutoIncrementStep(__int64);
[VB] Public Property AutoIncrementStep As Long
[JScript] public function get AutoIncrementStep( ): long function set AutoIncrementStep(long);
Description
Gets or sets the increment used by a column with its System.Data.DataColumn.AutoIncrement property set to true.
  Caption
  ToString
[C#] public string Caption {get; set;}
[C++] public: __property String* get_Caption( );public: __property void set_Caption(String*);
[VB] Public Property Caption As String
[JScript] public function get Caption( ): String function set Caption(String);
Description
Gets or sets the caption for the column.
The System.Data.DataColumn.Caption value becomes visible in controls that support its display. For example, the System.Windows.Forms.DataGrid control is capable of displaying captions for each column.
  ColumnMapping
  ToString
[C#] public virtual MappingType ColumnMapping {get; set;}
[C++] public: __property virtual MappingType get_ColumnMapping( );public: __property virtual void set_ColumnMapping(MappingType);
[VB] Overridable Public Property ColumnMapping As MappingType
[JScript] public function get ColumnMapping( ): MappingType function set ColumnMapping(MappingType);
Description
Gets or sets the System.Data.MappingType of the column.
The System.Data.DataColumn.ColumnMapping property determines how a System.Data.DataColumn is mapped when a System.Data.DataSet is saved as an XML document using the System.Data.DataSet.WriteXml (System.IO.Stream) method.

ColumnName
ToString
[C#] public string ColumnName {get; set;}
[C++] public: __property String* get_ColumnName( );public: __property void set_ColumnName(String*);
[VB] Public Property ColumnName As String
[JScript] public function get ColumnName( ): String function set ColumnName(String);
Description Gets or sets the name of the column in the System.Data.DataColumnCollection.

When a System.Data.DataColumn is created, it has no System.Data.DataColumn.ColumnName value. When the System.Data.DataColumn is added to a System.Data.DataTable object's System.Data.DataColumnCollection, however, it is given a default name ("Column1", "Column2", etc.).

Container
DataType
ToString
Description

Gets or sets the type of data stored in the column.

Setting the System.Data.DataColumn.DataType value is critical to ensuring the correct creation and updating of data in a DBMS.

DefaultValue
ToString
[C#] public object DefaultValue {get; set;}
[C++] public: __property Object* get_DefaultValue( );public: __property void set_DefaultValue(Object*);
[VB] Public Property DefaultValue As Object
[JScript] public function get DefaultValue( ): Object;public function set DefaultValue(Object);
Description Gets or sets the default value for the column when creating new rows. A default value is the value that is automatically assigned to the column when a System.Data.DataRow is created. By setting a default value, you can give the user an idea of what information to input. On the other hand, you can use the System.Data.DataColumn.DefaultValue property to automatically insert a value that shouldn't be touched by the user; for example, the current date and time of the row's creation.

DesignMode
Events
Expression
ToString
Description

Gets or sets the expresssion used to filter rows, calculate the values in a column, or create an aggregate column.

One use of the System.Data.DataColumn.Expression property is to create calculated columns. For example, to calculate a tax value, the unit price is multiplied by a tax rate of a given region. Since tax rates vary from region to region, it would be impossible to put a single tax rate in a column; instead, the value is calculated using the System.Data.DataColumn.Expression property, as shown in the Visual Basic code below:
DataSet1.Tables("Products").Columns("tax").Expression= "UnitPrice*0.086" A second use is to create an aggregate column. Similar to a calculated value, an aggregate performs an operation based on the entire set of rows in the System.Data.DataTable. A simple example is to count the number of rows returned in the set, which is the method you would use to count the number of transactions completed by a particular salesperson, as shown in this Visual Basic code: DataSet1.Tables("Orders").Columns("OrderCount").Expression="Count(OrderID)" EXPRESSION SYNTAX When creating an expression, use the System.Data.DataColumn.ColumnName property to refer to columns. For example, if the System.Data.DataColumn.ColumnName for one column is "UnitPrice", and another "Quantity", the expression would be: "UnitPrice*Quantity" When creating an expression for a filter, enclose strings with single quotes: "LastName='Jones'" The following characters are special characters and must be escaped, as explained below, if they are to be used in a column name: \n (newline)\t (tab)\r (carriage return)~ ( ) # \ / = > < + − * % & | ^ ' " [ ] If a column name contains one of the above characters, the name must be wrapped in brackets. For example to use a column named "Column#" in an expression, you would write "[Column#]": Total*[Column#] Because brackets are special characters, you must use a slash ("\") to escape the bracket, if it is part of a column name. For example, a column named "Column[ ]" would be written: Total*[Column[\]] (Only the second bracket must be escaped.) USER-DEFINED VALUES User-defined values may be used within expressions to be compared against column values. String values should be enclosed within single quotes. Date values should be enclosed within pound signs (#). Decimals and scientific notation are permissible for numeric values. For example: "FirstName='John'" "Price <=50.00" "Birthdate <#Jan. 31, 1982#" For columns that contain enumeration values, cast the value to an integer data type. For example: "EnumColumn=5" OPERATORS Concatenation is allowed using Boolean AND, OR, and NOT operators. You can use parentheses to group clauses and force precedence. The AND operator has precedence over other operators. For example: (LastName='Smith' OR LastName='Jones') AND FirstName='John' When creating comparison expressions, the following operators are allowed: < > <= >= <> = IN LIKE The following arithmetic operators are also supported in expressions: + (addition) − (subtraction) * (multiplication) / (division) % (modulus) STRING OPERATORS To concatenate a string, use the + character. Whether string comparisons are casesensitive or not is determined by the value of the System.Data.DataSet class's System.Data.DataSet.CaseSensitive property. However, you can override that value with the System.Data.DataTable class's System.Data.DataTable.CaseSensitive property.

ExtendedProperties
ToString
[C#] public PropertyCollection ExtendedProperties {get;}
[C++] public: __property PropertyCollection* get_ExtendedProperties( );
[VB] Public ReadOnly Property ExtendedProperties As PropertyCollection
[JScript] public function get ExtendedProperties( ): PropertyCollection;
Description Gets the collection of custom user information.

The System.Data.DataColumn.ExtendedProperties property allows you to store custom information with the object. For example, you may store a time when the data should be refreshed.

MaxLength
ToString
[C#] public int MaxLength {get; set;}
[C++] public: __property int get_MaxLength( );public: __property void set_MaxLength(int);
[VB] Public Property MaxLength As Integer
[JScript] public function get MaxLength( ): int;public function set MaxLength(int);
Description Gets or sets the maximum length of a text column.

The System.Data.DataColumn.MaxLength property is ignored for nontext columns.

Namespace
ToString
[C#] public string Namespace {get; set;}
[C++] public: __property String* get__Namespace( );public: __property void set__Namespace(String*);
[VB] Public Property Namespace As String
[JScript] public function get Namespace( ): String;public function set Namespace(String);
Description
  Gets or sets the namespace of the System.Data.DataColumn.
  The System.Data.DataColumn.Namespace property is used when reading and writing an XML document into a System.Data.DataTable in the System.Data.DataSet using the System.Data.DataSet.ReadXml (System.Xml.XmlReader), System.Data.DataSet.WriteXml (System.IO.Stream), System.Data.DataSet.ReadXmlSchema (System.Xml.XmlReader), or System.Data.DataSet.WriteXmlSchema(System.IO.Stream) methods.
Ordinal
ToString
[C#] public int Ordinal {get;}
[C++] public: __property int get__Ordinal( );
[VB] Public ReadOnly Property Ordinal As Integer
[JScript] public function get Ordinal( ): int;
Description
  Gets the position of the column in the System.Data.DataColumnCollection collection.
Prefix
ToString
[C#] public string Prefix {get; set;}
[C++] public: __property String* get__Prefix( );public: __property void set__Prefix(String*);
[VB] Public Property Prefix As String
[JScript] public function get Prefix( ): String;public function set Prefix(String);
Description
  Gets or sets an XML prefix that aliases the namespace of the System.Data.DataTable.
  The System.Data.DataTable.Prefix is used throughout an XML document to identify elements which belong to the System.Data.DataSet object's namespace (as set by the System.Data.DataSet.Namespace property).
ReadOnly
ToString
[C#] public bool ReadOnly {get; set;}
[C++] public: __property bool get__ReadOnly( );public: __property void set__ReadOnly(bool);
[VB] Public Property ReadOnly As Boolean
[JScript] public function get ReadOnly( ): Boolean;public function set ReadOnly(Boolean);
Description
  Gets or sets a value indicating whether the column allows changes once a row has been added to the table.
Site
Table
ToString
Description
  Gets the System.Data.DataTable to which the column belongs to.
Unique
ToString
[C#] public bool Unique {get; set;}
[C++] public: __property bool get__Unique( );public: __property void set__Unique(bool);
[VB] Public Property Unique As Boolean
[JScript] public function get Unique( ): Boolean;public function set Unique(Boolean);
Description
  Gets or sets a value indicating whether the values in each row of the column must be unique.
  You can also add a System.Data.UniqueConstraint to the System.Data.DataTable to which this column belongs to ensure the values are unique.
CheckNotAllowNull
[C#] protected internal void CheckNotAllowNull( );
[C++] protected public: void CheckNotAllowNull( );
[VB] Protected Friend Dim Sub CheckNotAllowNull( )
[JScript] package function CheckNotAllowNull( );
Description
CheckUnique
[C#] protected void CheckUnique( );
[C++] protected: void CheckUnique( );
[VB] Protected Sub CheckUnique( )
[JScript] protected function CheckUnique( );
Description
  Throws an exception and the name of any column if its Unique property set to True and non-unique values are found in the column.
OnPropertyChanging
[C#] protected internal virtual void OnPropertyChanging (PropertyChangedEventArgs pcevent);
[C++] protected public: virtual void OnPropertyChanging (PropertyChangedEventArgs* pcevent);
[VB] Overridable Protected Friend Dim Sub OnPropertyChanging(ByVal pcevent As PropertyChangedEventArgs)
[JScript] package function OnPropertyChanging(pcevent: PropertyChangedEventArgs);
Description
  Raises the System.Data.DataColumn.OnPropertyChanging (System.ComponentModel.P ropertyChangedEventArgs) event.
  Raising an event invokes the event handler through a delegate. For an overview, see. A System.ComponentModel.PropertyChangedEventArgs that contains the event data.
RaisePropertyChanging
[C#] protected internal void RaisePropertyChanging(string name);
[C++] protected public: void RaisePropertyChanging (String* name);
[VB] Protected Friend Dim Sub RaisePropertyChanging (ByVal name As String)
[JScript] package function RaisePropertyChanging(name: String);
Description
  Sends notification that the specified System.Data.DataColumn property is about to change. The name of the property that is about to change.
ToString
[C#] public override string ToString( );
[C++] public: String* ToString( );
[VB] Overrides Public Function ToString( ) As String
[JScript] public override function ToString( ): String;
Description
  Gets the System.Data.DataColumn.Expression of the column, if one exists.
  Return Value: The System.Data.DataColumn.Expression value, if the property is set; otherwise, the System.Data.DataColumn.ColumnName property.
    DataColumnChangeEventArgs class (System.Data)

ToString
Description
   Provides data for the System.Data.DataTable.Column-Changing event.
   The System.Data.DataTable.ColumnChanging event occurs when a change is made to a column's value in the System.Data.DataTable.
   DataColumnChangeEventArgs
   Example Syntax:
   ToString
[C#] public DataColumnChangeEventArgs(DataRow row, DataColumn column, object value);
[C++] public: DataColumnChangeEventArgs(DataRow* row, DataColumn* column, Object* value);
[VB] Public Sub New(ByVal row As DataRow, ByVal column As DataColumn, ByVal value As Object)
[JScript] public function DataColumnChangeEventArgs (row: DataRow, column: DataColumn, value: Object);
Description
   Initializes a new instance of the System.Data.DataColumnChangeEventArgs class. The System.Data.DataRow with the changing value. The System.Data.DataColumn with the changing value. The new value.
   Column
   ToString
[C#] public DataColumn Column {get;}
[C++] public: __property DataColumn* get_Column( );
[VB] Public ReadOnly Property Column As DataColumn
[JScript] public function get Column( ): DataColumn;
Description
   Gets the System.Data.DataColumn with a changing value.
   ProposedValue
   ToString
[C#] public object ProposedValue {get; set;}
[C++] public: __property Object* get_ProposedValue( );public: __property void set_ProposedValue(Object*);
[VB] Public Property ProposedValue As Object
[JScript] public function get ProposedValue( ): Object;public function set ProposedValue(Object);
Description
   Gets or sets the proposed value.
   Row
   ToString
[C#] public DataRow Row {get;}
[C++] public: __property DataRow* get_Row( );
[VB] Public ReadOnly Property Row As DataRow
[JScript] public function get Row( ): DataRow;
Description
   Gets the System.Data.DataRow with a changing value.
   DataColumnChangeEventHandler delegate (System.Data)
   ToString
Description
   Represents the method that will handle the the System.Data.DataTable.ColumnChanging event. The source of the event. A System.Data.DataColumnChangeEventArgs that contains the event data.
   When you create a System.Data.DataColumnChangeEventHandler delegate, you identify the method that will handle the event. To associate the event with your event handler, add an instance of the delegate to the event. The event handler is called whenever the event occurs, until you remove the delegate. For more information about delegates, see Represents the method that will handle the the System.Data.DataTable.ColumnChanging event.
   DataColumnCollection class (System.Data)
   ToString
Description
   Represents a collection of System.Data.DataColumn objects for a System.Data.DataTable.
   The System.Data.DataColumnCollection defines the schema of a System.Data.DataTable, and determines what kind of data each System.Data.DataColumn can contain. You can access the System.Data.DataColumnCollection through the System.Data.DataTable.Columns property of the System.Data.DataTable object.
   Count
   IsReadOnly
   IsSynchronized
   Item
   ToString
   System.Data.DataColumn
Description
   Gets the System.Data.DataColumn from the collection at the specified index.
   The System.Data.DataColumnCollection.Contains (System.String) method can be used to test for the existence of a column, which is useful before attempting to use System.Data.DataColumnCollection.Item(System.Int32). The zero-based index of the column to return.
   Item
   ToString
[C#] public virtual DataColumn this[string name] {get;}
[C++] public: __property virtual DataColumn* get_Item (String* name);
[VB] Overridable Public Default ReadOnly Property Item (ByVal name As String) As DataColumn
[JScript] returnValue=DataColumnCollectionObject.Item (name);
Description
   Gets the System.Data.DataColumn from the collection with the specified name.
   System.Data.DataColumnCollection.Item(System.Int32) is not case-sensitive when searching for column names. The System.Data.DataColumn.ColumnName of the column to return.
   List
   ToString
[C#] protected override ArrayList List {get;}
[C++] protected: __property virtual ArrayList* get_List( );
[VB] Overrides Protected ReadOnly Property List As ArrayList
[JScript] protected function get List( ): ArrayList;
Description
   Gets the list of the collection items.
   SyncRoot
   ToString
Description
   Occurs when the columns collection changes, either by adding or removing a column.
   The System.Data.DataColumnCollection.Contains (System.String) and System.Data.DataColumnCollection.CanRemove (System.Data.DataColumn) methods can be used to determine if a column exists and can be removed.
   Add
[C#] public virtual DataColumn Add( );
[C++] public: virtual DataColumn* Add( );
[VB] Overridable Public Function Add( ) As DataColumn
[JScript] public function Add( ): DataColumn;
Description
   Creates and adds a System.Data.DataColumn to a System.Data.DataColumnCollection.
   Return Value: The newly created System.Data.DataColumn.

A default name ("Column1", "Column2", etc.) is given to the column.

Add

[C#] public void Add(DataColumn column);
[C++] public: void Add(DataColumn* column);
[VB] Public Sub Add(ByVal column As DataColumn)
[JScript] public function Add(column: DataColumn); Adds a System.Data.DataColumn to the System.Data.DataColumnCollectiion.

Description

Adds the specified System.Data.DataColumn to the System.Data.DataColumnCollection.

If the collection is successfuilly changed by adding or removing columns, the System.Data.DataColumnCollection.CollectionChanged event occurs. The System.Data.DataColumn to add.

Add

[C#] public virtual DataColumn Add(string columnName);
[C++] public: virtual DataColumn* Add(String* columnName);
[VB] Overridable Public Function Add(ByVal columnName As String) As DataColumn
[JScript] public function Add(columnName: String): DataColumn;

Description

Creates and adds a System.Data.DataColumn with the specified name to the System.Data.DataColumnCollection.
Return Value: The newly created System.Data.DataColumn.
By default, the column's System.Data.DataColumn.DataType is string. The name of the column.

Add

[C#] public virtual DataColumn Add(string columnName, Type type);
[C++] public: virtual DataColumn* Add(String* columnName, Type* type);
[VB] Overridable Public Function Add(ByVal columnName As String, ByVal type As Type) As DataColumn
[JScript] public function Add(columnName: String, type: Type): DataColumn;

Description

Creates and adds a System.Data.DataColumn with the specified name and type to the System.Data.DataColumnCollection.
Return Value: The newly created System.Data.DataColumn.
If null or an empty string ("") is passed in for the name, a default name ("Column1", "Column2", etc.) is given to the column. The System.Data.DataColumn.ColumnName to create the column with. The column's System.Data.DataColumn.DataType.

Add

[C#] public virtual DataColumn Add(string columnName, Type type, string expression);
[C++] public: virtual DataColumn* Add(String* columnName, Type* type, String* expression);
[VB] Overridable Public Function Add(ByVal columnName As String, ByVal type As Type, ByVal expression As String) As DataColumn
[JScript] public function Add(columnName: String, type: Type, expression: String): DataColumn;

Description

Creates and adds a System.Data.DataColumn with the specified name, type, and compute expression to the System.Data.DataColumnCollection.
Return Value: The newly created System.Data.DataColumn.
If null or an empty string ("") is passed in for the name, a default name ("Column1", "Column2", etc.) is given to the column. The column name. The System.Data.DataColumn.DataType of the column. The expression to assign to the System.Data.DataColumn.Expression property.

AddRange

[C#] public void AddRange(DataColumn[ ] columns);
[C++] public: void AddRange(DataColumn* columns[ ]);
[VB] Public Sub AddRange(ByVal colurnns( ) As DataColumn)
[JScript] public function AddRange(columns: DataColumn[ ]);

Description

Copies the elements of the specified System.Data.DataColumn array to the end of the collection. The array of System.Data.DataColumn objects to add to the collection.

CanRemove

[C#] public bool CanRemove(DataColumn column);
[C++] public: bool CanRemove(DataColunm* column);
[VB] Public Function CanRemove(ByVal column As DataColumn) As Boolean
[JScript] public function CanRemove(column: DataColumn): Boolean;

Description

Checks whether a given column can be removed from the collection.
Return Value: true if the column can be removed; otherwise, false.
The System.Data.DataColumnCollection.CanRemove (System.Data.DataColumn) method performs several checks before returning a true or false including the following: whether the column exists, belongs to the table, or is involved in a constraint or relation. A System.Data.DataColumn in the collection.

Clear

[C#] public void Clear( );
[C++] public: void Clear( );
[VB] Public Sub Clear( )
[JScript] public function Clear( );

Description

Clears the collection of any columns.
If the collection is succesfully changed by adding or removing columns, the System.Data.DataColumnCollection.OnCollectionChanged (System.ComponentModel.CollectionChangeEventArgs) event occurs.

Contains

[C#] public bool Contains(string name);
[C++] public: bool Contains(String* name);
[VB] Public Function Contains(ByVal name As String) As Boolean
[JScript] public function Contains(name: String): Boolean;

Description

Checks whether the collection contains a column with the specified name.
Return Value: true if a column exists with this name; otherwise, false.
The System.Data.DataColumnCollection.Contains (System.String) method can confirm the existence of a column before performing further operations on the column. The System.Data.DataColumn.ColumnName of the column.

IndexOf

[C#] public virtual int IndexOf(DataColumn column);
[C++] public: virtual int IndexOf(DataColumn* column);
[VB] Overridable Public Function IndexOf(ByVal column As DataColumn) As Integer
[JScript] public function IndexOf(column: DataColumn): int;

Description

Gets the index of a column specified by name.

Return Value: The index of the column specified by columnName if it is found; otherwise, -1.

The System.Data.DataColumnCollection.IndexOf (System.Data.DataColumn) method is not case-sensitive.
IndexOf
[C#] public int IndexOf(string columnName);
[C++] public: int IndexOf(String* columnName);
[VB] Public Function IndexOf(ByVal columnName As String) As Integer
[JScript] public function IndexOf(columnName: String): int;
Returns the index of a column specified by name.
OnCollectionChanged
[C#] protected virtual void OnCollectionChanged (CollectionChangeEventArgs ccevent);
[C++] protected: virtual void OnCollectionChanged (CollectionChangeEventArgs* ccevent);
[VB] Overridable Protected Sub OnCollectionChanged (ByVal ccevent As CollectionChangeEventArgs)
[JScript] protected function OnCollectionChanged(ccevent: CollectionChangeEventArgs);
Description
Raises the System.Data.DataColumnCollection.OnCollectionChanged (System.ComponentModel.CollectionChangeEventArgs) event. Raising an event invokes the event handler through a delegate. For an overview, see. A System.ComponentModel.CollectionChangeEventArgs that contains the event data.
OnCollectionChanging
[C#] protected internal virtual void OnCollectionChanging (CollectionChangeEventArgs ccevent);
[C++] protected public: virtual void OnCollectionChanging (CollectionChangeEventArgs* ccevent);
[VB] Overridable Protected Friend Dim Sub OnCollectionChanging(ByVal ccevent As CollectionChangeEventArgs)
[JScript] package function OnCollectionChanging(ccevent: CollectionChangeEventArgs);
Description
Raises the System.Data.DataColumnCollection.OnCollectionChanging(System.ComponentModel.CollectionChangeEventArgs) event.
Raising an event invokes the event handler through a delegate. For an overview, see. A System.ComponentModel.CollectionChangeEventArgs that contains the event data.
Remove
[C#] public void Remove(DataColumn column);
[C++] public: void Remove(DataColumn* column);
[VB] Public Sub Remove(ByVal column As DataColumn)
[JScript] public function Remove(column: DataColumn);
Removes a column from the collection.
Description
Removes the specified System.Data.DataColumn from the collection.
If the collection is succesfully changed by adding or removing columns, the System.Data.DataColumnCollection.OnCollectionChanged (System.ComponentModel.CollectionChangeEventArgs) event occurs. The System.Data.DataColumn to remove.
Remove
[C#] public void Remove(string name);
[C++] public: void Remove(string* name);
[VB] Public Sub Remove(ByVal name As String)
[JScript] public function Remove(name: String);
Description
Removes the column with the specified name from the collection.
If the collection is succesfully changed by adding or removing columns, the System.Data.DataColumnCollection.OnCollectionChanged (System.ComponentModel.CollectionChangeEventArgs) event occurs. The name of the column to remove.
RemoveAt
[C#] public void RemoveAt(int index);
[C++] public: void RemoveAt(int index);
[VB] Public Sub RemoveAt(ByVal index As Integer)
[JScript] public function RemoveAt(index: int);
Description
Removes the column at the specified index from the collection.
If the collection is succesfully changed by adding or removing columns, the System.Data.DataColumnCollection.OnCollectionChanged (System.ComponentModel.CollectionChangeEventArgs) event occurs. The index of the column to remove.
DataException class (System.Data)
ToString
Description
Represents the exception that is thrown when errors are generated using ADO.NET components.
DataException
Example Syntax:
ToString
[C#] public DataException( );
[C++] public: DataException( );
[VB] Public Sub New( )
[JScript] public function DataException( );
Description
Initializes a new instance of the System.Data.DataException class.
DataException
Example Syntax:
ToString
[C#] public DataException(string s);
[C++] public: DataException(String* s);
[VB] Public Sub New(ByVal s As String)
[JScript] public function DataException(s: String);
Description
Initializes a new instance of the System.Data.DataException class with the specified string. The string to display when the exception is thrown.
DataException
Example Syntax:
ToString
[C#] public DataException(SerializationInfo info, StreamingContext context);
[C++] public: DataException(SerializationInfo* info, StreamingContext context);
[VB] Public Sub New(ByVal info As SerializationInfo, ByVal context As StreamingContext)
[JScript] public function DataException(info: SerializationInfo, context: StreamingContext); Initializes a new instance of the System.Data.DataException class.
Description
Initializes a new instance of the System.Data.DataException class. The data necessary to serialize or deserialize an object. Description of the source and destination of the specified serialized stream.
DataException
Example Syntax:
ToString
[C#] public DataException(string s, Exception innerException);
[C++] public: DataException(String* s, Exception* innerException);
[VB] Public Sub New(ByVal s As String, ByVal innerException As Exception)

[JScript] public function DataException(s: String, innerException: Exception); Initializes a new instance of the System.Data.DataException class.

Description

Initializes a new instance of the System.Data.DataException class with the specified string and inner exception.

You can create a new exception that catches an earlier exception. The code that handles the second exception can make use of the additional information from the earlier exception, also called an inner exception, to examine the cause of the initial error. The string to display when the exception is thrown. A reference to an inner exception.

HelpLink
HResult
InnerException
Message
Source
StackTrace
TargetSite
DataRelation class (System.Data)
ToString Description Represents a parent/child relationship between two System.Data.DataTable objects.

A System.Data.DataRelation is used to relate two System.Data.DataTable objects to each other through System.Data.DataColumn objects. For example, in a Customer/Orders relationship, the Customers table is the parent and the Orders table is the child of the relationship. This is similar to a primary key/foreign key relationship. For more information, see.

DataRelation
Example Syntax:
ToString

[C#] public DataRelation(string relationName, DataColumn parentColumn, DataColumn childColumn);
[C++] public: DataRelation(String* relationName, DataColumn* parentColumn, DataColumn* childColumn);
[VB] Public Sub New(ByVal relationName As String, ByVal parentColumn As DataColumn, ByVal childColumn As DataColumn)
[JScript] public function DataRelation(relationName: String, parentColumn: DataColumn, childColumn: DataColumn); Initializes a new instance of the System.Data.DataRelation class.

Description

Initializes a new instance of the System.Data.DataRelation class using the specified System.Data.DataRelation name, and parent and child System.Data.DataColumn objects. The name of the System.Data.DataRelation If null or an empty string (""), a default name will be given when the created object is added to the System.Data.DataRelationCollection. The parent System.Data.DataColumn in the relationship. The child System.Data.DataColumn in the relationship.

DataRelation
Example Syntax:
ToString

[C#] public DataRelation(string relationName, DataColumn[ ] parentColumns, DataColumn[ ] childColumns);
[C++] public: DataRelation(String* relationName, DataColumn* parentColumns[ ], DataColumn* childColumns[ ]);
[VB] Public Sub New(ByVal relationName As String, ByVal parentColumns( ) As DataColumn, ByVal childColumns( ) As DataColumn)
[JScript] public function DataRelation(relationName: String, parentColumns: DataColumn[ ], childColumns: DataColumn[ ]);

Description

Initializes a new instance of the System.Data.DataRelation class using the specified System.Data.DataRelation name and matched arrays of parent and child System.Data.DataColumn objects. The name of the relation. If null or an empty string (""), a default name will be given when the created object is added to the System.Data.DataRelationCollection. An array of parent System.Data.DataColumn objects. An array of child System.Data.DataColumn objects.

DataRelation
Example Syntax:
ToString

[C#] public DataRelation(string relationName, DataColumn parentColumn, DataColumn childColumn, bool createConstraints);
[C++] public: DataRelation(String* relationName, DataColumn* parentColumn, DataColumn* childColumn, bool createConstraints);
[VB] Public Sub New(ByVal relationName As String, ByVal parentColumn As DataColumn, ByVal childColumn As DataColumn, ByVal createConstraints As Boolean)
[JScript] public function DataRelation(relationName: String, parentColumn: DataColumn, childColumn: DataColumn, createConstraints: Boolean);

Description

Initializes a new instance of the System.Data.DataRelation class using the specified name, parent and child System.Data.DataColumn objects, and a value indicating whether to create constraints. The name of the relation. If null or an empty string (""), a default name will be given when the created object is added to the System.Data.DataRelationCollection. The parent System.Data.DataColumn in the relation. The child System.Data.DataColumn in the relation. A value indicating whether constraints are created.

DataRelation
Example Syntax:
ToString

[C#] public DataRelation(string relationName, DataColumn[ ] parentColumns, DataColumn[ ] childColumns, bool createConstraints);
[C++] public: DataRelation(String* relationName, DataColumn* parentColumns[ ], DataColumn* childColumns[ ], bool createConstraints);
[VB] Public Sub New(ByVal relationName As String, ByVal parentColumns( ) As DataColumn, ByVal childcolumns( ) As DataColumn, ByVal createConstraints As Boolean)
[JScript] public function DataRelation(relationName: String, parentColumns: DataColumn[ ], childColumns: DataColumn[ ], createConstraints: Boolean);

Description

Initializes a new instance of the System.Data.DataRelation class using the specified name, matched arrays of parent and child System.Data.DataColumn objects, and value indicating whether to create constraints. The name of the relation. If null or an empty string (""), a default name will be given when the created object is added to the System.Data.DataRelationCollection. An array of parent System.Data.DataColumn objects. An array of child System.Data.DataColumn objects. A value indicating whether to create constraints.

DataRelation
Example Syntax:
ToString

[C#] public DataRelation(string relationName, string parentTableNamne, string childTableName, string[ ] parentColumnNames, string[ ] childColumnnNames, bool nested);

[C++] public: DataRelation(String* relationName, String* parentTableName, String* childTableName, String* parentColumnNames __gc[ ], String* childColumnNames __gc[ ], bool nested);
[VB] Public Sub New(ByVal relationName As String, ByVal parentTableName As String, ByVal childTableName As String, ByVal parentColumnNames( )As String, ByVal childColumnNames( ) As String, ByVal nested As Boolean)
[JScript] public function DataRelation(relationName: String, parentTableName: String, childTableName: String, parentColumnNames: String[ ], childColumnNames: String[ ], nested: Boolean);
Description
Initializes a new instance of the System.Data.DataRelation class using the specified System.Data.DataRelation name, parent and child System.Data.DataTable names, a matching array of parent and child System.Data.DataColumn objects, and a value indicating whether relationships are nested. The name of the relation. If null or an empty string (""), a default name will be given when the created object is added to the System.Data.DataRelationCollection. The name of the System.Data.DataTable that is the parent table of the relation. The name of the System.Data.DataTable that is the child table of the relation. An array of System.Data.DataColumn object names in the parent System.Data.DataTable of the relation. An array of System.Data.DataColumn object namess in the child System.Data.DataTable of the relation. A value indicating whether relationships are nested.
ChildColumns
ToString
[C#] public virtual DataColumn[ ] ChildColumns {get;}
[C++] public: __property virtual DataColumn* get__ChildColumns( );
[VB] Overridable Public ReadOnly Property ChildColumns As DataColumn( )
[JScript] public function get ChildColumns( ): DataColumn[ ];
Description
Gets the child System.Data.DataColumn objects of this relation.
ChildKeyConstraint
ToString
[C#] public virtual ForeignKeyConstraint ChildKeyConstraint {get;}
[C++] public: __property virtual ForeignKeyConstraint* get__ChildKeyConstraint( );
[VB] Overridable Public ReadOnly Property ChildKeyConstraint As ForeignKeyConstraint
[JScript] public function get ChildKeyConstraint( ): ForeigniKeyConstraint;
Description
Gets the System.Data.ForeignKeyConstraint for the relation.
ChildTable
ToString
[C#] public virtual DataTable ChildTable {get;}
[C++] public: __property virtual DataTable* get__ChildTable( );
[VB] Overridable Public ReadOnly Property ChildTable As DataTable
[JScript] public function get ChildTable( ): DataTable;
Description
Gets the child table of this relation.
DataSet
ToString
[C#] public virtual DataSet DataSet {get;}
[C++] public: __property virtual DataSet* get__DataSet( );
[VB] Overridable Public ReadOnly Property DataSet As DataSet
[JScript] public function get DataSet( ): DataSet;
Description
Gets the System.Data.DataSet to which the System.Data.DataRelation belongs.
The System.Data.DataRelationCollection associated with a System.Data.DataSet is accessed through the System.Data.DataSet.Relations property of the System.Data.DataSet object.
ExtendedProperties
ToString
[C#] public PropertyCollection ExtendedProperties {get;}
[C++] public: __property PropertyCollection* get__ExtendedProperties( );
[VB] Public ReadOnly Property ExtendedProperties As PropertyCollection
[JScript] public function get ExtendedProperties( ): PropertyCollection;
Description
Gets the collection that stores customized properties.
Nested
ToString
[C#] public virtual bool Nested {get; set;}
[C++] public: __property virtual bool get__Nested( );public: __property virtual void set__Nested(bool);
[VB] Overridable Public Property Nested As Boolean
[JScript] public function get Nested( ): Boolean;public function set Nested(Boolean);
Description
Gets or sets a value indicating whether System.Data.DataRelation objects are nested.
You can use System.Data.DataRelation objects to define hierarchical relationships, such as those specified in XML. For more information, see.
ParentColumns
ToString
[C#] public virtual DataColumn[ ] ParentColumns {get;}
[C++] public: __property virtual DataColumn* get__ParentColumns( );
[VB] Overridable Public ReadOnly Property ParentColumns As DataColumn( )
[JScript] public function get ParentColumns( ): DataColumn[ ];
Description
Gets an array of System.Data.DataColumn objects that are the parent columns of this System.Data.DataRelation.
ParentKeyConstraint
ToString
[C#] public virtual UniqueConstraint ParentKeyConstraint {get;}
[C++] public: __property virtual UniqueConstraint* get__ParentKeyConstraint( );
[VB] Overridable Public ReadOnly Property ParentKeyConstraint As UniqueConstraint
[JScript] public function get ParentKeyConstraint( ): UniqueConstraint;
Description
Gets the System.Data.UniqueConstraint that ensures values in the parent column of a System.Data.DataRelation are unique.
ParentTable
ToString
[C#] public virtual DataTable ParentTable {get;}
[C++] public: __property virtual DataTable* get__ParentTable( );

[VB] Overridable Public ReadOnly Property ParentTable As DataTable
[JScript] public function get ParentTable( ): DataTable;
Description
Gets the parent System.Data.DataTable of this System.Data.DataRelation.
RelationName
ToString
[C#] public virtual string RelationName {get; set;}
[C++] public: __property virtual String* get_RelationName( );public: __property virtual void set_RelationName(String*);
[VB] Overridable Public Property RelationName As String
[JScript] public function get RelationName( ): String;public function set RelationName(String);
Description
Gets or sets the name used to retrieve a System.Data.DataRelation from the System.Data.DataRelationCollection. Use the System.Data.DataRelation.RelationName property to retrieve a System.Data.DataRelation from the System.Data.DataRelationCollection.
CheckStateForProperty
[C#] protected void CheckStateForProperty( );
[C++] protected: void CheckStateForProperty( );
[VB] Protected Sub CheckStateForProperty( )
[JScript] protected function CheckStateForProperty( );
Description
Ensures that the System.Data.DataRelation is a valid object.
System.Data.DataRelation.CheckStateForProperty verifies the validity of a System.Data.DataRelation object, even if it does not belong to a System.Data.DataSet.
OnPropertyChanging
[C#] protected internal void OnPropertyChanging (PropertyChangedEventArgs pcevent);
[C++] protected public: void OnPropertyChanging (PropertyChangedEventArgs* pcevent);
[VB] Protected Friend Dim Sub OnPropertyChanging (ByVal pcevent As PropertyChangedEventArgs)
[JScript] package function OnPropertyChanging(pcevent: PropertyChangedEventArgs);
Description
RaisePropertyChanging
[C#] protected internal void RaiseProperttChanging(string name);
[C++] protected public: void RaisePropertyChanging (String* name);
[VB] Protected Friend Dim Sub RaisePropertyChanging (ByVal name As String)
[JScript] package function RaisePropertyChanging(name: String);
Description
ToString
[C#] public override string ToString( );
[C++] public: String* ToString( );
[VB] Overrides Public Function ToString( ) As String
[JScript] public override function ToString( ): String;
Description
Gets the System.Data.DataRelation.RelationName, if one exists.
Return Value: The value of the System.Data.DataRelation.RelationName property.
DataRelationCollection class (System.Data)
ToString
Description
Represents the collection of System.Data.DataRelation objects for this System.Data.DataSet.

A System.Data.DataRelationCollection object enables navigation between related parent/child System.Data.DataTable objects.
DataRelationCollection
Example Syntax:
ToString
[C#] protected DataRelationCollection( );
[C++] protected: DataRelationCollection( );
[VB] Protected Sub New( )
[JScript] protected function DataRelationCollection( );
Count
IsReadOnly
IsSynchronized
Item
ToString
Description
Gets the System.Data.DataRelation object specified by name. The name of the relation to find.
Item
ToString
[C#] public abstract DataRelation this[int index] {get;}
[C++] public: __property virtual DataRelation* get_Item(int index)=0;
[VB] MustOverride Public Default ReadOnly Property Item (ByVal index As Integer) As DataRelation
[JScript] abstract returnValue= DataRelationCollectionObject.Item(index); Gets the specified System.Data.DataRelation from the collection.
Description
Gets the System.Data.DataRelation object at the specified index. The zero-based index to find.
List
SyncRoot
ToString
Description
Occurs when the collection has changed.
Add
[C#] public void Add(DataRelation relation);
[C++] public: void Add(DataRelation* relation);
[VB] Public Sub Add(ByVal relation As DataRelation)
[JScript] public function Add(relation: DataRelation); Adds a System.Data.DataRelation to the System.Data.DataRelationCollection.
Description
Adds a System.Data.DataRelation to the System.Data.DataRelationCollection.
If the relation is sucessfully added to the collection, the System.Data.DataRelationCollection.CollectionChanged event fires. The DataRelation to add to the collection.
Add
[C#] public virtual DataRelation Add(DataColumn parentColumn, DataColumn childColumn);
[C++] public: virtual DataRelation* Add(DataColumn* parentColumn, DataColumn* childColumn);
[VB] Overridable Public Function Add(ByVal parentColumn As Data;Column, ByVal childColumn As DataColumn) As DataRelation
[JScript] public function Add(parentColumn: DataColumn, childColumn: DataColumn): DataRelation;
Description
Creates a relation given the parameters and adds it to the collection. The name is defaulted. An ArgumentException is generated if this relation already belongs to this collection or belongs to another collection. An InvalidConstraintException is generated if the relation can't be created based on the parameters. The CollectionChanged event is fired if it succeeds.

Return Value: The created relation. parent column of relation. child column of relation.

Add

[C#] public virtual DataRelation Add(DataColumn[ ] parentColumns, DataColumn[ ] childColumns);
[C++] public: virtual DataRelation* Add(DataColumn* parentColumns[ ], DataColumn* childColumns[ ]);
[VB] Overridable Public Function Add(ByVal parentColumns( ) As DataColumn, ByVal childColumns( ) As DataColumn) As DataRelation
[JScript] public function Add(parentColumns: DataColumn[ ], childColumns: DataColumn[ ]): DataRelation;

Description

Creates a relation given the parameters and adds it to the collection. The name is defaulted. An ArgumentException is generated if this relation already belongs to this collection or belongs to another collection. An InvalidConstraintException is generated if the relation can't be created based on the parameters. The CollectionChanged event is fired if it succeeds.

Return Value: The created relation. parent columns of relation. child columns of relation.

Add

[C#] public virtual DataRelation Add(string name, DataColumn parentColumn, DataColumn childColumn);
[C++] public: virtual DataRelation* Add(String* name, DataColumnn parentColumn, DataColumn* childColumn);
[VB] Overridable Public Function Add(ByVal name As String, ByVal parentColumn As DataColumn, ByVal childColumn As DataColumn) As DataRelation
[JScript] public function Add(name: String, parentColumn: DataColumn, childColumn: DataColumn): DataRelation;

Description

Creates a relation given the parameters and adds it to the collection. An ArgumentException is generated if this relation already belongs to this collection or belongs to another collection. A DuplicateNameException is generated if this collection already has a relation with the same name (case insensitive). An InvalidConstraintException is generated if the relation can't be created based on the parameters. The CollectionChanged event is fired if it succeeds.

Return Value: The created relation. The name of the relation. parent column of relation. child column of relation.

Add

[C#] public virtual DataRelation Add(string name, DataColumn[ ] parentColumns, DataColumn[ ] childColumns);
[C++] public: virtual DataRelation* Add(String* name, DataColumn parentColumns[ ], DataColumn* childColumns[ ]);
[VB] Overridable Public Function Add(ByVal name As String, ByVal parentcolumns( ) As DataColumn, ByVal childColumns( ) As DataColumn) As DataRelation
[JScript] public function Add(name: String, parentColumns: DataColumn[ ], childColumns: DataColumn[ ]): DataRelation;

Description

Creates a System.Data.DataRelation with the specified name, and arrays of parent and child columns, and adds it to the collection.

Return Value: The created DataRelation.

If the relation is successfully added to the collection, the System.Data.DataRelationCollection.CollectionChanged event fires. The name of the DataRelation to create. An array of parent System.Data.DataColumn objects. An array of child DataColumn objects.

Add

[C#] public virtual DataRelation Add(string name, DataColumn parentColumn, DataColumn childColumn, bool createConstraints);
[C++] public: virtual DataRelation* Add(String* name, DataColumn* parentColumn, DataColumn* childColumn, bool createConstraints);
[VB] Overridable Public Function Add(ByVal name As String, ByVal parentColumn As DataColumn, ByVal childColumn As DataColumn, ByVal createConstraints As Boolean) As DataRelation
[JScript] public function Add(name: String, parentColumn: DataColumn, childColumn: DataColumn, createConstraints: Boolean): DataRelation;

Description

Creates a relation given the parameters and adds it to the collection. An ArgumentException is generated if this relation already belongs to this collection or belongs to another collection. A DuplicateNameException is generated if this collection already has a relation with the same name (case insensitive). An InvalidConstraintException is generated if the relation can't be created based on the parameters. The CollectionChanged event is fired if it succeeds.

Return Value: The created relation. The name of the relation. parent column of relation. child column of relation. whether to create a constraints Add

[C#] public virtual DataRelation Add(string name, DataColumn[ ] parentColumns, DataColumn[ ] childColumns, bool createConstraints);
[C++] public: virtual DataRelation* Add(String* name, DataColumn* parentColumns[ ], DataColumn* childColumns[ ], bool createConstraints);
[VB] Overridable Public Function Add(ByVal name As String, ByVal parentColumns( ) As DataColumn, ByVal childColumns( ) As DataColumn, ByVal createConstraints As Boolean) As DataRelation
[JScript] public function Add(name: String, parentColumns: DataColumn[ ], childColumns: DataColumn[ ], createConstraints: Boolean): DataRelation;

Description

Creates a System.Data.DataRelation with the specified name, arrays of parent and child columns, and value specifying whether to create a constraint, and adds it to the collection.

Return Value: The created relation. The name of the DataRelation to create. An array of parent System.Data.DataColumn objects. An array of child DataColumn objects. true to create a constraint; otherwise false.

AddCore

[C#] protected virtual void AddCore(DataRelation relation);
[C++] protected: virtual void AddCore(DataRelation* relation);
[VB] Overridable Protected Sub AddCore(ByVal relation As DataRelation)
[JScript] protected function AddCore(relation: DataRelation);

Description

Performs verification on the table. An ArgumentNullException is generated if this relation is null. An ArgumentException is generated if this relation already belongs to this collection, belongs to another collection. A DuplicateNameException is generated if this collection already has a relation with the same name (case insensitive). The relation to check.

AddRange

[C#] public virtual void AddRange(DataRelation[ ] relations);

[C++] public: virtual void AddRange(DataRelation* relations[ ]);
[VB] Overridable Public Sub AddRange(ByVal relations( ) As DataRelation)
[JScript] public function AddRange(relations: DataRelation[ ]);
Description
Copies the elements of the specified System.Data.DataRelation array to the end of the collection. The array of System.Data.DataRelation objects to add to the collection.
CanRemove
[C#] public virtual bool CanRemove(DataRelation relation);
[C++] public: virtual bool CanRemove(DataRelation* relation);
[VB] Overridable Public Function CanRemove(ByVal relation As DataRelation) As Boolean
[JScript] public function CanRemove(relation: DataRelation): Boolean; Verifies if a given relation can be removed from the collection.
Clear
[C#] public virtual void Clear( );
[C++] public: virtual void Clear( );
[VB] Overridable Public Sub Clear( )
[JScript] public function Clear( );
Description
Clears the collection of any relations.
Contains
[C#] public virtual bool Contains(string name);
[C++] public: virtual bool Contains(String* name);
[VB] Overridable Public Function Contains(ByVal name As String) As Boolean
[JScript] public function Contains(name: String): Boolean;
Description
Gets a value of true if this collection has a relation with the given name (case insensitive), false otherwise.
Return Value: Whether a relation exists with this name. name to test.
GetDataSet
[C#] protected abstract DataSet GetDataSet( );
[C++] protected: virtual DataSet* GetDataSet( )=0;
[VB] MustOverride Protected Function GetDataSet( ) As DataSet
[JScript] protected abstract function GetDataSet( ): DataSet;
Description
Gets the dataSet for this collection.
Return Value: The dataSet.
IndexOf
[C+] public virtual int IndexOf(DataRelation relation);
[C++] public: virtual int IndexOf(DataRelation* relation);
[VB] Overridable Public Function IndexOf(ByVal relation As DataRelation) As Integer
[JScript] public function IndexOf(relation: DataRelation): int; Returns the index of a specified System.Data.DataRelation.
IndexOf
[C#] public virtual int IndexOf(string relationName);
[C++] public: virtual int IndexOf(String* relationName);
[VB] Overridable Public Function IndexOf(ByVal relationName As String) As Integer
[JScript] public function IndexOf(relationName: String): int; Returns the index of the relation with the given name (case insensitive), or −1 if the relation doesn't exist in the collection.
OnCollectionChanged
[C#] protected virtual void OnCollectionChanged (CollectionChangeEventArgs ccevent);
[C++] protected: virtual void OnCollectionChanged (CollectionChangeEventArgs* ccevent);
[VB] Overridable Protected Sub OnCollectionChanged (ByVal ccevent As CollectionChangeEventArgs)
[JScript] protected function OnCollectionChanged(ccevent: CollectionChangeEventArgs);
Description
Raises the System.Data.DataRelationCollection. CollectionChanged (Systei.ComponentModel.CollectionChangeEventArgs) event.
Raising an event invokes the event handler through a delegate. For an overview, see. A System.ComponentModel.CollectionChangeEventArgs that contains the event data.
OnCollectionChanging
[C#] protected internal virtual void OnCollectionChanging (CollectionChangeEventArgs ccevent);
[C++] protected public: virtual void OnCollectionChanging (CollectionChangeEventArgs* ccevent);
[VB] Overridable Protected Friend Dim Sub OnCollectionChanging(ByVal ccevent As CollectionChangeEventArgs)
[JScript] package function OnCollectionChanging(ccevent: CollectionChangeEventArgs);
Description
Raises the System.Data.DataRelationCollection. OnCollectionChanging (System.ComponentModel.CollectionChangeEventArgs) event.
Raising an event invokes the event handler through a delegate. For an overview, see. A System.ComponentModel.CollectionChangeEventArgs that contains the event data.
Remove
[C#] public void Remove(DataRelation relation);
[C++] public: void Remove(DataRelation* relation);
[VB] Public Sub Remove(ByVal relation As DataRelation)
[JScript] public function Remove(relation: DataRelation);
Removes the specified relation from the collection.
Description
Removes the specified relation from the collection. An ArgumentNullException is generated if this relation is null. An ArgumentException is generated if this relation doesn't belong to this collection. The CollectionChanged event is fired if it succeeds. The relation to remove.
Remove
[C#] public void Remove(string name);
[C++] public: void Remove(String* name);
[VB] Public Sub Remove(ByVal name As String)
[JScript] public function Remove(name: String);
Description
Removes the relation with the specified name from the collection. An IndexOutOfRangeException is generated if this collection doesn't have a relation with that name The CollectionChanged event is fired if it succeeds. The name of the relation to remove.
RemoveAt
[C#] public void RemoveAt(int index);
[C++] public: void RemoveAt(int index);
[VB] Public Sub RemoveAt(ByVal index As Integer)
[JScript] public function RemoveAt(index: int);
Description
Removes the relation at the specified index from the collection. An IndexOutOfRangeException is generated if this collection doesn't have a relation at this index. The CollectionChanged event is fired if it succeeds. The index at which to remove a relation.
RemoveCore
[C#] protected virtual void RemoveCore(DataRelation relation);
[C++] protected: virtual void RemoveCore(DataRelation* relation);

[VB] Overridable Protected Sub RemoveCore(ByVal relation As DataRelation)
[JScript] protected function RemoveCore(relation: DataRelation);
Description
Does verification on the relation. An ArgumentNullException is generated if this relation is null. An ArgumentException is generated if this relation doesn't belong to this collection. The relation to check.
DataRow class (System.Data)
ToString
Description
Represents a row of data in a System.Data.DataTable.
The System.Data.DataRow and System.Data.DataColumn objects are primary components of a System.Data.DataTable. Use the System.Data.DataRow object and its properties and methods to retrieve and evaluate; and insert, delete, and update the values in the System.Data.DataTable. The System.Data.DataRowCollection represents the actual System.Data.DataRow objects in the System.Data.DataTable, and the System.Data.DataColumnCollection contains the System.Data.DataColumn objects that describe the schema of the System.Data.DataTable. Use the overloaded System.Data.DataRow.Item(System.Int32) property to return or sets the value of a System.Data.DataColumn.
DataRow
Example Syntax:
ToString
[C#] protected internal DataRow(DataRowBuider builder);
[C++] internal: DataRow(DataRowBuilder* builder);
[VB] Protected Friend Sub New(ByVal builder As DataRowBuilder)
[JScript] package function DataRow(builder: DataRowBuilder);
Description
Initializes a new instance of the DataRow. builder
HasErrors
ToString
[C#] public bool HasErrors {get;}
[C++] public: __property bool get_HasErrors( );
[VB] Public ReadOnly Property HasErrors As Boolean
[JScript] public function get HasErrors( ): Boolean;
Description
Gets a value indicating whether there are errors in a columns collection.
When validating data, you can set an error on any column in a row. Such a column, when displayed in the System.Windows.Forms.DataGrid control, is marked with a red exclamation point to signal the user that the column is in error.
Item
ToString
[C#] public object this[string columnName] {get; set;}
[C++] public: __property Object* get_Item(String* columnName);public: __property void set_Item(String* columnName, Object*);
[VB] Public Default Property Item(ByVal columnName As String) As; Object
[JScript] returnValue=DataRowObject.Item(columnName); DataRowObject.Item(columnName)=returnValue;
Description
Gets or sets the data stored in the column specified by name.
When setting the property, an exception is generated if an exception occurs in the System.Data.DataTable.ColumnChanging event. The name of the column.
Item
ToString
[C#] public object this[DataColumn column] {get; set;}
[C++] public: __property Object* get_Item(DataColumn* column);public: __property void set_Item(DataColumn* column, Object*);
[VB] Public Default Property Item(ByVal column As DataColumn) As Object
[JScript] returnValue=DataRowObject.Item(column); DataRowObject.Item(column)=returnValue;
Description
Gets or sets the data stored in the specified System.Data.DataColumn.
When setting the property, an exception is generated if an exception occurs in the System.Data.DataTable.ColumnChanging event. A System.Data.DataColumn that contains the data.
Item
ToString
[C#] public object this[int columnIndex] {get; set;}
[C++] public: __property Object* get_Item(int columnIndex);public: __property void set_Item(int columnIndex, Object*);
[VB] Public Default Property Item(ByVal columnIndex As Integer) As Object [JScript] returnValue=DataRowObject.Item(columnIndex); DataRowObject.Item(columnIndex) returnValue; Gets or sets data stored in a specified column.
Description
Gets or sets the data stored in the column specified by index.
When setting the property, an exception is generated if an exception occurs in the System.Data.DataTable.ColumnChanging event. The zero-based index of the column
Item
ToString
[C#] public object this[string columnName, DataRowVersion version] {get;}
[C++] public: __property Object* get_Item(String* columnName, DataRowVersion version);
[VB] Public Default ReadOnly Property Item(ByVal columnName As String, ByVal version As DataRowVersion) As Object
[JScript] returnValue=DataRowObject.Item(columnName, version);
Description
Gets the specified version of data stored in the named column.
The version shouldn't be confused with the System.Data.DataRow.RowState property. The version argument describes the state of the data contained by the column in relation to the column's original value. The System.Data.DataRow.RowState property describes the state of the entire row in relation to its parent System.Data.DataTable The name of the column. One of the System.Data.DataRowVersion values that specifies the desired row version. Possible values are Default, Original, Current, and Proposed.
Item
ToString
[C#] public object this[DataColumn column, DataRowVersion version] {get;}
[C++] public: __property Object* get_Item(DataColumn* column, DataRowVersion version);
[VB] Public Default ReadOnly Property Item(ByVal column As DataColumn, ByVal version As DataRowVersion) As Object
[JScript] returnValue=DataRowObject.Item(column, version);

Description

Gets the specified version of data stored in the specified System.Data.DataColumn.

The version shouldn't be confused with the System.Data.DataRow.RowState property. The version argument describes the state of the data contained by the column in relation to the column's original value. A System.Data.DataColumn that contains information about the column. One of the System.Data.DataRowVersion values that specifies the desired row version. Possible values are Default, Original, Current, and Proposed.

Item
ToString
[C#] public object this[int columnIndex, DataRowVersion version] {get;}
[C++] public: __property Object* get_Item(int columnIndex, DataRowVersion version);
[VB] Public Default ReadOnly Property Item(ByVal columnIndex As Integer, ByVal version As DataRowVersion) As Object
[JScript] returnValue=DataRowObject.Item(columnIndex, version);
Description Gets the data stored in the column, specified by index and version of the data to retrieve.

You can only create or update a row after calling the System.Data.DataRow.BeginEdit method; similarly, the System.Data.DataRow.EndEdit method must be called to commit the edit. After calling the System.Data.DataRow.EndEdit method, and before calling the System.Data.DataRow.AcceptChanges method, internal representations of the original and new proposed values are stored. Therefore, until you call the System.Data.DataRow.AcceptChanges, you can use the version argument to specify which version of a column's value you need, either the DataRowVersion.Original or DataRowVersion.Proposed. Once you call the System.Data.DataRow.AcceptChanges method, however, the version of the column reverts to DataRowVersion.Original. If the row is new, you can also pass DataRowVersion.Default for the parameter to retrieve the column's default value. When passing DataRowVersion.Current, the property will return the current value, whatever its version may be. The zero-based index of the column. One of the System.Data.DataRowVersion values that specifies the desired row version. Possible values are Default, Original, Current, and Proposed.

ItemArray
ToString
[C#] public object[ ] ItemArray {get; set;}
[C++] public: __property Object* get_ItemArray( );public: __property void set_ItemArray(Object* __gc[ ]);
[VB] Public Property ItemArray As Object ( )
[JScript] public function get ItemArray( ): Object[ ];public function set ItemArray(Object[ ]);
Description Gets or sets all of the values for this row through an array.

If a System.Data.DataColumn has its System.Data.DataColumn.DefaultValue property set, pass a null in the array to set the default value for that column. Similarly, if a column has its System.Data.DataColumn.AutoIncrement property set to true, pass the null in the array to set the automatically generated value for the row.

RowError
ToString
[C#] public string RowError {get; set;}
[C++] public: __property String* get_RowError( );public: __property void set_RowError(String*);
[VB] Public Property RowError As String
[JScript] public function get RowError( ): String;public function set RowError(String);
Description Gets or sets the custom error description for a row.

Uses the System.Data.DataRow.HasErrors property to first determine if a System.Data.DataRow contains errors.

RowState
ToString
[C#] public DataRowState RowState {get;}
[C++] public: __property DataRowState get_RowState( );
[VB] Public ReadOnly Property RowState As DataRowState
[JScript] public function get RowState( ): DataRowState;
Description Gets the current state of the row in regards to its relationship to the System.Data.DataRowCollection.

The System.Data.DataRow.RowState property is used in conjunction with the System.Data.DataSet.GetChanges and System.Data.DataSet.HasChanges methods of the System.Data.DataSet.

Table
ToString
[C#] public DataTable Table {get;}
[C++] public: __property DataTable* get_Table( );
[VB] Public ReadOnly Property Table As DataTable
[JScript] public function get Table( ): DataTable;
Description Gets the System.Data.DataTable for which this row has a schema.

A System.Data.DataRow does not necessarily belong to any table's collection of rows. This occurs when the System.Data.DataRow has been created but not added to the System.Data.DataRowCollection. If the System.Data.DataRow.RowState property returns DataRowState.Detached, the row is not in any collection.

AcceptChanges
[C#] public void AcceptChanges( );
[C++] public: void AcceptChanges( );
[VB] Public Sub AcceptChanges( )
[JScript] public function AcceptChanges( );
Description Commits all the changes made to this row since the last time System.Data.DataRow.AcceptChanges was called.

When invoking System.Data.DataRow.AcceptChanges, the System.Data.DataRow.EndEdit method is implicitly called to end any edits. If the System.Data.DataRow.RowState of the row was Added or Modified, the System.Data.DataRow.RowState becomes Unchanged. If the System.Data.DataRow.RowState was Deleted, the row is removed.

BeginEdit
[C#] public void BeginEdit( );
[C++] public: void BeginEdit( );
[VB] Public Sub BeginEdit( )
[JScript] public function BeginEdit( );
Description Begins an edit operation on a System.Data.DataRow object.

Use the System.Data.DataRow.BeginEdit method to put a System.Data.DataRow into edit mode. In this mode, events are temporarily suspended allowing the user to make multiple changes to more than one row without triggering validation rules. For example, if the values of several rows must add up to 100, you can put each of the rows into edit mode to suspend the validation of the row values until the user attempts to commit the values. While in edit mode, the The System.Data.DataRow.BeginEdit method is called implicitly when the user changes the value of a databound control; the System.Data.DataRow.EndEdit method is called implicitly when you invoke the System.Data.DataTable object's System.Data.DataTable.AcceptChanges method.) While in this edit mode, the System.Data.DataRow stores representations of the original and new proposed values Therefore, as long as the System.Data.DataRow.EndEdit method has not been called, you can retrieve either the original or proposed version by passing either DataRowVersion.Original or DataRowVersion.Proposed for the version parameter of the System.Data.DataRow.Item(System.Int32) properly. You can also cancel any edits at this time by invoking the System.Data.DataRow.CancelEdit method.

CancelEdit
[C#] public void CancelEdit( );
[C++] public: void CancelEdit( );
[VB] Public Sub CancelEdit( )
[JScript] public function CancelEdit( );
Description
  Cancels the current edit on the row.
  See the System.Data.DataRow.BeginEdit method for more details.

ClearErrors
[C#] public void ClearErrors( );
[C++] public: void ClearErrors( );
[VB] Public Sub ClearErrors( )
[JScript] public function ClearErrors( );
Description
  Clears the errors for the row, including the System.Data.DataRow.RowError and errors set with System.Data.DataRow.SetColumnError(System.Int32, System.String).
  Use System.Data.DataRow.SetColumnError(System.Int32,System.String) and System.Data.DataRow.GetColumnError(System.Int32) to set and return errors for individual columns.

Delete
[C#] public void Delete( );
[C++] public: void Delete( );
[VB] Public Sub Delete( )
[JScript] public function Delete( );
Description
  Deletes the row.
  If the System.Data.DataRow.RowState of the row is Added, the row will be removed from the table.

EndEdit
[C#] public void EndEdit( );
[C++] public: void EndEdit( );
[VB] Public Sub EndEdit( )
[JScript] public function EndEdit( );
Description
  Ends the edit occurring on the row.
  When setting the property, an exception is generated if an exception occurs in the System.Data.DataTable.RowChanging event.

GetChildRows
[C#] public DataRow[ ] GetChildRows(DataRelation relation);
[C++] public: DataRow* GetChildRows(DataRelation* relation) [ ];
[VB] Public Function GetChildRows(ByVal relation As DataRelation) As DataRow( )
[JScript] public function GetChildRows(relation: DataRelation): DataRow[ ]; Gets the child rows of a System.Data.DataRow.
Description
  Gets the child rows of this System.Data.DataRow using the specified System.Data.DataRelation.
Return Value: An array of System.Data.DataRow objects (or an array of length zero).
  In a System.Data.DataSet, the collection of all System.Data.DataRelation objects for the data set is returned by the System.Data.DataSet.GetChildRelations method. The System.Data.DataRelation to use.

GetChildRows
[C#] public DataRow[ ] GetChildRows(string relationName);
[C++] public: DataRow* GetChildRows(String* relationName) [ ];
[VB] Public Function GetChildRows(ByVal relationName As String) As DataRow( )
[JScript] public function GetChildRows(relationName: String): DataRow[ ]; Gets the child rows in a related System.Data.DataTable of a System.Data.DataRow.
Description
  Gets the child rows of a System.Data.DataRow using the specified System.Data.DataRelation.RelationName of a System.Data.DataRelation.
Return Value: An array of System.Data.DataRow objects (or an array of length zero).
  In a System.Data.DataSet, the collection of all System.Data.DataRelation objects for the data set is returned by the System.Data.DataSet.GetChildRelations method. The System.Data.DataRelation.RelationName of the System.Data.DataRelation to use.

GetChildRows
[C#] public DataRow[ ] GetChildRows(DataRelation relation, DataRowVersion version);
[C++] public: DataRow* GetChildRows(DataRelation* relation, DataRowVersion version) [ ];
[VB] Public Function GetChildRows(ByVal relation As DataRelation, ByVal version As DataRowVersion) As DataRow( )
[JScript] public function GetChildRows(relation: DataRelation, version: DataRowVersion): DataRow[ ];
Description
  Gets the child rows of a System.Data.DataRow using the specified System.Data.DataRelation, and System.Data.DataRowVersion.
Return Value: An array of System.Data.DataRow objects.
  In a System.Data.DataSet, the collection of all System.Data.DataRelation objects for the data set is returned by the System.Data.DataSet.GetChildRelations method. The System.Data.DataRelation to use. One of the System.Data.DataRowVersion values specifying the version of the data to get. Possible values are Default, Original, Current, and Proposed.

GetChildRows
[C#] public DataRow[ ] GetChildRows(string relationName, DataRowVersion version);
[C++] public: DataRow* GetChildRows(String* relationName, DataRowVersion version) [ ];
[VB] Public Function GetChildRows(ByVal relationName As String, ByVal version As DataRowVersion) As DataRow( )
[JScript] public function GetChildRows(relationName: String, version: DataRowVersion): DataRow[ ];
Description
  Gets the specified version of the child rows of a System.Data.DataRow using the specified System.Data.DataRelation.RelationName of a System.Data.DataRelation, and System.Data.DataRowVersion.
Return Value: An array of System.Data.DataRow objects (or an array of length zero).
  In a System.Data.DataSet, the collection of all System.Data.DataRelation objects for the data set is returned by the System.Data.DataSet.GetChildRelations method. The System.Data.DataRelation.RelationName of the System.Data.DataRelation to use. One of the System.Data.DataRowVersion values specifying the version of the data to get. Possible values are Default, Original, Current, and Proposed.
GetColumnError
[C#] public string GetColumnError(DataColumn column);
[C++] public: String* GetColumnError(DataColumn* column);
[VB] Public Function GetColumnError(ByVal column As DataColumn) As String
[JScript] public function GetColumnError(column: DataColumn): String;
Description
Gets the error description of the specified System.Data.DataColumn
Return Value: The text of the error description.
Use the System.Data.DataRow.SetColumnError(System.Int32,System.String) method to set column errors. A System.Data.DataColumn.
GetColumnError
[C#] public string GetColumnError(int columnIndex);
[C++] public: String* GetColumnError(int columnIndex);
[VB] Public Function GetColumnError(ByVal columnIndex As Integer) As String
[JScript] public function GetColumnError(columnIndex: int): String; Gets the error description for a column.
Description
Gets the error description for the column specified by index.
Return Value: The text of the error description.
Use the System.Data.DataRow.SetColumnError(System.Int32,System.String) method to set column errors. The zero-based index of the column.
GetColumnError
[C#] public string GetColumnError(string columnName);
[C++] public: String* GetColumnError(String* columnName);
[VB] Public Function GetColumnError(ByVal columnName As String) As String
[JScript] public function GetColumnError(columnName: String): String;
Description
Gets the error description for a column, specified by name.
Return Value: The text of the error description.
Use the System.Data.DataRow.SetColumnError(System.Int32,System.String) method to set column errors. The name of the column.
GetColumnsInError
[C#] public DataColumn[ ] GetColumnsInError( );
[C++] public: DataColumn* GetColumnsInError( ) [ ];
[VB] Public Function GetColumnsInError( ) As DataColumn( )
[JScript] public function GetColumnsInError( ): DataColumn[ ];
Description
Gets an array of columns that have errors.
Return Value: An array of System.Data.DataColumn objects that contain errors.
The System.Data.DataRow.GetColumnsInError allows you to reduce the number of System.Data.DataColumn objects that must be processed for errors by returning only those columns that have an error. Errors can be set to individual columns with the System.Data.DataRow.SetColumnError(System.Int32, System.String) method. To further reduce the number of processing, check the System.Data.DataRow class's System.Data.DataRow.HasErrors property to first determine if a System.Data.DataRow has errors before invoking System.Data.DataRow.GetColumnsInError.
GetParentRow
[C#] public DataRow GetParentRow(DataRelation relation);
[C++] public: DataRow* GetParentRow(DataRelation* relation);
[VB] Public Function GetParentRow(ByVal relation As DataRelation) As DataRow
[JScript] public function GetParentRow(relation: DataRelation): DataRow;
Description
Gets the parent row of a System.Data.DataRow using the specified System.Data.DataRelation.
Return Value: The parent System.Data.DataRow of the current row.
In a System.Data.DataSet, the collection of all parent System.Data.DataRelation objects for the data set is returned by the System.Data.DataSet.GetParentRelations(System.Data.DataTable) method. The System.Data.DataRelation to use.
GetParentRow
[C#] public DataRow GetParentRow(string relationName);
[C++] public: DataRow* GetParentRow(String* relationName);
[VB] Public Function GetParentRow(ByVal relationName As String) As DataRow
[JScript] public function GetParentRow(relationName: String): DataRow; Gets the parent row of a System.Data.DataRow
Description
Gets the parent row of a System.Data.DataRow using the specified System.Data.DataRelation.RelationName of a System.Data.DataRelation.
Return Value: The parent System.Data.DataRow of the current row.
In a System.Data.DataSet, the collection of all parent System.Data.DataRelation objects for the data set is returned by the System.Data.DataSet.GetParentRelations(System.Data.DataTable) method. The System.Data.DataRelation.RelationName of a System.Data.DataRelation.
GetParentRow
[C#] public DataRow GetParentRow(DataRelation relation, DataRowVersion version);
[C++] public: DataRow* GetParentRow(DataRelation* relation, DataRowVersion version);
[VB] Public Function GetParentRow(ByVal relation As DataRelation, ByVal version As DataRowVersion) As DataRow
[JScript] public function GetParentRow(relation: DataRelation, version: DataRowVersion): DataRow;
Description
Gets the parent row of a System.Data.DataRow using the specified System.Data.DataRelation, and System.Data.DataRowVersion.
Return Value: The parent System.Data.DataRow of the current row.
In a System.Data.DataSet, the collection of all parent System.Data.DataRelation objects for the data set is returned by the System.Data.DataSet.GetParentRelations(System.Data.DataTable) method. The System.Data.DataRelation to use. One of the System.Data.DataRowVersion values specifying the version of the data to get.
GetParentRow
[C#] public DataRow GetParentRow(string relationName, DataRowVersion version);

[C++] public: DataRow* GetParentRow(String* relationName, DataRowVersion version);
[VB] Public Function GetParentRow(ByVal relationName As String, ByVal version As DataRowVersion) As DataRow
[JScript] public function GetParentRow(relationName: String, version: DataRowVersion): DataRow;
Description
Gets the parent row of a System.Data.DataRow using the specified System.Data.DataRelation.RelationName of a System.Data.DataRelation, and System.Data.DataRowVersion.
Return Value: The parent System.Data.DataRow of the current row.
In a System.Data.DataSet, the collection of all parent System.Data.DataRelation objects for the data set is returned by the System.Data.DataSet.GetParentRelations (System.Data.DataTable) method. The System.Data.DataRelation.RelationName of a System.Data.DataRelation. One of the System.Data.DataRowVersion values.
GetParentRows
[C#] public DataRow[ ] GetParentRows(DataRelation relation);
[C++] public: DataRow* GetParentRows(DataRelation* relation)
[VB] Public Function GetParentRows(ByVal relation As DataRelation) As DataRow( )
[JScript] public function GetParentRows(relation: DataRelation): DataRow[ ]; Gets the parent rows of a System.Data.DataRow.
Description
Gets the parent rows of a System.Data.DataRow using the specified System.Data.DataRelation.
Return Value: An array of System.Data.DataRow objects (or an array of length zero).
In a System.Data.DataSet, the collection of all parent System.Data.DataRelation objects for the data set is returned by the System.Data.DataSet.GetParentRelations (System.Data.DataTable) method. The System.Data.DataRelation to use.
GetParentRows
[C#] public DataRow[ ] GetParentRows(string relationName);
[C++] public: DataRow* GetParentRows(String* relationName) [ ];
[VB] Public Function GetParentRows(ByVal relationName As String) As DataRow( )
[JScript] public function GetParentRows(relationName: String): DataRow[ ]; Gets the parent rows of a System-.Data.DataRow.
Description
Gets the parent rows of a System.Data.DataRow using the specified System.Data.DataRelation.RelationName of a System.Data.DataRelation.
Return Value: An array of System.Data.DataRow objects (or an array of length zero).
In a System.Data.DataSet, the collection of all parent System.Data.DataRelation objects for the data set is returned by the System.Data.DataSet.GetParentRelations (System.Data.DataTable) method. The System.Data.DataRelation.RelationName of a System.Data.DataRelation.
GetParentRows
[C#] public DataRow[ ] GetParentRows(DataRelation relation, DataRowVersion version);
[C++] public: DataRow* GetParentRows(DataRelation* relation, DataRowVersion version) [ ];
[VB] Public Function GetParentRows(ByVal relation As DataRelation, ByVal version As DataRowVersion) As DataRow( )
[JScript] public function GetParentRows(relation: DataRelation, version: DataRowVersion): DataRow[ ];
Description
Gets the parent rows of a System.Data.DataRow using the specified System.Data.DataRelation, and System.Data.DataRowVersion.
Return Value: An array of System.Data.DataRow objects (or an array of length zero).
In a System.Data.DataSet, the collection of all parent System.Data.DataRelation objects for the data set is returned by the System.Data.DataSet.GetParentRelations (System.Data.DataTable) method. The System.Data.DataRelation to use. One of the System.Data.DataRowVersion values specifying the version of the data to get.
GetParentRows
[C#] public DataRow[ ] GetParentRows(string relationName, DataRowVersion version);
[C++] public: DataRow* GetParentRows(String* relationName, DataRowVersion version) [ ];
[VB] Public Function GetParentRows(ByVal relationName As String, ByVal version As DataRowVersion) As DataRow( )
[JScript] public function GetParentRows(relationName: String, version: DataRowVersion): DataRow[ ];
Description
Gets the parent rows of a System.Data.DataRow using the specified System.Data.DataRelation.RelationName of a System.Data.DataRelation, and System.Data.DataRowVersion.
Return Value: An array of System.Data.DataRow objects (or an array of length zero).
In a System.Data.DataSet, the collection of all parent System.Data.DataRelation objects for the data set is returned by the System.Data.DataSet.GetParentRelations (System.Data.DataTable) method. The System.Data.DataRelation.RelationName of a System.Data.DataRelation. One of the System.Data.DataRowVersion values specifying the version of the data to get. Possible values are Default, Original, Current, and Proposed.
HasVersion
[C#] public bool HasVersion(DataRowVersion version);
[C++] public: bool HasVersion(DataRowVersion version);
[VB] Public Function HasVersion(ByVal version As DataRowVersion) As Boolean
[JScript] public function HasVersion(version: DataRowVersion): Boolean;
Description
Gets a value indicating whether a specified version exists.
Return Value: true if the version exists; otherwise, false.
See the System.Data.DataRow.BeginEdit method for more details. One of the System.Data.DataRowVersion values that specifies the row version. Possible values are Default, Original, Current, and Proposed.
IsNull
[C#] public bool IsNull(DataColumn column);
[C++] public: bool IsNull(DataColumn* column);
[VB] Public Function IsNull(ByVal column As DataColumn) As Boolean
[JScript] public function IsNull(column: DataColumn): Boolean;
Description
Gets a value indicating whether the specified System.Data.DataColumn contains a null value.
Return Value: true if the column contains a null value; otherwise, false. A System.Data.DataColumn.
IsNull
[C#] public bool IsNull(int columnIndex);

[C++] public: bool IsNull(int columnIndex);
[VB] Public Function IsNull(ByVal columnIndex As Integer) As Boolean
[JScript] public function IsNull(columnIndex: int):Boolean; Gets a value indicating whether the specified column contains a null value.
Description
Gets a value indicating whether the column at the specified index contains a null value.
Return Value: true if the column contains a null value; otherwise, false. The zero-based index of the column.
IsNull
[C#] public bool IsNull(string columnName);
[C++] public: bool IsNull(String* columnName);
[VB] Public Function IsNull(ByVal columnName As String) As Boolean
[JScript] public function IsNull(columnName: String): Boolean;
Description
Gets a value indicating whether the named column contains a null value.
Return Value: true if the column contains a null value; otherwise, false. The name of the column.
IsNull
[C#] public bool IsNull(DataColumn column, DataRowVersion version);
[C++] public: bool IsNull(DataColumn* column, DataRowVersion version);
[VB] Public Function IsNull(ByVal column As DataColumn, ByVal version As DataRowVersion) As Boolean
[JScript] public function IsNull(column: DataColumn, version: DataRowVersion): Boolean;
Description
Gets a value indicating whether the specified System-.Data.DataColumn and System.Data.DataRowVersion contains a null value.
Return Value: true if the column contains a null value; otherwise, false. A System.Data.DataColumn. One of the System.Data.DataRowVersion values that specifies the row version. Possible values are Default, Original, Current, and Proposed.
RejectChanges
[C#] public void RejectChanges( );
[C++] public: void RejectChanges( );
[VB] Public Sub RejectChanges( )
[JScript] public function RejectChanges( );
Description
Rejects all changes made to the row since System.Data-.DataRow.AcceptChanges was last called.
When calling the System.Data.DataRow.RejectChanges method, the System.Data.DataRow.CancelEdit method is implicitly called to cancel any edits. If System.Data.DataRow.RowState is Deleted or Modified, the row reverts to its previous values, and System.Data.DataRow.RowState becomes Unchanged. If the System.Data.DataRow.RowState is Added, the row is removed.
SetColumnError
[C#] public void SetColumnError(DataColumn column, string error);
[C++] public: void SetColumnError(DataColumn* column, String* error);
[VB] Public Sub SetColumnError(ByVal column As DataColumn, ByVal error As String)
[JScript] public function SetColumnError(column: DataColumn, error: String);
Description
Sets the error description for a column specified as a System.Data.DataColumn.
To examine error descriptions, use the System.Data.DataRow.GetColumnError(System.Int32) method. The System.Data.DataColumn to set the error description for. The error description.
SetColumnError
[C#] public void SetColumnError(int columnIndex, string error);
[C++] public: void SetColumnError(int columnIndex, String* error);
[VB] Public Sub SetColumnError(ByVal columnIndex As Integer, ByVal error As String)
[JScript] public function SetColumnError(columnIndex: int, error: String); Sets the error description for a column.
Description
Sets the error description for a column specified by index.
The method is used to set custom error descriptions on specified columns. You can use the System.Windows.Forms.ErrorProvider control to display the text of the error, or through by other reporting mechanisms. The zero-based index of the column. The error description.
SetColumnError
[C#] public void SetColumnError(string columnName, string error);
[C++] public: void SetColumnError(String* columnName, String* error);
[VB] Public Sub SetColumnError(ByVal columnName As String, ByVal error As String)
[JScript] public function SetColumnError(columnName: String, error: String);
Description
Sets the error description for a column specified by name.
The name of a column is set with the System.Data.DataColumn class's System.Data.DataColumn.ColumnName property. The name of the column. The error description.
SetNull
[C#] protected void SetNull(DataColumn column);
[C++] protected: void SetNull(DataColumn* column);
[VB] Protected Sub SetNull(ByVal column As DataColumn)
[JScript] protected function SetNull(column: DataColumn);
Description
Sets the the value of the specified System.Data.DataColumn to a null value.
Use the System.Data.DataRow.IsNull(System.Int32) method to determine if a column contains a null value. A System.Data.DataColumn.
SetParentRow
[C#+] public void SetParentRow(DataRow parentrow);
[C++] public: void SetParentRow(DataRow* parentrow);
[VB] Public Sub SetParentRow(ByVal parentRow As DataRow)
[JScript] public function SetParentRow(parentRow: DataRow); Sets the parent row of a System.Data.DataRow.
Description
Sets the parent row of a System.Data.DataRow with specified new parent System.Data.DataRow. The new parent System.Data.DataRow
SetParentRow
[C#] public void SetParentRow(DataRow parentRow, DataRelation relation);
[C]++) public: void SetParentRow(DataRow* parentRow, DataRelation* relation);
[VB] Public Sub SetParentRow(ByVal parentRow As DataRow, ByVal relation As DataRelation)
[JScript] public function SetParentRow(parentRow: DataRow, relation: DataRelation);

Description

Sets the parent row of a System.Data.DataRow with specified new parent System.Data.DataRow and System.Data.DataRelation.

[Need explanation of why we do this.] The following example sets the parent row of a given child row. The new parent System.Data.DataRow. The relation System.Data.DataRelation to use.

DataRowAction enumeration (System.Data)
ToString
Description

Describes the action taken on a System.Data.DataRow

Use the members of this enumeration to determine the action that has occurred on a System.Data.DataRow with respect to the System.Data.DataTable to which it belongs.
ToString
[C#] public const DataRowAction Add;
[C++] public: const DataRowAction Add;
[VB] Public Const Add As DataRowAction
[JScript] public var Add: DataRowAction;
Description The row has been added to the table.
ToString
[C#] public const DataRowAction Change;
[C++] public: const DataRowAction Change;
[IVB] Public Const Change As DataRowAction
[JScript] public var Change: DataRowAction;
Description The row has changed.
ToString
[C#] public const DataRowAction Commit;
[C++] public: const DataRowAction Commit;
[VB] Public Const Commit As DataRowAction
[JScript] public var Commit: DataRowAction;
Description The row has been committed.
ToString
[C#] public const DataRowAction Delete;
[C++] public: const DataRowAction Delete;
[VB] Public Const Delete As DataRowAction
[JScript] public var Delete: DataRowAction;
Description The row was deleted from the table.
ToString
[C#] public const DataRowAction Nothing;
[C++] public: const DataRowAction Nothing;
[VB] Public Const Nothing As DataRowAction
[JScript] public var Nothing: DataRowAction;
Description The row has not changed.
ToString
[C#] public const DataRowAction Rollback;
[C++] public: const DataRowAction Rollback;
[VB] Public Const Rollback As DataRowAction
[JScript] public var Rollback: DataRowAction;
Description The change has been rolled back.
DataRowBuilder class (System.Data)
ToString
Description DataRowChangeEventArgs class (System.Data)
ToString
Description Provides data for the System.Data.DataTable.RowChanged, System.Data.DataTable.RowChanging, System.Data.DataTable.OnRowDeleting (System.Data.DataRowChangeEvent Args), and System.Data.DataTable.OnRowDeleted (System.Data.DataRowChangeEvent Args) events.

The System.Data.DataTable.RowChanged, System.Data.DataTable.RowChanged, System.Data.DataTable.RowChanged, and System.Data.DataTable.RowChanged events occur when an action is performed on a System.Data.DataRow
DataRowChangeEventArgs
Example Syntax:
ToString
[C#] public DataRowCangeEventArgs(DataRow row, DataRowAction action);
[C++] public: DataRowChangeEventArgs(DataRow* row, DataRowAction action);
[VB] Public Sub New(ByVal row As DataRow, ByVal action As DataRowAction)
[JScript] public function DataRowChangeEventArgs(row: DataRow, action: DataRowAction);
Description Initializes a new instance of the System.Data.DataRowChangeEventArgs class. The System.Data.DataRow upon which an action is occuring. One of the System.Data.DataRowAction values.

Action
ToString
[C#] public DataRowAction Action {get;}
[C++] public: __property DataRowAction get__Action( );
[VB] Public ReadOnly Property Action As DataRowAction
[JScript] public function get Action( ): DataRowAction;
Description Gets the action that has occurred on a System.Data.DataRow.
Row
ToString
[C#] public DataRow Row {get;}
[C++] public: __property DataRow* get__Row( );
[VB] Public ReadOnly Property Row As DataRow
[JScript] public function get Row( ): DataRow;
Description Gets the row upon which an action has occurred.
DataRowChangeEventHandler delegate (System.Data)
ToString
Description Represents the method that will handle the System.Data.DataTable.RowChanging, System.Data.DataTable.RowChanged, System.Data.DataTable.RowDeleting, and System.Data.DataTable.RowDeleted events of a System.Data.DataTable. The source of the event. A System.Data.DataRowChangeEventArgs that contains the event data.

When you create a System.Data.DataRowChangeEventHandler delegate, you identify the method that will handle the event. To associate the event with your event handler, add an instance of the delegate to the event. The event handler is called whenever the event occurs, until you remove the delegate. For more information about delegates, see.

DataRowCollection class (System.Data)
ToString
Description

Represents a collection of rows for a System.Data.DataTable.

The System.Data.DataRowCollection is a major component of the System.Data.DataTable. While the System.Data.DataColumnCollection defines the schema of the table, the System.Data.DataRowCollection contains the actual data for the table, where each System.Data.DataRow in the System.Data.DataRowCollection represents a single row.
Count
IsReadOnly
IsSynchronized
Item
ToString
Description
Gets the row at the specified index.
Use the System.Data.DataRowCollection.Contains (System.Object) method to determine if a given value exists in the key column of a row. The zero-based index of the row to return.
List
ToString
[C#] protected override ArrayList List {get;}
[C++] protected: _property virtual ArrayList* get_List( );
[VB] Overrides Protected ReadOnly Property List As Array-List
[JScript] protected function get List( ): ArrayList;
Description
Gets the list of the collection items.
SyncRoot
Add
[C#] public void Add(DataRow row);
[C++] public: void Add(DataRow* row);
[VB] Public Sub Add(ByVal row As DataRow)
[JScript] public function Add(row: DataRow); Adds a System.Data.DataRow to the System.Data.DataRowCollection.
Description
Adds the specified System.Data.DataRow to the System.Data.DataRowCollection object.
To create a new System.Data.DataRow, you must use the System.Data.DataTable class's System.Data.DataTable.NewRow method. When you use the System.Data.DataTable.NewRow method, a new System.Data.DataRow object is returned using the schema of parent System.Data.DataTable. After you create the System.Data.DataRow object and set the values for each of its columns, use the System.Data.DataRowCollection.Add (System.Data.DataRow) method to add the object to the collection. The System.Data.DataRow to add.
Add
[C#] public virtual DataRow Add(object[ ] values);
[C++] public: virtual DataRow* Add(Object* values _gc[ ]);
[VB] Overridable Public Function Add(ByVal values( ) As Object) As DataRow
[JScript] public function Add(values: Object[ ]): DataRow;
Description
Creates a row using specified values and adds it to the System.Data.DataRowCollection.
If a System.Data.DataColumn object has its System.Data.DataColumn.AutoIncrement set to True, System.Object.Empty should be passed to get the default value for that column. The array of values that are used to create the new row.
Clear
[C#] public void Clear( );
[C++] public: void Clear( );
[VB] Public Sub Clear( )
[JScript] public function Clear( );
Description
Clears the collection of all rows.
To add a row to the collection, first use the System.Data.DataTable class's System.Data.DataTable.NewRow method to create the new row. Then add the new row using the System.Data.DataRowCollection.Add (System.Data.DataRow) method of the System.Data.DataRowCollection class.
Contains
[C#] public bool Contains(object key);
[C++] public: bool Contains(Object* key);
[VB] Public Function Contains(ByVal key As Object) As Boolean
[JScript] public function Contains(key: Object): Boolean; Gets a value indicating whether any row in the collection contains a specified value in the primary key or keys column.
Description
Gets a value indicating whether the primary key of any row in the collection contains the specified value.
Return Value: true if the collection contains a System.Data.DataRow with the specified primary key value; otherwise, false.
To use the System.Data.DataRowCollection.Contains (System.Object) method, the System.Data.DataTable object to which the System.Data.DataRowCollection object belongs to must have at least one column designated as a primary key column. See the System.Data.DataTable.PrimaryKey property for details on creating a primary key column. The value of the primary key to test for.
Contains
[C#] public bool Contains(object[ ] keys);
[C++] public: bool Contains(Object* keys_gc[ ]);
[VB] Public Function Contains(ByVal keys( ) As Object) As Boolean is [JScript] public function Contains(keys: Object[ ]):Boolean;
Description
Gets a value indicating if the System.Data.DataRow with the specified primary key values exists.
Return Value: true if the System.Data.DataRowCollection contains a System.Data.DataRow with the specified key values; otherwise, false.
To use the System.Data.DataRowCollection.Contains (System.Object) method with an array of values, the System.Data.DataTable object to which the System.Data.DataRowCollection object belongs must have at an array of columns designated as a primary keys. See the System.Data.DataTable.PrimaryKey property for details on creating an array of primary key columns. The number of array elements must correspond to the number of primary key columns in the System.Data.DataTable. An array of primary key values to test for.
Find
[C#] public DataRow Find(object key);
[C++] public: DataRow* Find(Object* key);
[VB] Public Function Find(ByVal key As Object) As DataRow
[JScript] public function Find(key: Object): DataRow; Gets a specified System.Data.DataRow.
Description
Gets the row specified by the primary key value.
Return Value: A System.Data.DataRow containing the primary key value specified; otherwise a null value if the primary key value does not exist in the System.Data.DataRowCollection.
To use the System.Data.DataRowCollection.Contains (System.Object) method, the System.Data.DataTable object to which the System.Data.DataRowCollection object belongs to must have at least one column designated as a primary key column. See the System.Data.DataTable.PrimaryKey property for details on creating a primary key column. The primary key value of the System.Data.DataRow to find.

Find
[C#] public DataRow Find(object[ ] keys);
[C++] public: DataRow* Find(Object* keys_gc[ ]);
[VB] Public Function Find(ByVal keys( ) As Object) As DataRow
[JScript] public function Find(keys: Object[ ]): DataRow;
Description Gets the row containing the specified primary key values. Return Value: An array of System.Data.DataRow objects containing the primary key values specified; otherwise a null value if the primary key values do not exist in the System.Data.DataRowCollection.

To use the System.Data.DataRowCollection.Find (System.Object) method, the System.Data.DataTable object to which the System.Data.DataRowCollection object belongs to must have at least one column designated as a primary key column. See the System.Data.DataTable.PrimaryKey property for details on creating a System.Data.DataTable.PrimaryKey column, or an array of System.Data.DataColumn objects when the table has more than one primary key. An array of primary key values to find. The type of the array is Object.

InsertAt
[C#] public void InsertAt(DataRow row, int pos);
[C++] public: void InsertAt(DataRow* row, int pos);
[VB] Public Sub InsertAt(ByVal row As DataRow, ByVal pos As Integer)
[JScript] public function InsertAt(row: DataRow, pos: int);
Description Remove
[C#] public void Remove(DataRow row);
[C++] public: void Remove(DataRow* row);
[VB] Public Sub Remove(ByVal row As DataRow)
[JScript] public function Remove(row: DataRow); Removes a specific row from the System.Data.DataRowCollection.
Description Removes the specified System.Data.DataRow from the collection.

When a row is removed, data in that row is lost. You can also call the System.Data.DataRow class's System.Data.DataRow.Delete method to simply mark a row for removal. The row is not actually removed until the System.Data.DataRow.AcceptChanges method is invoked. The System.Data.DataRow to remove.

RemoveAt
[C#] public void RemoveAt(int index);
[C++] public: void RemoveAt(int index);
[VB] Public Sub RemoveAt(ByVal index As Integer)
[JScript] public function RemoveAt(index: int);
Description Removes the row with the specified index from the collection.

When a row is removed, data in that row is lost. You can also call the System.Data.DataRow class's System.Data.DataRow.Delete method to simply mark a row for removal. The row is not actually removed until the System.Data.DataRow.AcceptChanges method is invoked. The index of the row to remove.

DataRowState enumeration (System.Data)
ToString
Description

Gets the state of a System.Data.DataRow object.

The System.Data.DataRowState enumeration is returned by the System.Data.DataRow.RowState property of the System.Data.DataRow class.
ToString
[C#] public const DataRowState Added;
[C++] public: const DataRowState Added;
[VB] Public Const Added As DataRowState
[JScript] public var Added: DataRowState;
Description The row has been added to a System.Data.DataRowCollection, and System.Data.DataRow.AcceptChanges has not been called.
ToString
[C#] public const DataRowState Deleted;
[C++] public: const DataRowState Deleted;
[VB] Public Const Deleted As DataRowState
[JScript] public var Deleted: DataRowState;
Description The row was deleted using the System.Data.DataRow.Delete method of the System.Data.DataRow.
ToString
[C#] public const DataRowState Detached;
[C++] public: const DataRowState Detached;
[VB] Public Const Detached As DataRowState
[JScript] public var Detached: DataRowState;
Description The row has been created but is not part of any System.Data.DataRowCollection. A System.Data.DataRow is in this state immediately after it has been created and before it is added to a collection, or if it has been removed from a collection.
ToString
[C#] public const DataRowState Modified;
[C++] public: const DataRowState Modified;
[VB] Public Const Modified As DataRowState
[JScript] public var Modified: DataRowState;
Description The row has been modified and System.Data.DataRow.AcceptChanges has not been called.
ToString
[C#] public const DataRowState Unchanged;
[C++] public: const DataRowState Unchanged;
[VB] Public Const Unchanged As DataRowState
[JScript] public var Unchanged: DataRowState;
Description The row has not changed since System.Data.DataRow.AcceptChanges was last called.

DataRowVersion enumeration (System.Data)
ToString
Description

Describes the version of a System.Data.DataRow.

The System.Data.DataRowVersion values are used when retrieving the value found in a System.Data.DataRow using System.Data.DataRow.Item(System.Int32) or the System.Data.DataRow.GetChildRows(System.String) of the System.Data.DataRow object.
ToString
[C#] public const DataRowVersion Current;
[C++] public: const DataRowVersion Current;
[VB] Public Const Current As DataRowVersion
[JScript] public var Current: DataRowVersion;
Description The row contains current values.
ToString
[C#] public const DataRowVersion Default;
[C++] public: const DataRowVersion Default;
[VB] Public Const Default As DataRowVersion
[JScript] public var Default: DataRowVersion;
Description The row contains its default values.
ToString
[C#] public const DataRowVersion Original;

[C++] public: const DataRowVersion Original;
[VB] Public Const Original As DataRowVersion
[JScript] public var Original: DataRowVersion;
Description
  The row contains its original values.
  ToString
[C#] public const DataRowVersion Proposed;
[C++] public: const DataRowVersion Proposed;
[VB] Public Const Proposed As DataRowVersion
[JScript] public var Proposed: DataRowVersion;
Description
  The row contains a proposed value.
  DataRowView class (System.Data)
  ToString
Description
  Represents a customized view of a System.Data.DataRow exposed as a fully featured Windows Forms control.
  Whenever data is displayed (for example in a System.Windows.Forms.DataGrid control), only one version of each row can be displayed. The displayed row is a System.Data.DataRowView.
  DataView
  ToString
[C#] public DataView DataView {get;}
[C++] public: __property DataView* get_DataView( );
[VB] Public ReadOnly Property DataView As DataView
[JScript] public function get DataView( ): DataView;
Description
  Gets the System.Data.DataView to which this row belongs.
  IsEdit
  ToString
[C#] public bool IsEdit {get;}
[C++] public: __property bool get_IsEdit( );
[VB] Public ReadOnly Property IsEdit As Boolean
[JScript] public function get IsEdit( ): Boolean;
Description
  Indicates whether the row is in edit mode.
  IsNew
  ToString
[C#] public bool IsNew {get;}
[C++] public: __property bool get_IsNew( );
[VB] Public ReadOnly Property IsNew As Boolean
[JScript] public function get IsNew( ): Boolean;
Description
  Indicates whether a System.Data.DataRowView is new.
  Item
  ToString
[C#] public object this[string property] {get; set;}
[C++] public: __property Object* get_Item(String* property);public: __property void set_Item(String* property, Object*);
[VB] Public Default Property Item(ByVal property As String) As Object
[JScript] returnValue=DataRowViewObject.Item(property); DataRowViewObject.Item(property)=returnValue;
Description
  Gets or sets a value in a specified column. String that contains the specified column.
  Item
  ToString
[C#] public object this[int ndx] {get; set;}
[C++] public: __property Object* get_Item(int ndx);public: __property void set_Item(int ndx, Object*);
[VB] Public Default Property Item(ByVal ndx As Integer) As Object
[JScript] returnValue=DataRowViewObject.Item(ndx); DataRowViewObject.Item(ndx)=returnValue; Gets or sets a value in a specified column.

Description
  Gets or sets a value in a specified column. The specified column.
  Row
  ToString
[C#] public DataRow Row {get;}
[C++] public: __property DataRow* get_Row( );
[VB] Public ReadOnly Property Row As DataRow
[Script] public function get Row( ): DataRow;
Description
  Gets the System.Data.DataRow being viewed.
  RowVersion
  ToString
[C#] public DataRowVersion RowVersion {get;}
[C++] public: __property DataRowVersion get_RowVersion( );
[VB] Public ReadOnly Property RowVersion As DataRowVersion
[JScript] public function get RowVersion( ): DataRowVersion;
Description
  Gets the current version description of the System.Data.DataRow.
  For more details, see System.Data.DataRowVersion.
  BeginEdit
[C#] public void BeginEdit( );
[C++] public: __sealed void BeginEdit( );
[VB] NotOverridable Public Sub BeginEdit( )
[JScript] public function BeginEdit( );
Description
  Begins an edit procedure.
  The System.Data.DataRowView.BeginEdit method is identical to the System.Data.DataRow.BeginEdit method of the System.Data.DataRow. After calling System.Data.DataRowView.BeginEdit, any changes made to the System.Data.DataRowView can be rolled back by calling System.Data.DataRow.CancelEdit. Call the System.Data.DataRowView.BeginEdit method before allowing users to change row values. After values have been changed, you retrieve the new values by setting the System.Data.DataRowView.RowVersion to DataRowVersion.Proposed. Check the values with a business rule, and roll back the changes if needed by calling System.Data.DataRowView.CancelEdit, or call System.Data.DataRowView.EndEdit to accept the changes.
  CancelEdit
[C#] public void CancelEdit( );
[C++] public: __sealed void CancelEdit( );
[VB] NotOverridable Public Sub CancelEdit( )
[JScript] public function CancelEdit( );
Description
  Cancels an edit procedure.
  After calling System.Data.DataRowView.CancelEdit, all changes to the row are rolled back. You can also roll back changes by calling System.Data.DataTable.RejectChanges on the parent System.Data.DataTable.
  CreateChildView
[C#] public DataView CreateChildView(DataRelation relation);
[C++] public: DataView* CreateChildView(DataRelation* relation);
[VB] Public Function CreateChildView(ByVal relation As DataRelation) As DataView
[JScript] public function CreateChildView(relation: DataRelation): DataView; Returns a System.Data.DataView for the child System.Data.DataTable.

Description
  Returns a System.Data.DataView for the child System.Data.DataTable with the specified DataRelation. The System.Data.DataRelation object.
    CreateChildView
[C#] public DataView CreateChildView(string relationName);
[C++] public: DataView* CreateChildView(String* relationName);
[VB] Public Function CreateChildView(ByVal relationName As String) As DataView
[JScript] public function CreateChildView(relationName: String): DataView;
Description
  Returns a System.Data.DataView for the child System.Data.DataTable with the specified DataRelation name. A string containing the System.Data.DataRelation name.
    Delete
[C#] public void Delete( );
[C++] public: void Delete( );
[VB] Public Sub Delete( )
[JScript] public function Delete( );
Description
  Deletes a row.
  The row is not permanently deleted until System.Data.DataTable.AcceptChanges is invoked on the System.Data.DataTable that row belongs to.
    EndEdit
[C#] public void EndEdit( );
[C++] public: _sealed void EndEdit( );
[VB] NotOverridable Public Sub EndEdit( )
[JScript] public function EndEdit( );
Description
  Ends an edit procedure.
    Equals
[C#] public override bool Equals(object other);
[C++] public: bool Equals(Object* other);
[VB] Overrides Public Function Equals(ByVal other As Object) As Boolean
[JScript] public override function Equals(other: Object): Boolean;
Description
  Gets a value indicating whether the current System.Data.DataRowView is identical to the specified object.
  Return Value: true, if object is a System.Data.DataRowView and it returns the same row as the current System.Data.DataRowView; otherwise, false. An System.Object to be compared.
    GetHashCode
[C#] public override int GetHashCode( );
[C++] public: int GetHashCode( );
[VB] Overrides Public Function GetHashCode( ) As Integer
[JScript] public override function GetHashCode( ): int;
Description
  Returns the hash code of the System.Data.DataRow object.
  Return Value: A 32-bit signed integer hash code, one, which represents Boolean true if the value of this instance is nonzero; otherwise, the integer, zero, which represents Boolean false.
    ICustomTypeDescriptor.GetAttributes
[C#] AttributeCollection ICustomTypeDescriptor.GetAttributes( );
[C++] AttributeCollection* ICustomTypeDescriptor::GetAttributes( );
[VB] Function GetAttributes( ) As AttributeCollection Implements ICustomTypeDescriptor.GetAttributes
[JScript] function ICustomTypeDescriptor.GetAttributes( ): AttributeCollection;
  ICustomTypeDescriptor.GetClassName
[C#] string ICustomTypeDescriptor.GetClassName( );
[C++] String* ICustomTypeDescriptor::GetClassName( );
[VB] Function GetClassName( ) As String Implements ICustomTypeDescriptor.GetClassName
[JScript] function ICustomTypeDescriptor.GetClassName( ): String;
  ICustomTypeDescriptor.GetComponentName
[C#] string ICustomTypeDescriptor.GetComponentName( );
[C++] String* ICustomTypeDescriptor::GetComponentName( );
[VB] Function GetComponentName( ) As String Implements ICustomTypeDescriptor.GetComponentName
[JScript] function ICustomTypeDescriptor.GetComponentName( ): String;
  ICustomTypeDescriptor.GetConverter
[C#] TypeConverter ICustomTypeDescriptor.GetConverter( );
[C++] TypeConverter* ICustomTypeDescriptor::GetConverter( );
[VB] Function GetConverter( ) As TypeConverter Implements ICustomTypeDescriptor.GetConverter
[JScript] function ICustomTypeDescriptor.GetConverter( ): TypeConverter;
  ICustomTypeDescriptor.GetDefaultEvent
[C#] EventDescriptor ICustomTypeDescriptor.GetDefaultEvent( );
[C++] EventDescriptor* ICustomTypeDescriptor::GetDefaultEvent( );
[VB] Function GetDefaultEvent( ) As EventDescriptor Implements ICustomTypeDescriptor.GetDefaultEvent
[JScript] function ICustomTypeDescriptor.GetDefaultEvent( ): EventDescriptor;
  ICustomTypeDescriptor.GetDefaultProperty
[C#] PropertyDescriptor ICustomTypeDescriptor.GetDefaultProperty( );
[C++] PropertyDescriptor* ICustomTypeDescriptor::GetDefaultProperty( );
[VB] Function GetDefaultProperty( ) As PropertyDescriptor Implements ICustomTypeDescriptor.GetDefaultProperty
[JScript] function ICustomTypeDescriptor.GetDefaultProperty( ): PropertyDescriptor;
  ICustomTypeDescriptor.GetEditor
[C#] object ICustomTypeDescriptor.GetEditor(Type editorBaseType);
[C++] Object* ICustomTypeDescriptor::GetEditor(Type* editorBaseType);
[VB] Function GetEditor(ByVal editorBaseType As Type) As Object Implements ICustomTypeDescriptor.GetEditor
[JScript] function ICustomTypeDescriptor.GetEditor(editorBaseType: Type): Object;
  ICustomTypeDescriptor.GetEvents
[C#] EventDescriptorCollection ICustomTypeDescriptor.GetEvents( );
[C++] EventDescriptorCollection* ICustomTypeDescriptor::GetEvents( );
[VB] Function GetEvents( )As EventDescriptorCollection Implements ICustomTypeDescriptor.GetEvents
[JScript] function ICustomTypeDescriptor.GetEvents( ): EventDescriptorCollection;
  ICustomTypeDescriptor.GetEvents
[C#] EventDescriptorCollection ICustomTypeDescriptor.GetEvents(Attribute[ ]attributes);
[C++] EventDescriptorCollection* ICustomTypeDescriptor::GetEvents(Attribute* attributes[ ]);

[VB] Function GetEvents(ByVal attributes( ) As Attribute) As EventDescriptorCollection Implements ICustomTypeDescriptor.GetEvents
[JScript] function ICustomTypeDescriptor.GetEvents (attributes:Attribute[ ]): EventDescriptorCollection;
ICustomTypeDescriptor.GetProperties
[C#] PropertyDescriptorCollection ICustomTypeDescriptor.GetProperties( );
[C++] PropertyDescriptorCollection* ICustomTypeDescriptor::GetProperties( );
[VB] Function GetProperties( ) As PropertyDescriptorCollection Implements ICustomTypeDescriptor.GetProperties
[JScript] function ICustomTypeDescriptor.GetProperties( ): PropertyDescriptorCollection;
ICustomTypeDescriptor.GetProperties
[C#] PropertyDescriptorCollection ICustomTypeDescriptor.GetProperties(Attribute[ ] attributes);
[C++] PropertyDescriptorCollection* ICustomTypeDescriptor::GetProperties(Attribute* attributes [ ]);
[VB] Function GetProperties(ByVal attributes( ) As Attribute) As PropertyDescriptorCollection Implements ICustomTypeDescriptor.GetProperties
[JScript] function ICustomTypeDescriptor.GetProperties (attributes: Attribute[ ]): PropertyDescriptorCollection;
ICustomTypeDescriptor.GetPropertyOwner
[C#] object ICustomTypeDescriptor.GetPropertyOwner (PropertyDescriptor pd);
[C++] Object* ICustomTypeDescriptor::GetPropertyOwner (PropertyDescriptor* pd);
[VB] Function GetPropertyOwner(ByVal pd As PropertyDescriptor) As Object Implements ICustomTypeDescriptor.GetPropertyOwner
[JScript] function ICustomTypeDescriptor.GetPropertyOwner(pd: PropertyDescriptor) Object;
DataSet class (System.Data)
ToString
Description
Represents an in-memory cache of data.
The System.Data.DataSet, which is an in-memory cache of data retrieved from a database, is a major component of the ADO.NET architecture. The System.Data.DataSet consists of a collection of System.Data.DataTable objects that you can relate to each other with System.Data.DataRelation objects. You can also enforce data integrity in the System.Data.DataSet by using the System.Data.UniqueConstraint and System.Data.ForeignKeyConstraint objects. For further details about working with System.Data.DataSet objects, see
DataSet
Example Syntax:
ToString
[C#] public DataSet( );
[C++] public: DataSet( );
[VB] Public Sub New( )
[JScript] public function DataSet( ); Initializes a new instance of the System.Data.DataSet class.
Description
Initializes a new instance of the System.Data.DataSet class.
This implementation of the System.Data.DataSet constructor takes no parameters, and creates a default name, "NewDataSet", for the new instance.
DataSet
Example Syntax:
ToString
[C#] public DataSet(string dataSetName);
[C++] public: DataSet(String* dataSetName);
[VB] Public Sub New(ByVal dataSetName As String)
[JScript] public function DataSet(dataSetName: String);
Description
Initializes a new instance of a System.Data.DataSet class with the given name.
A name for the System.Data.DataSet is required to ensure that the XML representation of the System.Data.DataSet always has a name for the document element, which is the highest level element in a schema definition. The name of the System.Data.DataSet.
DataSet
Example Syntax:
ToString
[C#] protected DataSet(SerializationInfo info, StreamingContext context);
[C++] protected: DataSet(SerializationInfo* info, StreamingContext context);
[VB] Protected Sub New(ByVal info As SerializationInfo, ByVal context As StreamingContext)
[JScript] protected function DataSet(info: SerializationInfo, context: StreamingContext);
Description
Initializes a new instance of the System.Data.DataSet class with the System.Runtime.Serialization.SerializationInfo and the System.Runtime.Serialization.StreamingContext.
This implemenation of the System.Data.DataSet constructor is required for System.Runtime.Serialization.ISerializable. The data needed to serialize or deserialize an object. The source and destination of a given serialized stream.
CaseSensitive
ToString
[C#] public bool CaseSensitive {get; set;}
[C++] public: __property bool get_CaseSensitive( );public: __property void set_CaseSensitive(bool);
[VB] Public Property CaseSensitive As Boolean
[JScript] public function get CaseSensitive( ): Boolean;public function set CaseSensitive(Boolean);
Description
Gets or sets a value indicating whether string comparisons within System.Data.DataTable objects are case-sensitive.
The System.Data.DataSet.CaseSensitive property affects how sorting, searching, and filtering operations are performed on each System.Data.DataTable contained in a System.Data.DataSet when using the System.Data.DataTable.Select method.
Container
DataSetName
ToString
Description
Gets or sets the name of the current System.Data.DataSet.
DefaultViewManager
ToString
[C#] public DataViewManager DefaultViewManager {get;}
[C++] public: __property DataViewManager* get_DefaultViewManager( );
[VB] Public ReadOnly Property DefaultViewManager As DataViewManager
[JScript] public function get DefaultViewManager( ): DataViewManager;
Description
Gets a custom view of the data contained by the System.Data.DataSet that allows filtering, searching, and navigating using a custom System.Data.DataViewManager.

The System.Data.DataViewManager returned by the System.Data.DataSet.DefaultViewManager property allows you to create custom settings for each System.Data.DataTable in the System.Data.DataSet. When you add System.Data.DataTable objects to the System.Data.DataTableCollection, each table is automatically configured to display rows according to the specified property settings of the System.Data.DataView, including sort order, filtering, and System.Data.DataViewRowState.

DesignMode
EnforceConstraints
ToString
Description
Gets or sets a value indicating whether constraint rules are followed when attempting any update operation.
See the System.Data.DataTable.Constraints property for more details.

Events
ExtendedProperties
ToString
Description
Gets the collection of custom user information.
The System.Data.DataSet.ExtendedProperties property allows you to store custom information with the object. For example, you may store a time when the data should be refreshed.

HasErrors
ToString
[C#] public bool HasErrors {get;}
[C++] public: __property bool get_HasErrors( );
[VB] Public ReadOnly Property HasErrors As Boolean
[JScript] public function get HasErrors( ): Boolean;
Description
Gets a value indicating whether there are errors in any of the rows in any of the tables of this System.Data.DataSet.
The System.Data.DataSet.HasErrors property is usually consulted after creating using the System.Data.DataSet.GetChanges method. Check the System.Data.DataSet.HasErrors property of the System.Data.DataSet created with the System.Data.DataSet.GetChanges method to determine if any errors exists. If so, you should reconcile the errors before proceeding to update the data source with the changes.

Locale
ToString
[C#] public CultureInfo Locale {get; set;}
[C++] public: __property CultureInfo* get_Locale( ); public: __property void set_Locale(CultureInfo*);
[VB] Public Property Locale As CultureInfo
[JScript] public function get Locale( ): CultureInfo;public function set Locale(CultureInfo);
Description
Gets or sets the locale information used to compare strings within the table.
The System.Data.DataSet.Locale property specifies the locale for which sorting will apply.

Namespace
ToString
[C#] public string Namespace {get; set;}
[C++] public: __property String* get_Namespace( );public: __property void set_Namespace(String*);
[VB] Public Property Namespace As String
[JScript] public function get Namespace( ): String;public function set Namespace(String);
Description
Gets or sets the namespace of the System.Data.DataSet
The System.Data.DataSet.Namespace property is used when reading and writing an XML document into the System.Data.DataSet using the System.Data.DataSet.ReadXml(System.Xml.XmlReader), System.Data.DataSet.WriteXml(System.IO.Stream), System.Data.DataSet.ReadXmlSchema (System.Xml.XmlReader), or System.Data.DataSet.WriteXmlSchema(System.IO.Stream) methods.

Prefix
ToString
[C#] public string Prefix {get; set;}
[C++] public: __property String* get_Prefix( );public: __property void set_Prefix(String*);
[VB] Public Property Prefix As String
[JScript] public function get Prefix( ): String;public function set Prefix(String);
Description
Gets or sets an XML prefix that aliases the namespace of the System.Data.DataSet.
The System.Data.DataSet.Prefix is used throughout an XML document to identify elements which belong to the System.Data.DataSet object's namespace (as set by the System.Data.DataSet.Namespace property).

Relations
ToString
[C#] public DataRelationCollection Relations {get;}
[C++] public: __property DataRelationCollection* get_Relations( );
[VB] Public ReadOnly Property Relations As DataRelationCollection
[JScript] public function get Relations( ): DataRelationCollection;
Description
Get the collection of relations that link tables and allow navigation from parent tables to child tables.

Site
ToString
[C#] public override ISite Site {get; set;}
[C++] public: __property virtual ISite* get_Site( );public: __property virtual void set_Site(ISite*);
[VB] Overrides Public Property Site As ISite
[JScript] public function get Site( ): ISite;public function set Site(ISite);
Description
Gets or sets an System.ComponentModel.ISite for the System.Data.DataSet.
Sites bind a System.ComponentModel.Component to a System.ComponentModel.Container and enable communication between them, as well as provide a way for the container to manage its components.

Tables
ToString
[C#] public DataTableCollection Tables {get;}
[C++] public: __property DataTableCollection* get_Tables( );
[VB] Public ReadOnly Property Tables As DataTableCollection
[JScript] public function get Tables( ): DataTableCollection;
Description
Gets the collection of tables contained in the System.Data.DataSet
To add tables to the collection, use System.Data.DataTableCollection.Add (System.Data.DataTable) method of the System.Data.DataTableCollection. To remove tables, use the System.Data.DataTableCollection.Remove (System.Data.DataTable) method.

ToString
Description

Occurs when a target and source System.Data.DataRow have the same primary key value, and System.Data.DataSet.EnforceConstraints is set to true.

For more information about handling events, see.

AcceptChanges
[C#] public void AcceptChanges( );
[C++] public: void Acceptchanges( );
[VB] Public Sub AcceptChanges( )
[JScript] public function AcceptChanges( );
Description Commits all the changes made to this System.Data.DataSet since it was loaded or the last time System.Data.DataSet.AcceptChanges was called.

Both the System.Data.DataRow and System.Data.DataTable classes also have System.Data.DataSet.AcceptChanges methods. Invoking System.Data.DataSet.AcceptChanges on the System.Data.DataSet causes System.Data.DataTable.AcceptChanges to be called on each table in a System.Data.DataSet. Consequently, calling System.Data.DataTable.AcceptChanges on each System.Data.DataTable causes each System.Data.DataRow object's System.Data.DataRow.AcceptChanges method to be called. In this manner, you have multiple levels at which the method can be invoked. Calling the System.Data.DataSet.AcceptChanges of the System.Data.DataSet however, allows you to invoke the method on all subordinate objects (for example, tables and rows) with one call.

BeginInit
[C#] public void BeginInit( );
[C++] public: _sealed void BeginInit( );
[VB] NotOverridable Public Sub BeginInit( )
[JScript] public function Beginnit( );
Description Begins the initialization of a System.Data.DataSet that is used on a form or used by another component. The initialization occurs at runtime.

The Visual Studio.NET design environment uses this method to start the initialization of a component that is used on a form or used by another component. The System.Data.DataSet.EndInit method ends the initialization. Using the BeginInit and EndInit methods prevents the control from being used before it is fully initialized.

Clear
[C#] public void Clear( );
[C++] public: void Clear( );
[VB] Public Sub Clear( )
[JScript] public function Clear( );
Description Clears the System.Data.DataSet of any data by removing all rows in all tables.

Clone
[C#] public DataSet Clone( );
[C++] public: DataSet* Clone( );
[VB] Public Function Clone( ) As DataSet
[JScript] public function Clone( ): DataSet;
Description Clones the structure of the System.Data.DataSet, including all System.Data.DataTable schemas, relations, and constraints.

Return Value: A new System.Data.DataSet with the same schema as the current System.Data.DataSet.

If these classes have been subclassed, the clone will also be of the same subclasses.

Copy
[C#] public DataSet Copy( );
[C++] public: DataSet* Copy( );
[VB] Public Function Copy( ) As DataSet
[JScript] public function Copy( ): DataSet;
Description Copies both the structure and data for this System.Data.DataSet.

Return Value: A new System.Data.DataSet with the same structure Stable schemas, relations, and constraints) and data as this System.Data.DataSet.

EndInit
[C#] public void EndInit( );
[C++] public: _sealed void EndInit( );
[VB] NotOverridable Public Sub EndInit( )
[JScript] public function EndInit( );
Description Ends the initialization of a System.Data.DataSet that is used on a form or used by another component. The initialization occurs at runtime.

The Visual Studio.NET design environment uses this method to end the initialization of a component that is used on a form or used by another component. The System.Data.DataSet.BeginInit method starts the initialization. Using the BeginInit and EndInit methods prevents the control from being used before it is fully initialized.

GetChanges
[C#] public DataSet GetChanges( );
[C++] public: DataSet* GetChanges( );
[VB] Public Function GetChanges( ) As DataSet
[JScript] public function GetChanges( ): DataSet; Gets a copy of the System.Data.DataSet containing all changes made to it since it was last loaded, or since System.Data.DataSet.AcceptChanges was called.
Description Gets a copy of the System.Data.DataSet that contains all changes made to it since it was loaded or System.Data.DataSet.AcceptChanges was last called.

Return Value: A copy of the changes from this System.Data.DataSet that can have actions performed on it and subsequently be merged back in using System.Data.DataSet.Merge(System.Data.DataSet), or null if none are found.

Gets a copy of the System.Data.DataSet that contains all changes made to it since it was loaded or System.Data.DataSet.AcceptChanges was last called. This copy is particularly designed so that it can be merged back in to this original System.Data.DataSet. Relationship constraints may cause Unchanged parent rows to be included. If no rows of these rowStates are found, this method returns null.

GetChanges
[C#] public DataSet GetChanges(DataRowState rowstates);
at [C++] public: DataSet* GetChanges(DataRowState rowStates);
[VB] Public Function GetChanges(ByVal rowStates As DataRowState) As DataSet
[JScript] public function GetChanges(rowStates: DataRowState): DataSet;
Description Gets a copy of the System.Data.DataSet containing all changes made to it since it was last loaded, or since System.Data.DataSet.AcceptChanges was called, filtered by System.Data.DataRowState.

Return Value: A filtered copy of the System.Data.DataSet that can have actions performed on it, and subsequently be merged back in using System.Data.DataSet.Merge (System.Data.DataSet). If no rows of the desired System.Data.DataRowState are found, the method returns null.

The System.Data.DataSet.GetChanges method is used to produce a second System.Data.DataSet object which contains only the changes introduced into the original. Use the rowStates argument to specify the type of changes the new object should include. One of the System.Data.DataRowState values.

GetNestedChanges

[C#] public DataSet GetNestedChanges(DataRowState rowStates);
[C++] public: DataSet* GetNestedChanges(DataRow State rowStates);
[VB] Public Function GetNestedChanges(ByVal rowStates As DataRowState) As DataSet
[JScript] public function GetNestedChanges(rowStates: DataRowState): DataSet;
Description GetSchemaSerializable

[C#] protected virtual XmlSchema GetSchemaSerializable( );
[C++] protected: virtual XmlSchema* GetSchemaSerializable( );
[VB] Overridable Protected Function GetSchemaSerializable( ) As XmlSchema
[JScript] protected function GetSchemaSerializable( ): XmlSchema;
Description Retrieves an System.Xml.XmlTextReader for the implementation of IXmlSerializable.
Return Value: An System.Xml.XmlTextReader.
A user should not call System.Data.DataSet.GetSchemaSerializable directly.

GetSerializationData

[C#] protected void GetSerializationData(SerializationInfo info, StreamingContext context);
[C++] protected: void GetSerializationData (SerializationInfo* info, StreamingContext context);
[VB] Protected Sub GetSerializationData(ByVal info As SerializationInfo, ByVal context As StreamingContext)
[JScript] protected function GetSerializationData(info: SerializationInfo, context: StreamingContext);
Description Retrieves System.Runtime.Serialization.SerializationInfo and System.Runtime.Serialization.StreamingContext information for the implementation of IXmlSerializable.
Return Value: System.Runtime.Serialization.SerializationInfo and System.Runtime.Serialization.StreamingContext information.
A user should not call System.Data.DataSet.GetSerializationData (System.Runtime.Serialization.SerializationInfo, System.Runtime.Serialization.StreamingContext) directly. The data needed to serialize or deserialize an object. The source and destination of a given serialized stream.

GetXml

[C#] public string GetXml( );
[C++] public: String* GetXml( );
[VB] Public Function GetXml( ) As String
[JScript] public function GetXml( ): String;
Description Returns the XML representation of the data stored in the System.Data.DataSet.
Return Value: String that is a representation of the data stored in the System.Data.DataSet.
If the System.Data.DataSet has changes, calling this method is identical to calling System.Data.DataSet.WriteXml(System.IO.Stream) with XmlWriteMode set to DiffGram; otherwise it is equivalent to calling System.Data.DataSet.WriteXml (System.IO.Stream) with XmlWriteMode set to IgnoreSchema.

GetXmlSchema

[C#] public string GetXmlSchema( );
[C++] public: String* GetXmlSchema( );
[VB] Public Function GetXmlSchema( ) As String
[JScript] public function GetXmlSchema( ): String;
Description Returns the XSD schema for the XML representation of the data stored in the System.Data.DataSet.
Return Value: String that is the XSD schema for the XML representation of the data stored in the System.Data.DataSet.
Calling this method is identical to calling System.Data.DataSet.WriteXmlSchema (System.IO.Stream), except that only the primary schema is written.

HasChanges

[C#] public bool HasChanges( );
[C++] public: bool HasChanges( );
[VB] Public Function HasChanges( ) As Boolean
[JScript] public function HasChanges( ): Boolean; Gets a value indicating whether the System.Data.DataSet has changes, including new, deleted, or modified rows.
Description Gets a value indicating whether the System.Data.DataSet has changes, including new, deleted, or modified rows.
Return Value: true, if the System.Data.DataSet has changes; otherwise, false.

HasChanges

[C#] public bool HasChanges(DataRowState rowStates);
[C++] public: bool HasChanges(DataRowState rowStates);
[VB] Public Function HasChanges(ByVal rowStates As DataRowState) As Boolean
[JScript] public function HasChanges(rowStates: DataRowState): Boolean;
Description Gets a value indicating whether the System.Data.DataSet has changes, including new, deleted, or modified rows, filtered by System.Data.DataRowState.
Return Value: true, if the System.Data.DataSet has changes; otherwise, false.
Examine the System.Data.DataSet.HasChanges property before invoking System.Data.DataSet.GetChanges method. One of the System.Data.DataRowState values.

InferXmlSchema

[C#] public void InferXmlSchema(Stream stream, string[ ] nsArray);
[C++] public: void InferXmlSchema(Stream* stream, String* nsArra __gc[ ]);
[VB] Public Sub InferXmlSchema(ByVal stream As Stream, ByVal nsArray( ) As String)
[JScript] public function InferXmlSchema(stream: Stream, nsArray: String[ ]);
Description Infers the XML schema from the specified System.IO.TextReader into the System.Data.DataSet. The System.IO.Stream from which to read. An array of namespace URI strings to be excluded from schema inference.

InferXmlSchema

[C#] public void InferXmlSchema(string fileName, string[ ] nsArray);
[C++] public: void InferXmlSchema(String* fileName, String* nsArray__gc[ ]);
[VB] Public Sub InferXmlSchema(ByVal fileName As String, ByVal nsArray( ) As String)
[JScript] public function InferXmlSchema(fileName: String, nsArray: String[ ]);
Description Infers the XML schema from the specified file into the System.Data.DataSet. The file name (including the path)

from which to read. An array of namespace URI strings to be excluded from schema inference.

InferXmlSchema

[C#] public void InferXmlSchema(TextReader reader, string[ ] nsArray);
[C++] public: void InferXmlSchema(TextReader* reader, String* nsArray_gc[ ]);
[VB] Public Sub InferXmlSchema(ByVal reader As TextReader, ByVal nsArray( ) As String)
[JScript] public function InferXmlSchema(reader: TextReader, nsArray: String[ ]);

Description

Infers the XML schema from the specified System.IO.TextReader into the System.Data.DataSet. The System.IO.TextReader from which to read. An array of namespace URI strings to be excluded from schema inference.

InferXmlSchema

[C#] public void InferXmlSchema(XmlReader reader, string[ ] nsArray);
[C++] public: void InferXmlSchema(XmlReader* reader, String* nsArray_gc[ ]);
[VB] Public Sub InferXmlSchema(ByVal reader As XmlReader, ByVal nsArray( ) As String)
[JScript] public function InferXmlSchema(reader: XmlReader, nsArray: String[ ]); Infers the XML schema from the specified System.IO.TextReader or file into the System.Data.DataSet.

Description

Infer the XML schema from the specified System.IO.TextReader into the System.Data.DataSet. The System.IO.TextReader from which to read. An array of namespace URI strings to be excluded from schema inference.

Merge

[C#] public void Merge(DataRow[ ] rows);
[C++] public: void Merge(DataRow* rows[ ]);
[VB] Public Sub Merge(ByVal rows( ) As DataRow)
[JScript] public function Merge(rows: DataRow[ ]);

Description

Merges this System.Data.DataSet with an array of System.Data.DataRow objects.

The System.Data.DataSet.Merge(System.Data.DataSet) method is used to merge two System.Data.DataSet objects that have largely similar schemas. A merge is typically used on a client application to incorporate the latest changes from a data source into an existing System.Data.DataSet. This allows the client application to have a refreshed System.Data.DataSet with the latest data from the data source. The array of System.Data.DataRow objects that will be merged into the System.Data.DataSet.

Merge

[C#] public void Merge(DataSet dataSet);
[C++] public: void Merge(DataSet* dataSet);
[VB] Public Sub Merge(ByVal dataSet As DataSet)
[JScript] public function Merge(dataSet: DataSet); Merges this System.Data.DataSet with a specified System.Data.DataSet.

Description

Merges this System.Data.DataSet into a specified System.Data.DataSet.

The System.Data.DataSet.Merge(System.Data.DataSet) method is used to merge two System.Data.DataSet objects that have largely similar schemas. A merge is typically used on a client application to incorporate the latest changes from a data source into an existing System.Data.DataSet. This allows the client application to have a refreshed System.Data.DataSet with the latest data from the data source. The System.Data.DataSet whose data and schema will be merged.

Merge

[C#] public void Merge(DataTable table);
[C++] public: void Merge(DataTable* table);
[VB] Public Sub Merge(ByVal table As DataTable)
[JScript] public function Merge(table: DataTable);

Description

Merges a System.Data.DataSet with a specified System.Data.DataTable.

The System.Data.DataSet.Merge(System.Data.DataSet) method is used to merge two System.Data.DataSet objects that have largely similar schemas. A merge is typically used on a client application to incorporate the latest changes from a data source into an existing System.Data.DataSet. This allows the client application to have a refreshed System.Data.DataSet with the latest data from the data source. The System.Data.DataTable whose data and schema will be merged.

Merge

[C#] public void Merge(DataSet dataSet, bool preserveChanges);
[C++] public: void Merge(DataSet* dataSet, bool preserveChanges);
[VB] Public Sub Merge(ByVal dataSet As DataSet, ByVal preserveChanges As Boolean)
[JScript] public function Merge(dataSet: DataSet, preserveChanges: Boolean);

Description

Merges this System.Data.DataSet with a specified System.Data.DataSet preserving changes according to the specified argument.

The System.Data.DataSet.Merge(System.Data.DataSet) method is used to merge two System.Data.DataSet objects that have largely similar schemas. A merge is typically used on a client application to incorporate the latest changes from a data source into an existing System.Data.DataSet. This allows the client application to have a refreshed System.Data.DataSet with the latest data from the data source. The System.Data.DataSet whose data and schema will be merged. A value indicating whether changes made to the current System.Data.DataSet should be maintained.

Merge

[C#] public void Merge(DataRow[ ] rows, bool preserveChanges, MissingSchemaAction missingSchemaAction);
[C++] public: void Merge(DataRow* rows[ ], bool preserveChanges, MissingSchemaAction missingSchemaAction);
[VB] Public Sub Merge(ByVal rows( ) As DataRow, ByVal preserveChanges As Boolean, ByVal missingSchemaAction As MissingSchemaAction)
[JScript] public function Merge(rows: DataRow[ ], preserveChanges: Boolean, missingSchemaAction: MissingSchemaAction);

Description

Merges this System.Data.DataSet with an array of System.Data.DataRow objects, preserving changes according to the specified argument, and handling an incompatible schema according to the specified argument.

The System.Data.DataSet.Merge(System.Data.DataSet) method is used to merge two System.Data.DataSet objects that have largely similar schemas. A merge is typically used on a client application to incorporate the latest changes from a data source into an existing System.Data.DataSet. This allows the client application to have a refreshed System.Data.DataSet with the latest data from the data source. The array of System.Data.DataRow objects to merge with. true to preserve changes made to the System.Data.DataSet;

otherwise, false. One of the System.Data.MissingSchemaAction values.

Merge

[C#] public void Merge(DataSet dataSet, bool preserveChanges, MissingSchemaAction missingSchemaAction);
[C++] public: void Merge(DataSet* dataSet, bool preserveChanges, MissingSchemaAction missingSchemaAction);
[VB] Public Sub Merge(ByVal dataSet As DataSet, ByVal preserveChanges As Boolean, ByVal missingSchemaAction As MissingSchemaAction)
[JScript] public function Merge(dataSet: DataSet, preserveChanges: Boolean, missingSchemaAction: MissingSchemaAction);

Description

Merges this System.Data.DataSet with a specified System.Data.DataSet preserving changes according to the specified argument, and handling an incompatible schema according to the specified argument.

The System.Data.DataSet.Merge(System.Data.DataSet) method is used to merge two System.Data.DataSet objects that have largely similar schemas. A merge is typically used on a client application to incorporate the latest changes from a data source into an existing System.Data.DataSet. This allows the client application to have a refreshed System.Data.DataSet with the latest data from the data source. The System.Data.DataSet whose data and schema will be merged. A value indicating whether changes in the current (target) System.Data.DataSet should be maintained. One of the System.Data.MissingSchemaAction values.

Merge

[C#] public void Merge(DataTable table, bool preserveChanges, MissingSchemaAction missingSchemaAction);
[C++] public: void Merge(DataTable* table, bool preserveChanges, MissingSchemaAction missingSchemaAction);
[VB] Public Sub Merge(ByVal table As DataTable, ByVal preserveChanges As Boolean, ByVal missingSchemaAction As MissingSchemaAction)
[JScript] public function Merge(table: DataTable, preserveChanges: Boolean, missingSchemaAction: MissingSchemaAction);

Description

Merges this System.Data.DataTable with a specified System.Data.DataTable preserving changes according to the specified argument, and handling an incompatible schema according to the specified argument.

The System.Data.DataSet.Merge(System.Data.DataSet) method is used to merge two System.Data.DataSet objects that have largely similar schemas. A merge is typically used on a client application to incorporate the latest changes from a data source into an existing System.Data.DataSet. This allows the client application to have a refreshed System.Data.DataSet with the latest data from the data source. The System.Data.DataSet whose data and schema will be merged. Whether changes in the current (target) System.Data.DataSet should be maintained. One of the System.Data.MissingSchemaAction values.

OnPropertyChanging

[C#] protected internal virtual void OnPropertyChanging(PropertyChangedEventArgs pcevent);
[C++] protected public: virtual void OnPropertyChanging(PropertyChangedEventArgs* pcevent);
[VB] Overridable Protected Friend Dim Sub OnPropertyChanging(ByVal pcevent As PropertyChangedEventArgs)
[JScript] package function OnPropertyChanging(pcevent: PropertyChangedEventArgs);

Description

Raises the System.Data.DataSet.OnPropertyChanging (System.ComponentModel.PropertyChangedEventArgs) event.

Raising an event invokes the event handler through a delegate. For an overview, see. A System.ComponentModel.PropertyChangedEventArgs that contains the event data.

OnRemoveRelation

[C#] protected virtual void OnRemoveRelation(DataRelation relation);
[C++] protected: virtual void OnRemoveRelation(DataRelation* relation);
[VB] Overridable Protected Sub OnRemoveRelation(ByVal relation As DataRelation)
[JScript] protected function OnRemoveRelation(relation: DataRelation);

Description

This method should be overriden by subclasses to restrict tables being removed. The System.Data.DataRelation being removed.

OnRemoveTable

[C#] protected virtual void OnRemoveTable(DataTable table);
[C++] protected: virtual void OnRemoveTable(DataTable* table);
[VB] Overridable Protected Sub OnRemoveTable(ByVal table As DataTable)
[JScript] protected function OnRemoveTable(table: DataTable);

Description

Occurs when when a System.Data.DataTable is being removed.

This method can be overriden by subclasses to restrict tables from being removed. The System.Data.DataTable being removed.

RaisePropertyChanging

[C#] protected internal void RaisePropertyChanging(string name);
[C++] protected public: void RaisePropertyChanging(String* name);
[VB] Protected Friend Dim Sub RaisePropertyChanging(ByVal name As String)
[JScript] package function RaisePropertyChanging(name: String);

Description

Sends notification that the specified System.Data.DataSet property is about to change. The name of the property that is about to change.

ReadXml

[C#] public XmlReadMode ReadXml(Stream stream);
[C++] public: XmlReadMode ReadXml(Stream* stream);
[VB] Public Function ReadXml(ByVal stream As Stream) As XmlReadMode
[JScript] public function ReadXml(stream: Stream): XmlReadMode;

Description

Reads XML schema and data into the System.Data.DataSet using the specified System.IO.Stream.

Use the System.Data.DataSet.ReadXml (System.Xml.XmlReader) method to read an XML document that includes both schema and data. An object that derives from System.IO.Stream.

ReadXml

[C#] public XmlReadMode ReadXml(string fileName);
[C++] public: XmlReadMode ReadXml(String* fileName);

[VB] Public Function ReadXml(ByVal fileName As String) As XmlReadMode
[JScript] public function ReadXml(fileName: String): XmlReadMode;
Description
Reads XML schema and data into the System.Data.DataSet using the specified file.
Use the System.Data.DataSet.ReadXml (System.Xml.XmlReader) method to read an XML document that includes both schema and data. The file name (including the path) from which to read.
ReadXml
[C#] public XmlReadMode ReadXml(TextReader reader);
[C++] public: XmlReadMode ReadXml(TextReader* reader);
[VB] Public Function ReadXml(ByVal reader As TextReader) As XmlReadMode
[JScript] public function ReadXml(reader: TextReader): XmlReadMode;
Description
Reads XML schema and data into the System.Data.DataSet using the specified System.IO.TextReader.
Use the System.Data.DataSet.ReadXml (System.Xml.XmlReader) method to read an XML document that includes both schema and data. An object that derives from the System.IO.TextReader class.
ReadXml
[C#] public XmlReadMode ReadXml(XmlReader reader);
[C++] public: XmlReadMode ReadXml(XmlReader* reader);
[VB] Public Function ReadXml(ByVal reader As XmlReader) As XmlReadMode
[JScript] public function ReadXml(reader: XmlReader): XmlReadMode; Reads XML schema and data into the System.Data.DataSet.
Description
Reads XML schema and data into the System.Data.DataSet using the specified System.Xml.XmlReader.
Use the System.Data.DataSet.ReadXml (System.Xml.XmlReader) method to read an XML document that includes both schema and data. The System.IO.TextReader from which to read.
ReadXml
[C#] public XmlReadMode ReadXml(Stream stream, XmlReadMode mode);
[C++] public: XmlReadMode ReadXml(Stream* stream, XmlReadMode mode);
[VB] Public Function ReadXml(ByVal stream As Stream, ByVal mode As. XmlReadMode) As XmlReadMode
[JScript] public function ReadXml(stream: Stream, mode: XmlRead,Mode): XmlReadMode;
Description
Reads XML schema and data into the System.Data.DataSet using the specified System.IO.Stream and System.Data.XmlReadMode. The System.IO.Stream from which to read. One of the System.Data.XmlReadMode values.
ReadXml
[C#] public XmlReadMode ReadXml(string fileName, XmlReadMode mode);
[C++] public: XmlReadMode ReadXml(String* fileName, XmlReadMode mode);
[VB] Public Function ReadXml(ByVal fileName As String, ByVal mode As XmlReadMode) As XmlReadMode
[JScript] public function ReadXml(fileName: String, mode: XmlReadMode): XmlReadMode;
Description
Reads XML schema and data into the System.Data.DataSet using the specified file and System.Data.XmlReadMode. The file name (including the path) from which to read. One of the System.Data.XmlReadMode values.
ReadXml
[C#] public XmlReadMode ReadXml(TextReader reader, XmlReadMode mode);
[C++] public: XmlReadMode ReadXml(TextReader* reader, XmlReadMode mode);
[VB] Public Function ReadXml(ByVal reader As TextReader, ByVal mode As XmlReadMode) As XmlReadMode
[JScript] public function ReadXml(reader: TextReader, mode: XmlReadMode) XmlReadMode;
Description
Reads XML schema and data into the System.Data.DataSet using the specified System.IO.TextReader and System.Data.XmlReadMode. The System.IO.TextReader from which to read. One of the System.Data.XmlReadMode values.
ReadXml
[C#] public XmlReadMode ReadXml(XmlReader reader, XmlReadMode mode);
[C++] public: XmlReadMode ReadXml(XmlReader* reader, XmlReadMode mode);
[VB] Public Function ReadXml(ByVal reader As XmlReader, ByVal mode As XmlReadMode) As XmlReadMode
[JScript] public function ReadXml(reader: XmlReader, mode: XmlReadMode): XmlReadMode; Writes the current schema and data for the System.Data.DataSet to an XML document using the specified System.Data.XmlReadMode.
Description
Writes schema and data for the DataSet. The System.IO.TextReader from which to read. One of the System.Data.XmlReadMode values.
ReadXmlSchema
[C#] public void ReadXmlSchema(Stream stream);
[C++] public: void ReadXmlSchema(Stream* stream);
[VB] Public Sub ReadXmlSchema(ByVal stream As Stream)
[JScript] public function ReadXmlSchema(stream: Stream);
Description
Reads the XML schema from the specified System.IO.Stream into the System.Data.DataSet.
Use the System.Data.DataSet.ReadXmlSchema (System.Xml.XmlReader) method to create the schema for a System.Data.DataSet. The schema includes table, relation, and constraint definitions. To write a schema to an XML document, use the System.Data.DataSet.WriteXmlSchema (System.IO.Stream) method. The System.IO.Stream from which to read.
ReadXmlSchema
[C#] public void ReadXmlSchema(string fileName);
[C++] public: void ReadXmlschema(String* fileName);
[VB] Public Sub ReadXmlSchema(ByVal fileName As String)
[JScript] public function ReadXmlSchema(fileName: String);
Description
Reads the XML schema from the specified file into the System.Data.DataSet.
Use the System.Data.DataSet.ReadXmlSchema (System.Xml.XmlReader) method to create the schema for a System.Data.DataSet. The schema includes table, relation, and constraint definitions. To write a schema to an XML document, use the System.Data.DataSet.WriteXmlSchema (System.IO.Stream) method. The file name (including the path) from which to read.

ReadXmlSchema
[C#] public void ReadXmlSchema(TextReader reader);
[C++] public: void ReadXmlSchema(TextReader* reader);
[VB] Public Sub ReadXmlSchema(ByVal reader As TextReader)
[JScript] public function ReadXmlSchema(reader: TextReader);
Description
Reads the XML schema from the specified System.IO.TextReader into the System.Data.DataSet.
Use the System.Data.DataSet.ReadXmlSchema (System.Xml.XmlReader) method to create the schema for a System.Data.DataSet. The schema includes table, relation, and constraint definitions. To write a schema to an XML document, use the System.Data.DataSet.WriteXmlSchema (System.IO.Stream) method. The System.IO.TextReader from which to read.
ReadXmlSchema
[C#] public void ReadXmlSchema(XmlReader reader);
[C++] public: void ReadXmlSchema(XmlReader* reader);
[VB] Public Sub ReadXmlSchema(ByVal reader As XmlReader)
[JScript] public function ReadXmlSchema(reader: XmlReader); Reads an XML schema into the System.Data.DataSet.
Description
Reads the XML schema from the specified System.Xml.XmlReader into the System.Data.DataSet.
Use the System.Data.DataSet.ReadXmlSchema (System.Xml.XmlReader) method to create the schema for a System.Data.DataSet. The schema includes table, relation, and constraint definitions. The System.Xml.XmlReader from which to read.
ReadXmlSerializable
[C#] protected virtual void ReadXmlSerializable (XmlReader reader);
[C++] protected: virtual void ReadXmlSerializable (XmlReader* reader);
[VB] Overridable Protected Sub ReadXmlSerializable (ByVal reader As XmlReader)
[JScript] protected function ReadXmlSerializable(reader: XmlReader);
Description
Reads XML serialization information for the implementation of IXmlSerializable.
Return Value: An System.Xml.XmlTextReader object.
A user should not call System.Data.DataSet.ReadXmlSerializable (System.Xml.XmlReader) directly. The System.Xml.XmlTextReader object.
RejectChanges
[C#] public virtual void RejectChanges( );
[C++] public: virtual void RejectChanges( );
[VB] Overridable Public Sub RejectChanges( )
[JScript] public function RejectChanges( );
Description
Rolls back all the changes made to the System.Data.DataSet since it was created, or since the last time System.Data.DataSet.AcceptChanges was called.
Invoke the System.Data.DataSet.RejectChanges to call the System.Data.DataTable.RejectChanges method on all System.Data.DataTable objects contained by the System.Data.DataSet. Additionally, any System.Data.Constraint rules contained by the System.Data.DataSet are enforced.
Reset
[C#] public virtual void Reset( );
[C++] public: virtual void Reset( );
[VB] Overridable Public Sub Reset( )
[JScript] public function Reset( );
Description
Resets the System.Data.DataSet to its original state. Subclasses should override System.Data.DataSet.Reset to restore a System.Data.DataSet to its original state.
ShouldSerializeRelations
[C#] protected virtual bool ShouldSerializeRelations( );
[C++] protected: virtual bool ShouldSerializeRelations( );
[VB] Overridable Protected Function ShouldSerializeRelations( ) As Boolean
[JScript] protected function ShouldSerializeRelations( ): Boolean;
Description
Gets a value indicating whether System.Data.DataSet.Relations property should be persisted.
Return Value: true if the property value has been changed from its default; otherwise, false.
You typically use this method if you are either creating a designer for the System.Data.DataSet, or creating your own control incorporating the System.Data.DataSet.
ShouldSerializeTables
[C#] protected virtual bool ShouldSerializeTables( );
[C++] protected: virtual bool ShouldSerializeTables( );
[VB] Overridable Protected Function ShouldSerializeTables( ) As Boolean
[JScript] protected function ShouldSerializeTables( ): Boolean;
Description
Gets a value indicating whether System.Data.DataSet.Tables property should be persisted.
Return Value: true if the property value has been changed from its default; otherwise, false.
You typically use this method only if you are either creating a designer for the System.Data.DataSet, or creating your own control incorporating the System.Data.DataSet.
IListSource.GetList
[C#] IList IListSource.GetList( );
[C++] IList* IListSource::GetList( );
[VB] Function GetList( ) As IList Implements IListSource.GetList
[JScript] function IListSource.GetList( ): IList;
ISerializable.GetObjectData
[C#] void ISerializable.GetObjectData(SerializationInfo info, StreamingContext context);
[C++] void ISerializable::GetObjectData(SerializationInfo* info, StreamingContext context);
[VB] Sub GetObjectData(ByVal info As SerializationInfo, ByVal context As StreamingContext) Implements ISerializable.GetObjectData
[JScript] function ISerializable.GetObjectData(info: SerializationInfo, context: StreamingContext);
IXmlSerializable.GetSchema
[C#] XmlSchema IXmlSerializable.GetSchema( );
[C++] XmlSchema* IXmlSerializable::GetSchema( );
[VB] Function GetSchema( ) As XmlSchema Implements IXmlSerializable.GetSchema
[JScript] function IXmlSerializable.GetSchema( ): XmlSchema;
IXmlSerializable.ReadXml
[C#] void IXmlSerializable.ReadXml(XmlReader reader);
[C++] void IXmlSerializable::ReadXml(XmlReader* reader);
[VB] Sub ReadXml(ByVal reader As XmlReader) Implements IXmlSerializable.ReadXml
[JScript] function IXmlSerializable.ReadXml(reader: XmlReader);

IXmlSerializable.WriteXml
[C#] void IXmlSerializable.WriteXml(XmlWriter writer);
[C++] void IXmlSerializable::WriteXml(XmlWriter* writer);
[VB] Sub WriteXml(ByVal writer As XmlWriter) Implements IXmlSerializable.WriteXml
[JScript] function IXmlSerializable.WriteXml(writer: XmlWriter);
WriteXml
[C#] public void WriteXml(Stream stream);
[C++] public: void WriteXml(Stream* stream);
[VB] Public Sub WriteXml(ByVal stream As Stream)
[JScript] public function WriteXml(stream: Stream); Writes XML schema and data from the System.Data.DataSet.
Description
Writes the current schema and data for the System.Data.DataSet using the specified System.IO.Stream.
Use the System.Data.DataSet.WriteXml (System.IO.Stream) method to write an XML document that includes both schema and data of a System.Data.DataSet. To read an XML document, that includes schema and data, use the System.Data.DataSet.ReadXml (System.Xml.XmlReader) method. A System.IO.Stream object used to write to a file.
WriteXml
[C#] public void WriteXml(string fileName);
[C++] public: void WriteXml(String* fileName);
[VB] Public Sub WriteXml(ByVal fileName As String)
[JScript] public function WriteXml(fileName: String);
Description
Writes the current schema and data for the System.Data.DataSet to the specified file. The file name (including the path) to which to write.
WriteXml
[C#] public void WriteXml(TextWriter writer);
[C++] public: void WriteXml(TextWriter* writer);
[VB] Public Sub WriteXml(ByVal writer As TextWriter)
[JScript] public function WriteXml(writer: TextWriter);
Description
Writes the current schema and data for the System.Data.DataSet using the specified System.IO.TextWriter. The System.IO.TextWriter object with which to write.
WriteXml
[C#] public void WrteXml(XmlWriter writer);
[C++] public: void WriteXml(XmlWriter* writer);
[VB] Public Sub WriteXml(ByVal writer As XmlWriter)
[JScript] public function WriteXml(writer: XmlWriter);
Description
Writes the current schema and data for the System.Data.DataSet to the specified System.Xml.XmlWriter. The System.Xml.XmlWriter with which to write.
WriteXml
[C#] public void WriteXml(Stream stream, XmlWriteMode mode);
[C++] public: void WriteXml(Stream* stream, XmlWriteMode mode);
[VB] Public Sub WriteXml(ByVal stream As Stream, ByVal mode As XmlWriteMode)
[JScript] public function WriteXml(stream: Stream, mode: XmlWriteMode);
Description
Writes the current schema and data for the System.Data.DataSet using the specified System.IO.Stream and System.Data.XmlWriteMode. A System.IO.Stream object used to write to a file. One of the System.Data.XmlWriteMode values.

WriteXml
[C#] public void WriteXml(string fileName, XmlWriteMode mode);
[C++] public: void WriteXml(String* fileName, XmlWriteMode mode);
[VB] Public Sub WriteXml(ByVal fileName As String, ByVal mode As XmlWriteMode)
[JScript] public function WriteXml(fileName: String, mode: XmlWriteMode);
Description
Writes the current schema and data for the System.Data.DataSet to the specified file using the specified System.Data.XmlWriteMode.
Use the System.Data.DataSet.WriteXml (System.IO.Stream) method to write an XML document that includes both schema and data of a System.Data.DataSet. To read an XML document, that includes schema and data, use the System.Data.DataSet.ReadXml (System.Xml.XmlReader) method. The file name (including the path) to which to write. One of the System.Data.XmlWriteMode values.
WriteXml
[C#] public void WriteXml(TextWriter writer, XmlWriteMode mode);
[C++] public: void WriteXml(TextWriter* writer, XmlWriteMode mode);
[VB] Public Sub WriteXml(ByVal writer As TextWriter, ByVal mode As XmlWriteMode)
[JScript] public function WriteXml(writer: TextWriter, mode: XmlWriteMode);
Description
Writes the current schema and data for the System.Data.DataSet using the specified System.IO.TextWriter and System.Data.XmlWriteMode.
Use the System.Data.DataSet.WriteXml (System.IO.Stream) method to write an XML document that includes both schema and data of a System.Data.DataSet. To read an XML document, that includes schema and data, use the System.Data.DataSet.ReadXml (System.Xml.XmlReader) method. A System.IO.TextWriter object used to write the document. One of the System.Data.XmlWriteMode values.
WriteXml
[C#] public void WriteXml(XmlWriter writer, XmlWriteMode mode);
[C++] public: void WriteXml(XmlWriter* writer, XmlWriteMode mode);
[VB] Public Sub WriteXml(ByVal writer As XmlWriter, ByVal mode As XmlWriteMode)
[JScript] public function WriteXml(writer: XmlWriter, mode: XmlWriteMode);
Description
Writes the current schema and data for the System.Data.DataSet using the specified System.Xml.XmlWriter and System.Data.XmlWriteMode.
Use the System.Data.DataSet.WriteXml (System.IO.Stream) method to write an XML document that includes both schema and data of a System.Data.DataSet. To read an XML document, that includes schema and data, use the System.Data.DataSet.ReadXml (System.Xml.XmlReader) method. The System.Xml.XmlWriter with which to write. One of the System.Data.XmlWriteMode values.
WriteXmlSchema
[C#] public void WriteXmlSchema(Stream stream);
[C++] public: void WriteXmlSchema(Stream* stream);
[VB] Public Sub WriteXmlSchema(ByVal stream As Stream)

[JScript] public function WriteXmlSchema(stream: Stream);
Writes the System.Data.DataSet structure as an XML schema.
Description
Writes the System.Data.DataSet structure as an XML schema to using the specified System.IO.Stream object.
Use the System.Data.DataSet.WriteXmlSchema (System.IO.Stream) method to write the schema for a System.Data.DataSet to an XML document. The schema includes table, relation, and constraint definitions. To write a schema to an XML document, use the System.Data.DataSet.WriteXmlSchema(System.IO.Stream) method. A System.IO.Stream object used to write to a file.
WriteXmlSchema
[C#] public void WriteXmlSchema(string fileName);
[C++] public: void WriteXmlSchema(String* fileName);
[VB] Public Sub WriteXmlSchema(ByVal fileName As String)
[JScript] public function WriteXmlSchema(fileName: String);
Description
Writes the System.Data.DataSet structure as an XML schema to a file.
Use the System.Data.DataSet.WriteXmlSchema (System.IO.Stream) method to write the schema for a System.Data.DataSet to an XML document. The schema includes table, relation, and constraint definitions. To write a schema to an XML document, use the System.Data.DataSet.WriteXmlSchema(System.IO.Stream) method. The file name (including the path) to which to write.
WriteXmlSchema
[C#] public void WriteXmlSchema(TextWriter writer);
[C++] public: void WriteXmlSchema(TextWriter* writer);
[VB] Public Sub WriteXmlSchema(ByVal writer As TextWriter)
[JScript] public function WriteXmlSchema(writer: TextWriter);
Description
Writes the System.Data.DataSet structure as an XML schema to a System.IO.TextWriter object.
Use the System.Data.DataSet.WriteXmlSchema (System.IO.Stream) method to write the schema for a System.Data.DataSet to an XML document. The schema includes table, relation, and constraint definitions. To write a schema to an XML document, use the System.Data.DataSet.WriteXmlSchema(System.IO.Stream) method. The System.IO.TextWriter object with which to write.
WriteXmlSchema
[C#] public void WriteXmlSchema(XmlWriter writer);
[C++] public: void WriteXmlSchema(XmlWriter* writer);
[VB] Public Sub WriteXmlSchema(ByVal writer As XmlWriter)
[JScript] public function WriteXmlSchema(writer: XmlWriter);
Description
Writes the System.Data.DataSet structure as an XML schema to an System.Xml.XmlWriter object.
Use the System.Data.DataSet.WriteXmlSchema (System.IO.Stream) method to write the schema for a System.Data.DataSet to an XML document. The schema includes table, relation, and constraint definitions. To write a schema to an XML document, use the System.Data.DataSet.WriteXmlSchema(System.IO.Stream) method. The System.Xml.XmlWriter with which to write.
DataSysDescriptionAttribute class (System.Data)
WriteXmlSchema
Description
DescriptionAttribute marks a property, event, or extender with a description. Visual designers can display this description when referencing the member.
DataSysDescriptionAttribute
Example Syntax:
WriteXmlSchema
[C#] public DataSysDescriptionAttribute(string description);
[C++] public: DataSysDescriptionAttribute(String* description);
[VB] Public Sub New(ByVal description As String)
[JScript] public function DataSysDescriptionAttribute (description: String);
Description
Constructs a new sys description. description text.
Description
WriteXmlSchema
[C#] public override string Description {get;}
[C++] public: _property virtual String* get_Description( );
[VB] Overrides Public ReadOnly Property Description As String
[JScript] public function get Description( ): String;
Description
Retrieves the description text.
Return Value: description Retrieves the description text.
DescriptionValue
TypeId
DataTable class (System.Data)
ToString
Description
Represents one table of in-memory data.
The System.Data.DataTable is a central object in the ADO.NET library. Other objects that use the System.Data.DataTable include the System.Data.DataSet and the System.Data.DataView.
ToString
[C#] protected internal bool fInitInProgress;
[C++] protected public: bool fInitInProgress;
[VB] Internal fInitInProgress As Boolean
[JScript] package var fInitInProgress: Boolean;
Description
DataTable
Example Syntax:
ToString
[C#] public DataTable( );
[C++] public: DataTable( );
[VB] Public Sub New( )
[JScript] public function DataTable( ); Initializes a new instance of the System.Data.DataTable class.
Description
Initializes a new instance of the System.Data.DataTable class with no arguments.
The constructor sets initial values for all properties of the System.Data.DataTable object. The following table shows the properties and their default values. When an instance System.Data.DataTable is created, the following read/write properties are set to initial values.
DataTable
Example Syntax:
ToString
[C#] public DataTable(string tableName);
[C++] public: DataTable(String* tableName);
[VB] Public Sub New(ByVal tableName As String)
[JScript] public function DataTable(tableName: String);
Description
Intitalizes a new instance of the System.Data.DataTable class with the specified table name. The name to give the table. If null or an empty string, a default name will be given when added to the System.Data.DataTableCollection.
DataTable
Example Syntax:
ToString
[C#] protected DataTable(SerializationInfo info, StreamingContext context);
[C++] protected: DataTable(SerializationInfo* info, StreamingContext context);
[VB] Protected Sub New(ByVal info As SerializationInfo, ByVal context As StreamingContext)
[JScript] protected function DataTable(info: SerializationInfo, context: StreamingContext);
Description
Initializes a new instance of the System.Data.DataTable class with the System.Runtime.Serialization.SerializationInfo and the System.Runtime.Serialization.StreamingContext.
This implemenation of the System.Data.DataTable constructor is required for System.Runtime.Serialization.ISerializable. The data needed to serialize or deserialize an object. The source and destination of a given serialized stream.
CaseSensitive
ToString
[C#] public bool CaseSensitive {get; set;}
[C++] public: __property bool get_CaseSensitive( );public: __property void set_CaseSensitive(bool);
[VB] Public Property CaseSensitive As Boolean
[JScript] public function get CaseSensitive( ): Boolean;public function set CaseSensitive(Boolean);
Description
Indicates whether string comparisons within the table are case-sensitive.
The System.Data.DataTable.CaseSensitive property affects string comparisons in sorting, searching, and filtering.
ChildRelations
ToString
[C#] public DataRelationCollection ChildRelations {get;}
[C++] public: __property DataRelationCollection* get_ChildRelations( );
[VB] Public ReadOnly Property ChildRelations As DataRelationCollection
[JScript] public function get ChildRelations( ): DataRelationCollection;
Description
Gets the collection of child relations for this System.Data.DataTable.
A System.Data.DataRelation defines the relationship between two tables. Typically, two tables are linked through a single field that contains the same data. For example, a table which contains address data may have a single field containing codes that represent countries/regions. A second table that contains country/region data will have a single field that contains the code that identifies the country/region, and it is this code which is inserted into the corresponding field in the first table. A System.Data.DataRelation, then, contains at least four pieces of information: (1) the name of the first table, (2) the column name in the first table, (3) the name of the second table, and (4) the column name in the second table.
Columns
ToString
[C#] public DataColumnCollection Columns {get;}
[C++] public: __property DataColumnCollection* get_Columns( );
[VB] Public ReadOnly Property Columns As DataColumnCollection
[JScript] public function get Columns( ): DataColumnCollection;
Description
Gets the collection of columns that belong to this table.
The System.Data.DataColumnCollection determines the schema of a table by defining the data type of each column.
Constraints
ToString
[C#] public ConstraintCollection Constraints {get;}
[C++] public: __property ConstraintCollection* get_Constraints( );
[VB] Public ReadOnly Property Constraints As ConstraintCollection
[JScript] public function get Constraints( ): ConstraintCollection;
Description
Gets the collection of constraints maintained by this table.
A System.Data.ForeignKeyConstraint restricts the action performed when a value in a column (or columns) is either deleted or updated. Such a constraint is intended to be used with primary key columns. In a parent/child relationship between two tables, deleting a value from the parent table can affect the child rows in one of the following ways.
Container
DataSet
ToString
Description
Gets the System.Data.DataSet that this table belongs to.
If a control is data bound to a System.Data.DataTable, and the table belongs to a System.Data.DataSet, you can get to the System.Data. DataSet through this property.
DefaultView
ToString
[C#] public DataView DefaultView {get;}
[C++] public: __property DataView* get_DefaultView( );
[VB] Public ReadOnly Property DefaultView As DataView
[JScript] public function get DefaultView( ): DataView;
Description
Gets a customized view of the table which may include a filtered view, or a cursor position.
The System.Data.DataTable.DefaultView property returns a System.Data.DataView you can use to sort, filter, and search a System.Data.DataTable
DesignMode
DisplayExpression
ToString
Description
Gets or sets the expression that will return a value used to represent this table in the user interface.
For rules on forming the expression string, see the System.Data.DataColumn.Expression property.
Events
ExtendedProperties
ToString
Description
Gets the collection of customized user information.
Use the System.Data.DataTable.ExtendedProperties to add custom information to a System.Data.DataTable. Add information with the Add method. Retrieve information with the Item method.
HasErrors
ToString
[C#] public bool HasErrors {get;}
[C++] public: __property bool get_HasErrors( );
[VB] Public ReadOnly Property HasErrors As Boolean

[JScript] public function get HasErrors( ): Boolean;
Description
Gets a value indicating whether there are errors in any of the rows in any of the tables of the System.Data.DataSet to which the table belongs.
As users work on a set of data contained in a System.Data.DataSet, you can mark each change with an error if the change causes some validation failure. You can mark an entire System.Data.DataRow with an error message using the System.Data.DataRow.RowError property. You can also set errors on each column of the row with the System.Data.DataRow.SetColumnError(System.Int32, System.String) method.
Locale
ToString
[C#] public CultureInfo Locale {get; set;}
[C++] public: __property CultureInfo* get__Locale( );public: __property void set__Locale(CultureInfo*);
[VB] Public Property Locale As CultureInfo
[JScript] public function get Locale( ): CultureInfo;public function set Locale(CultureInfo);
Description
Gets or sets the locale information used to compare strings within the table.
A System.Globalization.CultureInfo represents the software preferences of a particular culture or community.
MinimumCapacity
ToString
[C#] public int MinimumCapacity {get; set;}
[C++] public: __property int get__MinimumCapacity( ); public: __property void set__MinimumCapacity(int);
[VB] Public Property MinimumCapacity As Integer
[JScript] public function get MinimumCapacity( ): int;public function set MinimumCapacity(int);
Description
Gets or sets the initial starting size for this table.
The System.Data.DataTable.MinimumCapacity allows the system to create an appropriate set of resources before fetching data. In a situation when performance is critical, setting this property can optimize performance.
Namespace
ToString
[C#] public string Namespace {get; set;}
[C++] public: __property String* get__Namespace( );public: __property void set__Namespace(String*);
[VB] Public Property Namespace As String
[JScript] public function get Namespace( ): String;public function set Namespace(String);
Description
Gets or sets the namespace for the XML represenation of the data stored in the System.Data.DataTable.
ParentRelations
ToString
[C#] public DataRelationCollection ParentRelations {get;}
[C++] public: __property DataRelationCollection* get__ParentRelations( );
[VB] Public ReadOnly Property ParentRelations As DataRelationCollection
[JScript] public function get ParentRelations( ): DataRelationCollection;
Description
Gets the collection of parent relations for this System.Data.DataTable.
Prefix
ToString
[C#] public string Prefix {get; set;}
[C++] public: __property String* get__Prefix( );public: __property void set__Prefix(String*);
[VB] Public Property Prefix As String
[JScript] public function get Prefix( ): String;public function set Prefix(String);
Description
Gets or sets the namespace for the XML represenation of the data stored in the System.Data.DataTable
PrimaryKey
ToString
[C#] public DataColumn[ ] PrimaryKey {get; set;}
[C++] public: __property DataColumn* get__PrimaryKey( ); public: __property void set__PrimaryKey(DataColumn* [ ]);
[VB] Public Property PrimaryKey As DataColumn( )
[JScript] public function get PrimaryKey( ): DataColumn[ ]; public function set PrimaryKey(DataColumn[ ]);
Description
Gets or sets an array of columns that function as primary keys for the data table.
The primary key of a table must be unique to identify the record in the table. It's also possible to have a table with a primary key made up of two or more columns. This occurs when a single column can't contain enough unique values. For example, a two column primary key might consist of a "FirstName" and "LastName" column. Because primary keys can be made up of more than one column, the System.Data.DataTable.PrimaryKey property consists of an array of System.Data.DataColumn objects.
Rows
ToString
[C#] public DataRowCollection Rows {get;}
[C++] public: __property DataRowCollection* get__Rows( );
[VB] Public ReadOnly Property Rows As DataRowCollection
[JScript] public function get Rows( ): DataRowCollection;
Description
Gets the collection of rows that belong to this table.
To create a new System.Data.DataRow, you must use the System.Data.DataTable.NewRow method to return a new object. Such an object is automatically configured with according to the schema defined for the System.Data.DataTable through its collection of System.Data.DataColumn objects. After creating a new row and setting the values for each column in the row, add the row to the DataRowCollection using the Add method.
Site
ToString
[C#] public override ISite Site {get; set;}
[C++] public: __property virtual ISite* get__Site( );public: __property virtual void set__Site(ISite*);
[VB] Overrides Public Property Site As ISite
[JScript] public function get Site( ): ISite;public function set Site(ISite);
Description
Gets or sets an System.ComponentModel.ISite for the System.Data.DataTable.
Sites bind a System.ComponentModel.Component to a System.ComponentModel.Container and enable communication between them, as well as provide a way for the container to manage its components.
TableName
ToString
[C#] public string TableName {get; set;}
[C++] public: __property String* get__TableName( );public: __property void set__TableName(String*);
[VB] Public Property TableName As String
[JScript] public function get TableName( ): String;public function set TableName(String);

Description
Gets or sets the name of the the System.Data.DataTable.
The System.Data.DataTable.TableName is used to return this table from the parent System.Data.DataSet object's System.Data.DataTableCollection (returned by the System.Data.DataSet.Tables property).
ToString
[C#] public event DataColumnChangeEventHandler ColumnChanged;
[C++] public: __event DataColumnChangeEventHandler* ColumnChanged;
[VB] Public Event ColumnChanged As DataColumnChangeEventHandler
Description
Occurs when after a value has been changed for the specified System.Data.DataColumn in a System.Data.DataRow.
ToString
[C#] public event DataColumnChangeEventHandler ColumnChanging;
[C++] public: __event DataColumnChangeEventHandler* ColumnChanging;
[VB] Public Event ColumnChanging As DataColumnChangeEventHandler
Description
Occurs when a value is being changed for the specified System.Data.DataColumn in a System.Data.DataRow.
ToString
Description
Occurs after a System.Data.DataRow has been changed successfully.
ToString
[C#] public event DataRowChangeEventHandler RowChanging;
[C++] public: __event DataRowchangeEventHandler* RowChanging;
[VB] Public Event RowChanging As DataRowChangeEventHandler
Description
Occurs when a System.Data.DataRow is changing.
ToString
[C#] public event DataRowChangeEventHandler RowDeleted;
[C++] public: __event DataRowChangeEventHandler* RowDeleted;
[VB] Public Event RowDeleted As DataRowChangeEventHandler
Description
Occurs after a row in the table has been deleted.
ToString
[C#] public event DataRowChangeEventHandler RowDeleting;
[C++] public: __event DataRowChangeEventHandler* RowDeleting;
[VB] Public Event RowDeleting As DataRowChangeEventHandler
Description
Occurs before a row in the table is about to be deleted.
AcceptChanges
[C#] public void AcceptChanges( );
[C++] public: void AcceptChanges( );
[VB] Public Sub AcceptChanges( )
[JScript] public function AcceptChanges( );
Description
Commits all the changes made to this table since the last time System.Data.DataTable.AcceptChanges was called.
When System.Data.DataTable.AcceptChanges is called, any System.Data.DataRow object still in edit mode successfully ends its edits. The System.Data.DataRowState also changes: all Added and Modified rows become Unchanged; Deleted rows are removed.
BeginInit
[C#] public void BeginInit( );
[C++] public: __sealed void BeginInit( );
[VB] NotOverridable Public Sub BeginInit( )
[JScript] public function BeginInit( );
Description
Begins the initialization of a System.Data.DataTable that is used on a form or used by another component. The initialization occurs at runtime.
The Visual Studio.NET design environment uses this method to start the initialization of a component that is used on a form or used by another component. The System.Data.DataTable.EndInit method ends the initialization. Using the BeginInit and EndInit methods prevents the control from being used before it is fully initialized.
BeginLoadData
[C#] public void BeginLoadData( );
[C++] public: void BeginLoadData( );
[VB] Public Sub BeginLoadData( )
[JScript] public function BeginLoadData( );
Description
Turns off notifications, index maintenance, and constraints while loading data.
Use System.Data.DataTable.BeginLoadData in conjunction with System.Data.DataTable.LoadDataRow (System.Object[ ],System.Boolean) and System.Data.DataTable.EndLoadData.
Clear
[C#] public void Clear( );
[C++] public: void Clear( );
[VB] Public Sub Clear( )
[JScript] public function Clear( );
Description
Clears the System.Data.DataTable of all data.
All rows in all tables are removed. An exception is generated if the table has any enforced child relations that would cause child rows to be stranded.
Clone
[C#] public DataTable Clone( );
[C++] public: DataTable* Clone( );
[VB] Public Function Clone( ) As DataTable
[JScript] public function Clone( ): DataTable;
Description
Clones the structure of the System.Data.DataTable, including all System.Data.DataTable schemas, relations, and constraints.
Return Value: A new System.Data.DataTable with the same schema as the current System.Data.DataTable.
If these classes have been subclassed, the clone will also be of the same subclasses.
Compute
[C#] public object Compute(string expression, string filter);
[C++] public: Object* Compute(String* expression, String* filter);
[VB] Public Function Compute(ByVal expression As String, ByVal filter As String) As Object
[JScript] public function Compute(expression: String, filter: String): Object;
Description
Computes the given expression on the current rows that pass the filter criteria.
Return Value: An System.Object, set to the result of the computation.
The expression parameter requires an aggregate function. For example, the following is a legal expression: Count (Quantity) But this expression is not: Sum(Quantity*UnitPrice) If you must perform an operation on two or more columns, you should create a System.Data.DataColumn, set its System.Data.DataColumn.Expression property to an appropriate expression, and use an aggregate expression on the resulting column. In that case, given a System.Data.DataColumn with the name "total," and the System.Data.DataColumn.Expression property set to: "Quantity*UnitPrice" The expression argument for the System.Data.DataTable.Compute(System.String, System.String) method would then be: Sum(total) The second parameter filter determines which rows are used in the expression. For example, if the table contains a date column named "colDate", you could limit the rows with the following expression: colDate>Jan. 1, 1999 AND colDate<Jan. 17, 1999 For rules on creating expressions for both parameters, see the System.Data.DataColumn.Expression property of the System.Data.DataColumn class. The expression to compute. The filter to limit the rows that evaluate in the expression.

Copy
[C#] public DataTable Copy( );
[C++] public: DataTable* Copy( );
[VB] Public Function Copy( ) As DataTable
[JScript] public function Copy( ): DataTable;
Description
Copies both the structure and data for this System.Data.DataTable.
Return Value: A new System.Data.DataTable with the same structure (table schemas, relations, and constraints) and data as this System.Data.DataTable.

EndInit
[C#] public void EndInit( );
[C++] public: _sealed void EndInit( );
[VB] NotOverridable Public Sub EndInit( )
[JScript] public function EndInit( );
Description
Ends the initialization of a System.Data.DataTable that is used on a form or used by another component. The initialization occurs at runtime.
The Visual Studio.NET design environment uses this method to end the initialization of a component that is used on a form or used by another component. The System.Data.DataTable.BeginInit method starts the initialization. Using the BeginInit and EndInit methods prevents the control from being used before it is fully initialized.

EndLoadData
[C#] public void EndLoadData( );
[C++] public: void EndLoadData( );
[VB] Public Sub EndLoadData( )
[JScript] public function EndLoadData( );
Description
Turns off notifications, index maintenance, and constraints while loading data.
Use System.Data.DataTable.EndLoadData in conjunction with System.Data.DataTable.LoadDataRow(System.Object[ ],System.Boolean) and System.Data.DataTable.BeginLoadData.

GetChanges
[C#] public DataTable GetChanges( );
[C++] public: DataTable* GetChanges( );
[VB] Public Function GetChanges( ) As DataTable
[JScript] public function GetChanges( ): DataTable; Gets a copy of the System.Data.DataTable containing all changes made to it since it was last loaded, or since System.Data.DataTable.AcceptChanges was called.

Description
Gets a copy of the System.Data.DataTable that contains all changes made to it since it was loaded or System.Data.DataTable.AcceptChanges was last called.
Return Value: A copy of the changes from this System.Data.DataTable that can have actions performed on it and subsequently be merged back in using System.Data.DataSet.Merge(System.Data.DataSet), or null if none are found.
Gets a copy of the System.Data.DataTable that contains all changes made to it since it was loaded or System.Data.DataTable.AcceptChanges was last called. This copy is particularly designed so that it can be merged back in to this original System.Data.DataTable. Relationship constraints may cause Unchanged parent rows to be included. If no rows of these rowStates are found, this method returns null.

GetChanges
[C#] public DataTable GetChanges(DataRowState rowStates);
[C++] public: DataTable* GetChanges(DataRowState rowstates);
[VB] Public Function GetChanges(ByVal rowStates As DataRowState) As DataTable
[JScript] public function GetChanges(rowStates: DataRowState): DataTable;
Description
Gets a copy of the System.Data.DataTable containing all changes made to it since it was last loaded, or since System.Data.DataTable.AcceptChanges was called, filtered by System.Data.DataRowState.
Return Value: A filtered copy of the System.Data.DataTable that can have actions performed on it, and subsequently be merged back in using System.Data.DataSet.Merge(System.Data.DataSet). If no rows of the desired System.Data.DataRowState are found, the method returns null.
The System.Data.DataTable.GetChanges method is used to produce a second System.Data.DataTable object which contains only the changes introduced into the original. Use the rowStates argument to specify the type of changes the new object should include. One of the System.Data.DataRowState values.

GetErrors
[C#] public DataRow[ ] GetErrors( );
[C++] public: DataRow* GetErrors( ) [ ];
[VB] Public Function GetErrors( ) As DataRow( )
[JScript] public function GetErrors( ): DataRow[ ];
Description
Gets an array of System.Data.DataRow objects that contain errors.
Return Value: An array of System.Data.DataRow objects that have errors.
Invoke System.Data.DataTable.GetErrors after invoking the System.Data.DataSet class's System.Data.DataSet.GetChanges method. Also, be sure you don't invoke the System.Data.DataTable.AcceptChanges on the System.Data.DataTable until after all errors have been succesfully resolved, and the System.Data.DataSet re-submitted for updating.

GetRowType
[C#] protected virtual Type GetRowType( );
[C++] protected: virtual Type* GetRowType( );
[VB] Overridable Protected Function GetRowType( ) As Type
[JScript] protected function GetRowType( ): Type;
Description
Gets the row type.
Return Value: The System.Type of the row.

ImportRow

[C#] public void ImportRow(DataRow row);
[C++] public: void ImportRow(DataRow* row);
[VB] Public Sub ImportRow(ByVal row As DataRow)
[JScript] public function ImportRow(row: DataRow);
Description
  Copies a System.Data.DataRow, including original and current values, System.Data.DataRowState values, and errors, into a System.Data.DataTable. A System.Data.DataRow, including original and current values, System.Data.DataRowState values, and errors.
    LoadDataRow
[C#] public DataRow LoadDataRow(object[ ] values, bool fAcceptChanges);
[C++] public: DataRow* LoadDataRow(Object* values __gc[ ], bool fAcceptChanges);
[VB] Public Function LoadDataRow(ByVal values( ) As Object, ByVal fAcceptChanges As Boolean) As DataRow
[JScript] public function LoadDataRow(values: Object[ ], fAcceptChanges: Boolean): DataRow;
Description
  Finds and updates a specific row. If no matching row is found, a new row is created using the given values.
Return Value: The new System.Data.DataRow.
  The System.Data.DataTable.LoadDataRow (System.Object[ ];System.Boolean) method takes an array of values and finds the matching value(s) in the primary key column(s). An array of values used to create the new row. true to accept changes; otherwise, false.
    NewRow
[C#] public DataRow NewRow( );
[C++] public: DataRow* NewRow( );
[VB] Public Function NewRow( ) As DataRow
[JScript] public function NewRow( ): DataRow;
Description
  Creates a new System.Data.DataRow with the same schema as the table.
Return Value: A System.Data.DataRow with the same schema as the System.Data.DataTable.
  You must use the System.Data.DataTable.NewRow method to create new System.Data.DataRow objects with the same schema as the System.Data.DataTable. After creating a System.Data.DataRow, you can add it to the System.Data.DataRowCollection, through the System.Data.DataTable object's System.Data.DataTable.Rows property.
    NewRowArray
[C#] protected internal DataRow[ ] NewRowArray(int size);
[C++] protected public: DataRow* NewRowArray(int size) [ ];
[VB] Protected Friend Dim Function NewRowArray(ByVal size As Integer) As DataRow( )
[JScript] package function NewRowArray(size: int): DataRow[ ];
Description
  NewRowFromBuilder
[C#] protected virtual DataRow NewRowFromBuilder (DataRowBuilder builder);
[C++] protected: virtual DataRow* NewRowFromBuilder (DataRowBuilder* builder);
[VB] Overridable Protected Function NewRowFromBuilder (ByVal builder As DataRowBuilder) As DataRow
[JScript] protected function NewRowFromBuilder(builder: DataRowBuilder): DataRow;
Description
  This is what a subclassed dataSet overrides to create a new row.
    OnColumnChanged
[C#] protected virtual void OnColumnChanged (DataColumnChangeEventArgs e);

[C++] protected: virtual void OnColumnChanged (DataColumnChangeEventArgs* e);
[VB] Overridable Protected Sub OnColumnChanged(ByVal e As DataColumnChangeEventArgs)
[JScript] protected function OnColumnChanged(e: DataColumnChangeEventArgs);
Description
  Raises the System.Data.DataTable.ColumnChanged event.
  Raising an event invokes the event handler through a delegate. For an overview, see. A System.Data.DataColumnChangeEventArgs that contains the event data.
    OnColumnChanging
[C#] protected virtual void OnColumnChanging (DataColumnChangeEventArgs e);
[C++] protected: virtual void OnColumnChanging (DataColumnChangeEventArgs* e);
[VB] Overridable Protected Sub OnColumnChanging (ByVal e As DataColumnChangeEventArgs)
[JScript] protected function OnColumnChanging(e: DataColumnChangeEventArgs);
Description
  Raises the System.Data.DataTable.ColumnChanging event.
  Raising an event invokes the event handler through a delegate. For an overview, see. A System.Data.DataColumnChangeEventArgs that contains the event data.
    OnPropertyChanging
[C#] protected internal virtual void OnPropertyChanging (PropertyChangedEventArgs pcevent);
[C++] protected public: virtual void OnPropertyChanging (PropertyChangedEventArgs* pcevent);
[VB] Overridable Protected Friend Dim Sub OnPropertyChanging(ByVal pcevent As PropertyChangedEventArgs)
[JScript] package function OnPropertyChanging(pcevent: PropertyChangedEventArgs);
Description
  Raises the System.Data.DataTable.OnPropertyChanging (System.ComponentModel.PropertyChangedEventArgs) event.
  Raising an event invokes the event handler through a delegate. For an overview, see. A System.ComponentModel.PropertyChangedEventArgs that contains the event data.
    OnRemoveColumn
[C#] protected internal virtual void OnRemoveColumn (DataColumn column);
[C++] protected public: virtual void OnRemoveColumn (DataColumn* column);
[VB] Overridable Protected Friend Dim Sub OnRemoveColumn(ByVal column As DataColumn)
[JScript] package function OnRemoveColumn(column: DataColumn);
Description
  Notifies the System.Data.DataTable that a System.Data.DataColumn is being removed.
  Raising an event invokes the event handler through a delegate. For more information, see. The System.Data.DataColumn being removed.
    OnRowChanged
[C#] protected virtual void OnRowChanged (DataRowChangeEventArgs e);
[C++] protected: virtual void OnRowChanged (DataRowChangeEventArgs* e);
[VB] Overridable Protected Sub OnRowChanged(ByVal e As DataRowChangeEventArgs)
[JScript] protected function OnRowChanged(e: DataRowChangeEventArgs);

Description
　　Raises the System.Data.DataTable.RowChanged event.
　　Raising an event invokes the event handler through a delegate. For an overview, see. A System.Data.DataRowChangeEventArgs that contains the event data.
　　OnRowChanging
[C#] protected virtual void OnRowChanging (DataRowChangeEventArgs e);
[C++] protected: virtual void OnRowChanging (DataRowChangeEventArgs* e);
[VB] Overridable Protected Sub OnRowChanging(ByVal e As DataRowChangeEventArgs)
[JScript] protected function OnRowChanging(e: DataRowChangeEventArgs);
Description
　　Raises the System.Data.DataTable.RowChanging event.
　　Raising an event invokes the event handler through a delegate. For an overview, see. A System.Data.DataRowChangeEventArgs that contains the event data.
　　OnRowDeleted
[C#] protected virtual void OnRowDeleted (DataRowChangeEventArgs e);
[C++] protected: virtual void OnRowDeleted (DataRowChangeEventArgs* e);
[VB] Overridable Protected Sub OnRowDeleted(ByVal e As DataRowChangeEventArgs)
[JScript] protected function OnRowDeleted(e: DataRowChangeEventArgs);
Description
　　Raises the System.Data.DataTable.RowDeleted event.
　　Raising an event invokes the event handler through a delegate. For an overview, see. A System.Data.DataRowChangeEventArgs that contains the event data.
　　OnRowDeleting
[C#] protected virtual void OnRowDeleting (DataRowChangeEventArgs e);
[C++] protected: virtual void OnRowDeleting (DataRowChangeEventArgs* e);
[VB] Overridable Protected Sub OnRowDeleting(ByVal e As DataRowChangeEventArgs)
[JScript] protected function OnRowDeleting(e: DataRowChangeEventArgs);
Description
　　Raises the System.Data.DataTable.OnRowDeleting (System.Data.DataRowChangeEvent Args) event.
　　Raising an event invokes the event handler through a delegate. For an overview, see. A System.Data.DataRowChangeEventArgs that contains the event data.
　　RejectChanges
[C#] public void RejectChanges( );
[C++] public: void RejectChanges( );
[VB] Public Sub RejectChanges( )
[JScript] public function RejectChanges( );
Description
　　Rolls back all changes that have been made to the table since it was loaded, or the last time System.Data.DataTable.AcceptChanges was called.
　　When System.Data.DataTable.RejectChanges is called, any System.Data.DataRow objects that are still in edit-mode cancel their edits. New rows are removed. Rows with the System.Data.DataRowState set to Modified or Deleted return back to their original state.
　　Reset
[C#] public virtual void Reset( );
[C++] public: virtual void Reset( );
[VB] Overridable Public Sub Reset( )
[JScript] public function Reset( );
Description
　　Resets the System.Data.DataTable to its original state.
　　Select
[C#] public DataRow[ ] Select( );
[C++] public: DataRow* Select( ) [ ];
[VB] Public Function Select( ) As DataRow( )
[JScript] public function Select( ): DataRow[ ]; Gets an array of System.Data.DataRow objects.
Description
　　Gets an array of all System.Data.DataRow objects.
　　Return Value: An array of System.Data.DataRow objects.
　　The method returns the current rows in order of primary key (or lacking one, order of addition.) The following example returns an array of System.Data.DataRow objects through the System.Data.DataTable.Select method.
　　Select
[C#] public DataRow[ ] Select(string filterExpression);
[C++] public: DataRow* Select(String* filterExpression) [ ];
[VB] Public Function Select(ByVal filterExpression As String) As DataRow( )
[JScript] public function Select(filterExpression: String): DataRow[ ];
Description
　　Gets an array of all System.Data.DataRow objects that match the filter criteria in order of primary key (or lacking one, order of addition.)
　　Return Value: An array of System.Data.DataRow objects.
　　To create the filterExpression argument, use the same rules that apply to the System.Data.DataColumn class's System.Data.DataColumn.Expression property value for creating filters. The criteria to use to filter the rows.
　　Select
[C#] public DataRow[ ] Select(string filterExpression, string sort);
[C++] public: DataRow* Select(String* filterExpression, String* sort) [ ];
[VB] Public Function Select(ByVal filterExpression As String, ByVal sort As String) As DataRow( )
[JScript] public function Select(filterExpression: String, sort: String): DataRow[ ];
Description
　　Gets an array of all System.Data.DataRow objects that match the filter criteria, in the the specified sort order.
　　Return Value: An array of System.Data.DataRow objects matching the filter expression.
　　To form the filterExpression argument, use the same rules for creating the System.Data.DataColumn class's System.Data.DataColumn.Expression property value. The Sort argument also uses the same rules for creating class's System.Data.DataColumn.Expression strings. The criteria to use to filter the rows. A string specifying the column and sort direction.
　　Select
[C#] public DataRow[ ] Select(string filterExpression, string sort, DataViewRowState recordStates);
[C++] public: DataRow* Select(String* filterExpression, String* sort, DataViewRowState recordStates) [ ];
[VB] Public Function Select(ByVal filterExpression As String, ByVal sort As String, ByVal recordStates As DataViewRowState) As DataRow( )
[JScript] public function Select(filterExpression: String, sort: String, recordStates: DataViewRowState): DataRow[ ];
Description
　　Gets an array of all System.Data.DataRow objects that match the filter in the order of the sort, that match the specified state.

Return Value: An array of System.Data.DataRow objects.

To form the filterExpression argument, use the same rules for creating the System.Data.DataColumn class's System.Data.DataColumn.Expression property value. The Sort argument also uses the same rules for creating class's System.Data.DataColumn.Expression strings. The criteria to use to filter the rows. A string specifying the column and sort direction. One of the System.Data.DataViewRowState values.

IListSource.GetList
[C#] IList IListSource.GetList( );
[C++] IList* IListSource::GetList( );
[VB] Function GetList( ) As IList Implements IListSource.GetList
[JScript] function IListSource.GetList( ): IList;
ISerializable.GetObjectData
[C#] void ISerializable.GetObjectData(SerializationInfo info, StreamingContext context);
[C++] void ISerializable::GetObjectData(SerializationInfo* info, StreamingContext context);
[VB] Sub GetObjectData(ByVal info As SerializationInfo, ByVal context As StreamingContext) Implements ISerializable.GetObjectData
[JScript] function ISerializable.GetObjectData(info: SerializationInfo, context: StreamingContext);
ToString
[C#] public override string ToString( );
[C++] public: String* ToString( );
[VB] Overrides Public Function ToString( ) As String
[JScript] public override function ToString( ): String;
Description
  Gets the System.Data.DataTable.TableName and System.Data.DataTable.DisplayExpression, if there is one as a concatenated string.
Return Value: A string consisting of the System.Data.DataTable.TableName and the System.Data.DataTable.DisplayExpression values.
  Gets the System.Data.DataTable.TableName and System.Data.DataTable.DisplayExpression for the System.Data.DataTable.

DataTableCollection class (System.Data)
ToString
Description
  Represents the collection of tables for the System.Data.DataSet.
  The System.Data.DataTableCollection contains all of the System.Data.DataTable objects for a System.Data.DataSet. To access the System.Data.DataTableCollection of a System.Data.DataSet, use the System.Data.DataSet.Tables property.
  Count
  IsReadOnly
  IsSynchronized
  Item
  ToString
  System.Data.DataTable
Description
  Gets the System.Data.DataTable specified by its index.
  The System.Data.DataTableCollection.Contains (System.String) method. can be used to determine if a table with a specified index exists. The zero-based index of the System.Data.DataTable to find.
    Item
    ToString
[C#] public DataTable this[string name] {get;}
[C++] public: _property DataTable* get_Item(String* name);
[VB] Public Default ReadOnly Property Item(ByVal name As String) As DataTable
[JScript] returnValue=DataTableCollectionObject.Item (name);
Description
  Gets the System.Data.DataTable in the collection with the given name (not case-sensitive).
  The System.Data.DataTableCollection.Contains (System.String) method can be used to determine if a table with a specified name or index exists. The name of the table to find.
    List
    ToString
[C#] protected override ArrayList List {get;}
[C++] protected: _property virtual ArrayList* get_List( );
[VB] Overrides Protected ReadOnly Property List As ArrayList
[JScript] protected function get List( ): ArrayList;
Description
  Gets the tables in the collection as an object.
    SyncRoot
    ToString
Description
  Occurs when the collection is changed.
    ToString
[C#] public event CollectionChangeEventHandler CollectionChanging;
[C++] public: _event CollectionChangeEventHandler* CollectionChanging;
[VB] Public Event CollectionChanging As CollectionChangeEventHandler
Description
  Occurs when the collection is changing.
  To abort the change, the user should throw an exception in a System.Data.DataColumnChangeEventHandler event handler, and then catch the exception.
    Add
[C#] public virtual DataTable Add( );
[C++] public: virtual DataTable* Add( );
[VB] Overridable Public Function Add( ) As DataTable
[JScript] public function Add( ): DataTable;
Description
  Creates a new table with a default name and adds it to the collection.
Return Value: The newly created System.Data.DataTable.
  Because no name is specified, the table is created with a default name, relative to its order of addition. The default name is "Table" where i=a new 1-based index.
    Add
[C#] public virtual void Add(DataTable table);
[C++] public: virtual void Add(DataTable* table);
[VB] Overridable Public Sub Add(ByVal table As DataTable)
[JScript] public function Add(table: DataTable); Adds a System.Data.DataTable to the collection.
Description
  Adds the specified System.Data.DataTable to the collection.
  The System.Data.DataTableCollection. On Collection Changed (System.ComponentModel.CollectionChangeEventArgs) event occurs when a table is succefully added. System.Data.DataTable to add.
    Add
[C#] public virtual DataTable Add(string name);
[C++] public: virtual DataTable* Add(String* name);
[VB] Overridable Public Function Add(ByVal name As String) As DataTable

[JScript] public function Add(name: String): DataTable;
Description
  Creates a table with the given name and adds it to the collection.
Return Value: The newly created System.Data.DataTable.
  If either a null or an empty string ("") is passed in, a default name is given to the newly created System.Data.DataTable. The name to give the created System.Data.DataTable.
    AddRange
[C#] public void AddRange(DataTable[ ] tables);
[C++] public: void AddRange(DataTable* tables[ ]);
[VB] Public Sub AddRange(ByVal tables( ) As DataTable)
[JScript] public function AddRange(tables: DataTable[ ]);
Description
  Copies the elements of the specified System.Data.DataTable array to the end of the collection. The array of System.Data.DataTable objects to add to the collection.
    CanRemove
[C#] public bool CanRemove(DataTable table);
[C++] public: bool CanRemove(DataTable* table);
[VB] Public Function CanRemove(ByVal table As DataTable) As Boolean
[JScript] public function CanRemove(table: DataTable): Boolean;
Description
  Verifies if the specified System.Data.DataTable can be removed from the collection.
Return Value: true if the table can be removed; otherwise, false. A System.Data.DataTable in the collection.
    Clear
[C#] public void Clear( );
[C++] public: void Clear( );
[VB] Public Sub Clear( )
[JScript] public function Clear( );
Description
  Clears the collection of any tables.
    Contains
[C#] public bool Contains(string name);
[C++] public: bool Contains(String* name);
[VB] Public Function Contains(ByVal name As String) As Boolean
[JScript] public function Contains(name: String): Boolean;
Description
  Checks if a table, specified by name, exists in the collection.
Return Value: true if the specified table exists; otherwise, false.
  The System.Data.DataTable object's name is specified by the System.Data.DataTable.TableName property. If you add a System.Data.DataTable to the System.Data.DataTableCollection with the System.Data.DataTableCollection.Add (System.Data.DataTable) method, passing no arguments, the table is given a default name such as Table1, Table2, and so on. The table name to check for.
    IndexOf
[C#] public virtual int IndexOf(DataTable table);
[C++] public: virtual int Indexof(DataTable* table);
[VB] Overridable Public Function IndexOf(ByVal table As DataTable,) As Integer
[JScript] public function IndexOf(table: DataTable): int;
  Gets the index of a specified table.
Description
  Gets the index of a specified System.Data.DataTable.
Return Value: The 0-based index of the table, or −1 if the table isn't found in the collection.
  Use the System.Data.DataTableCollection.IndexOf (System.Data.DataTable) method when it's necessary to know the exact index of a given table. The System.Data.DataTable to search for.
    IndexOf
[C#] public virtual int IndexOf(string tableName);
[C++] public: virtual intIndexOf(String* tableName);
[VB] Overridable Public Function IndexOf(ByVal tableName As String) As Integer
[JScript] public function IndexOf(tableName: String): int;
Description
  Gets the index of the table with the given name (case insensitive), or −1 if the table doesn't exist in the collection.
Return Value: The index of the table with the name, or −1 if the table doesn't exist in the collection.
  The name of a System.Data.DataTable is set with the System.Data.DataTable.TableName property. The name to look for.
    OnCollectionChanged
[C#] protected virtual void OnCollectionChanged (CollectionChangeEventArgs ccevent);
[C++] protected: virtual void OnCollectionChanged (CollectionChangeEventArgs* ccevent);
[VB] Overridable Protected Sub OnCollectionChanged (ByVal ccevent As CollectionChangeEventArgs)
[JScript] protected function OnCollectionChanged(ccevent: CollectionChangeEventArgs);
Description
  Raises the System.Data.DataTableCollection.OnCollectionChanged (System.ComponentModel.CollectionChangeEventArgs) event.
  Raising an event invokes the event handler through a delegate. For an overview, see. A System.ComponentModel.CollectionChangeEventArgs that contains the event data.
    On Collection Changing
[C#] protected internal virtual void OnCollectionChanging (CollectionChangeEventArgs ccevent);
[C++] protected public: virtual void OnCollectionChanging (CollectionChangeEventArgs* ccevent);
[VB] Overridable Protected Friend Dim Sub OnCollectionChanging(ByVal cceventAs CollectionChangeEventArgs)
[JScript] package function OnCollectionChanging(ccevent: CollectionChangeEventArgs);
Description
  Raises the System.Data.DataTableCollection.OnCollectionChanging (System.ComponentModel.CollectionChangeEventArgs) event.
  Raising an event invokes the event handler through a delegate. For an overview, see. A System.ComponentModel.CollectionChangeEventArgs that contains the event data.
    Remove
[C#] public void Remove(DataTable table);
[C++] public: void Remove(DataTable* table);
[VB] Public Sub Remove(ByVal table As DataTable)
[JScript] public function Remove(table: DataTable);
  Removes a table from the collection.
Description
  Removes the specified table from the collection.
  The System.Data.DataTableCollection.OnCollectionChanged (System.ComponentModel.CollectionChangeEventArgs) event occurs when a table is succesfully removed. The System.Data.DataTable to remove.
    Remove
[C#] public void Remove(string name);
[C++] public: void Remove(String* name);

[VB] Public Sub Remove(ByVal name As String)
[JScript] public function Remove(name: String);
Description
  Removes the table with a specified name from the collection.
  The System.Data.DataTableCollection.OnCollectionChanged (System.ComponentModel.CollectionChangeEventArgs) event occurs when a table is succesfully removed. The name of the System.Data.DataTable to remove.
    RemoveAt
[C#] public void RemoveAt(int index);
[C++] public: void RemoveAt(int index);
[VB] Public Sub RemoveAt(ByVal index As Integer)
[JScript] public function RemoveAt(index: int);
Description
  Removes the table at the given index from the collection
  The collection doesn't have a table at this index.
  The System.Data.DataTableCollection.OnCollectionChanged (System.ComponentModel.CollectionChangeEventArgs) event occurs when a table is successfully removed. The index at which to remove a table.
    Data View class (System.Data)
    ToString
Description
  Represents a databindable, customized view of a System.Data.DataTable for sorting, filtering, searching, editing, and navigation.
  A major function of the System.Data.DataView is to allow data binding on both Windows Forms and Web Forms.
    DataView
    Example Syntax:
    ToString
[C#] public Data View( );
[C++] public: Data View( );
[VB] Public Sub New( )
[JScript] public function Data View( ); Initializes a new instance of the System.Data.DataView class.
Description
  Initializes a new instance of the System.Data.DataView class.
    DataView
    Example Syntax:
    ToString
[C#] public DataView(DataTable table);
[C++] public: DataView(DataTable* table);
[VB] Public Sub New(ByVal table As DataTable)
[JScript] public function DataView(table: DataTable);
Description
  Initializes a new instance of the System.Data.DataView class with the specified System.Data.DataTable. A System.Data.DataTable to add to the System.Data.DataView.
    DataView
    Example Syntax:
    ToString
[C#] public DataView(DataTable table, string RowFilter, string Sort, DataViewRowState RowState);
[C++] public: DataView(DataTable* table, String* RowFilter, String* Sort, DataViewRowState RowState);
[VB] Public Sub New(ByVal table As DataTable, ByVal RowFilter As String, ByVal Sort As String, ByVal RowState As DataViewRowState)
[JScript] public function DataView(table: DataTable, RowFilter: String, Sort: String, RowState: DataViewRowState); Initializes a new instance of the System.Data.DataView class with the specified System.Data.DataTable.

AllowDelete
  ToString
[C#] public bool AllowDelete {get; set}
[C++] public: __property bool get_AllowDelete( );public: __property void set_AllowDelete(bool);
[VB] Public Property AllowDelete As Boolean
[JScript] public function get AllowDelete( ): Boolean;public function set AllowDelete(Boolean);
Description
  Sets or gets a value indicating whether deletes are allowed.
    AllowEdit
    ToString
[C#] public bool AllowEdit {get; set;}
[C++] public: __property bool get_AllowEdit( );public: __property void set_AllowEdit(bool);
[VB] Public Property AllowEdit As Boolean
[JScript] public function get AllowEdit( ): Boolean;public function set AllowEdit(Boolean);
Description
  Gets or sets a value indicating whether edits are allowed.
    AllowNew
    ToString
[C#] public bool AllowNew {get; set;}
[C++] public: __property bool get_AllowNew( );public: __property void set_AllowNew(bool);
[VB] Public Property AllowNew As Boolean
[JScript] public function get AllowNew( ): Boolean;public function set AllowNew(Boolean);
Description
  Gets or sets a value indicating whether the new rows can be added using the System.Data.DataView.AddNew method.
    ApplyDefaultSort
    ToString
[C#] public bool ApplyDefaultSort {get; set;}
[C++] public: __property bool get_ApplyDefaultSort( );public: __property void set_ApplyDefaultSort(bool);
[VB] Public Property ApplyDefaultSort As Boolean
[JScript] public function get ApplyDefaultSort( ): Boolean;, public function set ApplyDefaultSort(Boolean);
Description
  Gets or sets a value indicating whether to use the default sort.
    Container
    Count
    ToString
Description
  Gets the number of records in the System.Data.DataView after System.Data.DataView.RowFilter and System.Data.DataView.RowStateFilter have been applied.
    DataViewManager
    ToString
[C#] public DataViewManager DataViewManager {get;}
[C++] public: __property DataViewManager* get_DataViewManager( );
[VB] Public ReadOnly Property DataViewManager As DataViewManager
[JScript] public function get DataViewManager( ): DataViewManager;
Description
  Gets the System.Data.DataView associated with this view.
    DesignMode
    Events
    IsOpen
    ToString Description Gets a value indicating whether the data source is currently open and projecting views of data on the System.Data.DataTable.

A System.Data.DataView is a "view" on a System.Data.DataTable because it provides custom sorting and filtering of the data. The System.Data.DataView.IsOpen property can be queried to determine if a System.Data.DataView has been opened using the System.Data.DataView. Open method.

Item
ToString
[C#] public DataRow View this[int recordIndex] {get;}
[C++] public: __property DataRowView* get_Item(int recordIndex);
[VB] Public Default ReadOnly Property Item (ByVal recordIndex As Integer) As DataRowView
[JScript] returnValue=DataViewObject.Item(recordIndex);
Description Gets a row of data from a specified table. The index of a record in the System.Data.DataTable.

RowFilter
ToString
[C#] public virtual string RowFilter {get; set;}
[C++] public: __property virtual String* get_RowFilter( ); public: __property virtual void set_RowFilter(String*);
[VB] Overridable Public Property RowFilter As String
[JScript] public function get RowFilter( ): String;public function set RowFilter(String);
Description Gets or sets the expression used to filter which rows are viewed in the System.Data.DataView.

To form a System.Data.DataView.RowFilter value, specify the name of a column followed by an operator and a value to filter on. The value must be in quotes. For example: "LastName='Smith'" See the System.Data.DataColumn class's System.Data.DataColumn.Expression property for more information.

RowStateFilter
ToString
[C#] public DataViewRowState RowStateFilter {get; set;}
[C++] public: __property DataViewRowState get_RowStateFilter( );public: __property void set_RowStateFilter(DataViewRowState);
[VB] Public Property RowStateFilter As DataViewRowState
[JScript]public function get RowStateFilter( ): DataViewRowState;public function set RowStateFilter (DataViewRowState);
Description Gets or sets the row state filter used in the System.Data.DataView.

Only rows that have been deleted using the System.Data.DataView.Delete(System.Int32) method will have their System.Data.DataView.RowStateFilter value set to Deleted. Those rows added using the System.Data.DataView.AddNew method will similarly have the property set to Added.

Site
Sort
ToString
Description

Gets or sets the sort column or columns, and sort order for the table.

See the System.Data.DataColumn.Expression property of System.Data.DataColumn for more details on forming a System.Data.DataView.Sort expression.

Table
ToString
[C#] public DataTable Table {get; set;}
[C++] public: __property DataTable* get_Table( );public: __property void set_Table(DataTable*);
[VB] Public Property Table As DataTable
[JScript] public function get Table( ): DataTable;public function set Table(DataTable);
Description Gets or sets the source System.Data.DataTable.

The System.Data.DataTable also has a System.Data.DataTable.DefaultView property which returns the default System.Data.DataView for the table. For example, if you wish to create a custom view on the table, set the System.Data.DataView.RowFilter on the System.Data.DataView returned by the System.Data.DataTable.DefaultView ToString
Description Occurs when the list managed by the System.Data.DataView changes.

AddNew
[C#] public virtual DataRowView AddNew( );
[C++] public: virtual DataRowView* AddNew( );
[VB] Overridable Public Function AddNew( ) As DataRowView
[JScript] public function AddNew( ): DataRowView;
Description Adds a new row to the System.Data.DataView.
Return Value: A System.Data.DataRowView.

BeginInit
[C#] public void BeginInit( );
[C++] public: __sealed void BeginInit( );
[VB] NotOverridable Public Sub BeginInit( )
[JScript] public function BeginInit( );
Description Begins the initialization of a System.Data.DataView that is used on a form or used by another component. The initialization occurs at runtime.

The Visual Studio.NET design environment uses this method to start the initialization of a component that is used on a form or used by another component. The System.Data.DataView.EndInit method ends the initialization. Using the BeginInit and EndInit methods prevents the control from being used before it is fully initialized.

Close
[C#] protected void Close( );
[C++] protected: void Close( );
[VB] Protected Sub Close( )
[JScript] protected function Close( );
Description Closes the System.Data.DataView.

The method allows you to manually close the System.Data.DataView in derived classes. Use the corresponding System.Data.DataView. Open method to open the System.Data.DataView.

ColumnCollectionChanged
[C#] protected virtual void ColumnCollectionChanged (object sender, CollectionChangeEventArgs e);
[C++] protected: virtual void ColumnnCollectionChanged (Object* sender, CollectionChangeEventArgs* e);
[VB] Overridable Protected Sub ColumnCollectionChanged (ByVal sender As Object, ByVal e As CollectionChangeEventArgs)
[JScript] protected function ColumnCollectionChanged (sender: Object, e: CollectionChangeEventArgs);
Description Occurs after a System.Data.DataColumnCollection has been changed successfully. The source of the event. A System.ComponentModel.ListChangedEventArgs that contains the event data.

CopyTo

[C#] public void CopyTo(Array array, int index);
[C++] public: _sealed void CopyTo(Array* array, int index);
[VB] NotOverridable Public Sub CopyTo(ByVal array As Array, ByVal index As Integer)
[JScript] public function CopyTo(array: Array, index: int);

Description

Copies items into an array. Only for Web Forms Interfaces. array to copy into. index to start at.

Delete

[C#] public void Delete(int index);
[C++] public: void Delete(int index);
[VB] Public Sub Delete(ByVal index As Integer)
[JScript] public function Delete(index: int);

Description

Deletes a row at the specified index.

After deleting a System.Data.DataRow, its state changes to DataViewRowState.Deleted. You can roll back the deletion by calling System.Data.DataTable.RejectChanges on the System.Data.DataTable. The index of the row to delete.

Dispose

[C#] protected override void Dispose(bool disposing);
[C++] protected: void Dispose(bool disposing);
[VB] Overrides Protected Sub Dispose(ByVal disposing As Boolean)
[JScript] protected override function Dispose(disposing: Boolean);

Description

Disposes of the resources (other than memory) used by the System.Data.DataView object.

Property change notifications between the System.Data.DataView and the underlying System.Data.DataTable stop after this method is called.

EndInit

[C#] public void EndInit( );
[C++] public: _sealed void EndInit( );
[VB] NotOverridable Public Sub EndInit( )
[JScript] public function EndInit( );

Description

Ends the initialization of a System.Data.DataView that is used on a form or used by another component. The initialization occurs at runtime.

The Visual Studio.NET design environment uses this method to end the initialization of a component that is used on a form or used by another component. The System.Data.DataView.BeginInit method starts the initialization. Using the BeginInit and EndInit methods prevents the control from being used before it is fully initialized.

Find

[C#] public int Find(object key);
[C++] public: int Find(Object* key);
[VB] Public Function Find(ByVal key As Object) As Integer
[JScript] public function Find(key: Object): int; Finds a row in the System.Data.DataView by the specified primary key value.

Description

Finds a row in the System.Data.DataView by the specified primary key value.
Return Value: The index of the row in the System.Data.DataView containing the primary key value specified; otherwise a null value if the primary key value does not exist. The object to search for.

Find

[C#] public int Find(object[ ] key);
[C++] public: int Find(Object* key _gc[ ]);
[VB] Public Function Find(ByVal key( ) As Object) As Integer
[JScript] public function Find(key: Object[ ]) int;

Description

Finds an array of rows in the System.Data.DataView by the specified primary key values.
Return Value: The array of row indexes in the System.Data.DataView containing the primary key values specified; otherwise a null value if the primary key values do not exist. An array of values, typed as System.Object.

FindRows

[C#] public DataRowView[ ] FindRows(object key);
[C++] public: DataRowView* FindRows(Object* key) [ ];
[VB] Public Function FindRows(ByVal key As Object) As DataRowView( )
[JScript] public function FindRows(key: Object): DataRowView[ ]; Finds a row in the System.Data.DataView by the specified primary key value.

FindRows

[C#] public DataRowView[ ] FindRows(object[ ] key);
[C++] public: DataRowView* FindRows(Object* key _gc[ ]) [ ],
[VB] Public Function FindRows(ByVal key( ) As Object) As DataRowView( )
[JScript] public function FindRows(key: Object[ ]): DataRowView[ ]; Finds a row in the System.Data.DataView by the specified primary key values.

GetEnumerator

[C#] public IEnumerator GetEnumerator( );
[C++] public: _sealed IEnumerator* GetEnumerator( );
[VB] NotOverridable Public Function GetEnumerator( ) As IEnumerator
[JScript] public function GetEnumerator( ): IEnumerator;

Description

Gets an enumerator for this System.Data.DataView.
Return Value: An System.Collections.IEnumerator for navigating through the list IndexListChanged

[C#] protected virtual void IndexListChanged(object sender, ListChangedEventArgs e);
[C++] protected: virtual void IndexListChanged(Object* sender, ListChangedEventArgs* e);
[VB] Overridable Protected Sub IndexListChanged(ByVal sender As Object, ByVal e As ListChangedEventArgs)
[JScript] protected function IndexListChanged(sender: Object, e: ListChangedEventArgs);

Description

Occurs after a System.Data.DataView has been changed successfully. The source of the event. A System.ComponentModel.ListChangedEventArgs that contains the event data.

OnListChanged

[C#] protected virtual void OnListChanged (ListChangedEventArgs e);
[C++] protected: virtual void OnListChanged (ListChangedEventArgs* e);
[VB] Overridable Protected Sub OnListChanged(ByVal e As ListChangedEventArgs)
[JScript] protected function OnListChanged(e: ListChangedEventArgs);

Description

Raises the System.Data.DataView.ListChanged event. A System.ComponentModel.ListChangedEventArgs that contains the event data.

Open

[C#] protected void Open( );
[C++] protected: void Open( );

[VB] Protected Sub Open( )
[JScript] protected function Open( );
Description
   Opens a System.Data.DataView.
   The method allows you to manually open the System.Data.DataView in derived classes. Use the corresponding System.Data.DataView.Close method to close the System.Data.DataView.
   Reset
[C#] protected void Reset( );
[C++] protected: void Reset( );
[VB] Protected Sub Reset( )
[JScript] protected function Reset( );
Description
   Reserved for internal use only.
   IList.Add
[C#] int IList.Add(object value);
[C++] int IList::Add(Object* value);
[VB] Function Add(ByVal value As Object) As Integer Implements IList.Add
[JScript] function IList.Add(value: Object): int;
   IList.Clear
[C#] void IList.Clear( );
[C++] void IList::Clear( );
[VB] Sub Clear( ) Implements IList.Clear
[JScript] function IList.Clear( );
   IList.Contains
[C#] bool IList.Contains(object value);
[C++] bool IList::Contains(Object* value);
[VB] Function Contains(ByVal value As Object) As Boolean Implements IList.Contains
[JScript] function IList.Contains(value: Object): Boolean;
   IList.IndexOf
[C#] int IList.IndexOf(object value);
[C++] int IList::IndexOf(Object* value);
[VB] Function IndexOf(ByVal value As Object) As Integer Implements IList.IndexOf
[JScript] function IList.IndexOf(value: Object) int;
   IList.Insert
[C#] void IList.Insert(int index, object value);
[C++] void IList::Insert(int index, Object* value);
[VB] Sub Insert(ByVal index As Integer, ByVal value As Object) Implements IList.Insert
[JScript] function IList.Insert(index: int, value: Object);
   IList.Remove
[C#] void IList.Remove(object value);
[C++] void IList::Remove(Object* value);
[VB] Sub Remove(ByVal value As Object) Implements IList.Remove
[JScript] function IList.Remove(value: Object);
   IList.RemoveAt
[C#] void IList.RemoveAt(int index);
[C++] void IList::RemoveAt(int index);
[VB] Sub RemoveAt(ByVal index As Integer) Implements IList.RemoveAt
[JScript] function IList.RemoveAt(index: int);
   IBindingList.AddIndex
[C#] void IBindingList.AddIndex(PropertyDescriptor property);
[C++] void IBindingList::AddIndex(PropertyDescriptor* property);
[VB] Sub AddIndex(ByVal property As PropertyDescriptor) Implements IBindingList.AddIndex
[JScript] function IBindingList.AddIndex(property: PropertyDescriptor);
   IBindingList.AddNew
[C#] object IBindingList.AddNew( );
[C++] Object* IBindingList::AddNew( );
[VB] Function AddNew( ) As Object Implements IBindingList.AddNew
[JScript] function IBindingList.AddNew( ): Object;
   IBindingList.ApplySort
[C#] void IBindingList.ApplySort(PropertyDescriptor property, ListSortDirection direction);
[C++] void IBindingList::ApplySort(PropertyDescriptor* property, ListSortDirection direction);
[VB] Sub ApplySort(ByVal property As PropertyDescriptor, ByVal direction As ListSortDirection) Implements IBindingList.ApplySort
[JScript] function IBindingList.ApplySort(property PropertyDescriptor, direction: ListSortDirection);
   IBindingList.Find
[C#]int IBindingList.Find(PropertyDescriptor property, object key);
[C++] int IBindingList:Find(PropertyDescriptor property, Object key);
[VB] Function Find(ByVal property As PropertyDescriptor, ByVal key As Object) As Integer Implements IBindingList.Find
[JScript] function IBindingList.Find(property: PropertyDescriptor, key: Object): int;
   IBindingList.RemoveIndex
[C#] void IBindingList.RemoveIndex(PropertyDescriptor property);
[C++] void IBindingList::RemoveIndex (PropertyDescriptor* property);
[VB] Sub RemoveIndex(ByVal property As PropertyDescriptor) Implements IBindingList.RemoveIndex
[JScript] function IBindingList.RemoveIndex(property: PropertyDescriptor); IBindingList.RemoveSort
[C#] void IBindingList.RemoveSort( );
[C++] void IBindingList::RemoveSort( );
[VB] Sub RemoveSort( ) Implements IBindingList.RemoveSort
[JScript] function IBindingList.RemoveSort( );
   ITypedList.GetItemProperties
[C#] PropertyDescriptorCollection ITypedList.GetItemProperties(PropertyDescriptor[ ] listAccessors);
[C++] PropertyDescriptorCollection* ITypedList::GetItemProperties(PropertyDescriptor* listAccessors[ ]);
[VB] Function GetItemProperties(ByVal listAccessors( ) As PropertyDescriptor) As PropertyDescriptorCollection Implements ITypedList.GetItemProperties
[JScript] function ITypedList.GetItemProperties (listAccessors: PropertyDescriptor[ ]): PropertyDescriptorCollection;
   ITypedList.GetListName
[C#] string ITypedList.GetListName(PropertyDescriptor[ ] listAccessors);
[C++] String* ITypedList::GetListName (PropertyDescriptor* listAccessors[ ]);
[VB] Function GetListName(ByVal listAccessors( ) As PropertyDescriptor) As String Implements ITypedList.GetListName
[JScript] function ITypedList.GetListName(listAccessors: PropertyDescriptor[ ]): String;
   UpdateIndex
[C#] protected void UpdateIndex( );
[C++] protected: void UpdateIndex( );
[VB] Protected Sub UpdateIndex( )
[JScript] protected function UpdateIndex( ); Reserved for internal use only.

Description
    Reserved for internal use only.
    UpdateIndex.
[C#]protected virtual void UpdateIndex(bool force);
[C++] protected: virtual void UpdateIndex(bool force);
[VB] Overridable Protected Sub UpdateIndex(ByVal force As Boolean)
[JScript] protected function UpdateIndex(force: Boolean);
Description
    Reserved for internal use only. Reserved for internal use only.
    DataViewManager class (System.Data)
    UpdateIndex
Description
    Contains a default System.Data.DataViewSettingCollection for each System.Data.DataTable in a System.Data.DataSet.
    DataViewManager
    Example Syntax:
    UpdateIndex
[C#] public DataViewManager( );
[C++] public: DataViewManager( );
[VB] Public Sub New( )
[JScript] public function DataViewManager( ); Initializes a new instance of the System.Data.DataViewManager class.
Description
    Initializes a new instance of the System.Data.DataViewManager class.
    DataViewManager
    Example Syntax:
    UpdateIndex
[C#] public DataViewManager(DataSet dataSet);
[C++] public: DataViewManager(DataSet* dataSet);
[VB] Public Sub New(ByVal dataSet As DataSet)
[JScript] public function DataViewManager(dataSet: DataSet);
Description
    Initializes a new instance of the System.Data.DataViewManager class for the specified System.Data.DataSet. The name of the System.Data.DataSet to use.
    Container
    DataSet
    UpdateIndex
Description
    Gets or sets the name of the System.Data.DataSet to use with the System.Data.DataViewManager.
    DataViewSettingCollectionString
    UpdateIndex
[C#] public string DataViewSettingCollectionString {get; set;}
[C++] public: __property String* get_DataViewSettingCollectionString( );public: __property void set_DataViewSettingCollectionString(String*);
[VB] Public Property DataViewSettingCollectionString As String
[JScript] public function get DataViewSettingCollectionString( ): String;public function set DataViewSettingCollectionString(String);
Description
    Gets or sets a value used for code persistence.
    A user should not call System.Data.DataViewManager.DataViewSettingCollectionString directly.
    DataViewSettings
    UpdateIndex
[C#] public DataViewSettingCollection DataViewSettings {get;}
[C++] public: __property DataViewSettingCollection* get_DataViewSettings( );
[VB] Public ReadOnly Property DataViewSettings As DataViewSettingCollection
[JScript] public function get DataViewSettings( ): DataViewSettingCollection;
Description
    Gets the System.Data.DataViewSettingCollection for each System.Data.DataTable in the System.Data.DataSet.
    DesignMode
    Events
    Site
    UpdateIndex
Description
    Occurs a row is added to or deleted from a System.Data.DataView.
    CreateDataView
[C#] public DataView CreateDataView(DataTable table);
[C++] public: DataView* CreateDataView(DataTable* table);
[VB] Public Function CreateDataView(ByVal table As DataTable) As DataView
[JScript] public function CreateDataView(table: DataTable): DataView;
Description
    Creates a System.Data.DataView for the specified System.Data.DataTable. The name of the System.Data.DataTable to use in the System.Data.DataView.
    OnListChanged
[C#] protected virtual void OnListChanged(ListChangedEventArgs e);
[C++] protected: virtual void OnListChanged(ListChangedEventArgs* e);
[VB] Overridable Protected Sub OnListChanged(ByVal e As ListChangedEventArgs)
[JScript] protected function OnListChanged(e: ListChangedEventArgs);
Description
    Raises the System.Data.DataViewManager.ListChanged event. A System. ComponentModel.ListChangedEventArgs that contains the event data.
    Relation Collection Changed
[C#] protected virtual void RelationCollectionChanged(object sender, CollectionChangeEventArgs e);
[C++] protected: virtual void RelationCollectionChanged(Object* sender, CollectionChangeEventArgs* e);
[VB] Overridable Protected Sub RelationCollectionChanged(ByVal sender As Object, ByVal e As Collection ChangeEventArgs)
[JScript] protected function RelationCollectionChanged(sender: Object, e: CollectionChangeEventArgs);
Description
    Raises a System.Data.DataRelation Collection.CollectionChanged event when a System.Data.DataRelation is added to or removed from the System.Data.DataRelationCollection. The source of the event. A System.ComponentModel.CollectionChangeEventArgs that contains the event data.
    ICollection.CopyTo
[C#] void ICollection.CopyTo(Array array, int index);
[C++] void ICollection::Copy To(Array* array, int index);
[VB] Sub CopyTo(ByVal array As Array, ByVal index As Integer) Implements ICollection.CopyTo
[JScript] function ICollection.CopyTo(array Array, index: int);
    IEnumerable.GetEnumerator
[C#] IEnumerator IEnumerable.GetEnumerator( );

[C++] IEnumerator* IEnumerable::GetEnumerator( );
[VB] Function GetEnumerator( ) As IEnumerator Implements IEnumerable.GetEnumerator
[JScript] function IEnumerable.GetEnumerator( ): IEnumerator;
IList.Add
[C#] int IList.Add(object value);
[C++] int IList::Add(Object* value);
[VB] Function Add(ByVal value As Object) As Integer Implements IList.Add
[JScript] function IList.Add(value: Object): int;
IList.Clear
[C#] void IList.Clear( );
[C++] voidIList::Clear( );
[VB] Sub Clear( ) Implements IList.Clear
[JScript] function IList.Clear( );
IList.Contains
[C#] bool IList Contains(object value);
[C++] bool IList::Contains(Object* value);
[VB] Function Contains(ByVal value As Object) As Boolean Implements IList.Contains
[JScript] function IList.Contains(value: Object): Boolean;
IList.IndexOf
[C#] int IList.IndexOf(object value);
[C++] int IList::IndexOf(Object* value);
[VB] Function IndexOf(ByVal value As Object) As Integer Implements IList.IndexOf
[JScript] function IList.IndexOf(value: Object) int;
IList.Insert
[C#] void IList.Insert(int index, object value);
[C++] void IList::Insert(int index, Object* value);
[VB] Sub Insert(ByVal index As Integer, ByVal value As Object) Implements IList.Insert
[JScript] function IList.Insert(index: int, value: Object);
IList.Remove
[C#] void IList.Remove(object value);
[C++] void IList::Remove(Object* value);
[VB] Sub Remove(ByVal value As Object) Implements IList.Remove
[JScript] function IList.Remove(value: Object);
IList.RemoveAt
[C#] void IList.RemoveAt(int index);
[C++] void IList::RemoveAt(int index);
[VB] Sub RemoveAt(ByVal index As Integer) Implements IList.RemoveAt
[JScript] function IList.RemoveAt(index: int);
IBindingList.AddIndex
[C#] void IBindingList.AddIndex(PropertyDescriptor property);
[C++] void IBindingList::AddIndex(PropertyDescriptor* property);
[VB] Sub AddIndex(ByValproperty As PropertyDescriptor) Implements IBindingList.AddIndex
[JScript] function IBindingList.AddIndex(property: PropertyDescriptor);
IBindingList.AddNew
[C#] object IBindingList.AddNew( );
[C++] Object* IBindingList::AddNew( );
[VB] Function AddNew( ) As Object Implements IBindingList.AddNew
[JScript] function IBindingList.AddNew( ): Object;
IBindingList.ApplySort
[C#] void IBindingList.ApplySort(PropertyDescriptor property, ListSortDirection direction);
[C++] void IBindingList::ApplySort(PropertyDescriptor* property, ListSortDirection direction);
[VB] Sub ApplySort(ByVal property As PropertyDescriptor, ByVal direction As ListSortDirection) Implements IBindingList.ApplySort

[JScript] function IBindingList.ApplySort(property PropertyDescriptor, direction: ListSortDirection);
IBindingList.Find
[C.# ] IBindingList.Find(PropertyDescriptor property, object key);
[C++] int IBindingList::Find(PropertyDescriptor* property, Object* key);
[VB] Function Find(ByVal property As PropertyDescriptor, ByVal key As Object) As Integer Implements IBindingList.Find
[JScript] function IBindingList.Find(property PropertyDescriptor, key: Object): int;
IBindingList.RemoveIndex
[C#] void IBindingList.RemoveIndex(PropertyDescriptor property);
[C++] void IBindingList::RemoveIndex (PropertyDescriptor* property);
[VB] Sub RemoveIndex(ByVal property As PropertyDescriptor) Implements IBindingList.RemoveIndex
[JScript] function IBindingList.RemoveIndex(property: PropertyDescriptor);
IBindingList.RemoveSort
[C#] void IBindingList.RemoveSort( );
[C++] void IBindingList::RemoveSort( );
[VB] Sub RemoveSort( ) Implements IBindingList.RemoveSort
[JScript] function IBindingList.RemoveSort( );
ITypedList.GetItemProperties
[C#] PropertyDescriptorCollection ITypedList.GetItemProperties(PropertyDescriptor[ ] listAccessors);
[C++] PropertyDescriptorCollection* ITypedList::GetItemProperties(PropertyDescriptor* listAccessors[ ]);
[VB] Function GetItemProperties(ByVal listAccessors( ) As PropertyDescriptor) As PropertyDescriptorCollection Implements ITypedList.GetItemProperties
[JScript] function ITypedList.GetItemProperties (listAccessors: PropertyDescriptor[ ]: PropertyDescriptorCollection;
ITypedList.GetListName
[C#] string ITypedList.GetListName(PropertyDescriptor[ ] listAccessors);
[C++] String* ITypedList::GetListName (PropertyDescriptor* listAccessors[ ]);
[VB] Function GetListName(ByVal listAccessors( ) As PropertyDescriptor) As String Implements ITypedList.GetListName
[JScript] function ITypedList.GetListName(listAccessors: PropertyDescriptor[ ]): String;
TableCollectionChanged
[C#] protected virtual void TableCollectionChanged(object sender, Collection ChangeEventArgs e);
[C++] protected: virtual void TableCollectionChanged (Object* sender, CollectionChangeEventArgs* e);
[VB] Overridable Protected Sub TableCollection Changed (ByVal sender As Object, ByVal e As CollectionChangeEventArgs)
[JScript] protected function TableCollectionChanged (sender: Object, e: CollectionChangeEventArgs);
Description
Raises a System.Data.DataTableCollection.CollectionChanged event when a System.Data.DataTable is added to or removed from the System.Data.DataTableCollection. The source of the event. A System.ComponentModel.CollectionChangeEventArgs that contains the event data.

DataViewRowState enumeration (System.Data)
ToString
Description
   Describes the version of data in a System.Data.DataRow. The System.Data.DataViewRowState values are used either to retrieve a particular version of data from a System.Data.DataRow, or to determine what versions exist.
   ToString
[C#] public const DataViewRowState Added;
[C++] public: const DataViewRowState Added;
[VB] Public Const Added As DataViewRowState
[JScript] public var Added: DataViewRowState;
Description
   A new row.
   ToString
[C#] public const DataViewRowState CurrentRows;
[C++] public: const DataViewRowState CurrentRows;
[VB] Public Const CurrentRows As DataViewRowState
[JScript] public var CurrentRows: DataViewRowState;
Description
   Current rows including unchanged, new, and modified rows.
   ToString
[C#] public const DataViewRowState Deleted,
[C++] public: const DataViewRowState Deleted;
[VB] Public Const Deleted As DataViewRowState
[JScript] public var Deleted: DataViewRowState;
Description
   A deleted row.
   ToString
[C#] public const DataViewRowState ModifiedCurrent;
[C++] public: const DataViewRowState ModifiedCurrent;
[VB] Public Const ModifiedCurrent As DataViewRowState
[JScript] public var ModifiedCurrent: DataViewRowState;
Description
   A current version, which is a modified version of original data (see ModifiedOriginal).
   ToString
[C#] public const DataViewRowState ModifiedOriginal;
[C++] public: const DataViewRowState ModifiedOriginal;
[VB] Public Const ModifiedOriginal As DataViewRowState
[JScript] public var ModifiedOriginal: DataViewRowState;
Description
   The original version (although it has since been modified and is available as ModifiedCurrent).
   ToString
[C#] public const DataViewRowState None;
[C++] public: const DataViewRowState None;
[VB] Public Const None As DataViewRowState
[JScript] public var None: DataViewRowState;
Description
   None.
   ToString
[C#] public const DataViewRowState OriginalRows;
[C++] public: const DataViewRowState OriginalRows;
[VB] Public Const OriginalRows As DataViewRowState
[JScript] public var OriginalRows: DataViewRowState;
Description
   Original rows including unchanged and deleted rows.
   ToString
[C#] public const DataViewRowState Unchanged;
[C++] public: const DataViewRowState Unchanged;
[VB] Public Const Unchanged As DataViewRowState
[JScript] public var Unchanged: DataViewRowState;
Description
   An unchanged row.
DataViewSetting class (System.Data)
ToString
Description
   Represents the default settings for ApplyDefaultSort, DataViewManager, RowFilter, RowStateFilter, Sort, and Table for DataViews created from the System.Data.DataViewManager.
   ApplyDefaultSort
   ToString
[C#] public bool ApplyDefaultSort {get; set,}
[C++] public: __property bool get_ApplyDefaultSort( );
   public: __property void set_ApplyDefaultSort(bool);
[VB] Public Property ApplyDefaultSort As Boolean
[JScript] public function get ApplyDefaultSort( ): Boolean;public function set ApplyDefaultSort(Boolean);
Description
   Gets or sets a value indicating whether to use the default sort.
   DataViewManager
   ToString
[C#] public DataViewManager DataViewManager {get;}
[C++] public: __property DataViewManager* get_DataViewManager( );
[VB] Public ReadOnly Property DataViewManager As DataViewManager
[JScript] public function get DataViewManager( ): DataViewManager;
Description
   Gets the System.Data.DataViewManager that contains this System.Data.DataViewSetting.
   RowFilter
   ToString
[C#] public string RowFilter {get; set;}
[C++] public: __property String* get_RowFilter( );public: __property void set_RowFilter(String*);
[VB] Public Property RowFilter As String
[JScript] public function get RowFilter( ): String;public function set RowFilter(String);
Description
   Gets or sets the filter to apply in the System.Data.DataView.
   RowStateFilter
   ToString
[C#] public DataViewRowState RowStateFilter {get; set;}
[C++] public: __property DataViewRowState get_RowStateFilter( );public: __property void set_RowStateFilter(DataViewRowState);
[VB] Public Property RowStateFilter As DataViewRowState
[JScript] public function get RowStateFilter( ): DataViewRowState;public function set RowStateFilter (DataViewRowState);
Description
   Gets or sets a value indicating whether to display Current, Deleted, Modified Current, ModifiedOriginal, New, Original, Unchanged, or no rows in the System.Data.DataView.
   Sort
   ToString
[C#] public string Sort {get; set;}
[C++] public: __property String* get_Sort( );public: __property void set_Sort(String*);
[VB] Public Property Sort As String
[JScript] public function get Sort( ): String;public function set Sort(String);
Description
   Gets or sets a value indicating the Sort to apply in the System.Data.DataView.

Table
ToString
[C#] public DataTable Table {get;}
[C++] public: _property DataTable* get_Table( );
[VB] Public ReadOnly Property Table As DataTable
[JScript] public function get Table( ): DataTable;
Description
Gets the System.Data.DataTable to which the System.Data.DataViewSetting properties apply.
DataViewSettingCollection class (System.Data)
ToString
Description
Contains a read-only collection of System.Data.DataViewSetting objects for each System.Data.DataTable in a System.Data.DataSet.
A user cannot add or remove a DataViewSetting from the collection, but can change the properties of the DataViewSetting corresponding to a particular DataTable. Adding or removing a DataTable from the DataSet adds or removes the corresponding DataViewSetting from the collection.
Count
ToString
[C#] public virtual int Count {get;}
[C++] public: _property virtual int get_Count( );
[VB] Overridable Public ReadOnly Property Count As Integer
[JScript] public function get Count( ): int;
Description
Gets the number of System.Data.DataViewSetting objects in the System.Data.DataViewSettingCollection.
The number of System.Data.DataViewSetting objects is the same as the number of System.Data.DataTable objects in the System.Data.DataSet.
IsReadOnly
ToString
[C#] public bool IsReadOnly {get;}
[C++] public: _property bool get_IsReadOnly( );
[VB] Public ReadOnly Property IsReadOnly As Boolean
[JScript] public function get IsReadOnly( ): Boolean;
Description
Gets a value indicating whether the System.Data.DataViewSettingCollection is read-only.
IsSynchronized
ToString
[C#] public bool IsSynchronized {get;}
[C++] public: _property bool get_IsSynchronized( );
[VB] Public ReadOnly Property IsSynchronized As Boolean
[JScript] public function get IsSynchronized( ): Boolean;
Description
Gets a value indicating whether access to the System.Data.DataViewSettingCollection is synchronized (thread-safe).
This property implements the System.Collections.ICollection interface.
Item
ToString
[C#] public virtual DataViewSetting this[DataTable table] {get; set;}
[C++] public: _property virtual DataViewSetting* get_Item(DataTable* table);public: _property virtual void set_Item(DataTable* table, DataViewSetting*);
[VB] Overridable Public Default Property Item(ByVal table As DataTable) As DataViewSetting
[JScript] returnValue= DataViewSettingCollectionObject.Item(table); DataViewSettingCollectionObject.Item(table)= returnValue; Gets the specified System.Data.DataTable from the collection.

Description
Gets the specified System.Data.DataTable object from the collection. The System.Data.DataTableto find.
Item
ToString
[C#] public virtual DataViewSetting this[string tableName] {get;}
[C++] public: _property virtual DataViewSetting* get_Item(String* tableName);
[VB] Overridable Public Default ReadOnly Property Item (ByVal tableName As String) As DataViewSetting
[JScript] returnValue= DataViewSettingCollectionObject.Item(tableName);
Description
Gets the specified System.Data.DataTable from the collection. The name of the System.DataDataTable to find.
Item
ToString
[C#] public virtual DataViewSetting this[int index] {get; set;}
[C++] public: _property virtual DataViewSetting* get_Item(int index);public: _property virtual void set_Item (int index, DataViewSetting*);
[VB] Overridable Public Default Property Item(ByVal index As Integer) As DataViewSetting
[JScript] returnValue= DataViewSettingCollectionObject.Item(index); DataViewSettingCollectionObject.Item(index)= returnValue;
Description
Gets the System.Data.DataTable specified by its index. The zero-based index of the System.Data.DataTable to find.
SyncRoot
ToString
[C#] public object SyncRoot {get;}
[C++] public: _property Object* get_SyncRoot( );
[VB] Public ReadOnly Property SyncRoot As Object
[JScript] public function get SyncRoot( ): Object;
Description
Gets an object that can be used to synchronize access to the System.Data.DataViewSettingCollection.
This property implements the System.Collections.ICollection interface.
CopyTo
[C#] public void CopyTo (Array ar, int index);
[C++] public: _sealed void CopyTo(Array* ar, int index);
[VB] NotOverridable Public Sub CopyTo(ByVal ar As Array, ByVal index As Integer)
[JScript] public function CopyTo(ar: Array, index: int);
Description
Copies the elements of the System.Data.DataViewSettingCollection to the specified array. An System.Array to which to copy System.Data.DataViewSettingCollection elements. The starting index of the array.
GetEnumerator
[C#] public IEnumerator GetEnumerator( );
[C++] public: _sealed IEnumerator* GetEnumerator( );
[VB] NotOverridable Public Function GetEnumerator( ) As IEnumerator
[JScript] public function GetEnumerator( ): IEnumerator,
Description
Gets an IEnumerator for the collection.
DBConcurrencyException class (System.Data)
ToString
Description
The exception that is thrown by the DataAdapter during the update operation if the number of rows affected equals zero.

The DataAdapter examines the number of rows affected by the execution of each insert, update, or delete operation, and throws this exception if the number equals zero. This is usually the result of a concurrency violation.
   DBConcurrencyException
   Example Syntax:
   ToString
[C#] public DBConcurrencyException(string message);
[C++] public: DBConcurrencyException(String* message);
[VB] Public Sub New(ByVal message As String)
[JScript] public function DBConcurrencyException (message: String); Initializes a new instance of the System.Data.DBConcurrencyException class.
Description
   Initializes a new instance of the System.Data.DBConcurrencyException class. The text string describing the details of the exception.
   DBConcurrencyException
   Example Syntax:
   ToString
[C#] public DBConcurrencyException(string message, Exception inner);
[C++] public: DBConcurrencyException(String* message, Exception* inner);
[VB] Public Sub New(ByVal message As String, ByVal inner As Exception)
[JScript] public function DBConcurrencyException (message: String, inner: Exception);
Description
   Initializes a new instance of the System.Data.DBConcurrencyException class.
   You can create a new exception that catches an earlier exception. The code that handles the second exception can make use of the additional information from the earlier exception, also called an inner exception, to examine the cause of the initial error. The text string describing the details of the exception. A reference to an inner exception.
   HelpLink
   HResult
   InnerException
   Message
   Row
   ToString
Description
   Gets or sets the value of the System.Data.DataRow.
   Use System.Data.DBConcurrencyException.Row to retrieve the value of the System.Data.DataRow row that generated the System.Data.DBConcurrencyException. Setting the value of the System.Data.DataRow has no effect.
   Source
   StackTrace
   TargetSite
   DbType enumeration (System.Data)
   ToString
Description
   Gets the data type of a field, a property, or a Parameter object of a .NET data provider.
   The type of a parameter is specific to the .NET data provider. Specifying the type converts the value of the Parameter to the .NET data provider Type before passing the value to the data source. If the type is not specified, ADO.NET infers the .NET data provider Type of the Parameter from the .NET Framework Type from the Value property of the Parameter object.
   ToString
[C#] public const DbType AnsiString;
[C++] public: const DbType AnsiString;
[VB] Public Const AnsiString As DbType
[JScript] public var AnsiString: DbType;
Description
   A variable-length stream of non-Unicode characters ranging between 1 and 8,000 characters.
   ToString
[C#] public const DbType AnsiStringFixedLength;
[C++] public: const DbType AnsiStringFixedLength;
[VB] Public Const AnsiStringFixedLength As DbType
[JScript] public var AnsiStringFixedLength: DbType;
   ToString
[C#] public const DbType Binary;
[C++] public: const DbType Binary;
[VB] Public Const Binary As DbType
[JScript] public var Binary: DbType;
Description
   A variable-length stream of binary data ranging between 1 and 8,000 bytes.
   ToString
[C#] public const DbType Boolean;
[C++] public: const DbType Boolean;
[VB] Public Const Boolean As DbType
[JScript] public var Boolean: DbType;
Description
   A simple type representing Boolean values of true or false.
   ToString
[C#] public const DbType Byte;
[C++] public: const DbType Byte;
[VB] Public Const Byte As DbType
[JScript] public var Byte: DbType;
Description
   An 8-bit unsigned integer.
   ToString
[C#] public const DbType Currency;
[C++] public: const Db Type Currency;
[VB] Public Const Currency As DbType
[JScript] public var Currency: DbType;
Description
   A currency value ranging from −2 (or −922,337,203,685, 477.5808) to 2 −1 (or +922,337,203,685,477.5807) with an accuracy to a ten-thousandth of a currency unit.
   ToString
[C#] public const DbType Date;
[C++] public: const DbType Date;
[VB] Public Const Date As DbType
[JScript] public var Date: DbType;
Description
   Date and time data ranging in value from Jan. 1, 1753 to Dec. 31, 9999 to an accuracy of 3.33 milliseconds.
   ToString
[C#] public const DbType DateTime;
[C++] public: const DbType DateTime;
[VB] Public Const DateTime As DbType
[JScript] public var DateTime: DbType;
Description
   A type representing a date and time value.
   ToString
[C#] public const DbType Decimal;
[C++] public: const DbType Decimal,
[VB] Public Const Decimal As DbType
[JScript] public var Decimal: DbType;
Description
   A simple type representing values rangingfrom 1.0×10 to approximately 7.9×10 with 28–29 significant digits.
   ToString
[C#] public const DbType Double;

[C++] public: const DbType Double;
[VB] Public Const Double As DbType
[JScript] public var Double: DbType;
Description
A floating point type representing values ranging from approximately 5.0×10 to 1.7×10 with a precision of 15–16 digits.
ToString
[C#] public const DbType Guid;
[C++] public: const DbType Guid;
[VB] Public Const Guid As DbType
[JScript] public var Guid: DbType;
Description
A globally unique identifier (or GUID).
ToString
[C#] public const DbType Int16;
[C++] public: const DbType Int16;
[VB] Public Const Int16 As DbType
[JScript] public var Int16: DbType;
Description
An integral type representing signed 16-bit integers with values between −32768 and 32767.
ToString
[C#] public const DbType Int32;
[C++] public: const DbType Int32;
[VB] Public Const Int32 As DbType
[JScript] public var Int32: DbType;
Description
An integral type representing signed 32-bit integers with values between −2147483648 and 2147483647.
ToString
[C#] public const DbType Int64;
[C++] public: const DbType Int64;
[VB] Public Const Int64 As DbType
[JScript] public var Int64: DbType;
Description
An integral type representing signed 64-bit integers with values between −9223372036854775808 and 9223372036854775807.
ToString
[C#] public const DbType Object;
[C++] public: const DbType Object;
[VB] Public Const Object As DbType
[JScript] public var Object: DbType;
Description
A general type representing any reference or value type not explicitly represented by another TypeCode.
ToString
[C#] public const DbType SByte;
[C++] public: const DbType SByte;
[VB] Public Const SByte As DbType
[JScript] public var SByte: DbType;
Description
An integral type representing signed 8-bit integers with values between −128 and 127.
ToString
[C#] public const DbType Single;
[C++] public: const DbType Single;
[VB] Public Const Single As DbType
[JScript] public var Single: DbType;
Description
A floating point type representing values ranging from approximately 1.5×10 to 3.4×10 with a precision of 7 digits.
ToString
[C#] public const DbType String;
[C++] public: const DbType String;
[VB] Public Const String As DbType
[JScript] public var String: DbType;
Description
A sealed class type representing Unicode character strings.
ToString
[C#] public const DbType StringFixedLength;.
[C++] public: const DbType StringFixedLength;
[VB] Public Const StringFixedLength As DbType
[JScript] public var StringFixedLength: DbType;
ToString
[C#] public const DbType Time;
[C++] public: const DbType Time;
[VB] Public Const Time As DbType
[JScript] public var Time: DbType;
Description
Date and time data ranging in value from Jan. 1, 1753 to Dec. 31, 9999 to an accuracy of 3.33 milliseconds.
ToString
[C#] public const DbType UInt16;
[C++] public: constDbType UInt16;
[VB] Public Const UInt16 As DbType
[JScript] public var UInt16: DbType;
Description
An integral type representing unsigned 16-bit integers with values between 0 and 65535.
ToString
[C#] public const DbType UInt32;
[C++] public: const DbType UInt32;
[VB] Public Const UInt32 As DbType
[JScript] public var UInt32: DbType;
Description
An integral type representing unsigned 32-bit integers with values between 0 and 4294967295.
ToString
[C#] public const DbType UInt64;
[C++] public: const DbType UInt64;
[VB] Public Const UInt64 As DbType
[JScript] public var UInt64: DbType;
Description
An integral type representing unsigned 64-bit integers with values between 0 and 18446744073709551615.
ToString
[C+] public const DbType VarNumeric;
[C++] public: const DbType VarNumeric;
[VB] Public Const VarNumeric As DbType
[JScript] public var VarNumeric: DbType;
DeletedRowInaccessibleException class (System.Data)
ToString
Description
Represents the exception that is thrown when an action is attempted on a System.Data.DataRow that has been deleted.
To delete a System.Data.DataRow, use the System.Data-.DataRow class's System.Data.DataRow.Delete method. Once you have deleted a row, any attempts to manipulate it will generate the System.Data.DeletedRowInaccessibleException.
DeletedRowInaccessibleException
Example Syntax:
ToString
[C#] public DeletedRowInaccessibleException( );
[C++] public: DeletedRowInaccessibleException( );
[VB] Public Sub New( )
[JScript] public function DeletedRowInaccessibleException( ); Initializes a new instance of the System.Data.DeletedRowInaccessibleException class.
Description Initializes a new instance of the System.Data.DeletedRowInaccessibleException class.
Use the System.Data.DataRow class's System.Data.DataRow.RowState to determine if a row has been deleted.
DeletedRowInaccessibleException
Example Syntax:
ToString
[C#] public DeletedRowInaccessibleException(string s);
[C++] public: DeletedRowInaccessibleException(String* s);
[VB] Public Sub New(ByVal s As String)
[JScript] public function DeletedRowInaccessibleException(s: String);
Description
Initializes a new instance of the System.Data.DeletedRowInaccessibleException class with the specified string.
Use the System.Data.DataRow class's System.Data.DataRow.RowState to determine if a row has been deleted. The string to display when the exception is thrown.
DeletedRowInaccessibleException
Example Syntax:
ToString
[C#] public DeletedRowInaccessibleException(SerializationInfo info, StreamingContext context);
[C++] public: DeletedRowInaccessibleException(SerializationInfo* info, StreamingContext context);
[VB] Public Sub New(ByVal info As SerializationInfo, ByVal context As StreamingContext)
[JScript] public function DeletedRowInaccessibleException(info: SerializationInfo, context: StreamingContext); Initializes a new instance of the System.Data.DeletedRowInaccessibleException class.
Description
Initializes a new instance of the System.Data.DeletedRowInaccessibleException class with serialization information. The data necessary to serialize or deserialize an object. Description of the source and destination of the specified serialized stream.
HelpLink
HResult
InnerException
Message
Source
StackTrace
TargetSite
DuplicateNameException class (System.Data)
ToString
Description
Represents the exception that is thrown when a duplicate database object name is encountered during an add operation in a System.Data.DataSet-related object.
Examples of duplicate database object names that may be encountered are tables, columns, relations, or constraints.
DuplicateNameException
Example Syntax:
ToString
[C#] public DuplicateNameException( );
[C++] public: DuplicateNameException( );
[VB] Public Sub New( )
[JScript] public function DuplicateNameException( );
Description
Initializes a new instance of the System.Data.DuplicateNameException class.
DuplicateNameException
Example Syntax:
ToString
[C#] public DuplicateNameException(string s);
[C++] public: DuplicateNameException(String* s);
[VB] Public Sub New(ByVal s As String)
[JScript] public function DuplicateNameException(s: String);
Description
Initializes a new instance of the System.Data.DuplicateNameException class with the specified string. The string to display when the exception is thrown.
DuplicateNameException
Example Syntax:
ToString
[C#] public DuplicateNameException(SerializationInfo info, StreamingContext context);
[C++] public: DuplicateNameException(SerializationInfo* info, StreamingContext context);
[VB] Public Sub New(ByVal info As SerializationInfo, ByVal context As StreamingContext)
[JScript] public function DuplicateNameException(info: SerializationInfo, context: StreamingContext); Initializes a new instance of the System.Data.DuplicateNameException class.
Description
Initializes a new instance of the System.Data.DuplicateNameException class with serialization information. The data necessary to serialize or deserialize an object. Description of the source and destination of the specified serialized stream.
HelpLink
HResult
InnerException
Message
Source
StackTrace
TargetSite
EvaluateException class (System.Data)
ToString
Description
Represents the exception that is thrown when the System.Data.DataColumn.Expression property of a System.Data.DataColumn cannot be evaluated.
EvaluateException
Example Syntax:
ToString
[C#] public EvaluateException( );
[C++] public: EvaluateException( );
[VB] Public Sub New( )
[JScript] public function EvaluateException( ); Initializes a new instance of the System.Data.EvaluateException class.
Description
Initializes a new instance of the System.Data.EvaluateException class.
EvaluateException
Example Syntax:
ToString
[C#] publicEvaluateException(strings);
[C++] public: EvaluateException(String* s);
[VB] Public Sub New(ByVal s As String)
[JScript] public function EvaluateException(s: String);
Description
Initializes a new instance of the System.Data.EvaluateException class with the specified string. The string to display when the exception is thrown.
EvaluateException
Example Syntax:
ToString
[C#] public EvaluateException(SerializationInfo info, StreamingContext context);

[C++] public: EvaluateException(SerializationInfo* info, StreamingContext context);
[VB] Public Sub New(ByVal info As SerializationInfo, ByVal context As StreamingContext)
[JScript] public function EvaluateException(info: SerializationInfo, context: StreamingContext);
Description
Initializes a new instance of the System.Data.Evaluate-Exception class with the System.Runtime.Serialization.SerializationInfo and the System.Runtime.Serialization.StreamingContext. The data needed to serialize or deserialize an object. The source and destination of a given serialized stream.
  HelpLink
  HResult
  InnerException
  Message
  Source
  StackTrace
  TargetSite
  FillErrorEventArgs class (System.Data)
  ToString
Description
Provides data for the System.Data.Common.DbDataAdapter.FillError event of a System.Data.Common.DbDataAdapter.
The data is used by the System.Data.Common.DbDataAdapter.OnFillError (System.Data.FillErrorEvent Args) method of the System.Data.Common.DbDataAdapter.
  FillErrorEventArgs
  Example Syntax:
  ToString
[C#] public FillErrorEventArgs(DataTable dataTable, object[ ] values;
[C++] public: FillErrorEventArgs(DataTable* dataTable, Object* values _gc[ ]);
[VB] Public Sub New(ByVal dataTable As DataTable, ByVal values( ) As Object)
[JScript] public function FillErrorEventArgs(dataTable: DataTable, values: Object[ ]);
Description
Initializes a new instance of the System.Data.FillErrorEventArgs class. The System.Data.DataTable being updated. The values for the row being updated.
  Continue
  ToString
[C#] public bool Continue {get; set;}
[C++] public: _property bool get_Continue( );public: _property void set_Continue(bool);
[VB] Public Property Continue As Boolean
[JScript] public function get Continue( ): Boolean;public function set Continue(Boolean);
Description
Gets or sets a value indicating whether to continue the fill operation despite the error.
  DataTable
  ToString
[C#] public DataTable DataTable {get;}
[C++] public: _property DataTable* get_DataTable( );
[VB] Public ReadOnly Property DataTable As DataTable
[JScript] public function get DataTable( ): DataTable;
Description
Gets the System.Data.DataTable being updated when the error occurred.
  Errors
  ToString
[C#] public Exception Errors {get; set;}
[C++] public: _property Exception* get_Errors( );public: _property void set_Errors(Exception*);
[VB] Public Property Errors As Exception
[JScript] public function get Errors( ): Exception;public function set Errors (Exception);
Description
Gets the errors being handled.
  Values
  ToString
[C#] public object[ ] Values {get;}
[C++] public: _property Object* get_Values( );
[VB] Public ReadOnly Property Values As Object ( )
[JScript] public function get Values( ): Object[ ];
Description
Gets the values for the row being updated when the error occurred.
  FillErrorEventHandler delegate (System.Data)
  ToString
Description
Represents the method that will handle the System.Data.Common.DbDataAdapter.FillError event. The source of the event. The System.Data.FillErrorEventArgs that contains the event data.
When you create a System.Data.FillErrorEventHandler delegate, you identify the method that will handle the event. To associate the event with your event handler, add an instance of the delegate to the event. The event handler is called whenever the event occurs, unless you remove the delegate. For more information about event handler delegates, see.
  ForeignKeyConstraint class (System.Data)
  ToString
Description
Represents an action restriction enforced on a set of columns in a primary key/foreign key relationship when a value or row is either deleted or updated.
A System.Data.ForeignKeyConstraint restricts the action performed when a value in a column (or columns) is either deleted or updated. Such a constraint is intended to be used with primary key columns. In a parent/child relationship between two tables, deleting a value from the parent table can affect the child rows in one of the following ways.
  ForeignKeyConstraint
  Example Syntax:
  ToString
[C#] public ForeignKeyConstraint(DataColumn parentColumn, DataColumn childColumn);
[C++] public: ForeignKeyConstraint(DataColumn* parentColumn, DataColumn* childColumn);
[VB] Public Sub New(ByValparentColumn As DataColumn, ByVal childColumn As DataColumn)
[JScript] public function ForeignKeyConstraint (parentColumn: DataColumn, childColumn: DataColumn); Initializes a new instance of the System.Data.ForeignKeyConstraint class.
Description
Initializes a new instance of the System.Data.ForeignKeyConstraint class with the specified parent and child System.Data.DataColumn objects. The parent System.Data.DataColumn in the constraint. The child System.Data.DataColumn in the constraint.
  ForeignKeyConstraint
  Example Syntax:
  ToString
[C#] public ForeignKeyConstraint(DataColumn[ ] parentColumns, DataColumn[ ] childColumns);

[C++] public: ForeignKeyConstraint(DataColumn* parentColumns[ ], DataColumn* childColumns[ ]);
[VB] Public Sub New(ByVal parentColumns( ) As DataColumn, ByVal childColumns( ) As DataColumn)
[JScript] public function ForeignKeyConstraint (parentColumns: DataColumn[ ], childColumns: DataColumn[ ]);
Description
Initializes a new instance of the System.Data.ForeignKeyConstraint class with the specified arrays of parent and child System.Data.DataColumn objects. An array of parent System.Data.DataColumn in the constraint. An array of child System.Data.DataColumn in the constraint.
    ForeignKeyConstraint
    Example Syntax:
    ToString
[C#] public ForeignKeyConstraint(string constraintName, DataColumn parentColumn, DataColumn childColumn);
[C++] public: ForeignKeyConstraint(String* constraintName, DataColumn* parentColumn, DataColumn* childColumn);
[VB] Public Sub New(ByVal constraintName As String, ByVal parentColumn As DataColumn, ByVal childColumn As DataColumn)
[JScript] public function ForeignKeyConstraint (constraintName: String, parentColumn: DataColumn, childColumn: DataColumn);
Description
Initializes a new instance of the System.Data.ForeignKeyConstraint class with the specified name, parent and child System.Data.DataColumn,objects. The name of the constraint. The parent System.Data.DataColumn in the constraint. The child System.Data.DataColumn in the constraint.
    ForeignKeyConstraint
    Example Syntax:
    ToString
[C#] public ForeignKeyConstraint(string constraintName, DataColumn[ ] parentColumns, DataColumn[ ] childColumns);
[C++] public: ForeignKeyConstraint(String* constraintName, DataColumn* parentColumns[ ], DataColumn* childColumns[ ]);
[VB] Public Sub New(ByVal constraintName As String, ByVal parentColumns( ) As DataColumn, ByVal childColumns( ) As DataColumn)
[JScript] public function ForeignKeyConstraint (constraintName: String, parentColumns: DataColumn[ ], childColumns: DataColumn[ ]);
Description
Initializes a new instance of the System.Data.ForeignKeyConstraint class with the specified name, and arrays of parent and child System.Data.DataColumn objects. The name of the System.Data.ForeignKeyConstraint. If null or empty string, a default name will be given when added to the constraints collection. An array of parent System.Data.DataColumn in the constraint. An array of child System.Data.DataColumn in the constraint.
    ForeignKeyConstraint
    Example Syntax:
    ToString
[C#] public ForeignKeyConstraint(string constraintName, string parentTableName, string[ ] parentColumnNames, string[ ] childColumnNames, AcceptRejectRule acceptRejectRule, Rule deleteRule, Rule updateRule);
[C++] public: ForeignKeyConstraint(String* constraintName, String* parentTableName, String* parentColumnNames _gc[ ], String* childColumnNames _gc[ ], AcceptRejectRule acceptRejectRule, Rule deleteRule, Rule updateRule);
[VB] Public Sub New(ByVal constraintName As String, ByVal parentTableName As String, ByVal parentColumnNames( ) As String, ByVal childColumnNames( ) As String, ByVal acceptRejectRule As AcceptRejectRule, ByVal deleteRule As Rule, ByVal updateRule As Rule)
[JScript] public function ForeignKeyConstraint (constraintName: String, parentTableName: String, parentColumnNames: String[ ], childColumnNames: String[ ], acceptRejectRule: AcceptRejectRule, deleteRule: Rule, updateRule: Rule);
Description
Initializes a new instance of the System.Data.ForeignKeyConstraint class with the specified name, and arrays of parent and child System.Data.DataColumn objects, the parent System.Data.DataTable name, and various rule settings. The name of the constraint. The names of the parent System.Data.DataTable that contains parent System.Data.DataColumn objects in the constraint. An array of the names of parent System.Data.DataColumn objects in the constraint. An array of the names of child System.Data.DataColumn objects in the constraint. One of the System.Data.AcceptRejectRule values. Possible values include None, Cascade, and Default. One of the System.Data.Rule values to use when a row is deleted. The default is Cascade. Possible values include: None, Cascade, SetNull, SetDefault, and Default. One of the System.Data.Rule values to use when a row is updated. The default is Cascade. Possible values include: None, Cascade, SetNull, SetDefault, and Default.
    _DataSet
    AcceptRejectRule
    ToString
Description
Indicates the action that should take place across this constraint when System.Data.DataTable.AcceptChanges is invoked.
Changes to a System.Data.DataRow or System.Data.DataTable are not final until the AcceptChanges method is invoked. At that point, the System.Data.ForeignKeyConstraint.AcceptRejectRule determines the course of action on any values that have been changed or deleted.
    Columns
    ToString
[C#] public virtual DataColumn[ ] Columns {get:}
[C++] public: _property virtual DataColumn* get_ Columns( );
[VB] Overridable Public ReadOnly Property Columns As DataColumn ( )
[JScript] public function get Columns( ): DataColumn[ ];
Description
Gets the child columns of this constraint.
    ConstraintName
    DeleteRule
    ToString
Description
Gets or sets the action that occurs across this constraint when a row is deleted.
When a row is deletedfrom a parent table, the System.Data.ForeignKeyConstraint.DeleteRule determines what will happen in the columns of the child table (or tables). If the rule is set to Cascade, child rows will be deleted.
    ExtendedProperties
    RelatedColumns
    ToString Description
  The parent columns of this constraint.
    RelatedTable
    ToString
[C#] public virtual DataTable RelatedTable {get;}
[C++] public: _property virtual DataTable* get_RelatedTable( );
[VB] Overridable Public ReadOnly Property RelatedTable As DataTable
[JScript] public function get RelatedTable( ): DataTable;
Description
  Gets the parent table of this constraint.
    Table
    ToString
[C#] public override DataTable Table {get;}
[C++] public: _property virtual DataTable* get_Table( );
[VB] Overrides Public ReadOnly Property Table As DataTable
[JScript] public function get Table( ): DataTable;
Description
  Gets the child table of this constraint.
    UpdateRule
    ToString
[C#] public virtual Rule UpdateRule {get; set;}
[C++] public: _property virtual Rule get_UpdateRule( ); public: _property virtual void set_UpdateRule(Rule);
[VB] Overridable Public Property UpdateRule As Rule
[JScript] public function get UpdateRule( ): Rule;public function set UpdateRule(Rule);
Description
  Gets or sets the action that occurs across this constraint on when a row is updated.
    Equals
[C#] public override bool Equals(object key);
[C++] public: bool Equals(Object* key);
[VB] Overrides Public Function Equals(ByVal key As Object) As Boolean
[JScript] public override function Equals(key: Object): Boolean;
Description
  Gets a value indicating whether the current System.Data.ForeignKeyConstraint is identical to the specified object.
Return Value: true, if the objects are identical; otherwise, false. The object to which this System.Data.ForeignKeyConstraint is compared. Two System.Data.ForeignKeyConstraint are equal if they constrain the same columns.
    GetHashCode
[C#] public override int GetHashCode( );
[C++] public: int GetHashCode( );
[VB] Overrides Public Function GetHashCode( ) As Integer
[JScript] public override function GetHashCode( ): int;
Description
  Gets the hash code of this instance of the System.Data.ForeignKeyConstraint object.
Return Value: A 32-bit signed integer hash code.
    IColumnMapping interface (System.Data)
    ToString
Description
  Associates a data source column with a System.Data.DataSet column, and is implemented by the System.Data.Common.DataColumnMapping class, which is used in common by .NET data providers.
  The System.Data.IColumnMapping interface allows an inheriting class to implement a ColumnMapping class, which associates a data source column with a System.Data.DataSet column. For more information, see.
    DataSetColumn
    ToString
[C#] string DataSetColumn {get; set;}
[C++] String* get_DataSetColumn( );void set_DataSetColumn(String*);
[VB] Property DataSetColumn As String
[JScript] abstract function get DataSetColumn( ): String;public abstract function set DataSetColumn(String);
Description
  Gets or sets the name of the column within the System.Data.DataSet to map to.
    SourceColumn
    ToString
[C#] string SourceColumn {get; set,}
[C++] String* get_SourceColumn( ); void set_SourceColumn(String*);
[VB] Property SourceColumn As String
[JScript] abstract function get SourceColumn( ): String;public abstract function set SourceColumn(String);
Description
  Gets or sets the case-sensitive column name from a data source to map from.
    IColumnMappingCollection interface (System.Data)
    ToString
Description
  Contains a collection of ColumnMapping objects, and is implemented by the System.Data.Common.DataColumnMappingCollection, which is used in common by .NET data providers.
  The System.Data.IColumnMappingCollection interface allows an is inheriting class to implement a ColumnMapping collection. For more information, see.
    Item
    ToString
[C#] object this[string index] {get; set;}
[C++] Object* get_Item(String* index);void set_Item(String* index, Object*);
[VB] Default Property Item(ByVal index As String) As Object
[JScript] abstract returnValue=IColumnMappingCollectionObject.Item(index); IColumnMappingCollectionObject.Item(index)=returnValue;
Description
  Gets or sets the System.Data.Common.DataColumnMapping object with the specified name. The name of the System.Data. Common.DataColumnMapping object to find.
    Add
[C#] IColumnMapping Add(string sourceColumnName, string dataSetColumnName);
[C++] IColumnMapping* Add(String* sourceColumnName, String* dataSetColumnName);
[VB] Function Add(ByVal sourceColumnName As String, ByVal dataSetColumnName As String) As IColumnMapping
[JScript] function Add(sourceColumnName: String, dataSetColumnName: String): IColumnMapping;
Description
  Adds a System.Data.Common.DataColumnMapping to the System.Data.Common.DataColumnMappingCollection using the source column and System.Data.DataSet column names.
Return Value: A reference to the newly-mapped System.Data. Common.DataColumnMapping object. The case-sensitive name of the source column. The name of the System.Data.DataSet column.

Contains
[C#] bool Contains(string sourceColumnName);
[C++] bool Contains(String* sourceColumnName);
[VB] Function Contains(ByVal sourceColumnName As String) As Boolean
[JScript] function Contains(sourceColumnName: String): Boolean;
Description
Gets a value indicating whether the System.Data.Common.DataColumnMappingCollection contains a System.Data. Common.DataColumnMapping with the specified source column name.
Return Value: true if a System.Data.Common.DataColumnMapping with the specified source column name exists, otherwise false. The case-sensitive name of the source column.
GetByDataSetColumn
[C#] IColumnMapping GetByDataSetColumn(string dataSetColumnName);
[C++] IColumnMapping* GetByDataSetColumn(String* dataSetColumnName);
[VB] Function GetByDataSetColumn(ByVal dataSetColumnName As String) As IColumnMapping
[JScript] function GetByDataSetColumn (dataSetColumnName: String): IColumnMapping;
Description
Gets a reference to a System.Data.Common.DataColumnMapping using the name of the System.Data.DataSet column.
Return Value: A reference to a System.Data.Common.DataColumnMapping. The name of the System.Data.DataSet column within the collection.
IndexOf
[C#] int IndexOf(string sourceColumnName);
[C++] int IndexOf(String* sourceColumnName);
[VB] Function IndexOf(ByVal sourceColumnName As String) As Integer
[JScript] function IndexOf(sourceColumnName: String): int;
Description
Gets the location of the System.Data.Common.DataColumnMapping with the specified source column name.
Return Value: The location of the System.Data.Common.DataColumnMapping with the specified case-sensitive source column name. The case-sensitive name of the source column.
RemoveAt
[C#] void RemoveAt(string sourceColumnName);
[C++] void RemoveAt(String* source ColumnName);
[VB] Sub RemoveAt(ByVal sourceColumnName As String)
[JScript] function RemoveAt(sourceColumnName: String);
Description
Removes the System.Data.Common.DataColumnMapping object with the specified source column name from the collection. The case-sensitive source column name.
IDataAdapter interface (System.Data)
RemoveAt
Description
Allows an object to implement a DataAdapter, and represents a set of methods and mapping action-related properties used to fill and refresh a System.Data.DataSet and update a data source.
The System.Data.IDataAdapter interface allows an inheriting class to is implement a DataAdapter class, which represents the bridge between a data source and a System.Data.DataSet. For more information about DataAdapter classes, see. For more information about implementing .NET data providers, see.

MissingMappingAction
RemoveAt
[C#] MissingMappingAction MissingMappingAction {get; set;}
[C++] MissingMappingAction get_MissingMappingAction( ); void set_MissingMappingAction(MissingMappingAction);
[VB] Property MissingMappingAction As MissingMappingAction
[JScript] abstract function get MissingMappingAction( ): MissingMappingAction;public abstract function set MissingMappingAction(MissingMappingAction);
Description
Indicates or specifies whether unmapped source tables or columns are passed with their source names in order to be filtered or to raise an error.
The System.Data.IDataAdapter.TableMappings property provides the master mapping between the returned records and the System.Data.DataSet.
MissingSchemaAction
RemoveAt
[C#] MissingSchemaAction MissingSchemaAction {get; set;}
[C#+] MissingSchemaAction get_MissingSchemaAction( ); void set_MissingSchemaAction (MissingSchemaAction);
[VB] Property MissingSchemaAction As MissingSchemaAction
[JScript] abstract function get MissingSchemaAction( ): MissingSchemaAction;public abstract function set MissingSchemaAction(MissingSchemaAction);
Description
Indicates or specifies whether missing source tables, columns, and their relationships are added to the data set schema, ignored, or cause an error to be raised.
TableMappings
RemoveAt
[C#] ITableMappingCollection TableMappings {get;}
[C++] ITableMappingCollection* get_TableMappings( );
[VB] ReadOnly Property TableMappings As ITableMappingCollection
[JScript] abstract function get TableMappings( ): ITableMappingCollection;
Description
Indicates how a source table is mapped to a data set table.
The System.Data.IDataAdapter uses only the mappings for the source table named "Table". All SELECT, INSERT, DELETE, and UPDATE statements returning data must do so using consistent column naming. The column names returned in the records must be unique, otherwise columns with duplicate names overwrite previous data. On System.Data.IDataAdapter.Update(System.Data.DataSet), only the table mapped to the source table named "Table" will have its changes reconciled.
Fill
[C#] int Fill(DataSet dataSet);
[C++] int Fill(DataSet* dataSet);
[VB] Function Fill(ByVal dataSet As DataSet) As Integer
[JScript] function Fill(dataSet: DataSet): int;
Description
Adds or refreshes rows in the System.Data.DataSet to match those in the data source using the System.Data.DataSet name, and creates a System.Data.DataTable named "Table".
Return Value: The number of rows successfully added to or refreshed in the System.Data.DataSet. This does not include rows affected by statements that do not return rows.

System.Data.IDataAdapter.Fill(System.Data.DataSet) retrieves rows from the data source using the SELECT statement specified by an associated System.Data.IDbDataAdapter.SelectCommand property. The connection object associated with the SELECT statement must be valid, but it does not need to be open. If the connection is closed before System.Data.IDataAdapter.Fill(System.Data.DataSet) is called, it is opened to retrieve data, then closed. If the connection is open before System.Data.IDataAdapter.Fill (System.Data.DataSet) is called, it remains open. A System.Data.DataSet to fill with records and, if necessary, schema.
FillSchema
[C#] DataTable[ ] FillSchema(DataSet dataSet, SchemaType schemaType);
[C++] DataTable* FillSchema(DataSet* dataSet, SchemaType schemaType) [ ];
[VB] Function FillSchema(ByVal dataSet As DataSet, ByVal schema Type As SchemaType) As DataTable( )
[JScript] function FillSchema(dataSet: DataSet, schemaType: SchemaType): DataTable[ ];
Description
Adds a System.Data.DataTable named "Table" to the specified System.Data.DataSet and configures the schema to match that in the data source based on the specified System.Data.SchemaType.
Return Value: An array of System.Data.DataTable objects that contain schema information returnedfrom the data source.
The System.Data.IDataAdapter.FillSchema (System.Data.DataSet,System.Data.SchemaType) method retrieves the schema from the data source using the System.Data.IDbDataAdapter.SelectCommand. The connection object associated with the System.Data.IDbDataAdapter.SelectCommand must be valid, but it does not need to be open. If the connection is closed before System.Data.IDataAdapter.FillSchema (System.Data.DataSet,System.Data.SchemaType) is called, it is opened to retrieve data, then closed. If the connection is open before System.Data.IDataAdapter.FillSchema (System.Data.DataSet,System.Data.SchemaType) is called, it remains open. The System.Data.DataSet to be filled with the schema from the data source. One of the System.Data.SchemaType values.
GetFillParameters
[C#] IDataParameter[ ] GetFillParameters( );
[C++] IDataParameter* GetFillParameters( ) [ ];
[VB] Function GetFillParameters( ) As IDataParameter( )
[JScript] function GetFillParameters( ): IDataParameter[ ];
Description
Gets the parameters set by the user when executing an SQL SELECT statement.
Return Value: An array of System.Data.IDataParameter objects that contains the parameters set by the user.
Update
[C#] int Update(DataSet dataSet);
[C++] int Update(DataSet* dataSet);
[VB] Function Update(ByVal dataSet As DataSet) As Integer
[JScript] function Update(dataSet: DataSet): int;
Description
Calls the respective INSERT, UPDATE, or DELETE statem ents for each inserted, updated, or deleted row in the specified System.Data.DataSet from a System.Data.DataTable named "Table".
Return Value: The number of rows successfully updated from the System.Data.DataSet.
When an application calls the System.Data.IDataAdapter.Update(System.Data.DataSet) method, the System.Data.IDataAdapter examines the System.Data.DataRow.RowState property, and executes the required INSERT, UPDATE, or DELETE statements based on the order of the indexes configured in the System.Data.DataSet. For example, System.Data.IDataAdapter.Update (System.Data.DataSet) might execute a DELETE statement, followed by an INSERT statement, and then another DELETE statement, due to the ordering of the rows in the System.Data.DataTable. An application can call the System.Data.DataSet.GetChanges method in situations where you must control the sequence of statement types (for example, INSERTs before UPDATEs). For more information, see. The System.Data.DataSet used to update the data source.

IDataParameter interface (System.Data)
Update
Description
Represents a parameter to a Command object, and optionally, its mapping to System.Data.DataSet columns; and is implemented by .NET data providers that access data sources.
The System.Data.IDataParameter interface allows an inheriting class to implement a Parameter class, which represents a parameter to a Command object. For more information about Parameter classes, see. For more information about implementing .NET data providers, see.
DbType
Update
[C#] DbType DbType {get; set;}
[C++] DbType get_DbType( );void set_DbType(DbType);
[VB] Property DbType As DbType
[JScript] abstractfunction get DbType( ): DbType;public abstract function set DbType(Db Type);
Description
Gets or sets the System.Data.DbType of the parameter.
The PrvDbType (where Prv represents the provider-specific prefix) and System.Data.SqlClient.SqlParameter.DbType are linked. Therefore, setting the System.Data.SqlClient.SqlParameter.DbType changes the PrvDbType to a supporting PrvDbType.
Direction
Update
[C#] ParameterDirection Direction {get, set;}
[C++] ParameterDirection get_Direction( );void set_Direction(ParameterDirection);
[VB] Property Direction As ParameterDirection
[JScript] abstract function get Direction( ): ParameterDirection;public abstract function set Direction (ParameterDirection);
Description
Gets or sets a value indicating whether the parameter is input-only, output-only, bidirectional, or a stored procedure return value parameter.
If the System.Data.ParameterDirection is output, and execution of the associated System.Data.SqlClient.SqlCommand does not return a value, the System.Data.IDataParameter contains a null value.
IsNullable
Update
[C#] boot IsNullable {get;}
[C++] bool get_IsNullable( );
[VB] ReadOnly Property IsNullable As Boolean
[JScript] abstract function get IsNullable( ): Boolean;
Description
Gets or sets a value indicating whether the parameter accepts null values.
Null values are handled using the System.DBNull class.
ParameterName Update
[C#] string ParameterName {get; set;}
[C++] String* get_ParameterName( );void set_ParameterName(String*);
[VB] Property ParameterName As String
[JScript] abstract function get ParameterName( ): String; public abstract function set ParameterName(String);
Description
  Gets or sets the name of the System.Data.IDataParameter.
  The System.Data.IDataParameter.ParameterName is specified in the form @paramname. You must set System.Data.IDataParameter.ParameterName before executing a command that relies on parameters.
  SourceColumn
  Update
[C#] string SourceColumn {get; set;}
[C++] String* get_SourceColumn( );void set_SourceColumn(String*);
[VB] Property SourceColumn As String
[JScript] abstract function get SourceColumn( ): String;public abstract function set SourceColumn(String);
Description
  Gets or sets the name of the source column that is mapped to the System.Data.DataSet and used for loading or returning the System.Data.IDataParameter.Value.
  The link betwen the value of the System.Data.IDataParameter and the System.Data.DataTable may be bidirectional depending on the value of the System.Data.IDataParameter.Direction property.
  Source Version
  Update
[C#] DataRow Version Source Version {get; set;}
[C++] DataRowVersion get_SourceVersion( );void set_Source Version(DataRowVersion);
[VB] Property Source Version As DataRow Version
[JScript] abstract function get SourceVersion( ): DataRowVersion;public abstract function set SourceVersion (DataRowVersion);
Description
  Gets or sets the System.Data.DataRowVersion to use when loading System.Data.IDataParameter.Value.
  This property is used by the System.Data.IDbDataAdapter.UpdateCommand during the System.Data.Common.DbDataAdapter.Update (System.Data.DataSet) to determine whether the original or current value is used for a parameter value. This allows primary keys to be updated. This property is ignored by the System.Data.IDbDataAdapter.InsertCommand and System.Data.IDbDataAdapter.DeleteCommand. This property is set to the version of the System.Data.DataRow used by the System.Data.DataRow.Item(System.Int32) property, or the System.Data.DataRow.GetChildRows(System.String) method of the System.Data.DataRow object.
  Value
  Update
[C#] object Value {get; set;}
[C++] Object* get_Value( );void set_Value(Object*);
[VB] Property Value As Object
[JScript] abstract function get Value( ): Object;public abstract function set Value(Object);
Description
  Gets or sets the value of the parameter.
  For input parameters, the value is bound to the System.Data.IDbCommand that is sent to the server. For output and return value parameters, the value is set on completion of the System.Data.IDbCommand and after the System.Data.IDataReader is closed.

IDataParameterCollection interface (System.Data)
  Update
Description
  Collects allparameters relevant to a Command object and their mappings to System.Data.DataSet columns, and is implemented by .NET data providers that access data sources.
  The System.Data.IDataParameterCollection interface allows an inheriting class to implement a Parameter collection. For more information about Parameter classes, see. For more information about implementing .NET data providers, see.
  Item
  Update
[C#] object this[string parameterName] {get; set;}
[C++] Object* get_Item(String* parameterName);void set_Item(String* parameterName, Object*);
[VB] Default Property Item(ByVal parameterName As String) As Objuect
[JScript] abstract returnValue= IDataParameterCollectionObject.Item(parameterName); IDataParameterCollectionObject.Item(parameterName)= returnValue;
Description
  Gets the parameter at the specified index. The name of the parameter to retrieve.
  Contains
[C#] bool Contains(string parameterName);
[C++] bool Contains(String* parameterName);
[VB] Function Contains(ByVal parameterName As String) As Boolean
[JScript] function Contains(parameterName: String): Boolean;
Description
  Gets a value indicating whether a parameter in the collection has the specified source table name.
  Return Value: true if the collection contains the parameter; otherwise, false. The name of the parameter.
  IndexOf
[C#] int IndexOf(string parameterName);
[C++] int IndexOf(String* parameterName);
[VB] Function IndexOf(ByVal parameterName As String) As Integer
[JScript] function IndexOf(parameterName: String): int;
Description
  Gets the location of the System.Data.IDataParameter within the collection.
  Return Value: The location of the System.Data.IDataParameter within the collection. The name of the parameter.
  RemoveAt
[C#] void RemoveAt(string parameterName);
[C++] void RemoveAt(String* parameterName);
[VB] Sub RemoveAt(ByVal parameterName As String)
[JScript] function RemoveAt(parameterName: String);
Description
  Removes the System.Data.IDataParameter from the collection. The name of the parameter.
  IDataReader interface (System.Data)
  RemoveAt
Description
  Provides a means of reading one or more forward-only streams of result sets obtained by executing a command at a data source, and is implemented by .NET data providers that access relational databases.
  The System.Data.IDataReader and System.Data.IDataRecord interfaces allow an inheriting class to implement a DataReader class, which provides a means of reading one or more forward-only streams of result sets. For more information about DataReader classes, see. For more information about implementing .NETdata providers, see.

Depth
RemoveAt
[C#] int Depth {get;}
[C++] int get_Depth( );
[VB] ReadOnly Property Depth As Integer
[JScript] abstract function get Depth( ): int;
Description
Gets a value indicating the depth of nesting for the current row.
The outermost table has a depth of zero.
IsClosed
RemoveAt
[C#] bool IsClosed {get;}
[C++] bool get_IsClosed( );
[VB] ReadOnly Property IsClosed As Boolean
[JScript] abstract function get IsClosed( ): Boolean;
Description
Gets a value indicating whether the data reader is closed.
System.Data.IDataReader.IsClosed and System.Data.IDataReader.RecordsAffected are the only properties that you can call after the System.Data.IDataReader is closed.
RecordsAffected
RemoveAt
[C#] int RecordsAffected {get;}
[C++] int get_RecordsAffected( );
[VB] ReadOnly Property RecordsAffected As Integer
[JScript] abstract function get RecordsAffected( ): int;
Description
Gets the number of rows changed, inserted, or deleted by execution of the SQL statement.
The System.Data.IDataReader.RecordsAffected property is not set until all rows are read and you close the System.Data.IDataReader.
Close
[C#] void Close( );
[C++] void Close( );
[VB] Sub Close( )
[JScript] function Close( );
Description
Closes the System.Data.IDataReader Object.
You must explicitly call the System.Data.IDataReader.Close method when you are through using the System.Data.IDataReader to use the associated System.Data.IDbConnection for any other purpose.
GetSchemaTable
[C#] DataTable GetSchemaTable( );
[C++] DataTable* GetSchemaTable( );
[VB] Function GetSchemaTable( ) As DataTable
[JScript] function GetSchemaTable( ): DataTable;
Description
Returns a System.Data.DataTable that describes the column metadata of the System.DataIDataReader.
Return Value: A System.Data.DataTable that describes the column metadata.
The implementation of System.Data.IDataReader.GetSchemaTable methodfor the OLE DB .NET Data Provider maps to the OLE DB IColumnsRowset::GetColumnsRowset method, while the implementation for the SQL Server .NET Data Provider does not use an OLE DB provider layer.
NextResult
[C#] bool NextResult( );
[C++] bool NextResult( );
[VB] Function NextResult( ) As Boolean
[JScript] function NextResult( ): Boolean;
Description
Advances the data reader to the next result, when reading the results of batch SQL statements.
Return Value: true if there are more rows; otherwise, false.
Used to process multiple results, which can be obtained by executing batch SQL statements.
Read
[C#] bool Read( );
[C++] bool Read( );
[VB] Function Read( ) As Boolean
[JScript] function Read( ): Boolean;
Description
Advances the System.Data.IDataReader to the next record.
Return Value: true if there are more rows; otherwise, false.
The default position of the System.Data.IDataReader is prior to the first record. Therefore you must call System.Data.IDataReader.Read to begin accessing any data.
IDataRecord interface (System.Data)
Read
Description
Provides access to the column values within each row for a DataReader, and is implemented by .NET data providers that access relational databases.
The System.Data.IData.Reader and System.Data.IData.Record interfaces allow an inheriting class to implement a DataReader class, which provides a means of reading one or more forward-only streams of result sets. For more information about DataReader classes, see. For more information about implementing .NET data providers, see.
FieldCount
Read
[C#] int FieldCount {get;}
[C++] int get_FieldCount( );
[VB] ReadOnly Property FieldCount As Integer
[JScript] abstract function get FieldCount( ): int;
Description
Gets the number of columns in the current row.
After executing a query that does not return rows (for example, using the System.Data.IDbCommand.ExecuteNonQuery method), System.Data.IDataRecord.FieldCount returns −1.
Item
Read
[C#] object this[string name] {get;}
[C++] Object* get_Item(String* name);
[VB] Default ReadOnly Property Item(ByVal name As String) As Object
[JScript] abstract returnValue=IDataRecordObject.Item (name);
Description
Gets the column with the specified name. The name of the column to find.
Item
Read
[C#] object this[int i] {get;}
[C++] Object* get_Item(int i);
[VB] Default ReadOnly Property Item(ByVal i As Integer) As Object
[JScript] abstract returnValue=IDataRecordObject.Item(i);
Gets the specified column.
Description
Gets the column located at the specified index. The index of the column to get.
GetBoolean
[C#] bool GetBoolean(int i);

[C++] bool GetBoolean(int i);
[VB] Function GetBoolean(ByVal i As Integer) As Boolean
[JScript] function GetBoolean(i: int): Boolean;
Description
  Gets the boolean value of the specified column.
Return Value: The value of the column.
  No conversions are performed, therefore the data retrieved must already be a boolean or an exception is generated. The index of the field to find.
  GetByte
[C#] byte GetByte(int i);
[C++] unsigned char GetByte(int i);
[VB] Function GetByte(ByVal i As Integer) As Byte
[JScript] function GetByte(i: int): Byte;
Description
  Gets the 8-bit unsigned integer value of the specified field.
Return Value: The 8-bit unsigned integer value of the specified field. she index of the field to find.
  GetBytes
[C#] long GetBytes(int i, long fieldOffset, byte[ ] buffer, int bufferoffset, int length);
[C++] __int64 GetBytes(int i, __int64 fieldOffset, unsigned char buffer __gc[ ], int bufferoffset, int length);
[VB] Function GetBytes(ByVal i As Integer, ByValfieldOffset As Long, ByVal buffer( ) As Byte, ByVal bufferoffset As Integer, ByVal length As Integer) As Long
[JScript] function GetBytes(i: int, fieldOffset: long, buffer: Byte[ ], bufferoffset: int, length: int): long;
Description
  Reads a stream of bytes from the field offset in the specifted field into the buffer starting at the given buffer offset.
Return Value: The actual number of bytes read.
  The actual number of bytes read can be less than the requested length, if the end of the row is reached. If you pass a buffer that is null, System.Data.IDataRecord.GetBytes (System.Int32,System.Int64,System.Byte[ ], System.Int32, System.Int32) returns the length of the row in bytes. The zero-based column ordinal. The index within the field from which to begin the read operation. The buffer into which to read the stream of bytes. The index for buffer to begin the read operation. The number of bytes to read.
  GetChar
[C#] char GetChar(int i);
[C++] __wchar_t GetChar(int i);
[VB] Function GetChar(ByVal i As Integer) As Char
[JScript] function GetChar(i: int): Char;
Description
  Gets the character value of the specifted field.
Return Value: The character value of the specified field. The index of the field to find.
  GetChars
[C#] long GetChars(int i, long fieldoffset, char[ ] buffer, int bufferoffset, int length);
[C++] __int64 GetChars(int i, __int64 fieldoffset, __wchar_t buffer __gc[ ], int bufferoffset, int length);
[VB] Function GetChars(ByVal i As Integer, ByVal fieldoffset As Long, ByVal buffer( ) As Char, ByVal bufferoffset As Integer, ByVal length As Integer) As Long
[JScript] function GetChars(i: int, fieldOffset: long, buffer: Char[ ], bufferoffset: int, length: int): long;
Description
  Reads a stream of characters from the field offset in the specified field into the buffer starting at the given buffer offset.
Return Value: The actual number of characters read.
  The actual number of characters read can be less than the requested length, if the end of the field is reached. If you pass a buffer that is null, System.Data.IDataRecord.GetChars (System.Int32,System.Int64,System.Char[ ],System.Int32, System.Int32) returns the length of the field in characters. The zero-based column ordinal. The index within the row from which to begin the read operation. The buffer into which to read the stream of bytes. The index for buffer to begin the read operation. The number of bytes to read.
  GetData
[C#] IDataReader GetData(int i);
[C++] IDataReader* GetData(int i);
[VB] Function GetData(ByVal i As Integer) As IDataReader
[JScript] function GetData(i: int): IDataReader;
Description
  Gets an System.Data.IDataReader to be used when the field points to more remote structured data.
Return Value: An System.Data.IDataReader to be used when the field points to more remote structured data. The index of the field to find.
  GetDataTypeName
[C#] string GetDataTypeName(int i);
[C++] String* GetDataTypeName(int i);
[VB] Function GetDataTypeName(ByVal i As Integer) As String
[JScript] function GetDataTypeName(i: int): String;
Description
  Gets the data type information for the specified field.
Return Value: The data type information for the specified field.
  The data type information can differ from the type information returned by GetFieldType, especially where the underlying data types do not map one for one to the runtime types supported by the language. (e.g. DataTypeName may be "integer", while Type.Name may be "Int32".) Returns the data type information for the specified field. The index of the field to find.
  GetDateTime
[C#] DateTime GetDateTime(int i);
[C++] DateTime GetDateTime(int i);
[VB] Function GetDateTime(ByVal i As Integer) As DateTime
[JScript] function GetDateTime(i: int): DateTime;
Description
  Gets the date and time data value of the spcified field.
Return Value: The date and time data value of the spcified field. The index of the field to find.
  GetDecimal
[C#] decimal GetDecimal(int i);
[C++] Decimal GetDecimal(int i);
[VB] Function GetDecimal(ByVal i As Integer) As Decimal
[JScript] function GetDecimal(i: int): Decimal;
Description
  Gets the fixed-position numeric value of the specified field.
Return Value: The fixed-position numeric value of the specified field. The index of the field to find.
  GetDouble
[C#] double GetDouble(int i);
[C++] double GetDouble(int i);
[VB] Function GetDouble(ByVal i As Integer) As Double
[JScript] function GetDouble(i: int): double;
Description
  Gets the double-precision floating point number of the specified field.
Return Value: The double-precision floating point number of the specified field. The index of the field to find.
  GetFieldType
[C#] Type GetFieldType(int i);

[C++] Type* GetFieldType(int i);
[VB] Function GetFieldType(ByVal i As Integer) As Type
[JScript] function GetFieldType(i: int): Type;
Description Gets the System.Type information corresponding to the type of System.Object that would be returned from System.Data.IDataRecord.GetValue(System.Int32) .
Return Value: The System.Type information corresponding to the type of System.Object that would be returned from System.Data.IDataRecord.GetValue(System.Int32)
This information can be used to increase performance by indicating the strongly-typed accessor to call. (e.g. using GetInt32 is roughly ten times faster than using GetValue.) Returns the System.Type information corresponding to the type of System.Object that would be returned from System.Data.IDataRecord.GetValue(System.Int32) . The index of the field to find.
  GetFloat
[C#] float GetFloat(int i);
[C++] float GetFloat(int i);
[VB] Function GetFloat(ByVal i As Integer) As Single
[JScript] function GetFloat(i: int): float;
Description Gets the single-precision floating point number of the specified field.
Return Value: The single-precision floating point number of the specified field. The index of the field to find.
  GetGuid
[C#] Guid GetGuid(int i);
[C++] Guid GetGuid(int i);
[VB] Function GetGuid(ByVal i As Integer) As Guid
[JScript] function GetGuid(i: int): Guid;
Description Returns the guid value of the specified field.
Return Value: The guid value of the specified field. The index of the field to find.
  GetInt16
[C#] short GetInt16(int i);
[C++] short GetInt16(int i);
[VB] Function GetInt16(ByVal i As Integer) As Short
[JScript] function GetInt16(i: int): Int16,
Description Gets the 16-bit signed integer value of the specified field.
Return Value: The 16-bit signed integer value of the specified field. The index of the field to find.
  GetInt32
[C#] int GetInt32(int i);
[C++] int GetInt32(int i); is [VB] Function GetInt32(ByVal i As Integer) As Integer
[JScript] function GetInt32(i: int): int;
Description Gets the 32-bit signed integer value of the specified field.
Return Value: The 32-bit signed integer value of the specified field. The index of the field to find.
  GetInt64
[C#] long GetInt64(int i);
[C++] _int64 GetInt64(int i);
[VB] Function GetInt64(ByVal i As Integer) As Long
[JScript] function GetInt64(i: int): long;
Description Gets the 64-bit signed integer value of the specified field.
Return Value: The 64-bit signed integer value of the specified field. The index of the field to find.
  GetName
[C#] string GetName(int i);
[C++] String* GetName(int i);
[VB] Function GetName(ByVal i As Integer) As String
[JScript]function GetName(i: int): String;
Description Gets the name for the field to find.
Return Value: The name of the field or the empty string (""), if there is no value to return. The index of the field to find.
  GetOrdinal
[C#] int GetOrdinal(string name);
[C++] int Getordinal(String* name);
[VB] Function GetOrdinal(ByVal name As String) As Integer
[JScript] function GetOrdinal(name: String): int;
Description Return the index of the named field.
Return Value: The index of the named field. The name of the field to find.
  GetString
[C#] string GetString(int i);
[C++] String* GetString(int i);
[VB] Function GetString(ByVal i As Integer) As String
[JScript] function GetString(i: int): String;
Description Gets the string value of the specified field.
Return Value: The string value of the specified field. The index of the field to find.
  GetValue
[C#] object GetValue(int i);
[C++] Object* GetValue(int i);
[VB] Function Get Value(ByVal i As Integer) As Object
[JScript] function GetValue(i: int): Object;
Description Return the value of the specified field.
Return Value: The System.Object which will contain the field value upon return. The index of the field to find.
  GetValues
[C#] int GetValues(object[ ] values);
[C++] int Get Values(Object* values _gc[ ]);
[VB] Function GetValues(ByVal values( ) As Object) As Integer
[JScript] function GetValues(values: Object[ ]): int;
Description Gets all the attribute fields in the collection for the current record.
Return Value: The number of instances of System.Object in the array.

For most applications, the System.Data.IDataRecord.GetValues(System.Object[ ]) method provides an efficient means for retrieving all columns, rather than retrieving each column individually. An array of System.Object to copy the attribute fields into.
  IsDBNull
[C#] bool IsDBNull(int i);
[C++] bool IsDBNull(int i);
[VB] Function IsDBNull(ByVal i As Integer) As Boolean
[JScript] function IsDBNull(i: int): Boolean;
Description Return whether the specified field is set to null.
Return Value: true if the specified field is set to null, otherwise false The index of the field to find.
  IDbCommand interface (System.Data)
  IsDBNull
Description Represents a SQL statement that is executed while connected to a data source, and is implemented by .NET data providers that access relational databases.

The System.Data.IDbCommand interface allows an inheriting class to implement a Command class, which represents a SQL statement that is executed at a data source.

For more information about Command classes, see. For more information about implementing .NET data providers, see.

CommandText
IsDBNull
[C#] string CommandText {get; set;}
[C++] String* get_CommandText( );void set_CommandText(String*);
[VB] Property CommandText As String
[JScript] abstract function get CommandText( ): String;public abstract function set CommandText(String);
Description
Gets or sets the text command to run against the data source.
When the System.Data.IDbCommand.CommandType property is set to StoredProcedure, set the System.Data.IDbCommand.CommandText property to the name of the stored procedure. The command will call this stored procedure when you call one of the Execute methods.

CommandTimeout
IsDBNull
[C#] int CommandTimeout {get; set;}
[C++] int get_CommandTimeout( );void set_CommandTimeout(int);
[VB] Property CommandTimeout As Integer
[JScript] abstract function get CommandTimeout( ): int;public abstract function set CommandTimeout(int);
Description
Gets or sets the wait time before terminating the attempt to execute a command and generating an error.

CommandType
IsDBNull
[C#] CommandType CommandType {get; set;}
[C++] CommandType get_CommandType( );void set_CommandType(CommandType);
[VB] Property CommandType As CommandType
[JScript] abstract function get CommandType( ): CommandType;public abstract function set CommandType(CommandType);
Description
Indicates or specifies how the System.Data.IDbCommand.CommandText property is interpreted.
When you set the System.Data.IDbCommand.CommandType property to StoredProcedure, you should set the System.Data.IDbCommand.CommandText property to the name of the stored procedure. The command executes this stored procedure when you call one of the Execute methods.

Connection
IsDBNull
[C#] IDbConnection Connection {get; set;}
[C++] IDbConnection* get_Connection( );void set_Connection(IDbConnection*);
[VB] Property Connection As IDbConnection
[JScript] abstract function get Connection( ): IDbConnection;public abstract function set Connection (IDbConnection);
Description
Gets or sets the System.Data.IDbConnection used by this instance of the System.Data.IDbCommand.

Parameters
IsDBNull
[C#] IDataParameterCollection Parameters {get;}
[C++] IDataParameterCollection* get_Parameters( );
[VB] ReadOnly Property Parameters As IDataParameterCollection
[JScript] abstract function get Parameters( ): IDataParameterCollection;
Description
Gets the System.Data.IDataParameterCollection.

Transaction
IsDBNull
[C#] IDbTransaction Transaction {get; set;}
[C++] IDbTransaction* get_Transaction( );void set_Transaction(IDbTransaction*);
[VB] Property Transaction As IDbTransaction
[JScript] abstract function get Transaction( ): IDbTransaction;public abstract function set Transaction (IDbTransaction);
Description
Gets or sets the transaction in which the Command object of an ADO .NET data provider executes.

UpdatedRowSource
IsDBNull
[C#] UpdateRowSource UpdatedRowSource {get; set;}
[C++] UpdateRowSource get_UpdatedRowSource( );void set_UpdatedRowSource(UpdateRowSource);
[VB] Property UpdatedRowSource As UpdateRowSource
[JScript] abstract function get UpdatedRowSource( ): UpdateRowSource;public abstract function set UpdatedRowSource(UpdateRowSource);
Description
Gets or sets how command results are applied to the System.Data.DataRow when used by the System.Data.IDataAdapter.Update(System.Data.DataSet) method of a System.Data.Common.DbDataAdapter.

Cancel
[C#] void Cancel( );
[C++] void Cancel( );
[VB] Sub Cancel( )
[JScript] function Cancel( );
Description
Cancels the execution of an System.Data.IDbCommand.

CreateParameter
[C#] IDbDataParameter CreateParameter( );
[C++] IDbDataParameter* CreateParameter( );
[VB] Function CreateParameter( ) As IDbDataParameter
[JScript] function CreateParameter( ): IDbDataParameter;
Description
Creates a new instance of an ADO .NET Parameter object.
Return Value: An ADO .NET Parameter object.
When inheriting from System.Data.IDbCommand, an ADO .NET data provider implements a strongly-typed version of System.Data.IDbCommand.CreateParameter.

ExecuteNonQuery
[C#] int ExecuteNonQuery( );
[C++] int ExecuteNonQuery( );
[VB] Function ExecuteNonQuery( ) As Integer
[JScript] function ExecuteNonQuery( ): int;
Description
Executes a SQL statement against the Connection object of an ADO .NET data provider, and returns the number of rows affected.
Return Value: The number of rows affected.
You can use the System.Data.IDbCommand.ExecuteNonQuery to perform catalog operations (for example, querying the structure of a database or creating database objects such as tables), or to change the data in a database without using a System.Data.DataSet by executing UPDATE, INSERT, or DELETE statements.

ExecuteReader
[C#] IDataReader ExecuteReader( );
[C++] IDataReader* ExecuteReader( );
[VB] Function ExecuteReader( ) As IDataReader
[JScript] function ExecuteReader( ): IDataReader; Executes the System.Data.IDbCommand.CommandText against the System.Data.IDbCommand.Connection and builds an System.Data.IDataReader.
Description
Executes the System.Data.IDbCommand.CommandText against the System.Data.IDbCommand. Connection and builds an System.Data.IDataReader.
Return Value: An System.DataIDataReader object.
ExecuteReader
[C#] IDataReader ExecuteReader(CommandBehavior behavior);
[C++] IDataReader* ExecuteReader(CommandBehavior behavior);
[VB] Function ExecuteReader(ByVal behavior As CommandBehavior) As IDataReader
[JScript] function ExecuteReader(behavior: CommandBehavior): IDataReader;
Description
Executes the System.Data.IDbCommand.CommandText against the System.Data.IDbCommand.Connection, and builds an System.Data.IDataReader using one of the System.Data.CommandBehavior values.
Return Value: An System.Data.IDataReader object.
The caller must call the System.Data.IDbConnection.Open method of the System.Data.IDbCommand.Connection property. One of the System.Data.CommandBehavior-values.
ExecuteScalar
[C#] object ExecuteScalar( );
[C++] Object* ExecuteScalar( );
[VB] Function ExecuteScalar( ) As Object
[JScript] function ExecuteScalar( ): Object;
Description
Executes the query, and returns the first column of the first row in the resultset returned by the query. Extra columns or rows are ignored.
Return Value: The first column of the first row in the resultset.
Use the System.Data.IDbCommand.ExecuteScalar method to retrieve a single value (for example, an aggregate value) from a database. This requires less code than using the System.Data.IDbCommand.ExecuteReader method, and then performing the operations necessary to generate the single value using the data returned by an System.Data.IDbDataReader.
Prepare
[C#] void Prepare( );
[C++] void Prepare( );
[VB] Sub Prepare( )
[JScript] function Prepare( );
Description
Creates a prepared (or compiled) version of the command on the data source.
If the System.Data.IDbCommand.CommandType property is set to TableDirect, System.Data.IDbCommand.Prepare does nothing. If System.Data.IDbCommand.CommandType is set to StoredProcedure, the call to System.Data.IDbCommand.Prepare should succeed, although it may result in a no-op.
IDbConnection interface (System.Data)
Prepare
Description
Represents an open connection to a data source, and is implemented by .NET data providers that access relational databases.
The System.Data.IDbConnection interface allows an inheriting class to implement a Connection class, which represents a unique session with a data source (for example,
a network connection to a server). For more information about Connection classes, see. For more information about implementing .NET data providers, see.
ConnectionString
Prepare
[C#] string ConnectionString {get; set;}
[C++] String* get_ConnectionString( );void set_ConnectionString(String*);
[VB] Property ConnectionString As String
[JScript] abstract function get ConnectionString( ): String; public abstract function set ConnectionString(String);
Description
Gets or sets the string used to open a database.
The string can only be set when the connection state is closed.
Connection Timeout
Prepare
[C#] int ConnectionTimeout {get;}
[C++] int get_ConnectionTimeout( );
[VB] ReadOnly Property ConnectionTimeout As Integer
[JScript] abstract function get ConnectionTimeout( ): int;
Description
Gets the time to wait while trying to establish a connection before terminating the attempt and generating an error.
A value of 0 indicates no limit, and should be avoided in a System.Data.Db Connection.ConnectionString because an attempt to connect will wait indefinitely.
Database
Prepare
[C#] string Database {get;}
[C++] String* get_Database( );
[VB] ReadOnly Property Database As String
[JScript] abstract function get Database( ): String,
Description
Gets the name of the current database or the database to be used once a connection is open.
The System.Data.OleDb.OleDbConnection.Database property updates dynamically. If you change the current database using a SQL statement or the System.Data.OleDb.OleDbConnection.ChangeDatabase (System.String) method, an informational message is sent and the property is updated automatically.
State
Prepare
[C#] ConnectionState State {get;}
[C++] ConnectionState get_State( );
[VB] ReadOnly Property State As ConnectionState
[JScript] abstract function get State( ): ConnectionState;
Description
Gets the current state of the connection.
System.Data.ConnectionState values may be OR'ed together.
Begin Transaction
[C#] IDbTransaction BeginTransaction( );
[C++] IDbTransaction* BeginTransaction( );
[VB] Function BeginTransaction( ) As IDb Transaction
[JScript] function BeginTransaction( ): IDbTransaction;
Begins a database transaction.
Description
Begins a database transaction.
You must explicity commit or roll back the transaction using the System.Data.IDbTransaction.Commit or System.Data.IDbTransaction.Rollback method. To ensure that the SQL Server .NET Data Provider transaction management model performs correctly, avoid using other transaction management models, such as the one provided by SQL Server.

Begin Transaction
[C#] IDbTransaction BeginTransaction(IsolationLevel il);
[C++] IDbTransaction* Begin Transaction(IsolationLevel il);
[VB] Function BeginTransaction(ByVal il As IsolationLevel) As IDbTransaction
[JScript] function BeginTransaction(il: IsolationLevel): IDbTransaction;
Description
Begins a database transaction with the specified isolation level.
Return Value: An object representing the new transaction.
You must explicity commit or roll back the transaction using the System.Data.IDbTransaction.Commit or System.DataIDbTransaction.Rollback method. To ensure that the SQL Server .NET Data Provider transaction management model performs correctly, avoid using other transaction management models, such as the one provided by SQL Server. The isolation level under which the transaction should run.
ChangeDatabase
[C#] void ChangeDatabase(string databaseName);
[C++] void ChangeDatabase(String* databaseName);
[VB] Sub ChangeDatabase(ByVal databaseName As String)
[JScript] function ChangeDatabase(databaseName: String);
Description
Changes the current database for an open System.Data.IDbConnection. The database name.
Close
[C#] void Close( );
[C++] void Close( );
[VB] Sub Close( )
[JScript] function Close( );
Description
Closes the connection to the database.
The System.DataSqlClient.SqlConnection.Close method rolls back any pending transactions. It then releases the connection to the connection pool, or closes the connection if connection pooling is disabled.
CreateCommand
[C#] IDbCommand CreateCommand( );
[C++] IDbCommand* Create Command( );
[VB] Function CreateCommand( ) As IDbCommand
[JScript] function CreateCommand( ): IDbCommand;
Description
Creates and returns an System.DataIDbCommand object associated with the System.Data.IDbConnection.
Open
[C#] void Open( ),
[C++] void Open( );
[VB] Sub Open( )
[JScript] function Open( );
Description
Opens a database connection with the property settings specified by the System.Data.IDbConnection.ConnectionString.
When overridding System.Data.OleDb.OleDbConnection.Open in a derived class, opens a connection to the data source.
IDbDataAdapter interface (System.Data)
Open
Description
Represents a set of command-related properties that are used to fill the System.Data.DataSet and update a data source, and is implemented by .NET data providers that access relational databases.
The System.Data.IDbDataAdapter interface inherits from the System.Data.IDataAdapter interface and allows an object to create a Data,dapter designed for use with a relational database. The System.Data.IDbDataAdapter interface and, optionally, the utility class, System.Data.Common.DbDataAdapter, allow an inheriting class to implement a DataAdapter class, which represents the bridge between a data source and a System.Data.DataSet. For more information about DataAdapter classes, see. For more information about implementing .NET data providers, see.
DeleteCommand
Open
[C#] IDbCommand DeleteCommand {get; set;}
[C++] IDbCommand* get_DeleteCommand( );void set_Delete Command(IDbCommand*);
[VB] Property DeleteCommand As IDbCommand
[JScript] abstract function get DeleteCommand( ): IDbCommand;public abstract function set DeleteCommand (IDbCommand);
Description
Gets or sets an SQL statement for deleting records from the data set.
During System.Data.Common.DbDataAdapter.Update (System.Data.DataSet), if this property is not set and primary key information is present in the System.Data.DataSet, the System.Data.IDbDataAdapter.DeleteCommand can be generated automatically ifyou set the SelectCommand property of a .NET data provider. Then, any additional SQL statements that you do not set are generated by the CommandBuilder. This generation logic requires key column information to be present in the System.Data.DataSet. For more information see.
InsertCommand
Open
[C#] IDbCommand InsertCommand {get; set;}
[C++] IDbCommand* get_InsertCommand( );void set_InsertCommand(IDbCommand*);
[VB] Property InsertCommand As IDbCommand
[JScript] abstract function get InsertCommand: IDbCommand;public abstract function set InsertCommand (IDbCommand);
Description
Gets or sets an SQL statement used to insert new records into the data source.
During System.Data.Common.DbDataAdapter.Update (System.Data.DataSet), if this property is not set and primary key information is present in the System.Data.DataSet, the System.Data.IDbDataAdapter.InsertCommand can be generated automatically ifyou set the SelectCommand property of a .NET data provider. Then, any additional SQL statements that you do not set are generated by the CommandBuilder. This generation logic requires key column information to be present in the System.Data.DataSet. For more information see.
SelectCommand
Open
[C#] IDbCommand SelectCommand {get; set;}
[C++] IDbCommand* get_SelectCommand( );void set_SelectCommand(IDbCommand*);
[VB] Property SelectCommand As IDbCommand
[JScript] abstract function get SelectCommand( ): IDbCommand;public abstract function set SelectCommand (IDbCommand);
Description
Gets or sets an SQL statement used to select records in the data source.
When System.Data.IDbDataAdapter.SelectCommand is assigned to a previously created System.Data.IDbCommand, the System.Data.IDbCommand is not cloned. The System.Data.IDbDataAdapter.SelectCommand maintains a reference to the previously created System.Data.IDbCommand object.
UpdateCommand
Open
[C#] IDbCommand UpdateCommand {get; set;}
[C++] IDbCommand* get_UpdateCommand( );void set_UpdateCommand(IDbCommand*);
[VB] Property UpdateCommand As IDbCommand
[JScript] abstract function get UpdateCommand( ): IDbCommand;public abstract function set UpdateCommand (IDbCommand);
Description
Gets or sets an SQL statement used to update records in the data source.
During System.Data.Common.DbDataAdapter.Update (System.Data.DataSet), if this property is not set and primary key information is present in the System.Data.DataSet, the System.Data.IDbDataAdapter.UpdateCommand can be generated automatically if you set the SelectCommand property of a .NET data provider. Then, any additional SQL statements that you do not set are generated by the CommandBuilder. This generation logic requires key column information to be present in the System.Data.DataSet. For more information see.
IDbDataParameter interface (System.Data)
Open
Precision
Open
Scale
Open
Size
Open
IDbTransaction interface (System.Data)
Open
Description
Represents a transaction to be performed at a data source, and is implemented by .NET data providers that access relational databases.
The System.Data.IDbTransaction interface allows an inheriting class to implement a Transaction class, which represents the transaction to be performed at a data source. For more information about Transaction classes, see. For more information about implementing .NET data providers, see.
Connection
Open
[C#] IDbConnection Connection {get;}
[C++] IDbConnection* get_Connection( );
[VB] ReadOnly Property Connection As IDbConnection
[JScript] abstract function get Connection( ): IDbConnection;
Description
IsolationLevel
Open
[C#] IsolationLevel IsolationLevel {get;}
[C++] IsolationLevel get_IsolationLevel( );
[VB] ReadOnly Property IsolationLevel As IsolationLevel
[JScript] abstract function get IsolationLevel( ): IsolationLevel;
Description
Specifies the System.Data.IsolationLevelfor this transaction.
Parallel transactions are not supported. Therefore, the System.Data.IsolationLevel applies to the entire transaction.
Commit
[C#] void Commit( );
[C++] void Commit( );
[VB] Sub Commit( )
[JScript] function Commit( );
Description
Commits the database transaction.
Rollback
[C#] void Rollback( );
[C++] void Rollback( );
[VB] Sub Rollback( )
[JScript] function Rollback( );
Description
Rolls back a transaction from a pending state.
The transaction can only be rolled back from a pending state (after System.Data.IDbConnection.BeginTransaction has been called, but before System.Data.IDbTransaction.Commit is called).
InRowChangingEventException class (System.Data)
Rollback
Description
Represents the exception that is thrown when when calling the System.Data.DataRow.EndEdit method within the System.Data.DataTable.RowChanging event.
InRowChangingEventException
Example Syntax:
Rollback
[C#] public InRowChangingEventException( );
[C++] public: InRowChangingEventException( );
[VB] Public Sub New( )
[JScript] public function InRowChangingEvent Exception( );
Description
Initializes a new instance of the System.Data.InRowChangingEventException class.
InRowChangingEventException
Example Syntax:
Rollback
[C#] public InRowChangingEventException(string s);
[C++] public: InRowChangingEventException(String* s);
[VB] Public Sub New(ByVal s As String)
[JScript] public function InRowChangingEventException(s: String);
Description
Initializes a new instance of the System.Data.InRowChangingEventException class with the specified string. The string to display when the exception is thrown.
InRowChangingEventException
Example Syntax:
Rollback
[C#] public InRowChangingEventException (SerializationInfo info, StreamingContext context);
[C++] public: InRowChangingEventException (SerializationInfo* info, StreamingContext context);
[VB] Public Sub New(ByVal info As SerializationInfo, ByVal context As StreamingContext)
[JScript] public function InRowChangingEventException (info: SerializationInfo, context: StreamingContext); Initializes a new instance of the System.Data.InRowChangingEventException class.
Description
Initializes a new instance of the System.Data.InRowChangingEventException class with serialization information. The data necessary to serialize or deserialize an object. Description of the source and destination of the specified serialized stream.
HelpLink
HResult InnerException
Message
Source
StackTrace
TargetSite
InternalDataCollectionBase class (System.Data)
ToString
Description
   Provides the base functionality for creating collections.
   The System.BaseCollection class and its members are not intended for use as a stand alone component, but as the class from which other collection classes derive standard functionality.
   InternalDataCollectionBase
   Example Syntax:
   ToString
[C#] public InternalDataCollectionBase( );
[C++] public: InternalDataCollectionBase( );
[VB] Public Sub New( )
[JScript] public function InternalDataCollectionBase( );
   Count
   ToString
[C#] public virtual int Count {get;}
[C++] public: __property virtual int get_Count( );
[VB] Overridable Public ReadOnly Property Count As Integer
[JScript] public function get Count( ): int;
Description
   Gets the total number of elements in a collection.
   The System.BaseCollection class and its members are not intended for use as a stand alone component, but as the class from which other collection classes derive standard functionality.
   IsReadOnly
   ToString
[C#] public bool IsReadOnly {get;}
[C++] public: __property bool get_IsReadOnly( );
[VB] Public ReadOnly Property IsReadOnly As Boolean
[JScript] public function get IsReadOnly( ): Boolean;
Description
   Gets a value indicating whether the System.Data.InternalDataCollectionBase is read-only.
   The System.BaseCollection class and its members are not intended for use as a stand alone component, but as the class from which other collection classes derive standard functionality.
   IsSynchronized
   ToString
[C#] public bool IsSynchronized {get;}
[C++] public: __property bool get_IsSynchronized( );
[VB] Public ReadOnly Property IsSynchronized As Boolean
[JScript] public function get IsSynchronized( ): Boolean;
Description
   Gets a value indicating whether the System.Data.InternalDataCollectionBase is synchonized.
   The System.BaseCollection class and its members are not intended for use as a stand alone component, but as the class from which other collection classes derive standard functionality.
   List
   ToString
[C#] protected virtual ArrayList List {get;}
[C++] protected: __property virtual ArrayList* get_List( );
[VB] Overridable Protected ReadOnly Property List As ArrayList
[JScript] protected function get List( ): ArrayList;

Description
   Gets the items of the collection as a list.
   The System.BaseCollection class and its members are not intended for use as a stand alone component, but as the class from which other collection classes derive standard functionality.
   SyncRoot
   ToString
[C#] public object SyncRoot {get;}
[C++] public: __property Object* get_SyncRoot( );
[VB] Public ReadOnly Property SyncRoot As Object
[JScript] public function get SyncRoot( ): Object,
Description
   Gets an object that can be used to synchronize the collection.
   The System.BaseCollection class and its members are not intended for use as a stand alone component, but as the class from which other collection classes derive standard functionality.
   CopyTo
[C#] public void Copy To(Array ar, it index);
[C++] public: __sealed void Copy To(Array* ar, int index);
[VB] NotOverridable Public Sub CopyTo(ByVal ar As Array, ByVal index As Integer)
[JScript] public function CopyTo(ar Array, index: int);
Description
   Copies all the elements of the current System.Data.InternalDataCollectionBase to a one-dimensional System.Array, starting at the specified System.Data.InternalDataCollectionBase index.
   This method can be overriden by a derived class. The one-dimensional System.Array to copy the current System.Data.InternalDataCollectionBase object's elements into. The destination System.Array index to start copying into.
   GetEnumerator
[C#] public IEnumerator GetEnumerator( );
[C++] public: __sealed IEnumerator* GetEnumerator( );
[VB] NotOverridable Public Function GetEnumerator( ) As IEnumerator
[JScript] public function GetEnumerator( ): IEnumerator;
Description
   Gets an System.Collections.IEnumerator for the collection.
Return Value: An System.Collections.IEnumerator for the collection.
   The System.BaseCollection class and its members are not intended for use as a stand alone component, but as the class from which other collection classes derive standard functionality.
   InvalidConstraintException class (System.Data)
   ToString
Description
   Represents the exception that is thrown when incorrectly attempting to create or access a relation.
   The System.Data.InvalidConstraintException is thrown when incorrectly invoking the following methods while attempting to create or access a relation.
   InvalidConstraintException
   Example Syntax:
   ToString
[C#] public InvalidConstraintException( );
[C++] public: InvalidConstraintException( );
[VB] Public Sub New( )
[JScript] public function InvalidConstraintException( );
Description
   Initializes a new instance of the System.Data.InvalidConstraintException class.
   InvalidConstraintException Example Syntax:
ToString
[C#] public InvalidConstraintException(string s);
[C++] public: InvalidConstraint(Exception(String* s);
[VB] Public Sub New(ByVal s As String)
[JScript] public function InvalidConstraintException(s: String);
Description
Initializes a new instance of the System.Data.InvalidConstraintException class with the specified string. The string to display when the exception is thrown.
InvalidConstraintException
Example Syntax:
ToString
[C#] public InvalidConstraintException(SerializationInfo info, StreamingContext context);
[C++] public: InvalidConstraintException (SerializationInfo* info, StreamingContext context);
[VB] Public Sub New(ByVal info As SerializationInfo, ByVal context As StreamingContext)
[JScript] public function InvalidConstraintException(info: SerializationInfo, context: StreamingContext); Initializes a new instance of the System.Data.InvalidConstraintException class.
Description
Initializes a new instance of the System.Data.InvalidConstraintException class with serialization information. The data necessary to serialize or deserialize an object. Description of the source and destination of the specified serialized stream.
HelpLink
HResult
InnerException
Message
Source
StackTrace
TargetSite
InvalidExpressionException class (System.Data)
ToString
Description
Represents the exception that is thrown when attempting to add a System.Data.DataColumn containing an invalid System.Data.DataColumn.Expression to a System.Data.DataColumnCollection.
The System.Data.DataColumn.Expression property is use to calculate the value of a column, or create an aggregate column.
InvalidExpressionException
Example Syntax:
ToString
[C#] public InvalidExpressionException( );
[C++] public: InvalidExpressionException( );
[VB] Public Sub New( )
[JScript] public function InvalidExpressionException( ); Initializes a new instance of the System.Data.InvalidExpressionException class.
Description
Initializes a new instance of the System.Data.InvalidExpressionException class.
InvalidExpressionException
Example Syntax:
ToString
[C#] public InvalidExpressionException(string s);
[C++] public: InvalidExpressionException(String* s);
[VB] Public Sub New(ByVal s As String)
[JScript] public function InvalidExpressionException(s: String);

Description
Initializes a new instance of the System.Data.InvalidExpressionException class with the specified string. The string to display when the exception is thrown.
InvalidExpressionException
Example Syntax:
ToString
[C#] public InvalidExpressionException(SerializationInfo info, StreamingContext context);
[C++] public: InvalidExpressionException (SerializationInfo* info, StreamingContext context);
[VB] Public Sub New(ByVal info As SerializationInfo, ByVal context As StreamingContext)
[JScript] public function InvalidExpressionException(info SerializationInfo, context: StreamingContext);
Description
Initializes a new instance of the System.Data.InvalidExpressionException class with the System.Runtime.Serialization.SerializationInfo and the System.Runtime.Serialization.StreamingContext. The data needed to serialize or deserialize an object. The source and destination of a given serialized stream.
HelpLink
HResult
InnerException
Message
Source
StackTrace
TargetSite
IsolationLevel enumeration (System.Data)
ToString
Description
Specifies the transaction locking behavior for the connection.
The System.Data.IsolationLevel values are used by a .NET data provider when performing a transaction.
ToString
[C#] public const IsolationLevel Chaos;
[C++]public: const IsolationLevel Chaos;
[VB] Public Const Chaos As IsolationLevel
[JScript] public var Chaos: IsolationLevel;
Description
The pending changes from more highly isolated transactions cannot be overwritten.
ToString
[C#] pubic const IsolationLevel ReadCommitted;
[C++] public: const IsolationLevel ReadCommitted;
[VB] Public Const ReadCommitted As IsolationLevel
[JScript] public var ReadCommitted: IsolationLevel;
Description
Shared locks are held while the data is being read to avoid dirty reads, but the data can be changed before the end of the transaction, resulting in non-repeatable reads or phantom data.
ToString
[C#] public const IsolationLevel ReadUncommitted;
[C++] public: const IsolationLevel ReadUncommitted;
[VB] Public Const ReadUncommitted As IsolationLevel
[JScript] public var ReadUncommitted: IsolationLevel;
Description
A dirty read is possible, meaning that no shared locks are issued and no exclusive locks are honored.
ToString
[C#] public const IsolationLevel RepeatableRead;
[C++] public: const IsolationLevel RepeatableRead;
[VB] Public Const RepeatableRead As IsolationLevel
[JScript] public var RepeatableRead: IsolationLevel;

Description

Locks are placed on all data that is used in a query, preventing other users from updating the data. Prevents non-repeatable reads but phantom rows are still possible.
ToString
[C#] public const IsolationLevel Serializable;
[C++] public: const IsolationLevel Serializable;
[VB] Public Const Serializable As IsolationLevel
[JScript] public var Serializable: IsolationLevel;
Description A range lock is palced on the System.Data.DataSet, preventing other users from updating or inserting rows into the dataset until the transaction is complete.
ToString
[C#] public const IsolationLevel Unspecified;
[C++] public: const IsolationLevel Unspecified;
[VB] Public Const Unspecified As IsolationLevel
[JScript] public var Unspecified: IsolationLevel;
Description A different isolation level than the one specified is being used, but the level cannot be determined.
ITableMapping interface (System.Data)
ToString
Description Associates a source table with a table in a System.Data.DataSet, and is implemented by the System.Data.Common.DataTableMapping class, which is used in common by .NET data providers.

The System.Data.ITableMapping interface allows an inheriting class to implement a TableMapping class, which associates a data source column with a System.Data.DataSet column. For more information, see.
ColumnMappings
ToString
[C#] IColumnMappingCollection ColumnMappings {get;}
[C++] IColumnMappingCollection* get_ColumnMappings( );
[VB] ReadOnly Property ColumnMappings As IColumnMappingCollection
[JScript] abstract function get ColumnMappings( ): IColumnMappingCollection;
Description Gets the derived System.Data.Common.DataColumnMappingCollection for the System.Data.DataTable.
DataSetTable
ToString
[C#] string DataSetTable {get; set;}
[C++] String* get_DataSetTable( );void set_DataSetTable (String*);
[VB] Property DataSetTable As String
[JScript] abstract function get DataSetTable( ): String;public abstract function set DataSetTable(String);
Description Gets or sets the case-insensitive name of the table within the System.Data.DataSet.
SourceTable
ToString
[C#] string SourceTable {get; set;}
[C++] String* get_SourceTable( );void set_SourceTable (String*);
[VB] Property SourceTable As String
[JScript] abstract function get SourceTable( ): String;public abstract function set SourceTable(String);
Description Gets or sets the case-sensitive name of the source table.
ITableMappingCollection interface (System.Data)
ToString
Description Contains a collection of TableMapping objects, and is implemented by the System.Data.Common.DataTableMappingCollection, which is used in common by .NET data providers.

The System.Data.ITableMappingCollection interface allows an inheriting class to implement a TableMapping collection. For more information, see.
Item
ToString
[C#] object this[string index] {get; set;}
[C++] Object* get_Item(String* index);void set_Item (String* index, Object*);
[VB] Default Property Item(ByVal index As String) As Object
[JScript] abstract returnValue=ITableMappingCollectionObject.Item(index); ITableMappingCollectionObject.Item(index)=returnValue;
Description Gets or sets the instance of System.Data.ITableMapping with the specified name. The name of the System.Data.ITableMapping.
Add
[C#] ITableMapping Add(string sourceTableName, string dataSetTableName);
[C++] ITableMapping* Add(String* sourceTableName, String* dataSetTableName);
[VB] Function Add(ByVal sourceTableName As String, ByVal dataSetTableName As String) As ITableMapping
[JScript] function Add(sourceTableName: String, dataSetTableName: String): ITableMapping;
Description Adds a table mapping to the collection.
Return Value: A reference to the newly-mapped System.Data.ITableMapping object. The case-sensitive name of the source table. The name of the System.Data.DataSettable.
Contains
[C#] bool Contains(string sourceTableName);
[C++] bool Contains(String* source TableName);
[VB] Function Contains(ByVal sourceTableName As String) As Boolean
[JScript] function Contains(sourceTableName: String): Boolean;
Description Gets a value indicating whether the collection contains a table mapping with the specified source table name.
Return Value: true if a table mapping with the specified source table name exists, otherwise false. The case-sensitive name of the source table.
GetByDataSetTable
[C#] ITableMapping GetByDataSetTable(string dataSetTableName);
[C++] ITableMapping* GetByDataSetTable(String* dataSetTableName);
[VB] Function GetByDataSetTable(ByVal dataSetTableName As String) As ITableMapping
[JScript] function GetByDataSetTable(dataSetTableName: String): ITableMapping;
Description Gets a reference to a System.Data.ITableMapping table mapping.
Return Value: A reference to a System.Data.ITableMapping table mapping. The name of the System.Data.DataSet table within the collection.
IndexOf
[C#] int IndexOf(string sourceTableName);

[C++] int IndexOf(String* sourceTableName);
[VB] Function IndexOf(ByVal sourceTableName As String) As Integer
[JScript] function IndexOf(sourceTableName: String): int;
Description
  Gets the location of the System.Data.ITableMapping object within the collection.
Return Value: The location of the System.Data.ITableMapping object within the collection. The case-sensitive name of the source table.
  RemoveAt
[C#] void RemoveAt(string sourceTableName);
[C++] void RemoveAt(String* sourceTableName);
[VB] Sub RemoveAt(ByVal sourceTableName As String)
[JScript] function RemoveAt(sourceTableName: String);
Description
  Removes the System.Data.ITableMapping object with the specified name from the collection. The case-sensitive name of the source table.
    MappingType enumeration (System.Data)
    RemoveAt
Description
  Specifies how a System.Data.DataColumn is mapped.
  The System.Data.MappingType enumeration is used when getting or setting the System.Data.DataColumn.ColumnMapping property of the System.Data.DataColumn. The property determines how a column's values will be written when the System.Data.DataSet.WriteXml (System.IO.Stream) method is called on a System.Data.DataSet to write the data and schema out as an XML document.
    RemoveAt
[C#] public const MappingType Attribute;
[C++]public: const MappingType Attribute;
[VB] Public Const Attribute As MappingType
[JScript] public var Attribute: MappingType;
Description
  The column is mapped to an XML attribute.
    RemoveAt
[C#] public const MappingType Element,
[C++] public: const MappingType Element;
[VB] Public Const Element As MappingType
[JScript] public var Element: MappingType;
Description
  The column is mapped to an XML element.
    RemoveAt
[C#] public const MappingType Hidden;
[C++] public: const MappingType Hidden;
[VB] Public Const Hidden As MappingType
[JScript] public var Hidden: MappingType;
Description
  The column is mapped to an internal structure.
    RemoveAt
[C#] public const MappingType SimpleContent;
[C++] public: const MappingType SimpleContent;
[VB] Public Const SimpleContent As MappingType
[JScript] public var SimpleContent: MappingType;
Description
  The column is mapped to an System.Xml.XmlText node.
    MergeFailedEventArgs class (System.Data)
    ToString
Description
  Occurs when a target and source DataRow have the same primary key value, and the System.Data.DataSet.EnforceConstraints property is set to true.
    MergeFailedEventArgs
    Example Syntax:
    ToString
[C#] public MergeFailedEventArgs(DataTable table, string conflict);
[C++] public: MergeFailedEventArgs(DataTable* table, String* conflict);
[VB] Public Sub New(ByVal table As DataTable, ByVal conflict As String)
[JScript] public function MergeFailedEventArgs(table: DataTable, conflict: String);
Description
  Initializes a new instance of a System.Data.MergeFailedEventArgs class with the System.Data.DataTable name and a description of the merge conflict. The System.Data.DataTable name. A description of the merge conflict.
    Conflict
    ToString
[C#] public string Conflict {get;}
[C++] public: __property String* get_Conflict( );
[VB] Public ReadOnly Property Conflict As String
[JScript] public function get Conflict( ): String;
Description
  Returns a description of the merge conflict.
    Table
    ToString
[C#] public DataTable Table {get;}
[C++] public: __property DataTable* get_Table( );
[VB] Public ReadOnly Property Table As DataTable
[JScript] public function get Table( ): DataTable;
Description
  Returns the name of the System.Data.DataTable.
    MergeFailedEventHandler delegate (System.Data)
    ToString
Description
  Represents the method that will handle the System.Data.DataSet.MergeFailed event.
  When you create a System.Data.MergeFailedEventHandler delegate, you identify the method that will handle the event. To associate the event with your event handler, add an instance of the delegate to the event. The event handler is called whenever the event occurs, unless you remove the delegate. For more information about event handler delegates, see.
    MissingMappingAction enumeration (System.Data)
    ToString
Description
  Determines the action that occurs when a mapping is missing from a source table or a source column.
  The System.Data.MissingMappingAction values are used as arguments in the System.Data.Common.DataColumnMappingCollection. GetColumnMappingBySchemaAction (System.Data.Common.DataColumnMappingCollection, System.String,System.Data.MissingMappingAction) method, and the System.Data.Common.DataTableMappingCollection. GetTableMappingBySchemaAction (System.Data.Common.DataTableMappingCollection, System.String,System.String,System.Data. MissingMappingAction) method.
    ToString
[C#] public const MissingMappingAction Error;
[C++] public: const MissingMappingAction Error;
[VB] Public Const Error As MissingMappingAction
[JScript] public var Error: MissingMappingAction;
Description
  A System.SystemException is generated.
    ToString
[C#] public const MissingMappingAction Ignore;
[C++] public: const MissingMappingAction Ignore;

[VB] Public Const Ignore As MissingMappingAction
[JScript] public var Ignore: MissingMappingAction;
Description
  The column or table not having a mapping is ignored. Returns null.
  ToString
[C#] public const MissingMappingAction Passthrough;
[C++] public: const MissingMappingAction Passthrough;
[VB] Public Const Passthrough As MissingMappingAction
[JScript] public var Passthrough: MissingMappingAction;
Description
  The source column or source table created and added to the System.Data.DataSet using its original name.
  MissingPrimaryKeyException class (System.Data)
  ToString
Description
  Represents the exception that is thrown when attempting to access a row in a table that has no primary key.
  The System.Data.MissingPrimaryKeyException is thrown when invoking the following methods to access a row in a table that has no primary key.
  MissingPrimaryKeyException
  Example Syntax:
  ToString
[C#] public MissingPrimaryKeyException( );
[C++] public: MissingPrimaryKeyException( );
[VB] Public Sub New( )
[JScript] public function MissingPrimaryKeyException( );
Description
  Initializes a new instance of the System.Data.MissingPrimaryKeyException class.
  MissingPrimaryKeyException
  Example Syntax:
  ToString
[C#] public MissingPrimaryKeyException(string s);
[C++]public: MissingPrimaryKeyException(String* s);
[VB] Public Sub New(ByVal s As String)
[JScript] public function MissingPrimaryKeyException(s: String);
Description
  Initializes a new instance of the System.Data.MissingPrimaryKeyException class with the specified string. The string to display when the exception is thrown.
  MissingPrimaryKeyException
  Example Syntax:
  ToString
[C#] public MissingPrimaryKeyException(SerializationInfo info, StreamingContext context);
[C++] public: MissingPrimaryKeyException (SerializationInfo* info, StreamingContext context);
[VB] Public Sub New(ByVal info As SerializationInfo, ByVal context As StreamingContext)
[JScript] public function MissingPrimaryKeyException (info: SerializationInfo, context: StreamingContext); Initializes a new instance of the System.Data.MissingPrimaryKeyException class.
Description
  Initializes a new instance of the System.Data.MissingPrimaryKeyException class with serialization information.
The data necessary to serialize or deserialize an object. A description of the source and destination of the specified serialized stream.
  HelpLink
  HResult
  InnerException
  Message
  Source
  StackTrace
  TargetSite
  MissingSchemaAction enumeration (System.Data)
  ToString
Description
  Specifies the action to take when adding data to the System.Data.DataSet and the required System.Data.DataTable or System.DataDataColumn is missing.
  The System.Data.MissingSchemaAction values are used whenever an action is taken that could change the schema of the System.Data.DataSet.
  ToString
[C#] public const MissingSchemaAction Add;
[C++] public: const MissingSchemaAction Add;
[VB] Public Const Add As MissingSchemaAction
[JScript] public var Add: MissingSchemaAction;
Description
  Adds the necessary columns to complete the schema.
  ToString
[C#] public const MissingSchemaAction AddWithKey;
[C++] public: const MissingSchemaAction AddWithKey;
[VB] Public Const AddWithKey As MissingSchemaAction
[JScript] public var AddWithKey: MissingSchemaAction;
Description
  Adds the necessary columns and primary key information to complete the schema. For more information about how primary key information is added to a System.Data.DataTable, see System.DataIDataAdapter.FillSchema (System.Data.DataSet,System.Data.SchemaType). To function properly with the OLE DB .NET Data Provider, AddWithKey requires that the native OLE DB provider obtains necessary primary key information by setting the DBPROP_UNIQUEROWS property, and then determines which columns are primary key columns by examining DBCOLUMN_KEYCOLUMN in the IColumnsRowset. As an alternative, the user may explicitly set the primary key constraints on each System.Data.DataTable. This ensures that incoming records that match existing records are updated instead of appended. When using AddWithKey, the SQL Server .NET Data Provider appends a FOR BROWSE clause to the statement being executed. The user should be aware of potential side effects, such as interference with the use of SET FMTONLY ON statements. See SQL Server Books Online for more information.
  ToString
[C#] public const MissingSchemaAction Error,
[C++] public: const MissingSchemaAction Error;
[VB] Public Const Error As MissingSchemaAction
[JScript] public var Error: MissingSchemaAction;
Description.
  A System.SystemException is generated.
  ToString
[C#] public const MissingSchemaAction Ignore;
[C++] public: const MissingSchemaAction Ignore;
[VB] Public Const Ignore As MissingSchemaAction
[JScript] public var Ignore: MissingSchemaAction;
Description
  Ignores the extra columns.
  NoNullAllowedException class (System.Data)
  ToString
Description
  Represents the exception that is thrown when attempting to insert a null value into a column where System.Data.DataColumn.AllowDBNull is set to false The System.Data.NoNullAllowedException is thrown when invoking the following methods or properties when attempting to insert a null value into a column where System.Data.DataColumn. AllowDBNull is set to false.
   NoNullAllowedException
   Example Syntax:
   ToString
[C#] public NoNullAllowedException( );
[C++] public: NoNullAllowedException( );
[VB] Public Sub New( )
[JScript] public function NoNullAllowedException( );
Description
   Initializes a new instance of the System.Data.NoNullAllowedException class.
   NoNullAllowedException
   Example Syntax:
   ToString
[C#] public NoNullAllowedException(string s);
[C++] public: NoNullAllowedException(String* s);
[VB] Public Sub New(ByVal s As String)
[JScript] public function NoNullAllowedException(s: String);
Description
   Initializes a new instance of the System.Data.NoNullAllowedException class with the specified string. The string to display when the exception is thrown.
   NoNullAllowedException
   Example Syntax:
   ToString
[C#] public NoNullAllowedException(SerializationInfo info, StreamingContext context);
[C++] public: NoNullAllowedException(SerializationInfo* info, StreamingContext context);
[VB] Public Sub New(ByVal info As SerializationInfo, ByVal context As StreamingContext)
[JScript] public function NoNullAllowedException(info: SerializationInfo, context: StreamingContext); Initializes a new instance of the System.Data.NoNullAllowedException class.
Description
   Initializes a new instance of the System.Data.NoNullAllowedException class with serialization information. The data necessary to serialize or deserialize an object. Description of the source and destination of the specified serialized stream.
   HelpLink
   HResult
   InnerException
   Message
   Source
   StackTrace
   TargetSite
   ParameterDirection enumeration (System.Data)
   ToString
Description
   Specifies the type of a parameter within a query relative to the System.Data.DataSet.
   The System.Data.ParameterDirection values are used by the parameter direction properties of System.Data.OleDb. OleDbParameter and System.Data.SqlClient.SqlParameter.
   ToString
[C#] public const ParameterDirection Input;
[C++] public: const ParameterDirection Input;
[VB] Public Const Input As ParameterDirection
[JScript] public var Input: ParameterDirection;
Description
   The parameter is an input parameter.
   ToString
[C#] public const ParameterDirection InputOutput;
[C++] public: const ParameterDirection InputOutput;
[VB] Public Const InputOutput As ParameterDirection
[JScript] public var InputOutput: ParameterDirection;
Description
   The parameter is capable of both input and output.
   ToString
[C#] public const ParameterDirection Output;
[C++] public: const ParameterDirection Output;
[VB] Public Const Output As ParameterDirection
[JScript] public var Output: ParameterDirection;
Description
   The parameter is an output parameter.
   ToString
[C#] public const ParameterDirection ReturnValue;
[C++] public: const ParameterDirection ReturnValue;
[VB] Public Const ReturnValue As ParameterDirection
[JScript] public var ReturnValue: ParameterDirection;
Description
   The parameter represents a return value from an operation such as a storedprocedure, built-in function, or user-defined function.
   PropertyAttributes enumeration (System.Data)
   ToString
Description
   Specifies the attributes of a property.
   ToString
[C] public const PropertyAttributes NotSupported;
[C++] public: const PropertyAttributes NotSupported;
[VB] Public Const NotSupported As PropertyAttributes
[JScript] public var NotSupported: PropertyAttributes;
Description
   The property is not supported by the provider.
   ToString
[C#] public const PropertyAttributes Optional;
[C++] public: const PropertyAttributes Optional;
[VB] Public Const Optional As PropertyAttributes
[JScript] public var Optional: PropertyAttributes;
Description
   The user does not need to specify a value for this property before the data source is initialized.
   ToString
[C#] public const PropertyAttributes Read;
[C++] public: const PropertyAttributes Read;
[VB] Public Const Read As PropertyAttributes
[JScript] public var Read: PropertyAttributes;
Description
   The user can read the property.
   ToString
[C#] public const PropertyAttributes Required;
[C++] public: const PropertyAttributes Required;
[VB] Public Const Required As PropertyAttributes
[JScript] public var Required: PropertyAttributes;
Description
   The user must specify a value for this property before the data source is initialized.
   ToString
[C#] public const PropertyAttributes Write;
[C++] public: const PropertyAttributes Write;
[VB] Public Const Write As PropertyAttributes
[JScript] public var Write: PropertyAttributes;
Description
   The user can write to the property.
   PropertyCollection class (System.Data)
   ToString
Description
   Represents a collection of properties that can be added to System.Data.DataColumn, System.Data.DataSet, or System.Data.DataTable.

The System.Data.PropertyCollection can be accessed through the ExtendedProperties property of the System.Data.DataColumn, System.Data.DataSet, or System.Data.DataTable class.
    PropertyCollection
    Example Syntax:
    ToString
[C#] public PropertyCollection( );
[C++] public: PropertyCollection( );
[VB] Public Sub New( )
[JScript] public function PropertyCollection( );
    comparer
    Count
    hcp
    IsFixedSize
    IsReadOnly
    IsSynchronized
    Item
    Keys
    SyncRoot
    Values
    ReadOnlyException class (System.Data)
    ToString
Description
    Represents the exception that is thrown when attempting to change the value of a read-only column.
    The System.Data.RowNotInTableException is thrown when invoking the following methods or properties when attempting to change the value of a read-only column.
    ReadOnlyException
    Example Syntax:
    ToString
[C#] public ReadonlyException( );
[C++] public: ReadOnlyException( );
[VB] Public Sub New( )
[JScript] public function ReadOnlyException( );
Description
    Initializes a new instance of the System.Data.ReadOnly-Exception class.
    ReadOnlyException
    Example Syntax:
    ToString
[C#] public ReadOnlyException(string s);
[C++] public: ReadOnlyException(String* s);
[VB] Public Sub New(ByVal s As String)
[JScript] public function ReadOnlyException(s: String);
Description
    Initializes a new instance of the System.Data.ReadOnly-Exception class with the specified string. The string to display when the exception is thrown.
    ReadOnlyException
    Example Syntax:
    ToString
[C#] public ReadOnlyException(SerializationInfo info, StreamingContext context);
[C++] public: ReadOnlyException(SerializationInfo* info, StreamingContext context);
[VB] Public Sub New(ByVal info As SerializationInfo, ByVal context As StreamingContext)
[JScript] public function ReadOnlyException(info: SerializationInfo, context: StreamingContext); Initializes a new instance of the System.Data.ReadOnlyException class.
Description
    Initializes a new instance of the System.Data.ReadOnly-Exception class with serialization information. The data necessary to serialize or deserialize an object. Description of the source and destination of the specified serialized stream.
    HelpLink
    HResult
    InnerException
    Message
    Source
    StackTrace
    TargetSite
    RowNotInTableException class (System.Data)
    ToString
Description
    Represents the exception that is thrown when trying to perform an operation on a System.Data.DataRow that is not in a System.Data.DataTable. The System.Data.RowNotInTableException is thrown when invoking the following methods on a row that has been deleted with either the System.Data.DataRow.Delete or the System.Data.DataRowCollection.Remove (System.Data.DataRow) method.
    RowNotInTableException
    Example Syntax:
    ToString
[C#]public RowNotInTableException( );
[C++] public: RowNotInTableException( );
[VB] Public Sub New( )
[JScript] public function RowNotInTableException( ); Initializes a new instance of the System.Data.RowNotInTableException class with no arguments.
Description
    Initializes a new instance of the System.Data.RowNotInTableException class.
    RowNotInTableException
    Example Syntax:
    ToString
[C#] public RowNotInTableException(string s);
[C++] pubic: RowNotInTableException(String* s);
[VB] Public Sub New(ByVal s As String)
[JScript] public function RowNotInTableException(s: String);
Description
    Initializes a new instance of the System.Data.RowNotInTableException class with the specified string. The string to display when the exception is thrown.
    RowNotInTableException
    Example Syntax:
    ToString
[C#] public RowNotInTableException(SerializationInfo info, StreamingContext context);
[C++] public: RowNotInTableException(SerializationInfo* info, StreamingContext context);
[VB] Public Sub New(ByVal info As SerializationInfo, ByVal context As StreamingContext)
[JScript] public function RowNotInTableException(info: SerializationInfo, context: StreamingContext); Initializes a new instance of the System.Data.RowNotInTableException class.
Description
    Initializes a new instance of the System.Data.RowNotInTablejxception class with serialization information. The data necessary to serialize or deserialize an object. Description of the source and destination of the specified serialized stream.
    HelpLink
    HResult
    InnerException
    Message
    Source
    StackTrace TargetSite
Rule enumeration (System.Data)
ToString
Description
  Indicates the action that occurs when a System.Data.ForeignKeyConstraint is enforced.
  The System.Data.Rule values are set to the System.Data.ForeignKeyConstraint.UpdateRule and the System.Data.ForeignKeyConstraint.DeleteRule properties of a System.Data.ForeignKeyConstraint object found in a System.Data.DataTable object's System.Data.ConstraintCollection.
ToString
[C#] public const Rule Cascade;
[C++] public: const Rule Cascade;
[VB] Public Const Cascade As Rule
[JScript] public var Cascade: Rule;
Description
  Delete or update related rows. This is the default.
ToString
[C#] public const Rule None;
[C++] public: const Rule None;
[VB] Public Const None As Rule
[JScript] public var None: Rule;
Description
  No action taken on related rows.
ToString
[C#] public const Rule SetDefault;
[C++] public: const Rule SetDefault;
[VB] Public Const SetDefault As Rule
[JScript] public var SetDefault: Rule;
Description
  Set values in related rows to the value contained in the System.Data.DataColumn.DefaultValue property.
ToString
[C#] public const Rule SetNull;
[C++] public: const Rule SetNull;
[VB] Public Const SetNull As Rule
[JScript] public var SetNull: Rule;
Description
  Set values in related rows to DBNull.
  Schema Type enumeration (System.Data)
ToString
Description
  Specifies how to handle existing schema mappings when performing a System.Data.Common.DataAdapter.FillSchema (System.Data.DataSet,System.Data.SchemaType) operation.
  The System.Data.SchemaType usually should be set to Mapped, because any established table and column mappings are used.
ToString
[C#] public const Schema Type Mapped;
[C++] public: const Schema Type Mapped;
[VB] Public Const Mapped As SchemaType
[JScript] public var Mapped: SchemaType;
Description
  Apply any existing table mappings to the incoming schema. Configure the System.Data.DataSet with the transformed schema.
ToString
[C#] public const SchemaType Source;
[C++] public: const Schema Type Source;
[VB] Public Const Source As SchemaType
[JScript] public var Source: SchemaType;

Description
  Ignore any table mappings on the DataAdapter. Configure the System.Data.DataSet using the incoming schema without applying any transformations.
  SqlDbType enumeration (System.Data)
ToString
Description
  Specifies SQL Server data types.
ToString
[C#] public const SqlDbType BigInt;
[C++] public: const SqlDbType BigInt;
[VB] Public Const BigInt As SqlDbType
[JScript] public var BigInt: SqlDbType;
Description
  System.Int64 A 64-bit signed integer.
ToString
[C#] public const SqlDBType Binary;
[C++] public: const SqlDbType Binary;
[VB] Public Const Binary As SqlDbType
[JScript] public var Binary: SqlDbType;
Description
  System.Array of type System.Byte A fixed-length stream of binary data ranging between 1 and 8,000 bytes.
ToString
[C#] public const SqlDbType Bit;
[C++] public: const SqlDbType Bit;
[VB] Public Const Bit As SqlDbType
[JScript] public var Bit: SqlDbType;
Description
  System.Boolean An unsigned numeric value that can be 0, 1, or null.
ToString
[C#] public const SqlDBType Char;
[C++] public: const SqlDbType Char;
[VB] Public Const Char As SqlDbType
[JScript] public var Char: SqlDbType;
Description
  System.String A fixed-length stream of non-Unicode characters ranging between 1 and 8,000 characters.
ToString
[C#] public const SqlDbType DateTime;
[C++] public: const SqlDbType DateTime;
[VB] Public Const DateTime As SqlDbType
[JScript] public var DateTime: SqlDbType;
Description
  System.DateTime Date and time data ranging in value from Jan. 1, 1753 to Dec. 31, 9999 to an accuracy of 3.33 milliseconds.
ToString
[C#] public const SqlDbType Decimal;
[C++] public: const SqlDbType Decimal;
[VB] Public Const Decimal As SqlDbType
[JScript] public var Decimal: SqlDbType;
Description
  System.Decimal A fixed precision and scale numeric value between −10 −1 and 10 −1.
ToString
[C#] public const SqlDbType Float;
[C++] public: const SqlDbType Float;
[VB] Public Const Float As SqlDbType
[JScript] public var Float: SqlDbType;
Description
  System.Double A floating point number within the range of −1.79E+308 through 1.79E+308.
ToString
[C#] public const SqlDbType Image;
[C++] public: const SqlDbType Image;
[VB] Public Const Image As SqlDBType

[JScript] public var Image: SqlDbType;
Description
System.Array of type System.Byte A variable-length stream of binary data ranging from 0 to 2 −1 (or 2,147,483,647) bytes.
ToString
[C#] public const SqlDbType Int;
[C++] public: const SqlDbType Int;
[VB] Public Const Int As SqlDbType
[JScript] public var Int: SqlDbType;
Description
System.Int32 A 32-bit signed integer.
ToString
[C#] public const SqlDbType Money;
[C++] public: const SqlDbType Money,;
[VB] Public Const Money As SqlDbType
[JScript] public var Money: SqlDbType;
Description
System.Decimal A currency value ranging from −2 (or 922,337,203,685,477.5808) to 2 −1 (or +922,337,203,685,477.5807) with an accuracy to a ten-thousandth of a currency unit.
ToString
[C#] public const SqlDbType NChar,;
[C++] public: const SqlDbType NChar,
[VB] Public Const NChar As SqlDbType
[JScript] public var NChar: SqlDbType;
Description
System.String A fixed-length stream of Unicode characters ranging between 1 and 4,000 characters.
ToString
[C#] public const SqlDbType NText;
[C++] public: const SqlDbType NIext;
[VB] Public Const NText As SqlDbType
[JScript] public var NText: SqlDbType;
Description
System.String A variable-length stream of Unicode data with a maximum length of 2 −1 (or 1,073,741,823) characters.
ToString
[C#] public const SqlDbType NVarChar;
[C++] public: const SqlDbType NVarChar;
[VB] Public Const NVarChar As SqlDbType
[JScript] public var NVarChar: SqlDbType;
Description
System.String A variable-length stream of Unicode characters ranging between 1 and 4,000 characters.
ToString
[C#] public const SqlDbType Real;
[C++] public: const SqlDbType Real;
[VB] Public Const Real As SqlDbType
[JScript] public var Real: SqlDbType;
Description
System.Single A floating point number within the range of −3.40E+38 through 3.40E+38.
ToString
[C#] public const SqlDbType SmallDateTime;
[C++] public: const SqlDbType SmallDateTime;
[VB] Public Const SmallDate Time As SqlDbType
[JScript] public var SmallDateTime: SqlDbType;
Description
System.DateTime Date and time data ranging in value from Jan. 1, 1900 to Jun. 6, 2079 to an accuracy of one minute.
ToString
[C#] public const SqlDbType SmallInt;
[C++] public: const SqlDbType SmallInt;
[VB] Public Const SmallInt As SqlDbType
[JScript] public var SmallInt: SqlDbType;
Description
System.Int16 A 16-bit signed integer.
ToString
[C#] public const SqlDbType SmallMoney;
[C++] public: const SqlDbType SmallMoney;
[VB] Public Const SmallMoney As SqlDbType
[JScript] public var SmallMoney: SqlDbType;
Description
System.Decimal A currency value ranging from −214,748.3648 to +214,748.3647 with an accuracy to a ten-thousandth of a currency unit.
ToString
[C#] public const SqlDbType Text;
[C++] public: const SqlDbType Text;
[VB] Public Const Text As SqlDbType
[JScript] public var Text: SqlDbType;
Description
System.String A variable-length stream of non-Unicode data with a maximum length of 2 −1 (or 2,147,483,647) characters.
ToString
[C#] public const SqlDbType Timestamp;
[C++]public: const SqlDbType Timestamp;
[VB] Public Const Timestamp As SqlDbType
[JScript] public var Timestamp: SqlDbType;
Description
System.DateTime Data and time data in the format yyyymmddhhmmss.
ToString
[C#] public const SqlDbType TinyInt;
[C++] publc: const SqlDbType TinyInt;
[VB] Public Const TinyInt As SqlDbType
[JScript] public var TinyInt: SqlDbType;
Description
System.Byte An 8-bit unsigned integer.
ToString
[C#] public const SqlDbType UniqueIdentifier;
[C++] public: const SqlDbType UniqueIdentifier;
[VB] Public Const UniqueIdentifier As SqlDbType
[JScript] public var UniqueIdentifier: SqlDbType;
Description
System. Guid A globally unique identifier (or GUID).
ToString
[C#] public const SqlDbType VarBinary;
[C++] public: const SqlDbType VarBinary;
[VB] Public Const VarBinary As SqlDbType
[JScript] public var VarBinary: SqlDbType;
Description
System.Array of type System.Byte A variable-length stream of binary data ranging between 1 and 8, 000 bytes.
ToString
[C#] public const SqlDbType VarChar;
[C++] public: const SqlDbType VarChar;
[VB] Public Const VarChar As SqlDbType
[JScript] public var VarChar: SqlDbType;
Description
System.String A variable-length stream of non-Unicode characters ranging between 1 and 8,000 characters.
ToString
[C#] public const SqlDbType Variant;
[C++] public: const SqlDbType Variant;
[VB] Public Const Variant As SqlDbType
[JScript] public var Variant: SqlDbType;
Description
System.Object A special data type that can contain numeric, string, binary, or date data as well as the SQL Server values Empty and Null, which is assumed if no other type is declared.

StateChangeEventArgs class (System.Data)
ToString
Description
Provides data for the state change event of a .NET data provider.

The data is used by the System.Data.OleDb.OleDbConnection.StateChange property of the System.Data.OleDb.OleDbConnection and the System.Data.SqlClient.SqlConnection.StateChange property of the System.Data.SqlClientSqlConnection.
StateChangeEventArgs
Example Syntax:
ToString
[C#] public StateChangeEventArgs(ConnectionState originalState, ConnectionState currentState);
[C++] public: StateChangeEventArgs(ConnectionState originalState, ConnectionState currentState);
[VB] Public Sub New(ByVal originalState As ConnectionState, ByVal currentState As ConnectionState)
[JScript] public function StateChangeEventArgs (originalState: ConnectionState, currentState: ConnectionState);
Description
Initializes a new instance of the System.DataStateChangeEventArgs class, when given the original state and the current state of the object. One of the System.Data.ConnectionState values. One of the System.Data.ConnectionState values.
CurrentState
ToString
[C#] public ConnectionState CurrentState {get;}
[C++] public: __property ConnectionState get_ CurrentState( );
[VB] Public ReadOnly Property CurrentState As ConnectionState
[JScript] public function get CurrentState( ): ConnectionState;
Description
Gets the new state of the connection. The connection object will be in the new state already when the event is fired.
OriginalState
ToString
[C#] public ConnectionState OriginalState {get;}
[C++] public: __property ConnectionState get_ OriginalState( );
[VB] Public ReadOnly Property OriginalState As ConnectionState
[JScript] public function get OriginalState( ): ConnectionState;
Description
Gets the original state of the connection.
StateChangeEventHandler delegate (System.Data)
ToString
Description
Represents the method that will handle the System.Data.OleDb.OleDbConnection.StateChange event. The source of the event. The System.Data.StateChangeEventArgs that contains the event data.
When you create a System.Data.StateChangeEventHandler delegate, you identify the method that will handle the event. To associate the event with your event handler, add an instance of the delegate to the event. The event handler is called whenever the event occurs, unless you remove the delegate. For more information about event handler delegates, see.

StatementType enumeration (System.Data)
ToString
Description
Specifies the type of SQL query to be used by the System.Data.OleDb.OleDbRowUpdatedEventArgs, System.Data.OleDb.OleDbRowUpdatingEventArgs, System.Data.SqlClient.SqlRowUpdatedEventArgs, or System.Data.SqlClient.SqlRowUpdatingEventArgs class.
ToString
[C#] public const StatementType Delete;
[C++] public: const StatementType Delete;
[VB] Public Const Delete As StatementType
[JScript] public var Delete: StatementType;
Description
A SQL query that is a DELETE statement.
ToString
[C#] public const StatementType Insert;
[C++] public: const StatementType Insert;
[VB] Public Const Insert As StatementType
[JScript] public var Insert: StatementType;
Description
A SQL query that is an INSERT statement.
ToString
[C#] public const StatementType Select;
[C++] public: const StatementType Select;
[VB] Public Const Select As StatementType
[JScript] public var Select: StatementType;
Description
A SQL query that is a SELECT statement.
ToString
[C#] public const StatementType Update;
[C++] public: const StatementType Update;
[VB] Public Const Update As StatementType
[JScript] public var UpDate: StatementType;
Description
A SQL query that is an UPDATE statement.
StrongTypingException class (System.Data)
ToString
Description
The exception that is thrown by a strongly-typed System.Data.DataSet when the user accesses DBNull value.
The System.Data.StrongTypingException class is not intended for use as a stand alone component, but as a class from which other classes derive standard functionality.
StrongTypingException
Example Syntax:
ToString
[C#] public StrongTypingException( );
[C++] public: StrongTypingException( );
[VB] Public Sub New( )
[JScript] public function StrongTypingException( ); Initializes a new instance of the System.Data.StrongTypingException class.
Description
Initializes a new instance of the System.Data.StrongTypingException class.
The System.Data.StrongTypingException class is not intended for use as a stand alone component, but as a class from which other classes derive standard functionality.
StrongTypingException
Example Syntax:
ToString
[C#] public StrongTypingException(SerializationInfo info, StreamingContext context);
[C++] public: StrongTypingException(SerializationInfo* info, StreamingContext context);
[VB] Public Sub New(ByVal info As SerializationInfo, ByVal context As StreamingContext)

[JScript] public function StrongTypingException(info: SerializationInfo, context: StreamingContext);
StrongTypingException
Example Syntax:
ToString
[C#] public StrongTypingException(string s, Exception innerException);
[C++] public: StrongIypingException(String* s, Exception* innerException);
[VB] Public Sub New(ByVal s As String, ByVal innerException As Exception)
[JScript] public function StrongTypingException(s: String, innerException: Exception);
Description
Initializes a new instance of the System.Data.StrongTypingException class with the specified string and inner exception.
The System.Data.StrongTypingException class is not intended for use as a stand alone component, but as a class from which other classes derive standard functionality. The string to display when the exception is thrown. A reference to an inner exception.
HelpLink
HResult
InnerException
Message
Source
StackTrace
TargetSite
SyntaxErrorException class (System.Data)
ToString
Description
Represents the exception that is thrown when the System.Data.DataColumn.Expression property of a System.Data.DataColumn contains a syntax error.
SyntaxErrorException
Example Syntax:
ToString
[C#] public SyntaxErrorException( );
[C++] public: SyntaxErrorException( );
[VB] Public Sub New( )
[JScript] public function SyntaxErrorException( ); Initializes a new instance of the System.Data.SyntaxErrorException class.
Description
Initializes a new instance of the System.Data.SyntaxErrorException class.
SyntaxErrorException
Example Syntax:
ToString
[C#] public SyntaxErrorException(string s);
[C++] public: SyntaxErrorException(String* s);
[VB] Public Sub New(ByVal s As String)
[JScript] public function SyntaxErrorException(s: String);
Description
Initializes a new instance of the System.Data.SyntaxErrorException class with the specified string. The string to display when the exception is thrown.
SyntaxErrorException
Example Syntax:
ToString
[C#] public SyntaxErrorException(SerializationInfo info, StreamingContext context);
[C++] public: SyntaxErrorException(SerializationInfo* info, StreamingContext context);
[VB] Public Sub New(ByVal info As SerializationInfo, ByVal context As StreamingContext)
[JScript] public function SyntaxErrorException(info: SerializationInfo, context: StreamingContext);
Description
Initializes a new instance of the System.Data.SyntaxErrorException class with the System.Runtime.Serialization.SerializationInfo and the System.Runtime.Serialization.StreamingContext. The data needed to serialize or deserialize an object. The source and destination of a given serialized stream.
HelpLink
HResult
InnerException
Message
Source
StackTrace
TargetSite
TypedDataSetGenerator class (System.Data)
ToString
Description
Used to create a strongly-typed System.Data.DataSet.
The System.Data.TypedDataSetGenerator class is not intended for use as a stand alone component, but as a class from which other classes derive standard functionality.
TypedDataSetGenerator
Example Syntax:
ToString
[C#] public TypedDataSetGenerator( );
[C++] public: TypedDataSetGenerator( );
[VB] Public Sub New( )
[JScript] public function TypedDataSetGenerator( );
Generate
[C#] public static void Generate(DataSet dataSet, CodeNamespace codeNamespace, ICodeGenerator codeGen);
[C++] public: static void Generate(DataSet* dataSet, CodeNamespace* codeNamespace, ICodeGenerator* codeGen);
[VB] Public Shared Sub Generate(ByVal dataSet As DataSet, ByVal codeNamespace As CodeNamespace, ByVal codeGen As ICodeGenerator)
[JScript] public static function Generate(dataSet: DataSet, codeNamespace: CodeNamespace, codeGen: ICodeGenerator); Generates a strongly-typed System.Data.DataSet.
Description
Generates a strongly-typed System.Data.DataSet.
The System.Data.TypedDataSetGenerator class is not intended for use as a stand alone component, but as a class from which other classes derive standard functionality. The source System.Data.DataSet that specifies the metadata for the typed System.Data.DataSet. The CodeNamespace that provides the target Namespace for the typed System.Data.DataSet. The CodeGenerator used to create the typed System.Data.DataSet.
GenerateIdName
[C#] public static string GenerateIdName(string name, ICodeGenerator codeGen);
[C++] public: static String* GenerateIdName(String* name, ICodeGenerator* codeGen);
[VB] Public Shared Function GenerateIdName(ByVal name As String, ByVal codeGen As ICodeGenerator) As String
[JScript] public static function GenerateIdName(name: String, codeGen: ICodeGenerator): String;
Description
Transforms a string in a valid typed System.Data.DataSet name.
Return Value: A string that is the converted name.
The System.Data.TypedDataSetGenerator class is not intended for use as a stand alone component, but as a class from which other classes derive standard functionality. The source name to transform into a valid typed System.Data.DataSet name. The CodeGenerator used to perform the conversion.

TypedDataSetGeneratorException class (System.Data)
    ToString

Description

The exception that is thrown when a name conflict occurs while generating a strongly-typed System.Data.DataSet.

The System.Data.TypedDataSetGeneratorException class is not intended for use as a stand alone component, but as a class from which other classes derive standard functionality.

TypedDataSetGeneratorException
    Example Syntax:
    ToString

[C#] public TypedDataSetGeneratorException( );
[C++] public: TypedDataSetGeneratorException( );
[VB] Public Sub New( )
[JScript] public function TypedDataSetGenerator Exception( ); Initializes a new instance of the System.Data.TypedDataSetGeneratorException class.

Description

Initializes a new instance of the System.Data.TypedDataSetGeneratorException class.

The System.Data.TypedDataSetGeneratorException class is not intended for use as a stand alone component, but as a class from which other classes derive standard functionality.

TypedDataSetGeneratorException
    Example Syntax:
    ToString

[C#] public TypedDataSetGeneratorException(ArrayList list);
[C++] public: TypedDataSetGeneratorException (ArrayList* list);
[VB] Public Sub New(ByVal list As ArrayList)
[JScript] public function TypedDataSetGeneratorException (list: ArrayList);

Description

Initializes a new instance of the System.Data.TypedDataSetGeneratorException class.

The System.Data.TypedDataSetGeneratorException class is not intended for use as a stand alone component, but as a class from which other classes derive standard functionality. A dynamic list of exceptions.

TypedDataSetGeneratorException
    Example Syntax:
    ToString

[C#] public TypedDataSetGeneratorException (SerializationInfo info, StreamingContext context);
[C++] public: TypedDataSetGeneratorException (SerializationInfo* info, StreamingContext context);
[VB] Public Sub New(ByVal info As SerializationInfo, ByVal context As StreamingContext)
[JScript] public function TypedDataSetGeneratorException (info: SerializationInfo, context: StreamingContext);
    ErrorList
    ToString
[C#] public ArrayList ErrorList {get;}
[C++] public: __property ArrayList* get_ErrorList( );
[VB] Public ReadOnly Property ErrorList As ArrayList
[JScript] public function get ErrorList( ): ArrayList;

Description

Gets a dynamic list of generated errors.

The System.Data.TypedDataSetGeneratorException class is not intended for use as a stand alone component, but as a class from which other classes derive standard functionality.

HelpLink
    HResult
    InnerException
    Message
    Source
    StackTrace
    TargetSite
    GetObjectData

[C#] public override void GetObjectData(SerializationInfo info, StreamingContext context);
[C++] public: void GetObjectData(SerializationInfo* info, StreamingContext context);
[VB] Overrides Public Sub GetObjectData(ByVal info As SerializationInfo, ByVal context As StreamingContext)
[JScript] public override function GetObjectData(info: SerializationInfo, context: StreamingContext);
    UniqueConstraint class (System.Data)
    ToString Description Represents a restriction on a set of columns in which all values must be unique.

The System.Data.UniqueConstraint is enforced on a single column (or columns) to ensure that a primary key value is unique.

UniqueConstraint
    Example Syntax:
    ToString

[C#] public UniqueConstraint(DataColumn column);
[C++] public: UniqueConstraint(DataColumn* column);
[VB] Public Sub New(ByVal column As DataColumn)
[JScript] public function UniqueConstraint(column: DataColumn);

Description

Initializes a new instance of the System.Data.UniqueConstraint with the specified System.Data.DataColumn. The System.Data.DataColumn to constrain.

UniqueConstraint
    Example Syntax:
    ToString

[C#] public UniqueConstraint(DataColumn[ ] columns);
[C++] public: UniqueConstraint(DataColumn* columns[ ]);
[VB] Public Sub New(ByVal columns( ) As DataColumn)
[JScript] public function UniqueConstraint(columns: DataColumnn[ ]);

Description

Initializes a new instance of the System.Data.UniqueConstraint with the given array of System.Data.DataColumn objects. The array of System.Data.DataColumn objects to constrain.

UniqueConstraint
    Example Syntax:
    ToString

[C#] public Unique Constraint(string name, DataColumn column);
[C++] public: UniqueConstraint(String* name, DataColumn* column);
[VB] Public Sub New(ByVal name As String, ByVal column As DataColumn)
[JScript] public function UniqueConstraint(name: String, column: DataColumn); Initializes a new instance of the System.Data.UniqueConstraint.

Description

Initializes a new instance of the System.Data.UniqueConstraint with the specified name and System.Data.DataColumn. The name of the constraint. The System.Data.DataColumn to constrain.

UniqueConstraint
    Example Syntax:

ToString
[C#] public UniqueConstraint(string name, DataColumn[ ] columns);
[C++] public: UniqueConstraint(String* name, DataColumn* columns[ ]);
[VB] Public Sub New(ByVal name As String, ByVal columns( ) As DataColumn)
[JScript] public function UniqueConstraint(name: String, columns: DataColumn[ ]);
Description
Initializes a new instance of the System.Data.UniqueConstraint with the specified name and array of System.Data.DataColumn objects. The name of the constraint. The array of System.Data.DataColumn objects to constrain.
UniqueConstraint
Example Syntax:
ToString
[C#] public UniqueConstraint(string name, string[ ] columnNames, bool isPrimaryKey);
[C++] public: UniqueConstraint(String* name, String* columnNames _gc[ ], bool is PrimaryKey);
[VB] Public Sub New(ByVal name As String, ByVal columnNames( ) As String, ByVal isPrimaryKey As Boolean)
[JScript] public function UniqueConstraint(name: String, columnNames: String[ ], is PrimaryKey: Boolean);
Description
Initializes a new instance of the System.Data.UniqueConstraint with the specified name, an array of System.Data.DataColumn objects, and a value specifying whether the constraint is a primary key. The name of the constraint. An array containing names of System.Data.DataColumn objects to constrain.
_DataSet
Columns
ToString
Description.
Gets the array of columns that this constraint affects.
ConstraintName
ExtendedProperties
IsPrimaryKey
ToString
Description
Gets a value indicating whether or not the constraint is on a primary key.
A table usually includes a primary key that ensures every row is unique. In some tables, the primary key may be made up of more than one column. For example, a primary key for a table containing names might be made up of both the first and last names as well. To create a primary key with more than one column, set the Columns property to an array of DataColumn objects.
Table
ToString
[C#] public override DataTable Table {get;}
[C++] public: _property virtual DataTable* get_Table( );
[VB] Overrides Public ReadOnly Property Table As DataTable
[JScript] public function get Table( ): DataTable;
Description
Gets the table to which this constraint belongs.
Equals
[C#] public override bool Equals(object key2);
[C++] public: bool Equals(Object* key2);
[VB] Overrides Public Function Equals(ByVal key2 As Object) As Boolean
[JScript] public override function Equals(key2: Object): Boolean;

Description
Compares this constraint to a second to determine if both are identical
Return Value: true, if the contraints are equal; otherwise, false.
Two constraints are equal if they constrain the same columns. The object to which this System.Data.UniqueConstraint is compared.
GetHashCode
[C#] public override int GetHashCode( );
[C++] public: int GetHash Code( );
[VB] Overrides Public Function GetHashCode( ) As Integer
[JScript] public override function GetHashCode( ): int;
Description
Gets the hash code of this instance of the System.Data.UniqueConstraint object.
Return Value: A 32-bit signed integer hash code.
UpdateRowSource enumeration (System.Data)
ToString
Description
Specifies how query command results are applied to the row being updated.
The System.Data.UpdateRowSource values are used by the System.Data.IDbCommand.UpdatedRowSource property of System.Data.IDbCommand and any classes derived from it.
ToString
[C#] public const UpdateRowSource Both;
[C++]public: const UpdateRowSource Both;
[VB] Public Const Both As UpdateRowSource
[JScript] public var Both: UpdateRowSource;
Description
Both the output parameters and the first returned row are mapped to the changed row in the System.Data.DataSet.
ToString
[C#] public const UpdateRowSource FirstReturnedRecord;
[C++] public: const UpdateRowSource FirstReturnedRecord;
[VB] Public Const FirstReturnedRecord As UpdateRowSource
[JScript] public var FirstReturnedRecord: UpdateRowSource;
Description
The data in the first returned row is mapped to the changed row in the System.Data.DataSet.
ToString
[C#] public const UpdateRowSource None;
[C++] public: const UpdateRowSource None;
[VB] Public Const None As UpdateRowSource
[JScript] public var None: UpdateRowSource;
Description
Any returned parameters or rows are ignored.
ToString
[C#] public const UpdateRowSource OutputParameters;
[C++] public: const UpdateRowSource OutputParameters;
[VB] Public Const OutputParameters As UpdateRowSource
[JScript] public var OutputParameters: UpdateRowSource;
Description
Output parameters are mapped to the changed row in the System.Data.DataSet.
UpdateStatus enumeration (System.Data)
ToString
Description
Specifies the action to take with regard to the current and remaining rows during an System.Data.Common.DbDataAdapter.Update (System.Data.DataSet).

ToString
[C#] public const UpdateStatus Continue;
[C++] public: const UpdateStatus Continue;
[VB] Public Const Continue As UpdateStatus
[JScript] public var Continue: UpdateStatus;
Description
   The System.Data.Common.DataAdapter is to continue proccessing rows.
   ToString
[C#] public const UpdateStatus ErrorsOccurred;
[C++] public: const UpdateStatus ErrorsOccurred;
[VB] Public Const Errors Occurred As UpdateStatus
[JScript] public var ErrorsOccurred: UpdateStatus;
Description
   The event handler reports that the update should be treated as an error.
   ToString
[C#] public const UpdateStatus SkipAllRemainingRows;
[C++] public: const UpdateStatus SkipAllRemainingRows;,
[VB] Public Const SkipAllRemainingRows As UpdateStatus
[JScript] public var SkipAllRemainingRows: UpdateStatus;
Description
   The current row and all remaining rows are not to be updated.
   ToString
[C#] public const UpdateStatus SkipCurrentRow;
[C++] public: const UpdateStatus SkipCurrentRow;
[VB] Public Const SkipCurrentRow As UpdateStatus
[JScript] public var SkipCurrentRow: UpdateStatus;
Description
   The current row is not to be updated.
   VersionNotFoundException class (System.Data)
   ToString
Description
   Represents the exception that is thrown when attempting to return a version of a System.Data.DataRow that has been deleted.
   VersionNotFoundException
   Example Syntax:
   ToString
[C#] public VersionNotFoundException( );
[C++] public: VersionNotFoundException( );
[VB] Public Sub New( )
[JScript] public function VersionNotFoundException( );
Description
   Initializes a new instance of the System.Data.VersionNotFoundException class.
   VersionNotFoundException
   Example Syntax:
   ToString
[C++] public VersionNotFoundException(string s);
[C++] public: VersionNotFoundException(String* s);
[VB] Public Sub New(ByVal s As String)
[JScript] public function VersionNotFoundException(s: String);
Description
   Initializes a new instance of the System.Data.VersionNotFoundException class with the specified string. The string to display when the exception is thrown.
   VersionNotFoundException
   Example Syntax:
   ToString
[C#] public VersionNotFoundException(SerializationInfo info, StreamingContext context);
[C++] public: VersionNotFoundException (SerializationInfo* info, StreamingContext context);
[VB] Public Sub New(ByVal info As SerializationInfo, ByVal context,As StreamingContext)
[JScript] public function VersionNotFoundException(info: SerializationInfo, context: StreamingContext); Initializes a new instance of the System.Data.VersionNotFoundException class.
Description
   Initializes a new instance of the System.Data.VersionNotFoundException class with serialization information. The data necessary to serialize or deserialize an object. Description of the source and destination of the specified serialized stream.
   HelpLink
   HResult
   InnerException
   Message
   Source
   StackTrace
   TargetSite
   XmlReadMode enumeration (System.Data)
   ToString
Description
   Specifies how to read XML data and a relational schema into a System.Data.DataSet.
   Use the members of this enumeration when setting the ReadMode parameter of the System.Data.DataSet.ReadXml (System.Xml.XmlReader) method.
   ToString
[C#] public const XmlReadMode Auto;
[C++] public: const XmlReadMode Auto;
[VB] Public Const Auto As XmlReadMode
[JScript] public var Auto: XmlReadMode;
Description
   Default. Performs the most appropriate of these actions: If the data is a DiffGram, sets XmlReadMode to DiffGram.
   ToString
[C#] public const XmlReadMode DiffGram;
[C++] public: const XmlReadMode DiffGram;
[VB] Public Const DiffGram As XmlReadMode
[JScript] public var DiffGram: XmlReadMode;
Description
   Reads a DiffGram, applying changes from the DiffGram to the System.Data.DataSet. The semantics are identical to those of a System.Data.DataSet.Merge (System.Data.DataSet) operation. As with the System.Data.DataSet.Merge(System.Data.DataSet) operation, System.Data.DataRow.RowState values are preserved. Input to System.Data.DataSet.ReadXml (System.XmlXmlReader) with DiffGrams should only be obtained using the outputfrom System.Data.DataSet.WriteXml(System.IO.Stream) as a DiffGram.
   ToString
[C#] public const XmlReadMode Fragment;
[C++] public: const XmlReadMode Fragment;
[VB] Public Const Fragment As XmlReadMode
[JScript] public var Fragment: XmlReadMode;
Description
   Reads XML documents containing inline XDR schema fragments, such as those generated by executing FOR XML schemas that include inline XDR schemaagainst an instance of SQL Server. When System.Data.XmlReadMode is set to SqlXml, the default namespace is read as the inline schema.
   ToString
[C#] public const XmlReadMode IgnoreSchema;
[C++] public: const XmlReadMode IgnoreSchema;
[VB] Public Const IgnoreSchema As XmlReadMode

[JScript] public var IgnoreSchema: XmlReadMode;
Description

Ignores any inline schema and reads data into the existing System.Data.DataSet schema. If any data does not match the existing schema, it is discarded (including data from differing namespaces defined for the System.Data.DataSet). If the data is a DiffGram, IgnoreSchema has the same functionality as DiffGram.

ToString
[C#] public const XmlReadMode InferSchema;
[C++] public: const XmIReadMode InferSchema;
[VB] Public Const InferSchema As XmlReadMode
[JScript] public var InferSchema: XmlReadMode;
Description Ignores any inline schema, infering schema from the data, and loads the data. If the System.Data.DataSet already contains a schema, the current schema is extended by adding columns to existing tables, where they exist, and new tables where existing tables don't exist. An exception is thrown if a column already exists but has an incompatible mapping type property.

ToString
[C#] public constXmlReadModeReadSchema;
[C++] public: constXmlReadMode ReadSchema;
[VB] Public Const ReadSchema As XmlReadMode
[JScript] public var ReadSchema: XmlReadMode;
Description Reads any inline schema and loads the data. If the System.Data.DataSet already contains schema, new tables may be added to the schema, but an exception is thrown if any tables in the inline schema already exist in the System.Data.DataSet.

XmlWriteMode enumeration (System.Data)
ToString
Description

Specifies how to write XML data and a relational schema from a System.Data.DataSet.

Use the members of this enumeration when setting the WriteMode parameter of the System.Data.DataSet.WriteXml(System.IO.Stream) method.

ToString
[C#] public constXmlWriteMode DiffGram;
[C++] public: const XmlWriteMode DiffGram;
[VB]) Public Const DiffGram As XmlWriteMode
[JScript] public var DifGram: XmlWriteMode;
Description Writes the entire System.Data.DataSet as a DiffGram, including original and current values. To generate a DiffGram containing only changed values, call System.Data.DataSet.GetChanges, and then call System.Data.DataSet.WriteXml(System.IO.Stream) as a DiffGram on the returned System.Data.DataSet.

ToString
[C#] public const XmlWriteMode IgnoreSchema;
[C++] public: const XmlWriteMode IgnoreSchema;
[VB] Public Const IgnoreSchema As XmlWriteMode
[JScript] public var IgnoreSchema: XmlWriteMode;
Description Writes the current contents of the System.Data.DataSet as XML data, without an XSD schema. If no data is loaded into the System.Data.DataSet,
System.Data.Common
Description The System.Data.Common namespace contains classes shared by the .NET data providers.

DataAdapter class (System.Data.Common)
Description

Represents a set of data commands and a database connection that are used to fill the System.Data.DataSet and update the data source.

The System.Data.Common.DataAdapter serves as a bridge between a System.Data.DataSet and a data source for retrieving and saving data. The System.Data.Common.DataAdapter provides this bridge by mapping System.Data.Common.DataAdapter.Fill (System.Data.DataSet), which changes the data in the System.Data.DataSet to match the data in the data source, and System.Data.IDataAdapter.Update(System.Data.DataSet), which changes the data in the data source to match the data in the System.Data.DataSet.

Constructors:
DataAdapter
Example Syntax:
[C#] protected DataAdapter( );
[C++] protected: DataAdapter( );
[VB] Protected Sub New( )
[JScript] protected function DataAdapter( );
Description Initializes a new instance of the System.Data.Common.DataAdapter class.

When an instance of System.Data.Common.DataAdapter is created, the following read/write properties are set to the following initial values.

Properties:
AcceptChangesDuringFill
[C#] public bool AcceptChangesDuringFill {get; set;}
[C++] public: __property bool get__ AcceptChangesDuringFill( );public: __property void set__ AcceptChangesDuiingFill(bool);
[VB] Public Property AcceptChangesDuringFill As Boolean
[JScript] public function get AcceptChangesDuringFill( ): Boolean;public function set AcceptChangesDuringFill (Boolean);
Description Gets or sets a value indicating whether System.Data.DataRow.AcceptChanges is called on a System.Data.DataRow after it is added to the System.Data.DataTable.

If false, System.Data.DataRow.AcceptChanges is not called, and the newly added rows are treated as inserted rows.

Container
DesignMode
Events
MissingMappingAction
Description

Determines the action to take when incoming data does not have a matching table or column.

The System.Data.Common.DataAdapter.TableMappings property provides the master mapping between the returned records and the System.Data.DataSet.

MissingSchemaAction
[C#] public MissingSchemaAction MissingSchemaAction {get; set;}
[C++] public: __property MissingSchemaAction get__ MissingSchemaAction( );public: __property void set__ MissingSchemaAction(MissingSchemaAction);
[VB] Public Property MissingSchemaAction As MissingSchemaAction
[JScript] public function get MissingSchemaAction( ) MissingSchemaAction;public function set MissingSchemaAction(MissingSchemaAction);
Description Determines the action to take when existing System.Data.DataSet schema does not match incoming data.

Site
TableMappings
Description
   Gets a collection that provides the master mapping between a source table and a System.Data.DataTable.
   When reconciling changes, the System.Data.Common.DataAdapter uses the System.Data.Common.DataTableMappingCollection collection to associate the column names used by the data source with the column names used by the System.Data.DataSet.
   Methods:
   CloneInternals
[C#] protected virtual DataAdapter CloneInternals( );
[C++] protected: virtual DataAdapter* CloneInternals( );
[VB] Overridable Protected Function CloneInternals( ) As DataAdapter
[JScript] protected function CloneInternals( ): DataAdapter;
Description
   Creates a copy of this instance of System.Data.Common.DataAdapter.
Return Value: The cloned instance of System.Data.Common.DataAdapter.
   All the commands, the System.Data.Common.DataAdapter.TableMappings, The System.Data.Common.DataAdapter.MissingSchemaAction, and the System.Data.Common.DataAdapter.MissingMappingAction are cloned. However, the connections for the commands are not copied, but shared. Thus, the cloned System.Data.Common.DataAdapter can be used against the same connection as the original.
   CreateTableMappings
[C#] protected virtual DataTableMappingCollection CreateTableMappings( );
[C++] protected: virtual DataTableMappingCollection* CreateTableMappings( );
[VB] Overridable Protected Function CreateTableMappings( ) As DataTableMappingCollection
[JScript] protected function CreateTableMappings( ): DataTableMappingCollection;
Description
   Creates a new System.Data.Common.DataTableMappingCollection
Return Value: A new System.Data.Common.DataTableMappingCollection.
   Dispose
[C#] protected override void Dispose(bool disposing);
[C++] protected: void Dispose(bool disposing);
[VB] Overrides Protected Sub Dispose(ByVal disposing As Boolean)
[JScript] protected override function Dispose(disposing: Boolean); Releases the resources used by the System.Data.Common.DataAdapter.
Description
   Releases the unmanaged resources used by the System.Data.Common.DataAdapter and optionally releases the managed resources.
   This method is called by the public method and the System.Object.Finalize method. true to release both managed and unmanaged resources; false to release only unmanaged resources.
   Fill
[C#] public abstract int Fill(DataSet dataSet);
[C++] public: virtual int Fill(DataSet* dataSet)=0;
[VB] MustOverride Public Function Fill(ByVal dataSet As DataSet) As Integer
[JScript] public abstract function Fill(dataSet: DataSet): int;

Description
   Adds or refreshes rows in the System.Data.DataSet to match those in the data source using the System.Data.DataSet name, and creates a System.Data.DataTable named "Table".
Return Value: The number of rows successfully added to or refreshed in the System.Data.DataSet. This does not include rows affected by statements that do not return rows.
   The System.Data.Common.DataAdapter.Fill (System.Data.DataSet) method retrieves rows from the data source using the SELECT statement specified by an associated System.Data.IDbDataAdapter.SelectCommand property. The connection object associated with the SELECT statement must be valid, but it does not need to be open. If the connection is closed before System.Data.Common.DataAdapter.Fill (System.Data.DataSet) is called, it is opened to retrieve data, then closed. If the connection is open before System.Data.Common.DataAdapter.Fill (System.Data.DataSet) is called, it remains open. A System.Data.DataSet to fill with records and, if necessary, schema.
   FillSchema
[C#] public abstract DataTable[ ] FillSchema(DataSet dataSet, SchemaType schemaType);
[C++] public: virtual DataTable* FillSchema(DataSet* dataSet, SchemaType schemaType)[ ]=0;
[VB] MustOverride Public Function FillSchema(ByVal dataSet As DataSet, ByVal schemaType As SchemaType): As DataTable( )
[JScript] public abstract function FillSchema(dataSet: DataSet, schemaType: SchemaType) DataTable[ ];
Description
   Adds a System.Data.DataTable named "Table" to the specified System.Data.DataSet and configures the schema to match that in the data source based on the specified System.Data.SchemaType
Return Value: An array of System.Data.DataTable objects that contain schema information returned from the data source.
   The System.Data.Common.DataAdapter.FillSchema (System.Data.DataSet,System.Data.SchemaType) method retrieves the schema from the data source using the System.Data.IDbDataAdapter.SelectCommand. The connection object associated with the System.Data.IDbDataAdapter.SelectCommand must be valid, but it does not need to be open. If the connection is closed before System.Data.Common.DataAdapter.FillSchema (System.Data.DataSet,System.Data.SchemaType) is called, it is opened to retrieve data, then closed. If the connection is open before System.Data.Common.DataAdapter.FillSchema (System.Data.DataSet,System.Data.SchemaType) is called, it remains open. The System.Data.DataSet to be filled with the schema from the data source. One of the System.Data.SchemaType values.
   GetFillParameters
[C#] public abstract IDataParameter[ ] GetFillParameters( );
[C++] public: virtual IDataParameter* GetFillParameters( ) [ ]=0;
[VB] MustOverride Public Function GetFillParameters( ) As IDataParameter( )
[JScript] public abstract function GetFillParameters( ): IDataParameter[ ];
Description
   Gets the parameters set by the user when executing an SQL SELECT statement.
Return Value: An array of System.Data.IDataParameter objects that contains the parameters set by the user.

ShouldSerializeTableMappings
[C#] protected virtual bool ShouldSerializeTableMappings( );
[C++] protected: virtual bool ShouldSerializeTableMappings( );
[VB] Overridable Protected Function ShouldSerializeTableMappings( ) As Boolean
[JScript] protected function ShouldSerializeTableMappings( ): Boolean;
Description
Determines whether one or more System.Data.Common.DataTableMapping objects exist and they should be persisted.
Return Value: true if one or more System.Data.Common.DataTableMapping objects exist; otherwise false.
Update
[C#] public abstract int Update(DataSet dataset);
[C++] public: virtual int Update(DataSet* dataSet)=0;
[VB] MustOverride Public Function Update(ByVal dataSet As DataSet) As Integer
[JScript] public abstract function Update(dataSet: DataSet): int;
Description
Calls the respective INSERT, UPDATE, or DELETE statements for each inserted, updated, or deleted row in the specified System.Data.DataSet from a System.Data.DataTable named "Table".
Return Value: The number of rows successfully updated from the System.Data.DataSet.
When an application calls the System.Data.Common.DataAdapter.Update (System.Data.DataSet) method, the System.Data.Common.DataAdapter examines the System.Data.DataRow.RowState property, and executes the required INSERT, UPDATE, or DELETE statements based on the order of the indexes configured in the System.Data.DataSet. For example, System.Data.Common.DataAdapter.Update (System.Data.DataSet) might execute a DELETE statement, followed by an INSERT statement, and then another DELETE statement, due to the ordering of the rows in the System.Data.DataTable. An application can call the System.Data.DataSet.GetChanges method in situations where you must control the sequence of statement types (for example, INSERTs before UPDATEs). For more information, see. The System.Data.DataSet used to update the data source.

DataColumnMapping class (System.Data.Common)
Update
Description
Contains a generic column mapping for an object that inherits from System.Data.Common.DataAdapter. This class cannot be inherited.
A System.Data.Common.DataColumnMapping enables you to use column names in a System.Data.DataTable that are different from those in the data source. The DataAdapter uses the mapping to match the columns when the tables in the System.Data.DataSet or data source are updated. For more information, see.
DataColumnMapping
Example Syntax:
Update
[C#] public DataColumnMapping( );
[C++] public: DataColumnMapping( );
[VB] Public Sub New( )
[JScript] public function DataColumnMapping( ); Initializes a new instance of the System.Data.Common.DataColumnMapping class.
Description
Initializes a new instance of the System.Data.Common.DataColumnMapping class.
DataColumnMapping
Example Syntax:
Update
[C#] public DataColurnMapping(string sourceColumn, string dataSetColumn);
[C++] public: DataColumnMapping(String* sourceColumn, String* dataSetColumn);
[VB] Public Sub New(ByVal sourceColumn As String, ByVal dataSetColumn As String)
[JScript] public function DataColumnMapping (sourceColumn: String, dataSetColumn: String);
Description
Initializes a new instance of the System.Data.Common.DataColumnMapping class when given a source column name and a System.Data.DataSet column name to map to. The case-sensitive column name from a data source. The column name, which is not case sensitive, from a System.Data.DataSet to map to.
DataSetColumn
Update
[C#] public string DataSetColumn {get; set;}
[C++] public: _property String* get_DataSetColumn( ); public: _property void set_DataSetColumn(String*);
[VB] Public Property DataSetColumn As String
[JScript] public function get DataSetColumn( ): String;public function set DataSetColumn(String);
Description
Gets or sets the name of the column within the System.Data.DataSet to map to.
SourceColumn
Update
[C#] public string SourceColumn {get; set;}
[C++] public: _property String* get_SourceColumn( ); public: _property void set_SourceColumn(String*);
[VB] Public Property SourceColumn As String
[JScript] public function get SourceColumn( ): String;public function set SourceColumn(String);
Description
Gets or sets the case-sensitive column name from a data source to map from.
GetDataColumnBySchemaAction
[C#] public DataColumn GetDataColumnBySchemaAction (DataTatile dataTable, Type dataType, MissingSchemaAction schemaAction);
[C++] public: DataColumn* GetDataColumnBySchemaAction(DataTable* dataTable, Type* dataType, MissingSchemaAction schemaAction);
[VB] Public Function GetDataColumnBySchemaAction (ByVal dataTable As DataTable, ByVal dataType As Type, ByVal schemaAction As MissingSchemaAction) As DataColumn
[JScript] public function GetDataColumnBySchemaAction (dataTable: DataTable, dataType: Type, schemaAction: MissingSchemaAction): DataColumn;
Description
Gets a System.Data.DataColumn from the given System.Data.DataTable using the System.Data.MissingSchemaAction and the System.Data.Common.DataColumnMapping.DataSetColumn property.
Return Value: A System.Data.DataColumn.
If the given dataType is not convertible to the System.Type of the System.Data.DataColumn, an exception is generated. The System.Data.DataTable to get the column from. The System.Type of the data column. One of the System.Data.MissingSchemaAction values.

ICloneable.Clone
[C#] object ICloneable.Clone( );
[C++] Object* ICloneable::Clone( );
[VB] Function Clone( ) As Object Implements ICloneable.Clone
[JScript] function ICloneable.Clone( ): Object;
ToString
[C#] public override string ToString( );
[C++] public: String* ToString( );
[VB] Overrides Public Function ToString( ) As String
[JScript] public override function ToString( ): String;
Description
  Converts the current System.Data.Common.DataColumnMapping.SourceColumn name to a string.
  Return Value: The current System.Data.Common.DataColumnMapping.SourceColumn name as a string.
    DataColumnMappingCollection class (System.Data.Common)
    ToString
Description
  Contains a collection of System.Data.Common.DataColumnMapping objects. This class cannot be inherited.
    DataColumnMappingCollection
    Example Syntax:
    ToString
[C#] public DataColumnMappingCollection( );
[C++] public: DataColumnMappingCollection( );
[VB] Public Sub New( )
[JScript] public function DataColumnMappingCollection( );
Description
  Creates an empty System.Data.Common.DataColumnMappingCollection.
    Count
    ToString
[C#] public int Count {get;}
[C++] public: __property int get_Count( );
[VB] Public ReadOnly Property Count As Integer
[JScript] public function get Count( ): int;
Description
  Gets the number of items in the collection.
    Item
    ToString
[C#] public DataColumnMapping this[int index] {get; set;}
[C++] public: __property DataColumnMapping* get_Item (int index);public: __property void set_Item(int index, DataColumnMapping*);
[VB] Public Default Property Item(ByVal index As integer) As DataColumnMapping
[JScript] returnValue=DataColumnMappingCollectionObject.Item(index); DataColumnMappingCollectionObject.Item(index)=returnValue; Gets or sets the System.Data.Common.DataColumnMapping object specified.
Description
  Gets or sets the System.Data.Common.DataColumnMapping object at the specified index. The zero-based index of the System.Data.Common.DataColumnMapping object to find.
    Item
    ToString
[C#] public DataColumnMapping this[string sourceColumn] {get; set;}
[C++] public: __property DataColumnMapping* get_Item (String* sourceColumn);public: __property void set_Item (String* sourceColumn, DataColumnMapping*);
[VB] Public Default Property Item(ByVal sourceColumn As String) As DataColumnMapping
[JScript] returnValue=DataColumnMappingCollectionObject.Item(sourceColumn); DataColumnMappingCollectionObject.Item(sourceColumn)=returnValue;
Description
  Gets or sets the System.Data.Common.DataColumnMapping object with the specified source column name. The case-sensitive name of the source column.
    Add
[C#] public int Add(object value);
[C++] public: __sealed int Add(Object* value);
[VB] NotOverridable Public Function Add(ByVal value As Object) As Integer
[JScript] public function Add(value: Object): int; Adds a column mapping to the collection.
Description
  Adds an System.Object to the collection.
  Return Value: The index of the System.Object added to the collection. An System.Object to add to the collection.
    Add
[C#] public DataColumnMapping Add(string sourceColumn, string dataSetColumn);
[C++] public: DataColumnMapping* Add(String* sourceColumn, String* dataSetColumn);
[VB] Public Function Add(ByVal sourceColumn As String, ByVal dataSetColumn As String) As DataColumnMapping
[JScript] public function Add(sourceColumn: String, dataSetColumn: String): DataColumnMapping;
Description
  Adds a column mapping to the collection when given a source column name and a System.Data.DataSet column name.
  Return Value: The System.Data.Common.DataColumnMapping object added to the collection. The case-sensitive name of the source column to map to. The name, which is not case sensitive, of the System.Data.DataSet column to map to.
    AddRange
[C#] public void AddRange(DataColumnMapping[ ] values);
[C++] public: void AddRange(DataColumnMapping* values[ ]);
[VB] Public Sub AddRange(ByVal values( ) As DataColumnMapping)
[JScript] public function AddRange(values: DataColumnMapping[ ]);
Description
  Copies the elements of the specified System.Data.Common.DataColumnMapping array to the end of the collection.
    Clear
[C#] public void Clear( );
[C++] public: __sealed void Clear( );
[VB] NotOverridable Public Sub Clear( )
[JScript] public function Clear( );
Description
  Removes all the items from the collection.
    Contains
[C#] public bool Contains(object value);
[C++] public: __sealed bool Contains(Object* value);
[VB] NotOverridable Public Function Contains(ByVal value As Object) As Boolean
[JScript] public function Contains(value: Object): Boolean;
Description
  Gets a value indicating whether a System.Data.Common.DataColumnMapping object with the given System.Object exists in the collection.

Return Value: true if the collection contains the specified System.Data.Common.DataColumnMapping object; otherwise, false. An System.Object that is the System.Data.Common.DataColumnMapping.
Contains
[C#] public bool Contains(string value);
[C++] public: _sealed bool Contains(String* value);
[VB] NotOverridable Public Function Contains(ByVal value As String) As Boolean
[JScript] public function Contains(value: String): Boolean;
Gets a value indicating whether a System.Data.Common.DataColumnMapping object exists in the collection.
Description
Gets a value indicating whether a System.Data.Common.DataColumnMapping object with the given value exists in the collection.
Return Value: true if collection contains a System.Data.Common.DataColumnMapping object with this source column name; otherwise, false. The case-sensitive source column name of the System.Data.Common.DataColumnMapping object.
CopyTo
[C#] public void CopyTo(Array array, int index);
[C++] public: _sealed void CopyTo(Array* array, int index);
[VB] NotOverridable Public Sub CopyTo(ByVal array As Array, ByVal index As Integer)
[JScript] public function CopyTo(array: Array, index: int);
Description
Copies the elements of the System.Data.Common.DataColumnMappingCollection to the specified array. An System.Array to which to copy System.Data.Common.DataColumnMappingCollection elements. The starting index of the array.
GetByDataSetColumn
[C#] public DataColumnMapping GetByDataSetColumn (string value);
[C++] public: DataColumnMapping* GetByDataSetColumn(String* value);
[VB] Public Function GetByDataSetColumn(ByVal value As String) As DataColumnMapping
[JScript] public function GetByDataSetColumn(value: String): DataColumnMapping;
Description
Gets the System.Data.Common.DataColumnMapping object with the specified System.Data.DataSet column name.
Return Value: The System.Data.Common.DataColumnMapping object with the specified System.Data.DataSet column name. The name, which is not case-sensitive, of the System.Data.DataSet column to find.
GetColumnMappingBySchemaAction
[C#] public static DataColumnMapping GetColumnMappingBySchemaAction (DataColumnMappingCollection columnMappings, string sourceColumn, MissingMappingAction mappingAction);
[C++] public: static DataColumnMapping* GetColumnMappingBySchemaAction (DataColumnMappingCollection* columnMappings, String* sourceColumn, MissingMappingAction mappingAction);
[VB] Public Shared Function GetColumnMappingBySchemaAction(ByVal columnMappings As DataColumnMappingCollection, ByVal sourceColumn As String, ByVal mappingAction As MissingMappingAction) As DataColumnMapping
[JScript] public static function GetColumnMappingBySchemaAction(columnMappings: DataColumnMappingCollection, sourceColumn: String, mappingAction: MissingMappingAction): DataColumnMapping;
Description
Gets a System.Data.Common.DataColumnMapping for the specified System.Data.Common.DataColumnMappingCollection, source column name, and System.Data.MissingMappingAction.
Return Value: A System.Data.Common.DataColumnMapping object.
If the System.Data.Common.DataColumnMapping exists in the collection, it is returned. the System.Data.Common.DataColumnMappingCollection. The case-sensitive source column name to find. One of the System.Data.MissingMappingAction values.
GetEnumerator
[C#] public IEnumerator GetEnumerator( );
[C++] public: _sealed IEnumerator* GetEnumerator( );
[VB] NotOverridable Public Function GetEnumerator( ) As IEnumerator
[JScript] public function GetEnumerator( ): IEnumerator;
Description
IndexOf
[C#] public int IndexOf(object value);
[C++] public: _sealed int IndexOf(Object* value);
[VB] NotOverridable Public Function IndexOf(ByVal value As Object) As Integer
[JScript] public function IndexOf(value: Object): int; Gets the location of the specified System.Data.Common.DataColumnMapping within the collection.
Description
Gets the location of the specified System.Object that is a System.Data.Common.DataColumnMapping within the collection.
Return Value: The location of the specified System.Object that is a System.Data.Common.DataColumnMapping within the collection. An System.Object that is the System.Data.Common.DataColumnMapping to find.
IndexOf
[C#] public int IndexOf(string sourceColumn);
[C++] public: _sealed int IndexOf(String* sourceColumnn);
[VB] NotOverridable Public Function IndexOf(ByVal sourceColumn As String) As Integer
[JScript] public function IndexOf(sourceColumn: String): int;
Description
Gets the location of the System.Data.Common.DataColumnMapping with the specified source column name.
Return Value: The location of the System.Data.Common.DataColumnMapping with the specified case-sensitive source column name. The case-sensitive name of the source column.
IndexOfDataSetColumn
[C#] public int IndexOfDataSetColumn(string dataSetColumn);
[C++] public: int IndexOfDataSetColumn(String* dataSetColumn);
[VB] Public Function IndexOfDataSetColumn(ByVal dataSetColunan As String) As Integer
[JScript] public function IndexOfDataSetColumn(dataSetColumn: String): int;
Description
Gets the location of the specified System.Data.Common.DataColumnMapping with the given System.Data.DataSet column name.

Return Value: The location of the specified System.Data.Common.DataColumnMapping with the given data set column name, or −1 if the System.Data.Common.DataColumnMapping object does not exist in the collection. The name, which is not case-sensitive, of the data set column to find.

Insert

[C#] public void Insert(int index, object value);
[C++] public: _sealed void Insert(int index, Object* value);
[VB] NotOverridable Public Sub Insert(ByVal index As Integer, ByVal value As Object)
[JScript] public function Insert(index: int, value: Object);

Description

Inserts a System.Data.Common.DataColumnMapping object into the System.Data.Common.DataColumnMappingCollection at the specified index.

Return Value: A System.Data.Common.DataColumnMapping object. The zero-based index of the System.Data.Common.DataColumnMappingobject to insert. The System.Data.Common.DataColumnMappingobject.

Remove

[C#] public void Remove(object value);
[C++] public: sealed void Remove(Object* value);
[VB] NotOverridable Public Sub Remove(ByVal value As Object)
[JScript] public function Remove(value: Object);

Description

Removes the System.Object that is a System.Data.Common.DataColumnMapping from the collection. The System.Object that is the System.Data.Common.DataColumnMapping to remove.

RemoveAt

[C#] public void RemoveAt(int index);
[C++] public: sealed void RemoveAt(int index);
[VB] NotOverridable Public Sub RemoveAt(ByVal index As Integer)
[JScript] public function RemoveAt(index: int); Removes the specified System.Data.Common.DataColumnMapping object from the collection.

Description

Removes the System.Data.Common.DataColumnMapping object with the specified index from the collection. The zero-based index of the System.Data.Common.DataColumnMapping object to remove.

RemoveAt

[C#] public void RemoveAt(string sourceColumn);
[C++] public: _sealed void RemoveAt(String* sourceColumn);
[VB] NotOverridable Public Sub RemoveAt(ByVal sourceColumn As String)
[JScript] public function RemoveAt(sourceColumn: String);

Description

Removes the System.Data.Common.DataColumnMapping object with the specified source column name from the collection. The case-sensitive source column name.

IColumnMappingCollection.Add

[C#] IColumnMapping IColumnMappingCollection.Add (string sourceColumnName, string dataSetColumnName);
[C++] IColumnMapping* IColumnMappingCollection::Add(String* sourceColumnName, String* dataSetColumnName);
[VB] Function Add(ByVal sourceColumnName As String, ByVal dataSetColumnName As String) As IColumnMapping Implements IColumnMappingCollection.Add
[JScript] function IColumnMappingCollection.Add (sourceColumnName: String, dataSetColumnName: String): IColumnMapping;

IColumnMappingCollection.GetByDataSetColumn

[C#] IColumnMapping IColumnMappingCollection.GetByDataSetColumn (string dataSetColumnName);
[C++] IColumnMapping* IColumnMappingCollection::GetByDataSetColumn (String* dataSetColumnName);
[VB] Function GetByDataSetColumn(ByVal dataSetColumnName As String) As IColumnMapping Implements IColumnMappingCollection.GetByDataSetColumn
[JScript] function IColumnMappingCollection.GetByDataSetColumn (dataSetColumnName: String): IColumnMapping;

DataTableMapping class (System.Data.Common)

ToString

Description

Contains a description of a mapped relationship between a source table and a System.Data.DataTable. This class is used by a System.Data.Common.DataAdapter when populating a System.Data.DataSet.

A System.Data.Common.DataTableMapping provides a master mapping between the data returned from a query against a data source, and a System.Data.DataTable. The System.Data.Common.DataTableMapping name can be passed in place of the System.Data.DataTable name to the Fill method of the DataAdapter. For more information, see.

DataTableMapping

Example Syntax:

ToString

[C#] public DataTableMapping( );
[C++] public: DataTableMapping( );
[VB] Public Sub New( )
[JScript] public function DataTableMapping( ); Initializes a new instance of the System.Data.Common.DataTableMapping class.

Description

Initializes a new instance of the System.Data.Common.DataTableMapping class.

DataTableMapping

Example Syntax:

ToString

[C#] public DataTableMapping(string sourceTable, string dataSetTable);
[C++] public: DataTableMapping(String* sourcetable, String* dataSetTable);
[VB] Public Sub New(ByVal sourceTable As String, ByVal dataSetTable As String)
[JScript] public function DataTableMapping(sourceTable: String, diataSetTable: String);

Description

Initializes a new instance of the System.Data.Common.DataTableMapping class with a source when given a source table name and a System.Data.DataTable name. The case-sensitive source table name from a data source. The table name from a System.Data.DataSet to map to.

DataTableMapping

Example Syntax:

ToString

[C#] public DataTableMapping(string sourceTable, string clataSetTable, DataColumnMapping[ ] columnMappings);
[C++] public: DataTableMapping(String* sourceTable, String* dataSetTable, DataColumnMapping* columnMappings[ ]);
[VB] Public Sub New(ByVal sourceTable As String, ByVal dataSetTable As String, ByVal columnMappings( ) As DataColumnMapping)

[JScript] public function DataTableMapping(sourceTable: String, dataSetTable: String, columnMappings: DataColumnMapping[ ]);
Description
Initializes a new instance of the System.Data.Common-.DataTableMapping class when given a source table name, a System.Data.DataTable name, and an array of System-.Data.Common.DataColumnMapping objects. The case-sensitive source table name from a data source. The table name from a System.Data.DataSet to map to. An array of System.Data.Common.DataColumnMapping objects.
ColumnMappings
ToString
[C#] public DataColumnMappingCollection ColumnMappings {get;}
[C++] public: __property DataColumnMappingCollection* get_ColumnMappings( );
[VB] Public ReadOnly Property ColumnMappings As DataColumnMappingCollection
[JScript] public function get ColumnMappings( ) DataColumnMappingCollection;
Description
Gets the System.Data.Common.DataColumnMappingCollection for the System.Data.DataTable.
DataSetTable
ToString
[C#] public string DataSetTable {get; set;}
[C++] public: __property String* get_DataSetTable( ); public: __property void set_DataSetTable(String*);
[VB] Public Property DataSetTable As String
[JScript] public function get DataSetTable( ): String;public function set DataSetTable(String);
Description
Gets or sets the table name from a System.Data.DataSet.
SourceTable
ToString
[C#] public string SourceTable {get; set;}
[C++] public: __property String* get_SourceTable( ); public: __property void set_SourceTable(String*);
[VB] Public Property SourceTable As String
[JScript] public function get SourceTable( ): String;public iunction set SourceTable(String);
Description
Gets or sets the case-sensitive source table name from a data source.
GetColumnMappingBySchemaAction
[C#] public DataColumnMapping GetColumnMappingBySchemaAction(string sourceColumn, MissingMappingAction mappingAction);
[C++] public: DataColumnMapping* GetColumnMappingBySchemaAction(String* sourceColumn, MissingMappingAction mappingAction);
[VB] Public Function GetColumnMappingBySchemaAction(ByVal sourceColumn As String, ByVal mappingAction As MissingMappingAction) As DataColumnMapping
[JScript] public function GetColumnMappingBySchemaAction(sourceColumn: String, mappingAction: MissingMappingAction): DataColumnMapping;
Description
Gets a System.Data.DataColumn from the specified System.Data.DataTable using the specified System.Data.MissingMappingAction value and the name of the System.Data.DataColumn.
Return Value: A System.Data.DataColumn. The name of the System.Data.DataColumn. One of the System.Data.MissingMappingAction values.

GetDataTableBySchemaAction
[C#] public DataTable GetDataTableBySchemaAction (DataSet dataSet, MissingSchemaAction schemaAction);
[C++] public: DataTable* GetDataTableBySchemaAction (DataSet* dataSet, MissingSchemaAction schemaAction);
[VB] Public Function GetDataTableBySchemaAction (ByVal dataSet; As DataSet, ByVal schemaAction As MissingSchemaAction) As DataTable
[JScript] public function GetDataTableBySchemaAction (dataSet: DataSet, schemaAction: MissingSchemaAction): DataTable;
Description
Gets the current System.Data.DataTable for the specified System.Data.DataSet using the specified System.Data.MissingSchemaAction value.
Return Value: A System.Data.DataTable.
If the System.Data.DataTable does not exist, the specified System.Data.MissingSchemaAction is taken. The System-.Data.DataSet from which to get the System.Data.DataTable. One of the System.Data.MissingSchemaAction values.
ICloneable.Clone
[C#] object ICloneable.Clone( );
[C++] Object* ICloneable::Clone( );
[VB] Function Clone( ) As Object Implements ICloneable-.Clone
[JScript] function ICloneable.Clone( ): Object;
ToString
[C#] public override string ToString( );
[C++] public: String* ToString( );
[VB] Overrides Public Function ToString( ) As String
[JScript] public override function ToString( ): String;
Description
Converts the current System.Data.Common.DataTableMapping.SourceTable name to a string.
Return Value: The current System.Data.Common.DataTableMapping.SourceTable name, as a string.
DataTableMappingCollection class (System.Data.Common)
ToString
Description
A collection of System.Data.Common.DataTableMapping objects. This class cannot be inherited.
DataTableMappingCollection
Example Syntax:
ToString
[C#] public DataTableMappingCollection( );
[C++] public: DataTableMappingCollection( );
[VB] Public Sub New( )
[JScript] public function DataTableMappingCollection( );
Description
Initializes an empty System.Data.Common.DataTableMappingCollection.
Count
ToString
[C#] public int Count {get;}
[C++] public: __property int get_Count( );
[VB] Public ReadOnly Property Count As Integer
[JScript] public function get Count( ): int;
Description
Gets the number of items in the collection.
Item
ToString
[C#] public DataTableMapping this[int index] {get; set;}
[C++] public: __property DataTableMapping* get_Item(int index);public: __property void set_Item(int index, DataTableMapping*);

[VB] Public Default Property Item(ByVal index As Integer) As DataTableMapping
[JScript] returnValue=DataTableMappingCollectionObject.Item(index); DataTableMappingCollectionObject.Item(index)=returnValue; Gets or sets the System.Data.Common.DataTableMapping object specified.
Description
Gets or sets the System.Data.Common.DataTableMapping object at a specified index. The zero-based index of the System.Data.Common.DataTableMapping object to find.
Item
ToString
[C#] public DataTableMapping this[string sourceTable] {get; set;}
[C++] public: _property DataTableMapping* get_Item (String* sourceTable);public: _property void set_item (String* sourceTable, DataTableMapping*);
[VB] Public Default Property Item(ByVal sourceTable As String) As DataTableMapping
[JScript] returnValue=DataTableMappingCollectionObject.Item(sourceTable); DataTableMappingCollectionObject.Item(sourceTable)=returnValue;
Description
Gets or sets the System.Data.Common.DataTableMapping object with the specified source table name. The case-sensitive name of the source table.
Add
[C#] public int Add(object value);
[C++] public: _sealed int Add(Object* value);
[VB] NotOverridable Public Function Add(ByVal value As Object) As Integer
[JScript] public function Add(value: Object): int; Adds a table mapping to the collection.
Description
Adds an System.Object that is a table mapping to the collection.
Return Value: The index of the System.Object added to the collection. An System.Object to add to the collection.
Add
[C#] public DataTableMapping Add(string sourceTable, string dataSetTable);
[C++] public: DataTableMapping* Add(String* sourceTable, String* dataSetTable);
[VB] Public Function Add(ByVal sourceTable As String, ByVal dataSetTable As String) As DataTableMapping
[JScript] public function Add(sourceTable: String, dataSetTable: String): DataTableMapping;
Description
Adds a table mapping to the collection when given a source table name and a System.Data.DataSet table name.
Return Value: The System.Data.Common.DataTableMapping object that was added to the collection. The case-sensitive name of the source table to map to. The name, which is not case-sensitive, of the System.Data.DataSet table to map to.
AddRange
[C#] public void AddRange(DataTableMapping[ ] values);
[C++] public: void AddRange(DataTableMapping* values[ ]);
[VB] Public Sub AddRange(ByVal values( ) As DataTableMapping)
[JScript] public function AddRange(values: DataTableMapping[ ]);
Description
Copies the elements of the specified System.Data.Common.DataTableMapping array to the end of the collection.
Clear
[C#] public void Clear( );
[C++] public: _sealed void Clear( );
[VB] NotOverridable Public Sub Clear( )
[JScript] public function Clear( );
Description
Removes all items from the collection.
Contains
[C#] public bool Contains(object value);
[C++] public: _sealed bool Contains(Object* value);
[VB] NotOverridable Public Function Contains(ByVal value As Object) As Boolean
[JScript] public function Contains(value: Object): Boolean;
Description
Gets a value indicating whether the given System.Data.Common.DataTableMapping object exists in the collection.
Return Value: true if this collection contains the specified System.Data.Common.DataTableMapping; otherwise, false. An System.Object that is the System.Data.Common.DataTableMapping.
Contains
[C#] public bool Contains(string value);
[C++] public: _sealed bool Contains(String* value);
[VB] NotOverridable Public Function Contains(ByVal value As String) As Boolean
[JScript] public function Contains(value: String): Boolean;
Gets a value indicating whether a System.Data.Common.DataTableMapping object exists in the collection.
Description
Gets a value indicating whether a System.Data.Common.DataTableMapping object with the given source table name exists in the collection.
Return Value: true if the collection contains a System.Data.Common.DataTableMapping object with this source table name; otherwise, false. The case-sensitive source table name containing the System.Data.Common.DataTableMapping object.
CopyTo
[C#] public void CopyTo(Array array, int index);
[C++] public: sealed void CopyTo(Array* array, int index);
[VB] NotOverridable Public Sub CopyTo(ByVal array As Array, ByVal index As Integer)
[JScript] public function CopyTo(array: Array, index: int);
Description
Copies the elements of the System.Data.Common.DataTableMappingCollection to the specified array. An System.Array to which to copy System.Data.Common.DataTableMappingCollection elements. The starting index of the array.
GetByDataSetTable
[C#] public DataTableMapping GetByDataSetTable(string dataSetTable);
[C++] public: DataTableMapping* GetByDataSetTable (String* dataSetTable);
[VB] Public Function GetByDataSetTable(ByVal dataSetTable As String) As DataTableMapping
[JScript] public function GetByDataSetTable(dataSetTable: String): DataTableMapping;
Description
Gets the System.Data.Common.DataTableMapping object with the specified System.Data.DataSet table name.
Return Value: The System.Data.Common.DataTableMapping object with the specified System.Data.DataSet table name. The name, which is not case sensitive, of the System.Data.DataSet table to find.

GetEnumerator
[C#] public IEnumerator GetEnumerator( );
[C++] public: _sealed IEnumerator* GetEnumerator( );
[VB] NotOverridable Public Function GetEnumerator( ) As IEnumerator
[JScript] public function GetEnumerator( ): IEnumerator;
Description GetTableMappingBySchemaAction
[C#] public static DataTableMapping GetTableMappingBySchemaAction (DataTableMappingCollection tableMappings, string sourceTable, string dataSetTable, MissingMappingAction mappingAction);
[C++] public: static DataTableMapping* GetTableMappingBySchemaAction (DataTableMappingCollection* tableMappings, String* sourceTable, String* dLataSetTable, MissingMappingAction mappingAction);
[VB] Public Shared Function GetTableMappingBySchemaAction(ByVal tableMappings As DataTableMappingCollection, ByVal sourceTable As String, ByVal dataSetTable As String, ByVal mappingAction As MissingMappingAction) As DataTableMapping
[JScript] public static function GetTableMappingBySchemaAction(tableMappings: DataTableMappingCollection, sourceTable: String, dataSetTable: String, mappingAction: MissingMappingAction): DataTaebleMapping;
Description
Gets a System.Data.Common.DataColumnMapping object with the given source table name and System.Data.DataSet table name, using the given System.Data.MissingMappingAction
Return Value: A System.Data.Common.DataTableMapping. If the System.Data.Common.DataTableMapping exists in the collection, it is returned. The System.Data.Common.DataTableMappingCollection collection to search. The case-sensitive name of the source table to find. The name, which is not case-sensitive, to assign to the System.Data.DataSet table. One of the System.Data.MissingMappingAction values.

IndexOf
[C#] public int IndexOf(object value);
[C++] public: _sealed int IndexOf(Object* value);
[VB] NotOverridable Public Function IndexOf(ByVal value As Object) As Integer
[JScript] public function IndexOf(value: Object): int; Gets the location of the specified System.Data.Common.DataTableMapping object within the collection.
Description
Gets the location of the specified System.Object that is a System.Data.Common.DataTableMapping object within the collection.
Return Value: The location of the specified System.Object that is a System.Data.Common.DataTableMapping object within the collection. An System.Object that is the System.Data.Common.DataTableMapping object to find.

IndexOf
[C#] public int IndexOf(string sourceTable);
[C++] public: _sealed int IndexOf(String* sourceTable);
[VB] NotOverridable Public Function IndexOf(ByVal sourceTable As String) As Integer
[JScript] public function IndexOf(sourceTable: String): int;
Description
Gets the location of the System.Data.Common.DataTableMapping object with the specified source table name.
Return Value: The location of the System.Data.Common.DataTableMapping object with the specified source table name. The case-sensitive name of the source table.

IndexOfDataSetTable
[C#] public int IndexOfDataSetTable(string dataSetTable);
[C++] public: int IndexOfDataSetTable(String* dataSetTable);
[VB] Public Function IndexOfDataSetTable(ByVal dataSetTable As String) As Integer
[JScript] public function IndexOfDataSetTable (dataSetTable: String): int;
Description
Gets the location of the System.Data.Common.DataTableMapping object with the specified System.Data.DataSet table name.
Return Value: The location of the System.Data.Common.DataTableMapping object with the given System.Data.DataSet table name, or −1 if the System.Data.Common.DataTableMapping object does not exist in the collection. The name, which is not case-sensitive, of the data set table to find.

Insert
[C#] public void Insert(int index, object value);
[C++] public: _sealed void Insert(int index, Object* value);
[VB] NotOverridable Public Sub Insert(ByVal index As Integer, ByVal value As Object)
[JScript] public function Insert(index: int, value: Object);
Description
Inserts a System.Data.Common.DataTableMapping object into the System.Data.Common.DataTableMappingCollection at the specified index.
Return Value: A System.Data.Common.DataTableMapping object. The zero-based index of the System.Data.Common.DataTableMapping object to insert. The System.Data.Common.DataTableMapping object.

Remove
[C#] public void Remove(object value);
[C++] public: _sealed void Remove(Object* value);
[VB] NotOverridable Public Sub Remove(ByVal value As Object)
[JScript] public function Remove(value: Object);
Description
Removes the specified System.Data.Common.DataTableMapping object from the collection. The System.Object that is the System.Data.Common.DataTableMapping object to remove.

RemoveAt
[C#] public void RemoveAt(int index);
[C++] public: _sealed void RemoveAt(int index);
[VB] NotOverridable Public Sub RemoveAt(ByVal index As Integer)
[JScript] public function RemoveAt(index: int); Removes the specified System.Data.Common.DataTableMapping object from the collection.
Description
Removes the System.Data.Common.DataTableMapping object located at the specified index from the collection. The zero-based index of the System.Data.Common.DataTableMapping object to remove.

RemoveAt
[C#] public void RemoveAt(string sourceTable);
[C++] public: _sealed void RemoveAt(String* sourceTable);
[VB] NotOverridable Public Sub RemoveAt(ByVal sourceTable As String)
[JScript] public function RemoveAt(sourceTable: String);

Description
Removes the System.Data.Common.DataTableMapping object with the specified source table name from the collection. The case-sensitive source table name to find.
  ITableMappingCollection.Add
[C#] ITableMapping ITableMappingCollection.Add(string sourceTableName, string dataSetTableName);
[C++] ITableMapping* ITableMappingCollection::Add (String* sourceTableName, String* dataSetTableName);
[VB] Function Add(ByVal sourceTableName As String, ByVal dataSetTableName As String) As ITableMapping Implements ITableMappingCollection.Add
[JScript] function ITableMappingCollection.Add (sourceTableName: String, dataSetTableName: String): ITableMapping;
  ITableMappingCollection.GetByDataSetTable
[C#] ITableMapping ITableMappingCollection.GetByDataSetTable(string dataSetTableName);
[C++] ITableMapping* ITableMappingCollection::GetByDataSetTable(String* dataSetTableName);
[VB] Function GetByDataSetTable(ByVal dataSetTableName As String) As ITableMapping Implements ITableMappingCollection.GetByDataSetTable
[JScript] function ITableMappingCollection.GetByDataSetTable (dataSetTableName: String): ITableMapping;
  DbDataAdapter class (System.Data.Common)
  ToString
Description
  Aids implementation of the System.Data.IDbDataAdapter interface. Inheritors of System.Data.Common.DbDataAdapter implement a set of functions to provide strong typing, but inherit most of the functionality needed to fully implement a DataAdapter.
  The System.Data.Common.DbDataAdapter class inherits from the System.Data.Common.DataAdapter class and helps a class implement a DataAdapter designed for use with a relational database.
  ToString
[C#] public const string DefaultSourceTableName;
[C++] public: const String* DefaultSourceTableName;
[VB] Public Const DefaultSourceTableName As String
[JScript] public var DefaultSourceTableName: String;
Description
  The default name used by the System.Data.Common.DataAdapter object for table mappings.
  System.Data.Common.DbDataAdapter.DefaultSourceTableName is when an application adds a table mapping to be used with System.Data.Common.DbDataAdapter.Fill (System.Data.DataTable), but does not specify a System.Data.DataTable name.
  DbDataAdapter
  Example Syntax:
  ToString
[C#] protected DbDataAdapter( );
[C++] protected: DbDataAdapter( );
[VB] Protected Sub New( )
[JScript] protected function DbDataAdapter( );
Description
  Initializes a new instance of the System.Data.Common.DbDataAdapter class.
  When you create an instance of System.Data.Common.DbDataAdapter, the following read/write properties are set to the following initial values.
  AcceptChangesDuringFill
  Container
  DesignMode
  Events
  MissingMappingAction
  MissingSchemaAction
  Site
  TableMappings
  ToString
Description
  Returned when an error occurs during a fill operation.
  The System.Data.Common.DbDataAdapter.FillError event allows a user to determine whether or not the fill operation should continue after the error occurs. Examples of when the System.Data.Common.DbDataAdapter.FillError event might occur are: The data being added to a System.Data.DataSet cannot be converted to a common language runtime type without losing precision.
  CreateRowUpdatedEvent
[C#] protected abstract RowUpdatedEventArgs CreateRowUpdatedEvent(DataRow dataRow, IDbCommand command, StatementType statementType, DataTableMapping tableMapping);
[C++] protected: virtual RowUpdatedEventArgs* CreateRowUpdatedEvent(DataRow* dataRow, IDbCommand* command, StatementType statementType, DataTableMapping* tableMapping)=0;
[VB] MustOverride Protected Function CreateRowUpdatedEvent(ByVal dataRow As DataRow, ByVal command As IDbCommand, ByVal statementType As StatementType, ByVal tableMapping As DataTableMapping) As RowUpdatedEventArgs
[JScript] protected abstract function CreateRowUpdatedEvent(dataRow: DataRow, command: IDbCommand, statementType: StatementType, tableMapping: DataTableMapping): RowUpdatedEventArgs;
Description
  Initializes a new instance of the System.Data.Common.RowUpdatedEventArgs class.
  Return Value: A new instance of the System.Data.Common.RowUpdatedEventArgs class.
  When overridding System.Data.Common.DbDataAdapter. CreateRowUpdatedEvent(System.Data.DataRow, System.Data.IDbCommand,System.Data.StatementType, System. Data.Common.DataTableMapping) in a derived class, be sure to call the base class's System.Data.Common.DbDataAdapter.CreateRowUpdated Event (System.Data.DataRow,System.Data.IDbCommand, System.Data.StatementType,System. Data.Common.DataTableMapping) method. The System.Data.DataRow used to update the data source. The System.Data.IDbCommand executed during the System.Data.IDataAdapter.Update(System.Data.DataSet). Whether the command is an UPDATE, INSERT, DELETE, or SELECT statement. A System.Data.Common.DataTableMapping object.
  CreateRowUpdatingEvent
[C#] protected abstract RowUpdatingEventArgs CreateRowUpdatingEvent(DataRow dataRow, IDbCommand command, StatementType statementType, DataTableMapping tableMapping);
[C++] protected: virtual RowUpdatingEventArgs* CreateRowUpdatingEvent(DataRow* dataRow, IDbCommand* command, StatementType statementType, DataTableMapping* tableMapping)=0;
[VB] MustOverride Protected Function CreateRowUpdatingEvent(ByVal dataRow As DataRow, ByVal command As IDbCommand, ByVal statementType As StatementType, ByVal tableMapping As DataTableMapping) As RowUpdatingEventArgs

[JScript] protected abstract function CreateRowUpdatingEvent(dataRow: DataRow, command: IDbCommand, statementType: StatementType, tableMapping: DataTableMapping): RowUpdatingEventArgs;

Description

Initializes a new instance of the System.Data.Common.RowUpdatingEventArgs class.

Return Value: A new instance of the System.Data.Common.RowUpdatingEventArgs class.

When overridding System.Data.Common.DbDataAdapter.CreateRowUpdatingEvent(System.Data.DataRow, System.Data.IDbCommand,System.Data.StatementType, System. Data.Common.DataTableMapping) in a derived class, be sure to call the base class's System.Data.Common.DbDataAdapter.CreateRow UpdatingEvent (System.Data.DataRow,System.Data.IDbCommand, System.Data.StatementType,System. Data.Common.DataTableMapping) method. The System.Data.DataRow that updates the data source. The System.Data.IDbCommand to execute during the System.Data.IDataAdapter.Update(System.Data.DataSet). Whether the command is an UPDATE, INSERT, DELETE, or SELECT statement. A System.Data.Common.DataTableMapping object.

Fill

[C#] public override int Fill(DataSet dataSet);
[C++] public: int Fill(DataSet* dataSet);
[VB] Overrides Public Function Fill(ByVal dataSet As DataSet) As Integer
[JScript] public override function Fill(dataSet: DataSet): int;

Description

Adds or refreshes rows in the System.Data.DataSet to match those in the data source using the System.Data.DataSet name, and creates a System.Data.DataTable named "Table".

Return Value: The number of rows successfully added to or refreshed in the System.Data.DataSet. This does not include rows affected by statements that do not return rows.

The System.Data.Common.DbDataAdapter.Fill (System.Data.DataTable) method retrieves the data from the data source using a SELECT statement. The System.Data.IDbConnection object associated with the select command must be valid, but it does not need to be open. If the System.Data.IDbConnection is closed before System.Data.Common.DbDataAdapter.Fill (System.Data.DataTable) is called, it is opened to retrieve data, then closed. If the connection is open before System.Data.Common.DbDataAdapter.Fill (System.Data.DataTable) is called, it remains open. A System.Data.DataSet to fill with records and, if necessary, schema.

Fill

[C#] public int Fill(DataTable dataTable);
[C++] public: int Fill(DataTable* dataTable);
[VB] Public Function Fill(ByVal dataTable As DataTable) As Integer
[JScript] public function Fill(dataTable: DataTable): int;
Adds or refreshes rows in the System.Data.DataSet to match those in the data source.

Description

Adds or refreshes rows in a System.Data.DataTable to match those in the data source using the System.Data.DataTable name.

Return Value: The number of rows successfully added to or refreshed in the System.Data.DataTable. This does not include rows affected by statements that do not return rows.

The System.Data.Common.DbDataAdapter.Fill (System.Data.DataTable) method retrieves rows from the data source using the SELECT statement specified by an associated System.Data.IDbDataAdapter.SelectCommand property. The connection object associated with the SELECT statement must be valid, but it does not need to be open. If the connection is closed before System.Data.Common.DbDataAdapter.Fill (System.Data.DataTable) is called, it is opened to retrieve data, then closed. If the connection is open before System.Data.Common.DbDataAdapter.Fill (System.Data.DataTable) is called, it remains open. A System.Data.DataTable to fill with records and, if necessary, schema.

Fill

[C#] public int Fill(DataSet dataSet, string srcTable);
[C++] public: int Fill(DataSet* dataSet, String* srcTable);
[VB] Public Function Fill(ByVal dataSet As DataSet, ByVal srcTable As String) As Integer
[JScript] public function Fill(dataSet: DataSet, srcTable: String): int;

Description

Adds or refreshes rows in the System.Data.DataSet to match those in the data source using the System.Data.DataSet and System.Data.DataTable names.

Return Value: The number of rows successfully added to or refreshed in the System.Data.DataSet. This does not include rows affected by statements that do not return rows.

The System.Data.Common.DbDataAdapter.Fill (System.Data.DataTable) method retrieves the data from the data source using a SELECT statement. The System.Data.IDbConnection object associated with the select command must be valid, but it does not need to be open. If the System.Data.IDbConnection is closed before System.Data.Common.DbDataAdapter.Fill (System.Data.DataTable) is called, it is opened to retrieve data, then closed. If the connection is open before System.Data.Common.DbDataAdapter.Fill (System.Data.DataTable) is called, it remains open. A System.Data.DataSet to fill with records and, if necessary, schema. The name of the source table to use for table mapping.

Fill

[C#] protected virtual int Fill(DataTable dataTable, IDataReader dataReader);
[C++] protected: virtual int Fill(DataTable* dataTable, IDataReader* dataReader);
[VB] Overridable Protected Function Fill(ByVal dataTable As DataTable, ByVal dataReader As IDataReader) As Integer
[JScript] protected function Fill(dataTable: DataTable, dataReader: IDataReader): int;

Description

Adds or refreshes rows in a System.Data.DataTable to match those in the data source using the specified System.Data.DataTable and System.Data.IDataReader names.

Return Value: The number of rows successfully added to or refreshed in the System.Data.DataTable. This does not include rows affected by statements that do not return rows.

The System.Data.Common.DbDataAdapter.Fill (System.Data.DataTable) method retrieves rows from the data source using the SELECT statement specified by an associated System.Data.IDbDataAdapter.SelectCommand property. The connection object associated with the SELECT statement must be valid, but it does not need to be open. If the connection is closed before System.Data.Common.DbDataAdapter.Fill (System.Data.DataTable) is called, it is opened to retrieve data, then closed. If the connection is open before System.Data.Common.DbDataAdapter.Fill (System.Data.DataTable) is called, it remains open. A System.Data.DataTable to fill with records and, if necessary, schema. The name of the System.Data.IDataReader.

Fill

[C#] protected virtual int Fill(DataTable dataTable, IDbCommand command, CommandBehavior behavior);

[C++] protected: virtual int Fill(DataTable* dataTable, IDbCommand* command, CommandBehavior behavior);

[VB] Overridable Protected Function Fill(ByVal dataTable As DataTable, ByVal command As IDbCommand, ByVal behavior As CommandBehavior) As Integer

[JScript] protected function Fill(dataTable: DataTable, command: IDbCommand, behavior: CommandBehavior): int;

Description

Adds or refreshes rows in a System.Data.DataTable to match those in the data source using the System.Data.DataTable name, the specified SQL SELECT statement, and System.Data.CommandBehavior Return Value: The number of rows successfully added to or refreshed in the System.Data.DataTable. This does not include rows affected by statements that do not return rows.

The System.Data.Common.DbDataAdapter.Fill (System.Data.DataTable) method retrieves rows from the data source using the SELECT statement specified by an associated System.Data.IDbDataAdapter.SelectCommand property. The connection object associated with the SELECT statement must be valid, but it does not need to be open. If the connection is closed before System.Data.Common.DbDataAdapter.Fill (System.Data.DataTabtle) is called, it is opened to retrieve data, then closed. If the connection is open before System.Data.Common.DbDataAdapter.Fill (System.Data.DataTable) is called, it remains open. A System.Data.DataTable to fill with records and, if necessary, schema. The SQL SELECT statement used to retrieve rows from the data source. One of the the System.Data.CommandBehavior values.

Fill

[C#] public int Fill(DataSet dataSet, int startRecord, int maxRecords, string srcTable);

[C++] public: int Fill(DataSet* dataSet, int startRecord, int maxRecords, String* srcTable);

[VB] Public Function Fill(ByVal dataSet As DataSet, ByVal startRecord As Integer, ByVal maxRecords As Integer, ByVal srcTable As String) As Integer

[JScript] public function Fill(dataSet: DataSet, startRecord: int, maxRecords: int, srcTable: String): int;

Description

Adds or refreshes rows in a specified range in the System.Data.DataSet to match those in the data source using the System.Data.DataSet and System.Data.DataTable names.

Return Value: The number of rows successfully added to or refreshed in the System.Data.DataSet. This does not include rows affected by statements that do not return rows.

A maxRecords value of 0 gets all records found after the start record. If maxRecords is greater than the number of remaining rows, only the remaining rows are returned and no error is issued. A System.Data.DataSet to fill with records and, if necessary, schema. The zero-based record number to start with. The maximum number of records to retrieve. The name of the source table to use for table mapping.

Fill

[C#] protected virtual int Fill(DataSet dataSet, string srcTable, IDataReader dataReader, int startRecord, int maxRecords);

[C++] protected: virtual int Fill(DataSet* dataSet, String* srcTable, IDataReader* dataReader, int startRecord, int maxRecords);

[VB] Overridable Protected Function Fill(ByVal dataSet As DataSet, ByVal srcTable As String, ByVal dataReader As IDataReader, ByVal startRecord As Integer, ByVal maxRecords As Integer) As Integer

[JScript] protected function Fill(dataSet: DataSet, srcTable: String, dataReader: IDataReader, startRecord: int, maxRecords: int): int;

Description

Adds or refreshes rows in a specified range in the System.Data.DataSet to match those in the data source using the System.Data.DataSet, System.Data.DataTable, and System.Data.IDataReader names.

Return Value: The number of rows successfully added to or refreshed in the System.Data.DataSet. This does not include rows affected by statements that do not return rows.

The System.Data.Common.DbDataAdapter.Fill (System.Data.DataTable) method retrieves rows from the data source using the SELECT statement specified by an associated System.Data.IDbDataAdapter.SelectCommand property. The connection object associated with the SELECT statement must be valid, but it does not need to be open. If the connection is closed before System.Data.Common.DbDataAdapter.Fill (System.Data.DataTable) is called, it is opened to retrieve data, then closed. If the connection is open before System.Data.Common.DbDataAdapter.Fill (System.Data.DataTable) is called, it remains open. A System.Data.DataSet to fill with records and, if necessary, schema. The name of the System.Data.DataTable to use for table mapping. The name of the System.Data.IDataReader. The zero-based record number to start with. The maximum number of records to retrieve.

Fill

[C#] protected virtual int Fill(DataSet dataSet, int startRecord, int maxRecords, string srcTable, IDbCommand command, CommandBehavior behavior);

[C++] protected: virtual int Fill(DataSet* dataSet, int startRecord, int maxRecords, String* srcTable, IDbCommand* command, CommandBehavior behavior);

[VB] Overridable Protected Function Fill(ByVal dataSet As DataSet, ByVal startRecord As Integer, ByVal maxRecords As Integer, ByVal srcTable As String, ByVal command As IDbCommand, ByVal behavior As CommandBehavior) As Integer

[JScript] protected function Fill(dataSet: DataSet, starRecord: int, maxRecords: int, srcTable: String, command: IDbCommand, behavior: CommandBehavior): int;

Description

Adds or refreshes rows in a specified range in the System.Data.DataSet to match those in the data source using the System.Data.DataSet and source table names, command string and command behavior.

Return Value: The number of rows successfully added to or refreshed in the System.Data.DataSet. This does not include rows affected by statements that do not return rows.

The System.Data.Common.DbDataAdapter.Fill (System.Data.DataTable) method retrieves rows from the data source using the SELECT statement specified by an associated System.Data.IDbDataAdapter.SelectCommand property. The connection object associated with the SELECT statement must be valid, but it does not need to be open. If the connection is closed before Systemi.Data.Common.DbDataAdapter.Fill (System.Data.DataTable) is called, it is opened to retrieve data, then closed. If the connection is open before System.Data.Common.DbDataAdapter.Fill (System.Data.DataTable) is called, it remains open. A System.Data.DataSet to fill with records and, if necessary, iischema. The zero-based record number to start with. The maximum number of records to retrieve. The name of the source table to use for table mapping. The SQL SELECT statement used to retrieve rows from the data source. One of the the System.Data.CommandBehavior values.

FillSchema

[C#] public override DataTable[ ] FillSchema(DataSet dataSet, SchemaType schemaType);

[C++] public: DataTable* FillSchema(DataSet* dataSet, SchemaType schemaType) [ ]:

[VB] Overrides Public Function FillSchema(ByVal dataSet As DataSet, ByVal schemaType As SchemaType) As DataTable( )

[JScript] public override function FillSchema(dataSet: DataSet, schemaType: SchemaType): DataTable[ ];

Description

Adds a System.Data.DataTable named "Table" to the specified System.Data.DataSet and configures the schema to match that in the data source based on the specified System.Data.SchemaType.

Return Value: A reference to a collection of System.Data.DataTable objects that were added to the System.Data.DataSet.

This method retrieves the schema information from the data source using the System.Data.IDbDataAdapter.SelectCommand. A System.Data.DataSet to insert the schema in. One of the System.Data.SchemaType values that specify how to insert the schema.

FillSchema

[C#] public DataTable FillSchema(DataTable dataTable, SchemaType schemaType);

[C++] public: DataTable* FillSchema(DataTable* dataTable, SchemaType schemaType);

[VB] Public Function FillSchema(ByVal dataTable As DataTable, ByVal schemaType As SchemaType) As DataTable

[JScript] public function FillSchema(dataTable: DataTable, schemaType: SchemaType): DataTable; Adds a System.Data.DataTable to a System.Data.DataSet and configures the schema to match that in the data source.

Description

Configures the schema of the specified System.Data.DataTable based on the specified System.Data.SchemaType.

Return Value: A System.Data.DataTable that contains schema information returned from the data source.

The System.Data.Common.DbDataAdapter.FillSchema (System.Data.DataTable,System.Data.SchemaType) method retrieves the schema from the data source using the System.Data.IDbDataAdapter.SelectCommand. The connection object associated with the System.Data.IDbDataAdapter.SelectCommand must be valid, but it does not need to be open. If the connection is closed before System.Data.Common.DbDataAdapter.FillSchema (System.Data.DataTable,System.Data.SchemaType) is called, it is opened to retrieve data, then closed. If the connection is open before System.Data.Common.DbDataAdapter.FillSchema (System.Data.DataTable,System.Data.SchemaType) is called, it remains open. The System.Data.DataTable to be filled with the schema from the data source. One of theSystem.Data.SchemaType values.

FillSchema

[C#] public DataTable[ ] FillSchema(DataSet dataSet, SchemaType schemaType, string srcTable);

[C++] public: DataTable* FillSchema(DataSet* dataSet, SchemaType schemaType, String* srcTable) [ ];

[VB] Public Function FillSchema(ByVal dataSet As DataSet, ByVal schemaType As SchemaType, ByVal srcTable As String) As DataTable( )

[JScript] public function FillSchema(dataSet: DataSet, schemaType: SchemaType, srcTable: String): DataTable[ ];

Description

Adds a System.Data.DataTable to the specified System.Data.DataSet and configures the schema to match that in the data source based upon the specified System.Data.SchemaType and System.Data.DataTable.

Return Value: A reference to a collection of System.Data.DataTable objects that were added to the System.Data.DataSet.

This method retrieves the schema information from the data source using the System.Data.IDbDataAdapter.SelectCommand. A System.Data.DataSet to insert the schema in. One of the System.Data.SchemaType values that specify how to insert the schema. The name of the source table to use for table mapping.

FillSchema

[C#] protected virtual DataTable FillSchema(DataTable dataTable, SchemaType schemaType, IDbCommand command, CommandBehavior behavior);

[C++] protected: virtual DataTable* FillSchema(DataTable* dataTable, SchemaType schemaType, IDbCommand* command, CommandBehavior behavior);

[VB] Overridable Protected Function FillSchema(ByVal dataTable As DataTable, ByVal schemaType As SchemaType, ByVal command As IDbCommand, ByVal behavior As CommandBehavior) As DataTable

[JScript] protected function FillSchema(dataTable: DataTable, schemaType: SchemaType, command: IDbCommand, behavior: CommandBehavior): DataTable;

Description

Adds a System.Data.DataTable to a System.Data.DataSet and configures the schema to match that in the data source based on the specified System.Data.SchemaType.

Return Value: An array of System.Data.DataTable objects that contain schema information returned from the data source.

The System.Data.Common.DbDataAdapter.FillSchema (System.Data.DataTable,System.Data.SchemaType) method retrieves the schema from the data source using the System.Data.IDbDataAdapter.SelectCommand. The connection object associated with the System.Data.IDbDataAdapter.SelectCommand must be valid, but it does not need to be open. If the connection is closed before System.Data.Common.DbDataAdapter.FillSchema (System.Data.DataTable,System.Data.SchemaType) is called, it is opened to retrieve data, then closed. If the connection is open before System.Data.Common.DbDataAdapter.FillSchema (System.Data.DataTable,System.Data.SchemaType) is called, it remains open. The System.Data.DataTable to be filled with the schema from the data source. One of theSystem.Data.SchemaType values. The SQL SELECT statement used to retrieve rows from the data source. One of the the System.Data.CommandBehavior values.

FillSchema

[C#] protected virtual DataTable[ ] FillSchema(DataSet dataSet, SchemaType schemaType, IDbCommand command, string srcTable, CommandBehavior behavior);

[C++] protected: virtual DataTable* FillSchema(DataSet* dataSet, SchemaType schemaType, IDbCommand* command, String* srcTable, CommandBehavior behavior)[ ];

[VB] Overridable Protected Function FillSchema(ByVal dataSet As DataSet, ByVal schemaType As SchemaType, ByVal command As IDbCommand, ByVal srcTable As String, ByVal behavior As CommandBehavior) As DataTable( )

[JScript] protected function FillSchema(dataSet: DataSet, schemaType: SchemaType, command: IDbCommand, srcTable: String, behavior: CommandBehavior): DataTable[ ];

Description

Adds a System.Data.DataTable to the specified System.Data.DataSet and configures the schema to match that in the data source based on the specified System.Data.SchemaType.

Return Value: An array of System.Data.DataTable objects that contain schema information returned from the data source.

The System.Data.Common.DbDataAdapter.FillSchema (System.Data.DataTable,System.Data.SchemaType) method retrieves the schema from the data source using the System.Data.IDbDataAdapter.SelectCommand. The connection object associated with the System.Data.IDbDataAdapter.SelectCommand must be valid, but it does not need to be open. If the connection is closed before System.Data.Common.DbDataAdapter.FillSchema (System.Data.DataTable,System.Data.SchemaType) is called, it is opened to retrieve data, then closed. If the connection is open before System.Data.Common.DbDataAdapter.FillSchema (System.Data.DataTable,System.Data.SchemaType) is called, it remains open. The System.Data.DataSet to be filled with the schema from the data source. One of theSystem.Data.SchemaType values. The SQL SELECT statement used to retrieve rows from the data source. The name of the source table to use for table mapping. One of the the System.Data.CommandBehavior values.

GetFillParameters

[C#] public override IDataParameter[ ] GetFillParameters( );

[C++] public: IDataParameter* GetFillParameters( ) [ ];

[VB] Overrides Public Function GetFillParameters( ) As IDataParameter( )

[JScript] public override function GetFillParameters( ): IDataParameter[ ];

Description

Gets the parameters set by the user when executing an SQL SELECT statement.

Return Value: An array of System.Data.IDataParameter objects that contains the parameters set by the user.

OnFillError

[C#] protected virtual void OnFillError(FillErrorEventArgs value);

[C++] protected: virtual void OnFillError (FillErrorEventArgs* value);

[VB] Overridable Protected Sub OnFillError(ByVal value As FillErrorEventArgs)

[JScript] protected function OnFillError(value: FillErrorEventArgs);

Description

Raises the System.Data.Common.DbData-Adapter.FillError event.

Raising an event invokes the event handler through a delegate. For an overview, see. A System.Data.FillErrorEventArgs that contains the event data.

OnRowUpdated

[C#] protected abstract void OnRowUpdated (RowUpdatedEventArgs value);

[C++] protected: virtual void OnRowUpdated (RowUpdatedEventArgs* value)=0;

[VB] MustOverride Protected Sub OnRowUpdated(ByVal value As RowUpdatedEventArgs)

[JScript] protected abstract function OnRowUpdated(value: RowUpdatedEventArgs);

Description

Raises the RowUpdated event of a .NET data provider.

Raising an event invokes the event handler through a delegate. For an overview, see. A System.Data.Common.RowUpdatedEventArgs that contains the event data.

OnRowUpdating

[C#] protected abstract void OnRowupdating (RowupdatingEventArgs value);

[C++] protected: virtual void OnRowUpdating (RowUpdatingEventArgs* value)=0;

[VB] MustOverride Protected Sub OnRowUpdating(ByVal value As RowUpdatingEventArgs)

[JScript] protected abstract function OnRowUpdating (value: RowUpdatingEventArgs);

Description

Raises the RowUpdating event of a .NET data provider.

Raising an event invokes the event handler through a delegate. For an overview, see. An System.Data.OleDb.OleDbRowUpdatingEventArgs that contains the event data.

Update

[C#] public int Update(DataRow[ ] dataRows);

[C++] public: int Update(DataRow* dataRows[ ]);

[VB] Public Function Update(ByVal dataRows( ) As DataRow) As Integer

[JScript] public function Update(dataRows: DataRow[ ]): int;

Description

Calls the respective INSERT, UPDATE, or DELETE statements for each inserted, updated, or deleted row in the specified array of System.Data.DataRow objects.

Return Value: The number of rows successfully updated from the System.Data.DataSet.

When an application calls the System.Data.Common.DbDataAdapter.Update (System.Data.DataSet) method, the System.Data.Common.DbDataAdapter examines the System.Data.DataRow.RowState property, and executes the required INSERT, UPDATE, or DELETE statements based on the order of the indexes configured in the System.Data.DataSet. For example, System.Data.Common.DbDataAdapter.Update (System.Data.DataSet) might execute a DELETE statement, followed by an INSERT statement, and then it another DELETE statement, due to the ordering of the rows in the System.Data.DataTable. An application can call the System.Data.DataSet.GetChanges method in situations where you must control the sequence of statement types (for example, INSERTs before UPDATEs). For more information, see. An array of System.Data.DataRow objects used to update the data source.

Update

[C#] public override int Update(DataSet dataset);

[C++] public: int Update(DataSet* dataset);

[VB] Overrides Public Function Update(ByVal dataSet As DataSet) As Integer

[JScript] public override function Update(dataSet: DataSet): int; Calls the respective INSERT, UPDATE, or DELETE statements for each inserted, updated, or deleted row in the System.Data.DataSet from a System.Data.DataTable named "Table".

Description
Calls the respective INSERT, UPDATE, or DELETE statements for each inserted, updated, or deleted row in the specified System.Data.DataSet.
Return Value: The number of rows successfully updated from the System.Data.DataSet.
When an application calls the System.Data.Common.DbDataAdapter.Update (System.Data.DataSet) method, the System.Data.Common.DbDataAdapter examines the System.Data.DataRow.RowState property, and executes the required INSERT, UPDATE, or DELETE statements based on the order of the indexes configured in the System.Data.DataSet. For example, System.Data.Common.DbDataAdapter.Update (System.Data.DataSet) might execute a DELETE statement, followed by an INSERT statement, and then another DELETE statement, due to the ordering of the rows in the System.Data.DataTable. An application can call the System.Data.DataSet.GetChanges method in situations where you must control the sequence of statement types (for example, INSERTs before UPDATEs). For more information, see. The System.Data.DataSet used to update the data source.
Update
[C#] public int Update(DataTable dataTable);
[C++] public: int Update(DataTable* dataTable);
[VB] Public Function Update(ByVal dataTable As DataTable) As Integer
[JScript] public function Update(dataTable: DataTable): int;
Description
Calls the respective INSERT, UPDATE, or DELETE statements for each inserted, updated, or deleted row in the specified System.Data.DataTable.
Return Value: The number of rows successfully updated from the System.Data.DataSet.
When an application calls the System.Data.Common.DbDataAdapter.Update (System.Data.DataSet) method, the System.Data.Common.DbDataAdapter examines the System.Data.DataRow.RowState property, and executes the required INSERT, UPDATE, or DELETE statements based on the order of the indexes configured in the System.Data.DataSet. For example, System.Data.Common.DbDataAdapter.Update (System.Data.DataSet) might execute a DELETE statement, followed by an INSERT statement, and then another DELETE statement, due to the ordering of the rows in the System.Data.DataTable An application can call the System.Data.DataSet.GetChanges method in situations where you must control the sequence of statement types (for example, INSERTs before UPDATEs). For more information, see. The System.Data.DataTable used to update the data source.
Update
[C#] protected virtual int Update(DataRow[ ] dataRows, DataTableMapping tableMapping);
[C++] protected: virtual int Update(DataRow* dataRows[ ], DataTableMapping* tableMapping);
[VB] Overridable Protected Function Update(ByVal dataRows( ) As DataRow, ByVal tableMapping As DataTableMapping) As Integer
[JScript] protected function Update(dataRows: DataRow[ ], tableMapping: DataTableMapping): int;
Description
Calls the respective INSERT, UPDATE, or DELETE statements for each inserted, updated, or deleted row in the specified array of System.Data.DataRow objects.
Return Value: The number of rows successfully updated from the System.Data.DataSet.
When an application calls the System.Data.Common.DbDataAdapter.Update (System.Data.DataSet) method, the System.Data.Common.DbDataAdapter examines the System.Data.DataRow.RowState property, and executes the required INSERT, UPDATE, or DELETE statements based on the order of the indexes configured in the System.Data.DataSet. For example, System.Data.Common.DbDataAdapter.Update (System.Data.DataSet) might execute a DELETE statement, followed by an INSERT statement, and then another DELETE statement, due to the ordering of the rows in the System.Data.DataTable. An application can call the System.Data.DataSet.GetChanges method in situations where you must control the sequence of statement types (for example, INSERTs before UPDATEs). For more information, see. An array of System.Data.DataRow objects used to update the data source. The System.Data.IDataAdapter.TableMappings collection to use.
Update
[C#] public int Update(DataSet dataSet, string srcTable);
[C++] public: int Update(DataSet* dataSet, String* srcTable);
[VB] Public Function Update(ByVal dataSet As DataSet, ByVal srcTable As String) As Integer
[JScript] public function Update(dataSet: DataSet, srcTable: String): int;
Description
Calls the respective INSERT, UPDATE, or DELETE statements for each inserted, updated, or deleted row in the System.Data.DataSet with the specified System.Data.DataTable name.
Return Value: The number of rows successfully updated from the System.Data.DataSet.
When an application calls the System.Data.Common.DbDataAdapter.Update (System.Data.DataSet) method, the System.Data.Common.DbDataAdapter examines the System.Data.DataRow.RowState property, and executes the required INSERT, UPDATE, or DELETE statements based on the order of the indexes configured in the System.Data.DataSet. For example, System.Data.Common.DbDataAdapter.Update (System.Data.DataSet) might execute a DELETE statement, followed by an INSERT statement, and then another DELETE statement, due to the ordering of the rows in the System.Data.DataTable. An application can call the System.Data.DataSet.GetChanges method in situations where you must control the sequence of statement types (for example, INSERTs before UPDATEs). For more information, see. The System.Data.DataSet to use to update the data source. The name of the source table to use for table mapping.
DBDataPermission class (System.Data.Common)
Update
Description
Provides the capability for a .NET data provider to ensure that a user has a security level adequate for accessing data.
DBDataPermission
Example Syntax:
Update
[C#] protected DBDataPermission( );
[C++] protected: DBDataPermission( );
[VB] Protected Sub New( )
[JScript] protected function DBDataPermission( ); Initializes a new instance of the System.Data.Common.DBDataPermission class.
Description
Initializes a new instance of the System.Data.Common.DBDataPermission class.
DBDataPermission
Example Syntax:

Update

[C#] protected DBDataPermission(PermissionState state);
[C++] protected: DBDataPerinission(PermissionState state);
[VB] Protected Sub New(ByVal state As PermissionState)
[JScript] protected function DBDataPermission(state: PermissionState);
Description
Initializes a new instance of the System.Data.Common.DBDataPermission class. One of the System.Security.Permissions.PermissionState values.
DBDataPermission
Example Syntax:
Update
[C#] public DBDataPermission(PermissionState state, bool allowBlankassword);
[C++] public: DBDataPermission(PermissionState state, bool allowBl, ankmPassword);
[VB] Public Sub New(ByVal state As PermissionSate, ByVal allowBlankPassword As Boolean)
[JScript] public function DBDataPermission(state: PermissionState, allowBlankPassword: Boolean);
Description
Initializes a new instance of the System.Data.Common.DBDataPermission class. Indicates whether a blank password is allowed.
AllowBlankPassword
Update
[C#] public bool AllowBlankPassword {get; set;}
[C++] public: __property bool get_AllowBlankPassword( );
public: __property void set_AllowBlankPassword(bool);
[VB] Public Property AllowBlankPassword As Boolean
[JScript] public function get AllowBlankPassword( ): Boolean;public function set AllowBlankPassword(Boolean);
Description
Gets a value indicating whether a blank password is allowed.
Copy
[C#] public override IPermission Copy( );
[C++] public: IPermission* Copy( );
[VB] Overrides Public Function Copy( )As IPermission
[JScript] public override function Copy( ): IPermission;
Description
Creates and returns an identical copy of the current permission object.
Return Value: A copy of the current permission object.
A copy of a permission object represents the same access to resources as the original permission object.
FromXml
[C#] public override void FromXml(SecurityElement securityElement);
[C++] public: void FromXml(SecurityElement* securityelement);
[VB] Overrides Public Sub FromXml(ByVal securityElement As SecurityElement)
[JScript] public override function FromXml (securityElement: SecurityElement);
Description
Reconstructs a security object with a specified state from an XML is encoding.
Custom code that extends security objects needs to implement the ToXml and FromXml methods to make the objects security-encodable. The XML encoding to use to reconstruct the security object.
Intersect
[C#] public override IPermission Intersect(IPermission target);
[C++] public: IPermission* Intersect(IPermission* target);
[VB] Overrides Public Function Intersect(ByVal target As IPermission) As IPermission
[JScript] public override function Intersect(target: IPermission): IPermission;
Description
Returns a new permission object representing the intersection of the current permission object and the specified permission object.
Return Value: A new permission object that represents the intersection of the current permission object and the specified permission object. This new permission object is a null reference (Nothing in Visual Basic) if the intersection is empty The target parameter is not a null reference (Nothing in Visual Basic) and is not an instance of the same class as the current permission object.
The intersection of two permissions is a permission that describes the set of operations they both describe in common. Only a demand that passes both original permissions will pass the intersection. A permission object to intersect with the current permission object. It must be of the same type as the current permission object.
IsSubsetOf
[C#] public override bool IsSubsetOf(IPermission target);
[C++] public: bool IsSubsetOf(IPermission* target);
[VB] Overrides Public Function IsSubsetOf(ByVal target As IPermission) As Boolean
[JScript] public override function IsSubsetOf(target: IPermission): Boolean;
Description
Returns a value indicating whether the current permission object is a subset of the specified permission object.
Return Value: True if the current permission object is a subset of the specified permission object; otherwise false.
The current permission object is a subset of the specified permission object if the current permission object specifies a set of operations that is wholly contained by the specified permission object. For example, a permission that represents access to C:example.txt is a subset of a permission that represents access to C:. If this method returns true, the current permission object represents no more access to the protected resource than does the specified permission object. A permission object that is to be tested for the subset relationship. This object must be of the same type as the current permission object.
IsUnrestricted
[C#] public bool IsUnrestricted( );
[C++] public: __sealed bool IsUnrestricted( );
[VB] NotOverridable Public Function IsUnrestricted( ) As Boolean
[JScript] public function IsUnrestricted( ): Boolean;
Description
Returns a value indicating whether the permission can be represented as unrestricted without any knowledge of the permission semantics.
Return Value: True if the permission can be represented as unrestricted.
This is a binary permission; therefore the implementation always returns true.
ToXml
[C#] public override SecurityElement ToXml( );
[C++] public: SecurityElement* ToXml( );
[VB] Overrides Public Function ToXml( ) As SecurityElement
[JScript] public override function ToXml( ): SecurityElement;

Description
   Creates an XML encoding of the security object and its current state.
Return Value: An XML encoding of the security object, including any state information.
   Custom code that extends security objects needs to implement the System.Data.Common.DBDataPermission.ToXml and System.Data.Common.DBDataPermission.FromXml (System.Security.SecurityElement) methods to make the objects security-encodable.
   Union
[C#] public override IPermission Union(IPermission target);
[C++] public: IPermission* Union(IPermission* target);
[VB] Overrides Public Function Union(ByVal target As IPermission) As IPermission
[JScript] public override function Union(target: IPermission): IPermission;
Description
   Returns a new permission object that is the union of the current and specified permission objects.
Return Value: A new permission object that represents the union of the current permission object and the specified permission object.
   The result of a call to System.Data.Common.DBDataPermission.Union (System.Security.Permission) is a permission that represents all of the operations represented by both the current permission object and the specified permission object. Any demand that passes either permission passes their union. A permission object to combine with the current permission object. It must be of the same type as the current permission object.
   DBDataPermissionAttribute class (System.Data.Common)
   Union
Description
   Associates a security action with a custom security attribute.
   DBDataPermissionAttribute
   Example Syntax:
   Union
[C++] protected DBDataPermissionAttribute (SecurityAction action);
[C++] protected: DBDataPermissionAttribute (SecurityAction action);
[VB] Protected Sub New(ByVal action As SecurityAction)
[JScript] protected function DBDataPermissionAttribute (action: SecurityAction);
Description
   Initializes a new instance of the System.Data.Common.DBDataPermissionAttribute class.
Return Value: A System.Data.Common.DBDataPermissionAttribute object. One of the the System.Security.Permissions.SecurityAction values representing an action that can be performed using declarative security.
   Action
   AllowBlankPassword
   Union
Description
   Gets a value indicating whether a blank password is allowed.
   TypeId
   Unrestricted
   DbDataRecord class (System.Data.Common)
   ToString
Description
   FieldCount
   ToString

[C#] public int FieldCount {get;}
[C++] public: __property int get_FieldCount( );
[VB] Public ReadOnly Property FieldCount As Integer
[JScript] public function get FieldCount( ): int;
Description
   Indicates the number of fields within the current record. This property is read-only.
   Item
   ToString
[C#] public object this[string name] {get;}
[C++] public: __property Object* get_Item(String* name);
[VB] Public Default ReadOnly Property Item(ByVal name As String) As Object
[JScript] returnValue=DbDataRecordObject.Item(name);
Description
   Indicates the value at the specified column in its native format given the column name. This property is read-only. The column name.
   Item
   ToString
[C#] public object this[int i] {get;}
[C++] public: __property Object* get_Item(int i);
[VB] Public Default ReadOnly Property Item(ByVal i As Integer) As Object
[JScript] returnValue=DbDataRecordObject.Item(i); Indicates that value from a column in its native format. This property is read-only.
Description
   Indicates the value at the specified column in its native format given the column ordinal. This property is read-only. The column ordinal.
   GetBoolean
[C#] public bool GetBoolean(int i);
[C++] public: __sealed bool GetBooleanl(int i);
[VB] NotOverridable Public Function GetBoolean(ByVal i As Integer) As Boolean
[JScript] public function GetBoolean(i: int): Boolean;
Description
   Returns the value of the specified column as a boolean.
Return Value: true if the boolean is true; otherwise, false. No conversions are performed, therefore the data retrieved must already be a boolean. The column ordinal.
   GetByte
[C#] public byte GetByte(int i);
[C++] public: __sealed unsigned char GetByte(int i);
[VB] NotOverridable Public Function GetByte(ByVal i As Integer) As Byte
[JScript] public function GetByte(i: int): Byte;
Description
   Returns the value of the specified column as a byte.
Return Value: The value of the specified column. No conversions are performed, therefore the data retrieved must already be a byte. The column ordinal.
   GetBytes
[C#] public long GetBytes(int i, long dataIndex, byte[ ] buffer, int bufferIndex, int length);
[C++] public: __sealed __int64 GetBytes(int i, __int64 dataIndex, unsigned char buffer __gc[ ], nt bufferIndex, int length);
[VB] NotOverridable Public Function GetBytes(ByVal i As Integer, ByVal dataIndex As Long, ByVal buffer( ) As Byte, ByVal bufferIndex As Integer, ByVal length As Integer) As Long
[JScript] public function GetBytes(i: int, dataIndex: long, buffer: Byte[ ], bufferIndex: int, length: int): long;
Description
   Returns the value of the specified column as a byte array.
Return Value: The value of the specified column.

No conversions are performed, therefore the data retrieved must already be a byte array. column ordinal. point to start from within the source data. buffer to copy data into. point to start from within the buffer. max length to copy into the buffer.

GetChar
[C#] public char GetChar(int i);
[C++] public: _sealed _wchar_t GetChar(int i);
[VB] NotOverridable Public Function GetChar(ByVal i As Integer) As Char
[JScript] public function GetChar(i: int): Char;
Description
Returns the value of the specified column as a character.
Return Value: The value of the specified column.
No conversions are performed, therefore the data retrieved must already be a character. The column ordinal.

GetChars
[C#] public long GetChars(int i, long dataIndex, char[ ] buffer, int bufferIndex, int length);
[C++] public: _sealed _int64 GetChars(int i, _int64 dataIndex, _wchar_t buffer _gc[ ], int bufferIndex, int length);
[VB] NotOverridable Public Function GetChars(ByVal i As Integer, ByVal dataIndex As Long, ByVal buffer( ) As Char, ByVal bufferIndex As Integer, ByVal length As Integer) As Long
[JScript] public function GetChars(i: int, dataIndex: long, buffer: Char[ ], bufferIndex: int, length: int): long;
Description
Returns the value of the specified column as a character array.
Return Value: The value of the specified column.
No conversions are performed, therefore the data retrieved must already be a character array. column ordinal. point to start from within the source data. buffer to copy data into. point to start from within the buffer. max length to copy into the buffer.

GetData
[C#] public IDataReader GetData(int i);
[C++] public: _sealed IDataReader* GetData(int i);
[VB] NotOverridable Public Function GetData(ByVal i As Integer) As IDataReader
[JScript] public function GetData(i: int): IDataReader;
Description
Not currently supported.

GetDataTypeName
[C#] public string GetDataTypeName(int i);
[C++] public: _sealed String* GetDataTypeName(int i);
[VB] NotOverridable Public Function GetDataTypeName (ByVal i As Integer) As String
[JScript] public function GetDataTypeName(i: int): String;
Description
Returns the name of the back-end data type.
Return Value. The name of the back-end data type. The column ordinal.

GetDateTime
[C#] public DateTime GetDateTime(int i);
[C++] public: _sealed DateTime GetDateTime(int i);
[VB] NotOverridable Public Function GetDateTime(ByVal i As Integer) As DateTime
[JScript] public function GetDateTime(i: int): DateTime;
Description
Returns the value of the specified column as a System.DateTime object.
Return Value: The value of the specified column.
No conversions are performed, therefore the data retrieved must already be a System.DateTime object. The column ordinal.

GetDecimal
[C#] public decimal GetDecimal(int i);
[C++] public: _sealed Decimal GetDecimal(int i);
[VB] NotOverridable Public Function GetDecimal(ByVal i As Integer) As Decimal
[JScript] public function GetDecimal(i: int): Decimal;
Description
Returns the value of the specified column as a System.Decimal object.
Return Value: The value of the specified column.
No conversions are performed, therefore the data retrieved must already be a System.Decimal object. The column ordinal.

GetDouble
[C#] public double GetDouble(int i);
[C++] public: _sealed double GetDouble(int i);
[VB] NotOverridable Public Function GetDouble(ByVal i As Integer) As Double
[JScript] public function GetDouble(i: int): double;
Description
Returns the value of the specified column as a double-precision floating point number.
Return Value: The value of the specified column.
No conversions are performed, therefore the data retrieved must already be a double-precision floating point number. The column ordinal.

GetFieldType
[C#] public Type GetFieldType(int i);
[C++] public: _sealed Type* GetFieldType(int i);
[VB] NotOverridable Public Function GetFieldType(ByVal i As Integer) As Type
[JScript] public function GetFieldType(i: int): Type;
Description
Returns the System.Type that is the data type of the object.
Return Value: The System.Type that is the data type of the object. The column ordinal.

GetFloat
[C+] public float GetFloat(int i);
[C++] public: _sealed float GetFloat(int i);
[VB] NotOverridable Public Function GetFloat(ByVal i As Integer) As Single
[JScript] public function GetFloat(i: int): float;
Description
Returns the value of the specified column as a single-precision floating point number.
Return Value: The value of the specified column.
No conversions are performed, therefore the data retrieved must already be a single-precision floating point number. The column ordinal.

GetGuid
[C#] public Guid GetGuid(int i);
[C++] public: _sealed Guid GetGuid(int i);
[VB] NotOverridable Public Function GetGuid(ByVal i As Integer) As Guid
[JScript] public function GetGuid(i: int): Guid;
Description
Returns the guid value of the specified field.
Return Value: The guid value of the specified field. The index of the field to find.

GetInt16
[C#] public short GetInt16(int i);
[C++] public: _sealed short GetInt16(int i);
[VB] NotOverridable Public Function GetInt16(ByVal i As Integer) As Short
[JScript] public function GetInt16(i: int): Int16;

Description
  Returns the value of the specified column as a 16-bit signed integer.
Return Value: The value of the specified column.
  No conversions are performed, therefore the data retrieved must already be a 16-bit signed integer. The column ordinal.
  GetInt32
[C#] public int GetInt32(int i);
[C++] public: _sealed int GetInt32(int i);
[VB] NotOverridable Public Function GetInt32(ByVal i As Integer) As Integer
[JScript] public function GetInt32(i: int): int;
Description
  Returns the value of the specified column as a 32-bit signed integer.
Return Value: The value of the specified column.
  No conversions are performed, therefore the data retrieved must already be a 32-bit signed integer. The column ordinal.
  GetInt64
[C#] public long GetInt64(int i);
[C++] public: _sealed _int64 GetInt64(int i);
[VB] NotOverridable Public Function GetInt64(ByVal i As Integer) As Long
[JScript] public function GetInt64(i: int): long;
Description
  Returns the value of the specified column as a 64-bit signed integer.
Return Value: The value of the specified column.
  No conversions are performed, therefore the data retrieved must already be a 64-bit signed integer. The column ordinal.
  GetName
[C#] public string GetName(int i);
[C++] public: _sealed String* GetName(int i);
[VB] NotOverridable Public Function GetName(ByVal i As Integer) As String
[JScript] public function GetName(i: int): String;
Description
  Returns the name of the specified column.
Return Value: The name of the specified column. The column ordinal.
  GetOrdinal
[C#] public int GetOrdinal(string name);
[C++] public: _sealed int GetOrdinal(String* name);
[VB] NotOverridable Public Function GetOrdinal(ByVal name As String) As Integer
[JScript] public function GetOrdinal(name: String): int;
Description
  Returns the column ordinal, given the name of the column.
Return Value: The column ordinal. The name of the column.
  GetString
[C#] public string GetString(int i);
[C++] public: _sealed String* GetString(int i);
[VB] NotOverridable Public Function GetString(ByVal i As Integer) As String
[JScript] public function GetString(i: int): String;
Description
  Returns the value of the specified column as a string.
Return Value: The value of the specified column.
  No conversions are performed, therefore the data retrieved must already be a string. The column ordinal.
  GetValue
[C#] public object GetValue(int i);
[C++] public: _sealed Object* GetValue(int i);
[VB] NotOverridable Public Function GetValue(ByVal i As Integer) As Object
[JScript] public function GetValue(i: int): Object;
Description
  Returns the value at the specified column in its native format. The column ordinal.
  GetValues
[C#] public int GetValues(object[ ] values);
[C++] public: _sealed int GetValues(Object* values _gc[ ]);
[VB] NotOverridable Public Function GetValues(ByVal values( ) As Object) As Integer
[JScript] public function GetValues(values: Object[ ]): int;
Description
  Returns all the attribute fields in the collection for the current record.
Return Value: The number of instances of System.Object in the array.
  Using this method may be more effeciant for most applications then retrieving each field individually. An array of System.Object to copy the attribute fields into.
  IsDBNull
[C#] public bool IsDBNull(int i);
[C++] public: _sealed bool IsDBNull(int i);
[VB] NotOverridable Public Function IsDBNull(ByVal i As Integer) As Boolean
[JScript] public function IsDBNull(i: int): Boolean;
Description
  Used to indicate non-existant values.
Return Value: true if the specified column is equivalent to System.DBNull; otherwise, false. The column ordinal.
  ICustomTypeDescriptor.GetAttributes
[C#] AttributeCollection ICustomTypeDescriptor.GetAttributes( );
[C++] AttributeCollection* ICustomTypeDescriptor::GetAttributes( );
[VB] Function GetAttributes( ) As AttributeCollection Implements ICustomTypeDescriptor.GetAttributes
[JScript] function ICustomTypeDescriptor.GetAttributes( ): AttributeCollection;
  ICustomTypeDescriptor.GetClassName
[C#] string ICustomTypeDescriptor.GetClassName( );
[C++] String* ICustomTypeDescriptor::GetClassName( );
[VB] Function GetClassName(As String Implements ICustomTypeDescriptor.GetClassName
[JScript] function ICustomTypeDescriptor.GetClassName( ): String;
  ICustomTypeDescriptor.GetComponentName
[C#] string ICustomTypeDescriptor.GetComponentName( );
[C++] String* ICustomTypeDescriptor::GetComponentName( );
[VB] Function GetComponentName( ) As String Implements ICustomTypeDescriptor.GetComponentName
[JScript] function ICustomTypeDescriptor.GetComponentName( ): String;
  ICustomTypeDescriptor.GetConverter
[C#] TypeConverter ICustomTypeDescriptor.GetConverter( );
[C++] TypeConverter* ICustomTypeDescriptor::GetConverter( );
[VB] Function GetConverter( ) As TypeConverter Implements ICustomTypeDescriptor.GetConverter
[JScript] function ICustomTypeDescriptor.GetConverter( ): TypeConverter;
  ICustomTypeDescriptor.GetDefaultEvent
[C#] EventDescriptor ICustomTypeDescriptor.GetDefaultEvent( );
[C++] EventDescriptor* ICustomTypeDescriptor::GetDefaultEvent( );

[VB] Function GetDefaultEvent( ) As EventDescriptor Implements ICustomTypeDescriptor.GetDefaultEvent
[JScript] function ICustomTypeDescriptor.GetDefaultEvent( ): EventDescriptor;
ICustomTypeDescriptor.GetDefaultProperty
[C#] PropertyDescriptor ICustomTypeDescriptor.GetDefaultProperty( );
[C++] PropertyDescriptor* ICustomTypeDescriptor::GetDefaultProperty( );
[VB] Function GetDefaultProperty( ) As PropertyDescriptor Implements ICustomTypeDescriptor.GetDefaultProperty
[JScript] function ICustomTypeDescriptor.GetDefaultProperty( ): PropertyDescriptor;
ICustomTypeDescriptor.GetEditor
[C#] object ICustomTypeDescriptor.GetEditor(Type editorBaseType);
[C++] Object* ICustomTypeDescriptor::GetEditor(Type* editorBaseType);
[VB] Function GetEditor(ByVal editorBaseType As Type) As Object Implements ICustomTypeDescriptor.GetEditor
[JScript] function ICustomTypeDescriptor.GetEditor (editorBaseType: Type): Object;
ICustomTypeDescriptor.GetEvents
[C#] EventDescriptorCollection ICustomTypeDescriptor.GetEvents( );
[C++] EventDescriptorCollection* ICustomTypeDescriptor::GetEvents( );
[VB] Function GetEvents( ) As EventDescriptorCollection Implements ICustomTypeDescriptor.GetEvents
[JScript] function ICustomTypeDescriptor.GetEvents( ): EventDescriptorCollection;
ICustomTypeDescriptor.GetEvents
[C#] EventDescriptorCollection ICustomTypeDescriptor.GetEvents(Attribute[ ] attributes);
[C++] EventDescriptorCollection* ICustomTypeDescriptor::GetEverits(Attribute* attributes[ ]);
[VB] Function GetEvents(ByVal attributes( ) As Attribute) As EventDescriptorCollection Implements ICustomTypeDescriptor.GetEvents
[JScript] function ICustomTypeDescriptor.GetEvents (attributes: Attribute[ ]): EventDescriptorCollection;
ICustomTypeDescriptor.GetProperties
[C#] PropertyDescriptorCollection ICustomTypeDescriptor.GetProperties( );
[C++] PropertyDescriptorCollection* ICustomTypeDescriptor::GetProperties( );
[VB] Function GetProperties( ) As PropertyDescriptorCollection Implements ICustomTypeDescriptor.GetProperties
[JScript] function ICustomTypeDescriptor.GetProperties( ): PropertyDescriptorCollection;
ICustomTypeDescriptor.GetProperties
[C#] PropertyDescriptorCollection ICustomTypeDescriptor.GetProperties(Attribute[ ] attributes);
[C++] PropertyDescriptorCollection* ICustomTypeDescriptor::GetProperties(Attribute* attributes[ ]);
[VB] Function GetProperties(ByVal attributes( ) As Attribute) As PropertyDescriptorCollection Implements ICustomTypeDescriptor.GetProperties
[JScript] function ICustomTypeDescriptor.GetProperties (attributes: Attribute[ ]): PropertyDescriptorCollection;

ICustomTypeDescriptor.GetPropertyOwner
[C#] object ICustomTypeDescriptor.GetPropertyOwner (PropertyDescriptor pd);
[C++] Object* ICustomTypeDescriptor::GetPropertyOwner (PropertyDescriptor* pd);
[VB] Function GetPropertyOwner(ByVal pd As PropertyDescriptor) As Object Implements ICustomTypeDescriptor.GetPropertyOwner
[JScript] function ICustomTypeDescriptor.GetPropertyOwner(pd: PropertyDescriptor): Object;
DbEnumerator class (System.Data.Common)
ToString
Description
DbEnumerator
Example Syntax:
ToString
[C#] public DbEnumerator(IDataReader reader);
[C++] public: DbEnumerator(IDataReader* reader);
[VB] Public Sub New(ByVal reader As IDataReader)
[JScript] public function DbEnumerator(reader: IDataReader);
Current
ToString
[C#] public object Current {get;}
[C++] public: __property Object* get_Current( );
[VB] Public ReadOnly Property Current As Object
[JScript] public function get Current( ): Object;
Description
MoveNext
[C#] public bool MoveNext( );
[C++] public: __sealed bool MoveNext( );
[VB] NotOverridable Public Function MoveNext( ) As Boolean
[JScript] public function MoveNext( ): Boolean;
Description
Reset
[C#] public void Reset( );
[C++] public: __sealed void Reset( );
[VB] NotOverridable Public Sub Reset( )
[JScript] public function Reset( );
Description
RowUpdatedEventArgs class (System.Data.Common)
ToString
Description
Provides data for the RowUpdated event of a .NET data provider.
The RowUpdated event message is typically raised when an System.Data.Common.DbDataAdapter.Update (System.Data.DataSet) to a row is completed.
RowUpdatedEventArgs
Example Syntax:
ToString
[C#] protected RowUpdatedEventArgs(DataRow dataRow, IDbCommand command, StatementType statementType, DataTableMapping tableMapping);
[C++] protected: RowUpdatedEventArgs(DataRow* dataRow, IDbCommand* command, StatementType statementType, DataTableMapping* tableMapping);
[VB] Protected Sub New(ByVal dataRow As DataRow, ByVal command As IDbCommand, ByVal statementType As StatementType, ByVal tableMapping As DataTableMapping)
[JScript] protected function RowUpdatedEventArgs (dataRow: DataRow, command: IDbCommand, statementType: StatementType, tableMapping: DataTableMapping);

Description
  Initializes a new instance of the System.Data.Common.RowUpdatedEventArgs class. The System.Data.DataRow sent through an System.Data.Common.DbDataAdapter.Update (System.Data.DataSet). The System.Data.IDbCommand executed when System.Data.Common.DbDataAdapter.Update (System.Data.DataSet) is called. The type of SQL statement executed. The System.Data.Common.DataTableMapping sent through an System.Data.Common.DbDataAdapter.Update (System.Data.DataSet).
  Command
  ToString
[C#] public IDbCommand Command {get;}
[C++] public: _property IDbCommand* get_Command( );
[VB] Public ReadOnly Property Command As IDbCommand
[JScript] public function get Command( ): IDbCommand;
Description
  Gets the System.Data.IDbCommand executed when System.Data.Common.DbDataAdapter.Update (System.Data.DataiSet) is called.
  Errors
  ToString
[C#] public Exception Errors {get; set;}
[C++] public: _property Exception* get_Errors( );public: _property void set_Errors(Exception*);
[VB] Public Property Errors As Exception
[JScript] public function get Errors( ): Exception;public function set Errors(Exception);
Description
  Gets any errors generated by the .NET data provider when the System.Data.Common.RowUpdatedEventArgs.Command was executed.
  RecordsAffected
  ToString
[C#] public int RecordsAffected {get;}
[C++] public: _property int get_RecordsAffected( );
[VB] Public ReadOnly Property RecordsAffected As Integer
[JScript] public function get RecordsAffected( ): int;
Description
  Gets the number of rows changed, inserted, or deleted by execution of the SQL statement.
  Row
  ToString
[C#] public DataRow Row {get;}
[C++] public: _property DataRow* get_Row( );
[VB] Public ReadOnly Property Row As DataRow
[JScript] public function get Row( ): DataRow;
Description
  Gets the System.Data.DataRow sent through an System.Data.Common.DbDataAdapter.Update (System.Data.DataSet).
  StatementType
  ToString
[C#] public StatementType StatementType {get;}
[C++] public: _property StatementType get_StatementType( );
[VB] Public ReadOnly Property StatementType As StatementType
[JScript] public function get StatementType( ): StatementType;
Description
  Gets the type of SQL statement executed.
  System.Data.Common.RowUpdatedEventArgs.StatementType can be one of the following values: Select Insert Update Delete
  Status
  ToString
[C#] public UpdateStatus Status {get; set;}
[C++] public: _property UpdateStatus get_Status( );public: _property void set_Status(UpdateStatus);
[VB] Public Property Status As UpdateStatus
[JScript] public function get Status( ): UpdateStatus;public function set Status(UpdateStatus);
Description
  Gets the System.Data.UpdateStatus of the System.Data.Common.RowUpdatedEventArgs.Command.
  TableMapping
  ToString
[C#] public DataTableMapping TableMapping {get;}
[C++] public: _property DataTableMapping* get_TableMapping( );
[VB] Public ReadOnly Property TableMapping As DataTableMapping
[JScript] public function get TableMapping( ): DataTableMapping;
Description
  Gets the System.Data.Common.DataTableMapping sent through an System.Data.Common.DbDataAdapter.Update (System.Data.DataSet).
  RowUpdatingEventArgs class (System.Data.Common)
  ToString
Description
  Provides the data for the RowUpdating event of a .NET data provider.
  The RowUpdating event is typically raised just before an System.Data.Common.DbDataAdapter.Update (System.Data.DataSet) to a row begins.
  RowUpdatingEventArgs
  Example Syntax:
  ToString
[C#] protected RowUpdatingEventArgs(DataRow dataRow, IDbCommand command, StatementType statementType, DataTableMapping tableMapping);
[C++] protected: RowUpdatingEventArgs(DataRow* dataRow, IDbCommand* command, StatementType statementType, DataTableMapping* tableMapping);
[VB] Protected Sub New(ByVal dataRow As DataRow, ByVal command As IDbCommand, ByVal statementType As StatementType, ByVal tableMapping As DataTableMapping)
[JScript] protected function RowUpdatingEventArgs (dataRow: DataRow, command: IDbCommand, statementType: StatementType, tableMapping: DataTableMapping);
Description
  Initializes a new instance of the System.Data.Common.RowUpdatingEventArgs class. The System.Data.DataRow to System.Data.Common.DbDataAdapter.Update (System.Data.DataSet). The System.Data.IDbCommand to execute when System.Data.Common.DbDataAdapter.Update (System.Data.DataSet) is called. The type of SQL statement to execute. The System.Data.Common.DataTableMapping to send through an System.Data.Common.DbDataAdapter.Update (System.Data.DataSet).
  Command
  ToString
[C#] public IDbCommand Command {get; set;}
[C++] public: _property IDbCommand* get_Command( ); public: _property void set_Command(IDbCommand*);

[VB] Public Property Command As IDbCommand
[JScript] public function get Command( ): IDbCommand;
  public function set Command(IDbCommand);
Description
  Gets the System.Data.IDbCommand to execute during the System.Data.Common.DbDataAdapter.Update (System.Data.DataSet) operation.
    Errors
    ToString
[C#] public Exception Errors {get; set;}
[C++] public: _property Exception* get_Errors( );public: _property void set_Errors(Exception*);
[VB] Public Property Errors As Exception
[JScript] public function get Errors( ): Exception;public function set Errors(Exception);
Description
  Gets any errors generated by the .NET data provider when the System.Data.Common.RowUpdatedEventArgs.Command executes.
    Row
    ToString
[C#] public DataRow Row {get;}
[C++] public: _property DataRow* get_Row( );
[VB] Public ReadOnly Property Row As DataRow
[JScript] public function get Row( ): DataRow;
Description
  Gets the System.Data.DataRow to send through an System.Data.Common.DbDataAdapter.Update (System.Data.DataSet).
    StatementType
    ToString
[C#] public StatementType StatementType {get;}
[C++] public: _property StatementType get_StatementType( );
[VB] Public ReadOnly Property StatementType As StatementType
[JScript] public function get StatementType( ): StatementType;
Description
  Gets the type of SQL statement to execute.
  System.Data.Common.RowUpdatingEventArgs.StatementType can be one of the following values: Select Insert Update Delete Indicates the type of SQL command to execute. This property is read-only.
    Status
    ToString
[C#] public UpdateStatus Status {get; set;}
[C++] public: _property UpdateStatus get_Status( );public: _property void set_Status(UpdateStatus);
[VB] Public Property Status As UpdateStatus
[JScript] public function get Status( ): UpdateStatus;public function set Status(UpdateStatus);
Description
  Gets the System.Data.UpdateStatus of the System.Data.OleDb
    Description
  The System.Data.OleDb namespace is the OLE DB .NET Data Provider.
    OleDbCommand class (System.Data.OleDb)
Description
  Represents a SQL statement or stored procedure to execute at a data source.
  When an instance of System.Data.OleDb.OleDbCommand is created, the read/write properties are set to their initial values. For a list of these values, see the System.Data.OleDb.OleDbCommand constructor.
    Constructors:
    OleDbCommand
    Example Syntax:
[C#] public OleDbCommand( );
[C++] public: OleDbCommand( );
[VB] Public Sub New( )
[JScript] public function OleDbCommand( ); Initializes a new instance of the System.Data.OleDb.OleDbCommand class.
Description
  Initializes a new instance of the System.Data.OleDb.OleDbCommand class.
  The following table shows initial property values for an instance of System.Data.OleDb.OleDbCommand.
    OleDbCommand
    Example Syntax:
[C#] public OleDbCommand(string cmdText);
[C++] public: OleDbCommand(String* cmdText);
[VB] Public Sub New(ByVal cmdText As String)
[JScript] public function OleDbCommand(cmdText: String);
Description
  Initializes a new instance of the System.Data.OleDb.OleDbCommand class with the text of the query.
  The following table shows initial property values for an instance of System.Data.OleDb.OleDbCommand. The text of the query.
    OleDbCommand
    Example Syntax:
[C#] public OleDbCommand(string cmdText, OleDbConnection connection);
[C++] public: OleDbCommand(String* cmdText, OleDbConnection* connection);
[VB] Public Sub New(ByVal cmdText As String, ByVal connection As OleDbConnection)
[JScript] public function OleDbCommand(cmdText: String, connection: OleDbConnection);
Description
  Initializes a new instance of the System.Data.OleDb.OleDbCommand class with the text of the query and an System.Data.OleDb.OleDbConnection.
  The following table shows initial property values for an instance of System.Data.OleDb.OleDbCommand. The text of the query. An System.Data.OleDb.OleDbConnection that represents the connection to a data source.
    OleDbCommand
    Example Syntax
[C#] public OleDbCommand(string cmdText, OleDbConnection connection, OleDbTransaction transaction);
[C++] public: OleDbCommand(String* cmdText, OleDbConnection* connection, OleDbTransaction* transaction);
[VB] Public Sub New(ByVal cmdText As String, ByVal connection As OleDbConnection, ByVal transaction As OleDbTransaction)
[JScript] public function OleDbCommand(cmdText: String, connection: OleDbConnection, transaction: OleDbTransaction);
Description.
  Initializes a new instance of the System.Data.OleDb.OleDbCommand class with the text of the query, an System.Data.OleDb.OleDbConnection, and the System.Data.OleDb.OleDbCommand.Transaction.
  The following table shows initial property values for an instance of System.Data.OleDb.OleDbCommand. The text of the query. An System.Data.OleDb.OleDbConnection that represents the connection to a data source. The transaction in which the System.Data.OleDb.OleDbCommand executes.

Properties:
CommandText
[C#] public string CommandText {get; set;}
[C++] public: _property String* get_CommandText( );
public: _property void set_CommandText(String*);
[VB] Public Property CommandText As String
[JScript] public function get CommandText( ): String;public function set CommandText(String);
Description
Gets or sets the SQL statement or stored procedure to execute at the data source.
When the System.Data.IDbCommand.CommandType property is set to StoredProcedure, the System.Data.OleDb.OleDbCommand.CommnandText property should be set to the name of the stored procedure. The command executes this stored procedure when you call one of the Execute methods.
CommandTimeout
[C#] public int CommandTimeout {get; set;}
[C++] public: _property int get_CommandTimeout( ); public: _property void set_CommandTimeout(int);
[VB] Public Property CommandTimeout As Integer
[JScript] public function get CommandTimeout( ): int;public function set CommandTimeout(int);
Description
Gets or sets the wait time before terminating an attempt to execute a command and generating an error.
A value of 0 indicates no limit, and should be avoided in a System.Data.OleDb.OleDbCommand.CommandTimeout because an attempt to execute a command will wait indefinitely.
CommandType
[C#] public CommandType CommandType {get; set;}
[C++] public: _property CommandType get_CommandType( );public: _property void set_CommandType(CommandType);
[VB] Public Property CommandType As CommandType
[JScript] public function get CommandType( ): CommandType;public function set CommandType (CommandType);
Description
Gets or sets a value indicating how the System.Data.OleDb.OleDbCommand.CommandText property is interpreted.
When you set the System.Data.OleDb.OleDbCommand.CommandType property to StoredProcedure, you should set the System.Data.OleDb.OleDbCommand.CommandText property to the name of the stored procedure. The command executes this stored procedure when you call one of the Execute methods.
Connection
[C#] public OleDbConnection Connection {get; set;}
[C++] public: _property OleDbConnection* get_Connection( );public: _property void set_Connection (OleDbConnection*);
[VB] Public Property Connection As OleDbConnection
[JScript] public function get Connection( ): OleDbConnection;public function set Connection(OleDbConnection);
Description
Gets or sets the System.Data.OleDb.OleDbConnection used by this instance of the System.Data.OleDb.OleDbCommand.
You cannot set the System.Data.OleDb.OleDbCommand.Connection, System.Data.OleDb.OleDbCommand.CommandType and System.Data.OleDb.OleDbCommand.CommandText properties if the current connection is performing an execute or fetch operation.
Container
DesignMode
DesignTimeVisible
Description
Gets or sets a value indicating whether the command object should be visible in a customized Windows Forms Designer control.
Events
Parameters
Description
Gets the System.Data.OleDb.OleDbParameterCollection
The OLE DB .NET Provider does not support named parameters for passing parameters to a SQL Statement or a stored procedure called by an System.Data.OleDb.OleDbCommand when System.Data.OleDb.OleDbCommand.CommandType is set to Text. In this case, the question mark (?) placeholder must be used. For example: SELECT* FROM Customers WHERE CustomerID=? As a result, the order in which System.Data.OleDb.OleDbParameter objects are added to the System.Data.OleDb.OleDbParameterCollection must directly correspond to the position of the question mark placeholder for the parameter.
Site
Transaction
Description
Gets or sets the transaction in which the System.Data.OleDb.OleDbCommand executes.
UpdatedRowSource
[C#] public UpdateRowSource UpdatedRowSource {get; set;}
[C++] public: _property UpdateRowSource get_UpdatedRowSource( );public: _property void set_UpdatedRowSource(UpdateRowSource);
[VB] Public Property UpdatedRowSource As UpdateRowSource
[JScript] public function get UpdatedRowSource( ): UpdateRowSource;public function set UpdatedRowSource (UpdateRowSource);
Description
Gets or sets how command results are applied to the System.Data.DataRow when used by the System.Data.Common.DbDataAdapter.Update (System.Data.DataSet) method of the System.Data.Common.DbDataAdapter.
Methods:
Cancel
[C#] public void Cancel( );
[C++] public: _sealed void Cancel( );
[VB] NotOverridable Public Sub Cancel( )
[JScript] public function Cancel( );
Description
Cancels the execution of an System.Data.OleDb.OleDbCommand.
If there is nothing to cancel, nothing happens.
CreateParameter
[C#] public OleDbParameter CreateParameter( );
[C++] public: OleDbParameter* CreateParameter( );
[VB] Public Function CreateParameter( ) As OleDbParameter
[JScript] public function CreateParameter( ): OleDbParameter;
Description
Creates a new instance of an System.Data.OleDb.OleDbParameter object.
Return Value: An System.Data.OleDb.OleDbParameter object.
The System.Data.OleDb.OleDbCommand.CreateParameter method is a strongly-typed version of System.Data.IDbCommand.CreateParameter.

Dispose
[C#] protected override void Dispose(bool disposing);
[C++] protected: void Dispose(bool disposing);
[VB] Overrides Protected Sub Dispose(ByVal disposing As Boolean)
[JScript] protected override function Dispose(disposing: Boolean); Releases the resources used by the System.Data.OleDb.OleDbCommand.
Description
Releases the unmanaged resources used by the System.Data.OleDb.OleDbCommand and optionally releases the managed resources.
This method is called by the public method and the System.Object.Finalize method. true to release both managed and unmanaged resources; false to release only unmanaged resources.
ExecuteNonQuery
[C#] public int ExecuteNonQuery( );
[C++] public: _sealed int ExecuteNonQuery( );
[VB] NotOverridable Public Function ExecuteNonQuery( ) As Integer
[JScript] public function ExecuteNonQuery( ): int;
Description
Executes a SQL statement against the System.Data.OleDb.OleDbCommand.Connection and returns the number of rows affected.
Return Value: The number of rows affected.
You can use the System.Data.SqlClient.SqlCommand.ExecuteNonQuery to perform catalog operations (for example, querying the structure of a database or creating database objects such as tables), or to change the data in a database without using a System.Data.DataSet by executing UPDATE, INSERT, or DELETE statements.
ExecuteReader
[C#] public OleDbDataReader ExecuteReader( );
[C++] public: OleDbDataReader* ExecuteReader( );
[VB] Public Function ExecuteReader( ) As OleDbDataReader
[JScript] public function ExecuteReader( ): OleDbDataReader; Sends the System.Data.OleDb.OleDbCommand.CommandText to the System.Data.OleDb.OleDbCommand.Connection and builds an System.Data.OleDb.OleDbDataReader.
Description
Sends the System.Data.OleDb.OleDbCommand.CommandText to the System.Data.OleDb.OleDbCommand.Connection and builds an System.Data.OleDb.OleDbDataReader.
Return Value: An System.Data.OleDb.OleDbDataReader object.
When the System.Data.IDbCommand.CommandType property is set to StoredProcedure, the System.Data.OleDb.OleDbCommand.CommandText property should be set to the name of the stored procedure. The command executes this stored procedure when you call System.Data.OleDb.OleDbCommand.ExecuteReader.
ExecuteReader
[C#] public OleDbDataReader ExecuteReader (CommandBehavior behavior);
[C++] public: OleDbDataReader* ExecuteReader (CommandBehavior behavior);
[VB] Public Function ExecuteReader(ByVal behavior As CommandBehavior) As OleDbDataReader
[JScript] public function ExecuteReader(behavior: CommandBehavior): OleDbDataReader;
Description
Sends the System.Data.OleDb.OleDbCommand.CommandText to the System.Data.OleDb.OleDbCommand.Connection, and builds an System.Data.OleDb.OleDbDataReader using one of the System.Data.CommandBehavior values.
Return Value: An System.Data.OleDb.OleDbDataReader object.
When you specify System.Data.CommandBehavior.SingleRow with the System.Data.OleDb.OleDbCommand.ExecuteReader method of the System.Data.OleDb.OleDbCommand object, the OLE DB .NET Data Provider performs binding using the OLE DB IRow interface if it is available. Otherwise, it uses the IRowset interface. If your SQL statement is expected to return only a single row, specifying System.Data.CommandBehavior.SingleRow can also improve application performance. One of the System.Data.CommandBehaviorvalues.
ExecuteScalar
[C#] public object ExecuteScalar( );
[C++] public: _sealed Object* ExecuteScalar( );
[VB] NotOverridable Public Function ExecuteScalar( ) As Object
[JScript] public function ExecuteScalar( ): Object;
Description
Executes the query, and returns the first column of the first row in the resultset returned by the query. Extra columns or rows are ignored.
Return Value: The first column of the first row in the resultset.
Use the System.Data.OleDb.OleDbCommand.ExecuteScalar method to retrieve a single value (for example, an aggregate value) from a data source. This requires less code than using the System.Data.OleDb.OleDbCommand.ExecuteReader method, and then performing the operations necessary to generate the single value using the data returned by an System.Data.OleDb.OleDbDataReader.
Prepare
[C#] public void Prepare( );
[C++] public: _sealed void Prepare( );
[VB] NotOverridable Public Sub Prepare( )
[JScript] public function Prepare( );
Description
Creates a prepared (or compiled) version of the command on the data source.
If the System.Data.OleDb.OleDbCommand.CommandType property is set to TableDirect, System.Data.OleDb.OleDbCommand.Prepare does nothing. If System.Data.OleDb.OleDbCommand.CommandType is set to StoredProcedure, the call to System.Data.OleDb.OleDbCommand.Prepare should succeed, although it may result in a no-op.
ResetCommandTimeout
[C#] public void ResetCommandTimeout( );
[C++] public: void ResetCommandTimeout( );
[VB] Public Sub ResetCommandTimeout( )
[JScript] public function ResetCommandTimeout( );
Description
Resets the System.Data.OleDb.OleDbCommand.CommandTimeout property to the default value.
The default value of the System.Data.OleDb.OleDbCommand.CommandTimeout is 30 seconds.
IDbCommand.CreateParameter
[C#] IDbDataParameter IDbCommand.CreateParameter( );
[C++] IDbDataParameter* IDbCommand::CreateParameter( );
[VB] Function CreateParameter( ) As IDbDataParameter Implements IDbCommand.CreateParameter
[JScript] function IDbCommand.CreateParameter( ): IDbDataParameter;

IDbCommand.ExecuteReader
[C#] IDataReader IDbCommand.ExecuteReader( );
[C++] IDataReader* IDbCommand::ExecuteReader( );
[VB] Function ExecuteReader( ) As IDataReader Implements IDbCommand.ExecuteReader
[JScript] function IDbCommand.ExecuteReader( ): IDataReader;
IDbCommand.ExecuteReader
[C#] IDataReader IDbCommand.ExecuteReader (CommandBehavior behavior);
[C++] IDataReader* IDbCommand::ExecuteReader (CommandBehavior behavior);
[VB] Function ExecuteReader(ByVal behavior As CommandBehavior) As IDataReader Implements IDbCommand.ExecuteReader
[JScript] function IDbCommand.ExecuteReader(behavior: CommandBehavior): IDataReader;
ICloneable.Clone
[C#] object ICloneable.Clone( );
[C++] Object* ICloneable::Clone( );
[VB] Function Clone( ) As Object Implements ICloneable.Clone
[JScript] function ICloneable.Clone( ): Object;
OleDbCommandBuilder class (System.Data.OleDb)
ToString
Description
    Provides a means of automatically generating single-table commands used to reconcile changes made to a System.Data.DataSet with the associated database. This class cannot be inherited.
    The System.Data.OleDb.OleDbDataAdapter does not automatically generate the SQL statements required to reconcile changes made to a System.Data.DataSet with the associated data source. However, you can create an System.Data.OleDb.OleDbCommandBuilder object to automatically generate SQL statements for single-table updates if you set the System.Data.OleDb.OleDbDataAdapter.SelectCommand property of the System.Data.OleDb.OleDbDataAdapter. Then, any additional SQL statements that you do not set are generated by the System.Data.OleDb.OleDbCommandBuilder.
    OleDbCommandBuilder
    Example Syntax:
    ToString
[C#] public OleDbCommandBuilder( );
[C++] public: OleDbCommandBuilder( );
[VB] Public Sub New( )
[JScript] public function OleDbCommandBuilder( ); Initializes a new instance of the System.Data.OleDb.OleDbCommandBuilder class.
Description
    Initializes a new instance of the System.Data.OleDb.OleDbCommandBuilder class.
    OleDbCommandBuilder
    Example Syntax:
    ToString
[C#] public OleDbCommandBuilder(OleDbDataAdapter adapter);
[C++] public: OleDbCommandBuilder (OleDbDataAdapter* adapter);
[VB] Public Sub New(ByVal adapter As OleDbDataAdapter)
[JScript] public function OleDbCommandBuilder(adapter: OleDbDataAdapter);
Description
    Initializes a new instance of the System.Data.OleDb.OleDbCommandBuilder class with the associated System.Data.OleDb.OleDbDataAdapter object. An System.Data.OleDb.OleDbDataAdapter.
    Container
    DataAdapter
    ToString
Description
    Gets or sets an System.Data.OleDb.OleDbDataAdapter object for which SQL statements are automatically generated.
    The System.Data.OleDb.OleDbCommandBuilder registers itself as a listener for System.Data.OleDb.OleDbDataAdapter.RowUpdating events generated by the System.Data.OleDb.OleDbDataAdapter.
    DesignMode
    Events
    QuotePrefix
    ToString
Description
    Gets or sets the beginning character or characters to use when specifying database object names, (for example, tables or columns), that contain characters such as spaces.
    Some data sources may have objects that can contain characters such as spaces, commas, and semicolons. To accommodate this capability, use the System.Data.OleDb.OleDbCommandBuilder.QuotePrefix and System.Data.OleDb.OleDbCommandBuilder.QuoteSuffix properties to specify delimiters such as a left bracket and a right bracket to encapsulate the object name.
    QuoteSuffix
    ToString
[C#] public string QuoteSuffix {get; set;}
[C++] public: __property String* get_QuoteSuffix( );public: __property void set_QuoteSuffix(String*);
[VB] Public Property QuoteSuffix As String
[JScript] public function get QuoteSuffix( ): String;public function set QuoteSuffix(String);
Description
    Gets or sets the ending character or characters to use when specifying database object names, (for example, tables or columns), that contain characters such as spaces.
    Some data sources may have objects that can contain characters such as spaces, commas, and semicolons. To accommodate this capability, use the System.Data.OleDb.OleDbCommandBuilder.QuotePrefix and System.Data.OleDb.OleDbCommandBuilder.QuoteSuffix properties to specify delimiters such as a left bracket and a right bracket to encapsulate the object name.
    Site
    DeriveParameters
[C#] public static void DeriveParameters(OleDbCommand command);
[C++] public: static void DeriveParameters (OleDbCommand* command);
[VB] Public Shared Sub DeriveParameters(ByVal command As OleDbCommand)
[JScript] public static function DeriveParameters(command: OleDbCommand);
Description
    Dispose
[C#] protected override void Dispose(bool disposing);
[C++] protected: void Dispose(bool disposing);
[VB] Overrides Protected Sub Dispose(ByVal disposing As Boolean)
[JScript] protected override function Dispose(disposing: Boolean); Releases the resources used by the System.Data.OleDb.OleDbCommandBuilder.

Description

Releases the unmanaged resources used by the System.Data.OleDb.OleDbCommandBuilder and optionally releases the managed resources.

This method is called by the public method and the System.Object.Finalize method. true to release both managed and unmanaged resources; false to release only unmanaged resources.

GetDeleteCommand

[C#] public OleDbCommand GetDeleteCommand( );
[C++] public: OleDbCommand* GetDeleteCommand( );
[VB] Public Function GetDeleteCommand( ) As OleDbCommand
[JScript] public function GetDeleteCommand( ): OleDbCommand;

Description

Gets the automatically generated SQL statement required to perform deletions at the data source when an application calls System.Data.Common.DbDataAdapter.Update (System.Data.DataSet) on the System.Data.OleDb.OleDbDataAdapter.

Return Value: The text of the SQL statement to be executed.

An application can use the System.Data.OleDb.OleDbCommandBuilder.GetDeleteCommand method for informational or troubleshooting purposes because it returns the text of the statement to be executed.

GetInsertCommand

[C#] public OleDbCommand GetInsertCommand( );
[C++] public: OleDbCommand* GetInsertCommand( );
[VB] Public Function GetInsertCommand( ) As OleDbCommand
[JScript] public function GetInsertCommand( ): OleDbCommand;

Description

Gets the automatically generated SQL statement required to perform inserts at the data source when an application calls System.Data.Common.DbDataAdapter.Update (System.Data.DataSet) on the System.Data.OleDb.OleDbDataAdapter.

Return Value: The text of the SQL statement to be executed.

An application can use the System.Data.OleDb.OleDbCommandBuilder.GetInsertCommand method for informational or troubleshooting purposes because it returns the text of the statement to be executed.

GetUpdateCommand

[C#] public OleDbCommand GetUpdateCommand( );
[C++] public: OleDbCommand* GetUpdateCommand( );
[VB] Public Function GetUpdateCommand( ) As OleDbCommand
[JScript] public function GetUpdateCommand( ): OleDbCommand;

Description

Gets the automatically generated SQL statement required to perform updates at the data source when an application calls System.Data.Common.DbDataAdapter.Update (System.Data.DataSet) on the System.Data.OleDb.OleDbDataAdapter.

Return Value: The text of the SQL statement to be executed.

An application can use the System.Data.OleDb.OleDbCommandBuilder.GetUpdateCommand method for informational or troubleshooting purposes because it returns the text of the statement to be executed.

RefreshSchema

[C#] public void RefreshSchema( );
[C++] public: void RefreshSchema( );
[VB] Public Sub RefreshSchema( )
[JScript] public function RefreshSchema( );

Description

Refreshes the database schema information used to generate INSERT, UPDATE, or DELETE statements.

An application should call System.Data.OleDb.OleDbCommandBuilder.RefreshSchema whenever the SELECT statement associated with the System.Data.OleDb.OleDbCommandBuilder changes.

OleDbConnection class (System.Data.OleDb)

ToString

Description

Represents an open connection to a data source.

An System.Data.OleDb.OleDbConnection object represents a unique connection to a data source. In the case of a client/server database system, it is equivalent to a network connection to the server. Depending on the functionality supported by the native OLE DB provider, some collections, methods, or properties of an System.Data.OleDb.OleDbConnection object may not be available.

OleDbConnection

Example Syntax:

ToString

[C#] public OleDbConnection( );
[C++] public: OleDbConnection( );
[VB] Public Sub New( )
[JScript] public function OleDbConnection( ); Initializes a new instance of the System.Data.OleDb.OleDbConnection class.

Description

Initializes a new instance of the System.Data.OleDb.OleDbConnection class.

When a new instance of System.Data.OleDb.OleDbConnection is created, the read/write properties are set to the following initial values unless they are specifically set using their associated keywords in the System.Data.SqlClient.SqlConnection.ConnectionString property.

OleDbConnection

Example Syntax:

ToString

[C#] public OleDbConnection(string connectionString);
[C++] public: OleDbConnection(String* connectionString);
[VB] Public Sub New(ByVal connectionString As String)
[JScript] public function OleDbConnection (connectionString: String);

Description

Initializes a new instance of the System.Data.OleDb.OleDbConnection class with the specified connection string.

When a new instance of System.Data.OleDb.OleDbConnection is created, the read/write properties are set to the following initial values unless they are specifically set using their associated keywords in the System.Data.SqlClient.SqlConnection.ConnectionString property. The connection used to open the database.

ConnectionString

ToString

[C#] public string ConnectionString {get; set;}
[C++] public: __property String* get_ConnectionString( );public: __property void set_ConnectionString(String*);
[VB] Public Property ConnectionString As String
[JScript] public function get ConnectionString( ): String;public function set ConnectionString(String);

Description

Gets or sets the string used to open a database.

The System.Data.OleDb.OleDbConnection.ConnectionString is designed to match OLE DB connection string format as closely as possble with the following exceptions: The "Provider=value" clause is required. However, you cannot use "Provider=MSDASQL" because the OLE DB .NET Data Provider does not support the OLE DB Provider for ODBC (MSDASQL).
ConnectionTimeout
ToString
[C#] public int ConnectionTimeout {get;}
[C++] public: __property int get_ConnectionTimeout( );
[VB] Public ReadOnly Property ConnectionTimeout As Integer
[JScript] public function get ConnectionTimeout( ): int;
Description
Gets the time to wait while trying to establish a connection before terminating the attempt and generating an error.
A value of 0 indicates no limit, and should be avoided in a System.Data.OleDb.OleDbConnection.ConnectionString because an attempt to connect will wait indefinitely.
Container
Database
ToString
Description
Gets the name of the current database or the database to be used once a connection is open.
The System.Data.OleDb.OleDbConnection.Database property updates dynamically. If you change the current database using a SQL statement or the System.Data.OleDb.OleDbConnection.ChangeDatabase (System.String) method, an informational message is sent and the property is updated automatically.
DataSource
ToString
[C#] public string DataSource {get;}
[C++] public: __property String* get_DataSource( );
[VB] Public ReadOnly Property DataSource As String
[JScript] public function get DataSource( ): String;
Description
Gets the location and file name of the data source.
DesignMode
Events
Provider
ToString
Description
Gets the name of the OLE DB provider.
ServerVersion
ToString
[C#] public string ServerVersion {get;}
[C++] public: __property String* get_ServerVersion( );
[VB] Public ReadOnly Property ServerVersion As String
[JScript] public function get ServerVersion( ): String;
Description
Gets a string containing the version of the of the server to which the client is connected.
The System.Data.OleDb.OleDbConnection.ServerVersion property maps to the OLE DB DBPROP_DBMSVER property. If System.Data.OleDb.OleDbConnection.ServerVersion is not supported by the underlying OLE DB provider, an empty string is returned.
Site
State
ToString
Description
Gets the current state of the connection.
The allowed state changes are: From Closed to Open, using the Open method of the connnection object.
ToString
Description
Occurs when the provider sends a warning or an informational message.
Clients that want to process warnings or informational messages sent by the server should create an System.Data.OleDb.OleDbInfoMessageEventHandler delegate to listen to this event.
ToString
[C#] public event StateChangeEventHandler StateChange;
[C++] public: __event StateChangEventHandler* StateChange;
[VB] Public Event StateChange As StateChangeEventHandler
Description
Occurs when the state of the connection changes.
The System.Data.OleDb.OleDbConnection.StateChange event fires whenever the System.Data.OleDb.OleDbConnection.State changes from closed to opened, or from opened to closed.
BeginTransaction
[C#] public OleDbTransaction BeginTransaction( );
[C++] public: OleDbTransaction* BeginTransaction( );
[VB] Public Function BeginTransaction( ) As OleDbTransaction
[JScript] public function BeginTransaction( ): OleDbTransaction;
Description
Begins a database transaction.
Return Value: An object representing the new transaction.
You must explicity commit or roll back the transaction using the System.Data.OleDb.OleDbTransaction.Commit or System.Data.OleDb.OleDbTransaction.Rollback method. To ensure that the OLE DB .NET Data Provider transaction management model performs correctly, avoid using other transaction management models, such as those provided by the data source.
BeginTransaction
[C#] public OleDbTransaction BeginTransaction (IsolationLevel isolationlevel);
[C++] public: OleDbTransaction* BeginTransaction (IsolationLevel isolationLevel);
[VB] Public Function BeginTransaction(ByVal isolationLevel As IsolationLevel) As OleDbTransaction
[JScript] public function BeginTransaction(isolationLevel: IsolationLevel): OleDbTransaction; Begins a database transaction.
Description
Begins a database transaction with the current System.Data.IsolationLevel value.
Return Value: An object representing the new transaction.
You must explicity commit or roll back the transaction using the System.Data.OleDb.OleDbTransaction.Commit or System.Data.OleDb.OleDbTransaction.Rollback method. To ensure that the OLE DB .NET Data Provider transaction management model performs correctly, avoid using other transaction management models, such as those provided by the data source. The transaction isolation level for this connection.
ChangeDatabase
[C#] public void ChangeDatabase(string value);
[C++] public: __sealed void ChangeDatabase(String* value);
[VB] NotOverridable Public Sub ChangeDatabase(ByVal value As String)
[JScript] public function ChangeDatabase(value: String);
Description
Changes the current database for an open System.Data.OleDb.OleDbConnection.
The value supplied in the database parameter must be a valid database name. The database parameter cannot contain a null value, be empty, or contain a string with only blank characters. The database name.
Close
[C#] public void Close( );

[C++] public: _sealed void Close( );
[VB] NotOverridable Public Sub Close( )
[JScript] public function Close( );
Description Closes the connection to the data source. This is the preferred method of closing any open connection.

The System.Data.OleDb.OleDbConnection.Close method rolls back any pending transactions. It then releases the connection to the connection pool, or closes the connection if connection pooling is disabled. If System.Data.OleDb.OleDbConnection.Close is called while handling a System.Data.OleDb.OleDbConnection.StateChange event, no additional System.Data.OleDb.OleDbConnection.StateChange events are fired.

CreateCommand
[C#] public OleDbCommand CreateCommand( );
[C++] public: OleDbCommand* CreateCommand( );
[VB] Public Function CreateCommand( ) As OleDbCommand
[JScript] public function CreateCommand( ): OleDbCommand;
Description Creates and returns an System.Data.OleDb.OleDbCommand object associated with the System.Data.OleDb.OleDbConnection.
Return Value: An System.Data.OleDb.OleDbCommand object.

Dispose
[C#] protected override void Dispose(bool disposing);
[C++] protected: void Dispose(bool disposing);
[VB] Overrides Protected Sub Dispose(ByVal disposing As Boolean)
[JScript] protected override function Dispose(disposing: Boolean); Releases the resources used by the System.Data.OleDb.OleDbConnection
Description Releases the unmanaged resources used by the System.Data.OleDb.OleDbConnection and optionally releases the managed resources.

This method is called by the public method and the System.Object.Finalize method. true to release both managed and unmanaged resources; false to release only unmanaged resources.

GetOleDbSchemaTable
[C#] public DataTable GetOleDbSchemaTable(Guid schema, object[ ] restrictions);
[C++] public: DataTable* GetOleDbSchemaTable(Guid schema, Object* restrictions _gc[ ]);
[VB] Public Function GetOleDbSchemaTable(ByVal schema As Guid, ByVal restrictions( ) As Object) As DataTable
[JScript] public function GetOleDbSchemaTable(schema: Guid, restrictions: Object[ ]): DataTable;
Description Returns the schema table and associated restriction columns of the specified schema.
Return Value: A System.Data.DataTable containing a list of schema restrictions.

The schema table is returned as a System.Data.DataTable that has the same format as the OLE DB schema rowset specified by the the schema parameter. Use the restrictions parameter to filter the rows to be returned in the System.Data.DataTable (for example, by specifying restrictions for tablename, type, owner, or schema). When you pass values in the array, include empty strings for array elements that do not contain values. If you pass an empty array to restrictions, all rows (one for each table) are returned in default order. Values in the array correspond to the order of the columns in the source table and System.Data.DataTable. One of the System.Data.OleDb.OleDbSchemaGuid values that specifies the schema table to return. An array of objects that are filter values, each of which corresponds to a System.Data.DataColumn in the resulting System.Data.DataTable.

Open
[C#] public void Open( );
[C++] public: _sealed void Open( );
[VB] NotOverridable Public Sub Open( )
[JScript] public function Open( );
Description Opens a database connection with the property settings specified by the System.Data.OleDb.OleDbConnection.ConnectionString.

The System.Data.OleDb.OleDbConnection draws an open connection from the connection pool if one is available. Otherwise, it establishes a new connection to the data source.

ReleaseObjectPool
[C#] public static void ReleaseObjectPool( );
[C++] public: static void ReleaseObjectPool( );
[VB] Public Shared Sub ReleaseObjectPool( )
[JScript] public static function ReleaseObjectPool( );
Description Indicates that the System.Data.OleDb.OleDbConnection object pooling can be cleared when the last underlying OLE DB Provider is released.

The object pool is cached whenever one of the underlying OLE DB providers is created. This method should be called when the user is done using any System.Data.OleDb.OleDbConnection objects.

IDbConnection.BeginTransaction
[C#] IDbTransaction IDbConnection.BeginTransaction( );
[C++] IDbTransaction* IDbConnection::BeginTransaction( );
[VB] Function BeginTransaction( ) As IDbTransaction Implements IDbConnection.BeginTransaction
[JScript] function IDbConnection.BeginTransaction( ): IDbTransaction;
IDbConnection.BeginTransaction
[C#] IDbTransaction IDbConnection.BeginTransaction(IsolationLevel isolationLevel);
[C++] IDbTransaction* IDbConnection::BeginTransaction(IsolationLevel isolationLevel);
[VB] Function BeginTransaction(ByVal isolationLevel As IsolationLevel) As IDbTransaction Implements IDbConnection.BeginTransaction
[JScript] function IDbConnection.BeginTransaction(isolationLevel: IsolationLevel): IDbTransaction;
IDbConnection.CreateCommand
[C#] IDbCommand IDbConnection.CreateCommand( );
[C++] IDbCommand* IDbConnection::CreateCommand( );
[VB] Function CreateCommand( ) As IDbCommand Implements IDbConnection.CreateCommand
[JScript] function IDbConnection.CreateCommand( ): IDbCommand;
ICloneable.Clone
[C#] object ICloneable.Clone( );
[C++] Object* ICloneable::Clone( );
[VB] Function Clone( ) As Object Implements ICloneable.Clone
[JScript] function ICloneable.Clone( ): Object;
OleDbDataAdapter class (System.Data.OleDb)
ToString
Description Represents a set of data commands and a database connection which are used to fill the System.Data.DataSet and update the data source.

The System.Data.OleDb.OleDbDataAdapter serves as a bridge between a System.Data.DataSet and data source for retrieving and saving data. The System.Data.OleDb.OleDbDataAdapter provides this bridge by using System.Data.Common.DbDataAdapter.Fill (System.Data.DataTable) to load data from the data source into the System.Data.DataSet, and using System.Data.Common.DbDataAdapter.Update (System.Data.DataSet) to send changes made in the System.Data.DataSet back to the data source.
 OleDbDataAdapter
 Example Syntax:
 ToString
 [C#] public OleDbDataAdapter( );
 [C++] public: OleDbDataAdapter( );
 [VB] Public Sub New( )
 [JScript] public function OleDbDataAdapter( ); Initializes a new instance of the System.Data.OleDb.OleDbDataAdapter class.
Description
 Initializes a new instance of the System.Data.OleDb.OleDbDataAdapter class.
 When you create an instance of System.Data.OleDb.OleDbDataAdapter, the following read/write properties are set to the following initial values.
 OleDbDataAdapter
 Example Syntax:
 ToString
 [C#] public OleDbDataAdapter(OleDbCommand selectCommand);
 [C++] public: OleDbDataAdapter(OleDbCommand* selectCommand);
 [VB] Public Sub New(ByVal selectCommand As OleDbCommand)
 [JScript] public function OleDbDataAdapter (selectCommaand: OleDbCommand);
Description
 Initializes a new instance of the System.Data.OleDb.OleDbDataAdapter class with the specified SQL SELECT statement.
 When you create an instance of System.Data.OleDb.OleDbDataAdapter, the following read/write properties are set to the following initial values. An System.Data.OleDb.OleDbCommand that is a SQL SELECT statement.
 OleDbDataAdapter
 Example Syntax:
 ToString
 [C#] public OleDbDataAdapter(string selectCommandText, OleDbConnection selectconnection);
 [C++] public: OleDbDataAdapter(String* selectCommandText, OleDbConnection* selectConnection);
 [VB] Public Sub New(ByVal selectCommandText As String, ByVal selectConnection As OleDbConnection)
 [JScript] public function OleDbDataAdapter (selectCommandText: String, selectConnection: OleDbConnection);
Description
 Inintializes a new instance of the System.Data.OleDb.OleDbDataAdapter class with a System.Data.OleDb.OleDbDataAdapter.SelectCommand.
 This implementation of the System.Data.OleDb.OleDbDataAdapter opens and closes a System.Data.OleDb.OleDbConnection if it is not already open. This can be useful in a an application that must call the System.Data.Common.DbDataAdapter.Fill (System.Data.DataTablle) method for two or more System.Data.OleDb.OleDbDataAdapter objects. If the System.Data.OleDb.OleDbConnection is already open, you must explicitly call System.Data.OleDb.OleDbConnection.Close or System.Data.OleDb.OleDbConnection.Dispose (System.Boolean) to close it. The System.Data.OleDb.OleDbDataAdapter.SelectCommand. An System.Data.OleDb.OleDbConnection that represents the connection.
 OleDbDataAdapter
 Example Syntax:
 ToString
 [C#] public OleDbDataAdapter(string selectCommandText, string selectConnectionString);
 [C++] public: OleDbDataAdapter(String* selectCommandText, String* selectConnectionString);
 [VB] Public Sub New(ByVal selectCommandText As String, ByVal selectConnectionString As String)
 [JScript] public function OleDbDataAdapter (selectCommandText: String, selectConnectionString: String);
Description
 Initializes a new instance of the System.Data.OleDb.OleDbDataAdapter class with a System.Data.OleDb.OleDbDataAdapter.SelectCommand.
 When you create an instance of System.Data.OleDb.OleDbDataAdapter, the following read/write properties are set to the following initial values. The System.Data.OleDb.OleDbDataAdapter.SelectCommand. The connection string.
 AcceptChangesDuringFill
 Container
 DeleteCommand
 ToString
Description
 Gets or sets an SQL statement or stored procedure for deleting records from the data set.
 During System.Data.Common.DbDataAdapter.Update (System.Data.DataSet), if this property is not set and primary key information is present in the System.Data.DataSet, the System.Data.OleDb.OleDbDataAdapter.DeleteCommand can be generated automatically if you set the System.Data.OleDb.OleDbDataAdapter.SelectCommand property and use the System.Data.OleDb.OleDbCommandBuilder. Then, any additional commands that you do not set are generated by the System.Data.OleDb.OleDbCommandBuilder. This generation logic requires key column information to be present in the System.Data.DataSet. For more information see.
 DesignMode
 Events
 InsertCommand
 ToString
Description
 Gets or sets an SQL statement or stored procedure used to insert new records into the data source.
 During System.Data.Common.DbDataAdapter.Update (System.Data.DataSet), if this property is not set and primary key information is present in the System.Data.DataSet, the System.Data.OleDb.OleDbDataAdapter.InsertCommand can be generated automatically if you set the System.Data.OleDb.OleDbDataAdapter.SelectCommand property and use the System.Data.OleDb.OleDbCommandBuilder. Then, any additional commands that you do not set are generated by the System.Data.OleDb.OleDbCommandBuilder. This generation logic requires key column information to be present in the System.Data.DataSet. For more information see.

MissingMappingAction
MissingSchemaAction
SelectCommand
ToString
Description
Gets or sets an SQL statement or stored procedure used to select records in the data source.
When System.Data.OleDb.OleDbDataAdapter.SelectCommand is assigned to a previously created System.Data.OleDb.OleDbCommand, the System.Data.OleDb.OleDbCommand is not cloned. The System.Data.OleDb.OleDbDataAdapter.SelectCommand maintains a reference to the previously created System.Data.OleDb.OleDbCommand object.
site
TableMappings
UpdateCommand
ToString
Description
Gets or sets an SQL statement or stored procedure used to update records in the data source.
During System.Data.Common.DbDataAdapter.Update (System.Data.DataSet), if this property is not set and primary key information is present in the System.Data.DataSet, the System.Data.OleDb.OleDbDataAdapter.UpdateCommand can be generated automatically if you set the System.Data.OleDb.OleDbDataAdapter.SelectCommand property and use the System.Data.OleDb.OleDbCommandBuilder. Then, any additional commands that you do not set are generated by the System.Data.OleDb.OleDbCommandBuilder. This generation logic requires key column information to be present in the System.Data.DataSet. For more information see
ToString
Description
Occurs during System.Data.Common.DbDataAdapter.Update (System.Data.DataSet) after a command is executed against the data source. The attempt to update is made, so the event fires.
When using System.Data.Common.DbDataAdapter.Update (System.Data.DataSet), there are two events that occur per data row updated. The order of execution is as follows: The values in the System.Data.DataRow are moved to the parameter values.
ToString
[C#] public event OleDbRowUpdatingEventHandler RowUpdating;
[C++] public: __event OleDbRowUpdatingEventHandler* RowUpdating;
[VB] Public Event RowUpdating As OleDbRowUpdatingEventHandler
Description
Occurs during System.Data.Common.DbDataAdapter.Update (System.Data.DataSet) before a command is executed against the data source. The attempt to update is made, so the event fires.
When using System.Data.Common.DbDataAdapter.Update (System.Data.DataSet), there are two events that occur per data row updated. The order of execution is as follows: The values in the System.Data.DataRow are moved to the parameter values.
CreateRowUpdatedEvent
[C#] protected override RowUpdatedEventArgs CreateRowUpdatedEvent(DataRow dataRow, IDbCommand command, StatementType statementType, DataTableMapping tableMapping);
[C++] protected: RowUpdatedEventArgs* CreateRowUpdatedvent(DataRow* dataRow, IDbCommand* command, StatementType statementType, DataTableMapping* tableMapping);
[VB] Overrides Protected Function CreateRowUpdatedEvent(ByVal dataRow As DataRow, ByVal command As IDbCommand, ByVal statementType As StatementType, ByVal tableMapping As DataTableMapping) As RowUpdatedEventArgs
[JScript] protected override function CreateRowUpdatedEvent(dataRow: DataRow, command: IDbCommand, statementType: StatementType, tableMapping: DataTableMapping): RowUpdatedEventArgs;
Description
CreateRowUpdatingEvent
[C#] protected override RowUpdatingEventArgs CreateRowUpdatingEvent(DataRow dataRow, IDbCommand command, StatementType statementType, DataTableMapping tableMapping);
[C++] protected: RowUpdatingEventArgs* CreateRowUpdatingEvent(DataRow* dataRow, IDbCommand* command, StatementType statementType, DataTableMapping* tableMapping);
[VB] Overrides Protected Function CreateRowUpdatingEvent(ByVal dataRow As DataRow, ByVal command As IDbCommand, ByVal statementType As StatementType, ByVal tableMapping As DataTableMapping) As RowUpdatingEventArgs
[JScript] protected override function CreateRowUpdatingEvent(dataRow: DataRow, command: IDbCommand, statementType: StatementType, tableMapping: DataTableMapping): RowUpdatingEventArgs;
Description
Dispose
[C#] protected override void Dispose(bool disposing);
[C++] protected: void Dispose(bool disposing);
[VB] Overrides Protected Sub Dispose(ByVal disposing As Boolean)
[JScript] protected override function Dispose(disposing: Boolean); Releases the resources used by the System.Data.OleDb.OleDbDataAdapter.
Description
Releases the unmanaged resources used by the System.Data.OleDb.OleDbDataAdapter and optionally releases the managed resources.
This method is called by the public method and the System.Object.Finalize method. true to release both managed and unmanaged resources; false to release only unmanaged resources.
Fill
[C#] public it Fill(DataTable dataTable, object adodb);
[C++] public: int Fill(DataTable* dataTable, Object* adodb);
[VB] Public Function Fill(ByVal dataTable As DataTable, ByVal adodb As Object) As Integer
[JScript] public function Fill(dataTable: DataTable, adodb: Object): int; Adds or refreshes rows in the System.Data.DataSet to match those in an ADO Recordset or Record object.
Description
Adds or refreshes rows in a System.Data.DataTable to match those in an ADO Recordset or Record object using the specified System.Data.DataTable and ADO objects.

Return Value: The number of rows successfully refreshed to the System.Data.DataTable. This does not include rows affected by statements that do not return rows.

The link between ActiveX Data Objects (ADO) and ADO.NET is a one-way operation in that you can copy data from ADO to the System.Data.DataSet, but any updates to the data must be handled by ADO.NET. For more information, see. A System.Data.DataTable to fill with records and, if necessary, schema. An ADO Recordset or Record object.
Fill
[C#] public int Fill(DataSet dataSet, object adodb, string srcTable);
[C++] public: int Fill(DataSet* dataSet, Object* adodb, String* srcTable);
[VB] Public Function Fill(ByVal dataSet As DataSet, ByVal adodb As Object, ByVal srcTable As String) As Integer
[JScript] public function Fill(dataSet: DataSet, adodb: Object, srcTable: String): int;
Description
Adds or refreshes rows in the System.Data.DataSet to match those in an ADO Recordset or Record object using the specified System.Data.DataSet, ADO object, and source table name.
Return Value: The number of rows successfully added to or refreshed in the System.Data.DataSet. This does not include rows affected by statements that do not return rows.

The link between ActiveX Data Objects (ADO) and ADO.NET is a one-way operation in that you can copy data from ADO to the System.Data.DataSet, but any updates to the data must be handled by ADO.NET. For more information, see. A System.Data.DataSet to fill with records and, if necessary, schema. An ADO Recordset or Record object. The source table used for the table mappings.
OnRowUpdated
[C#] protected override void OnRowUpdated (RowUpdatedEventArgs value);
[C++] protected: void OnRowUpdated (RowUpdatedEventArgs* value);
[VB] Overrides Protected Sub OnRowUpdated(ByVal value As RowUpdatedEventArgs)
[JScript] protected override function OnRowUpdated(value: RowUpdatedEventArgs);
Description
Raises the System.Data.OleDb.OleDbDataAdapter.OnRowUpdated (System.Data.Common.RowUpdatedEventArgs) event using a System.Data.Common.RowUpdatedEventArgs object.

Raising an event invokes the event handler through a delegate. For an overview, see. A System.Data.Common.RowUpdatedEventArgs that contains the event data.
OnRowUpdating
[C#] protected override void OnRowUpdating (RowUpdatingEventArgs value);
[C++] protected: void OnRowUpdating (RowUpdatingEventArgs* value);
[VB] Overrides Protected Sub OnRowUpdating(ByVal value As RowUpdatingEventArgs)
[JScript] protected override function OnRowUpdating (value: RowUpdatingEventArgs);
Description
Raises the System.Data.OleDb.OleDbDataAdapter.OnRowUpdating (System.Data.Common.RowUpdatingEventArgs) event using a System.Data.Common.RowUpdatingEventArgs object.

Raising an event invokes the event handler through a delegate. For an overview, see. A System.Data.Common.RowUpdatingEventArgs that contains the event data.
ICloneable.Clone
[C#] object ICloneable.Clone( );
[C++] Object* ICloneable::Clone( );
[VB] Function Clone( ) As Object Implements ICloneable.Clone
[JScript] function ICloneable.Clone( ): Object;
OleDbDataReader class (System.Data.OleDb)
Update
Description
Provides a way of reading a forward-only stream of data rows from a data source. This class cannot be inherited.
To create an System.Data.OleDb.OleDbDataReader, you must call the System.Data.OleDb.OleDbCommand.ExecuteReader method of the System.Data.OleDb.OleDbCommand object, rather than directly using a constructor.
Depth
Update
[C#] public int Depth {get;}
[C++] public: __property int get__Depth( );
[VB] Public ReadOnly Property Depth As Integer
[JScript] public function get Depth( ): int;
Description
Gets a value indicating the depth of nesting for the current row.
The outermost table has a depth of zero.
FieldCount
Update
[C#] public int FieldCount {get;}
[C++] public: __property int get__FieldCount( );
[VB] Public ReadOnly Property FieldCount As Integer
[JScript] public function get FieldCount( ): int;
Description
Gets the number of columns in the current row.
After executing a query that does not return rows (for example, using the System.Data.OleDb.OleDbCommand.ExecuteNonQuery method), System.Data.OleDb.OleDbDataReader.FieldCount returns −1.
IsClosed
Update
[C#] public bool IsClosed {get;}
[C++] public: __property bool get__IsClosed( );
[VB] Public ReadOnly Property IsClosed As Boolean
[JScript] public function get IsClosed( ): Boolean;
Description
Indicates whether the data reader is closed.
System.Data.OleDb.OleDbDataReader.IsClosed and System.Data.OleDb.OleDbDataReader.RecordsAffected are the only properties that you can call after the System.Data.OleDb.OleDbDataReader is closed.
Item
Update
[C#] public object this[string name] {get;}
[C++] public: __property Object* get__Item(String* name);
[VB] Public Default ReadOnly Property Item(ByVal name As String) As Object
[JScript] returnValue=OleDbDataReaderObject.Item (name);
Description
Gets the value of the specified column in its native format given the column name. The column name.
Item
Update
[C#] public object this[int index] {get;}
[C++] public: __property Object* get__Item(int index);

[VB] Public Default ReadOnly Property Item(ByVal index As Integer) As Object
[JScript] returnValue=OleDbDataReaderObject.Item (index); Gets the value of a column in its native format.
Description
Gets the value of the specified column in its native format given the column ordinal. The column ordinal.
RecordsAffected
Update
[C#] public int RecordsAffected {get;}
[C++] public: __property int get_RecordsAffected( );
[VB] Public ReadOnly Property RecordsAffected As Integer
[JScript] public function get RecordsAffected( ): int;
Description
Gets the number of rows changed, inserted, or deleted by execution of the SQL statement.
The System.Data.OleDb.OleDbDataReader.RecordsAffected property is not set until all rows are read and you close the System.Data.OleDb.OleDbDataReader.
Close
[C#] public void Close( );
[C++] public: __sealed void Close( );
[VB] NotOverridable Public Sub Close( )
[JScript] public function Close( );
Description
Closes the System.Data.OleDb.OleDbDataReader object.
You must explicitly call the System.Data.OleDb.OleDbDataReader.Close method when you are through using the System.Data.OleDb.OleDbDataReader to use the associated System.Data.OleDb.OleDbConnection for any other purpose.
Finalize
[C#] ~OleDbDataReader( );
[C++] ~OleDbDataReader( );
[VB] Overrides Protected Sub Finalize( )
[JScript] protected override function Finalize( );
Description
Frees resources before the System.Data.OleDb.OleDbDataReader is reclaimed by the Garbage Collector.
GetBoolean
[C#] public bool GetBoolean(int ordinal);
[C++] public: __sealed bool GetBoolean(int ordinal);
[VB] NotOverridable Public Function GetBoolean(ByVal ordinal As Integer) As Boolean
[JScript] public function GetBoolean(ordinal: int): Boolean;
Description
Gets the value of the specified column as a boolean.
Return Value: The value of the column.
No conversions are performed, therefore the data retrieved must already be a boolean or an exception is generated. The zero-based column ordinal.
GetByte
[C#] public byte GetByte(int ordinal);
[C++] public: __sealed unsigned char GetByte(int ordinal);
[VB] NotOverridable Public Function GetByte(ByVal ordinal As Integer) As Byte
[JScript] public function GetByte(ordinal: int): Byte;
Description
Gets the value of the specified column as a byte.
Return Value: The value of the specified column as a byte.
No conversions are performed, therefore the data retrieved must already be a byte. The zero-based column ordinal.
GetBytes
[C#] public long GetBytes(int ordinal, long dataIndex, byte[ ] buffer, int bufferIndex, int length);
[C++] public: __sealed __int64 GetBytes(int ordinal, __int64 dataIndex, unsigned char buffer __gc[ ], int bufferIndex, int length);
[VB] NotOverridable Public Function GetBytes(ByVal ordinal As Integer, ByVal dataIndex As Long, ByVal buffers( ) As Byte, ByVal bufferIndex As Integer, ByVal length As Integer) As Long
[JScript] public function GetBytes(ordinal: int, dataIndex: long, buffer: Byte[ ], bufferindex: int, length: int): long;
Description
Reads a stream of bytes from the offset specified column offset into the buffer as an array starting at the given buffer offset.
Return Value: The actual number of bytes read.
The actual number of bytes read can be less than the requested length, if the end of the row is reached. If you pass a buffer that is null, System.Data.OleDb.OleDbDataReader.GetBytes (System.Int32,System.Int64, System.Byte[ ],System.Int32, System.Int32) returns the length of the row in bytes. The zero-based column ordinal. The index within the field from which to begin the read operation. The buffer into which to read the stream of bytes. The index for buffer to begin the read operation. The number of bytes to read.
GetChar
[C#] public char GetChar(int ordinal);
[C++] public: __sealed __wchar_t GetChar(int ordinal);
[VB] NotOverridable Public Function GetChar(ByVal ordinal As Integer) As Char
[JScript] public function GetChar(ordinal: int): Char;
Description
Gets the value of the specified column as a character.
Return Value: The value of the specified column.
No conversions are performed, therefore the data retrieved must already be a character. The zero-based column ordinal.
GetChars
[C#] public long GetChars(int ordinal, long dataIndex, char[ ] buffer, int bufferIndex, int length);
[C++] public: __sealed __int64 GetChars(int ordinal, __int64 dataIndex, __wchar_t buffer __gc[ ], int bufferIndex, int length);
[VB] NotOverridable Public Function GetChars(ByVal ordinal As Integer, ByVal dataIndex As Long, ByVal buffers As Char, ByVal bufferIndex As Integer, ByVal length As Integer) As Long
[JScript] public function GetChars(ordinal: int, dataIndex: long, buffer: Char[ ], bufferIndex: int, length: int): long;
Description
Reads a stream of characters from the specified column offset into the buffer as an array starting at the given buffer offset.
Return Value: The actual number of characters read.
The actual number of characters read can be less than the requested length, if the end of the field is reached. If you pass a buffer that is null, System.Data.OleDb.OleDbDataReader.GetChars(System.Int32, System.Int64, System.Char[ ],System.Int32,System.Int32) returns the length of the field in characters. The zero-based column ordinal. The index within the row from which to begin the read operation. The buffer into which to copy data. The index for buffer to begin the read operation. The number of characters to read.
GetData
[C#] public OleDbDataReader GetData(int ordinal);
[C++] public: OleDbDataReader* GetData(int ordinal);
[VB] Public Function GetData(ByVal ordinal As Integer) As OleDbDataReader
[JScript] public function GetData(ordinal: int): OleDbDataReader;

Description
   Not currently supported. The zero-based column ordinal.
GetDataTypeName
[C#] public s tring GetDataTypeName(int index);
[C++] public: _sealed String* GetDataTypeName(int index);
[VB] NotOverridable Public Function GetDataTypeName (ByVal index As Integer) As String
[JScript] public function GetDataTypeName(index: int): String;
Description
   Gets the name of the source data type.
Return Value: The name of the back-end data type. The zero-based column ordinal.
GetDateTime
[C#] public DateTime GetDateTime(int ordinal);
[C++] public: _sealed DateTime GetDateTime(int ordinal);
[VB] NotOverridable Public Function GetDateTime(ByVal ordinal As Integer) As DateTime
[JScript] public function GetDateTime(ordinal: int): DateTime;
Description
   Gets the value of the specified column as a System.DateTime object.
Return Value: The value of the specified column.
   No conversions are performed, therefore the data retrieved must already be a System.DateTime object. The zero-based column ordinal.
GetDecimal
[C#] public decimal GetDecimal(int ordinal);
[C++] public: _sealed Decimal GetDecimal(int ordinal);
[VB] NotOverridable Public Function GetDecimal(ByVal ordinal As Integer) As Decimal
[JScript] public function GetDecimal(ordinal: int): Decimal;
Description
   Gets the value of the specified column as a System.Decimal object.
Return Value: The value of the specified column.
   No conversions are performed, therefore the data retrieved must already be a System.Decimal object. The zero-based column ordinal.
GetDouble
[C#] public double GetDouble(int ordinal);
[C++] public: _sealed double GetDouble(int ordinal);
[VB] NotOverridable Public Function GetDouble(ByVal ordinal As Integer) As Double
[JScript] public function GetDouble(ordinal: int): double;
Description
   Gets the value of the specified column as a double-precision floating point number.
Return Value: The value of the specified column.
   No conversions are performed, therefore the data retrieved must already be a double-precision floating point number. The zero-based column ordinal.
GetFieldType
[C#] public Type GetFieldType(int index);
[C++] public: _sealed Type* GetFieldType(int index);
[VB] NotOverridable Public Function GetFieldType(ByVal index As Integer) As Type
[JScript] public function GetFieldType(index: int): Type;
Description
   Gets the System.Type that is the data type of the object.
Return Value: The System.Type that is the data type of the object. The zero-based column ordinal.
GetFloat
[C#] public float GetFloat(int ordinal);
[C++] public: _sealed float GetFloat(int ordinal);
[VB] NotOverridable Public Function GetFloat(ByVal ordinal As Integer) As Single
[JScript] public function GetFloat(ordinal: int): float;
Description
   Gets the value of the specified column as a single-precision floating point number.
Return Value: The value of the specified column.
   No conversions are performed, therefore the data retrieved must already be a single-precision floating point number. The zero-based column ordinal.
GetGuid
[C#] public Guid GetGuid(int ordinal);
[C++] public: _sealed Guid GetGuid(int ordinal);
[VB] NotOverridable Public Function GetGuid(ByVal ordinal As Integer) As Guid
[JScript] public function GetGuid(ordinal: int): Guid;
Description
   Gets the value of the specified column as a globally-unique identifier (GUID).
Return Value: The value of the specified column.
   No conversions are performed, therefore the data retrieved must already be a globally-unique identifier. The zero-based column ordinal.
GetInt16
[C#] public short GetInt16 (int ordinal);
[C++] public: _sealed short GetInt16(int ordinal);
[VB] NotOverridable Public Function GetInt16(ByVal ordinal As Integer) As Short
[JScript] public function GetInt16(ordinal: int): Int16;
Description
   Gets the value of the specified column as a 16-bit signed integer.
Return Value: The value of the specified column.
   No conversions are performed, therefore the data retrieved must already be a 16-bit signed integer. The zero-based column ordinal.
GetInt32
[C#] public int GetInt32(int ordinal);
[C++] public: _sealed int GetInt32(int ordinal);
[VB] NotOverridable Public Function GetInt32(ByVal ordinal As Integer) As Integer
[JScript] public function GetInt32(ordinal: int): int;
Description
   Gets the value of the specified column as a 32-bit signed integer.
Return Value: The value of the specified column.
   No conversions are performed, therefore the data retrieved must already be a 32-bit signed integer. The zero-based column ordinal.
GetInt64
[C#] public long GetInt64(int ordinal);
[C++] public: _sealed _int64 GetInt64(int ordinal);
[VB] NotOverridable Public Function GetInt64(ByVal ordinal As Integer) As Long
[JScript] public function GetInt64(ordinal: int): long;
Description
   Gets the value of the specified column as a 64-bit signed integer.
Return Value: The value of the specified column.
   No conversions are performed, therefore the data retrieved must already be a 64-bit signed integer. The zero-based column ordinal.
GetName
[C#] public string GetName(int index);
[C++] public: _sealed String* GetName(int index);
[VB] NotOverridable Public Function GetName(ByVal index As Integer) As String

[JScript] public function GetName(index: int): String;
Description
  Gets the name of the specified column.
Return Value: The name of the specified column. The zero-based column ordinal.
  GetOrdinal
[C#] public int GetOrdinal(string name);
[C++] public: _sealed int GetOrdinal(String* name);
[VB] NotOverridable Public Function GetOrdinal(ByVal name As String) As Integer
[JScript] public function GetOrdinal(name: String): int;
Description
  Gets the column ordinal, given the name of the column.
Return Value: The zero-based column ordinal. The name of the column.
  GetSchemaTable
[C#] public DataTable GetSchemaTable( );
[C++] public: _sealed DataTable* GetSchemaTable( );
[VB] NotOverridable Public Function GetSchemaTable( ) As DataTable
[JScript] public function GetSchemaTable( ): DataTable;
Description
  Returns a System.Data.DataTable that describes the column metadata of the System.Data.OleDb.OleDbDataReader.
Return Value: A System.Data.DataTable that describes the column metadata.
  The System.Data.OleDb.OleDbDataReader. GetSchemaTable method maps to the OLE DB IColumns Rowset::GetColumnsRowset method, and returns metadata about each column in the following order: DataReader Column OLE DB Column ID Description ColumnName DBCOLUMN_NAME The name of the column; this might not be unique. If this cannot be determined, a null value is returned. This name always reflects the most recent renaming of the column in the current view or command text.
  GetString
[C#] public string GetString(int ordinal);
[C++] public: _sealed String* GetString(int ordinal);
[VB] NotOverridable Public Function GetString(ByVal ordinal As Integer) As String
[JScript] public function GetString(ordinal: int): String;
Description
  Gets the value of the specified column as a string.
Return Value: The value of the specified column.
  No conversions are performed, therefore the data retrieved must already be a string. The zero-based column ordinal.
  GetTimeSpan
[C#] public TimeSpan GetTimeSpan(int ordinal);
[C++] public: TimeSpan GetTimeSpan(int ordinal);
[VB] Public Function GetTimeSpan(ByVal ordinal As Integer) As TimeSpan
[JScript] public function GetTimeSpan(ordinal: int): TimeSpan;
Description
  Gets the value of the specified column as a System.TimeSpan object.
Return Value: The value of the specified column.
  No conversions are performed, therefore the data retrieved must already be a System.TimeSpan object. The zero-based column ordinal.
  GetValue
[C#] public object GetValue(int ordinal);
[C++] public: _sealed Object* GetValue(int ordinal);
[VB] NotOverridable Public Function GetValue(ByVal ordinal As Integer) As Object

[JScript] public function GetValue(ordinal: int): Object;
  Gets the value of the specified column in its native format.
Description
  Gets the value of the column at the specified ordinal in its native format.
Return Value: The value to return. The zero-based column ordinal.
  GetValues
[C#] public int GetValues(object[ ] values);
[C++] public: _sealed int GetValues(Object* values __gc[ ]);
[VB] NotOverridable Public Function GetValues(ByVal values( ) As Object) As Integer
[JScript] public function GetValues(values: Object[ ]): int;
Description
  Gets all the attribute columns in the current row.
Return Value: The number of instances of System.Object in the array.
  For most applications, the System.Data.OleDb.OleDbDataReader.GetValues (System.Object[ ]) method provides an efficient means for retrieving all columns, rather than retrieving each column individually. An array of System.Object into which to copy the attribute columns.
  IsDBNull
[C#] public bool IsDBNull(int ordinal);
[C++] public: _sealed bool IsDBNull(int ordinal);
[VB] NotOverridable Public Function IsDBNull(ByVal ordinal As Integer) As Boolean
[JScript] public function IsDBNull(ordinal: int): Boolean;
Description
  Gets a value indicating whether the column contains non-existant or missing values.
Return Value: true if the specified column value is equivalent to System.DBNull; otherwise, false. The zero-based column ordinal.
  NextResult
[C#] public bool NextResult( );
[C++] public: _sealed bool NextResult( );
[VB] NotOverridable Public Function NextResult( ) As Boolean
[JScript] public function NextResult( ): Boolean;
Description
  Advances the data reader to the next result, when reading the results of batch SQL statements.
Return Value: true if there are more rows; otherwise, false.
  Used to process multiple results, which can be generated by executing batch SQL statements.
  Read
[C#] public bool Read( );
[C++] public: _sealed bool Read( );
[VB] NotOverridable Public Function Read( ) As Boolean
[JScript] public function Read( ): Boolean;
Description
  Advances the System.Data.OleDb.OleDbDataReader to the next record.
Return Value: true if there are more rows; otherwise, false.
  The default position of the System.Data.OleDb.OleDbDataReader is prior to the first record. Therefore, you must call System.Data.OleDb.OleDbDataReader.Read to begin accessing any data.
  IEnumerable.GetEnumerator
[C#] Ienumerator IEnumerable.GetEnumerator( );
[C++] Enumerator* IEnumerable::GetEnumerator( );
[VB] Function GetEnumerator( ) As IEnumerator Implements IEnumerable.GetEnumerator
[JScript] function IEnumerable.GetEnumerator( ): IEnumerator;

IDataRecord.GetData
[C#] IDataReader IDataRecord.GetData(int ordinal);
[C++] IDataReader* IDataRecord::GetData(int ordinal);
[VB] Function GetData(ByVal ordinal As Integer) As IDataReader Implements IDataRecord.GetData
[JScript] function IDataRecord.GetData(ordinal: it): DataReader;
IDisposable.Dispose
[C#] void IDisposable.Dispose( );
[C++] void IDisposable::Dispose( );
[VB] Sub Dispose( ) Implements IDisposable.Dispose
[JScript] function IDisposable.Dispose( );
OleDbError class (System.Data.OleDb)
ToString
Description
Collects information relevant to a warning or error returned by the data source. This class cannot be inherited.
This class is created by the OleDb data adapter when an error occurs. An instance of System.Data.OleDb.OleDbError is created and managed by the System.Data.OleDb.OleDbErrorCollection class, which in turn is created by the System.Data.OleDb.OleDbException class.
Message
ToString
[C#] public string Message {get;}
[C++] public: _property String* get_Message( );
[VB] Public ReadOnly Property Message As String
[JScript] public function get Message( ): String;
Description
Gets a short description of the error.
NativeError
ToString
[C#] public int NativeError {get;}
[C++] public: _property int get_NativeError( );
[VB] Public ReadOnly Property NativeError As Integer
[JScript] public function get NativeError( ): int;.
Description
Gets the database-specific error information.
Source
ToString
[C#] public string Source {get;}
[C++] public: _property String* get_Source( );
[VB] Public ReadOnly Property Source As String
[JScript] public function get Source( ): String;
Description
Gets the name of the provider that generated the error.
SQLState
ToString
[C#] public string SQLState {get;}
[C++] public: _property String* get_SQLState( );
[VB] Public ReadOnly Property SQLState As String
[JScript] public function get SQLState( ): String;
Description
Gets the five-character error code following the ANSI SQL standard for the database.
ToString
[C#] public override string ToString( );
[C++] public: String* ToString( );
[VB] Overrides Public Function ToString( ) As String
[JScript] public override function ToString( ): String;
Description
Gets the complete text of the error message.
Return Value: The complete text of the error.
The string is in the form "OleDbError:", followed by the System.Data.OleDb.OleDbError.Message, and the stack trace. For example: OleDbError:UserId or Password not valid. The following example displays each System.Data.OleDb.OleDbError within the System.Data.OleDb.OleDbErrorCollection collection.
OleDbErrorCollection class (System.Data.OleDb)
ToString
Description
Collects all errors generated by the adapter. This class cannot be inherited.
This class is created by System.Data.OleDb.OleDbException to collect instances of the System.Data.OleDb. OleDbError class.
Count
ToString
[C#] public int Count {get;}
[C++] public: _property int get_Count( );
[VB] Public ReadOnly Property Count As Integer
[JScript] public function get Count( ): int;
Description
Gets the number of errors in the collection.
Item
ToString
[C#] public OleDbError this[int index] {get;}
[C++] public: _property OleDbError* get_Item(int index);
[VB] Public Default ReadOnly Property Item(ByVal index As Integer) As OleDbError
[JScript] returnValue=OleDbErrorCollectionObject.Item (index);
Description
Gets the error at the specified index.
The following example displays each System.Data.OleDb. OleDbError within the System.Data.OleDb.OleDbErrorCollection collection. The zero-based index of the error to retrieve.
CopyTo
[C#] public void CopyTo(Array array, int index);
[C++] public: _sealed void CopyTo(Array* array, int index);
[VB] NotOverridable Public Sub CopyTo(ByVal array As Array, ByVal index As Integer)
[JScript] public function CopyTo(array: Array, index: int);
Description
Copies the elements of the System.Data.OleDb.OleDbErrorCollection into an System.Array, starting at the given index within the System.Array. The System.Array into which to copy the elements. The starting index of the array.
GetEnumerator
[C#] public IEnumerator GetEnumerator( );
[C++] public: _sealed IEnumerator* GetEnumerator( );
[VB] NotOverridable Public Function GetEnumerator( ) As IEnumerator
[JScript] public function GetEnumerator( ): IEnumerator;
Description
OleDbException class (System.Data.OleDb)
ToString
Description
The exception that is thrown when a warning or error is returned by an OLE DB data source. This class cannot be inherited.
This class is created whenever the OleDb adapter encounters a situation that it cannot handle. It always contains at least one instance of System.Data.OleDb.OleDbError.
ErrorCode
ToString
[C#] public override int ErrorCode {get;}
[C++] public: _property virtual int get_ErrorCode( );
[VB] Overrides Public ReadOnly Property ErrorCode As Integer
[JScript] public function get ErrorCode( ): int;

Description
  Errors
  ToString
[C#] public OleDbErrorCollection Errors {get;}
[C++] public: _property OleDbErrorCollection* get_Errors( );
[VB] Public ReadOnly Property Errors As OleDbErrorCollection
[JScript] public function get Errors( ): OleDbErrorCollection;
Description
  Gets a collection of one or more System.Data.OleDb.OleDbError objects that give detailed information about exceptions generated by the OLE DB .NET Data Provider.
  The System.Data.OleDb.OleDbErrorCollection class always contains at least one instance of the System.Data.OleDb.OleDbError class.
  HelpLink
  HResult
  InnerException
  Message
  ToString
Description
  Gets the text describing the error.
  This is a wrapper for the System.Data.OleDb.OleDbError.Message property of the first System.Data.OleDb.OleDbError in the System.Data.OleDb.OleDbException.Errors collection property.
  Source
  ToString
[C#] public override string Source {get;}
[C++] public: _property virtual String* get_Source( );
[VB] Overrides Public ReadOnly Property Source As String
[JScript] public function get Source( ): String;
Description
  Gets the name of the provider that generated the error.
  This is a wrapper for the System.Data.OleDb.OleDbError.Source property of the first System.Data.OleDb.OleDbError in the System.Data.OleDb.OleDbException.Errors collection.
  StackTrace
  TargetSite
  ISerializable.GetObjectData
[C#] void ISerializable.GetObjectData(SerializationInfo si, StreamingContext context);
[C++] void ISerializable::GetObjectData(SerializationInfo* si, StreamingContext context);
[VB] Sub GetObjectData(ByVal si As SerializationInfo, ByVal context As StreamingContext) Implements ISerializable.GetObjectData
[JScript] function ISerializable.GetObjectData(si: SerializationInfo, context: StreamingContext);
  OleDbInfoMessageEventArgs class (System.Data.OleDb)
  ToString
Description
  Provides data for the System.Data.OleDb.OleDbConnection.InfoMessage event. This class cannot be inherited.
  The System.Data.OleDb.OleDbConnection.InfoMessage event contains an System.Data.OleDb.OleDbErrorCollection collection with warnings sent from the data source.
  ErrorCode
  ToString
[C#] public int ErrorCode {get;}
[C++] public: _property int get_ErrorCode( );
[VB] Public ReadOnly Property ErrorCode As Integer
[JScript] public function get ErrorCode( ): int;
Description
  Gets the HRESULT following the ANSI SQL standard for the database.
  This is a wrapper for the System.Data.OleDb.OleDbError.SQLState property of the first System.Data.OleDb.OleDbError in the System.Data.OleDb.OleDbInfoMessageEventArgs.Errors collection.
  Errors
  ToString
[C#] public OleDbErrorCollection Errors {get;}
[C++] public: _property OleDbErrorCollection* get_Errors( );
[VB] Public ReadOnly Property Errors As OleDbErrorCollection
[JScript] public function get Errors( ): OleDbErrorCollection;
Description
  Gets the collection of warnings sent from the data source.
  Message
  ToString
[C#] public string Message {get;}
[C++] public: _property String* get_Message( );
[VB] Public ReadOnly Property Message As String
[JScript] public function get Message( ): String;
Description
  Gets the full text of the error sent from the data source.
  This is a wrapper for the System.Data.OleDb.OleDbError.Message property of the first System.Data.OleDb.OleDbError in the System.Data.OleDb.OleDbInfoMessageEventArgs.Errors collection.
  Source
  ToString
[C#] public string Source {get;}
[C++] public: _property String* get_Source( );
[VB] Public ReadOnly Property Source As String
[JScript] public function get Source( ): String;
Description
  Gets the name of the object that generated the error.
  This is a wrapper for the System.Data.OleDb.OleDbError.Source property of the first System.Data.OleDb.OleDbError in the System.Data.OleDb.OleDbInfoMessageEventArgs.Errors collection.
  ToString
[C#] public override string ToString( );
[C++] public: String* ToString( );
[VB] Overrides Public Function ToString( ) As String
[JScript] public override function ToString( ): String;
Description
  Retrieves a string representation of the System.Data.OleDb.OleDbConnection.InfoMessage event.
  Return Value: A string representing the System.Data.OleDb.OleDbConnection.InfoMessage event.
  OleDbInfoMessageEventHandler delegate (System.Data.OleDb)
  ToString
Description
  Represents the method that will handle the System.Data.OleDb.OleDbConnection.InfoMessage event of an System.Data.OleDb.OleDbConnection. The source of the event. An System.Data.OleDb.OleDbInfoMessageEventArgs object that contains the event data.
  When you create an System.Data.OleDb.OleDbInfoMessageEventArgs delegate, you identify the method that will handle the event. To associate the event with your event handler, add an instance of the delegate to the event. The event handler is called whenever the event occurs, unless you remove the delegate. For more information about event handler delegates, see.

OleDbLiteral enumeration (System.Data.OleDb)
ToString
Description
  Returns information about literals used in text commands, data values, and database objects.
  The System.Data.OleDb.OleDbLiteral enumeration returns the following categories of literal information.
ToString
[C#] public const OleDbLiteral Binary_Literal;
[C++] public: const OleDbLiteral Binary_Literal;
[VB] Public Const Binary_Literal As OleDbLiteral
[JScript] public var Binary_Literal: OleDbLiteral;
Description
  A binary literal in a text command.
ToString
[C#] public const OleDbLiteral Catalog_Name;
[C++] public: const OleDbLiteral Catalog_Name;
[VB] Public Const Catalog_Name As OleDbLiteral
[JScript] public var Catalog_Name: OleDbLiteral;
Description
  A catalog name in a text command.
ToString
[C#] public const OleDbLiteral Catalog_Separator;
[C++] public: const OleDbLiteral Catalog_Separator;
[VB] Public Const Catalog_Separator As OleDbLiteral
[JScript] public var Catalog_Separator: OleDbLiteral;
Description
  The character that separates the catalog name from the rest of the identifier in a text command.
ToString
[C#] public const OleDbLiteral Char_Literal;
[C++] public: const OleDbLiteral Char_Literal;
[VB] Public Const Char_Literal As OleDbLiteral
[JScript] public var Char_Literal: OleDbLiteral;
Description
  A character literal in a text command.
ToString
[C#] public const OleDbLiteral Column_Alias;
[C++] public: const OleDbLiteral Column_Alias;
[VB] Public Const Column_Alias As OleDbLiteral
[JScript] public var Column_Alias: OleDbLiteral;
Description
  A column alias in a text command.
ToString
[C#] public const OleDbLiteral Column_Name;
[C++] public: const OleDbLiteral Column_Name;
[VB] Public Const Column_Name As OleDbLiteral
[JScript] public var Column_Name: OleDbLiteral;
Description
  A column name used in a text command or in a data-definition interface.
ToString
[C#] public const OleDbLiteral Correlation_Name;
[C++] public: const OleDbLiteral Correlation_Name;
[VB] Public Const Correlation_Name As OleDbLiteral
[JScript] public var Correlation_Name: OleDbLiteral;
Description
  A correlation name (table alias) in a text command.
ToString
[C#] public const OleDbLiteral Cube_Name;
[C++] public: const OleDbLiteral Cube_Name;
[VB] Public Const Cube_Name As OleDbLiteral
[JScript] public var Cube_Name: OleDbLiteral;
Description
  The name of a cube in a schema (or the catalog if the provider does not support schemas).

ToString
[C#] public const OleDbLiteral Cursor_Name;
[C++] public: const OleDbLiteral Cursor_Name;
[VB] Public Const Cursor_Name As OleDbLiteral
[JScript] public var Cursor_Name: OleDbLiteral;
Description
  A cursor name in a text command.
ToString
[C#] public const OleDbLiteral Dimension_Name;
[C++] public: const OleDbLiteral Dimension_Name;
[VB] Public Const Dimension_Name As OleDbLiteral
[JScript] public var Dimension_Name: OleDbLiteral;
Description
  The name of the dimension. If a dimension is part of more than one cube, there is one row for each cube/dimension combination.
ToString
[C#] public const OleDbLiteral Escape_Percent_Prefix;
[C++] public: const OleDbLiteral Escape_Percent_Prefix;
[VB] Public Const Escape_Percent_Prefix As OleDbLiteral
[JScript] public var Escape_Percent_Prefix: OleDbLiteral;
Description
  The character used in a LIKE clause to escape the character returned for the DBLITERAL_LIKE_PERCENT literal. For example, if a percent sign (%) is used to match zero or more characters and this is a backslash (\), the characters "abc\%%" match all character values that start with "abc%". Some SQL dialects support a clause (the ESCAPE clause) that can be used to override this value.
ToString
[C#] public const OleDbLiteral Escape_Percent_Suffix;
[C++] public: const OleDbLiteral Escape_Percent_Suffix;
[VB] Public Const Escape_Percent_Suffix As OleDbLiteral
[JScript] public var Escape_Percent_Suffix: OleDbLiteral;
Description
  The escape character, if any, used to suffix the character returned for the DBLITERAL_LIKE_PERCENT literal. For example, if a percent sign (%) is used to match zero or more characters and percent signs are escaped by enclosing in open and close square brackets, DBLITERAL_ESCAPE_PERCENT_PREFIX is "[", DBLITERAL_ESCAPE_PERCENT_SUFFIX is "]", and the characters "abc[%]%" match all character values that start with "abc%". Providers that do not use a suffix character to escape the DBLITERAL_ESCAPE_PERCENT character do not return this literal value and can set the It member of the DBLITERAL structure to DBLITERAL_INVALID if requested.
ToString
[C#] public const OleDbLiteral Escape_Underscore_Prefix;
[C++] public: const OleDbLiteral Escape_Underscore_Prefix;
[VB] Public Const Escape_Underscore_Prefix As OleDbLiteral
[JScript] public var Escape_Underscore_Prefix: OleDbLiteral;
Description
  The character used in a LIKE clause to escape the character returned for the DBLITERAL_LIKE_UNDERSCORE literal. For example, if an underscore (_) is used to match exactly one character and this is a backslash (\), the characters "abc\_ _ _ _" match all character values that are five characters long and start with "abc_". Some SQL dialects support a clause (the ESCAPE clause) that can be used to override this value.

ToString
[C#] public const OleDbLiteral Escape_Underscore_Suffix;
[C++] public: const OleDbLiteral Escape_Underscore_Suffix;
[VB] Public Const Escape_Underscore_Suffix As OleDbLiteral
[JScript] public var Escape_Underscore_Suffix: OleDbLiteral;
Description
The character used in a LIKE clause to escape the character returned for the DBLITERAL_LIKE_UNDERSCORE literal. For example, if an underscore (_) is used to match exactly one character and this is a backslash (\), the characters "abc\\_\_" match all character values that are five characters long and start with "abc_". Some SQL dialects support a clause (the ESCAPE clause) that can be used to override this value.
ToString
[C#] public const OleDbLiteral Hierarchy_Name;
[C++] public: const OleDbLiteral Hierarchy_Name;
[VB] Public Const Hierarchy_Name As OleDbLiteral
[JScript] public var Hierarchy_Name: OleDbLiteral;
Description
The name of the hierarchy. If the dimension does not contain a hierarchy or has only one hierarchy, the current column contains a null value.
ToString
[C#] public co.st OleDbLiteral Index_Name;
[C++] public: const OleDbLiteral Index_Name;
[VB] Public Const Index_Name As OleDbLiteral
[JScript] public var Index_Name: OleDbLiteral;
Description
An index name used in a text command or in a data-definition interface.
ToString
[C#] public const OleDbLiteral Invalid;
[C++] public: const OleDbLiteral Invalid;
[VB] Public Const Invalid As OleDbLiteral
[JScript] public var Invalid: OleDbLiteral;
Description
An invalid value.
ToString
[C#] public const OleDbLiteral Level_Name;
[C++] public: const OleDbLiteral Level_Name;
[VB] Public Const Level_Name As OleDbLiteral
[JScript] public var Level_Name: OleDbLiteral;
Description
Name of the cube to which the current level belongs.
ToString
[C#] public const OleDbLiteral Like_Percent;
[C++] public: const OleDbLiteral Like_Percent;
[VB] Public Const Like_Percent As OleDbLiteral
[JScript] public var Like_Percent: OleDbLiteral;
Description
The character used in a LIKE clause to match zero or more characters. For example, if this is a percent sign (%), the characters "abc %" match all character values that start with "abc".
ToString
[C#] public const OleDbLiteral Like_Underscore;
[C++] public: const OleDbLiteral Like_Underscore;
[VB] Public Const Like_Underscore As OleDbLiteral
[JScript] public var Like_Underscore: OleDbLiteral;
Description
The character used in a LIKE clause to match exactly one character. For example, if this is an underscore (_) the characters "abc_" match all character values that are four characters long and start with "abc".
ToString
[C#] public const OleDbLiteral Member_Name;
[C++] public: const OleDbLiteral Member_Name;
[VB] Public Const_Member Name As OleDbLiteral
[JScript] public var Member_Name: OleDbLiteral;
Description
The name of the member.
ToString
[C#] public const OleDbLiteral Procedure_Name;
[C++] public: const OleDbLiteral Procedure_Name;
[VB] Public Const Procedure_Name As OleDbLiteral
[JScript] public var Procedure_Name: OleDbLiteral;
Description
A procedure name in a text command.
ToString
[C#] public const OleDbLiteral Property_Name;
[C++] public: const OleDbLiteral Property_Name;
[VB] public const Property_Name As OleDbLiteral
[JScript] public var Property_Name: OleDbLiteral;
Description
The name of the property.
ToString
[C#] public const OleDbLiteral Quote_Prefix;
[C++] public: const OleDbLiteral Quote_Prefix;
[VB] Public Const Quote_Prefix As OleDbLiteral
[JScript] public var Quote_Prefix: OleDbLiteral;
Description
The character used in a text command as the opening quote for quoting identifiers that contain special characters.
ToString
[C#] public const OleDbLiteral Quote_Suffix;
[C++] public: const OleDbLiteral Quote_Suffix;
[VB] Public Const Quote_Suffix As OleDbLiteral
[JScript] public var Quote_Suffix: OleDbLiteral;
Description
The character used in a text command as the closing quote for quoting identifiers that contain special characters. 1.x providers that use the same character as the prefix and suffix may not return this literal value and can set the It member of the DBLITERAL structure to DBLITERAL_INVALID if requested.
ToString
[C#] public const OleDbLiteral Schema_Name;
[C++] public: const OleDbLiteral Schema_Name;
[VB] Public Const Schema_Name As OleDbLiteral
[JScript] public var Schema_Name: OleDbLiteral;
Description
A schema name in a text command.
ToString
[C#] public const OleDbLiteral Schema_Separator;
[C++] public: const OleDbLiteral Schema_Separator;
[VB] Public Const Schema_Separator As OleDbLiteral
[JScript] public var Schema_Separator: OleDbLiteral;
Description
The character that separates the schema name from the rest of the identifier in a text command.
ToString
[C#] public const OleDbLiteral Table_Name;
[C++] public: const OleDbLiteral Table_Name;
[VB] Public Const Table_Name As OleDbLiteral
[JScript] public var Table_Name: OleDbLiteral;
Description
A table name used in a text command or in a data-definition interface.

ToString
[C#] public const OleDbLiteral Text_Command;
[C++] public: const OleDbLiteral Text_Command;
[VB] Public Const Text_Command As OleDbLiteral
[JScript] public var Text_Command: OleDbLiteral;
Description
A text command, such as an SQL statement.
ToString
[C#] public const OleDbLiteral User_Name;
[C++] public: const OleDbLiteral User_Name;
[VB] Public Const User_Name As OleDbLiteral
[JScript] public var User_Name: OleDbLiteral;
Description
A user name in a text command.
ToString
[C#] public const OleDbLiteral View_Name;
[C++] public: const OleDbLiteral View_Name;
[VB] Public Const View_Name As OleDbLiteral
[JScript] public var View_Name: OleDbLiteral;
Description
A view name in a text command.
OleDbParameter class (System.Data.OleDb)
ToString
Description
Represents a parameter to an System.Data.OleDb.OleDb Command and optionally, its mapping to a System.Data.DataSet column.
Parameter names are not case sensitive.
OleDbParameter
Example Syntax:
ToString
[C#] public OleDbParameter( );
[C++] public: OleDbParameter( );
[VB] Public Sub New( )
[JScript] public function OleDbParameter( ); Initializes a new instance of the System.Data.OleDb.OleDbParameter class.
Description
Initializes a new instance of the System.Data.OleDb.OleDbParameter class.
OleDbParameter
Example Syntax:
ToString
[C#] public OleDbParameter(string name, object value);
[C++] public: OleDbParameter(String* name, Object* value);
[VB] Public Sub New(ByVal name As String, ByVal value As Object)
[JScript] public function OleDbParameter(name: String, value: Object);
Description
Initializes a new instance of the System.Data.OleDb.OleDbParameter class with the parameter name and an System.Data.OleDb.OleDbParameter object. The name of the parameter to map. An System.Data.OleDb.OleDbParameter object.
OleDbParameter
Example Syntax:
ToString
[C#] public OleDbParameter(string name, OleDbType dataType);
[C++] public: OleDbParameter(String* name, OleDbType dataType);
[VB] Public Sub New(ByVal name As String, ByVal dataType As OleDbType)
[JScript] public function OleDbParameter(name: String, dataType: OleDbType);
Description
Initializes a new instance of the System.Data.OleDb.OleDbParameter class with the parameter name and data type.
The data type, and if appropriate, System.Data.OleDb.OleDbParameter.Size and System.Data.OleDb.OleDbParameter.Precision are inferred from the value of the dataType parameter. The name of the parameter to map. One of the System.Data.OleDb.OleDbType values.
OleDbParameter
Example Syntax:
ToString
[C#] public OleDbParameter(string name, OleDbType dataType, int size);
[C++] public: OleDbParameter(String* name, OleDbType dataType, int size);
[VB] Public Sub New(ByVal name As String, ByVal dataType As OleDbType, ByVal size As Integer)
[JScript] public function OleDbParameter(name: String, dataType: OleDbType, size: int);
Description
Initializes a new instance of the System.Data.OleDb.OleDbParameter class with the parameter name, data type, and width.
The System.Data.OleDb.OleDbParameter.Size is inferred from the value of the dataType parameter if it is not explicity set in the size parameter. The name of the parameter to map. One of the System.Data.OleDb.OleDbType values. The width of the parameter.
OleDbParameter
Example Syntax:
ToString
[C#] public OleDbParameter(string name, OleDbType dataType, int size, string srcColumn);
[C++] public: OleDbParameter(String* name, OleDbType dataType, int size, String* srcColumn);
[VB] Public Sub New(ByVal name As String, ByVal dataType As OleDbType, ByVal size As Integer, ByVal srcColumn As String)
[JScript] public function OleDbParameter(name: String, dataType: OleDbType, size: int, srcColumn: String);
Description
Initializes a new instance of the System.Data.OleDb.OleDbParameter class with the parameter name, data type, width, and source column name.
The System.Data.OleDb.OleDbParameter.Size is inferred from the value of the dataType parameter if it is not explicitly set in the size parameter. The name of the parameter to map. One of the System.Data.OleDb.OleDbType values. The width of the parameter. The name of the source column.
OleDbParameter
Example Syntax:
ToString
[C#] public OleDbParameter(string parameterName, OleDbType dbType, int size, ParameterDirection direction, bool isNullable, byte precision, byte scale, string srcColumn, DataRowVersion srcVersion, object value);
[C++] public: OleDbParameter(String* parameterName, OleDbType dbType, int size, ParameterDirection direction, bool isNullable, unsigned char precision, unsigned char scale, String* srcColumn, DataRowVersion srcVersion, Object* value);
[VB] Public Sub New(ByVal parameterName As String, ByVal dbType As OleDbType, ByVal size As Integer, ByVal direction As ParameterDirection, ByVal isNullable As Boolean, ByVal precision As Byte, ByVal scale As Byte, ByVal srcColumn As String, ByVal srcVersion As DataRowVersion, ByVal value As Object)

[JScript] public function OleDbParameter(parameterName: String, db,Type: OleDbType, size: int, direction: ParameterDirection, isNullable: Boolean, precision: Byte, scale: Byte, srcColumn: String, srcVersion: DataRowVersion, value: Object);

Description

Initializes a new instance of the System.Data.OleDb.OleDbParameter class with the parameter name, data type, width, source column name, parameter direction, numeric precision, and other properties.

The System.Data.OleDb.OleDbParameter.Size and System.Data.OleDb.OleDbParameter.Precision are inferred from the value of the datatype parameter if they are not explicity set in the size and precision parameters. The name of the parameter. One of the System.Data.OleDb.OleDbType values. The width of the parameter. One of the System.Data.ParameterDirection values. true if the value of the field can be null; otherwise, false. The total number of digits to the left and right of the decimal point to which System.Data.OleDb.OleDbParameter.Value is resolved. The total number of decimal places to which System.Data.OleDb.OleDbParameter.Value is resolved. The name of the source column. One of the System.Data.DataRowVersion values. An System.Object that is the value of the System.Data.OleDb.OleDbParameter.

DbType
ToString

[C#] public DbType DbType {get; set;}
[C++] public: _property DbType get_DbType( );public: _property void set_DbType(DbType);
[VB] Public Property DbType As DbType
[JScript] public function get DbType( ): DbType;public function set DbType(DbType);

Description

Gets or sets the System.Data.DbType of the parameter.

The System.Data.OleDb.OleDbParameter.OleDbType and System.Data.OleDb.OleDbParameter.DbType are linked. Therefore, setting the System.Data.OleDb.OleDbParameter.DbType changes the System.Data.OleDb.OleDbParameter.OleDbType to a supporting System.Data.OleDb.OleDbParameter.OleDbType.

Direction
ToString

[C#] public ParameterDirection Direction {get; set;}
[C++] public: _property ParameterDirection get_Direction( );public: _property void set_Direction(ParameterDirection);
[VB] Public Property Direction As ParameterDirection
[JScript] public function get Direction( ): ParameterDirection;public function set Direction(ParameterDirection);

Description

Gets or sets a value indicating whether the parameter is input-only, output-only, bidirectional, or a stored procedure return value parameter.

If the System.Data.ParameterDirection is output, and execution of the associated System.Data.OleDb.OleDbCommand does not return a value, the System.Data.OleDb.OleDbParameter contains a null value.

IsNullable
ToString

[C#] public bool IsNullable {get; set;}
[C++] public: _property bool get_IsNullable( );public: _property void set_IsNullable(bool);
[VB] Public Property IsNullable As Boolean
[JScript] public function get IsNullable( ): Boolean;public function set IsNullable(Boolean);

Description

Gets or sets a value indicating whether the parameter accepts null values. Null values are handled using the System.DBNull class.

OleDbType
ToString

[C#] public OleDbType OleDbType {get; set;}
[C++] public: _property OleDbType get_OleDbType( ); public: _property void set_OleDbType(OleDbType);
[VB] Public Property OleDbType As OleDbType
[JScript] public function get OleDbType( ): OleDbType; public function set OleDbType(OleDbType);

Description

Gets or sets the System.Data.OleDb.OleDbType of the parameter.

The System.Data.OleDb.OleDbParameter.OleDbType and System.Data.OleDb.OleDbParameter.DbType are linked. Therefore, setting the System.Data.OleDb.OleDbParameter.DbType changes the System.Data.OleDb.OleDbParameter.OleDbType to a supporting System.Data.OleDb.OleDbType.

ParameterName
ToString

[C#] public string ParameterName {get; set;}
[C++] public: _property String* get_ParameterName( ); public: _property void set_ParameterName(String*);
[VB] Public Property ParameterName As String
[JScript] public function get ParameterName( ): String;public function set ParameterName(String);

Description

Gets or sets the name of the System.Data.OleDb.OleDbParameter.

The OLE DB .NET Provider uses positional parameters that are marked with a question mark (?) instead of named parameters.

Precision
ToString

[C#] public byte Precision {get; set;}
[C++] public: _property unsigned char get_Precision( ); public: _property void set_Precision(unsigned char);
[VB] Public Property Precision As Byte
[JScript] public function get Precision( ): Byte;public function set Precision(Byte);

Description

Gets or sets the maximum number of digits used to represent the System.Data.OleDb.OleDbParameter.Value property.

The System.Data.OleDb.OleDbParameter.Precision property is only used for decimal and numeric input parameters.

Scale
ToString

[C#] public byte Scale {get; set;}
[C++] public: _property unsigned char get_Scale( );public: _property void set_Scale(unsigned char);
[VB] Public Property Scale As Byte
[JScript] public function get Scale( ): Byte;public function set Scale(Byte);

Description

Gets or sets the number of decimal places to which System.Data.OleDb.OleDbParameter.Value is resolved.

The System.Data.OleDb.OleDbParameter.Scale property is only used for decimal and numeric input parameters.

Size
ToString

[C#] public int Size {get; set;}
[C++] public: _property int get_Size( );public: _property void set_Size(int);
[VB] Public Property Size As Integer

[JScript] public function get Size( ): int;public function set Size(int);
Description
Gets or sets the maximum size, in bytes, of the data within the column.
The System.Data.OleDb.OleDbParameter.Size property is used for binary and string types.
SourceColumn
ToString
[C#] public string SourceColumn {get; set;}
[C++] public: _property String* get_SourceColumn( ); public: _property void set_SourceColumn(String*);
[VB] Public Property SourceColumn As String
[JScript] public function get SourceColumn( ): String;public function set SourceColumn(String);
Description
Gets or sets the name of the source column mapped to the System.Data.DataSet and used for loading or returning the System.Data.OleDb.OleDbParameter.Value.
The link betwen the value of the System.Data.OleDb.OleDbParameter and the System.Data.DataTable may be bidirectional depending on the value of the System.Data.OleDb.OleDbParameter.Direction property.
SourceVersion
ToString
[C#] public DataRowVersion SourceVersion {get; set;}
[C++] public: _property DataRowVersion get_SourceVersion( );public: _property void set_SourceVersion(DataRowVersion);
[VB] Public Property SourceVersion As DataRowVersion
[JScript] public function get SourceVersion( ): DataRowVersion;public function set SourceVersion (DataRowVersion);
Description
Gets or sets the System.Data.DataRowVersion to use when loading System.Data.OleDb.OleDbParameter.Value.
Used by System.Data.OleDb.OleDbDataAdapter.UpdateCommand during an System.Data.Common.DbDataAdapter.Update (System.Data.DataSet) operation to determine whether the parameter value is set to Current or Original. This allows primary keys to be updated. This property is ignored by System.Data.OleDb.OleDbDataAdapter.InsertCommand and System.Data.OleDb.OleDbDataAdapter.DeleteCommand. This property is set to the version of the System.Data.DataRow used by the System.Data.DataRow.Item(System.Int32) property, or the System.Data.DataRow.GetChildRows(System.String) method of the System.Data.DataRow object.
Value
ToString
[C#] public object Value {get; set;}
[C++] public: _property Object* get_Value( );public: _property void set_Value(Object*);
[VB] Public Property Value As Object
[JScript] public function get Value( ): Object;public function set Value(Object);
Description
Gets or sets the value of the parameter.
For input parameters, the value is bound to the System.Data.OleDb.OleDbCommand that is sent to the server. For output and return value parameters, the value is set on completion of the System.Data.OleDb.OleDbCommand and after the System.Data.OleDb.OleDbDataReader is closed.
ICloneable.Clone
[C#] object ICloneable.Clone( );
[C++] Object* ICloneable::Clone( );
[VB] Function Clone( ) As Object Implements ICloneable.Clone
[JScript] function ICloneable.Clone( ): Object;
ToString
[C#] public override string ToString( );
[C++] public: String* ToString( );
[VB] Overrides Public Function ToString( ) As String
[JScript] public override function ToString( ): String;
Description
Gets a string containing the System.Data.OleDb.OleDbParameter.ParameterName.
Return Value: A string containing the System.Data.OleDb.OleDbParameter.ParameterName.
OleDbParameterCollection class (System.Data.OleDb)
ToString
Description
Collects all parameters relevant to an System.Data.OleDb. OleDbCommand and their respective mappings to System.Data.DataSet columns.
The number of parameters in the collection must be equal to the number of parameter placeholders within the command text, or the OLE DB .NET Data Provider may raise an error.
Count
ToString
[C#] public int Count {get;}
[C++] public: _property int get_Count( );
[VB] Public ReadOnly Property Count As Integer
[JScript] public function get Count( ): int;
Description
Gets the number of System.Data.OleDb.OleDbParameter objects in the collection.
Item
ToString
[C#] public OleDbParameter this[int index] {get; set;}
[C++] public: _property OleDbParameter* get_Item(int index);public: _property void set_Item(int index, OleDbParameter*);
[VB] Public Default Property Item(ByVal index As Integer) As OleDibParameter
[JScript] return Value= OleDbParameterCollectionObject.Item(index); OleDbParameterCollectionObject.Item(index)=return 2283 value; Gets or sets the System.Data.OleDb.OleDbParameter with a specified attribute.
Description
Gets or sets the System.Data.OleDb.OleDbParameter at the specified index. The zero-based index of the parameter to retrieve.
Item
ToString
[C#] public OleDbParameter this[string parameterName] {get; set;}
[C++] public: _property OleDbParameter* get_Item (String* parameterName);public: _property void set_Item(String* parameterName, OleDbParameter*);
[VB] Public Default Property Item(ByVal parameterName As String) As OleDbParameter
[JScript] return Value= OleDbParameterCollectionObject.Item(parameterName); OleDbParameterCollectionObject.Item (parameterName)=return Value;
Description
Gets or sets the System.Data.OleDb.OleDbParameter with the specified name. The name of the parameter to retrieve.

Add
[C#] public int Add(object value);
[C++] public: _sealed int Add(Object* value);
[VB] NotOverridable Public Function Add(ByVal value As Object) As Integer
[JScript] public function Add(value: Object): int; Adds an System.Data.OleDb.OleDbParameter to the System.Data.OleDb.OleDbCommand.
Description
  Adds an System.Data.OleDb.OleDbParameter object to the System.Data.OleDb.OleDbCommand.
Return Value: A reference to the new System.Data.OleDb.OleDbParameter object. The System.Data.OleDb.OleDbParameter object to add to the collection.
Add
[C#] public OleDbParameter Add(OleDbParameter value);
[C++] public: OleDbParameter* Add(OleDbParameter* value);
[VB] Public Function Add(ByVal value As OleDbParameter) As OleDbParameter
[JScript] public function Add(value: OleDbParameter): OleDbParameter;
Description
  Adds the specified System.Data.OleDb.OleDbParameter to the System.Data.OleDb.OleDbCommand.
Return Value: A reference to the new System.Data.OleDb.OleDbParameter object. The System.Data.OleDb.OleDbParameter to add to the collection.
Add
[C#] public OleDbParameter Add(string parameterName, object value);
[C++] public: OleDbParameter* Add(String* parameterName, Object* value);
[VB] Public Function Add(ByVal parameterName As String, ByVal value As Object) As OleDbParameter
[JScript] public function Add(parameterName: String, value: Object): OleDbParameter;
Description
  Adds an System.Data.OleDb.OleDbParameter to the System.Data.OleDb.OleDbCommand given the parameter name and value.
Return Value: A reference to the new System.Data.OleDb.OleDbParameter object.
  When you specify System.DBNull.Value in the value parameter, you should also explicitly set the System.Data.OleDb.OleDbType as demonstrated in this C# example: OleDbCommand rComm=new OleDbCommand(null, rConn); rComm.CommandText="insert into mytable values (?)"; rComm.Parameters.Add("@p1", DBNull.Value); rComm.Parameters["@p1"].OleDbType= OleDbType.Integer;x The System.Data.OleDb.OleDbParameter.Value of the System.Data.OleDb.OleDbParameter to add to the collection.
Add
[C#] public OleDbParameter Add(string parameterName, OleDbType oleDbType);
[C++] public: OleDbParameter* Add(String* parameterName, OleDbType oleDbType);
[VB] Public Function Add(ByVal parameterName As String, ByVal oleDbType As OleDbType) As OleDbParameter
[JScript] public function Add(parameterName: String, oleDbType: OleDbType): OleDbParameter;
Description
  Adds an System.Data.OleDb.OleDbParameter to the System.Data.OleDb.OleDbCommand given the parameter name and data type.
Return Value: A reference to the new System.Data.OleDb.OleDbParameter object.

Add
[C#] public OleDbParameter Add(string parameterName, OleDbType oleDbType, int size);
[C++] public: OleDbParameter* Add(String* parameterName, OleDbType oleDbType, int size);
[VB] Public Function Add(ByVal parameterName As String, ByVal oleDbType As OleDbType, ByVal size As Integer) As OleDbParameter
[JScript] public function Add(parameterName: String, oleDbType: OleDbType, size: int): OleDbParameter;
Description
  Adds an System.Data.OleDb.OleDbParameter to the System.Data.OleDb.OleDbCommand given the the parameter name, data type, and column width.
Return Value: A reference to the new System.Data.OleDb.OleDbParameter object. The width of the column.
Add
[C#] public OleDbParameter Add(string parameterName, OleDbType oleDbType, int size, string sourceColumn);
[C++] public: OleDbParameter* Add(String* parameterName, OleDbType oleDbType, int size, String* sourceColumn);
[VB] Public Function Add(ByVal parameterName As String, ByVal oleDbType As OleDbType, ByVal size As Integer, ByVal sourceColumn As String) As OleDbParameter
[JScript] public function Add(parameterName: String, oleDbType: OleDbType, size: int, sourceColumn: String): OleDbParameter;
Description
  Adds an System.Data.OleDb.OleDbParameter to the System.Data.OleDb.OleDbCommand given the parameter name, data type, column width, and source column name.
Return Value: A reference to the new System.Data.OleDb.OleDbParameter object. The width of the column. The name of the source column.
Clear
[C#] public void Clear( );
[C++] public: _sealed void Clear( );
[VB] NotOverridable Public Sub Clear( )
[JScript] public function Clear( );
Description
  Removes all items from the collection.
Contains
[C#] public bool Contains(object value);
[C++] public: _sealed bool Contains(Object* value);
[VB] NotOverridable Public Function Contains(ByVal value As Object) As Boolean
[JScript] public function Contains(value: Object): Boolean;
Description
  Gets a value indicating whether an System.Data.OleDb.OleDbParameter object exists in the collection.
Return Value: true if the collection contains the System.Data.OleDb.OleDbParameter; otherwise, false. The value of the System.Data.OleDb.OleDbParameter object to find.
Contains
[C#] public bool Contains(string value);
[C++] public: _sealed bool Contains(String* value);
[VB] NotOverridable Public Function Contains(ByVal value As String) As Boolean
[JScript] public function Contains(value: String): Boolean;
  Indicates whether an System.Data.OleDb.OleDbParameter exists in the collection.
Description
  Gets a value indicating whether an System.Data.OleDb.OleDbParameter with the specified parameter name exists in the collection.
Return Value: true if the collection contains the parameter; otherwise, false. The name of the parameter.

CopyTo
[C#] public void CopyTo(Array array, int index);
[C++] public: _sealed void CopyTo(Array* array, int index);
[VB] NotOverridable Public Sub CopyTo(ByVal array As Array, ByVal index As Integer)
[JScript] public function CopyTo(array: Array, index: int);
Description
Copies System.Data.OleDb.OleDbParameter objects from the System.Data.OleDb.OleDbParameterCollection to the specified array. The System.Array into which to copy the System.Data.OleDb.OleDbParameter objects. The starting index of the array.
GetEnumerator
[C#] public IEnumerator GetEnumerator( );
[C++] public: _sealed IEnumerator* GetEnumerator( );
[VB] NotOverridable Public Function GetEnumerator( ) As IEnumerator
[JScript] public function GetEnumerator( ): IEnumerator;
Description
IndexOf
[C#] public int IndexOf(object value);
[C++] public: _sealed int IndexOf(Object* value);
[VB] NotOverridable Public Function IndexOf(ByVal value As Object) As Integer
[JScript] public function IndexOf(value: Object): int;
Description
Gets the location of the System.Data.OleDb.OleDbParameter object in the collection.
Return Value: The location of the System.Data.OleDb.OleDbParameter in the collection. The System.Data.OleDb.OleDbParameter object to locate.
IndexOf
[C#] public int IndexOf(string parameterName);
[C++] public: _sealed int IndexOf(String* parameterName);
[VB] NotOverridable Public Function IndexOf(ByVal parameterName As String) As Integer
[JScript] public function IndexOf(parameterName: String): int; Gets the location of the System.Data.OleDb.OleDbParameter in the collection.
Description
Gets the location of the System.Data.OleDb.OleDbParameter in the collection with the specified parameter name.
Return Value: The location of the System.Data.OleDb. OleDbParameter in the collection.
Insert
[C#] public void Insert(int index, object value);
[C++] public: _sealed void Insert(int index, Object* value);
[VB] NotOverridable Public Sub Insert(ByVal index As Integer, ByVal value As Object)
[JScript] public function Insert(index: int, value: Object);
Description
Inserts an System.Data.OleDb.OleDbParameter in the collection at the specified index. The zero-based index where the parameter is to be inserted within the collection. The System.Data.OleDb.OleDbParameter to add to the collection.
Remove
[C#] public void Remove(object value);
[C++] public: _sealed void Remove(Object* value);
[VB] NotOverridable Public Sub Remove(ByVal value As Object)
[JScript] public function Remove(value: Object);
Description
Removes the specified System.Data.OleDb.OleDbParameter from the collection. The System.Data.OleDb.OleDbParameter object to remove from the collection.

RemoveAt
[C#] public void RemoveAt(int index);
[C++] public: _sealed void RemoveAt(int index);
[VB] NotOverridable Public Sub RemoveAt(ByVal index As Integer)
[JScript] public function RemoveAt(index: int); Removes the specified System.Data.OleDb.OleDbParameter from the collection.
Description
Removes the System.Data.OleDb.OleDbParameter at the specified index from the collection. The zero-based index of the parameter to remove.
RemoveAt
[C#] public void RemoveAt(string parameterName);
[C++] public: _sealed void RemoveAt(String* parameterName);
[VB] NotOverridable Public Sub RemoveAt(ByVal parameterName As String)
[JScript] public function RemoveAt(parameterName: String);
Description
Removes the System.Data.OleDb.OleDbParameter with the specified name from the collection.
OleDbPermission class (System.Data.OleDb)
ToString
Description
Provides the capability for the OLE DB .NET Data Provider to ensure that a user has a security level adequate to access an OLE DB data source.
OleDbPermission
Example Syntax:
ToString
[C#] public OleDbPermission( );
[C++] public: OleDbPermission( );
[VB] Public Sub New( )
[JScript] public function OleDbPermission( ); Initializes a new instance of the System.Data.OleDb.OleDbPermission class.
Description
Initializes a new instance of the System.Data.OleDb.OleDbPermission class.
OleDbPermission
Example Syntax:
ToString
[C#] public OleDbPermission(PermissionState state);
[C++] public: OleDbPermission(PermissionState state);
[VB] Public Sub New(ByVal state As PermissionState)
[JScript] public function OleDbPermission(state: PermissionState);
Description
One of the System.Security.Permissions.PermissionState values.
OleDbPermission
Example Syntax:
ToString
[C#] public OleDbPermission(PermissionState state, bool allowBlankPassword);
[C++] public: OleDbPermission(PermissionState state, bool allowBlankPassword);
[VB] Public Sub New(ByVal state As PermissionState, ByVal allowBlankPassword As Boolean)
[JScript] public function OleDbPermission(state: PermissionState, allowBlankPassword: Boolean);
Description
One of the System.Security.Permissions.PermissionState values. Indicates whether a blank password is allowed.

AllowBlankPassword
Provider
ToString
Description
Gets or sets a comma-delimited list of providers allowed by the security policy.
Copy
[C#] public override IPermission Copy( );
[C++] public: IPermission* Copy( );
[VB] Overrides Public Function Copy( ) As IPermission
[JScript] public override function Copy( ): IPermission;
Description
FromXml
[C#] public override void FromXml(SecurityElement securityElement);
[C++] public: void FromXml(SecurityElement* securityElement);
[VB] Overrides Public Sub FromXml(ByVal securityElement As SecurityElement)
[JScript] public override function FromXml (securityElement: SecurityElement);
Description
Intersect
[C#] public override IPermission Intersect(IPermission target);
[C++] public: IPermission* Intersect(IPermission* target);
[VB] Overrides Public Function Intersect(ByVal target As IPermission) As IPermission
[JScript] public override function Intersect(target: IPermission): IPermission;
Description
IsSubsetOf
[C#] public override bool IsSubsetOf(IPermission target);
[C++] public: bool IsSubsetOf(IPermission* target);
[VB] Overrides Public Function IsSubsetOf(ByVal target As IPermission) As Boolean
[JScript] public override function IsSubsetOf(target: IPermission): Boolean;
Description
ToXml
[C#] public override SecurityElement ToXml( );
[C++] public: SecurityElement* ToXml( );
[VB] Overrides Public Function ToXml( ) As SecurityElement
[JScript] public override function ToXml( ): SecurityElement;
Description
Union
[C#] public override IPermission Union(IPermission target);
[C++] public: IPermission* Union(IPermission* target);
[VB] Overrides Public Function Union(ByVal target As IPermission) As IPermission
[JScript] public override function Union(target: IPermission): IPermission;
Description
OleDbPermissionAttribute class (System.Data.OleDb)
Union
Description
Associates a security action with a custom security attribute.
OleDbPermissionAttribute
Example Syntax:
Union
[C#] public OleDbPermissionAttribute(SecurityAction action);
[C++] public: OleDbPermissionAttribute(SecurityAction action);
[VB] Public Sub New(ByVal action As SecurityAction)
[JScript] public function OleDbPermissionAttribute(action: SecurityAction);
Description
Initializes a new instance of the System.Data.OleDb.OleDbPermissionAttribute class.
Return Value: An System.Data.OleDb.OleDbPermissionAttribute object. One of the the System.Security.Permissions.SecurityAction values representing an action that can be performed using declarative security.
Action
AllowBlankPassword
Provider
Union
Description
Gets or sets a comma-delimited string containing a list of supported providers.
TypeId
Unrestricted
CreatePermission
[C#] public override IPermission CreatePermission( );
[C++] public: IPermission* CreatePermission( );
[VB] Overrides Public Function CreatePermission( ) As IPermission
[JScript] public override function CreatePermission( ): IPermission;
Description
Returns an System.Data.OleDb.OleDbPermission object that is configured according to the attribute properties.
Return Value: An System.Data.OleDb.OleDbPermission object.
OleDbRowUpdatedEventArgs class (System.Data.OleDb)
ToString
Description
Provides data for the System.Data.OleDb.OleDbDataAdapter.RowUpdated event.
The System.Data.OleDb.OleDbDataAdapter.RowUpdated event is raised when an System.Data.Common.DbDataAdapter.Update (System.Data.DataSet) to a row is completed.
OleDbRowUpdatedEventArgs
Example Syntax:
ToString
[C#] public OleDbRowUpdatedEventArgs(DataRow dataRow, IDbCommand command, StatementType statementType, DataTableMapping tableMapping);
[C++] public: OleDbRowUpdatedEventArgs(DataRow* dataRow, IDbCommand* command, StatementType statementType, DataTableMapping* tableMapping);
[VB] Public Sub New(ByVal dataRow As DataRow, ByVal command As IDbCommand, ByVal statementType As StatementType, ByVal tableMapping As DataTableMapping)
[JScript] public function OleDbRowUpdatedEventArgs (dataRow: DataRow, command: IDbCommand, statementType: StatementType, tableMapping: DataTableMapping);
Description
Initializes a new instance of the System.Data.OleDb.OleDbRowUpdatedEventArgs class. The System.Data.DataRow sent through an System.Data.Common.DbDataAdapter.Update (System.Data.DataSet). The System.Data.IDbCommand executed when System.Data.Common.DbDataAdapter.Update (System.Data.DataSet) is called. One of the System.Data.StatementType values that specifies the type of query executed. The System.Data.Common.DataTableMapping sent through an System.Data.Common.DbDataAdapter.Update (System.Data.DataSet).
    Command
    ToString
[C#] public new OleDbCommand Command {get;}
[C++] public: _property OleDbCommand* get_Command( );
[VB] Public ReadOnly Property Command As OleDbCommand
[JScript] public function get Command( ): OleDbCommand;
Description
    Gets the System.Data.OleDb.OleDbCommand executed when System.Data.Common.DbDataAdapter.Update (System.Data.DataSet) is called.
    Errors
    RecordsAffected
    Row
    StatementType
    Status
    TableMapping
    OleDbRowUpdatedEventHandler delegate (System.Data.OleDb)
    ToString
Description
    Represents the method that will handle the System.Data.OleDb.OleDbDataAdapter.RowUpdated event of an System.Data.OleDb.OleDbDataAdapter. The source of the event. The System.Data.OleDb.OleDbRowUpdatedEventArgs that contains the event data.
    The handler is not required perform any action, and your code should avoid generating exceptions or allowing exceptions to propagate to the calling method. Any exceptions that do reach the caller are ignored.
    OleDbRowUpdatingEventArgs class (System.Data.OleDb)
    ToString
Description
    Provides data for the System.Data.OleDb.OleDbDataAdapter.RowUpdating event.
    The System.Data.OleDb.OleDbDataAdapter.RowUpdating event is raised before an System.Data.Common.DbDataAdapter.Update (System.Data.DataSet) to a row.
    OleDbRowUpdatingEventArgs
    Example Syntax:
    ToString
[C#] public OleDbRowUpdatingEventArgs(DataRow dataRow, IDbCommand command, StatementType statementType, DataTableMapping tableMapping);
[C++] public: OleDbRowUpdatingEventArgs(DataRow* dataRow, IDbCommand* command, StatementType statementType, DataTableMapping* tableMapping);
[VB] Public Sub New(ByVal dataRow As DataRow, ByVal command As IDbCommand, ByVal statementType As StatementType, ByVal tableMapping As DataTableMapping)
[JScript] public function OleDbRowUpdatingEventArgs (dataRow: DataRow, command: IDbCommand, statementType: StatementType, tableMapping: DataTableMapping);
Description
    Initializes a new instance of the System.Data.OleDb.OleDbRowUpdatingEventArgs class. The System.Data.DataRow to System.Data.Common.DbDataAdapter.Update (System.Data.DataSet). The System.Data.IDbCommand to execute during System.Data.Common.DbDataAdapter.Update(System.Data.DataSet). One of the System.Data.StatementType values that specifies the type of query executed. The System.Data.Common.DataTableMapping sent through an System.Data.Common.DbDataAdapter.Update (System.Data.DataSet).
    Command
    ToString
[C#] public new OleDbCommand Command {get; set;}
[C++] public: _property OleDbCommand* get_Command( );public: _property void set_Command (OleDbCommand*);
[VB] Public Property Command As OleDbCommand
[JScript] public function get Command( ): OleDbCommand; public function set Command(OleDbCommand);
Description
    Gets or sets the System.Data.OleDb.OleDbCommand to execute when performing the System.Data.Common.DbDataAdapter.Update (System.Data.DataSet).
    Errors
    Row
    StatementType
    Status
    TableMapping
    OleDbRowUpdatingEventHandler delegate (System.Data.OleDb)
    ToString
Description
    Represents the method that will handle the System.Data.OleDb.OleDbDataAdapter.RowUpdating event of an System.Data.OleDb.OleDbDataAdapter. The source of the event. The System.Data.OleDb.OleDbRowUpdatingEventArgs that contains the event data.
    The handler is not required perform any action, and your code should avoid generating exceptions or allowing exceptions to propagate to the calling method. Any exceptions that do reach the caller are ignored.
    OleDbSchemaGuid class (System.Data.OleDb)
    ToString
Description
    Returns the type of schema table specified by the System.Data.OleDb.OleDbConnection.GetOleDbSchemaTable(System.Guid, System.Object[ ]) method.
    Each field in the System.Data.OleDb.OleDbSchemaGuid class maps to an OLE DB schema rowset. For more information, see Appendix B: Schema rowsets in the OLE DB ProgrammerâC™s Reference.
    ToString
[C#] public static readonly Guid Assertions;
[C++] public: static Guid Assertions;
[VB] Public Shared ReadOnly Assertions As Guid
[JScript] public static var Assertions: Guid;
Description
    Returns the assertions defined in the catalog that are owned by a given user.
    System.Data.OleDb.OleDbSchemaGuid.Assertions maps to the OLE DB ASSERTIONS rowset. Unless otherwise specified, restriction columns are returned in the following order.
    ToString
[C#] public static readonly Guid Catalogs;
[C++] public: static Guid Catalogs;
[VB] Public Shared ReadOnly Catalogs As Guid
[JScript] public static var Catalogs: Guid;

Description

Returns the physical attributes associated with catalogs accessible from the data source. Returns the assertions defined in the catalog that are owned by a given user.

System.Data.OleDb.OleDbSchemaGuid.Catalogs maps to the OLE DB CATALOGS rowset. Unless otherwise specified, restriction columns are returned in the following order.

ToString
[C#] public static readonly Guid Character_Sets;
[C++] public: static Guid Character_Sets;
[VB] Public Shared ReadOnly Character_Sets As Guid
[JScript] public static var Character_Sets: Guid;
Description Returns the character sets defined in the catalog that are accessible to a given user.

System.Data.OleDb.OleDbSchemaGuid.Character_Sets maps to the OLE DB CHARACTER_SETS rowset. Unless otherwise specified, restriction columns are returned in the following order.

ToString
[C#] public static readonly Guid Check_Constraints;
[C++] public: static Guid Check_Constraints;
[VB] Public Shared ReadOnly Check_Constraints As Guid
[JScript] public static var Check_Constraints: Guid;
Description Returns the check constraints defined in the catalog that are owned by a given user.

System.Data.OleDb.OleDbSchemaGuid.Check_Constraints maps to the OLE DB CHECK_CONSTRAINTS rowset. Unless otherwise specified, restriction columns are returned in the following order.

ToString
[C#] public static readonly Guid Check_Constraints_By_Table;
[C++] public: static Guid Check_Constraints_By_Table;
[VB] Public Shared ReadOnly Check_Constraints_By_Table As Guid
[JScript] public static var Check_Constraints_By_Table: Guid;
Description Returns the check constraints defined in the catalog that are owned by a given user.

System.Data.OleDb.OleDbSchemaGuid.Check_Constraints maps to the OLE DB CHECK_CONSTRAINTS rowset. Unless otherwise specified, restriction columns are returned in the following order.

ToString
[C#] public static readonly Guid Collations;
[C++] public: static Guid Collations;
[VB] Public Shared ReadOnly Collations As Guid
[JScript] public static var Collations: Guid;
Description Returns the character collations defined in the catalog that are accessible to a given user.

System.Data.OleDb.OleDbSchemaGuid.Collations maps to the OLE DB COLLATIONS rowset. Unless otherwise specified, restriction columns are returned in the following order.

ToString
[C#] public static readonly Guid Column_Domain_Usage;
[C++] public: static Guid Column_Domain_Usage;
[VB] Public Shared ReadOnly Column_Domain_Usage As Guid
[JScript] public static var Column_Domain_Usage: Guid;
Description Returns the columns defined in the catalog that are dependent on a domain defined in the catalog and owned by a given user.

System.Data.OleDb.OleDbSchemaGuid.Column_Domain_Usage maps to the OLE DB COLUMN_DOMAIN_USAGE rowset. Unless otherwise specified, restriction columns are returned in the following order.

ToString
[C#] public static readonly Guid Column_Privileges;
[C++] public: static Guid Column_Privileges;
[VB] Public Shared ReadOnly Column_Privileges As Guid
[JScript] public static var Column_Privileges: Guid;
Description Returns the privileges on columns of tables defined in the catalog that are available to, or granted by, a given user.

System.Data.OleDb.OleDbSchemaGuid.Column_Privileges maps to the OLE DB COLUMN_PRIVELEGES rowset. Unless otherwise specified, restriction columns are returned in the following order.

ToString
[C#] public static readonly Guid Columns;
[C++] public: static Guid Columns;
[VB] Public Shared ReadOnly Columns As Guid
[JScript] public static var Columns: Guid;
Description Returns the columns of tables (including views) defined in the catalog that are accessible to a given user.

System.Data.OleDb.OleDbSchemaGuid.Columns maps to the OLE DB COLUMNS rowset. Unless otherwise specified, restriction columns are returned in the following order.

ToString
[C#] public static readonly Guid Constraint_Columnn_Usage;
[C++] public: static Guid Constraint_Column_Usage;
[VB] Public Shared ReadOnly Constraint_Column_Usage As Guid
[JScript] public static var Constraint_Column_Usage: Guid;
Description Returns the columns used by referential constraints, unique constraints, check constraints, and assertions, defined in the catalog and owned by a given user.

System.Data.OleDb.OleDbSchemaGuid.Constraint_Column_Usage maps to the OLE DB CONSRAINT_COLUMN_USAGE rowset. Unless otherwise specified, restriction columns are returned in the following order.

ToString
[C#] public static readonly Guid Constraint_Table_Usage;
[C++] public: static Guid Constraint_Table_Usage;
[VB] Public Shared ReadOnly Constraint_Table_Usage As Guid
[JScript] public static var Constraint_Table_Usage: Guid;
Description Returns the tables that are used by referential constraints, unique constraints, check constraints, and assertions defined in the catalog and owned by a given user.

System.Data.OleDb.OleDbSchemaGuid.Constraint_Table_Usage maps to the OLE DB CONSRAINT_TABLE_USAGE rowset. Unless otherwise specified, restriction columns are returned in the following order.

ToString
[C#] public static readonly Guid DbInfoLiterals;
[C++] public: static Guid DbInfoLiterals;
[VB] Public Shared ReadOnly DbInfoLiterals As Guid
[JScript] public static var DbInfoLiterals: Guid;
Description Returns a list of provider-specific literals used in text commands.

Using System.Data.OleDb.OleDbSchemaGuid. DbInfoLiterals is equivalent to calling the OLE DB IDBInfo::GetLiteralInfo interface, or the ADO Connection-.OpenSchema method with the adSchemaDBInfoLiterals constant.

ToString
[C#] public static readonly Guid Foreign_Keys;
[C++] public: static Guid Foreign_Keys;
[VB] Public Shared ReadOnly Foreign_Keys As Guid
[JScript] public static var Foreign_Keys: Guid;
Description
Returns the foreign key columns defined in the catalog by a given user.
System.Data.OleDb.OleDbSchemaGuid.Foreign_Keys maps to the OLE DB FOREIGN_KEYS rowset. Unless otherwise specified, restriction columns are returned in the following order.

ToString
[C#] public static readonly Guid Indexes;
[C++] public: static Guid Indexes;
[VB] Public Shared ReadOnly Indexes As Guid
[JScript] public static var Indexes: Guid;
Description
Returns the indexes defined in the catalog that are owned by a given user.
System.Data.OleDb.OleDbSchemaGuid.Indexes maps to the OLE DB INDEXES rowset. Unless otherwise specified, restriction columns are returned in the following order.

ToString
[C#] public static readonly Guid Key_Column_Usage;
[C++] public: static Guid Key_Columnn_Usage;
[VB] Public Shared ReadOnly Key_Column_Usage As Guid
[JScript] public static var Key_Columnm_Usage: Guid;
Description
Returns the columns defined in the catalog that are constrained as keys by a given user.
System.Data.OleDb.OleDbSchemaGuid.Key_Column_Usage maps to the OLE DB KEY_COLUMN rowset. Unless otherwise specified, restriction columns are returned in the following order.

ToString
[C#] public static readonly Guid Primary_Keys;
[C++] public: static Guid Primary_Keys;
[VB] Public Shared ReadOnly Primary_Keys As Guid
[JScript] public static var Primary_Keys: Guid;
Description
Returns the primary key columns defined in the catalog by a given user.
System.Data.OleDb.OleDbSchemaGuid.Primary_Keys maps to the OLE DB PRIMARY_KEYS rowset. Unless otherwise specified, restriction columns are returned in the following order.

ToString
[C#] public static readonly Guid Procedure_Columns;
[C++] public: static Guid Procedure_Columns;
[VB] Public Shared ReadOnly Procedure_Columns As Guid
[JScript] public static var Procedure_Columns: Guid;
Description
Returns information about the columns of rowsets returned by procedures.
System.Data.OleDb.OleDbSchemaGuid.Procedure_Columns maps to the OLE DB PROCEDURE_COLUMNS rowset. Unless otherwise specified, restriction columns are returned in the following order.

ToString
[C#] public static readonly Guid Procedure_Parameters;
[C++] public: static Guid Procedure_Parameters;
[VB] Public Shared ReadOnly Procedure_Parameters As Guid
[JScript] public static var Procedure_Parameters: Guid;
Description
Returns information about the parameters and return codes of procedures.
System.Data.OleDb.OleDbSchemaGuid.Procedure_Parameters maps to the OLE DB PROCEDURE_PARAMETERS rowset. Unless otherwise specified, restriction columns are returned in the following order.

ToString
[C#] public static readonly Guid Procedures;
[C++] public: static Guid Procedures;
[VB] Public Shared ReadOnly Procedures As Guid
[JScript] public static var Procedures: Guid;
Description
Returns the procedures defined in the catalog that are owned by a given user.
System.Data.OleDb.OleDbSchemaGuid.Procedures maps to the OLE DB PROCEDURES rowset. Unless otherwise specified, restriction columns are returned in the following order.

ToString
[C#] public static readonly Guid Provider_Types;
[C++] public: static Guid Provider_Types;
[VB] Public Shared ReadOnly Provider_Types As Guid
[JScript] public static var Provider_Types: Guid;
Description
Returns the base data types supported by the .NET data provider.
System.Data.OleDb.OleDbSchemaGuid.Provider_Types maps to the OLE DB PROVIDER_TYPES rowset. Unless otherwise specified, restriction columns are returned in the following order.

ToString
[C#] public static readonly Guid Referential_Constraints;
[C++] public: static Guid Referential_Constraints;
[VB] Public Shared ReadOnly Referential_Constraints As Guid
[JScript] public static var Referential_Constraints: Guid;
Description
Returns the referential constraints defined in the catalog that are owned by a given user.
System.Data.OleDb.OleDbSchemaGuid.Referential_Constraints maps to the OLE DB REFERENTIAL_CONSTRAINTS rowset. Unless otherwise specified, restriction columns are returned in the following order.

ToString
[C#] public static readonly Guid Schemata;
[C++] public: static Guid Schemata;
[VB] Public Shared ReadOnly Schemata As Guid
[JScript] public static var Schemata: Guid;
Description
Returns the schema objects that are owned by a given user.
System.Data.OleDb.OleDbSchemaGuid.Schemata maps to the OLE DB SCHEMATAS rowset. Unless otherwise specified, restriction columns are returned in the following order.

ToString
[C#] public static readonly Guid Sql_Languages;
[C++] public: static Guid Sql_Languages;
[VB] Public Shared ReadOnly Sql_Languages As Guid
[JScript] public static var Sql_Languages: Guid;
Description
Returns the conformance levels, options, and dialects supported by the SQL-implementation processing data defined in the catalog.

System.Data.OleDb.OleDbSchemaGuid.Sql_Languages maps to the OLE DB SQL_LANGUAGES rowset. Unless otherwise specified, restriction columns are returned in the following order.
ToString
[C#] public static readonly Guid Statistics;
[C++] public: static Guid Statistics;
[VB] Public Shared ReadOnly Statistics As Guid
[JScript] public static var Statistics: Guid;
Description
Returns the statistics defined in the catalog that are owned by a given user.
System.Data.OleDb.OleDbSchemaGuid.Statistics maps to the OLE DB STATISTICS rowset. Unless otherwise specified, restriction columns are returned in the following order.
ToString
[C#] public static readonly Guid Table_Constraints;
[C++] public: static Guid Table_Constraints;
[VB] Public Shared ReadOnly Table_Constraints As Guid
[JScript] public static var Table_Constraints: Guid;
Description
Returns the table constraints defined in the catalog that are owned by a given user.
System.Data.OleDb.OleDbSchemaGuid.Table_Constraints maps to the OLE DB TABLE_CONSTRAINTS rowset. Unless otherwise specified, restriction columns are returned in the following order.
ToString
[C#] public static readonly Guid Table_Privileges;
[C++] public: static Guid Table_Privileges;
[VB] Public Shared ReadOnly Table_Privileges As Guid
[JScript] public static var Table_Privileges: Guid;
Description
Returns the privileges on tables defined in the catalog that are available to, or granted by, a given user.
System.Data.OleDb.OleDbSchemaGuid.Table_Privileges maps to the OLE DB TABLE_PRIVILEGES rowset. Unless otherwise specified, restriction columns are returned in the following order.
ToString
[C#] public static readonly Guid Table_Statistics;
[C++] public: static Guid Table_Statistics;
[VB] Public Shared ReadOnly Table_Statistics As Guid
[JScript] public static var Table_Statistics: Guid;
Description
Describes the available set of statistics on tables in the provider.
System.Data.OleDb.OleDbSchemaGuid.Table_Statistics maps to the OLE DB TABLE_STATISTICS rowset. Unless otherwise specified, restriction columns are returned in the following order.
ToString
[C#] public static readonly Guid Tables;
[C++] public: static Guid Tables;
[VB] Public Shared ReadOnly Tables As Guid
[JScript] public static var Tables: Guid;
Description
Returns the tables (including views) defined in the catalog that are accessible to a given user.
System.Data.OleDb.OleDbSchemaGuid.Tables maps to the OLE DB TABLES rowset. Unless otherwise specified, restriction columns are returned in the following order.
ToString
[C#] public static readonly Guid Tables_Info;
[C++] public: static Guid Tables_Info;
[VB] Public Shared ReadOnly Tables_Info As Guid
[JScript] public static var Tables_Info: Guid;
Description
Returns the tables (including views) that are accessible to a given user.
System.Data.OleDb.OleDbSchemaGuid.Tables_Info maps to the OLE DB TABLES_INFO rowset. Unless otherwise specified, restriction columns are returned in the following order.
ToString
[C#] public static readonly Guid Translations;
[C++] public: static Guid Translations;
[VB] Public Shared ReadOnly Translations As Guid
[JScript] public static var Translations: Guid;
Description
Returns the character translations defined in the catalog that are accessible to a given user.
System.Data.OleDb.OleDbSchemaGuid.Translations maps to the OLE DB TRANSLATIONS rowset. Unless otherwise specified, restriction columns are returned in the following order.
ToString
[C#] public static readonly Guid Trustee;
[C++] public: static Guid Trustee;
[VB] Public Shared ReadOnly Trustee As Guid
[JScript] public static var Trustee: Guid;
Description
Identifies the trustees defined in the data source.
System.Data.OleDb.OleDbSchemaGuid.Trustee maps to the OLE DB TRUSTEES schema. Unless otherwise specified, restriction columns are returned in the following order.
ToString
[C#] public static readonly Guid Usage_Privileges;
[C++] public: static Guid Usage_Privileges;
[VB] Public Shared ReadOnly Usage_Privileges As Guid
[JScript] public static var Usage_Privileges: Guid;
Description
Returns the USAGE privileges on objects defined in the catalog that are available to, or granted by, a given user.
System.Data.OleDb.OleDbSchemaGuid.Usage Privileges maps to the OLE DB USAGE_PRIVILEGES rowset. Unless otherwise specified, restriction columns are returned in the following order.
ToString
[C#] public static readonly Guid View_Column_Usage;
[C++] public: static Guid View_Column_Usage;
[VB] Public Shared ReadOnly View_Column_Usage As Guid
[JScript] public static var View_Column_Usage: Guid;
Description
Returns the columns on which viewed tables, defined in the catalog and owned by a given user, are dependent.
System.Data.OleDb.OleDbSchemaGuid.View_Column_Usage maps to the OLE DB VIEW_COLUMN_USAGE rowset. Unless otherwise specified, restriction columns are returned in the following order.
ToString
[C#] public static readonly Guid View_Table_Usage;
[C++] public: static Guid View_Table_Usage;
[VB] Public Shared ReadOnly View_Table_Usage As Guid
[JScript] public static var View_Table_Usage: Guid;
Description
Returns the tables on which viewed tables, defined in the catalog and owned by a given user, are dependent.
System.Data.OleDb.OleDbSchemaGuid.View_Table_Usage maps to the OLE DB VIEW_TABLE_USAGE rowset. Unless otherwise specified, restriction columns are returned in the following order.
ToString
[C#] public static readonly Guid Views;
[C++] public: static Guid Views;
[VB] Public Shared ReadOnly Views As Guid
[JScript] public static var Views: Guid;
Description
Returns the views defined in the catalog that are accessible to a given user.
System.Data.OleDb.OleDbSchemaGuid.Views maps to the OLE DB VIEWS rowset. Unless otherwise specified, restriction columns are returned in the following order.
OleDbSchemaGuid
Example Syntax:
ToString
[C#] public OleDbSchemaGuid( );
[C++] public: OleDbSchemaGuid( );
[VB] Public Sub New( )
[JScript] public function OleDbSchemaGuid( );
OleDbTransaction class (System.Data.OleDb)
ToString
Description
Represents an SQL transaction to be made at a data source.
The application creates an System.Data.OleDb.OleDbTransaction object by calling System.Data.SqlClient.SqlConnection.BeginTransactioin on the System.Data.OleDb.OleDbConnection object. All subsequent operations associated with the transaction (for example, committing or aborting the transaction), are performed on the System.Data.OleDb.OleDbTransaction object.
Connection
ToString
[C#] public OleDbConnection Connection {get;}
[C++] public: __property OleDbConnection* get_Connection( );
[VB] Public ReadOnly Property Connection As OleDbConnection
[JScript] public function get Connection( ): OleDbConnection;
IsolationLevel
ToString
[C#] public IsolationLevel IsolationLevel {get;}
[C++] public: __property IsolationLevel get_IsolationLevel( );
[VB] Public ReadOnly Property IsolationLevel As IsolationLevel
[JScript] public function get IsolationLevel( ): IsolationLevel;
Description
Specifies the System.Data.IsolationLevel for this transaction.
Parallel transactions are not supported. Therefore, the System.Data.IsolationLevel applies to the entire transaction.
Begin
[C#] public OleDbTransaction* Begin( );
[C++] public: OleDbTransaction* Begin( );
[VB] Public Function Begin( ) As OleDbTransaction
[JScript] public function Begin( ): OleDbTransaction;
Description
Initiates a nested database transaction.
The new transaction is nested within the current transaction.
Begin
[C#] public OleDbTransaction Begin(IsolationLevel isolevel);
[C++] public: OleDbTransaction* Begin(IsolationLevel isolevel);
[VB] Public Function Begin(ByVal isolevel As IsolationLevel) As OleDbTransaction
[JScript] public function Begin(isolevel: IsolationLevel): OleDbTransaction; Initiates a nested database transaction.
Description
Initiates a nested database transaction and specifies the isolation level to use for the new transaction.
The new transaction is nested within the current transaction. The isolation level to use for the transaction.
Commit
[C#] public void Commit( );
[C++] public: __sealed void Commit( );
[VB] NotOverridable Public Sub Commit( )
[JScript] public function Commit( );
Description
Commits the database transaction.
Finalize
[C#] ~OleDbTransaction( );
[C++]~OleDbTransaction( );
[VB] Overrides Protected Sub Finalize( )
[JScript] protected override function Finalize( );
Description
Frees resources before the System.Data.OleDb.OleDbTransaction is reclaimed by the Garbage Collector.
Rollback
[C#] public void Rollback( );
[C++] public: __sealed void Rollback( );
[VB] NotOverridable Public Sub Rollback( )
[JScript] public function Rollback( );
Description
Rolls back a transaction from a pending state.
The transaction can only be rolled back from a pending state (after System.Data.OleDb.OleDbConnection.BeginTransaction (System.Data.IsolationLevel) has been called, but before System.Data.OleDb.OleDbTransaction.Commit is called).
IDisposable.Dispose
[C#] void IDisposable.Dispose( );
[C++] void IDisposable::Dispose( );
[VB] Sub Dispose( ) Implements IDisposable.Dispose
[JScript] function IDisposable.Dispose( );
OleDbType enumeration (System.Data.OleDb)
ToString
Description
Gets the data type of a field, a property, or an System.Data.OleDb.OleDbParameter. The corresponding OLE DB data type is shown in parentheses in the description of each member.
ToString
[C#] public const OleDbType BigInt;
[C++] public: const OleDbType BigInt;
[VB] Public Const BigInt As OleDbType
[JScript] public var BigInt: OleDbType;
Description
A 64-bit signed integer (DBTYPE_I8). This maps to System.Int64.
ToString
[C#] public const OleDbType Binary;
[C++] public: const OleDbType Binary;
[VB] Public Const Binary As OleDbType
[JScript] public var Binary: OleDbType;
Description
A stream of binary data (DBTYPE_BYTES). This maps to an System.Array of type System.Byte.

ToString
[C#] public const OleDbType Boolean;
[C++] public: const OleDBType Boolean;
[VB] Public Const Boolean As OleDbType
[JScript] public var Boolean: OleDbType;
Description
 A boolean value (DBTYPE_BOOL). This maps to System.Boolean.
ToString
[C#] public const OleDbType BSTR;
[C++] public: const OleDbType BSTR;
[VB] Public Const BSTR As OleDbType
[JScript] public var BSTR: OleDbType;
Description
 A null-terminated character string of Unicode characters (DBTYPE_BSTR). This maps to System.String.
ToString
[C#] public const OleDbType Char;
[C++] public: const OleDbType Char;
[VB] Public Const Char As OleDbType
[JScript] public var Char: OleDbType;
Description
 A character string (DBTYPE_STR). This maps to System.String.
ToString
[C#] public const OleDbType Currency;
[C++] public: const OleDbType Currency;
[VB] Public Const Currency As OleDbType
[JScript] public var Currency: OleDbType;
Description
 A currency value ranging from −2 (or −922,337,203,685,477.5808) to 2 −1 (or +922,337,203,685,477.5807) with an accuracy to a ten-thousandth of a currency unit (DBTYPE_CY). This maps to System.Decimal.
ToString
[C#] public const OleDbType Date;
[C++] public: const OleDbType Date;
[VB] Public Const Date As OleDbType
[JScript] public var Date: OleDbType;
Description
 Date data, stored as a double (DBTYPE_DATE). The whole portion is the number of days since Dec. 30, 1899, while the fractional portion is a fraction of a day. This maps to System.DateTime.
ToString
[C#] public const OleDbType DBDate;
[C++] public: const OleDbType DBDate;
[VB] Public Const DBDate As OleDbType
[JScript] public var DBDate: OleDbType;
Description
 Date data in the format yyyymmdd (DBTYPE_DBDATE). This maps to System.DateTime.
ToString
[C#] public const OleDbType DBTime;
[C++] public: const OleDbType DBTime;
[VB] Public Const DBTime As OleDbType
[JScript] public var DBTime: OleDbType;
Description
 Time data in the format hhmmss (DBTYPE_DBTIME). This maps to System.TimeSpan
ToString
[C#] public const OleDbType DBTimeStamp;
[C++] public: const OleDbType DBTimeStamp;
[VB] Public Const DBTimeStamp As OleDbType
[JScript] public var DBTimeStamp: OleDbType;
Description
 Data and time data in the format yyyymmddhhmmss (DBTYPE_DBTIMESTAMP). This maps to System.DateTime ToString
[C#] public const OleDbType Decimal;
[C++] public: const OleDbType Decimal;
[VB] Public Const Decimal As OleDbType
[JScript] public var Decimal: OleDbType;
Description
 A fixed precision and scale numeric value between −10 −1 and 10 −1 (DBTYPE_DECIMAL). This maps to System.Decimal.
ToString
[C#] public const OleDbType Double;
[C++] public: const OleDbType Double;
[VB] Public Const Double As OleDbType
[JScript] public var Double: OleDbType;
Description
 A floating point number within the range of −1.79E+308 through 1.79E+308 (DBTYPE_R8). This maps to System.Double.
ToString
[C#] public const OleDbType Empty;
[C++] public: const OleDbType Empty;
[VB] Public Const Empty As OleDbType
[JScript] public var Empty: OleDbType;
Description
 No value (DBTYPE_EMPTY). This maps to System.Empty.
ToString
[C#] public const OleDbType Error;
[C++] public: const OleDbType Error;
[VB] Public Const Error As OleDbType
[JScript] public var Error: OleDbType;
Description
 A 32-bit error code (DBTYPE_ERROR). This maps to System.Exception.
ToString
[C#] public const OleDbType Filetime;
[C++] public: const OleDbType Filetime;
[VB] Public Const Filetime As OleDbType
[JScript] public var Filetime: OleDbType;
Description
 A 64-bit unsigned integer representing the number of 100-nanosecond intervals since Jan. 1, 1601 (DBTYPE_FILETIME). This maps to Systemi.DateTime.
ToString
[C#] public const OleDbType Guid;
[C++] public: const OleDbType Guid;
[VB] Public Const Guid As OleDbType
[JScript] public var Guid: OleDbType;
Description
 A globally unique identifier (or GUID) (DBTYPE_GUID). This maps to System.Guid.
ToString
[C#] public const OleDbType IDispatch;
[C++] public: const OleDbType IDispatch;
[VB] Public Const IDispatch As OleDbType
[JScript] public var IDispatch: OleDbType;
Description
 A pointer to an IDispatch interface (DBTYPE_IDISPATCH). This maps to System.Object.
ToString
[C#] public const OleDbType Integer;
[C++] public: const OleDbType Integer;
[VB] Public Const Integer As OleDbType
[JScript] public var Integer: OleDbType;
Description
 A 32-bit signed integer (DBTYPE_I4). This maps to System.Int32.

ToString
[C#] public const OleDbType IUnknown;
[C++] public: const OleDbType IUnknown;
[VB] Public Const IUnknown As OleDbType
[JScript] public var IUnknown: OleDbType;
Description
A pointer to an IUnknown interface (DBTYPE_UNKNOWN). This maps to System.Object
ToString
[C#] public const OleDbType LongVarBinary;
[C++] public: const OleDbType LongVarBinary;
[VB] Public Const LongVarBinary As OleDbType
[JScript] public var LongVarBinary: OleDbType;
Description
A long binary value (System.Data.OleDb.OleDbParameter only). This maps to an System.Array of type System.Byte.
ToString
[C#] public const OleDbType LongVarChar;
[C++] public: const OleDbType LongVarChar;
[VB] Public Const LongVarChar As OleDbType
[JScript] public var LongVarChar: OleDbType;
Description
A long string value (System.Data.OleDb.OleDbParameter only). This maps to System.String.
ToString
[C#] public const OleDbType LongVarWChar;
[C++] public: const OleDbType LongVarWChar;
[VB] Public Const LongVarWChar As OleDbType
[JScript] public var LongVarWChar: OleDbType;
Description
A long null-terminated Unicode string value (System.Data.OleDb.OleDbParameter only). This maps to System.String.
ToString
[C#] public const OleDbType Numeric;
[C++] public: const OleDbType Numeric;
[VB] Public Const Numeric As OleDbType
[JScript] public var Numeric: OleDbType;
Description
An exact numeric value with a fixed precision and scale (DBTYPE_NUMERIC). This maps to System.Decimal.
ToString
[C#] public const OleDbType PropVariant;
[C++] public: const OleDbType PropVariant;
[VB] Public Const PropVariant As OleDbType
[JScript] public var PropVariant: OleDbType;
Description
An automation PROPVARIANT (DBTYPE_PROP_VARIANT). This maps to System.Object.
ToString
[C#] public const OleDbType Single;
[C++] public: const OleDbType Single;
[VB] Public Const Single As OleDbType
[JScript] public var Single: OleDbType;
Description
A floating point number within the range of −3.40E+38 through 3.40E+38. (DBTYPE_R4). This maps to System.Single.
ToString
[C#] public const OleDbType SmallInt;
[C++] public: const OleDbType SmallInt;
[VB] Public Const SmallInt As OleDbType
[JScript] public var SmallInt: OleDbType;
Description
A 16-bit signed integer (DBTYPE_I2). This maps to System.Int16.

ToString
[C#] public const OleDbType TinyInt;
[C++] public: const OleDbType TinyInt;
[VB] Public Const TinyInt As OleDbType
[JScript] public var TinyInt: OleDbType;
Description
A 8-bit signed integer (DBTYPE_I1). This maps to System.SByte.
ToString
[C#] public const OleDbType UnsignedBigInt;
[C++] public: const OleDbType UnsignedBigInt;
[VB] Public Const UnsignedBigInt As OleDbType
[JScript] public var UnsignedBigInt: OleDbType;
Description
A 64-bit unsigned integer (DBTYPE_UI8). This maps to System.UInt64.
ToString
[C#] public const OleDbType UnsignedInt;
[C++] public: const OleDbType UnsignedInt;
[VB] Public Const UnsignedInt As OleDbType
[JScript] public var UnsignedInt: OleDbType;
Description
A 32-bit unsigned integer (DBTYPE_UI4). This maps to System.UInt32.
ToString
[C#] public const OleDbType UnsignedSmallInt;
[C]++) public: const OleDbType UnsignedSmallInt;
[VB] Public Const UnsignedSmallInt As OleDbType
[JScript] public var UnsignedSmallInt: OleDbType;
Description
A 16-bit unsigned integer (DBTYPE_UI2). This maps to System.UInt16.
ToString
[C#] public const OleDbType UnsignedTinyInt;
[C++] public: const OleDbType UnsignedTinyInt;
[VB] Public Const UnsignedTinyInt As OleDbType
[JScript] public var UnsignedTinyInt: OleDbType;
Description
A 8-bit unsigned integer (DBTYPE_UI1). This maps to System.Byte
ToString
[C#] public const OleDbType VarBinary;
[C++] public: const OleDbType VarBinary;
[VB] Public Const VarBinary As OleDbType
[JScript] public var VarBinary: OleDbType;
Description
A variable-length stream of binary data (System.Data.OleDb.OleDbParameter only). This maps to an System.Array of type System.Byte.
ToString
[C#] public const OleDbType VarChar;
[C++] public: const OleDbType VarChar;
[VB] Public Const VarChar As OleDbType
[JScript] public var VarChar: OleDbType;
Description
A variable-length stream of non-Unicode characters (System.Data.OleDb.OleDbParameter only). This maps to System.String.
ToString
[C#] public const OleDbType Variant;
[C++] public: const OleDbType Variant;
[VB] Public Const Variant As OleDbType
[JScript] public var Variant: OleDbType;
Description
A special data type that can contain numeric, string, binary, or date data, as well as the special values Empty and Null (DBTYPE_VARIANT). This type is assumed if no other is specified. This maps to System.Object ToString
[C#] public const OleDbType VarNumeric;
[C++] public: const OleDbType VarNumeric;
[VB] Public Const VarNumeric As OleDbType
[JScript] public var VarNumeric: OleDbType;
Description
A variable-length numeric value (System.Data.OleDb.OleDbParameter only). This maps to System.Decimal.
ToString
[C#] public const OleDbType VarWChar;
[C++] public: const OleDbType VarWChar;
[VB] Public Const VarWChar As Ol
System.Data.SglClient
Description
The System.Data.SqlClient namespace is the SQL Server NET Data Provider.
SqlClientPermission class (System.Data.SqlClient)
Description
Provides the capability for the SQL Server. NET Data Provider to ensure that a user has a security level adequate to access a data source.
Constructors:
SqlClientPermission
Example Syntax:
[C#] public SqlClientPermission( );
[C++] public: SqlClientPermission( );
[VB] Public Sub New( )
[JScript] public function SqlClientPermission( ); Initializes a new instance of the System.Data.SqlClient.SqlClientPermission class.
Description
Initializes a new instance of the System.Data.SqlClient.SqlClientPermission class.
SqlClientPermission
Example Syntax:
[C#] public SqlClientPermission(PermissionState state);
[C++] public: SqlClientPermission(PermissionState state);
[VB] Public Sub New(ByVal state As PermissionState)
[JScript] public function SqlClientPermission(state: PermissionState);
Description
One of the System.Security.Permissions.PermissionState values.
SqlClientPermission
Example Syntax:
[C#] public SqlClientPermission(PermissionState state, bool allowBlankPassword);
[C++] public: SqlClientPermission(PermissionState state, bool allowBlankPassword);
[VB] Public Sub New(ByVal state As PermissionState, ByVal allowBlankPassword As Boolean)
[JScript] public function SqlClientPermission(state: PermissionState, allowBlankPassword: Boolean);
Description
One of the System.Security.Permissions.PermissionState values. Indicates whether a blank password is allowed.
Properties:
AllowBlankPassword
Methods:
SqlClientPermissionAttribute class (System.Data.SqlClient)
Union
Description
Associates a security action with a custom security attribute.
SqlClientPermissionAttribute
Example Syntax:
Union
[C#] public SqlClientPermissionAttribute(SecurityAction action);
[C++] public: SqlClientPermissionAttribute(SecurityAction action);
[VB] Public Sub New(ByVal action As SecurityAction)
[JScript] public function SqlClientPermissionAttribute (action: SecurityAction);
Description
Initializes a new instance of the System.Data.SqlClient.SqlClientPermissionAttribute class.
Return Value: A System.Data.SqlClient.SqlClientPermissionAttribute object. One of the the System.Security.Permissions.SecurityAction values representing an action that can be performed using declarative security.
Action
AllowBlankPassword
TypeId
Unrestricted
CreatePermission
[C#] public override IPermission CreatePermission( );
[C++] public: IPermission* CreatePermission( );
[VB] Overrides Public Function CreatePermission( ) As IPermission
[JScript] public override function CreatePermission( ): IPermission;
Description
Returns a System.Data.SqlClient.SqlClientPermission object that is configured according to the attribute properties.
Return Value: A System.Data.SqlClient.SqlClientPermission object.
SqlCommand class (System.Data.SqlClient)
ToString
Description
Represents a Transact-SQL statement or stored procedure to execute at a SQL Server database. This class cannot be inherited.
When an instance of System.Data.SqlClient.SqlCommand is created, the read/write properties are set to their initial values. For a list of these values, see the System.Data.SqlClient.SqlCommand constructor.
SqlCommand
Example Syntax:
ToString
[C#] public SqlCommand( );
[C++] public: SqlCommand( );
[VB] Public Sub New( )
[JScript] public function SqlCommand( ); Initializes a new instance of the System.Data.SqlClient.SqlCommand class.
Description
Initializes a new instance of the System.Data.SqlClient.SqlCommand class.
The following table shows initial property values for an instance of io System.Data.SqlClient.SqlCommand.
SqlCommand
Example Syntax:
ToString
[C#] public SqlCommand(string cmdText);
[C++] public: SqlCommand(String* cmdText);
[VB] Public Sub New(ByVal cmdText As String)
[JScript] public function SqlCommand(cmdText: String);
Description
Initializes a new instance of the System.Data.SqlClient.SqlCommand class with the text of the query.

When an instance of System.Data.SqlClient.SqlCommand is created, the following read/write properties are set to initial values. The text of the query.
SqlCommand
Example Syntax:
ToString
[C#] public SqlCommand(string cmdtext, SqlConnection connection);
[C++] public: SqlCommand(String* cmdText, SqlConnection* connection);
[VB] Public Sub New(ByVal cmdText As String, ByVal connection As SqlConnection)
[JScript] public function SqlCommand(cmdText: String, connection: SqlConnection);
Description
Initializes a new instance of the System.Data.SqlClient.SqlCommand class with the text of the query and a System.Data.SqlClient.SqlConnection.

The following table shows initial property values for an instance of System.Data.SqlClient.SqlCommand. The text of the query. A System.Data.SqlClient.SqlConnection that represents the connection to an instance of SQL Server.
SqlCommand
Example Syntax:
ToString
[C#] public SqlCommand(string cmdText, SqlConnection connection, SqlTransaction transaction);
[C++] public: SqlCommand(String* cmdText, SqlConnection* connection, SqlTransaction* transaction);
[VB] Public Sub New(ByVal cmdText As String, ByVal connection As SqlConnection, ByVal transaction As SqlTransaction)
[JScript] public function SqlCommand(cmdText: String, connection: SqlConnection, transaction: SqlTransaction);
Description
Initializes a new instance of the System.Data.SqlClient.SqlCommand class with the text of the query, a System.Data.SqlClient.SqlConnection, and the System.Data.SqlClient.Transaction.

The following table shows initial property values for an instance of System.Data.SqlClient.SqlCommand The text of the query. A System.Data.SqlClient.SqlConnection that represents the connection to an instance of SQL Server. The System.Data.SqlClient.SqlTransaction in which the System.Data.SqlClient.SqlCommand executes.
CommandText
ToString
[C#] public string CommandText {get; set;}
[C++] public: __property String* get_CommandText( ); public: __property void set_CommandText(String*);
[VB] Public Property CommandText As String
[JScript] public function get CommandText( ): String; public function set CommandText(String);
Description
Gets or sets the Transact-SQL statement or stored procedure to execute at the data source.
When the System.Data.SqlClient.SqlCommand.CommandType property is set to StoredProcedure, the System.Data.SqlClient.SqlCommand.CommandText property should be set to the name of the stored procedure. The command executes this stored procedure when you call one of the Execute methods.
CommandTimeout
ToString
[C#] public int CommandTimeout {get; set;}
[C++] public: __property int get_CommandTimeout( ); public: __property void set_CommandTimeout(int);
[VB] Public Property CommandTimeout As Integer
[JScript] public function get CommandTimeout( ): int; public function set CommandTimeout(int);
Description
Gets or sets the wait time before terminating the attempt to execute a command and generating an error.
A value of 0 indicates no limit, and should be avoided in a System.Data.OleDb.OleDbCommand.CommandTimeout because an attempt to execute a command will wait indefinitely.
CommandType
ToString
[C#] public CommandType CommandType {get; set;}
[C++] public: __property CommandType get_CommandType( ); public: __property void set_CommandType(CommandType);
[VB] Public Property CommandType As CommandType
[JScript] public function get CommandType( ): CommandType; public function set CommandType(CommandType);
Description
Gets or sets a value indicating how the System.Data.SqlClient.SqlCommand.CommandText property is to be interpreted.
When you set the System.Data.SqlClient.SqlCommand.CommandType property to StoredProcedure you should set the System.Data.SqlClient.SqlCommand.CommandText property to the name of the stored procedure. The command executes this stored procedure when you call one of the Execute methods.
Connection
ToString
[C#] public SqlConnection Connection {get; set;}
[C++] public: __property SqlConnection* get_Connection( ); public: __property void set_Connection(SqlConnection*);
[VB] Public Property Connection As SqlConnection
[JScript] public function get Connection( ): SqlConnection; public, function set Connection(SqlConnection);
Description
Gets or sets the System.Data.SqlClient.SqlConnection used by this instance of the System.Data.SqlClient.SqlCommand.
If you set System.Data.SqlClient.SqlCommand.Connection while a transaction is in progress and the System.Data.SqlClient.SqlCommand.Transaction property is not null, an System.InvalidOperationException is generated. If the System.Data.SqlClient.SqlCommand.Transaction property is not null and the transaction has already been committed or rolled back, System.Data.SqlClient.SqlCommand.Transaction is set to null.
Container
DesignMode
DesignTimeVisible
ToString
Description
Gets or sets a value indicating whether the command object should be visible in a Windows Forms Designer control.
Events
Parameters
ToString
Description
Gets the System.Data.SqlClient.SqlParameterCollection.
The SQL Server. NET Data Provider does not support the question mark (?) placeholder for passing parameters to a SQL Statement or a stored procedure called by a Command of CommandType.Text. In this case, named parameters must be used. For example: SELECT*FROM Customers WHERE CustomerID=@CustomerID For more information see.
  Site
  Transaction
  ToString
Description
  Gets or sets the transaction in which the System.Data.SqlClient.SqlCommand executes.
  UpdatedRowSource
  ToString
[C#] public UpdateRowSource UpdatedRowSource {get; set;}
[C++] public: _property UpdateRowSource get_ UpdatedRowSource( );public: _property void set_ UpdatedRowSource(UpdateRowSource);
[VB] Public Property UpdatedRowSource As UpdateRowSource
[JScript] public function get UpdatedRowSource( ): UpdateRowSource;public function set UpdatedRowSource (UpdateRowSource);
Description
  Gets or sets how command results are applied to the System.Data.DataRow when used by the System.Data.Common.DbDataAdapter.Update (System.Data.DataSet) method of the System.Data.Common.DbDataAdapter.
  Cancel
[C#] public void Cancel( );
[C++] public: _sealed void Cancel( );
[VB] NotOverridable Public Sub Cancel( )
[JScript] public function Cancel( );
Description
  Cancels the execution of a System.Data.SqlClient.SqlCommand.
  CreateParameter
[C#] public SqlParameter CreateParameter( );
[C++] public: SqlParameter* CreateParameter( );
[VB] Public Function CreateParameter( ) As SqlParameter
[JScript] public function CreateParameter( ): SqlParameter;
Description
  Creates a new instance of a System.Data.SqlClient.SqlParameter object.
Return Value: A System.Data.SqlClient.SqlParameter object.
  The System.Data.SqlClient.SqlCommand.CreateParameter method is a strongly-typed version of System.Data.IDbCommand.CreateParameter.
  ExecuteNonQuery
[C#] public int ExecuteNonQuery( );
[C++] public: _sealed int ExecuteNonQuery( );
[VB] NotOverridable Public Function ExecuteNonQuery( ) As Integer
[JScript] public function ExecuteNonQuery( ): int;
Description
  Executes a Transact-SQL statement against the System.Data.SqlClient.SqlCommand.Connection and returns the number of rows affected.
Return Value: The number of rows affected.
  You can use the System.Data.SqlClient.SqlCommand.ExecuteNonQuery to perform catalog operations (for example, querying the structure of a database or creating database objects such as tables), or to change the data in a database without using a System.Data.DataSet by executing UPDATE, INSERT, or DELETE statements.
  ExecuteReader
[C#] public SqlDataReader ExecuteReader( );
[C++] public: SqlDataReader* ExecuteReader( );
[VB] Public Function ExecuteReader( ) As SqlDataReader
[JScript] public function ExecuteReader( ): SqlDataReader;
  Sends the System.Data.SqlClient.SqlCommand.CommandText to the System.Data.SqlClient.SqlCommand.Connection and builds a System.Data.SqlClient.SqlDataReader.
Description
  Sends the System.Data.SqlClient.SqlCommand.CommandText to the System.Data.SqlClient.SqlCommand.Connection and builds a System.Data.SqlClient.SqlDataReader.
Return Value: A System.Data.SqlClient.SqlDataReader object.
  When the System.Data.SqlClient.SqlCommand.CommandType property is set to StoredProcedure the System.Data.SqlClient.SqlCommand.CommandText property should be set to the name of the stored procedure. The command executes this stored procedure when you call System.Data.SqlClient.SqlCommand.ExecuteReader.
  ExecuteReader
[C#] public SqlDataReader ExecuteReader (CommandBehavior behavior);
[C++] public: SqlDataReader* ExecuteReader (CommandBehavior behavior);
[VB] Public Function ExecuteReader(ByVal behavior As CommandBehavior) As SqlDataReader
[JScript] public function ExecuteReader(behavior: CommandBehavior): SqlDataReader;
Description
  Sends the System.Data.SqlClient.SqlCommand.CommandText to the System.Data.SqlClient.SqlCommand.Connection, and builds a System.Data.SqlClient.SqlDataReader using one of the System.Data.CommandBehavior values.
Return Value: A System.Data.SqlClient.SqlDataReader object.
  When the System.Data.SqlClient.SqlCommand.CommandType property is set to StoredProcedure, the System.Data.SqlClient.SqlCommand.CommandText property should be set to the name of the stored procedure. The command executes this stored procedure when you call System.Data.SqlClient.SqlCommand.ExecuteReader. One of the System.Data.CommandBehavior values.
  ExecuteScalar
[C#] public object ExecuteScalar( );
[C++] public: _sealed Object* ExecuteScalar( );
[VB] NotOverridable Public Function ExecuteScalar( ) As Object
[JScript] public function ExecuteScalar( ): Object;
Description
  Executes the query, and returns the first column of the first row in the resultset returned by the query. Extra columns or rows are ignored.
Return Value: The first column of the first row in the resultset.
  Use the System.Data.SqlClient.SqlCommand. ExecuteScalar method to retrieve a single value (for example, an aggregate value) from a database. This requires less code than using the System.Data.SqlClient.SqlCommand. ExecuteReader method, and then performing the operations necessary to generate the single value using the data returned by a System.Data.SqlClient.SqlDataReader.
  ExecuteXmlReader
[C#] public XmlReader ExecuteXmlReader( );

[C++] public: XmlReader* ExecuteXmlReader( );
[VB] Public Function ExecuteXmlReader( ) As XmlReader
[JScript] public function ExecuteXmlReader( ): XmlReader;
Description
Sends the System.Data.SqlClient.SqlCommand.CommandText to the System.Data.SqlClient.SqlCommand.Connection and builds an System.Xml.XmlReader object.
Return Value: An System.Xml.XmlReader object.
The System.Data.SqlClient.SqlCommand.CommandText property usually specifies a Transact-SQL statement with a valid FOR XML clause. However, System.Data.SqlClient.SqlCommand.CommandText can also specify a statement that returns ntext data containing valid XML.
Prepare
[C#] public void Prepare( );
[C++] public: _sealed void Prepare( );
[VB] NotOverridable Public Sub Prepare( )
[JScript] public function Prepare( );
Description
Creates a prepared version of the command on an instance of SQL Server.
If the System.Data.SqlClient.SqlCommand.CommandType property is set to TableDirect, System.Data.SqlClient.SqlCommand.Prepare does nothing. If System.Data.SqlClient.SqlCommand.CommandType is set to StoredProcedure, the call to System.Data.SqlClient.SqlCommand.Prepare should succeed, although it may result in a no-op.
ResetCommandTimeout
[C#] public void ResetCommandTimeout( );
[C++] public: void ResetCommandTimeout( );
[VB] Public Sub ResetCommandTimeout( )
[JScript] public function ResetCommandTimeout( );
Description
Resets the System.Data.SqlClient.SqlCommand.CommandTimeout property to its default value.
The default value of the System.Data.SqlClient.SqlCommand.CommandTimeout is 30 seconds.
IDbCommand.CreateParameter
[C#] IDbDataParameter IDbCommand.CreateParameter( );
[C++] IDbDataParameter* IDbCommand::CreateParameter( );
[VB] Function CreateParameter( ) As IDbDataParameter Implements IDbCommand.CreateParameter
[JScript] function IDbCommand.CreateParameter( ): IDbDataParameter;
IDbCommand.ExecuteReader
[C#] IDataReader IDbCommand.ExecuteReader( );
[C++] IDataReader* IDbCommand::ExecuteReader( );
[VB] Function ExecuteReader( ) As IDataReader Implements
IDbCommand.ExecuteReader
[JScript] function IDbCommand.ExecuteReader( ): IDataReader;
IDbCommand.ExecuteReader
[C#] IDataReader IDbCommand.ExecuteReader(CommandBehavior behavior);
[C++] IDataReader* IDbCommand::ExecuteReader(CommandBehavior behavior);
[VB] Function ExecuteReader(ByVal behavior As CommandBehavior) As IDataReader Implements IDbCommand.ExecuteReader
[JScript] function IDbCommand.ExecuteReader(behavior: CommandBehavior): IDataReader;
ICloneable.Clone
[C#] object ICloneable.Clone( );
[C++] Object* ICloneable::Clone( );
[VB] Function Clone( ) As Object Implements ICloneable.Clone
[JScript] function ICloneable.Clone( ): Object;
SqlCommandBuilder class (System.Data.SqlClient)
ToString
Description
Provides a means of automatically generating single-table commands used to reconcile changes made to a System.Data.DataSet with the associated SQL Server database. This class cannot be inherited.
The System.Data.SqlClient.SqlDataAdapter does not automatically generate the Transact-SQL statements required to reconcile changes made to a System.Data.DataSet with the associated instance of SQL Server. However, you can create a System.Data.SqlClient.SqlCommandBuilder object to automatically generate Transact-SQL statements for single-table updates if you set the System.Data.SqlClient.SqlDataAdapter.SelectCommand property of the System.Data.SqlClient.SqlDataAdapter. Then, any additional Transact-SQL statements that you do not set are generated by the System.Data.SqlClient.SqlCommandBuilder.
SqlCommandBuilder
Example Syntax:
ToString
[C#] public SqlCommandBuilder( );
[C++] public: SqlCommandBuilder( );
[VB] Public Sub New( )
[JScript] public function SqlCommandBuilder( ); Initializes a new instance of the System.Data.SqlClient.SqlCommandBuilder class.
Description
Initializes a new instance of the System.Data.SqlClient.SqlCommandBuilder class.
SqlCommandBuilder
Example Syntax:
ToString
[C#] public SqlCommandBuilder(SqlDataAdapter adapter);
[C++] public: SqlCommandBuilder(SqlDataAdapter* adapter);
[VB] Public Sub New(ByVal adapter As SqlDataAdapter)
[JScript] public function SqlCommandBuilder(adapter: SqlDataAdapter);
Description
Initializes a new instance of the System.Data.SqlClient.SqlCommandBuilder class with the associated System.Data.SqlClient.SqlDataAdapter object. The name of the System.Data.SqlClient.SqlDataAdapter.
Container
DataAdapter
ToString
Description
Gets or sets a System.Data.SqlClient.SqlDataAdapter object for which Transact-SQL statements are automatically generated.
The System.Data.SqlClient.SqlCommandBuilder registers itself as a listener for System.Data.SqlClient.SqlDataAdapter.RowUpdating events generated by the System.Data.SqlClient.SqlDataAdapter.
DesignMode
Events
QuotePrefix
ToString
Description
Gets or sets the beginning character or characters to use when specifying SQL Server object names, (for example, tables or columns), that contain characters such as spaces.

Database objects in instances of SQL Server 2000 and SQL Server version 7.0 can contain any valid Microsoft Windows NTÂ® or Microsoft WindowsÂ® 2000 characters, including spaces, commas, and semicolons. To accommodate this capability, use the System.Data.SqlClient.SqlCommandBuilder.QuotePrefix and System.Data.SqlClient.SqlCommandBuilder.QuoteSuffix properties to specify delimiters such as a left bracket and a right bracket to encapsulate the object name.

QuoteSuffix
ToString
[C#] public string QuoteSuffix {get; set;}
[C++] public: __property String* get_QuoteSuffix( );public: __property void set_QuoteSuffix(String*);
[VB] Public Property QuoteSuffix As String
[JScript] public function get QuoteSuffix( ): String;public function set QuoteSuffix(String);
Description Gets or sets the ending character or characters to use when specifying SQL Server object names, (for example, tables or columns), that contain characters such as spaces.

Database objects in instances of SQL Server 2000 and SQL Server version 7.0 can contain any valid Microsoft Windows NTÂ® or Microsoft WindowsÂ® 2000 characters, including spaces, commas, and semicolons. To accommodate this capability, use the System.Data.SqlClient.SqlCommandBuilder.QuotePrefix and System.Data.SqlClient.SqlCommandBuilder.QuoteSuffix properties to specify delimiters such as a left bracket and a right bracket to encapsulate the object name.

Site
Dispose
[C#] protected override void Dispose(bool disposing);
[C++] protected: void Dispose(bool disposing);
[VB] Overrides Protected Sub Dispose(ByVal disposing As Boolean)
[JScript] protected override function Dispose(disposing: Boolean); Releases the resources used by the System.Data.SqlClient.SqlCommandBuilder.
Description Releases the unmanaged resources used by the System.Data.SqlClient.SqlCommandBuilder and optionally releases the managed resources.

This method is called by the public method and the System.Object.Finalize method. true to release both managed and unmanaged resources; false to release only unmanaged resources.

GetDeleteCommand
[C#] public SqlCommand GetDeleteCommand( );
[C++] public: SqlCommand* GetDeleteCommand( );
[VB] Public Function GetDeleteCommand( ) As SqlCommand
[JScript] public function GetDeleteCommand( ): SqlCommand;
Description Gets the automatically generated Transact-SQL statement required to perform deletions on the database when an application calls System.Data.Common.DbDataAdapter.Update (System.Data.DataSet) on the System.Data.SqlClient.SqlDataAdapter.

Return Value: The text of the Transact-SQL statement to be executed.

An application can use the System.Data.SqlClient.SqlCommandBuilder.GetDeleteCommand method for informational or troubleshooting purposes because it returns the text of the statement to be executed.

GetInsertCommand
[C#] public SqlCommand GetInsertCommand( );
[C++] public: SqlCommnand* GetInsertCommand( );
[VB] Public Function GetInsertCommand( ) As SqlCommand
[JScript] public function GetInsertCommand( ): SqlCommand;
Description Gets the automatically generated Transact-SQL statement required to perform inserts on the database when an application calls System.Data.Common.DbDataAdapter.Update (System.Data.DataSet) on the System.Data.SqlClient.SqlDataAdapter Return Value: The text of the Transact-SQL statement to be executed.

An application can use the System.Data.SqlClient.SqlCommandBuilder.GetInsertCommand method for informational or troubleshooting purposes because it returns the text of the statement to be executed.

GetUpdateCommand
[C#] public SqlCommand GetUpdateCommand( );
[C++] public: SqlCommand* GetUpdateCommand( );
[VB] Public Function GetUpdateCommand( ) As SqlCommand
[JScript] public function GetUpdateCommand( ): SqlCommand;
Description Gets the automatically generated Transact-SQL statement required to perform updates on the database when an application calls System.Data.Common.DbDataAdapter.Update (System.Data.DataSet) on the System.Data.SqlClient.SqlDataAdapter Return Value: The text of the Transact-SQL statement to be executed.

An application can use the System.Data.SqlClient.SqlCommandBuilder.GetUpdateCommand method for informational or troubleshooting purposes because it returns the text of the statement to be executed.

RefreshSchema
[C#] public void RefreshSchema( );
[C++] public: void RefreshSchema( );
[VB] Public Sub RefreshSchema( )
[JScript] public function RefreshSchema( );
Description Refreshes the database schema information used to generate INSERT, UPDATE, or DELETE statements.

An application should call System.Data.SqlClient.SqlCommandBuilder.RefreshSchema whenever the SELECT statement associated with the System.Data.SqlClient.SqlCommandBuilder changes.

SqlConnection class (System.Data.SqlClient)
ToString
Description

Represents an open connection to a SQL Server database. This class cannot be inherited.

A System.Data.SqlClient.SqlConnection object represents a unique session to a SQL Server data source. In the case of a client/server database system, it is equivalent to a network connection to the server.

SqlConnection
Example Syntax:
ToString
[C#] public SqlConnection( );
[C++] public: SqlConnection( );
[VB] Public Sub New( )
[JScript] public function SqlConnection( ); Initializes a new instance of the System.Data.SqlClient.SqlConnection class.

Description

Initializes a new instance of the System.Data.SqlClient.SqlConnection class.

When a new instance of System.Data.SqlClient.SqlConnection is created, the read/write properties are set to the following initial values unless they are specifically set using their associated keywords in the System.Data.SqlClient.SqlConnection.ConnectionString property.

SqlConnection
Example Syntax:
ToString
[C#] public SqlConnection(string connectionString);
[C++] public: SqlConnection(String* connectionString);
[VB] Public Sub New(ByVal connectionString As String)
[JScript] public function SqlConnection(connectionString: String);
Description Initializes a new instance of the System.Data.SqlClient.SqlConnection class when given a string containing the connection string.

When a new instance of System.Data.SqlClient.SqlConnection is created, the read/write properties are set to the following initial values unless they are specifically set using their associated keywords in the System.Data.SqlClient.SqlConnection.ConnectionString property. The connection used to open the SQL Server database.

ConnectionString
ToString
[C#] public string ConnectionString {get; set;}
[C++] public: __property String* get_ConnectionString( );
    public: __property void set_ConnectionString(String*);
[VB] Public Property ConnectionString As String
[JScript] public function get ConnectionString( ): String;
    public function set ConnectionString(String);
Description Gets or sets the string used to open a SQL Server database.

The System.Data.SqlClient.SqlConnection.ConnectionString is similar to an OLE DB connection string, but is not identical. Unlike OLE DB or ADO, the connection string that is returned is the same as the user-set System.Data.SqlClient.SqlConnection.ConnectionString minus security information if Persist Security Info value is set to false (default). The SQL Server NET Data Provider does not persist or return the password in a connection string unless you set Persist Security Info to true.

ConnectionTimeout
ToString
[C#] public int ConnectionTimeout {get;}
[C++] public: __property int get_ConnectionTimeout( );
[VB] Public ReadOnly Property ConnectionTimeout As Integer
[JScript] public function get ConnectionTimeout( ): int;
Description Gets the time to wait while trying to establish a connection before terminating the attempt and generating an error.

A value of 0 indicates no limit, and should be avoided in a System.Data.SqlClient.SqlConnection.ConnectionString because an attempt to connect will wait indefinitely.

Container
Database
ToString
Description

Gets the name of the current database or the database to be used once a connection is open.

The System.Data.SqlClient.SqlConnection.Database property updates dynamically. If you change the current database using a Transact-SQL statement or the System.Data.SqlClient.SqlConnection.ChangeDatabase (System.String) method, an informational message is sent and the property is updated automatically.

DataSource
ToString
[C#] public string DataSource {get;}
[C++] public: __property String* get_DataSource( );
[VB] Public ReadOnly Property DataSource As String
[JScript] public function get DataSource( ): String;
Description Gets the name of the instance of SQL Server to which to connect.

DesignMode
Events
PacketSize
ToString
Description

Gets the size (in bytes) of network packets used to communicate with an instance of SQL Server.

If an application performs bulk copy operations, or sends or receives large amounts of text or image data, a packet size larger than the default may improve efficiency because it results in fewer network read and write operations. If an application sends and receives small amounts of information, you can set the packet size to 512 bytes (using the Packet Size value in the System.Data.SqlClient.SqlConnection.ConnectionString ), which is sufficient for most data transfer operations. For most applications, the default packet size is best.

ServerVersion
ToString
[C#] public string ServerVersion {get;}
[C++] public: __property String* get_ServerVersion( );
[VB] Public ReadOnly Property ServerVersion As String
[JScript] public function get ServerVersion( ): String;
Description Gets a string containing the version of the instance of SQL Server to which the client is connected.

The version is of the form ##.##.####, where the first two digits are the major version, the next two digits are the minor version, and the last four digits are the release version. The string is of the form major.minor.build, where major and minor are exactly two digits and build is exactly four digits.

Site
State
ToString
Description

Gets the current state of the connection.

The allowed state changes are: From Closed to Open, using the Open method of the connnection object.

WorkstationId
ToString
[C#] public string Workstationd {get;}
[C++] public: __property String* get_WorkstationId( );
[VB] Public ReadOnly Property WorkstationId As String
[JScript] public function get WorkstationId( ): String;
Description Gets a string that identifies the database client.

The string typically contains the network name of the client. The System.Data.SqlClient.SqlConnection.WorkstationId property corresponds to the Workstation ID connection string property.

ToString
Description

Occurs when an informational message is added.

ToString
[C#] public event StateChangeEventHandler StateChange;
[C++] public: _event StateChangeEventHandler* StateChange;
[VB] Public Event StateChange As StateChangeEventHandler
Description
Occurs when the state of the connection changes.
The System.Data.SqlClient.SqlConnection.StateChange event fires whenever the System.Data.SqlClient.SqlConnection.State changes from closed to opened, or from opened to closed.
BeginTransaction
[C#] public SqlTransaction BeginTransaction( );
[C++] public: SqlTransaction* BeginTransaction( );
[VB] Public Function BeginTransaction( ) As SqlTransaction
[JScript] public function BeginTransaction( ): SqlTransaction; Begins a database transaction.
Description
Begins a database transaction.
Return Value: An object representing the new transaction.
This command maps to the SQL Server implementation of BEGIN TRANSACTION.
BeginTransaction
[C#] public SqlTransaction BeginTransaction (IsolationLevel iso);
[C++] public: SqlTransaction* BeginTransaction (IsolationLevel iso);
[VB] Public Function BeginTransaction(ByVal is( ) As IsolationLevel) As SqlTransaction
[JScript] public function BeginTransaction(iso: IsolationLevel): SqlTransaction;
Description
Begins a database transaction with the specified isolation level.
Return Value: An object representing the new transaction.
This command maps to the SQL Server implementation of BEGIN TRANSACTION. The isolation level under which the transaction should run.
BeginTransaction
[C#] public SqlTransaction BeginTransaction(string transactionName);
[C++] public: SqlTranlsaction* BeginTransactionl(String* transactionName);
[VB] Public Function BeginTransaction(ByVal transactionName As String) As SqlTransaction
[JScript] public function BeginTransaction (transactionName: String): SqlTransaction; Begins a database transaction.
Description
Begins a database transaction with the specified transaction name.
Return Value: An object representing the new transaction.
This command maps to the SQL Server implementation of BEGIN TRANSACTION. The name of the transaction.
BeginTransaction
[C#] public SqlTransaction BeginTransaction (IsolationLevel iso, string transactionName);
[C++] public: SqlTransaction* BeginTransaction (IsolationLevel iso, String* transactionName);
[VB] Public Function BeginTransaction(ByVal iso As IsolationLevel, ByVal transactionName As String) As SqlTransaction
[JScript] public function BeginTransaction(iso: IsolationLevel, transactionName: String): SqlTransaction;
Description
Begins a database transaction with the specified isolation level and transaction name.
Return Value: An object representing the new transaction.
This command maps to the SQL Server implementation of BEGIN TRANSACTION. The isolation level under which the transaction should run. The name of the transaction.
ChangeDatabase
[C#] public void ChangeDatabase(string database);
[C++] public: _sealed void ChangeDatabase(String* database);
[VB] NotOverridable Public Sub ChangeDatabase(ByVal database As String)
[JScript] public function ChangeDatabase(database: String);
Description
Changes the current database for an open System.Data.SqlClient.SqlConnection.
The value supplied in the database parameter must be a valid database name. The database parameter cannot contain a null value, be empty, or contain a string with only blank characters. The database name.
Close
[C#] public void Close( );
[C++] public: _sealed void Close( );
[VB] NotOverridable Public Sub Close( )
[JScript] public function Close( );
Description
Closes the connection to the database. This is the preferred method of closing any open connection.
The System.Data.SqlClient.SqlConnection.Close method rolls back any pending transactions. It then releases the connection to the connection pool, or closes the connection if connection pooling is disabled.
CreateCommand
[C#] public SqlCommand CreateCommand( );
[C++] public: SqlCommand* CreateCommand( );
[VB] Public Function CreateCommand( ) As SqlCommand
[JScript] public function CreateCommand( ): SqlCommand;
Description
Creates and returns a System.Data.SqlClient.SqlCommand object associated with the System.Data.SqlClient.SqlConnection.
Return Value: A System.Data.SqlClient.SqlCommand object.
Dispose
[C#] protected override void Dispose(bool disposing);
[C++] protected: void Dispose(bool disposing);
[VB] Overrides Protected Sub Dispose(ByVal disposing As Boolean)
[JScript] protected override function Dispose(disposing: Boolean); Releases the resources used by the System.Data.SqlClient.SqlConnection.
Description
Releases the unmanaged resources used by the System.Data.SqlClient.SqlConnection and optionally releases the managed resources.
This method is called by the public method and the System.Object.Finalize method. true to release both managed and unmanaged resources; false to release only unmanaged resources.
Open
[C#] public void Open( );
[C++] public: _sealed void Open( );
[VB] NotOverridable Public Sub Open( )
[JScript] public function Open( );
Description
Opens a database connection with the property settings specified by the System.Data.SqlClient.SqlConnection.ConnectionString.

The System.Data.SqlClient.SqlConnection draws an open connection from the connection pool if one is available. Otherwise, it establishes a new connection to an instance of SQL Server.

IDbConnection.BeginTransaction
[C#] IDbTransaction IDbConnection.BeginTransaction( );
[C++] IDbTransaction* IDbConnection::BeginTransaction( );
[VB] Function BeginTransaction( ) As IDbTransaction Implements IDbConnection.BeginTransaction
[JScript] function IDbConnection.BeginTransaction( ): IDbTransaction;
IDbConnection.BeginTransaction
[C#] IDbTransaction IDbConnection.BeginTransaction (IsolationLevel iso);
[C++] IDbTransaction* IDbConnection::BeginTransaction (IsolationLevel iso);
[VB] Function BeginTransaction(ByVal iso As IsolationLevel) As IDbTransaction Implements IDbConnection.BeginTransaction
[JScript] function IDbConnection.BeginTransaction(iso: IsolationLevel) IDbTransaction;
IDbConnection.CreateCommnand
[C#] IDbCommand IDbConnection.CreateCommand( );
[C++] IDbCommand* IDbConnection::CreateCommand( );
[VB] Function CreateCommand( ) As IDbCommand Implements IDbConnection.CreateCommand
[JScript] function IDbConnection.CreateCommand( ): IDbCommand;
ICloneable.Clone
[C#] object ICloneable.Clone( );
[C++] Object* ICloneable::Clone( );
[VB] Function Clone( ) As Object Implements ICloneable.Clone
[JScript] function ICloneable.Clone( ): Object;
SqlDataAdapter class (System.Data.SqlClient)
ToString
Description Represents a set of data commands and a database connection which are used to fill the System.Data.DataSet and update a SQL Server database. This class cannot be inherited.

The System.Data.SqlClient.SqlDataAdapter, serves as a bridge between a System.Data.DataSet and SQL Server for retrieving and saving data. The System.Data.SqlClient.SqlDataAdapter provides this bridge by mapping System.Data.Common.DbDataAdapter.Fill (System.Data.DataTable), which changes the data in the System.Data.DataSet to match the data in the data source, and System.Data.Common.DbDataAdapter.Update (System.Data.DataSet), which changes the data in the data source to match the data in the System.Data.DataSet, using the appropriate Transact-SQL statements against the data source.

SqlDataAdapter
Example Syntax:
ToString
[C#] public SqlDataAdapter( );
[C++] public: SqlDataAdapter( );
[VB] Public Sub New( )
[JScript] public function SqlDataAdapter( ); Initializes a new instance of the System.Data.SqlClient.SqlDataAdapter class.
Description Initializes a new instance of the System.Data.SqlClient.SqlDataAdapter class.

When an instance of System.Data.SqlClient.SqlDataAdapter is created, the following read/write properties are set to the following initial values.

SqlDataAdapter
Example Syntax:
ToString
[C#] public SqlDataAdapter(SqlCommand selectCommand);
[C++] public: SqlDataAdapter(SqlCommand* selectCommand);
[VB] Public Sub New(ByVal selectCommand As SqlCommand)
[JScript] public function SqlDataAdapter(selectCommand: SqlCommand);
Description Initializes a new instance of the System.Data.SqlClient.SqlDataAdapter class with the specified Transact-SQL SELECT statement.

When an instance of System.Data.SqlClient.SqlDataAdapter is created, the following read/write properties are set to the following initial values. A System.Data.SqlClient.SqlCommand that is a Transact-SQL SELECT statement.

SqlDataAdapter
Example Syntax:
ToString
[C#] public SqlDataAdapter(string selectCommandText, SqlConnection selectConnection);
[C++] public: SqlDataAdapter(String* selectCommandText, SqlConnection* selectConnection);
[VB] Public Sub New(ByVal selectCommandText As String, ByVal selectConnection As SqlConnection)
[JScript] public function SqlDataAdapter (selectCommandText: String, selectConnection: SqlConnection);
Description Inintializes a new instance of the System.Data.SqlClient.SqlDataAdapter class with a System.Data.SqlClient.SqlDataAdapter.SelectCommand and a System.Data.SqlClient.SqlConnection object.

This implementation of the System.Data.SqlClient.SqlDataAdapter opens and closes a System.Data.SqlClient.SqlConnection if it is not already open. This can be useful in a an application that must call the System.Data.Common.DbDataAdapter.Fill (System.Data.DataTable) method for two or more System.Data.SqlClient.SqlDataAdapter objects. If the System.Data.SqlClient.SqlConnection is already open, you must explicitly call System.Data.SqlClient.SqlConnection.Close or System.Data.SqlClient.SqlConnection.Dispose (System.Boolean) to close it. The System.Data.SqlClient.SqlDataAdapter.SelectCommand. A System.Data.SqlClient.SqlConnection that represents the connection.

SqlDataAdapter
Example Syntax:
ToString
[C#] public SqlDataAdapter(string selectCommandText, string selectConnectionString);
[C++] public: SqlDataAdapter(String* selectCommandText, String* selectConnectionString);
[VB] Public Sub New(ByVal selectCommandText As String, ByVal selectConnectionString As String)
[JScript] public function SqlDataAdapter (selectCommandText: String, selectConnectionString: String);
Description Initializes a new instance of the System.Data.SqlClient.SqlDataAdapter class with a System.Data.SqlClient.SqlDataAdapter.SelectCommand and a connection string.

When an instance of System.Data.SqlClient.SqlDataAdapter is created, the following read/write properties are set to the following initial values. The System.Data.SqlClient.SqlDataAdapter.SelectCommand. The connection string.
  AcceptChangesDuringFill
  Container
  DeleteCommand
  ToString
Description
  Gets or sets a Transact-SQL statement or stored procedure to delete records from the data set.
  During System.Data.Common.DbDataAdapter.Update (System.Data.DataSet), if this property is not set and primary key information is present in the System.Data.DataSet, the System.Data.SqlClient.SqlDataAdapter.DeleteCommand can be generated automatically if you set the System.Data.OleDb.OleDbDataAdapter.SelectCommand property and use the System.Data.SqlClient.SqlCommandBuilder. Then, any additional commands that you do not set are generated by the System.Data.SqlClient.SqlCommandBuilder. This generation logic requires key column information to be present in the System.Data.DataSet. For more information see.
  DesignMode
  Events
  InsertCommand
  ToString
Description
  Gets or sets a Transact-SQL statement or stored procedure to insert new records into the data source.
  During System.Data.Common.DbDataAdapter.Update (System.Data.DataSet), if this property is not set and primary key information is present in the System.Data.DataSet the System.Data.SqlClient.SqlDataAdapter.InsertCommand can be generated automatically if you set the System.Data.OleDb.OleDbDataAdapter.SelectCommand property and use the System.Data.SqlClient.SqlCommandBuilder. Then, any additional commands that you do not set are generated by the System.Data.SqlClient.SqlCommandBuilder. This generation logic requires key column information to be present in the System.Data.DataSet. For more information see.
  MissingMappingAction
  MissingSchemaAction
  SelectCommand
  ToString
Description
  Gets or sets a Transact-SQL statement or stored procedure used to select records in the data source.
  When System.Data.SqlClient.SqlDataAdapter.SelectCommand is assigned to a previously created System.Data.SqlClient.SqlCommand, the System.Data.SqlClient.SqlCommand is not cloned. The System.Data.SqlClient.SqlDataAdapter.SelectCommand maintains a reference to the previously created System.Data.SqlClient.SqlCommand object.
  Site
  TableMappings
  UpdateCommand
  ToString
Description
  Gets or sets a Transact-SQL statement or stored procedure used to update records in the data source.
  During System.Data.Common.DbDataAdapter.Update (System.Data.DataSet), if this property is not set and primary key information is present in the System.Data.DataSet, the System.Data.SqlClient.SqlDataAdapter.UpdateCommand can be generated automatically if you set the System.Data.OleDb.OleDbDataAdapter.SelectCommand property and use the System.Data.SqlClient.SqlCommandBuilder. Then, any additional commands that you do not set are generated by the System.Data.SqlClient.SqlCommandBuilder. This generation logic requires key column information to be present in the System.Data.DataSelt. For more information see.
  ToString
Description
  Occurs during System.Data.Common.DbDataAdapter.Update (System.Data.DataSet) after a command is executed against the data source. The attempt to update is made, so the event fires.
  When using System.Data.Common.DbDataAdapter.Update (System.Data.DataSet), there are two events that occur per data row updated. The order of execution is as follows: The values in the System.Data.DataRow are moved to the parameter values.
  ToString
  [C#] public event SqlRowUpdatingEventHandler RowUpdating;
  [C++] public: _event SqlRowUpdatingEventHandler* RowUpdating;
  [VB] Public Event RowUpdating As SqlRowUpdatingEventHandler
Description
  Occurs during System.Data.Common.DbDataAdapter.Update (System.Data.DataSet) before a command is executed against the data source. The attempt to update is made, so the event fires.
  When using System.Data.Common.DbDataAdapter.Update(System.Data.DataSet), there are two events that occur per data row updated. The order of execution is as follows: The values in the System.Data.DataRow are moved to the parameter values.
  CreateRowUpdatedEvent
  [C#] protected override RowUpdatedEventArgs CreateRowUpdatedEvent(DataRow dataRow, IDbCommand command, StatementType statementType, DataTableMapping tableMapping);
  [C++] protected: RowUpdatedEventArgs* CreateRowUpdatedEvent(DataRow* dataRow, IDbCommand* command, StatementType statementType, DataTableMapping* tableMapping);
  [VB] Overrides Protected Function CreateRowUpdatedEvent(ByVal dataRow As DataRow, ByVal command As IDbCommand, ByVal statementType As StatementType, ByVal tableMapping As DataTableMapping) As RowUpdatedEventArgs
  [JScript] protected override function CreateRowUpdatedEvent(dataRow: DataRow, command: IDbCommand, statementType: StatementType, tableMapping: DataTableMapping): RowUpdatedEventArgs;
Description
  CreateRowUpdatingEvent
  [C#] protected override RowUpdatingEventArgs CreateRowUpdatingEvent(DataRow dataRow, IDbCommand command, StatementType statementType, DataTableMapping tableMapping);
  [C++] protected: RowUpdatingEventArgs* CreateRowUpdatingEvent(DataRow* dataRow, IDbCommand* command, StatementType statementType, DataTableMapping* tableMapping);

[VB] Overrides Protected Function CreateRowUpdatingEvent(ByVal dataRow As DataRow, ByVal command As IDbCommand, ByVal statementType As StatementType, ByVal tableMapping As DataTableMapping) As RowUpdatingEventArgs
[JScript] protected override function CreateRowUpdatingEvent(dataRow: DataRow, command: IDbCommand, statementType: StatementType, tableMapping: DataTableMapping): RowUpdatingEventArgs;
Description
The following example fills a System.Data.DataSet with the schema only, while filling a System.Data.DataTable with records, when provided a source table.
Dispose
[C#] protected override void Dispose(bool disposing);
[C++] protected: void Dispose(bool disposing);
[VB] Overrides Protected Sub Dispose(ByVal disposing As Boolean)
[JScript] protected override function Dispose(disposing: Boolean); Releases the resources used by the System.Data.SqlClient.SqlDataAdapter.
Description
Releases the unmanaged resources used by the System.Data.SqlClient.SqlDataAdapter and optionally releases the managed resources.
This method is called by the public method and the System.Object.Finalize method. true to release both managed and unmanaged resources; false to release only unmanaged resources.
OnRowUpdated
[C#] protected override void OnRowUpdated (RowUpdatedEventArgs value);
[C++] protected: void OnRowUpdated (RowUpdatedEventArgs* value);
[VB] Overrides Protected Sub OnRowUpdated(ByVal value As RowUpdatedEventArgs)
[JScript] protected override function OnRowUpdated(value: RowUpdatedEventArgs);
Description
Raises the System.Data.SqlClient.SqlDataAdapter.RowUpdated event.
Raising an event invokes the event handler through a delegate. For more information, see. A System.Data.SqlClient.SqlRowUpdatedEventArgs that contains the event data.
OnRowUpdating
[C#] protected override void OnRowupdating (RowupdatingEventArgs value);
[C++] protected: void OnRowUpdating (RowUpdatingEventArgs* value);
[VB] Overrides Protected Sub OnRowUpdating(ByVal value As RowUpdatingEventArgs)
[JScript] protected override function OnRowUpdating (value: RowUpdatingEventArgs);
Description
Raises the System.Data.SqlClient.SqlDataAdapter.RowUpdating event.
Raising an event invokes the event handler through a delegate. For more information, see. A System.Data.SqlClient.SqlRowUpdatingEventArgs that contains the event data.
ICloneable.Clone
[C#] object ICloneable.Clone( );
[C++] Object* ICloneable::Clone( );
[VB] Function Clone( ) As Object Implements ICloneable.Clone [JScript] function ICloneable.Clone( ): Object;
SqlDataReader class (System.Data.SqlClient)

Update
Description
Provides a means of reading a forward-only stream of rows from a SQL Server database. This class cannot be inherited.
To create a System.Data.SqlClient.SqlDataReader, you must call the System.Data.SqlClient.SqlCommand.ExecuteReader method of the System.Data.SqlClient.SqlCommand object, rather than directly using a constructor.
Depth
Update
[C#] public int Depth {get;}
[C++] public: __property int get__Depth( );
[VB] Public ReadOnly Property Depth As Integer
[JScript] public function get Depth( ): int;
Description
Gets a value indicating the depth of nesting for the current row
The outermost table has a depth of zero. The SQL Server .NET Data Provider does not support nesting and always returns zero.
FieldCount
Update
[C#] public int FieldCount {get;}
[C++] public: __property int get__FieldCount( );
[VB] Public ReadOnly Property FieldCount As Integer
[JScript] public function get FieldCount( ) int;
Description
Gets the number of columns in the current row.
After executing a query that does not return rows (for example, using the System.Data.SqlClient.SqlCommand.ExecuteNonQuery method), System.Data.SqlClient.SqlDataReader.FieldCount returns −1.
IsClosed
Update
[C#] public bool IsClosed {get;}
[C++] public: __property bool get__IsClosed( );
[VB] Public ReadOnly Property IsClosed As Boolean
[JScript] public function get IsClosed( ): Boolean;
Description
Gets a value indicating whether the data reader is closed. System.Data.SqlClient.SqlDataReader.IsClosed and System.Data.SqlClient.SqlDataReader.RecordsAffected are the only properties that you can call after the System.Data.SqlClient.SqlDataReader is closed.
Item
Update
[C#] public object this[string name] {get;}
[C++] public: __property Object* get__Item(String* name);
[VB] Public Default ReadOnly Property Item(ByVal name As String) As Object
[JScript] returnValue=SqlDataReaderObject.Item(name);
Description
Gets the value of the specified column in its native format given the column name. The column name.
Item
Update
[C#] public object this[int i] {get;}
[C++] public: __property Object* get__Item(int i);
[VB] Public Default ReadOnly Property Item(ByVal i As Integer) As Object
[JScript] returnValue=SqlDataReaderObject.Item(i); Gets the value of a column in its native format.
Description
Gets the value of the specified column in its native format given the column ordinal. The zero-based column ordinal.
RecordsAffected Update
[C#] public int RecordsAffected {get;}
[C++] public: __property int get_RecordsAffected( );
[VB] Public ReadOnly Property RecordsAffected As Integer
[JScript] public function get RecordsAffected( ): int;
Description
   Gets the number of rows changed, inserted, or deleted by execution of the Transact-SQL statement.
   The System.Data.SqlClient.SqlData Reader.RecordsAffected property is not set until all rows are read and you close the System.Data.SqlClient.SqlDataReader.
   Close
[C#] public void Close( );
[C++] public: __sealed void Close( );
[VB] NotOverridable Public Sub Close( )
[JScript] public function Close( );
Description
   Closes the System.Data.SqlClient.SqlDataReader object.
   You must explicitly call the System.Data.SqlClient.SqlDataReader.Close method when you are through using the System.Data.SqlClient.SqlDataReader to use the associated System.Data.SqlClient.SqlConnection for any other purpose.
   GetBoolean
[C#] public bool GetBoolean(int i);
[C++] public: __sealed bool GetBoolean(int i);
[VB] NotOverridable Public Function GetBoolean(ByVal i As Integer) As Boolean
[JScript] public function GetBoolean(i: int): Boolean;
Description
   Gets the value of the specified column as a boolean.
Return Value: The value of the column.
   No conversions are performed, therefore the data retrieved must already be a boolean or an exception is generated. The zero-based column ordinal.
   GetByte
[C#] public byte GetByte(int i);
[C++] public: __sealed unsigned char GetByte(int i);
[VB] NotOverridable Public Function GetByte(ByVal i As Integer) As Byte
[JScript] public function GetByte(i: int): Byte;
Description
   Gets the value of the specified column as a byte.
Return Value: The value of the specified column as a byte.
   No conversions are performed, therefore the data retrieved must already be a byte. The zero-based column ordinal.
   GetBytes
[C#] public long GetBytes(int i, long dataIndex, byte[ ] buffer, int bufferIndex, int length);
[C++] public: __sealed __int64 GetBytes(int i, __int64 dataIndex, unsigned char buffer __gc[ ], int bufferIndex, int length);
[VB] NotOverridable Public Function GetBytes(ByVal i As Integer, ByVal dataIndex As Long, ByVal buffer( ) As Byte, ByVal bufferIndex As Integer, ByVal length As Integer) As Long
[JScript] public function GetBytes(i: int, dataIndex: long, buffer: Byte[ ], bufferIndex: int, length: int): long;
Description
   Reads a stream of bytes from the specified column offset into the buffer an array starting at the given buffer offset.
Return Value: The actual number of bytes read.
   The actual number of bytes read can be less than the requested length, if the end of the row is reached. If you pass a buffer that is null, Sytem.Data.SqlCient.SqlDataReader.GetByte (System.Int32,System.Int64,System.Byte[ ],System.Int32, System.Int32) returns the length of the row in bytes. The zero-based column ordinal. The index within the field from which to begin the read operation. The buffer into which to read the stream of bytes. The index for buffer to begin the read operation. The maximum length to copy into the buffer.
   GetChar
[C#] public char GetChar(int i);
[C++] public: __sealed __wchar_t GetChar(int i);
[VB] NotOverridable Public Function GetChar(ByVal i As Integer) As Char
[JScript] public function GetChar(i: int): Char;
Description
   Gets the value of the specified column as a single character.
Return Value: The value of the specified column.
   No conversions are performed, therefore the data retrieved must already be a character. The zero-based column ordinal.
   GetChars
[C#] public long GetChars(int i, long dataIndex, char[ ] buffer, int bufferIndex, int length);
[C++] public: __sealed __int64 GetChars(int i, __int64 dataIndex, __wchar_t buffer __gc[ ], int bufferIndex, int length);
[VB] NotOverridable Public Function GetChars(ByVal i As Integer, ByVal dataindex As Long, ByVal buffer( ) As Char, ByVal bufferindex As Integer, ByVal length As Integer) As Long
[JScript] public function GetChars(i: int, dataIndex: long, buffer: Char[ ], bufferIndex: int, length: int): long;
Description
   Reads a stream of characters from the specified column offset into the buffer as an array starting at the given buffer offset.
Return Value: The actual number of characters read.
   The actual number of characters read can be less than the requested length, if the end of the field is reached. If you pass a buffer that is null, System.Data.SqlClient.SqlDataReader.GetChars (System.Int32,System.Int64, System.Char[ ],System.Int32, System.Int32) returns the length of the field in characters. The zero-based column ordinal. The index within the row from which to begin the read operation. The buffer into which to copy data. The index for buffer to begin the read operation. The number of characters to read.
   GetData
[C#] public IDataReader GetData(int i);
[C++] public: __sealed IDataReader* GetData(int )
[VB] NotOverridable Public Function GetData(ByVal i As Integer) As IDataReader
[JScript] public function GetData(i: int): IDataReader;
Description
   Not currently supported. The zero-based column ordinal.
   GetDataTypeName
[C#] public string GetDataTypeName(int i);
[C++] public: __sealed String* GetDataTypeName(int i);
[VB] NotOverridable Public Function GetDataTypeName (ByVal i As Integer) As String
[JScript] public function GetDataTypeName(i: int): String;
Description
   Gets the name of the source data type.
Return Value: The name of the back-end data type. The zero-based column ordinal.
   GetDateTime
[C#] public DateTime GetDateTime(int i);
[C++] public: __sealed DateTime GetDateTime(int i);

[VB] NotOverridable Public Function GetDateTime(ByVal i As Integer) As DateTime
[JScript] public function GetDateTime(i: int): DateTime;
Description
Gets the value of the specified column as a System.DateTime object.
Return Value: The value of the specified column.
No conversions are performed, therefore the data retrieved must already be a System.DateTime object. The zero-based column ordinal.
GetDecimal
[C#] public decimal GetDecimal(int i);
[C++] public: _sealed Decimal GetDecimal(int i);
[VB] NotOverridable Public Function GetDecimal(ByVa i As Integer) As Decimal
[JScript] public function GetDecimal(i: int): Decimal;
Description
Gets the value of the specified column as a System.Decimal object.
Return Value: The value of the specified column.
No conversions are performed, therefore the data retrieved must already be a System.Decimal object. The zero-based column ordinal.
GetDouble
[C#] public double GetDouble(int i);
[C++] public: _sealed double GetDouble(int i);
[VB] NotOverridable Public Function GetDouble(ByVal i As Integer) As Double
[JScript] public function GetDouble(i: int): double;
Description
Gets the value of the specified column as a double-precision floating point number.
Return Value: The value of the specified column.
No conversions are performed, therefore the data retrieved must already be a double-precision floating point number. The zero-based column ordinal.
GetFieldType
[C#] public Type GetFieldType(int i);
[C++] public: _sealed Type* GetFieldType(int i);
[VB] NotOverridable Public Function GetFieldType(ByVal i As Integer) As Type
[JScript] public function GetFieldType(i: int): Type;
Description
Gets the System.Type that is the data type of the object.
Return Value: The System.Type that is the data type of the object. The zero-based column ordinal.
GetFloat
[C#] public float GetFloat(int i);
[C++] public: _sealed float GetFloat(int i)
[VB] NotOverridable Public Function GetFloat(ByVal i As Integer) As Single
[JScript] public function GetFloat(i: int): float;
Description
Gets the value of the specified column as a single-precision floating point number.
Return Value: The value of the specified column.
No conversions are performed, therefore the data retrieved must already be a single-precision floating point number. The zero-based column ordinal.
GetGuid
[C#] public Guid GetGuid(int i);
[C++] public: _sealed Guid GetGuid(int i);
[VB] NotOverridable Public Function GetGuid(ByVal i As Integer) As Guid
[JScript] public function GetGuid(i: int): Guid;
Description
Gets the value of the specified column as a globally-unique identifier (GUID).
Return Value: The value of the specified column.
No conversions are performed, therefore the data retrieved must already be a guid. The zero-based column ordinal.
GetInt16
[C#] public short GetIntl16(int i);
[C++] public: _sealed short GetInt16(int i);
[VB] NotOverridable Public Function GetInt16(ByVal i As Integer) As Short
[JScript] public function GetInt16(i: int): Int16;
Description
Gets the value of the specified column as a 16-bit signed integer.
Return Value: The value of the specified column.
No conversions are performed, therefore the data retrieved must already be a 16-bit signed integer. The zero-based column ordinal.
GetInt32
[C#] public int GetInt32(int i);
[C++] public: _sealed int GetInt32(int i);
[VB] NotOverridable Public Function GetInt32(ByVal i As Integer) As Integer
[JScript] public function GetInt32(i: int): int;
Description
Gets the value of the specified column as a 32-bit signed integer.
Return Value: The value of the specified column.
No conversions are performed, therefore the data retrieved must already be a 32-bit signed integer. The zero-based column ordinal. GetInt64
[C#] public long GetInt64(int i);
[C++] public: _sealed _int64 GetInt64(int i);
[VB] NotOverridable Public Function GetInt64(ByVal i As Integer) As Long
[JScript] public function GetInt64(i: int): long;
Description
Gets the value of the specified column as a 64-bit signed integer.
Return Value: The value of the specified column.
No conversions are performed, therefore the data retrieved must already be a 64-bit signed integer. The zero-based column ordinal.
GetName
[#] public string GetName(int i);
[C++] public: _sealed String* GetName(int i);
[VB] NotOverridable Public Function GetName(ByVal i As Integer) As String
[JScript] public function GetName(i: int): String;
Description
Gets the name of the specified column.
Return Value: The name of the specified column. The zero-based column ordinal.
GetOrdinal
[C#] public int GetOrdinal(string name);
[C++] public: _sealed int Getordinal(String* name);
[VB] NotOverridable Public Function GetOrdinal(ByVal name As String) As Integer
[JScript] public function GetOrdinal(name: String): int;
Description
Gets the column ordinal, given the name of the column.
Return Value: The zero-based column ordinal. The name of the column.
GetSchemaTable
[C#] public DataTable GetSchemaTable( );
[C++] public: _sealed DataTable* GetSchemaTable( );
[VB] NotOverridable Public Function GetSchemaTable( ) As DataTable

[JScript] public function GetSchemaTable( ): DataTable;
Description
Returns a System.Data.DataTable that describes the column metadata of the System.Data.SqlClient.SqlDataReader
Return Value: A System.Data.DataTable that describes the column metadata.
For the System.Data.SqlClient.SqlDataReader.GetSchemaTable method returns metadata about each column in the following order: DataReader Column Description ColumnName The name of the column; this might not be unique. If this cannot be determined, a null value is returned. This name always reflects the most recent renaming of the column in the current view or command text.
GetSqlBinary
[C#] public SqlBinary GetSqlBinary(int i);
[C++] public: SqlBinary GetSqlBinary(int i);
[VB] Public Function GetSqlBinary(ByVal i As Integer) As SqlBinary
[JScript] public function GetSqlBinary(i: int): SqlBinary;
Description
Gets the value of the specified column as a System.Data.SqlTypes.SqlBinary.
Return Value: A System.Data.SqlTypes.SqlBinary. The zero-based column ordinal.
GetSqlBoolean
[C#] public SqlBoolean GetSqlBoolean(int i);
[C++] public: SqlBoolean GetSqlBoolean(int i);
[VB] Public Function GetSqlBoolean(ByVal i As Integer) As SqlBoolean
[JScript] public function GetSqlBoolean(i: int): SqlBoolean;
GetSqlByte
[C#] public SqlByte GetSqlByte(int i);
[C++] public: SqlByte GetSqlByte(int i);
[VB] Public Function GetSqlByte(ByVal i As Integer) As SqlByte
[JScript] public function GetSqlByte(i: int): SqlByte;
Description
Gets the value of the specified column as a System.Data.SqlTypes.SqlByte
Return Value: A System.Data.SqlTypes.SqlByte. The zero-based column ordinal.
GetSqlDateTime
[C#] public SqlDateTime GetSqlDateTime(int i);
[C++] public: SqlDateTime GetSqlDateTime(int i);
[VB] Public Function GetSqlDateTime(ByVal i As Integer) As SqlDateTime
[JScript] public function GetSqlDateTime(i: int): SqlDateTime;
Description
Gets the value of the specified column as a System.Data.SqlTypes.SqlDateTime
Return Value. A System.Data.SqlTypes.SqlDateTime. The zero-based column ordinal.
GetSqlDecimal
[C#] public SqlDecimal GetSqlDecimal(int i),
[C++] public: SqlDecimal GetSqlDecimal(int i);
[VB] Public Function GetSqlDecimal(ByVal i As Integer) As SqlDecimal
[JScript] public function GetSqlDecimal(i: int): SqlDecimal;
Description
Gets the value of the specified column as a System.Data.SqlTypes.SqlDecimal
Return Value: A System.Data.SqlTypes.SqlDecimal. The zero-based column ordinal.
GetSqlDouble
[C#] public SqlDouble GetSqlDouble(int i);
[C++] public: SqlDouble GetSqlDouble(int i);
[VB] Public Function GetSqlDouble(ByVal i As Integer) As SqlDouble
[JScript] public function GetSqlDouble(i: int): SqlDouble;
Description
Gets the value of the specified column as a System.Data.SqlTypes.SqlDouble
Return Value: A System.Data.SqlTypes.SqlDouble. The zero-based column ordinal.
GetSqlGuid
[C#] public SqlGuid GetSqlGuid(int i);
[C++] public: SqlGuid GetSqlGuid(int i);
[VB] Public Function GetSqlGuid(ByVal i As Integer) As SqlGuid
[JScript] public function GetSqlGuid(i: int): SqlGuid;
Description
Gets the value of the specified column as a System.Data.SqlTypes.SqlGuid
Return Value: A System.Data.SqlTypes.SqlGuid The zero-based column ordinal.
GetSqlInt16
[C#] public SqlInt16 GetSqlInt16(int i);
[C++] public: SqlInt16 GetSqlInt16(int i);
[VB] Public Function GetSqlInt16(ByVal i As Integer) As SqlInt16
[JScript] public function GetSqlInt16(i: int): SqlInt16;
Description
Gets the value of the specified column as a System.Data.SqlTypes.SqlInt16
Return Value: A System.Data.SqlTypes.SqlInt16. The zero-based column ordinal.
GetSqlInt32
[C#] public SqlInt32 GetSqlInt32(int i);
[C++] public: SqlInt32 GetSqlInt32(int i);
[VB] Public Function GetSqlInt32(ByVal i As Integer) As SqlInt32
[JScript] public function GetSqlInt32(i: int): SqlInt32;
Description
Gets the value of the specified column as a System.Data.SqlTypes.SqlInt32.
Return Value: A System.Data.SqlTypes.SqlInt32. The zero-based column ordinal.
GetSqlInt64
[C#] public SqlInt64 GetSqlInt64(int i);
[C++] public: SqlInt64 GetSqlInt64(int i);
[VB] Public Function GetSqlInt64(ByVal i As Integer) As SqlInt64
[JScript] public function GetSqlInt64(i: int): SqlInt64;
Description
Gets the value of the specified column as a System.Data.SqlTypes.SqlInt64.
Return Value: A System.Data.SqlTypes.SqlInt64. The zero-based column ordinal.
GetSqlMoney
[C#] public SqlMoney GetSqlMoney(int i);
[C++] public: SqlMoney GetSqlMoney(int i);
[VB] Public Function GetSqlMoney(ByVal i As Integer) As SqlMoney
[JScript] public function GetSqlMoney(i: int): SqlMoney;
Description
Gets the value of the specified column as a System.Data.SqlTypes.SqlMoney.
Return Value: A System.Data.SqlTypes.SqlMoney. The zero-based column ordinal.
GetSqlSingle
[C#] public SqlSingle GetSqlSingle(int i);
[C++] public: SqlSingle GetSqlSingle(int i);

[VB] Public Function GetSqlSingle(ByVal i As Integer) As SqlSingle
[JScript] public function GetSqlSingle(i: int): SqlSingle;
Description
  Gets the value of the specified column as a System.Data.SqlTypes.SqlSingle.
Return Value: A System.Data.SqlTypes.SqlSingle. The zero-based column ordinal.
  GetSqlString
[C#] public SqlString GetSqlString(int i);
[C++] public: SqlString GetSqlString(int i);
[VB] Public Function GetSqlString(ByVal i As Integer) As SqlString
[JScript] public function GetSqlString(i: int): SqlString;
Description
  Gets the value of the specified column as a System.Data.SqlTypes.SqlString.
Return Value: A System.Data.SqlTypes.SqlString. The zero-based column ordinal.
  GetSqlValue
[C#] public object GetSqlValue(int i);
[C++] public: Object* GetSqlValue(int i);
[VB] Public Function GetSqlValue(ByVal i As Integer) As Object
[JScript] public function GetSqlValue(i: int): Object;
Description
  Gets an System.Object that is a representation of the underlying System.Data.SqlDbTypeVariant.
Return Value: An System.Object that is a representation of the underlying System.Data.SqlDbTypeVariant.
  System.Data.SqlClient.SqlDataReader.GetSqlValue (System.Int32) returns data using the native SQL Server types. To retrieve data using the .Net Framework types, see System.Data.SqlClient.SqlDataReader.GetValue (System.Int32). The zero-based column ordinal.
  GetSqlValues
[C#] public int GetSqlValues(object[ ] values);
[C++] public: int GetSqlValues(Object* values _gc[ ]);
[VB] Public Function GetSqlValues(ByVal values( ) As Object) As Integer
[JScript] public function GetSqlValues(values: Object[ ]): int;
Description
  Gets all the attribute columns in the current row.
Return Value: The number of instances of System.Object in the array.
  For most applications, the System.Data.SqlClient.SqlDataReader.GetValues (System.Object[ ]) method provides an efficient means for retrieving all columns, rather than retrieving each column individually. An array of System.Object to copy the attribute columns into.
  GetString
[C#] public string GetString(int i);
[C++] public: _sealed String* GetString(int i);
[VB] NotOverridable Public Function GetString(ByVal i As Integer) As String
[JScript] public function GetString(i: int): String;
Description
  Gets the value of the specified column as a string.
Return Value: The value of the specified column.
  No conversions are performed, therefore the data retrieved must already be a string. The zero-based column ordinal.
  GetValue
[C#] public object GetValue(int i);
[C++] public: _sealed Object* GetValue(int i);
[VB] NotOverridable Public Function GetValue(ByVal i As Integer) As Object
[JScript] public function GetValue(i: int): Object;
Description
  Gets the value of the specified column in its native format.
  System.Data.SqlClient.SqlDataReader.GetValue (System.Int32) returns data using the .NET Framework types. The zero-based column ordinal.
  GetValues
[C#] public int GetValues(object[ ] values);
[C++] public: _sealed int GetValues(Object* values _gc[ ]);
[VB] NotOverridable Public Function GetValues(ByVal values( ) As Object) As Integer
[JScript] public function GetValues(values: Object[ ]): int;
Description
  Gets all attribute columns in the collection for the current row.
Return Value: The number of instances of System.Object in the array.
  For most applications, this method provides an efficient means for retrieving all columns, rather than retrieving each column individually. An array of System.Object into which to copy the attribute columns.
  IsDBNull
[C#] public bool IsDBNull(int i);
[C++] public: _sealed bool IsDBNull(int i);
[VB] NotOverridable Public Function IsDBNull(ByVal i As Integer) As Boolean
[JScript] public function IsDBNull(i: int): Boolean;
Description
  Gets a value indicating whether the column contains non-existant or missing values.
Return Value: true if the specified column value is equivalent to System.DBNull; otherwise, false. The zero-based column ordinal.
  NextResult
[C#] public bool NextResult( );
[C++] public: _sealed bool NextResult( );
[VB] NotOverridable Public Function NextResult( ) As Boolean
[JScript] public function NextResult( ): Boolean;
Description
  Advances the data reader to the next result, when reading the results of batch Transact-SQL statements.
Return Value: true if there are more rows; otherwise, false.
  Used to process multiple results, which can be generated by executing batch Transact-SQL statements.
  Read
[C#] public bool Read( );
[C++] public: _sealed bool Read( );
[VB] NotOverridable Public Function Read( ) As Boolean
[JScript] public function Read( ): Boolean;
Description
  Advances the System.Data.SqlClient.SqlDataReader to the next record.
Return Value: true if there are more rows; otherwise, false.
  The default position of the System.Data.SqlClient.SqlDataReader is prior to the first record. Therefore, you must call System.Data.SqlClient.SqlDataReader.Read to begin accessing any data.
  IEnumerable.GetEnumerator
[C#] IEnumerator IEnumerable.GetEnumerator( );
[C++] IEnumerator* IEnumerable::GetEnumerator( );
[VB] Function GetEnumerator( ) As IEnumerator Implements IEnumerable.GetEnumerator
[JScript] function IEnumerable.GetEnumerator( ): IEnumerator;

IDisposable.Dispose
[C#] void IDisposable.Dispose( );
[C++] void IDisposable::Dispose( );
[VB] Sub Dispose( ) Implements IDisposable.Dispose
[JScript] function IDisposable.Dispose( );
  SQLDebugging class (System.Data.SqlClient)
  ToString
Description
  Included to support debugging applications. Not intended for direct use.
  SQLDebugging
  Example Syntax:
  ToString
[C#] public SQLDebugging( );
[C++] public: SQLDebugging( );
[VB] Public Sub New( )
[JScript] public function SQLDebugging( );
  ISQLDebug.SQLDebug
[C#] bool ISQLDebug.SQLDebug(int dwpiddebugger, int dwpidDebuggee, string pszMachineName, string pszSDIDLLName, int dwOption, int cbData, byte[ ] rgbData);
[C++] bool ISQLDebug::SQLDebug(int dwpidDebugger, int dwpidDebuggee, String* pszMachineName, String* pszSDIDLLName, int dwOption, int cbData, unsigned char rgbData __gc[ ]);
[VB] Function SQLDebug(ByVal dwpidDebugger As Integer, ByVal dwpidDebuggee As Integer, ByVal pszMachineName As String, ByVal pszSDIDLLName As String, ByVal dwOption As Integer, ByVal cbData As Integer, ByVal rgbData( ) As Byte) As Boolean Implements ISQLDebug.SQLDebug
[JScript] function ISQLDebug.SQLDebug(dwpidDebugger: int, dwpidDebuggee: int, pszMachineName: String, pszSDIDLLName: String, dwOption: int, cbData: int, rgbData: Byte[ ]): Boolean;
  SqlError class (System.Data.SqlClient)
  ToString
Description
  Collects information relevant to a warning or error returned by SQL Server. This class cannot be inherited.
  This class is created by the SQL Server .NET Data Provider when an error occurs. An instance of System.Data.SqlClient.SqlError is created and managed by the System.Data.SqlClient.SqlErrorCollection, which in turn is created by the System.Data.SqlClient.SqlException class.
  Class
  ToString
[C#] public byte Class {get;}
[C++] public: __property unsigned char get_Class( );
[VB] Public ReadOnly Property Class As Byte
[JScript] public function get Class( ): Byte;
Description
  Gets the severity level of the error returned from SQL Server.
  Messages with a severity level of 10 or less are informational and indicate problems caused by mistakes in information that a user has entered. Severity levels from 11 through 16 are generated by the user, and can be corrected by the user. Severity levels from 17 through 25 indicate software or hardware errors. When a level 17, 18, or 19 error occurs, you can continue working, although you might not be able to execute a particular statement.
  LineNumber
  ToString
[C#] public int LineNumber {get;}
[C++] public: __property int get_LineNumber( );
[VB] Public ReadOnly Property LineNumber As Integer
[JScript] public function get LineNumber( ): int;
Description
  Bets the line number within the Transact-SQL command batch or stored procedure that contains the error.
  Line numbering starts at 1. If the value is 0, the line number is not applicable.
  Message
  ToString
[C#] public string Message {get;}
[C++] public: __property String* get_Message( );
[VB] Public ReadOnly Property Message As String
[JScript] public function get Message( ): String;
Description
  Gets the text describing the error.
  Number
  ToString
[C#] public int Number {get;}
[C++] public: __property int get_Number( );
[VB] Public ReadOnly Property Number As Integer
[JScript] public function get Number( ): int;
Description
  Gets a number that identifies the type of error.
  This number corresponds to an entry in the master.dbo.sysmessages table.
  Procedure
  ToString
[C#] public string Procedure {get;}
[C++] public: __property String* get_Procedure( );
[VB] Public ReadOnly Property Procedure As String
[JScript] public function get Procedure( ): String;
Description
  Gets the name of the stored procedure or remote procedure call (RPC) that generated the error.
  Server
  ToString
[C#] public string Server {get;}
[C++] public: __property String* get_Server( );
[VB] Public ReadOnly Property Server As String
[JScript] public function get _Server( ): String;
Description
  Gets the name of the instance of SQL Server that generated the error.
  Source
  ToString
[C#] public string Source {get;}
[C++] public: __property String* get_Source( );
[VB] Public ReadOnly Property Source As String
[JScript] public function get Source( ): String;
Description
  Gets the name of the provider that generated the error.
  State
  ToString
[C#] public byte State {get;}
[C++] public: __property unsigned char get_State( );
[VB] Public ReadOnly Property State As Byte
[JScript] public function get State( ): Byte;
Description
  Gets the number modifying the error to provide additional information.
  ToString
[C#] public override string ToString( );
[C++] public: String* ToString( );
[VB] Overrides Public Function ToString( ) As String
[JScript] public override function ToString( ): String;
Description
  Gets the complete text of the error message.

Return Value: The complete text of the error.

The string is in the form "SqlError:", followed by the System.Data.SqlClient.SqlError.Message, and the stack trace. For example: SqlError:UserId or Password not valid. The following example displays each System.Data.SqlClient.SqlError within the System.Data.SqlClient.SqlErrorCollection collection.

SqlErrorCollection class (System.Data.SqlClient)
ToString
Description

Collects all errors thrown by the System.Data.SqlClient.SqlDataAdapter. This class cannot be inherited.

This class is created by System.Data.SqlClient.SqlException to collect instances of the System.Data.SqlClient.SqlError class.

Count
ToString
[C#] public int Count {get;}
[C++] public: __property int get_Count( );
[VB] Public ReadOnly Property Count As Integer
[JScript] public function get Count( ): int;
Description Gets the number of errors in the collection.

Item
ToString
[C#] public SqlError this[int index] {get;}
[C++] public: __property SqlError* get_Item(int index);
[VB] Public Default ReadOnly Property Item(ByVal index As Integer) As SqlError
[JScript] returnValue=SqlErrorCollectionObject.Item (index);
Description Gets the error at the specified index. The zero-based index of the error to retrieve.

CopyTo
[C#] public void CopyTo(Array array, int index);
[C++] public: __sealed void CopyTo(Array* array, int index);
[VB] NotOverridable Public Sub CopyTo(ByVal array As Array, ByVal index As Integer)
[JScript] public function CopyTo(array: Array, index int);
Description Copies the elements of the System.Data.SqlClient.SqlErrorCollection collection into an System.Array , starting at the given index within the System.Array . The System.Array to copy elements into. The index from which to start copying into the array parameter.

GetEnumerator
[C#] public IEnumerator GetEnumerator( );
[C++] public: __sealed IEnumerator* GetEnumerator( );
[VB] NotOverridable Public Function GetEnumerator( ) As IEnumerator
[JScript] public function GetEnumerator( ): IEnumerator;
Description used to support the VB For Each . . . Next syntax. not explicitly called.

SqlException class (System.Data.SqlClient)
ToString
Description

The exception that is thrown when a warning or error is returned by SQL Server. This class cannot be inherited.

This class is created whenever the SQL Server .NET Data Provider encounters a situation that it cannot handle. It always contains at least one instance of System.Data.SqlClient.SqlError.

Class
ToString

[C#] public byte Class {get;}
[C++] public: __property unsigned char get_Class( );
[VB] Public ReadOnly Property Class As Byte
[JScript] public function get Class( ): Byte;
Description Gets the severity level of the error returned from the SQL Server .NET Data Provider.

Messages with a severity level of 10 or less are informational and indicate problems caused by mistakes in information that a user has entered. Severity levels from 11 through 16 are generated by the user, and can be corrected by the user. Severity levels from 17 through 25 indicate software or hardware errors. When a level 17, 18, or 19 error occurs, you can continue working, although you might not be able to execute a particular statement.

Errors
ToString
[C#] public SqlErrorCollection Errors {get;}
[C++] public: __property SqlErrorCollection* get_Errors( );
[VB] Public ReadOnly Property Errors As SqlErrorCollection
[JScript] public function get Errors( ): SqlErrorCollection;
Description Gets a collection of one or more System.Data.SqlClient.SqlError objects that give detailed information about exceptions generated by the SQL Server .NET Data Provider.

The System.Data.SqlClient.SqlErrorCollection class always contains at least one instance of the System.Data.SqlClient.SqlError class.

HelpLink
HResult
InnerException
LineNumber
ToString
Description

Gets the line number within the Transact-SQL command batch or stored procedure that generated the error.

The line numbering starts at 1; if 0 the line number is not applicable.

Message
ToString
[C#] public override string Message {get;}
[C++] public: __property virtual String* get_Message( );
[VB] Overrides Public ReadOnly Property Message As String
[JScript] public function get Message( ): String;
Description Gets the text describing the error.

This is a wrapper for the System.Data.SqlClient.SqlError.Message property of the first System.Data.SqlClient.SqlError in the System.Data.SqlClient.SqlException.Errors property.

Number
ToString
[C#] public int Number {get;}
[C++] public: __property int get_Number( );
[VB] Public ReadOnly Property Number As Integer
[JScript] public function get Number( ): int;
Description Gets a number that identifies the type of error.

This number corresponds to an entry in the master.dbo.sysmessages table.

Procedure
ToString
[C#] public string Procedure {get;}
[C++] public: __property String* get_Procedure( );

[VB] Public ReadOnly Property Procedure As String
[JScript] public function get Procedure( ): String;
Description
   Gets the name of the stored procedure or remote procedure call (RPC) that generated the error.
   This is a wrapper for the System.Data.SqlClient.SqlError.Procedure property of the first System.Data.SqlClient.SqlError in the System.Data.SqlClient.SqlException.Errors property.
   Server
   ToString
[C#] public string Server {get;}
[C++] public: __property String* get__Server( );
[VB] Public ReadOnly Property Server As String
[JScript] public function get Server( ): String;
Description
   Gets the name of the computer running an instance of SQL Server that generated the error.
   This is a wrapper for the System.Data.SqlClient.SqlError.Server property of the first System.Data.SqlClient.SqlError in the System.Data.SqlClient.SqlException.Errors property.
   Source
   ToString
[C#] public override string Source {get;}
[C++] public: __property virtual String* get__Source( );
[VB] Overrides Public ReadOnly Property Source As String
[JScript] public function get Source( ): String;
Description
   Gets the name of the provider that generated the error.
   This is a wrapper for the System.Data.SqlClient.SqlError.Source property of the first System.Data.SqlClient.SqlError in the System.Data.SqlClient.SqlException.Errors property.
   StackTrace
   State
   ToString
Description
   Gets the number modifying the error to provide additional information.
   This is a wrapper for the System.Data.SqlClient.SqlError.State property of the first System.Data.SqlClient.SqlError in the System.Data.SqlClient.SqlException.Errors property.
   TargetSite
   ISerializable.GetObjectData
[C#] void ISerializable.GetObjectData(SerializationInfo si, StreamingContext context);
[C++] void ISerializable::GetObjectData(SerializationInfo* si, StreamingContext context);
[VB] Sub GetObjectData(ByVal si As SerializationInfo, ByVal context As StreamingContext) Implements ISerializable.GetObjectData
[JScript] function ISerializable.GetObjectData(si: SerializationInfo, context StreamingContext);
   SqlInfoMessageEventArgs class (System.Data.SqlClient)
   ToString
Description
   Provides data for the System.Data.SqlClient.SqlConnection.InfoMessage event. This class cannot be inherited.
   The System.Data.SqlClient.SqlConnection.InfoMessage event contains a System.Data.SqlClient.SqlErrorCollection collection which contains the warnings sent from the server.
   Errors
   ToString
[C#] public SqlErrorCollection Errors {get;}
[C++] public: __property SqlErrorCollection* get__Errors( );
[VB] Public ReadOnly Property Errors As SqlErrorCollection
[JScript] public function get Errors( ): SqlErrorCollection;
Description
   Gets the collection of warnings sent from the server.
   SqlInfoMessageEventHandler delegate (System.Data.SqlClient)
   ToString
Description
   Represents the method that will handle the System.Data.SqlClient.SqlConnection.InfoMessage event of a System.Data.SqlClient.SqlConnection. The source of the event. A System.Data.SqlClient.SqlInfoMessageEventArgs object that contains the event data.
   When you create a System.Data.SqlClient.SqlInfoMessageEventArgs delegate, you identify the method that will handle the event. To associate the event with your event handler, add an instance of the delegate to the event. The event handler is called whenever the event occurs, unless you remove the delegate. For more information about event handler delegates, see.
   SqlParameter class (System.Data.SqlClient)
   ToString
Description
   Represents a parameter to a System.Data.SqlClient.SqlCommand, and optionally, its mapping to System.Data.DataSet columns. This class cannot be inherited.
   Parameter names are not case sensitive.
   SqlParameter
   Example Syntax:
   ToString
[C#] public SqlParameter( );
[C++] public: SqlParameter( );
[VB] Public Sub New( )
[JScript] public function SqlParameter( ); Initializes a new instance of the System.Data.SqlClient.SqlParameter class.
Description
   Initializes a new instance of the System.Data.SqlClient.SqlParameter class.
   SqlParameter
   Example Syntax:
   ToString
[C#] public SqlParameter(string parameterName, object value);
[C++] public: SqlParameter(String* parameterName, Object* value);
[VB] Public Sub New(ByVal parameterName As String, ByVal value As Object)
[JScript] public function SqlParameter(parameterName: String, value: Object);
Description
   Initializes a new instance of the System.Data.SqlClient.SqlParameter class with the parameter name and a System.Data.SqlClient.SqlParameter object. The name of the parameter to map. An System.Object that is the value of the System.Data.SqlClient.SqlParameter.
   SqlParameter
   Example Syntax:
   ToString
[C#] public SqlParameter(string parameterName, SqlDbType dbType);
[C++] public: SqlParameter(String* parameterName, SqlDbType dbtype);
[VB] Public Sub New(ByVal parameterName As String, ByVal dbType As SqlDbType)

[JScript] public function SqlParameter(parameterName: String, dbType: SqlDbType);
Description
Initializes a new instance of the System.Data.SqlClient.SqlParameter class with the parameter name and the data type.
The data type, and if appropriate, System.Data.OleDb.OleDbParameter.Size and System.Data.OleDb.OleDbParameter.Precision are inferred from the value of the dbType parameter. The name of the parameter to map. One of the System.Data.SqlDbType values.
SqlParameter
Example Syntax:
ToString
[C#] public SqlParameter(string parameterName, SqlDbType dbType, int size);
[C++] public: SqlParameter(String* parameterName, SqlDbType dbType, int size);
[VB] Public Sub New(ByVal parameterName As String, ByVal dbType As SqlDbType, ByVal size As Integer)
[JScript] public function SqlParameter(parameterName: String, dbType: SqlDbType, size: int);
Description
Initializes a new instance of the System.Data.SqlClient.SqlParameter class with the parameter name, the System.Data.SqlDbType, and the size.
The System.Data.OleDb.OleDbParameter.Size is inferred from the value of the dbType parameter if it is not explicity set in the size parameter. The name of the parameter to map. One of the System.Data.SqlDBType values. The width of the parameter.
SqlParameter
Example Syntax:
ToString
[C#] public SqlParameter(string parameterName, SqlDbType dbType, int size, string sourceColumn);
[C++] public: SqlParameter(String* parameterName, SqlDbType dbType, int size, String* sourceColumn);
[VB] Public Sub New(ByVal parameterName As String, ByVal dbType As SqlDbType, ByVal size As Integer, ByVal sourceColumn As String)
[JScript] public function SqlParameter(parameterName: String, dbType: SqlDbType, size: int, sourceColumn: String);
Description
Initializes a new instance of the System.Data.SqlClient.SqlParameter class with the parameter name, the System.Data.SqlDbType, the size, the source column name, and a System.Data.DataRowVersion to use.
The System.Data.OleDb.OleDbParameter.Size is inferred from the value of the dbType parameter if it is not explicity set in the size parameter. The name of the parameter to map. One of the System.Data.SqlDbType values. The width of the parameter. The name of the source column.
SqlParameter
Example Syntax:
ToString
[C#] public SqlParameter(string parameterName, SqlDbType dbType, int size, ParameterDirection direction, bool isNullable, byte precision, byte scale, string sourceColumn, DataRowVersion sourceVersion, object value);
[C++] public: SqlParameter(String* parameterName, SqlDbType dbType, int size, ParameterDirection direction, bool isNullable, unsigned char precision, unsigned char scale, String* sourceColumn, DataRowVersion sourceVersion, Object* value);
[VB] Public Sub New(ByVal parameterName As String, ByVal dbType As SqlDbType, ByVal size As Integer, ByVal direction As ParameterDirection, ByVal isNullable As Boolean, ByVal precision As Byte, ByVal scale As Byte, ByVal sourceColumn As String, ByVal sourceVersion As DataRowVersion, ByVal value As Object)
[JScript] public function SqlParameter(parameterName: String, dbType: SqlDbType, size: int, direction: ParameterDirection, isNullable: Boolean, precision: Byte, scale: Byte, sourceColumn: String, sourceVersion: DataRowVersion, value: Object);
Description
Initializes a new instance of the System.Data.SqlClient.SqlParameter class with the parameter name, the type of the parameter, the size of the parameter, a System.Data.ParameterDirection, the precision of the parameter, the scale of the parameter, the source column, a System.Data.DataRowVersion to use, and the value of the parameter.
The System.Data.OleDb.OleDbParameter.Size and System.Data.OleDb.OleDbParameter.Precision are inferred from the value of the dbType parameter if they are not explicity set in the size and precision parameters. The name of the parameter to map. One of the System.Data.SqlDbType values. The width of the parameter. One of the System.Data.ParameterDirection values. true if the value of the field can be null, otherwise false. The total number of digits to the left and right of the decimal point to which System.Data.SqlClient.SqlParameter.Value is resolved. The total number of decimal places to which System.Data.SqlClient.SqlParameter.Value is resolved. The name of the source column. One of the System.Data.DataRowVersion values. An System.Object that is the value of the System.Data.SqlClient.SqlParameter.
DbType
ToString
[C#] public DbType DbType {get; set;}
[C++] public: __property DbType get_DbType( );public: __property void set_DbType(DbType);
[VB] Public Property DbType As DbType
[JScript] public function get DbType( ): DbType;public function set DbType(DbType);
Description
Gets or sets the System.Data.DbType of the parameter.
The System.Data.SqlClient.SqlParameter.SqlDbType and System.Data.SqlClient.SqlParameter.DbType are linked. Therefore, setting the System.Data.SqlClient.SqlParameter.DbType changes the System.Data.SqlClient.SqlParameter.SqlDbType to a supporting System.Data.SqlClient.SqlParameter.SqlDbType.
Direction
ToString
[C#] public ParameterDirection Direction {get; set;}
[C++] public: __property ParameterDirection get_Direction( );public: __property void set_Direction(ParameterDirection);
[VB] Public Property Direction As ParamneterDirection
[JScript] public function get Direction( ): ParameterDirection;public function set Direction(ParameterDirection);
Description
Gets or sets a value indicating whether the parameter is input-only, outputonly, bidirectional, or a stored procedure return value parameter.
If the System.Data.ParameterDirection is output, and execution of the associated System.Data.SqlClient.SqlCommand does not return a value, the System.Data.SqlClient.SqlParameter contains a null value.

IsNullable
ToString
[C#] public bool IsNullable {get; set;}
[C++] public: _property bool get_IsNullable( );public: _property void set_IsNullable(bool);
[VB] Public Property IsNullable As Boolean
[JScript] public function get IsNullable( ): Boolean;public function set IsNullable(Boolean);
Description
Gets or sets a value indicating whether the parameter accepts null values.
Null values are handled using the System.DBNull class.
Offset
ToString
[C#] public int Offset {get; set;}
[C++] public: _property int get_Offset( );public: _property void set_Offset(int);
[VB] Public Property Offset As Integer
[JScript] public function get Offset( ): int;public function set Offset(int);
Description
Gets or sets the offset to the System.Data.SqlClient.SqlParameter.Value property.
This property is used for binary and string types. It returns the number of bytes for binary types, and the number of characters for strings. The count for strings does not include the terminating character, if null.
ParameterName
ToString
[C#] public string ParameterName {get; set;}
[C++] public: _property String* get_ParameterName( ); public: _property void set_ParameterName(String*);
[VB] Public Property ParameterName As String
[JScript] public function get ParameterName( ): String;public function set ParameterName(String);
Description
Gets or sets the name of the System.Data.SqlClient.SqlParameter.
The System.Data.SqlClient.SqlParameter.ParameterName is specified in the form @paramname. You must set System.Data.SqlClient.SqlParameter.ParameterName before executing a System.Data.SqlClient.SqlCommand that relies on parameters.
Precision
ToString
[C#] public byte Precision {get; set;}
[C++] public: _property unsigned char get_Precision( ); public: _property void set_Precision(unsigned char);
[VB] Public Property Precision As Byte
[JScript] public function get Precision( ): Byte;public function set Precision(Byte);
Description
Gets or sets the maximum number of digits used to represent the System.Data.SqlClient.SqlParameter.Value property.
The System.Data.SqlClient.SqlParameter.Precision property is used by parameters which have a System.Data.SqlDbType of Decimal.
Scale
ToString
[C#] public byte Scale {get; set;}
[C++] public: _property unsigned char get_Scale( );public: _property void set_Scale(unsigned char);
[VB] Public Property Scale As Byte
[JScript] public function get Scale( ): Byte;public function set Scale(Byte);

Description
Gets or sets the number of decimal places to which System.Data.SqlClient.SqlParameter.Value is resolved.
The System.Data.SqlClient.SqlParameter.Scale property is used by parameters which have a System.Data.SqlDbType of Decimal.
Size
ToString
[C#] public int Size {get; set;}
[C++] public: _property int get_Size( );public: _property void set_Size(int);
[VB] Public Property Size As Integer
[JScript] public function get Size( ): int;public function set Size(int);
Description
Gets or sets the maximum size, in bytes, of the data within the column.
The System.Data.SqlClient.SqlParameter.Size property is used for binary and string types.
SourceColumn
ToString
[C#] public string SourceColumn {get; set;}
[C++] public: _property String* get_SourceColumn( ); public: _property void set_SourceColumn(String*);
[VB] Public Property SourceColumn As String
[JScript] public function get SourceColumn( ): String;public function set SourceColumn(String);
Description
Gets or sets the name of the source column that is mapped to the System.Data.DataSet and used for loading or returning the System.Data.SqlClient.SqlParameter.Value.
The link betwen the value of the System.Data.SqlClient.SqlParameter and the System.Data.DataTable may be bidirectional depending on the value of the System.Data.SqlClient.SqlParameter.Direction property.
SourceVersion
ToString
[C#] public DataRowVersion SourceVersion {get; set;}
[C++] public: _property DataRowVersion get_SourceVersion( );public: _property void set_SourceVersion(DataRowVersion);
[VB] Public Property SourceVersion As DataRowVersion
[JScript] public function get SourceVersion( ): DataRowVersion;public function set SourceVersion(DataRowVersion);
Description
Gets or sets the System.Data.DataRowVersion to use when loading System.Data.SqlClient.SqlParameter.Value.
This property is used by the System.Data.SqlClient.SqlDataAdapter.UpdateCommand during the System.Data.Common.DbDataAdapter.Update (System.Data.DataSet) to determine whether the original or current value is used for a parameter value. This allows primary keys to be updated. This property is ignored by the System.Data.SqlClient.SqlDataAdapter.InsertCommand and System.Data.SqlClient.SqlDataAdapter.DeleteCommand. This property is set to the version of the System.Data.DataRow used by the System.Data.DataRow.Item(System.Int32) property, or the System.Data.DataRow.GetChildRows(System.String) method of the System.Data.DataRow object.
SqlDbType
ToString
[C#] public SqlDbType SqlDbType {get; set;}
[C++] public: _property SqlDbType get_SqlDbType( ); public: _property void set_SqlDbType(SqlDbType);
[VB] Public Property SqlDbType As SqlDbType
[JScript] public function get SqlDbType( ): SqlDbType;public function set SqlDbType(SqlDbType);

Description
  Gets or sets the System.Data.SqlDbType of the parameter. The System.Data.SqlClient.SqlParameter.SqlDbType and System.Data.SqlClient.SqlParameter.DbType are linked. Therefore, setting the System.Data.SqlClient.SqlParameter.DbType changes the System.Data.SqlClient.SqlParameter.SqlDbType to a supporting System.Data.SqlDbType.
  Value
  ToString
[C#] public object Value {get; set;}
[C++] public: __property Object* get_Value( );public: __property void set_Value(Object*);
[VB] Public Property Value As Object
[JScript] public function get Value( ): Object;public function set Value(Object);
Description
  Gets or sets the value of the parameter.
  For input parameters, the value is bound to the System.Data.SqlClient.SqlCommand that is sent to the server. For output and return value parameters, the value is set on completion of the System.Data.SqlClient.SqlCommand and after the System.Data.SqlClient.SqlDataReader is closed.
  ICloneable.Clone
[C#] object ICloneable.Clone( );
[C++] Object* ICloneable::Clone( );
[VB] Function Clone( ) As Object Implements ICloneable.Clone
[JScript] function ICloneable.Clone( ): Object;
  ToString
[C#] public override string ToString( );
[C++] public: String* ToString( );
[VB] Overrides Public Function ToString( ) As String
[JScript] public override function ToString( ): String;
Description
  Gets a string containing the System.Data.SqlClient.SqlParameter.ParameterName.
Return Value: A string containing the System.Data.SqlClient.SqlParameter.ParameterName.
  SqlParameterCollection class (System.Data.SqlClient)
  ToString
Description
  Collects all parameters relevant to a System.Data.SqlClient.SqlCommand and their respective mappings to System.Data.DataSet columns. This class cannot be inherited.
  The number of the parameters in the collection must be equal to the number of parameter placeholders within the command text, or SQL Server raises an error.
  Count
  ToString
[C#] public int Count {get;}
[C++] public: __property int get_Count( );
[VB] Public ReadOnly Property Count As Integer
[JScript] public function get Count( ): int;
Description
  Gets the number of System.Data.SqlClient.SqlParameter objects in the collection.
  Item
  ToString
[C#] public SqlParameter this[int index] {get; set;}
[C++] public: __property SqlParameter* get_Item(int index);public: __property void set_Item(int index, SqlParameter*);
[VB] Public Default Property Item(ByVal index As Integer) As SqlParameter
[JScript] returnValue=SqlParameterCollectionObject.Item (index); SqlParameterCollectionObject.Item(index)= returnvalue; Gets the System.Data.SqlClient.SqlParameter with a specified attribute.

Description
  Gets the System.Data.SqlClient.SqlParameter at the specified index. The zero-based index of the parameter to retrieve.
  Item
  ToString
[C#] public SqlParameter this[string parameterName] {get; set;}
[C++] public: __property SqlParameter* get_Item(String* parameterName);public: __property void set_Item (String* parameterName, SqlParameter*);
[VB] Public Default Property Item(ByVal parameterName As String) As SqlParameter
[JScript] returnValue=SqlParameterCollectionObject.Item (parameterName); SqlParameterCollectionObject.Item (parameterName)=returnvalue;
Description
  Gets the System.Data.SqlClient.SqlParameter with the specified name. The name of the parameter to retrieve.
  Add
[C#] public int Add(object value);
[C++] public: __sealed int Add(Object* value);
[VB] NotOverridable Public Function Add(ByVal value As Object) As Integer
[JScript] public function Add(value: Object): int; Adds a System.Data.SqlClient.SqlParameter to the System.Data.SqlClient.SqlParameterCollection
Description
  Adds the specified System.Data.SqlClient.SqlParameter object to the System.Data.SqlClient.SqlParameterCollection.
Return Value: A reference to the new System.Data.SqlClient.SqlParameter object. The System.Data.SqlClient.SqlParameter to add to the collection.
  Add
[C#] public SqlParameter Add(SqlParameter value);
[C++] public: SqlParameter* Add(SqlParameter* value);
[VB] Public Function Add(ByVal value As SqlParameter) As SqlParameter
[JScript] public function Add(value: SqlParameter): SqlParameter;
Description
  Adds the specified System.Data.SqlClient.SqlParameter object to the System.Data.SqlClient.SqlCommand
Return Value: A reference to the new System.Data.SqlClient.SqlParameter object. The System.Data.SqlClient.SqlParameter to be added.
  Add
[C#] public SqlParameter Add(string parameterName, object value);
[C++] public: SqlParameter* Add(String* parameterName, Object* value);
[VB] Public Function Add(ByVal parameterName As String, ByVal value As Object) As SqlParameter
[JScript] public function Add(parameterName: String, value: Object): SqlParameter;
Description
  Adds a System.Data.SqlClient.SqlParameter to the System.Data.SqlClient.SqlParameterCollection with the specified parameter name and System.Data.SqlClient.SqlParameter object.
Return Value: A reference to the new System.Data.SqlClient.SqlParameter object.
  When you specify System.DBNull.Value in the value parameter, you should also explicitly set the System.Data.SqlClient.SqlParameter.SqlDbType as demonstrated in this C# example: SqlCommand rComm=new SqlCommand(null, rConn); rComm.CommandText="insert into mytable values (?)"; rComm.Parameters.Add("@p1", DBNull.Value); rComm.Parameters["@p1"].SqlDbType= SqlDbType.Integer;x The System.Data.SqlClient.SqlParameter.Value of the System.Data.SqlClient.SqlParameter to add to the collection.
Add
[C#] public SqlParameter Add(string parameterName, SqlDbType sqlDbType);
[C++] public: SqlParameter* Add(String* parameterName, SqlDbType sqlDbType);
[VB] Public Function Add(ByVal parameterName As String, ByVal sqlDbType As SqlDbType) As SqlParameter
[JScript] public function Add(parameterName: String, sqlDbType: SqlDbType): SqlParameter;
Description
Adds a System.Data.SqlClient.SqlParameter to the System.Data.SqlClient.SqlParameterCollection with the parameter name and the data type.
Return Value: A reference to the new System.Data.SqlClient.SqlParameter object.
Add
[C#] public SqlParameter Add(string parameterName, SqlDbType sqlDbType, int size);
[C++] public: SqlParameter* Add(String* parameterName, SqlDbType sqlDbType, int size);
[VB] Public Function Add(ByVal parameterName As String, ByVal sqlDbType As SqlDbType, ByVal size As Integer) As SqlParameter.
[JScript] public function Add(parameterName: String, sqlDbType: SqlDbType, size: int): SqlParameter;
Description
Adds a System.Data.SqlClient.SqlParameter to the System.Data.SqlClient.SqlParameterCollection with the the parameter name, the data type, and the column width.
Return Value: A reference to the new System.Data.SqlClient.SqlParameter object. The width of the column.
Add
[C#] public SqlParameter Add(string parameterName, SqlDbType sqlDbType, int size, string sourcecolumn);
[C++] public: SqlParameter* Add(String* parameterName, SqlDbType sqlDbType, int size, String* sourceColumn);
[VB] Public Function Add(ByVal parameterName As String, ByVal sqlDbType As SqlDbType, ByVal size As Integer, ByVal sourceColumn As String) As SqlParameter
[JScript] public function Add(parameterName: String, sqlDbType: SqlDbType, size: int, sourceColumn: String): SqlParameter;
Description
Adds a System.Data.SqlClient.SqlParameter to the System.Data.SqlClient.SqlParameterCollection with the parameter name, the data type, the column width, and the source column name.
Return Value: A reference to the new System.Data.SqlClient.SqlParameter object. The width of the column. The name of the source column.
Clear
[C#] public void Clear( );
[C++] public: _sealed void Clear( );
[VB] NotOverridable Public Sub Clear( )
[JScript] public function Clear( );
Description
Removes all items from the collection.
Contains
[C#] public bool Contains(object value);
[C++] public: _sealed bool Contains(Object* value);
[VB] NotOverridable Public Function Contains(ByVal value As Object) As Boolean
[JScript] public function Contains(value: Object): Boolean;
Description
Indicates whether a System.Data.SqlClient.SqlParameter exists in the collection.
Return Value: true if the collection contains the System.Data.SqlClient.SqlParameter object; otherwise, false. A System.Data.SqlClient.SqlParameter object.
Contains
[C#] public bool Contains(string value);
[C++] public: sealed bool Contains(String* value);
[VB] NotOverridable Public Function Contains(ByVal value As String) As Boolean
[JScript] public function Contains(value: String): Boolean;
Indicates whether a System.Data.SqlClient.SqlParameter exists in the collection.
Description
Indicates whether a System.Data.SqlClient.SqlParameter with the specified parameter name exists in the collection.
Return Value: true if the collection contains the parameter; otherwise, false. The name of the parameter to retrieve.
CopyTo
[C#] public void CopyTo(Array array, inmt index);
[C++] public: _sealed void CopyTo(Array* array, int index);
[VB] NotOverridable Public Sub CopyTo(ByVal array As Array, ByVal index As Integer)
[JScript] public function CopyTo(array: Array, index: int);
Description
Copies System.Data.SqlClient.SqlParameter objects from the System.Data.SqlClient.SqlParameterCollection to the specified array. An System.Array to which to copy the System.Data.SqlClient.SqlParameter objects in the collection. The starting index of the array.
GetEnumerator
[C#] public IEnumerator GetEnumerator( );
[C++] public: sealed IEnumerator* GetEnumerator( );
[VB] NotOverridable Public Function GetEnumerator( ) As IEnumerator
[JScript] public function GetEnumerator( ): IEnumerator;
Description
IndexOf
[C#] public int IndexOf(object value);
[C++] public: _sealed int IndexOf(Object* value);
[VB] NotOverridable Public Function IndexOf(ByVal value As Object) As Integer
[JScript] public function IndexOf(value: Object): int;
Description
Gets the location of a System.Data.SqlClient.SqlParameter in the collection.
Return Value: The location of the System.Data.SqlClient.SqlParameter in the collection.
IndexOf
[C#] public int IndexOf(string parameterName);
[C++] public: _sealed int IndexOf(String* parameterName);
[VB] NotOverridable Public Function IndexOf(ByVal parameterName As String) As Integer
[JScript] public function IndexOf(parameterName: String): int; Gets the location of a System.Data.SqlClient.SqlParameter in the collection.
Description
Gets the location of the System.Data.SqlClient.SqlParameter in the collection with a specific parameter name.
Return Value: The location of the System.Data.SqlClient.SqlParameter in the collection. The name of the parameter to retrieve.
Insert

[C#] public void Insert(int index, object value);
[C++] public: _sealed void Insert(int index, Object* value);
[VB] NotOverridable Public Sub Insert(ByVal index As Integer, ByVal value As Object)
[JScript] public function Insert(index: int, value: Object);
Description
Inserts a System.Data.SqlClient.SqlParameter in the collection at the specified index. The zero-based index within the collection to insert the valueparameter. The System.Data.SqlClient.SqlParameter to add to the collection.
Remove
[C#] public void Remove(object value);
[C++] public: _sealed void Remove(Object* value);
[VB] NotOverridable Public Sub Remove(ByVal value As Object)
[JScript] public function Remove(value: Object);
Description
Removes the specified System.Data.SqlClient.SqlParameter from the collection. A System.Data.SqlClient.SqlParameter object to remove from the collection.
RemoveAt
[C#] public void RemoveAt(int index);
[C++] public: _sealed void RemoveAt(int index);
[VB] NotOverridable Public Sub RemoveAt(ByVal index As Integer)
[JScript] public function RemoveAt(index: int); Removes the specified System.Data.SqlClient.SqlParameter from the collection.
Description
Removes the specified System.Data.SqlClient.SqlParameter from the collection using a specific index. The zero-based index of the parameter.
RemoveAt
[C#] public void RemoveAt(string parameterName);
[C++] public: _sealed void RemoveAt(String* parameterName);
[VB] NotOverridable Public Sub RemoveAt(ByVal parameterName As String)
[JScript] public function RemoveAt(parameterName: String);
Description
Removes the specified System.Data.SqlClient.SqlParameter from the collection using the parameter name.
SqlRowUpdatedEventArgs class (System.Data.SqlClient)
ToString
Description
Provides data for the System.Data.SqlClient.SqlDataAdapter.RowUpdated event. This class cannot be inherited. The System.Data.SqlClient.SqlDataAdapter.RowUpdated event is raised when an System.Data.Common.DbDataAdapter.Update (System.Data.DataSet) to a row is completed.
SqlRowUpdatedEventArgs
Example Syntax:
ToString
[C#] public SqlRowUpdatedEventArgs(DataRow row, IDbCommand command, StatementType statementType, DataTableMapping tableMapping);
[C++] public: SqlRowUpdatedEventArgs(DataRow* row, IDbCommand* command, StatementType statementType, DataTableMapping* tableMapping);
[VB] Public Sub New(ByVal row As DataRow, ByVal command As IDbCommand, ByVal statementType As StatementType, ByVal tableMapping As DataTableMapping)
[JScript] public function SqlRowUpdatedEventArgs(row: DataRow, command: IDbCommand, statementType: StatementType, tableMapping: DataTableMapping);
Description
Initializes a new instance of the System.Data.SqlClient.SqlRowUpdatedEventArgs class. The System.Data.DataRow sent through an System.Data.Common.DbDataAdapter.Update (System.Data.DataSet). The System.Data.IDbCommand executed when System.Data.Common.DbDataAdapter.Update (System.Data.DataSet) is called. One of the System.Data.StatementType values that specifies the type of query executed. The System.Data.Common.DataTableMapping sent through an System.Data.Common.DbDataAdapter.Update (System.Data.DataSet).
Command
ToString
[C#] public new SqlCommand Command {get;}
[C++] public: _property SqlCommand* get_Command( );
[VB] Public ReadOnly Property Command As SqlCommand
[JScript] public function get Command( ): SqlCommand;
Description
Gets or sets the System.Data.SqlClient.SqlCommand executed when System.Data.Common.DbDataAdapter.Update (System.Data.DataSet) is called.
Errors
RecordsAffected
Row
StatementType
Status
TableMapping
SqlRowUpdatedEventHandler delegate (System.Data.SqlClient)
ToString
Description
Represents the method that will handle the System.Data.SqlClient.SqlDataAdapter.RowUpdated event of a System.Data.SqlClient.SqlDataAdapter. The source of the event. The System.Data.SqlClient.SqlRowUpdatedEventArgs that contains the event data.
The handler is not required perform any action, and your code should avoid generating exceptions or allowing exceptions to propagate to the calling method. Any exceptions that do reach the caller are ignored.
SqlRowUpdatingEventArgs class (System.Data.SqlClient)
ToString
Description
Provides data for the System.Data.SqlClient.SqlDataAdapter.RowUpdating event. This class cannot be inherited. The System.Data.SqlClient.SqlDataAdapter.RowUpdating event is raised before an System.Data.Common.DbDataAdapter.Update (System.Data.DataSet) to a row.
SqlRowUpdatingEventArgs
Example Syntax:
ToString
[C#] public SqlRowUpdatingEventArgs(DataRow row, IDbCommand command, StatementType statementType, DataTableMapping tableMapping);
[C++] public: SqlRowUpdatingEventArgs(DataRow* row, IDbCommand* command, StatementType statementType, DataTableMapping* tableMapping);
[VB] Public Sub New(ByVal row As DataRow, ByVal command As IDbCommand, ByVal statementType As StatementType, ByVal tableMapping As DataTableMapping)

[JScript] public function SqlRowUpdatingEventArgs(row: DataRow, command: IDbCommand, statementType: StatementType, tableMapping: DataTableMapping);
Description
Initializes a new instance of the System.Data.SqlClient.SqlRowUpdatingEventArgs class. The System.Data.DataRow to System.Data.Common.DbDataAdapter.Update (System.Data.DataSet). The System.Data.IDbCommand to execute during System.Data.Common.DbDataAdapter.Update (System.Data.DataSet). One of the System.Data.StatementType values that specifies the type of query executed. The System.Data.Common.DataTableMapping sent through an System.Data.Common.DbDataAdapter.Update (System.Data.DataSet).
Command
ToString
[C#] public new SqlCommand Command {get; set;}
[C++] public: _property SqlCommand* get_Command( ); public: _property void set_Command(SqlCommand*);
[VB] Public Property Command As SqlCommand
[JScript] public function get Command( ): SqlCommand;public function set Command(SqlCommand);
Description
Gets or sets the System.Data.SqlClient.SqlCommand to execute when performing the System.Data.Common.DbDataAdapter.Update (System.Data.DataSet).
Errors
Row
StatementType
Status
TableMapping
SqlRowUpdatingEventHandler delegate (System.Data.SqlClient)
ToString
Description
Represents the method that will handle the System.Data.SqlClient.SqlDataAdapter.RowUpdating event of a System.Data.SqlClient.SqlDataAdapter. The source of the event. The System.Data.SqlClient.SqlRowUpdatingEventArgs that contains the event data.
The handler is not required perform any action, and your code should avoid generating exceptions or allowing exceptions to propagate to the calling method. Any exceptions that do reach the caller are ignored.
SqlTransaction class (System.Data.SqlClient)
ToString
Description
Represents a Transact-SQL transaction to be made in a SQL Server database. This class cannot be inherited.
The application creates a System.Data.SqlClient.SqlTransaction object by calling System.Data.SqlClient.SqlConnection.BeginTransaction on the System.Data.SqlClient.SqlConnection object. All subsequent operations associated with the transaction (for example, committing or aborting the transaction), are performed on the System.Data.SqlClient.SqlTransaction object.
Connection
ToString
[C#] public SqlConnection Connection {get;}
[C++] public: _property SqlConnection* get_Connection( );
[VB] Public ReadOnly Property Connection As SqlConnection
[JScript] public function get Connection( ): SqlConnection;
IsolationLevel
ToString
[C#] public IsolationLevel IsolationLevel {get;}
[C++] public: _property IsolationLevel get_IsolationLevel( );
[VB] Public ReadOnly Property IsolationLevel As IsolationLevel
[JScript] public function get IsolationLevel( ): IsolationLevel;
Description
Specifies the System.Data.IsolationLevel for this transaction.
Parallel transactions are not supported. Therefore, the System.Data.IsolationLevel applies to the entire transaction.
Commit
[C#] public void Commit( );
[C++] public: _sealed void Commit( );
[VB] NotOverridable Public Sub Commit( )
[JScript] public function Commit( );
Description
Commits the database transaction.
The System.Data.SqlClient.SqlTransaction.Commit method is equivalent to the Transact-Sql COMMIT TRANSACTION statement. For more information, see SQL Server Books Online.
Dispose
[C#] public void Dispose( );
[C++] public: _sealed void Dispose( );
[VB] NotOverridable Public Sub Dispose( )
[JScript] public function Dispose( ); Releases the resources used by the System.Data.SqlClient.SqlTransaction.
Description
Releases the unmanaged resources used by the System.Data.SqlClient.SqlTransaction and optionally releases the managed resources.
This method is called by the public method and the System.Object.Finalize method.
Rollback
[C#] public void Rollback( );
[C++] public: _sealed void Rollback( );
[VB] NotOverridable Public Sub Rollback( )
[JScript] public function Rollback( ); Rolls back a transaction from a pending state.
Description
Rolls back a transaction from a pending state.
The System.Data.SqlClient.SqlTransaction.Rollback method is equivalent to the Transact-Sql ROLLBACK TRANSACTION statement. For more information, see SQL Server Books Online.
Rollback
[C#] public void Rollback(string transactionName);
[C++] public: void Rollback(String* transactionName);
[VB] Public Sub Rollback(ByVal transactionName As String)
[JScript] public function Rollback(transactionName: String); Rolls back a transaction from a pending state.
Description
Rolls back a transaction from a pending state, and specifies the transaction or savepoint name.
The System.Data.SqlClient.SqlTransaction.Rollback method is equivalent to the Transact-Sql ROLLBACK TRANSACTION statement. For more information, see SQL Server Books Online. The name of the transaction to rollback, or the savepoint to which to rollback.
Save
[C#] public void Save(string savePointName);
[C++] public: void Save(String* savePointName);
[VB] Public Sub Save(ByVal savePointName As String)

[JScript] public function Save(savePointName: String);
Description

Creates a savepoint in the transaction that can be used to roll back a portion of the transaction, and specifies the savepoint name.

System.Data.SqlClient.SqlTransaction.Save (System.String) method is equivalent to the Transact-SQL SAVE TRANSACTION statement. For more information, see SQL Server Books Online. The name of
System.Data.SqlTypes The namespace provides classes for native data types within SQL Server. These classes provide a safer, faster alternative to other data types. Using the objects within this namespace helps prevent type conversion errors caused in situations where loss of precision could occur. Because other data types are converted to and from SqlTypes behind the scenes, explicitly creating and using objects within this namespace results in faster code as well.
Description The System.Data.SqlTypes namespace provides classes for native data types within SQL Server. These classes provide a safer, faster alternative to other data types. Using the objects within this namespace helps prevent type conversion errors caused in situations where loss of precision could occur. Because other data types are converted to and from SqlTypes behind the scenes, explicitly creating and using objects within this namespace results in faster code as well.

INullable interface (System.Data.SqlTypes)
Description

All of the System.Data.SqlTypes objects and structures implement the INullable interface, reflecting the fact that, unlike the corresponding system types, SqlTypes can legally contain the value null.

Properties:
IsNull
[C#] bool IsNull {get;}
[C++] bool get_IsNull( );
[VB] ReadOnly Property IsNull As Boolean
[JScript] abstract function get IsNull( ): Boolean;
Description Indicates whether a structure is null.

SqlBinary structure (System.Data.SqlTypes)
Description

Represents a variable-length stream of binary data to be stored in or retrieved from a database.
[C#] public static readonly SqlBinary Null;
[C++] public: static SqlBinary Null;
[VB] Public Shared ReadOnly Null As SqlBinary
[JScript] public static var Null: SqlBinary;
Description Represents a null value that can be assigned to the System.Data.SqlTypes.SqlBinary.Value property of a System.Data.SqlTypes.SqlBinary structure.

Null functions as a constant for the SqlBinary structure.
Constructors:
SqlBinary
Example Syntax:
[C#] public SqlBinary(byte[ ] value);
[C++] public: SqlBinary(unsigned char value _gc[ ]);
[VB] Public Sub New(ByVal value( ) As Byte)
[JScript] public function SqlBinary(value: Byte[ ]); Initializes a new instance of the System.Data.SqlTypes.SqlBinary structure.
Description Initializes a new instance of the SqlBinary structure, setting the System.Data.SqlTypes.SqlBinary.Value property to the contents of the supplied byte array. The byte array to be stored or retrieved.

IsNull
[C#] public bool IsNull {get;}
[C++] public: _property bool get_IsNull( );
[VB] Public ReadOnly Property IsNull As Boolean
[JScript] public function get IsNull( ): Boolean;
Description Gets a value indicating whether whether the System.Data.SqlTypes.SqlBinary.Value property of the System.Data.SqlTypes.SqlBinary structure is null. This property is read-only.

Item
[C#] public byte this[int index] {get;}
[C++] public: _property unsigned char get_Item(int index);
[VB] Public Default ReadOnly Property Item(ByVal index As Integer) As Byte
[JScript] returnValue=SqlBinaryObject.Item(index);
Description Gets the single byte from the Value property located at the position indicated by the integer parameter, index. If index indicates a position beyond the end of the byte array, a System.Data.SqlTypes.SqlNullValueException will be raised. This property is read-only.

To avoid raising a SqlNullValueException, always check the System.Data.SqlTypes.SqlBinary.IsNull property and the Length property before reading this. The position of the byte to be retrieved.

Length
[C#] public int Length {get;}
[C++] public: _property int get_Length( );
[VB] Public ReadOnly Property Length As Integer
[JScript] public function get Length( ): int;
Description Gets the length in bytes of the System.Data.SqlTypes.SqlBinary.Value property. This property is read-only.

To avoid raising a SqlNullValueException, always check the System.Data.SqlTypes.SqlBinary.IsNull property before reading the Length property.

Value
[C#] public byte[ ] Value {get;}
[C++] public: _property unsigned char get Value( );
[VB] Public ReadOnly Property Value As Byte ( )
[JScript] public function get Value( ): Byte[ ];
Description Gets the value of the System.Data.SqlTypes.SqlBinary structure. This property is read-only.

To avoid raising a SqlNullValueException, always check the System.Data.SqlTypes.SqlBinary.IsNull property before reading the Value property.

Methods:
CompareTo
[C#] public int CompareTo(object value);
[C++] public: _sealed int CompareTo(Object* value);
[VB] NotOverridable Public Function CompareTo(ByVal value As Object) As Integer
[JScript] public function CompareTo(value: Object): int;
Description Compares this System.Data.SqlTypes.SqlBinary object to the supplied object and returns an indication of their relative values.

Return Value: A signed number indicating the relative values of this SqlBinary structure and the object. The object to be compared to this SqlBinary structure.

Concat
[C#] public static SqlBinary Concat(SqlBinary x, SqlBinary y);

[C++] public: static SqlBinary Concat(SqlBinary x, SqlBinary y);
[VB] Public Shared Function Concat(ByVal x As SqlBinary, ByVal y As SqlBinary) As SqlBinary
[JScript] public static function Concat(x: SqlBinary, y: SqlBinary): SqlBinary;
Description
Concatenates two System.Data.SqlTypes.SqlBinary structures to create a new SqlBinary structure.
Return Value: The concatenated values of the x and y parameters. A SqlBinary structure. A SqlBinary structure.
Equals
[C#] public override bool Equals(object value);
[C++] public: bool Equals(Object* value);
[VB] Overrides Public Function Equals(ByVal value As Object) As Boolean
[JScript] public override function Equals(value: Object): Boolean;
Description
Compares the supplied object parameter to the System.Data.SqlTypes.SqlBinary.Value property of the System.Data.SqlTypes.SqlBinary object.
Return Value: true if object is an instance of System.Data.SqlTypes.SqlBinary and the two are equal; otherwise false. The object to be compared.
Equals
[C#] public static new SqlBoolean Equals(SqlBinary x, SqlBinary y);
[C++] public: static SqlBoolean Equals(SqlBinary x, SqlBinary y);
[VB] Shadows Public Shared Function Equals(ByVal x As SqlBinary, ByVal y As SqlBinary) As SqlBoolean
[JScript] public static hide function Equals(x: SqlBinary, y: SqlBinary): SqlBoolean; Compares two System.Data.SqlTypes.SqlBinary structures to determine if they are equal.
Description
Compares two System.Data.SqlTypes.SqlBinary structures to determine if they are equal.
Return Value: A System.Data.SqlTypes.SqlBoolean that is System.Data.SqlTypes.SqlBoolean.True if the two instances are equal or System.Data.SqlTypes.SqlBoolean.False if the two instances are not equal. If either instance of SqlBinary is null, the System.Data.SqlTypes.SqlBoolean.Value of the SqlBoolean will be System.Data.SqlTypes.SqlBoolean.Null. A SqlBinary structure. A SqlBinary structure.
GetHashCode
[C#] public override int GetHashCode( );
[C++] public: int GetHashCode( );
[VB] Overrides Public Function GetHashCode( ) As Integer
[JScript] public override function GetHashCode( ): int;
Description
Returns the hash code for this System.Data.SqlTypes.SqlBinary structure.
Return Value: A 32-bit signed integer hash code.
GreaterThan
[C#] public static SqlBoolean GreaterThan(SqlBinary x, SqlBinary y);
[C++] public: static SqlBoolean GreaterThan(SqlBinary x, SqlBinary y);
[VB] Public Shared Function GreaterThan(ByVal x As SqlBinary, ByVal y As SqlBinary) As SqlBoolean
[JScript] public static function GreaterThan(x: SqlBinary, y: SqlBinary): SqlBoolean;
Description
Compares two System.Data.SqlTypes.SqlBinary structures to determine if the first is greater than the second.
Return Value: A System.Data.SqlTypes.SqlBoolean that is System.Data.SqlTypes.SqlBoolean.True if the first instance is greater than the second instance, otherwise System.Data.SqlTypes.SqlBoolean.False. If either instance of SqlBinary is null, the System.Data.SqlTypes.SqlBoolean.Value of the SqlBoolean will be System.Data.SqlTypes.SqlBoolean.Null. A SqlBinary structure. A SqlBinary structure.
GreaterThanOrEqual
[C#] public static SqlBoolean GreaterThanOrEqual(SqlBinary x, SqlBinary y);
[C++] public: static SqlBoolean GreaterThanOrEqual(SqlBinary x, SqlBinary y);
[VB] Public Shared Function GreaterThanOrEqual(ByVal x As SqlBinary, ByVal y As SqlBinary) As SqlBoolean
[JScript] public static function GreaterThanOrEqual(x: SqlBinary, y: SqlBinary): SqlBoolean;
Description
Compares two System.Data.SqlTypes.SqlBinary structues to determine if the first is greater than or equal to the second.
Return Value: A System.Data.SqlTypes.SqlBoolean that is System.Data.SqlTypes.SqlBoolean.True if the first instance is greaater than or equal to the second instance, otherwise System.Data.SqlTypes.SqlBoolean.False.
If either instance of SqlBinary is null, the System.Data.SqlTypes.SqlBoolean.Value of the SqlBoolean will be System.Data.SqlTypes.SqlBoolean.Null. A SqlBinary structure. A SqlBinary structure.
LessThan
[C#] public static SqlBoolean LessThan(SqlBinary x, SqlBinary y);
[C++] public: static SqlBoolean LessThan(SqlBinary x, SqlBinary y);
[VB] Public Shared Function LessThan(ByVal x As SqlBinary, ByVal y As SqlBinary) As SqlBoolean
[JScript] public static function LessThan(x: SqlBinary, y: SqlBinary): SqlBoolean;
Description
Compares two System.Data.SqlTypes.SqlBinary structures to determine if the first is less than the second.
Return Value: A System.Data.SqlTypes.SqlBoolean that is System.Data.SqlTypes.SqlBoolean.True if the first instance is less than the second instance, otherwise System.Data.SqlTypes.SqlBoolean.False. If either instance of SqlBinary is null, the System.Data.SqlTypes.SqlBoolean.Value of the SqlBoolean will be System.Data.SqlTypes.SqlBoolean.Null. A SqlBinary structure. A SqlBinary structure.
LessThanOrEqual
[C#] public static SqlBoolean LessThanOrEqual(SqlBinary x, SqlBinary y);
[C++] public: static SqlBoolean LessThanOrEqual(SqlBinary x, SqlBinary y);
[VB] Public Shared Function LessThanOrEqual(ByVal x As SqlBinary, ByVal y As SqlBinary) As SqlBoolean
[JScript] public static function LessThanOrEqual(x: SqlBinary, y: SqlBinary): SqlBoolean;
Description
Compares two System.Data.SqlTypes.SqlBinary structures to determine if the first is less than or equal to the second.
Return Value: A System.Data.SqlTypes.SqlBoolean that is System.Data.SqlTypes.SqlBoolean.True if the first instance is less than or equal to the second instance, otherwise System.Data.SqlTypes.SqlBoolean.False. If either instance of SqlBinary is null, the System.Data.SqlTypes.SqlBoolean.Value of the SqlBoolean will be System.Data.SqlTypes.SqlBoolean.Null. A SqlBinary structure. A SqlBinary structure.
NotEquals
[C#] public static SqlBoolean NotEquals(SqlBinary x, SqlBinary y);

[C++] public: static SqlBoolean NotEquals(SqlBinary x, SqlBinary y);
[VB] Public Shared Function NotEquals(ByVal x As SqlBinary, ByVal y As SqlBinary) As SqlBoolean
[JScript] public static function NotEquals(x: SqlBinary, y: SqlBinary): SqlBoolean;
Description
  Compares two System.Data.SqlTypes.SqlBinary structures to determine if they are equal.
Return Value: A System.Data.SqlTypes.SqlBoolean that is System.Data.SqlTypes.SqlBoolean.True if the two instances are not equal or System.Data.SqlTypes.SqlBoolean.False if the two instances are equal. If either instance of SqlBinary is null, the System.Data.SqlTypes.SqlBoolean.Value of the SqlBoolean will be System.Data.SqlTypes.SqlBoolean.Null. A SqlBinary structure. A SqlBinary structure.
  op_Addition
[C#] public static SqlBinary operator+(SqlBinary x, SqlBinary y);
[C++] public: static SqlBinary op_Addition(SqlBinary x, SqlBinary y);
[VB] returnValue=SqlBinary.op_Addition(x, y)
[JScript] returnValue=x+y;
Description
  Concatenates the two System.Data.SqlTypes.SqlBinary parameters to create a new SqlBinary structure.
Return Value: The concatenated values of the x and y parameters.
  x will appear first in the resulting SqlBinary, followed by y. A SqlBinary object. A SqlBinary object.
  op_Equality
[C#] public static SqlBoolean operator==(SqlBinary x, SqlBinary y);
[C++] public: static SqlBoolean op_Equality(SqlBinary x, SqlBinary y);
[VB] returnValue=SqlBinary.op_Equality(x, y)
[JScript] returnValue=x==y;
Description
  Compares two System.Data.SqlTypes.SqlBinary structures to determine if they are equal.
Return Value: A System.Data.SqlTypes.SqlBoolean that is System.Data.SqlTypes.SqlBoolean.True if the two instances are equal or System.Data.SqlTypes.SqlBoolean.False if the two instances are not equal. If either instance of SqlBinary is null, the System.Data.SqlTypes.SqlBoolean.Value of the SqlBoolean will be System.Data.SqlTypes.SqlBoolean.Null. A SqlBinary object. A SqlBinary object.
  op_Explicit
[C#] public static explicit operator byte[ ](SqlBinary x);
[C++] public: static unsigned char op_Explicit( );
[VB] returnValue=SqlBinary.op_Explicit(x)
[JScript] returnValue=Byte[ ](x);
Description
  Gets the contents of the System.Data.SqlTypes.SqlBinary.Value property of the System.Data.SqlTypes.SqlBinary parameter as an array of bytes.
Return Value: An array of bytes.
  In Visual Basic, you can use the conversions defined by the class, but you cannot override them or create your own. If Option Strict is set, you must use the to convert the System.Data.SqlTypes.SqlBinary to a binary object. A System.Data.SqlTypes.SqlBinary.
  op_Explicit
[C#] public static explicit operator SqlBinary(SqlGuid x);
[C++] public: static SqlBinary op_Explicit(SqlGuid x);
[VB] returnValue=SqlBinary.op_Explicit(x)
[JScript] returnValue=SqlBinary(x);

Description
  Converts a System.Data.SqlTypes.SqlGuid structure to a System.Data.SqlTypes.SqlBinary structure.
Return Value: A SqlBinary structure.
  In Visual Basic, you can use the conversions defined by the class, but you cannot override them or create your own. If Option Strict is set, you must use the to convert the System.Data.SqlTypes.SqlGuid to a System.Data.SqlTypes.SqlBinary. The SqlGuid structure to be converted.
  op_GreaterThan
[C#] public static SqlBoolean operator>(SqlBinary x, SqlBinary y);
[C++] public: static SqlBoolean op_GreaterThan(SqlBinary x, SqlBinary y);
[VB] returnValue=SqlBinary.op_GreaterThan(x, y)
[JScript] returnValue=x>y;
Description
  Compares two System.Data.SqlTypes.SqlBinary structures to determine if the first is greater than the second.
Return Value: A System.Data.SqlTypes.SqlBoolean that is System.Data.SqlTypes.SqlBoolean.True if the first instance is greater than the second instance, otherwise System.Data.SqlTypes.SqlBoolean.False. If either instance of SqlBinary is null, the System.Data.SqlTypes.SqlBoolean.Value of the SqlBoolean will be System.Data.SqlTypes.SqlBoolean.Null. A SqlBinary object. A SqlBinary object.
  op_GreaterThanOrEqual
[C#] public static SqlBoolean operator>=(SqlBinary x, SqlBinary y);
[C++] public: static SqlBoolean op_GreaterThanOrEqual(SqlBinary x, SqlBinary y);
[VB] returnValue=SqlBinary.op_GreaterThanOrEqual(x, y)
[JScript] returnValue=x>=y;
Description
  Compares two System.Data.SqlTypes.SqlBinary structues to determine if the first is greater than or equal to the second.
Return Value: A System.Data.SqlTypes.SqlBoolean that is System.Data.SqlTypes.SqlBoolean.True if the first instance is greater than or equal to the second instance, otherwise System.Data.SqlTypes.SqlBoolean.False.
  If either instance of SqlBinary is null, the System.Data.SqlTypes.SqlBoolean.Value of the SqlBoolean will be System.Data.SqlTypes.SqlBoolean.Null. A SqlBinary object. A SqlBinary object.
  op_Implicit
[C#] public static implicit operator SqlBinary(byte[ ] x);
[C++] public: static SqlBinary op_Implicit(unsigned char x _gc[ ]);
[VB] returnValue=SqlBinary.op_Implicit(x)
[JScript] returnValue=x;
Description
  Converts an array of bytes to a System.Data.SqlTypes.SqlBinary structure.
Return Value: A SqlBinary structure that represents the converted array of bytes. The array of bytes to be converted.
  op_Inequality
[C#] public static SqlBoolean operator !=(SqlBinary x, SqlBinary y);
[C++] public: static SqlBoolean op_Inequality(SqlBinary x, SqlBinary y);
[VB] returnValue=SqlBinary.op_Inequality(x, y)
[JScript] returnValue=x !=y;
Description
  Compares two System.Data.SqlTypes.SqlBinary structures to determine if they are equal.

Return Value: A System.Data.SqlTypes.SqlBoolean that is System.Data.SqlTypes.SqlBoolean.True if the two instances are not equal or System.Data.SqlTypes.SqlBoolean.False if the two instances are equal. If either instance of SqlBinary is null, the System.Data.SqlTypes.SqlBoolean.Value of the SqlBoolean will be System.Data.SqlTypes.SqlBoolean.Null. A SqlBinary object. A SqlBinary object.

op_LessThan

[C#] public static SqlBoolean operator
[C++] public: static SqlBoolean op_LessThan(SqlBinary x, SqlBinary y);
[VB] returnValue=SqlBinary.op_LessThan(x, y)
[JScript] returnValue=x<y;
Description Compares two System.Data.SqlTypes.SqlBinary structures to determine if the first is less than the second.
Return Value: A System.Data.SqlTypes.SqlBoolean that is System.Data.SqlTypes.SqlBoolean.True if the first instance is less than the second instance, otherwise System.Data.SqlTypes.SqlBoolean.False. If either instance of SqlBinary is null, the System.Data.SqlTypes.SqlBoolean.Value of the SqlBoolean will be System.Data.SqlTypes.SqlBoolean.Null. A SqlBinary object. A SqlBinary object.

op_LessThanOrEqual

[C#] public static SqlBoolean operator<=(SqlBinary x, SqlBinary y);
[C++] public: static SqlBoolean op_LessThanOrEqual (SqlBinary x, SqlBinary y);
[VB] returnValue =SqlBinary.op_LessThanOrEqual(x, y)
[JScript] returnValue=x<=y;
Description Compares two System.Data.SqlTypes.SqlBinary structures to determine if the first is less than or equal to the second.
Return Value: A System.Data.SqlTypes.SqlBoolean that is System.Data.SqlTypes.SqlBoolean.True if the first instance is less than or equal to the second instance, otherwise System.Data.SqlTypes.SqlBoolean.False. If either instance of SqlBinary is null, the System.Data.SqlTypes.SqlBoolean-.Value of the SqlBoolean will be System.Data.SqlTypes.Sql-Boolean.Null. A SqlBinary object. A SqlBinary object.

ToSqlGuid

[C#] public SqlGuid ToSqlGuid( );
[C++] public: SqlGuid ToSqlGuid( );
[VB] Public Function ToSqlGuid( ) As SqlGuid
[JScript] public function ToSqlGuid( ): SqlGuid;
Description Converts this instance of System.Data.SqlTypes.SqlBinary to System.Data.SqlTypes.SqlGuid.

ToString

[C#] public override string ToString( );
[C++] public: String* ToString( );
[VB] Overrides Public Function ToString( ) As String
[JScript] public override function ToString( ): String; Converts a System.Data.SqlTypes.SqlBinary to a string.
Description Converts this System.Data.SqlTypes.SqlBinary object to a string.
Return Value: A string containing the System.Data.SqlTypes.SqlBinary.Value of the SqlBinary If the Value is null the string will contain "null".

SqlBoolean structure (System.Data.SqlTypes)
ToString
Description

Represents an integer value that is either 1 or 0 to be stored in or retrieved from a database.

Any non-zero value is interpreted as 1.

Description

Represents a boolean stored in or retrieved from a database.

The key difference between a SqlBoolean structure and a standard boolean value is that, where a standard boolean has two possible values, true and false, a SqlBoolean structure has three possible values, System.Data.SqlTypes.SqlBoolean.True System.Data.SqlTypes.SqlBoolean.False, or System.Data.SqlTypes.SqlBoolean.Null.

ToString

[C#] public static readonly SqlBoolean False;
[C++] public: static SqlBoolean False;
[VB] Public Shared ReadOnly False As SqlBoolean
[JScript] public static var False: SqlBoolean;
Description Represents a false value that can be assigned to the System.Data.SqlTypes.SqlBoolean.Value property of an instance of the System.Data.SqlTypes.SqlBoolean structure.

The System.Data.SqlTypes.SqlBoolean.False field is a constant for the System.Data.SqlTypes.SqlBoolean structure.

ToString

[C#] public static readonly SqlBoolean Null;
[C++] public: static SqlBoolean Null;
[VB] Public Shared ReadOnly Null As SqlBoolean
[JScript] public static var Null: SqlBoolean;
Description Represents a null value that can be assigned to the System.Data.SqlTypes.SqlBoolean.Value property of an instance of the System.Data.SqlTypes.SqlBoolean structure.

The System.Data.SqlTypes.SqlBoolean.Null field is a constant for the System.Data.SqlTypes.SqlBoolean structure.

Description

Represents a null value that can be assigned to the System.Data.SqlTypes.SqlBoolean.ByteValue property or the System.Data.SqlTypes.SqlBoolean.BoolValue of an instance of the System.Data.SqlTypes.SqlBoolean structure.

System.Data.SqlTypes.SqlBoolean.Null functions as a constant for the System.Data.SqlTypes.SqlBoolean structure.

ToString

[C#] public static readonly SqlBoolean One;
[C++] public: static SqlBoolean One;
[VB] Public Shared ReadOnly One As SqlBoolean
[JScript] public static var One: SqlBoolean;
Description Represents a one value that can be assigned to the System.Data.SqlTypes.SqlBoolean.ByteValue property of an instance of the System.Data.SqlTypes.SqlBoolean structure.

The System.Data.SqlTypes.SqlBoolean.One field is a constant for the System.Data.SqlTypes.SqlBoolean structure.

ToString

[C#] public static readonly SqlBoolean True;
[C++] public: static SqlBoolean True;
[VB] Public Shared ReadOnly True As SqlBoolean
[JScript] public static var True: SqlBoolean;
Description Represents a true value that can be assigned to the System.Data.SqlTypes.SqlBoolean.Value property of an instance of the System.Data.SqlTypes.SqlBoolean structure.

The System.Data.SqlTypes.SqlBoolean.True field is a constant for the System.Data.SqlTypes.SqlBoolean structure.

ToString
[C#] public static readonly SqlBoolean Zero;
[C++] public: static SqlBoolean Zero;
[VB] Public Shared ReadOnly Zero As SqlBoolean
[JScript] public static var Zero: SqlBoolean;
Description
  Represents a zero value that can be assigned to the System.Data.SqlTypes.SqlBoolean.ByteValue property of an instance of the System.Data.SqlTypes.SqlBoolean structure.
  The System.Data.SqlTypes.SqlBoolean.Zero field is a constant for the System.Data.SqlTypes.SqlBoolean structure.
  SqlBoolean
  Example Syntax:
  ToString
[C#] public SqlBoolean(bool value);
[C++] public: SqlBoolean(bool value);
[VB] Public Sub New(ByVal value As Boolean)
[JScript] public function SqlBoolean(value: Boolean); Initializes a new instance of the System.Data.SqlTypes.SqlBoolean structure.
Description
  Initializes a new instance of the System.Data.SqlTypes.SqlBoolean structure with a boolean value to be stored.
Description
  Initializes a new instance of the System.Data.SqlTypes.SqlBoolean structure using the supplied boolean value. The boolean value to be stored.
  SqlBoolean
  Example Syntax:
  ToString
[C#] public SqlBoolean(int value);
[C++] public: SqlBoolean(int value);
[VB] Public Sub New(ByVal value As Integer)
[JScript] public function SqlBoolean(value: int);
Description
  Initializes a new instance of the System.Data.SqlTypes.SqlBoolean structure using the specified integer value. The integer whose value is to be used is for the new SqlBoolean structure.
  ByteValue
  ToString
[C#] public byte ByteValue {get;}
[C++] public: __property unsigned char get_ByteValue( );
[VB] Public ReadOnly Property ByteValue As Byte
[JScript] public function get_ByteValue( ): Byte;
Description
  Gets the value of the System.Data.SqlTypes.SqlBoolean structure as a byte.
  The byte value will be either 0 or 1.
  IsFalse
  ToString
[C#] public bool IsFalse {get;}
[C++] public: __property bool get_IsFalse( );
[VB] Public ReadOnly Property IsFalse As Boolean
[JScript] public function get IsFalse( ): Boolean;
Description
  Indicates whether the current System.Data.SqlTypes.SqlBoolean.Value is System.Data.SqlTypes.SqlBoolean.False
  If the System.Data.SqlTypes.SqlBoolean.Value is System.Data.SqlTypes.SqlBoolean.Null, this property still will be false.
  IsNull
  ToString
[C#] public bool IsNull {get;}
[C++] public: __property bool get_IsNull( );
[VB] Public ReadOnly Property IsNull As Boolean
[JScript] public function get IsNull( ): Boolean;
Description
  Indicates whether or not the value of the System.Data.SqlTypes.SqlBoolean structure is null.
Description
  Indicates whether the current System.Data.SqlTypes.SqlBoolean.Value is System.Data.SqlTypes.SqlBoolean.Null.
  IsTrue
  ToString
[C#] public bool IsTrue {get;}
[C++] public: __property bool get_IsTrue( );
[VB] Public ReadOnly Property IsTrue As Boolean
[JScript] public function get IsTrue( ): Boolean;
Description
  Indicates whether the current System.Data.SqlTypes.SqlBoolean.Value is System.Data.SqlTypes.SqlBoolean.True.
  If the System.Data.SqlTypes.SqlBoolean.Value is System.Data.SqlTypes.SqlBoolean.Null, this property still will be false.
  Value
  ToString
[C#] public bool Value {get;}
[C++] public: __property bool get_Value( );
[VB] Public ReadOnly Property Value As Boolean
[JScript] public function get Value( ): Boolean;
Description
  Gets the System.Data.SqlTypes.SqlBoolean structure's value. This property is read-only.
  And
[C+] public static SqlBoolean And(SqlBoolean x, SqlBoolean y);
[C++] public: static SqlBoolean And(SqlBoolean x, SqlBoolean y);
[VB] Public Shared Function And(ByVal x As SqlBoolean, ByVal y As SqlBoolean) As SqlBoolean
[JScript] public static function And(x: SqlBoolean, y: SqlBoolean): SqlBoolean;
Description
  Computes the bitwise AND of two specified System.Data.SqlTypes.SqlBoolean structures.
  Return Value: The result of the logical AND operation. A SqlBoolean structure. A SqlBoolean structure.
  CompareTo
[C#] public int CompareTo(object value);
[C++] public: __sealed int CompareTo(Object* value);
[VB] NotOverridable Public Function CompareTo(ByVal value As Object) As Integer
[JScript] public function CompareTo(value: Object): int;
Description
  Compares this System.Data.SqlTypes.SqlBoolean structure to a specified object and returns an indication of their relative values.
  Return Value: A signed number indicating the relative values of the instance and value.
  Any instance of SqlBoolean, regardless of its value, is considered greater than a null reference (Nothing). An object to compare, or a null reference (Nothingin Visual Basic).
  Equals
[C#] public override bool Equals(object value);
[C++] public: bool Equals(Object* value);
[VB] Overrides Public Function Equals(ByVal value As Object) As Boolean
[JScript] public override function Equals(value: Object): Boolean;
Description
  Compares the supplied object parameter to the System.Data.SqlTypes.SqlBoolean Return Value: true if object is an instance of System.Data.SqlTypes.SqlBoolean and the two are equal; otherwise false. The object to be compared.
Equals
[C#] public static new SqlBoolean Equals(SqlBoolean x, SqlBoolean y);
[C++] public: static SqlBoolean Equals(SqlBoolean x, SqlBoolean y);
[VB] Shadows Public Shared Function Equals(ByVal x As SqlBoolean, ByVal y As SqlBoolean) As SqlBoolean
[JScript] public static hide function Equals(x: SqlBoolean, y: SqlBoolean): SqlBoolean; Compares two System.Data.SqlTypes.SqlBoolean structures to determine if they are equal.
Description
Compares two System.Data.SqlTypes.SqlBoolean structures to determine if they are equal.
Return Value: A System.Data.SqlTypes.SqlBoolean that is System.Data.SqlTypes.SqlBoolean.True if the two instances are equal or System.Data.SqlTypes.SqlBoolean.False if the two instances are not equal. If either instance of System.Data.SqlTypes.SqlBoolean is null, the System.Data.SqlTypes.SqlBoolean.Value of the System.Data.SqlTypes.SqlBoolean will be System.Data.SqlTypes.SqlBoolean.Null. A SqlBoolean structure. A SqlBoolean structure.
GetHashCode
[C#] public override int GetHashCode( );
[C++] public: int GetHashCode( );
[VB] Overrides Public Function GetHashCode( ) As Integer
[JScript] public override function GetHashCode( ): int;
Description
Returns the hash code for this instance.
Return Value: A 32-bit signed integer hash code.
NotEquals
[C+] public static SqlBoolean NotEquals(SqlBoolean x, SqlBoolean y);
[C++] public: static SqlBoolean NotEquals(SqlBoolean x, SqlBoolean y);
[VB] Public Shared Function NotEquals(ByVal x As SqlBoolean, ByVal y As SqlBoolean) As SqlBoolean
[JScript] public static function NotEquals(x: SqlBoolean, y: SqlBoolean) SqlBoolean;
Description
Compares two instances of System.Data.SqlTypes.SqlBoolean for equality.
Return Value: A System.Data.SqlTypes.SqlBoolean that is System.Data.SqlTypes.SqlBoolean.True if the two instances are not equal or System.Data.SqlTypes.SqlBoolean.False if the two instances are equal. If either instance of System.Data.SqlTypes.SqlBoolean is null, the System.Data.SqlTypes.SqlBoolean.Value of the System.Data.SqlTypes.SqlBoolean will be System.Data.SqlTypes.SqlBoolean.Null. A SqlBoolean structure. A SqlBoolean structure.
OnesComplement
[C#] public static SqlBoolean OnesComplement (SqlBoolean x);
[C++] public: static SqlBoolean OnesComplement (SqlBoolean x);
[VB] Public Shared Function OnesComplement(ByVal x As SqlBoolean) As SqlBoolean
[JScript] public static function OnesComplement(x: SqlBoolean): SqlBoolean;
Description
Performs a one's complement operation on the supplied System.Data.SqlTypes.SqlBoolean structures.
Return Value: The one's complement of the supplied System.Data.SqlTypes.SqlBoolean. A SqlBoolean structure.

op_BitwiseAnd
[C#] public static SqlBoolean operator &(SqlBoolean x, SqlBoolean y);
[C++] public: static SqlBoolean op_BitwiseAnd (SqlBoolean x, SqlBoolean y);
[VB] returnValue=SqlBoolean.op_BitwiseAnd(x, y)
[JScript] returnValue=-x & y
Description
Performs a bitwise AND operation on two System.Data.SqlTypes.SqlBoolean structures.
Return Value: A SqlBoolean structure that is the result of the bitwise AND operation.
Description
Computes the bitwise AND of two specified System.Data.SqlTypes.SqlBoolean structures.
Return Value: The results of the logical AND operation. The SqlBoolean. The SqlBoolean.
op_BitwiseOr
[C#] public static SqlBoolean operator |(SqlBoolean x, SqlBoolean y);
[C++] public: static SqlBoolean op_BitwiseOr(SqlBoolean x, SqlBoolean y);
[VB] returnValue=SqlBoolean.op_BitwiseOr(x, y)
[JScript] returnValue=x|y;
Description
Computes the bitwise OR of its operands.
Return Value: The results of the logical OR operation.
Description
Performs a bitwise OR operation on the two specified System.Data.SqlTypes.SqlBoolean structures.
Return Value: A new SqlBoolean whose Value is the result of the bitwise OR operation. A System.Data.SqlTypes.SqlBoolean structure. A System.Data.SqlTypes.SqlBoolean structure.
op_Equality
[C#] public static SqlBoolean operator==(SqlBoolean x, SqlBoolean y);
[C++] public: static SqlBoolean op_Equality(SqlBoolean x, SqlBoolean y);
[VB] returnValue=SqlBoolean.op_Equality(x, y)
[JScript] returnValue=x==y;
Description
Compares two instances of System.Data.SqlTypes.SqlBoolean for equality.
Return Value: A System.Data.SqlTypes.SqlBoolean that is System.Data.SqlTypes.SqlBoolean.True if the two instances are equal or System.Data.SqlTypes.SqlBoolean.False if the two instances are not equal. If either instance of System.Data.SqlTypes.SqlBoolean is null, the System.Data.SqlTypes.SqlBoolean.Value of the System.Data.SqlTypes.SqlBoolean will be System.Data.SqlTypes.SqlBoolean.Null A System.Data.SqlTypes.SqlBoolean. A System.Data.SqlTypes.SqlBoolean.
op_ExclusiveOr
[C#] public static SqlBoolean operator ^(SqlBoolean x, SqlBoolean y);
[C++] public: static SqlBoolean op_ExclusiveOr (SqlBoolean x, SqlBoolean y);
[VB] returnValue=SqlBoolean.op_ExclusiveOr(x, y)
[JScript] returnValue=x ^y;
Description
Performs a bitwise exclusive-OR operation on the supplied parameters.
Return Value: The results of the logical XOR operation. A System.Data.SqlTypes.SqlBoolean structure. A System.Data.SqlTypes.SqlBoolean structure.
op_Explicit

[C#] public static explicit operator bool(SqlBoolean x);
[C++] public: static bool op_Explicit( );
[VB] returnValue=SqlBoolean.op_Explicit(x)
[JScript] returnValue=Boolean(x);
Description
Converts a System.Data.SqlTypes.SqlBoolean to a boolean.
Return Value: A boolean set to the System.Data.SqlTypes.SqlBoolean.Value of the SqlBoolean. A SqlBoolean to convert.
op_Explicit
[C#] public static explicit operator SqlBoolean(SqlByte x);
[C++] public: static SqlBoolean op_Explicit(SqlByte x);
[VB] returnValue=SqlBoolean.op_Explicit(x)
[JScript] returnValue=SqlBoolean(x);
Description
Converts the System.Data.SqlTypes.SqlByte parameter to a System.Data.SqlTypes.SqlBoolean structure.
Return Value: A new System.Data.SqlTypes.SqlBoolean structure whose value equals the System.Data.SqlTypes.SqlByte.Value of the System.Data.SqlTypes.SqlByte parameter. A System.Data.SqlTypes.SqlByte to be converted to a System.Data.SqlTypes.SqlBoolean structure.
op_Explicit
[C#] public static explicit operator SqlBoolean(SqlDecimal x);
[C++] public: static SqlBoolean op_Explicit(SqlDecimal x);
[VB] returnValue=SqlBoolean.op_Explicit(x)
[JScript] returnValue=SqlBoolean(x);
Description
Converts the System.Data.SqlTypes.SqlDecimal parameter to a System.Data.SqlTypes.SqlBoolean structure.
Return Value: A new System.Data.SqlTypes.SqlByte structure whose value equals the System.Data.SqlTypes.SqlDecimal.Value property of the System.Data.SqlTypes.SqlDecimal parameter. A System.Data.SqlTypes.SqlDecimal to be converted to a System.Data.SqlTypes.SqlBoolean structure.
op_Explicit
[C#] public static explicit operator SqlBoolean(SqlDouble x);
[C++] public: static SqlBoolean op_Explicit(SqlDouble x);
[VB] returnValue=SqlBoolean.op_Explicit(x)
[JScript] returnValue=SqlBoolean(x);
Description
Converts the System.Data.SqlTypes.SqlDouble parameter to a System.Data.SqlTypes.SqlBoolean structure.
Return Value: A new SqlBoolean structure whose value equals the System.Data.SqlTypes.SqlDouble.Value property of the SqlDouble parameter. A SqlDouble to be converted to a SqlBoolean structure.
op_Explicit
[C#] public static explicit operator SqlBoolean(SqlInt16 x);
[C++] public: static SqlBoolean op_Explicit(SqlInt16 x);
[VB] returnValue=SqlBoolean.op_Explicit(x)
[JScript] returnValue=SqlBoolean(x);
Description
Converts the System.Data.SqlTypes.SqlInt16 parameter to a System.Data.SqlTypes.SqlBoolean structure.
Return Value: A new SqlBoolean structure whose value equals the System.Data.SqlTypes.SqlInt16.Value property of the SqlInt16 parameter. A SqlInt16 to be converted to a SqlBoolean structure.
op_Explicit
[C#] public static explicit operator SqlBoolean(SqlInt32 x);
[C++] public: static SqlBoolean op_Explicit(SqlInt32 x);
[VB] returnValue=SqlBoolean.op_Explicit(x)
[JScript] returnValue=SqlBoolean(x);
Description
Converts the System.Data.SqlTypes.SqlInt32 parameter to a System.Data.SqlTypes.SqlBoolean structure.
Return Value: A new SqlBoolean structure whose value equals the System.Data.SqlTypes.SqlInt32.Value property of the SqlInt32 parameter. A SqlInt32 to be converted to a SqlBoolean structure.
op_Explicit
[C#] public static explicit operator SqlBoolean(SqlInt64 x);
[C++] public: static SqlBoolean op_Explicit(SqlInt64 x);
[VB] returnValue=SqlBoolean.op_Explicit(x)
[JScript] returnValue=SqlBoolean(x);
Description
Converts the System.Data.SqlTypes.SqlInt64 parameter to a System.Data.SqlTypes.SqlBoolean structure.
Return Value: A new SqlBoolean structure whose value equals the System.Data.SqlTypes.SqlInt64.Value property of the SqlInt64 parameter. A SqlInt64 to be converted to a SqlBoolean structure.
op_Explicit
[C#] public static explicit operator SqlBoolean(SqlMoney x);
[C++] public: static SqlBoolean op_Explicit(SqlMoney x);
[VB] returnValue=SqlBoolean.op_Explicit(x)
[JScript] returnValue=SqlBoolean(x);
Description
Converts the System.Data.SqlTypes.SqlMoney parameter to a System.Data.SqlTypes.SqlBoolean structure.
Return Value: A new System.Data.SqlTypes.SqlByte structure whose value equals the System.Data.SqlTypes.SqlMoney.Value property of the System.Data.SqlTypes.SqlMoney parameter. A System.Data.SqlTypes.SqlMoney to be converted to a System.Data.SqlTypes.SqlBoolean structure.
op_Explicit
[C#] public static explicit operator SqlBoolean(SqlSingle x);
[C++] public: static SqlBoolean op_Explicit(SqlSingle x);
[VB] returnValue=SqlBoolean.op_Explicit(x)
[JScript] returnValue=SqlBoolean(x);
Description
Converts the System.Data.SqlTypes.SqlSingle parameter to a System.Data.SqlTypes.SqlBoolean structure.
Return Value: A new SqlBoolean structure whose value equals the System.Data.SqlTypes.SqlSingle.Value property of the SqlSingle parameter. A SqlSingle to be converted to a SqlBoolean structure.
op_Explicit
[C#] public static explicit operator SqlBoolean(SqlString x);
[C++] public: static SqlBoolean op_Explicit(SqlString x);
[VB] returnValue=SqlBoolean.op_Explicit(x)
[JScript] returnValue=SqlBoolean(x);
Description
Converts the System.Data.SqlTypes.SqlString parameter to a System.Data.SqlTypes.SqlBoolean structure.
Return Value: A new System.Data.SqlTypes.SqlByte structure whose value equals the System.Data.SqlTypes.SqlBoolean.Value property of the System.Data.SqlTypes.SqlBoolean parameter. A System.Data.SqlTypes.SqlString to be converted to a System.Data.SqlTypes.SqlBoolean structure.
op_False
[C#] public static bool operator false(SqlBoolean x);
[C++] public: static bool op_False(SqlBoolean x);
[VB] returnValue=SqlBoolean.op_False(x)
Description
The false operator can be used to test the System.Data.SqlTypes.SqlBoolean.Value of the System.Data.SqlTypes.SqlBoolean to determine whether it is false.

Return Value: Returns true if the supplied parameter is SqlBoolean is false, false otherwise. The System.Data.Sql-Types.SqlBoolean structure to be tested.
    op_Implicit
[C#] public static implicit operator SqlBoolean(bool x);
[C++] public: static SqlBoolean op_Implicit(bool x);
[VB] returnValue=SqlBoolean.op_Implicit(x)
[JScript] returnValue=x;
Description
    Converts the supplied byte value to a System.Data.Sql-Types.SqlBoolean.
Return Value: A System.Data.SqlTypes.SqlBoolean value containing 0 or 1.
Description
    Converts a boolean to a System.Data.SqlTypes.SqlBoolean
Return Value: A SqlBoolean with a System.Data.Sql-Types.SqlBoolean.Value equivalent to the parameter. A byte value to be converted to System.Data.SqlTypes.SqlBoolean.
    op_Inequality
[C#] public static SqlBoolean operator !=(SqlBoolean x, SqlBoolean y);
[C++] public: static SqlBoolean op_Inequality(SqlBoolean x, SqlBoolean y);
[VB] returnValue=SqlBoolean.op_Inequality(x, y)
[JScript] returnValue=x !=y;
Description
    Compares two instances of System.Data.SqlTypes.Sql-Boolean for equality.
Return Value: A System.Data.SqlTypes.SqlBoolean that is System.Data.SqlTypes.SqlBoolean.True if the two instances are not equal or System.Data.SqlTypes.SqlBoolean.False if the two instances are equal. If either instance of System-.Data.SqlTypes.SqlBoolean is null, the System.Data.Sql-Types.SqlBoolean.Value of the System.Data.SqlTypes.Sql-Boolean will be System.Data.SqlTypes.SqlBoolean.Null A System.Data.SqlTypes.SqlBoolean. A System.Data.Sql-Types.SqlBoolean.
    op_LogicalNot
[C#] public static SqlBoolean operator !(SqlBoolean x);
[C++] public: static SqlBoolean op_LogicalNot (SqlBoolean x);
[VB] returnValue=SqlBoolean.op_LogicalNot(x)
[JScript] returnValue=!x;
Description
    Performs a NOT operation on a System.Data.Sql-Types.SqlBoolean
Return Value: A SqlBoolean with the System.Data.Sql-Types.SqlBoolean.ValueSystem.Da-ta.SqlTypes.SqlBoolean.True if argument was true, System-.Data.SqlTypes.SqlBoolean.Null if argument was null, and System.Data.SqlTypes.SqlBoolean.False otherwise. The SqlBoolean on which the NOT operation will be performed.
    op_OnesComplement
[C#] public static SqlBoolean operator ~(SqlBoolean x);
[C++] public: static SqlBoolean op_OnesComplement (SqlBoolean x);
[VB] returnValue=SqlBoolean.op_OnesComplement(x)
[JScript] returnValue=~x;
Description
    Performs a one's complement operation on the supplied System.Data.SqlTypes.SqlBoolean structures.
Return Value: The one's complement of the supplied Sys-tem.Data.SqlTypes.SqlBoolean. A System.Data.Sql-Types.SqlBoolean structure.
    op_True
[C#] public static bool operator true(SqlBoolean x);
[C++] public: static bool op_True(SqlBoolean x);
[VB] returnValue=SqlBoolean.op_True(x)
Description
    The true operator can be used to test the System.Data.Sql-Types.SqlBoolean.Value of the System.Data.SqlTypes.Sql-Boolean to determine whether it is true.
Return Value: Returns true if the supplied parameter is SqlBoolean is true, false otherwise. The SqlBoolean struc-ture to be tested.
    Or
[C+] public static SqlBoolean Or(SqlBoolean x, SqlBoolean y);
[C++] public: static SqlBoolean Or(SqlBoolean x, SqlBool-ean y);
[VB] Public Shared Function Or(ByVal x As SqlBoolean, ByVal y As SqlBoolean) As SqlBoolean
[JScript] public static function Or(x: SqlBoolean, y: SqlBoolean): SqlBoolean;
Description
    Performs a bitwise OR operation on the two specified System.Data.SqlTypes.SqlBoolean structures.
Return Value: A new SqlBoolean structure whose Value is the result of the bitwise OR operation. A SqlBoolean struc-ture. A SqlBoolean structure.
    Parse
[C#] public static SqlBoolean Parse(string s);
[C++] public: static SqlBoolean Parse(String* s);
[VB] Public Shared Function Parse(ByVal s As String) As SqlBoolean
[JScript] public static function Parse(s: String): SqlBoolean;
Description
    [ . ] [ . ]
    ToSqlByte
[C#] public SqlByte ToSqlByte( );
[C++] public: SqlByte ToSqlByte( );
[VB] Public Function ToSqlByte( ) As SqlByte
[JScript] public function ToSqlByte( ): SqlByte;
Description
    Converts this System.Data.SqlTypes.SqlBoolean struc-ture to System.Data.SqlTypes.SqlByte
Return Value: A SqlByte structure whose Value equals the Value of this SqlBoolean structure. If the SqlBoolean struc-ture's Value is true, then the SqlByte structure's Value will be 1, otherwise the SqlByte structure's Value will be 0.
    ToSqlDecimal
[C#] public SqlDecimal ToSqlDecimal( );
[C++] public: SqlDecimal ToSqlDecimal( );
[VB] Public Function ToSqlDecimal( ) As SqlDecimal
[JScript] public function ToSqlDecimal( ) SqlDecimal;
Description
    Converts this System.Data.SqlTypes.SqlBoolean struc-ture to System.Data.SqlTypes.SqlDecimal
Return Value: A new SqlDecimal structure whose Value equals 1 if the SqlBoolean structure's Value was true, otherwise the Value of the new SqlDecimal structure is 0.
    ToSqlDouble
[C#] public SqlDouble ToSqlDouble( );
[C++] public: SqlDouble ToSqlDouble( );
[VB] Public Function ToSqlDouble( ) As SqlDouble
[JScript] public function ToSqlDouble( ): SqlDouble;
Description
    Converts this System.Data.SqlTypes.SqlBoolean struc-ture to System.Data.SqlTypes.SqlDouble
Return Value: A new SqlDouble structure whose Value equals 1 if the SqlBoolean structure's Value was true oth-erwise the Value of the new SqlDouble structure is 0.
    ToSqlInt16

[C#] public SqlInt16 ToSqlInt16( );
[C++] public: SqlInt16 ToSqlInt16( );
[VB] Public Function ToSqlInt16( ) As SqlInt16
[JScript] public function ToSqlInt16( ): SqlInt16;
Description
Converts this System.Data.SqlTypes.SqlBoolean structure to System.Data.SqlTypes.SqlInt16
Return Value: A new SqlInt16 structure whose Value equals 1 if the SqlBoolean structure's Value was true, otherwise the Value of the new SqlInt16 structure is 0.
ToSqlInt32
[C#] public SqlInt32 ToSqlInt32( );
[C++] public: SqlInt32 ToSqlInt32( );
[VB] Public Function ToSqlInt32( ) As SqlInt32
[JScript] public function ToSqlInt32( ): SqlInt32;
Description
Converts this System.Data.SqlTypes.SqlBoolean structure to System.Data.SqlTypes.SqlInt32
Return Value: A new SqlInt32 structure whose Value equals 1 if the SqlBoolean structure's Value was true, otherwise the Value of the new SqlInt32 structure is 0.
ToSqlInt64
[C#] public SqlInt64 ToSqlInt64( );
[C++] public: SqlInt64 ToSqlInt64( );
[VB] Public Function ToSqlInt64( ) As SqlInt64
[JScript] public function ToSqlInt64( ): SqlInt64;
Description
Converts this System.Data.SqlTypes.SqlBoolean structure to System.Data.SqlTypes.SqlInt64
Return Value: A new SqlInt64 structure whose Value equals 1 if the SqlBoolean structure's Value was true, otherwise the Value of the new SqlInt64 structure is 0.
ToSqlMoney
[C#] public SqlMoney ToSqlMoney( );
[C++] public: SqlMoney ToSqlMoney( );
[VB] Public Function ToSqlMoney( ) As SqlMoney
[JScript] public function ToSqlMoney( ): SqlMoney;
Description
Converts this System.Data.SqlTypes.SqlBoolean structure to System.Data.SqlTypes.SqlMoney.
ToSqlSingle
[C#] public SqlSingle ToSqlSingle( );
[C++] public: SqlSingle ToSqlSingle( );
[VB] Public Function ToSqlSingle( ) As SqlSingle
[JScript] public function ToSqlSingle( ): SqlSingle;
Description
Converts this System.Data.SqlTypes.SqlBoolean structure to System.Data.SqlTypes.SqlSingle
Return Value: A new SqlSingle structure whose Value equals 1 if the SqlBoolean structure's Value was true, otherwise the Value of the new SqlSingle structure is 0.
ToSqlString
[C#] public SqlString ToSqlString( );
[C++] public: SqlString ToSqlString( );
[VB] Public Function ToSqlString( ) As SqlString
[JScript] public function ToSqlString( ): SqlString;
Description
Converts this System.Data.SqlTypes.SqlBoolean structure to System.Data.SqlTypes.SqlString
Return Value: A new SqlString structure whose Value equals 1 if the SqlBoolean structure's Value was true, otherwise the Value of the new SqlDouble structure is 0.
ToString
[C#] public override string ToString( );
[C++] public: String* ToString( );
[VB] Overrides Public Function ToString( ) As String
[JScript] public override function ToString( ): String;

Description
Converts the current System.Data.SqlTypes.SqlBoolean.Value to a string.
Return Value: A string containing "true" if true, "null" if null, otherwise "false".
Description
Converts this System.Data.SqlTypes.SqlBoolean structure to a string.
Return Value: A string containing the value of the System.Data.SqlTypes.SqlBoolean. If the value is null the string will contain "null".
Xor
[C#] public static SqlBoolean Xor(SqlBoolean x, SqlBoolean y);
[C++] public: static SqlBoolean Xor(SqlBoolean x, SqlBoolean y);
[VB] Public Shared Function Xor(ByVal x As SqlBoolean, ByVal y As SqlBoolean) As SqlBoolean
[JScript] public static function Xor(x: SqlBoolean, y: SqlBoolean): SqlBoolean;
Description
Performs a bitwise exclusive-OR operation on the supplied parameters.
Return Value: The results of the logical XOR operation. A SqlBoolean structure.
SqlByte structure (System.Data.SqlTypes)
Xor
Description
Represents an 8-bit unsigned integer, in the range of 0 through 255, to be stored in or retrieved from a database.
Xor
[C#] public static readonly SqlByte MaxValue;
[C++] public: static SqlByte MaxValue;
[VB] Public Shared ReadOnly MaxValue As SqlByte
[JScript] public static var MaxValue: SqlByte;
Description
A constant representing the largest possible value of a System.Data.SqlTypes.SqlByte.
The value of this constant is 255 or, hexadecimal 0xFF.
Xor
[C#] public static readonly SqlByte MnValue;
[C++] public: static SqlByte MinValue;
[VB] Public Shared ReadOnly MinValue As SqlByte
[JScript] public static var MinValue: SqlByte;
Description
A constant representing the smallest possible value of a System.Data.SqlTypes.SqlByte.
The value of this constant is 0.
Xor
[C#] public static readonly SqlByte Null;
[C++] public: static SqlByte Null;
[VB] Public Shared ReadOnly Null As SqlByte
[JScript] public static var Null: SqlByte;
Description
Represents a null value that can be assigned to the System.Data.SqlTypes.SqlByte.Value property of an instance of the System.Data.SqlTypes.SqlByte structure.
Null functions as a constant for the SqlByte structure.
Xor
[C#] public static readonly SqlByte Zero;
[C++] public: static SqlByte Zero;
[VB] Public Shared ReadOnly Zero As SqlByte
[JScript] public static var Zero: SqlByte;
Description
Represents a zero value that can be assigned to the System.Data.SqlTypes.SqlByte.Value property of an instance of the System.Data.SqlTypes.SqlByte structure.

The System.Data.SqlTypes.SqlByte.Zero field is a constant for the System.Data.SqlTypes.SqlByte structure.
SqlByte
Example Syntax:
Xor
[C#] public SqlByte(byte value);
[C++] public: SqlByte(unsigned char value);
[VB] Public Sub New(ByVal value As Byte)
[JScript] public function SqlByte(value: Byte);
Description
Initializes a new instance of the System.Data.SqlTypes.SqlByte structure using the specified byte value. A byte value to be stored in the System.Data.SqlTypes.SqlByte.Value property of the new SqlByte structure.
IsNull
Xor
[C#] public bool IsNull {get;}
[C++] public: __property bool get_IsNull( );
[VB] Public ReadOnly Property IsNull As Boolean
[JScript] public function get IsNull( ): Boolean;
Description
Indicates whether or not System.Data.SqlTypes.SqlByte.Value is null.
Value
Xor
[C#] public byte Value {get;}
[C++] public: __property unsigned char get_Value( );
[VB] Public ReadOnly Property Value As Byte
[JScript] public function get_Value( ): Byte;
Description
Gets the value of the System.Data.SqlTypes.SqlByte structure. This property is read-only The value of the SqlByte structure.
Add
[C#] public static SqlByte Add(SqlByte x, SqlByte y);
[C++] public: static SqlByte Add(SqlByte x, SqlByte y);
[VB] Public Shared Function Add(ByVal x As SqlByte, ByVal y As SqlByte) As SqlByte
[JScript] public static function Add(x: SqlByte, y: SqlByte): SqlByte;
Description
Computes the sum of the two specified System.Data.SqlTypes.SqlByte structures.
Return Value: A SqlByte structure whose Value property contains the results of the addition. A SqlByte structure. A SqlByte structure.
BitwiseAnd
[C#] public static SqlByte BitwiseAnd(SqlByte x, SqlByte y);
[C++] public: static SqlByte BitwiseAnd(SqlByte x, SqlByte y);
[VB] Public Shared Function BitwiseAnd(ByVal x As SqlByte, ByVal y As SqlByte) As SqlByte
[JScript] public static function BitwiseAnd(x: SqlByte, y: SqlByte): SqlByte;
Description
Computes the bitwise AND of its System.Data.SqlTypes.SqlByte operands.
Return Value: The results of the bitwise AND operation. A SqlByte structure. A SqlByte structure.
BitwiseOr
[C#] public static SqlByte BitwiseOr(SqlByte x, SqlByte y);
[C++] public: static SqlByte BitwiseOr(SqlByte x, SqlByte y);
[VB] Public Shared Function BitwiseOr(ByVal x As SqlByte, ByVal y As SqlByte) As SqlByte
[JScript] public static function BitwiseOr(x: SqlByte, y: SqlByte): SqlByte;

Description
Computes the bitwise OR of its two System.Data.SqlTypes.SqlByte operands.
Return Value: The results of the bitwise OR operation. A SqlByte structure. A SqlByte structure.
CompareTo
[C#] public int CompareTo(object value);
[C++] public: __sealed int CompareTo(Object* value);
[VB] NotOverridable Public Function CompareTo(ByVal value As Object) As Integer
[JScript] public function CompareTo(value: Object): int;
Description
Compares this instance to the supplied object and returns an indication of their relative values.
Return Value: A signed number indicating the relative values of the instance and the object. The object to be compared.
Divide
[C#] public static SqlByte Divide(SqlByte x, SqlByte y);
[C++] public: static SqlByte Divide(SqlByte x, SqlByte y);
[VB] Public Shared Function Divide(ByVal x As SqlByte, ByVal y As SqlByte) As SqlByte
[JScript] public static function Divide(x: SqlByte, y: SqlByte): SqlByte;
Description
Divides its first System.Data.SqlTypes.SqlByte operand by its second.
Return Value: A new SqlByte structure whose System.Data.SqlTypes.SqlByte.Value property contains the results of the division. A SqlByte structure. A SqlByte structure.
Equals
[C#] public override bool Equals(object value);
[C++] public: bool Equals(Object* value);
[VB] Overrides Public Function Equals(ByVal value As Object) As Boolean
[JScript] public override function Equals(value: Object): Boolean;
Description
Compares the supplied object parameter to the System.Data.SqlTypes.SqlByte.Value property of the System.Data.SqlTypes.SqlByte object.
Return Value: true if object is an instance of SqlByte and the two are equal; otherwise false. The object to be compared.
Equals
[C#] public static new SqlBoolean Equals(SqlByte x, SqlByte y);
[C++] public: static SqlBoolean Equals(SqlByte x, SqlByte y);
[VB] Shadows Public Shared Function Equals(ByVal x As SqlByte, ByVal y As SqlByte) As SqlBoolean
[JScript] public static hide function Equals(x: SqlByte, y: SqlByte): SqlBoolean; Performs a logical comparison to determine if a SqlByte structure's value is equal to another object.
Description
Performs a logical comparison of two System.Data.SqlTypes.SqlByte structures to determine if they are equal.
Return Value: A System.Data.SqlTypes.SqlBoolean that is System.Data.SqlTypes.SqlBoolean.True if the two instances are equal or System.Data.SqlTypes.SqlBoolean.False if the two instances are not equal. If either instance of SqlByte is null, the System.Data.SqlTypes.SqlBoolean.Value of the SqlBoolean will be System.Data.SqlTypes.SqlBoolean.Null. A SqlByte structure. A SqlByte structure.
GetHashCode
[C#] public override int GetHashCode( );
[C++] public: int GetHashCode( );
[VB] Overrides Public Function GetHashCode( ) As Integer

[JScript] public override function GetHashCode( ): int;
Description
  Returns the hash code for this instance.
Return Value: A 32-bit signed integer hash code.
  GreaterThan
[C#] public static SqlBoolean GreaterThan(SqlByte x, SqlByte y);
[C++] public: static SqlBoolean GreaterThan(SqlByte x, SqlByte y);
[VB] Public Shared Function GreaterThan(ByVal x As SqlByte, ByVal y As SqlByte) As SqlBoolean
[JScript] public static function GreaterThan(x: SqlByte, y: SqlByte):
  SqlBoolean;
Description
  Compares two instances of System.Data.SqlTypes.SqlByte to determine if the first is greater than the second.
Return Value: A System.Data.SqlTypes.SqlBoolean that is System.Data.SqlTypes.SqlBoolean.True if the first instance is greater than the second instance, otherwise System.Data.SqlTypes.SqlBoolean.False. If either instance of SqlByte is null, the System.Data.SqlTypes.SqlBoolean.Value of the SqlBoolean will be System.Data.SqlTypes.SqlBoolean.Null. A SqlByte structure. A SqlByte structure.
  GreaterThanOrEqual
[C#] public static SqlBoolean GreaterThanOrEqual(SqlByte x, SqlByte y);
[C++] public: static SqlBoolean GreaterThanOrEqual (SqlByte x, SqlByte y);
[VB] Public Shared Function GreaterThanOrEqual(ByVal x As SqlByte, ByVal y As SqlByte) As SqlBoolean
[JScript] public static function GreaterThanOrEqual(x: SqlByte, y: SqlByte) SqlBoolean;
Description
  Compares two SqlByte structures to determine if the first is greater than or equal to the second.
Return Value: A System.Data.SqlTypes.SqlBoolean that is System.Data.SqlTypes.SqlBoolean.True if the first instance is greater than or equal to the second instance, otherwise System.Data.SqlTypes.SqlBoolean.False. If either instance of SqlByte is null, the System.Data.SqlTypes.SqlBoolean.Value of the SqlBoolean will be System.Data.SqlTypes.SqlBoolean.Null. A SqlByte structure. A SqlByte structure.
  LessThan
[C#] public static SqlBoolean LessThan(SqlByte x, SqlByte y);
[C++] public: static SqlBoolean LessThan(SqlByte x, SqlByte y);
[VB] Public Shared Function LessThan(ByVal x As SqlByte, ByVal y As SqlByte) As SqlBoolean
[JScript] public static function LessThan(x: SqlByte, y: SqlByte): SqlBoolean;
Description
  Compares two instances of System.Data.SqlTypes.SqlByte to determine if the first is less than the second.
Return Value: A System.Data.SqlTypes.SqlBoolean that is System.Data.SqlTypes.SqlBoolean.True if the first instance is less than the second instance, otherwise System.Data.SqlTypes.SqlBoolean.False. If either instance of SqlByte is null, the System.Data.SqlTypes.SqlBoolean.Value of the SqlBoolean will be System.Data.SqlTypes.SqlBoolean.Null. A SqlByte structure. A SqlByte structure.
  LessThanOrEqual
[C#] public static SqlBoolean LessThanOrEqual(SqlByte x, SqlByte y);
[C++] public: static SqlBoolean LessThanOrEqual(SqlByte x, SqlByte y);
[VB] Public Shared Function LessThanOrEqual(ByVal x As SqlByte, ByVal y As SqlByte) As SqlBoolean
[JScript] public static unction LessThanOrEqual(x: SqlByte, y: SqlByte) SqlBoolean;
Description
  Compares two instances of System.Data.SqlTypes.SqlByte to determine if the first is less than or equal to the second. A SqlByte structure. A SqlByte structure.
  Mod
[C#] public static SqlByte Mod(SqlByte x, SqlByte y);
[C++] public: static SqlByte Mod(SqlByte x, SqlByte y);
[VB] Public Shared Function Mod(ByVal x As SqlByte, ByVal y As SqlByte) As SqlByte
[JScript] public static function Mod(x: SqlByte, y: SqlByte): SqlByte;
Description
  Computes the remainder after dividing its first System.Data.SqlTypes.SqlByte operand by its second.
Return Value: A SqlByte structure whose System.Data.SqlTypes.SqlByte.Value contains the remainder. A SqlByte structure. A SqlByte structure.
  Multiply
[C#] public static SqlByte Multiply(SqlByte x, SqlByte y);
[C++] public: static SqlByte Multiply(SqlByte x, SqlByte y);
[VB] Public Shared Function Multiply(ByVal x As SqlByte, ByVal y As SqlByte) As SqlByte
[JScript] public static function Multiply(x: SqlByte, y: SqlByte): SqlByte;
Description
  Computes the product of the two System.Data.SqlTypes.SqlByte operands.
Return Value: A new SqlByte structure whose System.Data.SqlTypes.SqlByte.Value property contains the product of the multiplication. A SqlByte structure. A SqlByte structure.
  NotEquals
[C#] public static SqlBoolean NotEquals(SqlByte x, SqlByte y);
[C++] public: static SqlBoolean NotEquals(SqlByte x, SqlByte y);
[VB] Public Shared Function NotEquals(ByVal x As SqlByte, ByVal y As SqlByte) As SqlBoolean
[JScript] public static function NotEquals(x: SqlByte, y: SqlByte) SqlBoolean;
Description
  Compares two instances of System.Data.SqlTypes.SqlByte for equality.
Return Value: A System.Data.SqlTypes.SqlBoolean that is System.Data.SqlTypes.SqlBoolean.True if the two instances are not equal or System.Data.SqlTypes.SqlBoolean.False if the two instances are equal. If either instance of SqlByte is null, the System.Data.SqlTypes.SqlBoolean.Value of the SqlBoolean will be System.Data.SqlTypes.SqlBoolean.Null. A SqlByte structure. A SqlByte structure.
  OnesComplement
[C#] public static SqlByte OnesComplement(SqlByte x);
[C++] public: static SqlByte OnesComplement(SqlByte x)
[VB] Public Shared Function OnesComplement(ByVal x As SqlByte) As SqlByte
[JScript] public static function OnesComplement(x: SqlByte): SqlByte;
Description
  The ones complement operator performs a bitwise one's complement operation on its System.Data.SqlTypes.SqlByte operand.
Return Value: A SqlByte structure whose System.Data.SqlTypes.SqlByte.Value property contains the ones complement of the SqlByte parameter. A SqlByte structure.

op_Addition
[C#] public static SqlByte operator+(SqlByte x, SqlByte y);
[C++] public: static SqlByte op_Addition(SqlByte x, SqlByte y);
[VB] returnValue=SqlByte.op_Addition(x, y)
[JScript] returnValue=x+y;
Description
Computes the sum of the two specified System.Data.SqlTypes.SqlByte structures.
Return Value: A SqlByte whose System.Data.SqlTypes.SqlByte.Value property contains the sum of the two operands. A SqlByte structure. A SqlByte structure.
op_BitwiseAnd
[C#] public static SqlByte operator &(SqlByte x, SqlByte y);
[C++] public: static SqlByte op_BitwiseAnd(SqlByte x, SqlByte y);
[VB] returnValue=SqlByte.op_BitwiseAnd(x, y)
[JScript] returnValue=x & y;
Description
Computes the bitwise AND of its System.Data.SqlTypes.SqlByte operands.
Return Value: The results of the bitwise AND operation. A SqlByte structure. A SqlByte structure.
op_BitwiseOr
[C#] public static SqlByte operator |(SqlByte x, SqlByte y);
[C++] public: static SqlByte op_BitwiseOr(SqlByte x, SqlByte y);
[VB] returnValue=SqlByte.op_BitwiseOr(x, y)
[JScript] returnValue=x|y;
Description
Computes the bitwise OR of its two System.Data.SqlTypes.SqlByte operands.
Return Value: The results of the bitwise OR operation. A SqlByte structure. A SqlByte structure.
op_Division
[C#] public static SqlByte operator /(SqlByte x, SqlByte y);
[C++] public: static SqlByte op_Division(SqlByte x, SqlByte y);
[VB] returnValue=SqlByte.op_Division(x, y)
[JScript] returnValue=x/y;
Description
Divides its first System.Data.SqlTypes.SqlByte operand by its second.
Return Value: A new SqlByte structure whose System.Data.SqlTypes.SqlByte.Value property contains the results of the division. A SqlByte structure. A SqlByte structure.
op_Equality
[C#] public static SqlBoolean operator==(SqlByte x, SqlByte y);
[C++] public: static SqlBoolean op_Equality(SqlByte x, SqlByte y);
[VB] returnValue=SqlByte.op_Equality(x, y)
[JScript] returnValue=x==y;
Description
Performs a logical comparison of two System.Data.SqlTypes.SqlByte structures to determine if they are equal.
Return Value: A System.Data.SqlTypes.SqlBoolean that is System.Data.SqlTypes.SqlBoolean.True if the two instances are equal or System.Data.SqlTypes.SqlBoolean.False if the two instances are not equal. If either instance of SqlByte is null, the System.Data.SqlTypes.SqlBoolean.Value of the SqlBoolean will be System.Data.SqlTypes.SqlBoolean.Null A SqlByte structure. A SqlByte structure.
op_ExclusiveOr
[C#] public static SqlByte operator ^(SqlByte x, SqlByte y);
[C++] public: static SqlByte op_ExclusiveOr(SqlByte x, SqlByte y);
[VB] returnValue=SqlByte.op_ExclusiveOr(x, y)
[JScript] returnValue=x^y;
Description
Performs a bitwise exclusive-OR operation on the supplied parameters.
Return Value: The results of the bitwise XOR operation. A SqlByte structure. A SqlByte structure.
op_Explicit
[C#] public static explicit operator SqlByte(SqlBoolean x);
[C++] public: static SqlByte op_Explicit(SqlBoolean x);
[VB] returnValue SqlByte.op_Explicit(x)
[JScript] returnValue=SqlByte(x);
Description
Converts the System.Data.SqlTypes.SqlBoolean parameter to a System.Data.SqlTypes.SqlByte
Return Value: A SqlByte whose System.Data.SqlTypes.SqlByte.Value property equals the System.Data.SqlTypes.SqlBit.ByteValue of the supplied SqlBoolean parameter. The SqlBoolean parameter to be converted to a SqlByte.
op_Explicit
[C#] public static explicit operator byte(SqlByte x);
[C++] public: static unsigned char op_Explicit( );
[VB] returnValue=SqlByte.op_Explicit(x)
[JScript] returnValue=Byte(x);
Description
Converts the supplied System.Data.SqlTypes.SqlByte structure to a byte.
Return Value: A byte whose value equals the System.Data.SqlTypes.SqlByte.Value property of the SqlByte parameter. The SqlByte structure to be converted to a byte.
op_Explicit
[C#] public static explicit operator SqlByte(SqlDecimal x);
[C++] public: static SqlByte op_Explicit(SqlDecimal x);
[VB] returnValue=SqlByte.op_Explicit(x)
[JScript] returnValue=SqlByte(x);
Description
Converts the supplied System.Data.SqlTypes.SqlDecimal to System.Data.SqlTypes.SqlByte
Return Value: A SqlByte structure whose System.Data.SqlTypes.SqlByte.Value property is equal to the System.Data.SqlTypes.SqlDecimal.Value of the Decimal parameter. A SqlDecimal structure.
op_Explicit
[C#] public static explicit operator SqlByte(SqlDouble x);
[C++] public: static SqlByte op_Explicit(SqlDouble x);
[VB] returnValue=SqlByte.op_Explicit(x)
[JScript] returnValue=SqlByte(x);
Description
Converts the supplied System.Data.SqlTypes.SqlDouble to System.Data.SqlTypes.SqlByte
Return Value: A SqlByte structure whose System.Data.SqlTypes.SqlByte.Value property is equal to the System.Data.SqlTypes.SqlDouble.Value of the Double parameter. A SqlDouble structure.
op_Explicit
[C#] public static explicit operator SqlByte(SqlInt16 x);
[C++] public: static SqlByte op_Explicit(SqlInt16 x);
[VB] returnValue=SqlByte.op_Explicit(x)
[JScript] returnValue=SqlByte(x);
Description
Converts the System.Data.SqlTypes.SqlInt16 parameter to a System.Data.SqlTypes.SqlByte
Return Value: A SqlByte structure whose System.Data.SqlTypes.SqlByte.Value property is equal to the System.Data.SqlTypes.SqlInt16.Value of the SqlInt16 parameter. A SqlInt16structure.
op_Explicit

[C#] public static explicit operator SqlByte(SqlInt32 x);
[C++] public: static SqlByte op_Explicit(SqlInt32 x);
[VB] returnValue=SqlByte.op_Explicit(x)
[JScript] returnValue=SqlByte(x);
Description
Converts the supplied System.Data.SqlTypes.SqlInt32 to System.Data.SqlTypes.SqlByte
Return Value: A SqlByte structure whose System.Data.SqlTypes.SqlByte.Value property is equal to the System.Data.SqlTypes.SqlInt32.Value of the SqlInt32 parameter. A SqlInt32 structure.
op_Explicit
[C#] public static explicit operator SqlByte(SqlInt64 x);
[C++] public: static SqlByte op_Explicit(SqlInt64 x);
[VB] returnValue=SqlByte.op_Explicit(x)
[JScript] returnValue=SqlByte(x);
Description
Converts the supplied System.Data.SqlTypes.SqlInt64 to System.Data.SqlTypes.SqlByte
Return Value: A SqlByte structure whose System.Data.SqlTypes.SqlByte.Value property is equal to the System.Data.SqlTypes.SqlInt64.Value of the SqlInt64 parameter. A SqlInt64 structure.
op_Explicit
[C#] public static explicit operator SqlByte(SqlMoney x);
[C++] public: static SqlByte op_Explicit(SqlMoney x);
[VB] returnValue=SqlByte.op_Explicit(x)
[JScript] returnValue=SqlByte(x);
Description
Converts the System.Data.SqlTypes.SqlMoney parameter to a System.Data.SqlTypes.SqlByte
Return Value: A SqlByte structure whose System.Data.SqlTypes.SqlByte.Value property is equal to the System.Data.SqlTypes.SqlMoney.Value of the SqlMoney parameter. A SqlMoney structure.
op_Explicit
[C#] public static explicit operator SqlByte(SqlSingle x);
[C++] public: static SqlByte op_Explicit(SqlSingle x);
[VB] returnValue=SqlByte.op_Explicit(x)
[JScript] returnValue=SqlByte(x);
Description
Converts the supplied System.Data.SqlTypes.SqlSingle structure to System.Data.SqlTypes.SqlByte
Return Value: A SqlByte structure whose System.Data.SqlTypes.SqlByte.Value property is equal to the System.Data.SqlTypes.SqlSingle.Value of the SqlSingle parameter. A SqlSingle structure.
op_Explicit
[C#] public static explicit operator SqlByte(SqlString x);
[C++] public: static SqlByte op_Explicit(SqlString x);
[VB] returnValue=SqlByte.op_Explicit(x)
[JScript] returnValue=SqlByte(x);
Description
Converts the supplied System.Data.SqlTypes.SqlString to System.Data.SqlTypes.SqlByte
Return Value: A SqlByte structure whose System.Data.SqlTypes.SqlByte.Value property is equal to the numeric value represented by the SqlString. An instance of the SqlString class.
op_GreaterThan
[C#] public static SqlBoolean operator>(SqlByte x, SqlByte y);
[C++] public: static SqlBoolean op_GreaterThan(SqlByte x, SqlByte y);
[VB] returnValue=SqlByte.op_GreaterThan(x, y)
[JScript] returnValue=x>y;
Description
Compares two instances of System.Data.SqlTypes.SqlByte to determine if the first is greater than the second.
Return Value: A System.Data.SqlTypes.SqlBoolean that is System.Data.SqlTypes.SqlBoolean.True if the first instance is greater than the second instance, otherwise System.Data.SqlTypes.SqlBoolean.False. If either instance of SqlByte is null, the System.Data.SqlTypes.SqlBoolean.Value of the SqlBoolean will be System.Data.SqlTypes.SqlBoolean.Null. A SqlByte structure. A SqlByte structure.
op_GreaterThanOrEqual
[C#] public static SqlBoolean operator>=(SqlByte x, SqlByte y);
[C++] public: static SqlBoolean op_GreaterThanOrEqual(SqlByte x, SqlByte y);
[VB] returnValue=SqlByte.op_GreaterThanOrEqual(x, y)
[JScript] returnValue=x>=y;
Description
Compares two instances of System.Data.SqlTypes.SqlByte to determine if the first is greater than or equal to the second.
Return Value: A System.Data.SqlTypes.SqlBoolean that is System.Data.SqlTypes.SqlBoolean.True if the first instance is greater than or equal to the second instance, otherwise System.Data.SqlTypes.SqlBoolean.False.
If either instance of SqlByte is null, the System.Data.SqlTypes.SqlBoolean.Value of the SqlBoolean will be System.Data.SqlTypes.SqlBoolean.Null. A System.Data.SqlTypes.SqlByte structure. A System.Data.SqlTypes.SqlByte structure.
op_Implicit
[C#] public static implicit operator SqlByte(byte x);
[C++] public: static SqlByte op_Implicit(unsigned char x);
[VB] returnValue=SqlByte.op_Implicit(x)
[JScript] returnValue=x;
Description
Converts the supplied byte value to a System.Data.SqlTypes.SqlByte
Return Value: A SqlByte structure whose System.Data.SqlTypes.SqlByte.Value property is equal to the supplied parameter. A byte value to be converted to SqlByte.
op_Inequality
[Cg] public static SqlBoolean operator !=(SqlByte x, SqlByte y);
[C++] public: static SqlBoolean op_Inequality(SqlByte x, SqlByte y);
[VB] returnValue=SqlByte.op_Inequality(x, y)
[JScript] returnValue=x !=y;
Description
Compares two instances of System.Data.SqlTypes.SqlByte for equality.
Return Value: A System.Data.SqlTypes.SqlBoolean that is System.Data.SqlTypes.SqlBoolean.True if the two instances are not equal or System.Data.SqlTypes.SqlBoolean.False if the two instances are equal. If either instance of SqlByte is null, the System.Data.SqlTypes.SqlBoolean.Value of the SqlBoolean will be System.Data.SqlTypes.SqlBoolean.Null. A SqlByte structure. A SqlByte structure.
op_LessThan
[C#] public static SqlBoolean operator
[C++] public: static SqlBoolean op_LessThan(SqlByte x, SqlByte y);
[VB] returnValue=SqlByte.op_LessThan(x, y)
[JScript] returnValue=x<y;
Description
Compares two instances of System.Data.SqlTypes.SqlByte to determine if the first is less than the second.
Return Value: A System.Data.SqlTypes.SqlBoolean that is System.Data.SqlTypes.SqlBoolean.True if the first instance is less than the second instance, otherwise System.Data.Sql-Types.SqlBoolean.False. If either instance of SqlByte is null, the System.Data.SqlTypes.SqlBoolean.Value of the SqlBoolean will be System.Data.SqlTypes.SqlBoolean.Null. A SqlByte structure. A SqlByte structure.

op_LessThanOrEqual

[C#] public static SqlBoolean operator<=(SqlByte x, SqlByte y);
[C++] public: static SqlBoolean op_LessThanOrEqual (SqlByte x, SqlByte y);
[VB] returnValue=SqlByte.op_LessThanOrEqual(x, y)
[JScript] returnValue=x<=y;
Description Compares two instances of System.Data.SqlTypes.Sql-Byte to determine if the first is less than or equal to the second.
Return Value: A System.Data.SqlTypes.SqlBoolean that is System.Data.SqlTypes.SqlBoolean.True if the first instance is less than or equal to the second instance, otherwise System.Data.SqlTypes.SqlBoolean.False. If either instance of SqlByte is null, the System.Data.SqlTypes.SqlBoolean-.Value of the SqlBoolean will be System.Data.SqlTypes.Sql-Boolean.Null. A SqlByte structure. A SqlByte structure.

op_Modulus

[C#] public static SqlByte operator %(SqlByte x, SqlByte y);
[C++] public: static SqlByte op_Modulus(SqlByte x, SqlByte y);
[VB] returnValue=SqlByte.op_Modulus(x, y)
[JScript] returnValue=x % y;
Description Computes the remainder after dividing its first System-.Data.SqlTypes.SqlByte operand by its second.
Return Value: A SqlByte structure whose System.Data.Sql-Types.SqlByte.Value contains the remainder. A SqlByte structure. A SqlByte structure.

op_Multiply

[C#] public static SqlByte operator*(SqlByte x, SqlByte y);
[C++] public: static SqlByte op_Multiply(SqlByte x, SqlByte y);
[VB] returnValue=SqlByte.op_Multiply(x, y)
[JScript] returnValue=x*y;
Description Computes the product of the two System.Data.Sql-Types.SqlByte operands.
Return Value: A new SqlByte structure whose System-.Data.SqlTypes.SqlByte.Value property contains the product of the multiplication. A SqlByte structure. A SqlByte structure.

op_OnesComplement

[C#] public static SqlByte operator ~(SqlByte x);
[C++] public: static SqlByte op_OnesComplement(SqlByte x);
[VB] returnValue=SqlByte.op_OnesComplement(x)
[JScript] returnValue=~x;
Description The ones complement operator performs a bitwise one's complement operation on its System.Data.SqlTypes.SqlByte operand.
Return Value: A SqlByte structure whose System.Data.Sql-Types.SqlByte.Value property contains the ones complement of the SqlByte parameter. A SqlByte structure.

op_Subtraction

[C#] public static SqlByte operator −(SqlByte x, SqlByte y);
[C++] public: static SqlByte op_Subtraction(SqlByte x, SqlByte y);
[VB] returnValue=SqlByte.op_Subtraction(x, y)
[JScript] returnValue=x−y;
Description Subtracts the second System.Data.SqlTypes.SqlByte operand from the first.
Return Value: The results of subtracting the second SqlByte operand from the first. A SqlByte structure. A SqlByte structure.

Parse

[C#] public static SqlByte Parse(string s);
[C++] public: static SqlByte Parse(String* s);
[VB] Public Shared Function Parse(ByVal s As String) As SqlByte
[JScript] public static function Parse(s: String): SqlByte;
Description
[.]

Subtract

[C+] public static SqlByte Subtract(SqlByte x, SqlByte y);
[C++] public: static SqlByte Subtract(SqlByte x, SqlByte y);
[VB] Public Shared Function Subtract(ByVal x As SqlByte, ByVal y As SqlByte) As SqlByte
[JScript] public static function Subtract(x: SqlByte, y: SqlByte): SqlByte;
Description Subtracts the second System.Data.SqlTypes.SqlByte operand from the first.
Return Value: The results of subtracting the second SqlByte operand from the first. A SqlByte structure. A SqlByte structure.

ToSqlBoolean

[C#] public SqlBoolean ToSqlBoolean( );
[C++] public: SqlBoolean ToSqlBoolean( );
[VB] Public Function ToSqlBoolean( ) As SqlBoolean
[JScript] public function ToSqlBoolean( ): SqlBoolean;
Description Converts this System.Data.SqlTypes.SqlByte structure to System.Data.SqlTypes.SqlBoolean
Return Value: A SqlBoolean that will be System.Data.Sql-Types.SqlBoolean.True if the System.Data.SqlTypes.Value of the SqlByte structure is non-zero, False if the SqlByte is zero and Null if the SqlByte is Null.

ToSqlDecimal

[C#] public SqlDecimal ToSqlDecimal( );
[C++] public: SqlDecimal ToSqlDecimal( );
[VB] Public Function ToSqlDecimal( ) As SqlDecimal
[JScript] public function ToSqlDecimal( ): SqlDecimal;
Description Converts this System.Data.SqlTypes.SqlByte structure to System.Data.SqlTypes.SqlDecimal
Return Value: A SqlDecimal structure whose System-.Data.SqlTypes.SqlDecimal.Value equals the System-.Data.SqlTypes.SqlByte.Value of this SqlByte structure.

ToSqlDouble

[C#] public SqlDouble ToSqlDouble( );
[C++] public: SqlDouble ToSqlDouble( );
[VB] Public Function ToSqlDouble( ) As SqlDouble
[JScript] public function ToSqlDouble( ): SqlDouble;
Description Converts this System.Data.SqlTypes.SqlByte structure to System.Data.SqlTypes.SqlDouble
Return Value: A SqlDouble structure with the same value as this SqlByte.

ToSqlInt16

[C#] public SqlInt16 ToSqlInt16( );
[C++] public: SqlInt16 ToSqlInt16( );
[VB] Public Function ToSqlInt16( ) As SqlInt16
[JScript] public function ToSqlInt16( ): SqlInt16;

Description
  Converts this SqlByte structure to System.Data.Sql-Types.SqlInt16
Return Value: A SqlInt16 structure with the same value as this SqlByte.
  ToSqlInt32
[C#] public SqlInt32 ToSqlInt32( );
[C++] public: SqlInt32 ToSqlInt32( );
[VB] Public Function ToSqlInt32( ) As SqlInt32
[JScript] public function ToSqlInt32( ): SqlInt32;
Description
  Converts this System.Data.SqlTypes.SqlByte to System.Data.SqlTypes.SqlInt32
Return Value: A SqlInt32 structure with the same value as this SqlByte.
  ToSqlInt64
[C#] public SqlInt64 ToSqlInt64( );
[C++] public: SqlInt64 ToSqlInt64( );
[VB] Public Function ToSqlInt64(As SqlInt64
[JScript] public function ToSqlInt64 ( ): SqlInt64;
Description
  Converts this System.Data.SqlTypes.SqlByte structure to System.Data.SqlTypes.SqlInt64
Return Value: A SqlInt64 structure who System.Data.SqlTypes.SqlInt64.Value equals the System.Data.SqlTypes.SqlByte.Value of this SqlByte;
  ToSqlMoney
[C#] public SqlMoney ToSqlMoney( );
[C++] public: SqlMoney ToSqlMoney( );
[VB] Public Function ToSqlMoney( ) As SqlMoney
[JScript] public function ToSqlMoney( ): SqlMoney;
Description
  Converts this System.Data.SqlTypes.SqlByte structure to System.Data.SqlTypes.SqlMoney
Return Value: A SqlMoney structure whose System.Data.SqlTypes.SqlMoney.Value equals the System.Data.SqlTypes.SqlByte.Value of this SqlByte structure.
  ToSqlSingle
[C#] public SqlSingle ToSqlSingle( );
[C++] public: SqlSingle ToSqlSingle( );
[VB] Public Function ToSqlSingle( ) As SqlSingle
[JScript] public function ToSqlSingle( ): SqlSingle;
Description
  Converts this System.Data.SqlTypes.SqlByte structure to System.Data.SqlTypes.SqlSingle
Return Value: A SqlSingle structure that has the same System.Data.SqlTypes.SqlSingle.Value as this SqlByte structure.
  ToSqlString
[C#] public SqlString ToSqlString( );
[C++] public: SqlString ToSqlString( );
[VB] Public Function ToSqlString( ) As SqlString
[JScript] public function ToSqlString( ) SqlString;
Description
  Converts this instance of System.Data.SqlTypes.SqlByte to System.Data.SqlTypes.SqlString
Return Value: A SqlString containing the string representation of the SqlByte structure's System.Data.SqlTypes.SqlByte.Value.
  ToString
[C#] public override string ToString( );
[C++] public: String* ToString( );
[VB] Overrides Public Function ToString( ) As String
[JScript] public override function ToString( ): String; Converts a System.Data.SqlTypes.SqlByte to a string.
Description
  Converts this System.Data.SqlTypes.SqlByte structure to a System.String Return Value: A string containing the System.Data.SqlTypes.SqlByte.Value of the SqlByte. If the Value is null, the String will be a null string.
  Xor
[C#] public static SqlByte Xor(SqlByte x, SqlByte y);
[C++] public: static SqlByte Xor(SqlByte x, SqlByte y);
[VB] Public Shared Function Xor(ByVal x As SqlByte, ByVal y As SqlByte) As SqlByte
[JScript] public static function Xor(x: SqlByte, y: SqlByte): SqlByte;
Description
  Performs a bitwise exclusive-OR operation on the supplied parameters.
Return Value: The results of the XOR operation. A SqlByte structure. A SqlByte structure.
  SqlCompareOptions enumeration (System.Data.SqlTypes)
  Xor
Description
  Specifies the compare option values for a System.Data.SqlTypes.SqlString structure.
  Xor
[C#] public const SqlCompareOptions BinarySort;
[++] public: const SqlCompareOptions BinarySort;
[VB] Public Const BinarySort As SqlCompareOptions
[JScript] public var BinarySort: SqlCompareOptions;
Description
  Specifies that sorts should be based on a characters numeric value rather than its alphabetic value.
  Xor
[C#] public const SqlCompareOptions IgnoreCase;
[C++] public: const SqlCompareOptions IgnoreCase;
[VB] Public Const IgnoreCase As SqlCompareOptions
[JScript] public var IgnoreCase: SqlCompareOptions;
Description
  Specifies that SqlString comparisons must ignore case.
  Xor
[C#] public const SqlCompareOptions IgnoreKanaType;
[C++] public: const SqlCompareOptions IgnoreKanaType;
[VB] Public Const IgnoreKanaType As SqlCompareOptions
[JScript] public var IgnoreKanaType: SqlCompareOptions;
Description
  Specifies that the string comparison must ignore the Kana type. Kana type refers to Japanese hiragana and katakana characters, which represent phonetic sounds in the Japanese language. Hiragana is used for native Japanese expressions and words, while katakana is used for words borrowed from other languages, such as "computer" or "internet". A phonetic sound can be expressed in both hiragana and katakana. If this value is selected, the hiragana character for one sound is considered equal to the katakana character for the same sound.
  Xor
[C#] public const SqlCompareOptions IgnoreNonSpace;
[C++] public: const SqlCompareOptions IgnoreNonSpace;
[VB] Public Const IgnoreNonSpace As SqlCompareOptions
[JScript] public var IgnoreNonSpace: SqlCompareOptions;
Description
  Specifies that the string comparison must ignore nonspace combining characters, such as diacritics. The Unicode Standard defines combining characters as characters that are combined with base characters to produce a new character. Non-space combining characters do not take up character space by themselves when rendered. For more information on non-space combining characters, see the Unicode Standard at http://www.unicode.org.
  Xor

[C#] public const SqlCompareOptions IgnoreWidth;
[C++] public: const SqlCompareOptions IgnoreWidth;
[VB] Public Const IgnoreWidth As SqlCompareOptions
[JScript] public var IgnoreWidth: SqlCompareOptions;
Description
Specifies that the string comparison must ignore the character width. For example, Japanese katakana characters can be written as full-width or half-width and, if this value is selected, the katakana characters written as full-width are considered equal to the same characters written in half-width.
Xor
[C#] public const SqlCompareOptions None;
[C++] public: const SqlCompareOptions None;
[VB] Public Const None As SqlCompareOptions
[JScript] public var None: SqlCompareOptions;
Description
Specifies the default option settings for SqlString comparisons.
SqlDateTime structure (System.Data.SqlTypes)
ToString
Description
Represents the date and time data ranging in value from Jan. 1, 1753 to Dec. 31, 9999 to an accuracy of 3.33 milliseconds to be stored in or retrieved from a database.
ToString
[C#] public static readonly SqlDateTime MaxValue;
[C++] public: static SqlDateTime MaxValue;
[VB] Public Shared ReadOnly MaxValue As SqlDateTime
[JScript] public static var MaxValue: SqlDateTime;
Description
Represents the maximum valid date value for a System.Data.SqlTypes.SqlDateTime structure.
The maximum valid date for a SqlDateTime structure is Dec. 31, 9999.
ToString
[C#] public static readonly SqlDateTime MinValue;
[C++] public: static SqlDateTime MinValue;
[VB] Public Shared ReadOnly MinValue As SqlDateTime
[JScript] public static var MinValue: SqlDateTime;
Description
Represents the minimum valid date value for a System.Data.SqlTypes.SqlDateTime structure.
The minimum valid date for a SqlDateTime structure is Jan. 1, 1753.
ToString
[C#]public static readonly SqlDateTime Null;
[C++] public: static SqlDateTime Null;
[VB] Public Shared ReadOnly Null As SqlDateTime
[JScript] public static var Null: SqlDateTime;
Description
Represents a null value that can be assigned to the System.Data.SqlTypes.SqlDateTime.Value property of an instance of the System.Data.SqlTypes.SqlDateTime structure.
Null functions as a constant for the SqlDatelime structure.
ToString
[C#] public static readonly int SQLTicksPerHour;
[C++] public: static int SQLTicksPerHour;
[VB] Public Shared ReadOnly SQLTicksPerHour As Integer
[JScript] public static var SQLTicksPerHour: int;
Description
A constant whose value is the number of ticks equivalent to one hour.
ToString
[C#] public static readonly int SQLTicksPerMinute;
[C++] public: static int SQLTicksPerMinute;
[VB] Public Shared ReadOnly SQLTicksPerMinute As Integer
[JScript] public static var SQLTicksPerMinute: int;
Description
A constant whose value is the number of ticks equivalent to one minute.
ToString
[C#] public static readonly int SQLTicksPerSecond;
[C++] public: static int SQLTicksPerSecond;
[VB] Public Shared ReadOnly SQLTicksPerSecond As Integer
[JScript] public static var SQLTicksPerSecond: int;
Description
A constant whose value is the number of ticks equivalent to one second. SqlDateTime
Example Syntax:
ToString
[C#] public SqlDateTime(DateTime value);
[C++] public: SqlDateTime(DateTime value);
[VB] Public Sub New(ByVal value As DateTime)
[JScript] public function SqlDateTime(value: DateTime);
Initializes a new instance of the System.Data.SqlTypes.SqlDateTime structure.
Description
Initializes a new instance of the System.Data.SqlTypes.SqlDateTime structure using the specified System.DateTime value. A System.DateTime structure.
SqlDateTime
Example Syntax:
ToString
[C#] public SqlDateTime(int dayTicks, int timeTicks);
[C++] public: SqlDateTime(int dayTicks, int timeTicks);
[VB] Public Sub New(ByVal dayTicks As Integer, ByVal timeTicks As Integer)
[JScript] public function SqlDateTime(dayTicks: int, timeTicks: int);
Description
Initializes a new instance of the System.Data.SqlTypes.SqlDateTime structure using the supplied parameters. An integer value that represents the date as ticks. An integer value that represents the time as ticks.
SqlDateTime
Example Syntax:
ToString
[C#] public SqlDateTime(int year, int month, int day);
[C++] public: SqlDateTime(int year, int month, int day);
[VB] Public Sub New(ByVal year As Integer, ByVal month As Integer, ByVal day As Integer)
[JScript] public function SqlDateTime(year: int, month: int, day: int);
Description
Initializes a new instance of the System.Data.SqlTypes.SqlDateTime structure using the supplied parameters to initialize the year, month, day. An integer representing the year of the of the new System.Data.SqlTypes.SqlDateTime structure. An integer value representing the month of the new System.Data.SqlTypes.SqlDateTime structure. An integer value representing the day number of the new System.Data.SqlTypes.SqlDateTime structure.
SqlDateTime
Example Syntax:
ToString
[C#] public SqlDateTime(int year, int month, int day, int hour, int minute, int second);
[C++] public: SqlDateTime(int year, int month, int day, int hour, int minute, int second);
[VB] Public Sub New(ByVal year As Integer, ByVal month As Integer, ByVal day As Integer, ByVal hour As Integer, ByVal minute As Integer, ByVal second As Integer)

[JScript] public function SqlDateTime(year: int, month: int, day: int, hour: int, minute: int, second int);
Description
Initializes a new instance of the System.Data.SqlTypes.SqlDateTime structure using the supplied parameters to initialize the year, month, day, hour, minute, and second of the new structure. An integer value representing the year of the new System.Data.SqlTypes.SqlDateTime structure. An integer value representing the month of the new System.Data.SqlTypes.SqlDateTime structure. An integer value representing the day of the month of the new System.Data.SqlTypes.SqlDateTime structure. An integer value representing the hour of the new System.Data.SqlTypes.SqlDateTime structure. An integer value representing the minute of the new System.Data.SqlTypes.SqlDateTime structure. An integer value representing the second of the new System.Data.SqlTypes.SqlDateTime structure.
SqlDateTime
Example Syntax:
ToString
[C#] public SqlDateTime(int year, int month, int day, int hour, int minute, int second, double millisecond);
[C++] public: SqlDateTime(int year, int month, int day, int hour, int minute, int second, double millisecond);
[VB] Public Sub New(ByVal year As Integer, ByVal month As Integer, ByVal day As Integer, ByVal hour As Integer, ByVal minute As Integer, ByVal second As Integer, ByVal millisecond As Double)
[JScript] public function SqlDateTime(year: int, month: int, day: int, hour: int, minute: int, second: int, millisecond: double);
Description
Initializes a new instance of the System.Data.SqlTypes.SqlDateTime structure using the supplied parameters to initialize the year, month, day, hour, minute, second, and millisecond of the new structure. An integer value representing the year of the new System.Data.SqlTypes.SqlDateTime structure. An integer value representing the month of the new System.Data.SqlTypes.SqlDateTime structure. An integer value representing the day of the month of the new System.Data.SqlTypes.SqlDateTime structure. An integer value representing the hour of the new System.Data.SqlTypes.SqlDateTime structure. An integer value representing the minute of the new System.Data.SqlTypes.SqlDateTime structure. An integer value representing the second of the new System.Data.SqlTypes.SqlDateTime structure. An double value representing the millisecond of the new System.Data.SqlTypes.SqlDateTime structure.
SqlDateTime
Example Syntax:
ToString
[C#] public SqlDateTime(int year, int month, int day, int hour, int minute, int second, int bilisecond);
[C++] public: SqlDateTime(int year, int month, int day, int hour, int minute, int second, int bilisecond);
[VB] Public Sub New(ByVal year As Integer, ByVal month As Integer, ByVal day As Integer, ByVal hour As Integer, ByVal minute As Integer, ByVal second As Integer, ByVal bilisecond As Integer)
[JScript] public function SqlDateTime(year: int, month: int, day: int, hour: int, minute: int, second: int, bilisecond: int);
Description
Initializes a new instance of the System.Data.SqlTypes.SqlDateTime structure using the supplied parameters to initialize the year, month, day, hour, minute, second, and billisecond of the new structure. An integer value representing the year of the new System.Data.SqlTypes.SqlDateTime structure. An integer value representing the month of the new System.Data.SqlTypes.SqlDateTime structure. An integer value representing the day of the new System.Data.SqlTypes.SqlDateTime structure. An integer value representing the hour of the new System.Data.SqlTypes.SqlDateTime structure. An integer value representing the minute of the new System.Data.SqlTypes.SqlDateTime structure. An integer value representing the second of the new System.Data.SqlTypes.SqlDateTime structure. An integer value representing the bilisecond (billionth of a second) of the new System.Data.SqlTypes.SqlDateTime structure.
DayTicks
ToString
[C#] public int DayTicks {get;}
[C++] public: __property int get_DayTicks( );
[VB] Public ReadOnly Property DayTicks As Integer
[JScript] public function get_DayTicks( ): int;
Description
Gets the number of ticks representing the date of this System.Data.SqlTypes.SqlDateTime structure.
IsNull
ToString
[C#] public bool IsNull {get;}
[C++] public: __property bool get_IsNull( );
[VB] Public ReadOnly Property IsNull As Boolean
[JScript] public function get IsNull( ) Boolean;
Description
Gets a value indicating whether the Value property of the SqlDateTime structure is null.
TimeTicks
ToString
[C#] public int TimeTicks {get;}
[C++] public: __property int get_TimeTicks( );
[VB] Public ReadOnly Property TimeTicks As Integer
[JScript] public function get TimeTicks( ): int;
Description
Gets the number of ticks representing the time of this System.Data.SqlTypes.SqlDateTime structure.
Value
ToString
[C#] public DateTime Value {get;}
[C++] public: __property DateTime get_Value( );
[VB] Public ReadOnly Property Value As DateTime
[JScript] public function get Value( ): DateTime;
Description
Gets the value of the System.Data.SqlTypes.SqlDateTime structure. This property is read-only.
CompareTo
[C#] public int CompareTo(object value);
[C++] public: __sealed int CompareTo(Object* value);
[VB] NotOverridable Public Function CompareTo(ByVal value As Object) As
Integer
[JScript] public function CompareTo(value: Object): int;
Description
Compares this instance to the supplied object and returns an indication of their relative values.
Return Value: A signed number indicating the relative values of the instance and the object. The object to be compared.
Equals
[C#] public override bool Equals(object value);
[C++] public: bool Equals(Object* value);
[VB] Overrides Public Function Equals(ByVal value As Object) As Boolean
[JScript] public override function Equals(value: Object): Boolean;

Description
Compares the supplied object parameter to the System-.Data.SqlTypes.SqlDateTime.Value property of the System-.Data.SqlTypes.SqlDateTime object.
Return Value: true if object is an instance of System-.Data.SqlTypes.SqlDateTime and the two are equal; otherwise false. The object to be compared.
Equals
[C#] public static new SqlBoolean Equals(SqlDateTime x, SqlDateTime y);
[C++] public: static SqlBoolean Equals(SqlDateTime x, SqlDateTime y);
[VB] Shadows Public Shared Function Equals(ByVal x As SqlDateTime, ByVal y As SqlDateTime) As SqlBoolean
[JScript] public static hide function Equals(x: SqlDateTime, y: SqlDateTime) SqlBoolean;
Description
Performs a logical comparison of two System.Data.SqlTypes.SqlDateTime structures to determine if they are equal.
GetHashCode
[C#] public override int GetHashCode( );
[C++] public: int GetHashCode( );
[VB] Overrides Public Function GetHashCode( ) As Integer
[JScript] public override function GetHashCode( ): int;
Description
Gets the hash code for this instance.
Return Value: A 32-bit signed integer hash code.
GreaterThan
[C#] public static SqlBoolean GreaterThan(SqlDateTime x, SqlDateTime y);
[C++] public: static SqlBoolean GreaterThan(SqlDateTime x, SqlDateTime y);
[VB] Public Shared Function GreaterThan(ByVal x As SqlDateTime, ByVal y As SqlDateTime) As SqlBoolean
[JScript] public static function GreaterThan(x: SqlDateTime, y: SqlDateTime); SqlBoolean;
Description
[ .]
GreaterThanOrEqual
[C#] public static SqlBoolean GreaterThanOrEqual (SqlDateTime x, SqlDateTime y);
[C++] public: static SqlBoolean GreaterThanOrEqual (SqlDateTime x, SqlDateTime y);
[VB] Public Shared Function GreaterThanOrEqual(ByVal x As SqlDateTime, ByVal y As SqlDateTime) As SqlBoolean
[JScript] public static function GreaterThanOrEqual(x: SqlDateTime, y: SqlDateTime) SqlBoolean;
Description
[ .]
LessThan
[C#] public static SqlBoolean LessThan(SqlDateTime x, SqlDateTime y);
[C++] public: static SqlBoolean LessThan(SqlDateTime x, SqlDateTime y);
[VB] Public Shared Function LessThan(ByVal x As SqlDateTime, ByVal y As SqlDateTime) As SqlBoolean
[JScript] public static function LessThan(x: SqlDateTime, y: SqlDateTime): SqlBoolean;
Description
[ .]
LessThanOrEqual
[C#] public static SqlBoolean LessThanOrEqual (SqlDateTime x, SqlDateTime y);
[C++] public: static SqlBoolean LessThanOrEqual (SqlDateTime x, SqlDateTime y);
[VB] Public Shared Function LessThanOrEqual(ByVal x As SqlDateTime, ByVal y As SqlDateTime) As SqlBoolean
[JScript] public static function LessThanOrEqual(x: SqlDateTime, y: SqlDateTime): SqlBoolean;
Description
[ .]
NotEquals
[C#] public static SqlBoolean NotEquals(SqlDateTime x, SqlDateTime y);
[C++] public: static SqlBoolean NotEquals(SqlDateTime x, SqlDateTime y);
[VB] Public Shared Function NotEquals(ByVal x As SqlDateTime, ByVal y As SqlDateTime) As SqlBoolean
[JScript] public static function NotEquals(x: SqlDateTime, y: SqlDateTime): SqlBoolean;
Description
[ .]
op_Addition
[C#] public static SqlDateTime operator+(SqlDateTime x, TimeSpan t);
[C++] public: static SqlDateTime op_Addition (SqlDateTime x, TimeSpan t);
[VB] returnValue=SqlDateTime.op_Addition(x, t)
[JScript] returnValue=x+t;
Description
Adds the amount of time indicated by the supplied TimeSpan parameter, t, to the supplied System.Data.SqlTypes.SqlDateTime structure.
Return Value: A new System.Data.SqlTypes.SqlDateTime. If either arguement is System.Data.SqlTypes.SqlDateTime.Null, the new System-.Data.SqlTypes.SqlDateTime.Value will be System-.Data.SqlTypes.SqlDateTime.Null A System.Data.SqlTypes.SqlDateTime structure. A System.TimeSpan structure.
op_Equality
[C#] public static SqlBoolean operator==(SqlDateTime x, SqlDateTime y);
[C++] public: static SqlBoolean op_Equality(SqlDateTime x, SqlDateTime y);
[VB] returnValue=SqlDateTime.op_Equality(x, y)
[JScript] returnValue=x==y;
Description
Performs a logical comparison of two System.Data.SqlTypes.SqlDateTime structures to determine if they are equal.
Return Value: true if the two values are equal, otherwise false. A System.Data.SqlTypes.SqlDateTime structure. A System.Data.SqlTypes.SqlDateTime structure.
op_Explicit
[C#] public static explicit operator DateTime(SqlDateTime x);
[C++] public: static DateTime op_Explicit( );
[VB] returnValue=SqlDateTime.op_Explicit(x)
[JScript] returnValue=DateTime(x);
Description
Converts a System.Data.SqlTypes.SqlDateTime structure to a System.DateTime structure.
Return Value: A System.DateTime object whose System-.DateTime.Date and System.TimeOfDay properties contain the same date and time values as the System.Data.SqlTypes.SqlDateTime.Value property of the supplied System-.Data.SqlTypes.SqlDateTime structure. A System.Data.SqlTypes.SqlDateTime structure.
op_Explicit
[C#] public static explicit operator SqlDateTime(SqlString x);
[C++] public: static SqlDateTime op_Explicit(SqlString x);
[VB] returnValue=SqlDateTime.op_Explicit(x)
[JScript] returnValue=SqlDateTime(x);

Description
Converts the supplied System.Data.SqlTypes.SqlString to a System.Data.SqlTypes.SqlDateTime structure.
Return Value: A System.Data.SqlTypes.SqlDateTime structure whose System.Data.SqlTypes.SqlDateTime.Value is equal to the date and time represented by the System.Data.SqlTypes.SqlString parameter. If the System.Data.SqlTypes.SqlString is null, the System.Data.SqlTypes.SqlDateTime.Value of the newly created System.Data.SqlTypes.SqlDateTime structure will be null. A System.Data.SqlTypes.SqlString to be converted.

op_GreaterThan
[C#] public static SqlBoolean operator >(SqlDateTime x, SqlDateTime y);
[C++] public: static SqlBoolean op_GreaterThan (SqlDateTime x, SqlDateTime y);
[VB] returnValue=SqlDateTime.op_GreaterThan(x, y)
[JScript] returnValue=x>y;
Description
Compares two instances of System.Data.SqlTypes.SqlDate Time to determine if the first is greater than the second.
Return Value: A System.Data.SqlTypes.SqlBoolean that is System.Data.SqlTypes.SqlBoolean.True if the first instance is greater than the second instance, otherwise System.Data.SqlTypes.SqlBoolean.False. If either instance of System.Data.SqlTypes.SqlByte is null, the System.Data.SqlTypes.SqlBoolean.Value of the System.Data.SqlTypes.SqlBoolean will be System.Data.SqlTypes.SqlBoolean.Null A System.Data.SqlTypes.SqlDateTime structure. A System.Data.SqlTypes.SqlDateTime structure.

op_GreaterThanOrEqual
[C#] public static SqlBoolean operator>=(SqlDateTime x, SqlDateTime y);
[C++] public: static SqlBoolean op_GreaterThanOrEqual (SqlDateTime x, SqlDateTime y);
[VB] returnValue=SqlDateTime.op_GreaterThanOrEqual (x, y)
[JScript] returnValue=x>=
Description
Compares two instances of System.Data.SqlTypes.SqlDate Time to determine if the first is greater than or equal to the second.
Return Value: A System.Data.SqlTypes.SqlBoolean that is System.Data.SqlTypes.SqlBoolean.True if the first instance is greaater than or equal to the second instance, otherwise System.Data.SqlTypes.SqlBoolean.False.
If either instance of System.Data.SqlTypes.SqlDateTime is null, the System.Data.SqlTypes.SqlBoolean.Value of the System.Data.SqlTypes.SqlBoolean will be System.Data.SqlTypes.SqlBoolean.Null A System.Data.SqlTypes.SqlDateTime structure. A System.Data.SqlTypes.SqlDateTime structure.

op_Implicit
[C#] public static implicit operator SqlDateTime(DateTime value);
[C++] public: static SqlDateTime op_Implicit(DateTime value);
[VB] returnValue=SqlDateTime.op_Implicit(value)
[JScript] returnValue=value;
Description
Converts a System.DateTime structure to a System.Data.SqlTypes.SqlDateTime structure.
Return Value: A System.Data.SqlTypes.SqlDateTime structure whose System.Data.SqlTypes.SqlDateTime.Value is equal to the combined System.DateTime.Date and System.TimeOfDay properties of the supplied System.DateTime structure. A System.DateTime structure.

op_Inequality
[C#] public static SqlBoolean operator !=(SqlDateTime x, SqlDateTime y);
[C++] public: static SqlBoolean op_Inequality (SqlDateTime x, SqlDateTime y);
[VB] returnValue=SqlDateTime.op_Inequality(x, y)
[JScript] returnValue=x !=y;
Description
Performs a logical comparison of two instances of System.Data.SqlTypes.SqlDateTime to determine if they are equal.
Return Value: A System.Data.SqlTypes.SqlBoolean that is System.Data.SqlTypes.SqlBoolean.True if the two instances are not equal or System.Data.SqlTypes.SqlBoolean.False if the two instances are equal. If either instance of System.Data.SqlTypes.SqlDateTime is null, the System.Data.SqlTypes.SqlBoolean.Value of the System.Data.SqlTypes.SqlBoolean will be System.Data.SqlTypes.SqlBoolean.Null A System.Data.SqlTypes.SqlDateTime structure. A System.Data.SqlTypes.SqlDateTime structure.

op_LessThan
[C#] public static SqlBoolean operator
[C++] public: static SqlBoolean op_LessThan (SqlDateTime x, SqlDateTime y);
[VB] returnValue=SqlDateTime.op_LessThan(x, y)
[JScript] returnValue=x<y;
Description
Compares two instances of System.Data.SqlTypes.SqlDate Time to determine if the first is less than the second.
Return Value: A System.Data.SqlTypes.SqlBoolean that is System.Data.SqlTypes.SqlBoolean.True if the first instance is less than the second instance, otherwise System.Data.SqlTypes.SqlBoolean.False. If either instance of System.Data.SqlTypes.SqlDateTime is null, the System.Data.SqlTypes.SqlBoolean.Value of the System.Data.SqlTypes.SqlBoolean will be System.Data.SqlTypes.SqlBoolean.Null. A System.Data.SqlTypes.SqlDateTime structure. A System.Data.SqlTypes.SqlDateTime structure.

op_LessThanOrEqual
[C#] public static SqlBoolean operator<=(SqlDateTime x, SqlDateTime y);
[C++] public: static SqlBoolean op_LessThanOrEqual (SqlDateTime x, SqlDateTime y);
[VB] returnValue=SqlDateTime.op_LessThanOrEqual(x, y)
[JScript] returnValue=x<=y;
Description
Compares two instances of System.Data.SqlTypes.SqlDateTime to determine if the first is less than or equal to the second.
Return Value: A System.Data.SqlTypes.SqlBoolean that is System.Data.SqlTypes.SqlBoolean.True if the first instance is less than or equal to the second instance, otherwise System.Data.SqlTypes.SqlBoolean.False. If either instance of System.Data.SqlTypes.SqlDateTime is null, the System.Data.SqlTypes.SqlBoolean.Value of the System.Data.SqlTypes.SqlBoolean will be System.Data.SqlTypes.SqlBoolean.Null. A System.Data.SqlTypes.SqlDateTime structure. A System.Data.SqlTypes.SqlDateTime structure.

op_Subtraction
[C#] public static SqlDateTime operator –(SqlDateTime x, TimeSpan t);
[C++] public: static SqlDateTime op_Subtraction (SqlDateTime x, TimeSpan t);
[VB] returnValue=SqlDateTime.op_Subtraction(x, t)
[JScript] returnValue=x–t;

Description
Subtracts the supplied System.TimeSpan structure, t, from the from the supplied System.Data.SqlTypes.SqlDateTime structure. A System.Data.SqlTypes.SqlDateTime structure. A System.TimeSpan structure.
Parse
[C#] public static SqlDateTime Parse(string s);
[C++] public: static SqlDateTime Parse(String* s);
[VB] Public Shared Function Parse(ByVal s As String) As SqlDateTime
[JScript] public static function Parse(s: String): SqlDateTime;
Description
[ . ] [ . ]
ToSqlString
[C#] public SqlString ToSqlString( );
[C++] public: SqlString ToSqlString( );
[VB] Public Function ToSqlString( ) As SqlString
[JScript] public function ToSqlString( ): SqlString;
Description
Converts this System.Data.SqlTypes.SqlDateTime structure to System.Data.SqlTypes.SqlString.
ToString
[C#] public override string ToString( );
[C++] public: String* ToString( );
[VB] Overrides Public Function ToString( ) As String
[JScript] public override function ToString( ): String; Converts a System.Data.SqlTypes.SqlDateTime structure to a System.String.
Description
Converts this System.Data.SqlTypes.SqlDateTime structure to a System.String.
Return Value: A String representing the System.Data.SqlTypes.SqlDateTime.Value property of this SqlDateTime structure.
SqlDecimal structure (System.Data.SqlTypes)
ToString
Description
Represents a fixed precision and scale numeric value between −10 −1 and 10 −1 to be stored in or retrieved from a database.
ToString
[C#] public static readonly byte MaxPrecision;
[C++] public: static unsigned char MaxPrecision;
[VB] Public Shared ReadOnly MaxPrecision As Byte
[JScript] public static var MaxPrecision: Byte;
Description
A constant representing the largest possible value for the System.Data.SqlTypes.SqlDecimal.Precision property.
The value of this constant is 38.
ToString
[C#] public static readonly byte MaxScale;
[C++] public: static unsigned char MaxScale;
[VB] Public Shared ReadOnly MaxScale As Byte
[JScript] public static var MaxScale: Byte;
Description
A constant representing the maximum value for the System.Data.SqlTypes.SqlDecimal.Scale property.
ToString
[C#] public static readonly SqlDecimal MaxValue;
[C++] public: static SqlDecimal MaxValue;
[VB] Public Shared ReadOnly MaxValue As SqlDecimal
[JScript] public static var MaxValue: SqlDecimal;
Description
A constant representing the maximum value of a System.Data.SqlTypes.SqlDecimal structure.
The value of this constant is 79,228,162,514,162,514,264, 337,593,543,950,335.
ToString
[C#] public static readonly SqlDecimal MinValue;
[C++] public: static SqlDecimal MinValue;
[VB] Public Shared ReadOnly MinValue As SqlDecimal
[JScript] public static var MinValue: SqlDecimal;
Description
A constant representing the minimum value for a System.Data.SqlTypes.SqlDecimal structure.
The value of this constant is −79,228,162,514,264,337, 593,543,950,335.
ToString
[C#] public static readonly SqlDecimal Null;
[C++] public: static SqlDecimal Null;
[VB] Public Shared ReadOnly Null As SqlDecimal
[JScript] public static var Null: SqlDecimal;
Description
Represents a null value that can be assigned to the System.Data.SqlTypes.SqlDecimal.Value property of an instance of the System.Data.SqlTypes.SqlMoney class.
SqlDecimal
Example Syntax:
ToString
[C#] public SqlDecimal(decimal value);
[C++] public: SqlDecimal(Decimal value);
[VB] Public Sub New(ByVal value As Decimal)
[JScript] public function SqlDecimal(value: Decimal); Initializes a new instance of the System.Data.SqlTypes.SqlDecimal structure.
Description
Initializes a new instance of the System.Data.SqlTypes.SqlDecimal structure using the supplied System.Decimal value. The System.Decimal value to be stored as a System.Data.SqlTypes.SqlDecimal structure.
SqlDecimal
Example Syntax:
ToString
[C#] public SqlDecimal(double dVal);
[C++] public: SqlDecimal(double dVal);
[VB] Public Sub New(ByVal dVal As Double)
[JScript] public function SqlDecimal(dVal: double);
Description
Initializes a new instance of the System.Data.SqlTypes.SqlDecimal structure using the supplied double parameter. A double, representing the value for the new System.Data.SqlTypes.SqlDecimal structure.
SqlDecimal
Example Syntax:
ToString
[C#] public SqlDecimal(int value);
[C++] public: SqlDecimal(int value);
[VB] Public Sub New(ByVal value As Integer)
[JScript] public function SqlDecimal(value: int);
Description
Initializes a new instance of the System.Data.SqlTypes.SqlDecimal structure using the supplied integer value. The supplied integer value which will the used as the value of the new System.Data.SqlTypes.SqlDecimal structure.
SqlDecimal
Example Syntax:
ToString
[C#] public SqlDecimal(long value);
[C++] public: SqlDecimal(__int64 value);
[VB] Public Sub New(ByVal value As Long)
[JScript] public function SqlDecimal(value long);
Description
Initializes a new instance of the System.Data.SqlTypes.SqlDecimal structure using the supplied long integer value. The supplied long integer value which will the used as the value of the new System.Data.SqlTypes.SqlDecimal structure.
SqlDecimal
Example Syntax:
ToString
[C#] public SqlDecimal(byte bprecision, byte bScale, bool fpositive, int[ ] bits);
[C++] public: SqlDecimal(unsigned char bprecision, unsigned char bScale, bool fpositive, int bits __gc[ ]);
[VB] Public Sub New(ByVal bprecision As Byte, ByVal bScale As Byte, ByVal fpositive As Boolean, ByVal bits( ) As Integer)
[JScript] public function SqlDecimal(bPrecision: Byte, bScale: Byte, fpositive: Boolean, bits int[ ]);
Description
Initializes a new instance of the System.Data.SqlTypes.SqlDecimal structure using the supplied parameters. The maximum number of digits that can be used to represent the System.Data.SqlTypes.SqlDecimal.Value property of the new System.Data.SqlTypes.SqlDecimal structure. The number of decimal places to which the System.Data.SqlTypes.SqlDecimal.Value property will be resolved for the new System.Data.SqlTypes.SqlDecimal structure. [ .]
SqlDecimal
Example Syntax:
ToString
[C#] public SqlDecimal(byte bprecision, byte bScale, bool fPositive, int data1, int data2, int data3, int data4);
[C++] public: SqlDecimal(unsigned char bprecision, unsigned char bScale, bool fpositive, int data1, int data2, int data3, int data4);
[VB] Public Sub New(ByVal bprecision As Byte, ByVal bScale As Byte, ByVal fpositive As Boolean, ByVal data1 As Integer, ByVal data2 As Integer, ByVal data3 As Integer, ByVal data4 As Integer)
[JScript] public function SqlDecimal(bPrecision: Byte, bScale: Byte, fpositive: Boolean, data1: int, data2: int, data3: int, data4: int);
Description
Initializes a new instance of the System.Data.SqlTypes.SqlDecimal structure using the supplied parameters. The maximum number of digits that can be used to represent the System.Data.SqlTypes.SqlDecimal.Value property of the new System.Data.SqlTypes.SqlDecimal structure. The number of decimal places to which the System.Data.SqlTypes.SqlDecimal.Value property will be resolved for the new System.Data.SqlTypes.SqlDecimal structure. [ .][ .][ .][ .][ .]
BinData
ToString
[C#] public byte[ ] BinData {get;}
[C++] public: __property unsigned char get_BinData( );
[VB] Public ReadOnly Property BinData As Byte ( )
[JScript] public function get BinData( ): Byte[ ];
Description
[ .][ .]
Data
ToString
[C#] public int[ ] Data {get;}
[C++] public: __property int get_Data( );
[VB] Public ReadOnly Property Data As Integer ( )
[JScript] public function get Data( ): int[ ];
Description
[ .][ .]
IsNull
ToString
[C#] public bool IsNull {get;}
[C++] public: __property bool get_IsNull( );
[VB] Public ReadOnly Property IsNull As Boolean
[JScript] public function get IsNull( ): Boolean;
Description
Indicates whether or not the System.Data.SqlTypes.SqlDecimal.Value of this System.Data.SqlTypes.SqlDecimal structure is null.
IsPositive
ToString
[C#] public bool IsPositive {get;}
[C++] public: __property bool get_IsPositive( );
[VB] Public ReadOnly Property IsPositive As Boolean
[JScript] public function get IsPositive( ): Boolean;
Description
Indicates whether or not the System.Data.SqlTypes.SqlDecimal.Value of this System.Data.SqlTypes.SqlDecimal structure is greater than zero.
Precision
ToString
[C#] public byte Precision {get;}
[C++] public: __property unsigned char get_Precision( );
[VB] Public ReadOnly Property Precision As Byte
[JScript] public function get Precision( ): Byte;
Description
Gets or sets the maximum number of digits used to represent the System.Data.SqlTypes.SqlDecimal.Value property.
Scale
ToString
[C#] public byte Scale {get;}
[C++] public: __property unsigned char get_Scale( );
[VB] Public ReadOnly Property Scale As Byte
[JScript] public function get Scale( ): Byte;
Description
Gets or sets the number of decimal places to which System.Data.SqlTypes.SqlDecimal.Value is resolved.
Value
ToString
[C#] public decimal Value {get;}
[C++] public: __property Decimal get_Value( );
[VB] Public ReadOnly Property Value As Decimal
[JScript] public function get Value( ): Decimal;
Description
Gets the value of the System.Data.SqlTypes.SqlDecimal structure. This property is read-only.
Abs
[C#] public static SqlDecimal Abs(SqlDecimal n);
[C++] public: static SqlDecimal Abs(SqlDecimal n);
[VB] Public Shared Function Abs(ByVal n As SqlDecimal) As SqlDecimal
[JScript] public static function Abs(n: SqlDecimal): SqlDecimal;
Description
The Abs member function gets the absolute value of the System.Data.SqlTypes.SqlDecimal parameter.
Return Value: A System.Data.SqlTypes.SqlDecimal structure whose System.Data.SqlTypes.SqlDecimal.Value property contains the unsigned number representing the absolute value of the System.Data.SqlTypes.SqlDecimal parameter.
A SqlDecimal structure.
Add
[C#] public static SqlDecimal Add(SqlDecimal x, SqlDecimal y);
[C++] public: static SqlDecimal Add(SqlDecimal x, SqlDecimal y);
[VB] Public Shared Function Add(ByVal x As SqlDecimal, ByVal y As SqlDecimal) As SqlDecimal

[JScript] public static function Add(x: SqlDecimal, y: SqlDecimal): SqlDecimal;
Description
[ .]
AdjustScale
[C#] public static SqlDecimal AdjustScale(SqlDecimal n, int digits, bool fRound);
[C++] public: static SqlDecimal AdjustScale(SqlDecimal n, int digits, bool fRound);
[VB] Public Shared Function AdjustScale(ByVal n As SqlDecimal, ByVal digits As Integer, ByVal fRound As Boolean) As SqlDecimal
[JScript] public static function AdjustScale(n: SqlDecimal, digits: int, fRound Boolean) SqlDecimal;
Description
The scale of the System.Data.SqlTypes.SqlDecimal operand will be adjusted to the number of digits indicated by the digits parameter. Depending on the value of the fRound parameter, the value will either be rounded to the appropriate number of digits or truncated.
Return Value: A new System.Data.SqlTypes.SqlDecimal structure whose System.Data.SqlTypes.SqlDecimal.Value property contains the adjusted number. The SqlDecimal structure to be adjusted. The number of digits in the adjusted structure. If this parameter is true, the new Value will be rounded, if false, the value will be truncated.
Ceiling
[C#] public static SqlDecimal Ceiling(SqlDecimal n);
[C++] public: static SqlDecimal Ceiling(SqlDecimal n);
[VB] Public Shared Function Ceiling(ByVal n As SqlDecimal) As SqlDecimal
[JScript] public static function Ceiling(n: SqlDecimal): SqlDecimal;
Description
[ .][ .][ .]
CompareTo
[C#] public int CompareTo(object value);
[C++] public: _sealed int CompareTo(Object* value);
[VB] NotOverridable Public Function CompareTo(ByVal value As Object) As Integer
[JScript] public function CompareTo(value: Object): int;
Description
Compares this instance to the supplied object and returns an indication of their relative values.
Return Value: A signed number indicating the relative values of the instance and the object. The object to be compared.
ConvertToPrecScale
[C#] public static SqlDecimal ConvertToPrecScale (SqlDecimal n, int precision, int scale);
[C++] public: static SqlDecimal ConvertToPrecScale (SqlDecimal n, int precision, int scale);
[VB] Public Shared Function ConvertToPrecScale(ByVal n As SqlDecimal, ByVal precision As Integer, ByVal scale As Integer) As SqlDecimal
[JScript] public static function ConvertToPrecScale(n: SqlDecimal, precision: int, scale int): SqlDecimal;
Description
Adjusts the value of the System.Data.SqlTypes.SqlDecimal operand to the indicated precision and scale.
Return Value: A new System.Data.SqlTypes.SqlDecimal structure whose Value has been adjusted to the precision and scale indicated in the parameters. The SqlDecimal structure whose value is to be adjusted. The precision for the new SqlDecimal structure. The scale for the new SqlDecimal structure.
Divide
[C#] public static SqlDecimal Divide(SqlDecimal x, SqlDecimal y);
[C++] public: static SqlDecimal Divide(SqlDecimal x, SqlDecimal y);
[VB] Public Shared Function Divide(ByVal x As SqlDecimal, ByVal y As SqlDecimal) As SqlDecimal
[JScript] public static function Divide(x: SqlDecimal, y: SqlDecimal) SqlDecimal;
Description
[ .]
Equals
[C#] public override bool Equals(object value);
[C++] public: bool Equals(Object* value);
[VB] Overrides Public Function Equals(ByVal value As Object) As Boolean
[JScript] public override function Equals(value: Object): Boolean;
Description
Compares the supplied object parameter to the System.Data.SqlTypes.SqlMoney.Value property of the System.Data.SqlTypes.SqlMoney object. The object to be compared.
Equals
[C#] public static new SqlBoolean Equals(SqlDecimal x, SqlDecimal y);
[C++] public: static SqlBoolean Equals(SqlDecimal x, SqlDecimal y);
[VB] Shadows Public Shared Function Equals(ByVal x As SqlDecimal, ByVal y As SqlDecimal) As SqlBoolean
[JScript] public static hide function Equals(x: SqlDecimal, y: SqlDecimal) SqlBoolean;
Description
[ .]
Floor
[C#] public static SqlDecimal Floor(SqlDecimal n);
[C++] public: static SqlDecimal Floor(SqlDecimal n);
[VB] Public Shared Function Floor(ByVal n As SqlDecimal) As SqlDecimal
[JScript] public static function Floor(n: SqlDecimal): SqlDecimal;
Description
[ .][ .][ .]
GetHashCode
[C#] public override int GetHashCode( );
[C++] public: int GetHashCode( );
[VB] Overrides Public Function GetHashCode( ) As Integer
[JScript] public override function GetHashCode( ): int;
Description
Returns the hash code for this instance.
Return Value: A 32-bit signed integer hash code.
GreaterThan
[C#] public static SqlBoolean GreaterThan(SqlDecimal x, SqlDecimal y);
[C++] public: static SqlBoolean GreaterThan(SqlDecimal x, SqlDecimal y);
[VB] Public Shared Function GreaterThan(ByVal x As SqlDecimal, ByVal y As SqlDecimal) As SqlBoolean
[JScript] public static function GreaterThan(x: SqlDecimal, y: SqlDecimal) SqlBoolean;
Description
[ .]
GreaterThanOrEqual
[C#] public static SqlBoolean GreaterThanOrEqual (SqlDecimal x, SqlDecimal y);
[C++] public: static SqlBoolean GreaterThanOrEqual (SqlDecimal x, SqlDecimal y);
[VB] Public Shared Function GreaterThanOrEqual(ByVal x As SqlDecimal, ByVal y As SqlDecimal) As SqlBoolean
[JScript] public static function GreaterThanOrEqual(x: SqlDecimal, y SqlDecimal) SqlBoolean;

Description
[ . ]
LessThan
[C#] public static SqlBoolean LessThan(SqlDecimal x, SqlDecimal y);
[C++] public: static SqlBoolean LessThan(SqlDecimal x, SqlDecimal y);
[VB] Public Shared Function LessThan(ByVal x As SqlDecimal, ByVal y As SqlDecimal) As SqlBoolean
[JScript] public static function LessThan(x: SqlDecimal, y: SqlDecimal) SqlBoolean;
Description
[ . ]
LessThanOrEqual
[C#] public static SqlBoolean LessThanOrEqual (SqlDecimal x, SqlDecimal y);
[C++] public: static SqlBoolean LessThanOrEqual (SqlDecimal x, SqlDecimal y);
[VB] Public Shared Function LessThanOrEqual(ByVal x As SqlDecimal, ByVal y As SqlDecimal) As SqlBoolean
[JScript] public static function LessThanOrEqual(x: SqlDecimal, y: SqlDecimal): SqlBoolean;
Description
[ . ]
Multiply
[C#] public static SqlDecimal Multiply(SqlDecimal x, SqlDecimal y);
[C++] public: static SqlDecimal Multiply(SqlDecimal x, SqlDecimal y);
[VB] Public Shared Function Multiply(ByVal x As SqlDecimal, ByVal y As SqlDecimal) As SqlDecimal
[JScript] public static function Multiply(x: SqlDecimal, y: SqlDecimal): SqlDecimal;
Description
[ . ]
NotEquals
[C#] public static SqlBoolean NotEquals(SqlDecimal x, SqlDecimal y);
[C++] public: static SqlBoolean NotEquals(SqlDecimal x, SqlDecimal y);
[VB] Public Shared Function NotEquals(ByVal x As SqlDecimal, ByVal y As SqlDecimal) As SqlBoolean
[JScript] public static function NotEquals(x: SqlDecimal, y: SqlDecimal): SqlBoolean;
Description
[ . ]
op_Addition
[C#] public static SqlDecimal operator +(SqlDecimal x, SqlDecimal y);
[C++] public: static SqlDecimal op_Addition(SqlDecimal x, SqlDecimal y);
[VB] returnValue=SqlDecimal.op_Addition(x, y)
[JScript] returnValue=x+y;
Description
The addition operator calcuates the sum of the two System.Data.SqlTypes.SqlDecimal operators.
Return Value: A new System.Data.SqlTypes.SqlDecimal structure whose System.Data.SqlTypes.SqlDecimal.Value property contains the sum. A System.Data.SqlTypes.SqlDecimal structure. A System.Data.SqlTypes.SqlDecimal structure.
op_Division
[C#] public static SqlDecimal operator/(SqlDecimal x, SqlDecimal y);
[C++] public: static SqlDecimal op_Division(SqlDecimal x, SqlDecimal y);
[VB] returnValue=SqlDecimal.op_Division(x, y)
[JScript] returnValue=x/y;
Description
The division operator calculates the results of dividing the first System.Data.SqlTypes.SqlDecimal operand by the second.
Return Value: A new System.Data.SqlTypes.SqlDecimal structure whose System.Data.SqlTypes.SqlDecimal.Value property contains the results of the division. A System.Data.SqlTypes.SqlDecimal structure. A System.Data.SqlTypes.SqlDecimal structure.
op_Equality
[C#] public static SqlBoolean operator==(SqlDecimal x, SqlDecimal y);
[C++] public: static SqlBoolean op_Equality(SqlDecimal x, SqlDecimal y);
[VB] returnValue=SqlDecimal.op_Equality(x, y)
[JScript] returnValue=x==y;
Description
Performs a logical comparison of the two System.Data.SqlTypes.SqlDecimal operands to determine if they are equal.
Return Value: A System.Data.SqlTypes.SqlBoolean that is System.Data.SqlTypes.SqlBoolean.True if the two instances are equal or System.Data.SqlTypes.SqlBoolean.False if the two instances are not equal. If either instance of System.Data.SqlTypes.SqlDecimal is null, the System.Data.SqlTypes.SqlBoolean.Value of the System.Data.SqlTypes.SqlBoolean will be System.Data.SqlTypes.SqlBoolean.Null. A System.Data.SqlTypes.SqlDecimal structure. A System.Data.SqlTypes.SqlDecimal structure.
op_Explicit
[C#] public static explicit operator SqlDecimal(SqlBoolean x);
[C++] public: static SqlDecimal op_Explicit(SqlBoolean x);
[VB] returnValue=SqlDecimal.op_Explicit(x)
[JScript] returnValue=SqlDecimal(x);
Description
Converts the supplied System.Data.SqlTypes.SqlBit structure to System.Data.SqlTypes.SqlDecimal
Return Value: A new System.Data.SqlTypes.SqlDecimal structure whose System.Data.SqlTypes.SqlDecimal.Value is equal to the System.Data.SqlTypes.SqlBit.ByteValue of the System.Data.SqlTypes.SqlBit parameter. The System.Data.SqlTypes.SqlBit structure to be converted.
op_Explicit
[C#] public static explicit operator decimal(SqlDecimal x);
[C++] public: static Decimal op_Explicit( );
[VB] returnValue=SqlDecimal.op_Explicit(x)
[JScript] returnValue=Decimal(x);
Description
Converts the System.Data.SqlTypes.SqlDecimal parameter to System.Decimal
Return Value: A new System.Decimal structure whose value equals the System.Data.SqlTypes.SqlDecimal.Value of the System.Data.SqlTypes.SqlDecimal parameter. The System.Data.SqlTypes.SqlDecimal structure to be converted.
op_Explicit
[C#] public static explicit operator SqlDecimal(SqlDouble x);
[C++] public: static SqlDecimal op_Explicit(SqlDouble x);
[VB] returnValue=SqlDecimal.op_Explicit(x)
[JScript] returnValue=SqlDecimal(x);
Description
Converts the supplied System.Data.SqlTypes.SqlDouble structure to System.Data.SqlTypes.SqlDecimal
Return Value: A new System.Data.SqlTypes.SqlDecimal structure whose System.Data.SqlTypes.SqlDecimal.Value equals the System.Data.SqlTypes.SqlDouble.Value of the System.Data.SqlTypes.SqlDouble parameter. The System.Data.SqlTypes.SqlDouble structure to be converted.

op_Explicit

[C#] public static explicit operator SqlDecimal(SqlSingle x);
[C++] public: static SqlDecimal op_Explicit(SqlSingle x);
[VB] returnValue=SqlDecimal.op_Explicit(x)
[JScript] returnValue=SqlDecimal(x);

Description

Converts the supplied System.Data.SqlTypes.SqlSingle structure to System.Data.SqlTypes.SqlDecimal
Return Value: A new System.Data.SqlTypes.SqlDecimal structure whose System.Data.SqlTypes.SqlDecimal.Value property equals the System.Data.SqlTypes.SqlSingle.Value of the System.Data.SqlTypes.SqlSingle parameter. The System.Data.SqlTypes.SqlSingle structure to be converted.

op_Explicit

[C#] public static explicit operator SqlDecimal(SqlString x);
[C++] public: static SqlDecimal op_Explicit(SqlString x);
[VB] returnValue=SqlDecimal.op_Explicit(x)
[JScript] returnValue=SqlDecimal(x);

Description

Converts the supplied System.Data.SqlTypes.SqlString parameter to System.Data.SqlTypes.SqlDecimal
Return Value: A new System.Data.SqlTypes.SqlDecimal structure whose System.Data.SqlTypes.SqlDecimal.Value equals the value represented by the System.Data.SqlTypes.SqlString parameter. The System.Data.SqlTypes.SqlString object to be converted.

op_GreaterThan

[C#] public static SqlBoolean operator >(SqlDecimal x, SqlDecimal y);
[C++] public: static SqlBoolean op_GreaterThan (SqlDecimal x, SqlDecimal y);
[VB] returnValue=SqlDecimal.op_GreaterThan(x, y)
[JScript] returnValue=x>y;

Description

Performs a logical comparison of two System.Data.SqlTypes.SqlDecimal structures to determine if the first is greater than the second.
Return Value: A System.Data.SqlTypes.SqlBoolean that is System.Data.SqlTypes.SqlBoolean.True if the first instance is less than the second instance, otherwise System.Data.SqlTypes.SqlBoolean.False. If either instance of System.Data.SqlTypes.SqlDecimal is null, the System.Data.SqlTypes.SqlBoolean.Value of the System.Data.SqlTypes.SqlBoolean will be System.Data.SqlTypes.SqlBoolean.Null. A System.Data.SqlTypes.SqlDecimal structure. A System.Data.SqlTypes.SqlDecimal structure.

op_GreaterThanOrEqual

[C#] public static SqlBoolean operator>=(SqlDecimal x, SqlDecimal y);
[C++] public: static SqlBoolean op_GreaterThanOrEqual (SqlDecimal x, SqlDecimal y);
[VB] returnValue=SqlDecimal.op_GreaterThanOrEqual(x, y)
[JScript] returnValue=x>=y;

Description

Performs a logical comparison of the two System.Data.SqlTypes.SqlDecimal parameters to determine if the first is greater than or equal to the second.
Return Value: A System.Data.SqlTypes.SqlBoolean that is System.Data.SqlTypes.SqlBoolean.True if the first instance is greaater than or equal to the second instance, otherwise System.Data.SqlTypes.SqlBoolean.False.

If either instance of System.Data.SqlTypes.SqlDecimal is null, the System.Data.SqlTypes.SqlBoolean.Value of the System.Data.SqlTypes.SqlBoolean will be System.Data.SqlTypes.SqlBoolean.Null. A System.Data.SqlTypes.SqlDecimal structure. A System.Data.SqlTypes.SqlDecimal structure.

op_Implicit

[C#] public static implicit operator SqlDecimal(decimal x);
[C++] public: static SqlDecimal op_Implicit(Decimal x);
[VB] returnValue=SqlDecimal.op_Implicit(x)
[JScript] returnValue=x;

Description

Converts the System.Decimal value to System.Data.SqlTypes.SqlDecimal
Return Value: A new System.Data.SqlTypes.SqlDecimal structure whose System.Data.SqlTypes.SqlDecimal.Value property equals the value of the System.Decimal parameter. The decimal value to be converted.

op_Implicit

[C#] public static implicit operator SqlDecimal(SqlByte x);
[C++] public: static SqlDecimal op_Implicit(SqlByte x);
[VB] returnValue=SqlDecimal.op_Implicit(x)
[JScript] returnValue=x;

Description

Converts the supplied System.Data.SqlTypes.SqlByte structure to System.Data.SqlTypes.SqlDecimal. The System.Data.SqlTypes.SqlByte structure to be converted.

op_Implicit

[C#] public static implicit operator SqlDecimal(SqlInt16 x);
[C++] public: static SqlDecimal op_Implicit(SqlInt16 x);
[VB] returnValue=SqlDecimal.op_Implicit(x)
[JScript] returnValue=x;

Description

Converts the supplied System.Data.SqlTypes.SqlInt16 structure to System.Data.SqlTypes.SqlDecimal
Return Value: A new System.Data.SqlTypes.SqlDecimal structure whose System.Data.SqlTypes.SqlDecimal.Value property equals the System.Data.SqlTypes.SqlInt16.Value property of the System.Data.SqlTypes.SqlInt16 parameter. The System.Data.SqlTypes.SqlInt16structure to be converted.

op_Implicit

[C#] public static implicit operator SqlDecimal(SqlInt32 x);
[C++] public: static SqlDecimal op_Implicit(SqlInt32 x);
[VB] returnValue=SqlDecimal.op_Implicit(x)
[JScript] returnValue=x;

Description

Converts the supplied System.Data.SqlTypes.SqlInt32 structure to System.Data.SqlTypes.SqlDecimal
Return Value: A new System.Data.SqlTypes.SqlDecimal structure whose System.Data.SqlTypes.Value property is equal to the System.Data.SqlTypes.Value property of the System.Data.SqlTypes.SqlInt32 parameter. The System.Data.SqlTypes.SqlInt32 structure to be converted.

op_Implicit

[C#] public static implicit operator SqlDecimal(SqlInt64 x);
[C++] public: static SqlDecimal op_Implicit(SqlInt64 x);
[VB] returnValue=SqlDecimal.op_Implicit(x)
[JScript] returnValue=x;

Description

Converts the supplied System.Data.SqlTypes.SqlInt64 structure to SqlDecimal.
Return Value: A new System.Data.SqlTypes.SqlDecimal structure whose System.Data.SqlTypes.SqlDecimal.Value equals the System.Data.SqlTypes.SqlInt64.Value of the System.Data.SqlTypes.SqlInt64 parameter. The System.Data.SqlTypes.SqlInt64 structure to be converted.

op_Implicit

[C#] public static implicit operator SqlDecimal(SqlMoney x);
[C++] public: static SqlDecimal op_Implicit(SqlMoney x);
[VB] returnValue=SqlDecimal.op_Implicit(x)
[JScript] returnValue=x;
Description Converts the System.Data.SqlTypes.SqlMoney operand to System.Data.SqlTypes.SqlDecimal
Return Value: A new System.Data.SqlTypes.SqlDecimal structure whose System.Data.SqlTypes.SqlDecimal.Value equals the System.Data.SqlTypes.SqlMoney.Value of the System.Data.SqlTypes.SqlMoney parameter. The System.Data.SqlTypes.SqlMoney structure to be converted.

op_Inequality

[C#] public static SqlBoolean operator !=(SqlDecimal x, SqlDecimal y);
[C++] public: static SqlBoolean op_Inequality(SqlDecimal x, SqlDecimal y);
[VB] returnValue=SqlDecimal.op_Inequality(x, y)
[JScript] returnValue=x !=y;
Description Performs a logical comparison of the two System.Data.SqlTypes.SqlDecimal parameters to determine if they are equal.
Return Value: A System.Data.SqlTypes.SqlBoolean that is System.Data.SqlTypes.SqlBoolean.True if the two instances are not equal or System.Data.SqlTypes.SqlBoolean.False if the two instances are equal. If either instance of System.Data.SqlTypes.SqlDecimal is null, the System.Data.SqlTypes.SqlBoolean.Value of the System.Data.SqlTypes.SqlBoolean will be System.Data.SqlTypes.SqlBoolean.Null. A System.Data.SqlTypes.SqlDecimal structure. A System.Data.SqlTypes.SqlDecimal structure.

op_LessThan

[C#] public static SqlBoolean operator
[C++] public: static SqlBoolean op_LessThan(SqlDecimal x, SqlDecimal y);
[VB] returnValue=SqlDecimal.op_LessThan(x, y)
[JScript] returnValue=x<y;
Description Performs a logical comparison of two System.Data.SqlTypes.SqlDecimal structures to determine if the first is less than the second.
Return Value: A System.Data.SqlTypes.SqlBoolean that is System.Data.SqlTypes.SqlBoolean.True if the first instance is less than the second instance, otherwise System.Data.SqlTypes.SqlBoolean.False. If either instance of System.Data.SqlTypes.SqlDecimal is null, the System.Data.SqlTypes.SqlBoolean.Value of the System.Data.SqlTypes.SqlBoolean will be System.Data.SqlTypes.SqlBoolean.Null. A System.Data.SqlTypes.SqlDecimal structure. A System.Data.SqlTypes.SqlDecimal structure.

op_LessThanOrEqual

[C#] public static SqlBoolean operator <=(SqlDecimal x, SqlDecimal y);
[C++] public: static SqlBoolean op_LessThanOrEqual(SqlDecimal x, SqlDecimal y);
[VB] returnValue SqlDecimal.op_LessThanOrEqual(x, y)
[JScript] returnValue=x<=y;
Description Performs a logical comparison of the two System.Data.SqlTypes.SqlDecimal parameters to determine if the first is less than or equal to the second.
Return Value: A System.Data.SqlTypes.SqlBoolean that is System.Data.SqlTypes.SqlBoolean.True if the first instance is less than or equal to the second instance, otherwise System.Data.SqlTypes.SqlBoolean.False. If either instance of System.Data.SqlTypes.SqlDecimal is null, the System.Data.SqlTypes.SqlBoolean.Value of the System.Data.SqlTypes.SqlBoolean will be System.Data.SqlTypes.SqlBoolean.Null. A System.Data.SqlTypes.SqlDecimal structure. A System.Data.SqlTypes.SqlDecimal structure.

op_Multiply

[C#] public static SqlDecimal operator*(SqlDecimal x, SqlDecimal y);
[C++] public: static SqlDecimal op_Multiply(SqlDecimal x, SqlDecimal y);
[VB] returnValue=SqlDecimal.op_Multiply(x, y)
[JScript] returnValue=x*y;
Description The multiplication operator computes the product of the two System.Data.SqlTypes.SqlDecimal parameters.
Return Value: A new System.Data.SqlTypes.SqlDecimal structure whose System.Data.SqlTypes.SqlDecimal.Value property contains the product of the multiplication. A System.Data.SqlTypes.SqlDecimal structure. A System.Data.SqlTypes.SqlDecimal structure.

op_Subtraction

[C#] public static SqlDecimal operator -(SqlDecimal x, SqlDecimal y);
[C++] public: static SqlDecimal op_Subtraction (SqlDecimal x, SqlDecimal y);
[VB] returnValue=SqlDecimal.op_Subtraction(x, y)
[JScript] returnValue=x-y;
Description The System.Data.SqlTypes.subtraction operator calcuates the results of subtracting the second System.Data.SqlTypes.SqlDecimal operand from the first.
Return Value: A new System.Data.SqlTypes.SqlDecimal structure whose Value property contains the results of the subtraction. A System.Data.SqlTypes.SqlDecimal structure. A System.Data.SqlTypes.SqlDecimal structure.

op_UnaryNegation

[C#] public static SqlDecimal operator -(SqlDecimal x);
[C++] public: static SqlDecimal op_UnaryNegation (SqlDecimal x);
[VB] returnValue=SqlDecimal.op_UnaryNegation(x)
[JScript] returnValue=-x;
Description The unary minus operator negates the System.Data.SqlTypes.SqlDecimal parameter.
Return Value: A new System.Data.SqlTypes.SqlDecimal structure whose value contains the results of the negation. The System.Data.SqlTypes.SqlDecimal structure to be negated.

Parse

[C#] public static SqlDecimal Parse(string s);
[C++] public: static SqlDecimal Parse(String* s);
[VB] Public Shared Function Parse(ByVal s As String) As SqlDecimal
[JScript] public static function Parse(s: String): SqlDecimal;
Description
[ . ] [ . ]

Power

[C#] public static SqlDecimal Power(SqlDecimal n, double exp);
[C++] public: static SqlDecimal Power(SqlDecimal n, double exp);
[VB] Public Shared Function Power(ByVal n As SqlDecimal, ByVal exp As Double) As SqlDecimal
[JScript] public static function Power(n: SqlDecimal, exp: double): SqlDecimal;

Description
[ . ][ . ][ . ][ . ]
Round
[C#] public static SqlDecimal Round(SqlDecimal n, int position);
[C++] public: static SqlDecimal Round(SqlDecimal n, int position);
[VB] Public Shared Function Round(ByVal n As SqlDecimal, ByVal position As Integer) As SqlDecimal
[JScript] public static function Round(n: SqlDecimal, position: int): SqlDecimal;
Description
[ . ][ . ][ . ][ . ]
Sign
[C#] public static SqlInt32 Sign(SqlDecimal n);
[C++] public: static SqlInt32 Sign(SqlDecimal n);
[VB] Public Shared Function Sign(ByVal n As SqlDecimal) As SqlInt32
[JScript] public static function Sign(n: SqlDecimal): SqlInt32;
Description
[ . ][ . ][ . ]
Subtract
[C#] public static SqlDecimal Subtract(SqlDecimal x, SqlDecimal y);
[C++] public: static SqlDecimal Subtract(SqlDecimal x, SqlDecimal y);
[VB] Public Shared Function Subtract(ByVal x As SqlDecimal, ByVal y As SqlDecimal) As SqlDecimal
[JScript] public static function Subtract(x: SqlDecimal, y: SqlDecimal): SqlDecimal;
Description
[ . ]
ToDouble
[C#] public double ToDouble( );
[C++] public: double ToDouble( );
[VB] Public Function ToDouble( ) As Double
[JScript] public function ToDouble( ): double;
Description
Returns the a double equal to the contents of the System.Data.SqlTypes.SqlDecimal.Value property of this instance. Return Value: The decimal representation of the System.Data.SqlTypes.SqlDecimal.Value property.
ToSqlBoolean
[C#] public SqlBoolean ToSqlBoolean( );
[C++] public: SqlBoolean ToSqlBoolean( );
[VB] Public Function ToSqlBoolean( ) As SqlBoolean
[JScript] public function ToSqlBoolean( ): SqlBoolean;
Description
[ . ]
ToSqlByte
[C#] public SqlByte ToSqlByte( );
[C++] public: SqlByte ToSqlByte( );
[VB] Public Function ToSqlByte( ) As SqlByte
[JScript] public function ToSqlByte( ): SqlByte;
Description
[ . ]
ToSqlDouble
[C#] public SqlDouble ToSqlDouble( );
[C++] public: SqlDouble ToSqlDouble( ); [VB] Public Function ToSqlDouble( ) As SqlDouble
[JScript] public function ToSqlDouble( ): SqlDouble;
Description
[ . ]
ToSqlInt16
[C#] public SqlInt16 ToSqlInt16( );
[C++] public: SqlInt16 ToSqlInt16( );
[VB] Public Function ToSqlInt16( ) As SqlInt16
[JScript] public function ToSqlInt16( ): SqlInt16;
Description
[ . ]
ToSqlInt32
[C#] public SqlInt32 ToSqlInt32( );
[C++] public: SqlInt32 ToSqlInt32( );
[VB] Public Function ToSqlInt32( ) As SqlInt32
[JScript] public function ToSqlInt32( ): SqlInt32;
Description
[ . ]
ToSqlInt64
[C#] public SqlInt64 ToSqlInt64( );
[C++] public: SqlInt64 ToSqlInt64( );
[VB] Public Function ToSqlInt64( ) As SqlInt64
[JScript] public function ToSqlInt64( ): SqlInt64;
Description
[ . ]
ToSqlMoney
[C#] public SqlMoney ToSqlMoney( );
[C++] public: SqlMoney ToSqlMoney( );
[VB] Public Function ToSqlMoney( ) As SqlMoney
[JScript] public function ToSqlMoney( ) SqlMoney;
Description
[ . ]
ToSqlSingle
[C#] public SqlSingle ToSqlSingle( );
[C++] public: SqlSingle ToSqlSingle( );
[VB] Public Function ToSqlSingle( ) As SqlSingle
[JScript] public function ToSqlSingle( ): SqlSingle;
Description
[ . ]
ToSqlString
[C#] public SqlString ToSqlString( );
[C++] public: SqlString ToSqlString( );
[VB] Public Function ToSqlString( ) As SqlString
[JScript] public function ToSqlString( ): SqlString;
Description
[ . ]
ToString
[C#] public override string ToString( );
[C++] public: String* ToString( );
[VB] Overrides Public Function ToString( ) As String
[JScript] public override function ToString( ): String; Converts a System.Data.SqlTypes.SqlDecimal structure to System.String.
Description
Converts this System.Data.SqlTypes.SqlDecimal structure to System.String
Return Value: A new System.String object containing the string representation of the System.Data.SqlTypes.SqlDecimal structure's System.Data.SqlTypes.SqlDecimal.Value property.
Truncate
[C#] public static SqlDecimal Truncate(SqlDecimal n, int position);
[C++] public: static SqlDecimal Truncate(SqlDecimal n, int position);
[VB] Public Shared Function Truncate(ByVal n As SqlDecimal, ByVal position As Integer) As SqlDecimal
[JScript] public static function Truncate(n: SqlDecimal, position: int): SqlDecimal;
Description
[ . ][ . ][ . ][ . ]
SqlDouble structure (System.Data.SqlTypes)
Truncate Description
Represents a floating-point number within the range of −1.79E+308 through 1.79E+308 to be stored in or retrieved from a database.
Truncate
[C#] public static readonly SqlDouble MaxValue;
[C++] public: static SqlDouble MaxValue;
[VB] Public Shared ReadOnly MaxValue As SqlDouble
[JScript] public static var MaxValue: SqlDouble;
Description
A constant representing the maximum value for a System.Data.SqlTypes.SqlDouble structure.
This value is 1.79E+308 [ .]
Truncate
[C#] public static readonly SqlDouble MinValue;
[C++] public: static SqlDouble MinValue;
[VB] Public Shared ReadOnly MinValue As SqlDouble
[JScript] public static var MinValue: SqlDouble;
Description
A constant representing the minimum possible value of System.Data.SqlTypes.SqlDouble
This value is −1.79E+308 [ .]
Truncate
[C#] public static readonly SqlDouble Null;
[C++] public: static SqlDouble Null;
[VB] Public Shared ReadOnly Null As SqlDouble
[JScript] public static var Null: SqlDouble;
Description
Represents a null value that can be assigned to the System.Data.SqlTypes.SqlDouble.Value property of an instance of the System.Data.SqlTypes.SqlDouble structure.
System.Data.SqlTypes.SqlDouble.Null functions as a constant for the System.Data.SqlTypes.SqlDouble structure.
Truncate
[C#] public static readonly SqlDouble Zero;
[C++] public: static SqlDouble Zero;
[VB] Public Shared ReadOnly Zero As SqlDouble
[JScript] public static var Zero: SqlDouble;
Description
Represents a zero value that can be assigned to the System.Data.SqlTypes.SqlDouble.Value property of an instance of the System.Data.SqlTypes.SqlDouble structure.
The System.Data.SqlTypes.SqlDouble.Zero field is a constant for the System.Data.SqlTypes.SqlDouble structure.
SqlDouble
Example Syntax:
Truncate
[C#] public SqlDouble(double value);
[C++] public: SqlDouble(double value);
[VB] Public Sub New(ByVal value As Double)
[JScript] public function SqlDouble(value: double);
Description
Initializes a new instance of the System.Data.SqlTypes.SqlDouble structure using the supplied double parameter to set the new SqlDouble structure's System.Data.SqlTypes.SqlDouble.Value property. A double whose value will be used for the new System.Data.SqlTypes.SqlDouble.
IsNull
Truncate
[C#] public bool IsNull {get;}
[C++] public: __property bool get_IsNull( );
[VB] Public ReadOnly Property IsNull As Boolean
[JScript] public function get IsNull( ): Boolean;
Description
Indicates whether or not System.Data.SqlTypes.SqlDouble.Value is null.
Value
Truncate
[C#] public double Value {get;}
[C++] public: __property double get_Value( );
[VB] Public ReadOnly Property Value As Double
[JScript] public function get Value( ): double;
Description
Gets the value of the System.Data.SqlTypes.SqlDouble structure. This property is read-only.
Add
[C#] public static SqlDouble Add(SqlDouble x, SqlDouble y);
[C++] public: static SqlDouble Add(SqlDouble x, SqlDouble y);
[VB] Public Shared Function Add(ByVal x As SqlDouble, ByVal y As SqlDouble) As SqlDouble
[JScript] public static function Add(x: SqlDouble, y: SqlDouble): SqlDouble;
Description
[ .]
CompareTo
[C#] public int CompareTo(object value);
[C++] public: __sealed int CompareTo(Object* value);
[VB] NotOverridable Public Function CompareTo(ByVal value As Object) As Integer
[JScript] public function CompareTo(value: Object): int;
Description
Compares this instance to the supplied object and returns an indication of their relative values.
Return Value: A signed number indicating the relative values of the instance and the object. The object to compare.
Divide
[C#] public static SqlDouble Divide(SqlDouble x, SqlDouble y);
[C++] public: static SqlDouble Divide(SqlDouble x, SqlDouble y);
[VB] Public Shared Function Divide(ByVal x As SqlDouble, ByVal y As SqlDouble) As SqlDouble
[JScript] public static function Divide(x: SqlDouble, y: SqlDouble): SqlDouble;
Description
[ .]
Equals
[C#] public override bool Equals(object value);
[C++] public: bool Equals(Object* value);
[VB] Overrides Public Function Equals(ByVal value As Object) As Boolean
[JScript] public override function Equals(value: Object): Boolean;
Description
Compares the supplied object parameter to the System.Data.SqlTypes.SqlDateTime.Value property of the System.Data.SqlTypes.SqlDouble object.
Return Value: true if object is an instance of System.Data.SqlTypes.SqlByte and the two are equal; otherwise false. The object to be compared.
Equals
[C#] public static new SqlBoolean Equals(SqlDouble x, SqlDouble y);
[C++] public: static SqlBoolean Equals(SqlDouble x, SqlDouble y);
[VB] Shadows Public Shared Function Equals(ByVal x As SqlDouble, ByVal y As SqlDouble) As SqlBoolean
[JScript] public static hide function Equals(x: SqlDouble, y: SqlDouble) SqlBoolean;
Description
[ .]
GetHashCode
[C#] public override int GetHashCode( );

[C++] public: int GetHashCode( );
[VB] Overrides Public Function GetHashCode( ) As Integer
[JScript] public override function GetHashCode( ): int;
Description
   Returns the hash code for this instance.
Return Value: A 32-bit signed integer hash code.
   GreaterThan
[C#] public static SqlBoolean GreaterThan(SqlDouble x, SqlDouble y);
[C++] public: static SqlBoolean GreaterThan(SqlDouble x, SqlDouble y);
[VB] Public Shared Function GreaterThan(ByVal x As SqlDouble, ByVal y As SqlDouble) As SqlBoolean
[JScript] public static function GreaterThan(x: SqlDouble, y: SqlDouble) SqlBoolean;
Description
   [ .]
   GreaterThanOrEqual
[C] public static SqlBoolean GreaterThanOrEqual (SqlDouble x, SqlDouble y);
[C++] public: static SqlBoolean GreaterThanOrEqual (SqlDouble x, SqlDouble y);
[VB] Public Shared Function GreaterThanOrEqual(ByVal x As SqlDouble, ByVal y As SqlDouble) As SqlBoolean
[JScript] public static function GreaterThanOrEqual(x: SqlDouble, y: SqlDouble) SqlBoolean;
Description
   [ .]
   LessThan
[C#] public static SqlBoolean LessThan(SqlDouble x, SqlDouble y);
[C++] public: static SqlBoolean LessThan(SqlDouble x, SqlDouble y);
[VB] Public Shared Function LessThan(ByVal x As SqlDouble, ByVal y As SqlDouble) As SqlBoolean
[JScript] public static function LessThan(x: SqlDouble, y: SqlDouble) SqlBoolean;
Description
   [ .]
   LessThanOrEqual
[C#] public static SqlBoolean LessThanOrEqual(SqlDouble x, SqlDouble y);
[C++] public: static SqlBoolean LessThanOrEqual (SqlDouble x, SqlDouble y);
[VB] Public Shared Function LessThanOrEqual(ByVal x As SqlDouble, ByVal y As SqlDouble) As SqlBoolean
[JScript] public static function LessThanOrEqual(x: SqlDouble, y: SqlDouble) SqlBoolean;
Description
   [ .]
   Multiply
[C#] public static SqlDouble Multiply(SqlDouble x, SqlDouble y);
[C++] public: static SqlDouble Multiply(SqlDouble x, SqlDouble y);
[VB] Public Shared Function Multiply(ByVal x As SqlDouble, ByVal y As SqlDouble) As SqlDouble
[JScript] public static function Multiply(x: SqlDouble, y: SqlDouble): SqlDouble;
Description
   [ .]
   NotEquals
[C#] public static SqlBoolean NotEquals(SqlDouble x, SqlDouble y);
[C++] public: static SqlBoolean NotEquals(SqlDouble x, SqlDouble y);
[VB] Public Shared Function NotEquals(ByVal x As SqlDouble, ByVal y As SqlDouble) As SqlBoolean
[JScript] public static function NotEquals(x: SqlDouble, y: SqlDouble) SqlBoolean;
Description
   [ .]
   op_Addition
[C#] public static SqlDouble operator+(SqlDouble x, SqlDouble y);
[C++] public: static SqlDouble op_Addition(SqlDouble x, SqlDouble y);
[VB] returnValue=SqlDouble.op_Addition(x, y)
[JScript] returnValue=x+y;
Description
   The addition operator computes the sum of the two System.Data.SqlTypes.SqlDouble operands.
Return Value: The sum of the two System.Data.SqlTypes.SqlDouble operands. A System.Data.SqlTypes.SqlDouble structure. A System.Data.SqlTypes.SqlDouble structure.
   op_Division
[C#] public static SqlDouble operator/(SqlDouble x, SqlDouble y);
[C++] public: static SqlDouble op_Division(SqlDouble x, SqlDouble y);
[VB] returnValue=SqlDouble.op_Division(x, y)
[JScript] returnValue=x/y;
Description
   The division operator divides the first System.Data.SqlTypes.SqlDouble operand by the second.
Return Value: The results of the division operation. A System.Data.SqlTypes.SqlDouble structure. A System.Data.SqlTypes.SqlDouble structure.
   op_Equality
[C#] public static SqlBoolean operator==(SqlDouble x, SqlDouble y);
[C++] public: static SqlBoolean op_Equality(SqlDouble x, SqlDouble y);
[VB] returnValue=SqlDouble.op_Equality(x, y)
[JScript] returnValue=x==y;
Description
   Performs a logical comparison on two instances of System.Data.SqlTypes.SqlDouble to determine if they are equal.
Return Value: true if the two values are equal, otherwise false. A System.Data.SqlTypes.SqlDouble structure. A System.Data.SqlTypes.SqlDouble structure.
   op_Explicit
[C#] public static explicit operator SqlDouble(SqlBoolean x);
[C++] public: static SqlDouble op_Explicit(SqlBoolean x);
[VB] returnValue=SqlDouble.op_Explicit(x)
[JScript] returnValue=SqlDouble(x);
Description
   Converts the supplied System.Data.SqlTypes.SqlBit parameter to System.Data.SqlTypes.SqlDouble
Return Value: A new System.Data.SqlTypes.SqlDouble structure whose System.Data.SqlTypes.SqlDouble.Value is either 0 or 1, depending on the System.Data.SqlTypes.SqlBit.ByteValue property of the System.Data.SqlTypes.SqlBit parameter. The System.Data.SqlTypes.SqlBit to be converted.
   op_Explicit
[C#] public static explicit operator double(SqlDouble x);
[C++] public: static double op_Explicit( );
[VB] returnValue=SqlDouble.op_Explicit(x)
[JScript] returnValue Double(x);
Description
   Converts the suppliedj System.Data.SqlTypes.SqlDouble structure to double. A System.Data.SqlTypes.SqlDouble structure.

op_Explicit
[C#] public static explicit operator SqlDouble(SqlString x);
[C++] public: static SqlDouble op_Explicit(SqlString x);
[VB] returnValue=SqlDouble.op_Explicit(x)
[JScript] returnValue=SqlDouble(x);
Description
Converts the supplied System.Data.SqlTypes.SqlString parameter to System.Data.SqlTypes.SqlDouble
Return Value: A new System.Data.SqlTypes.SqlDoulble whose System.Data.SqlTypes.SqlDouble.Value is equal to the value of the number represented by the System.Data.SqlTypes.SqlString. A SqlString object.

op_GreaterThan
[C#] public static SqlBoolean operator >(SqlDouble x, SqlDouble y);
[C++] public: static SqlBoolean op_GreaterThan (SqlDouble x, SqlDouble y);
[VB] returnValue=SqlDouble.op_GreaterThan(x, y)
[JScript] returnValue=x>y;
Description
Compares two instances of System.Data.SqlTypes.SqlDouble to determine if the first is greater than the second. Return Value: A System.Data.SqlTypes.SqlBoolean that is System.Data.SqlTypes.SqlBoolean.True if the first instance is greater than the second instance, otherwise System.Data.SqlTypes.SqlBoolean.False. If either instance of System.Data.SqlTypes.SqlDouble is null, the System.Data.SqlTypes.SqlBoolean.Value of the System.Data.SqlTypes.SqlBoolean will be System.Data.SqlTypes.SqlBoolean.Null. A System.Data.SqlTypes.SqlDouble structure. A System.Data.SqlTypes.SqlDouble structure.

op_GreaterThanOrEqual
[C#] public static SqlBoolean operator >=(SqlDouble x, SqlDouble y);
[C++] public: static SqlBoolean op_GreaterThanOrEqual (SqlDouble x, SqlDouble y);
[VB] returnValue=SqlDouble.op_GreaterThanOrEqual(x, y)
[JScript] returnValue=x>=y;
Description
Compares two instances of System.Data.SqlTypes.SqlDouble to determine if the first is greater than or equal to the second.
Return Value: A System.Data.SqlTypes.SqlBoolean that is System.Data.SqlTypes.SqlBoolean.True if the first instance is greater than or equal to the second instance, otherwise System.Data.SqlTypes.SqlBoolean.False.
If either instance of System.Data.SqlTypes.SqlDouble is null, the System.Data.SqlTypes.SqlBoolean.Value of the System.Data.SqlTypes.SqlBoolean will be System.Data.SqlTypes.SqlBoolean.Null. A System.Data.SqlTypes.SqlDouble structure. A System.Data.SqlTypes.SqlDouble structure.

op_Implicit
[C#] public static implicit operator SqlDouble(double x);
[C++] public: static SqlDouble op_Implicit(double x);
[VB] returnValue=SqlDouble.op_Implicit(x)
[JScript] returnValue=x;
Description
Converts the supplied double value to a System.Data.SqlTypes.SqlDouble. The double value to convert.

op_Implicit
[C#] public static implicit operator SqlDouble(SqlByte x);
[C++] public: static SqlDouble op_Implicit(SqlByte x);
[VB] returnValue=SqlDouble.op_Implicit(x)
[JScript] returnValue=x;
Description
Converts the supplied System.Data.SqlTypes.SqlByte parameter to System.Data.SqlTypes.SqlDouble
Return Value: A System.Data.SqlTypes.SqlDouble structure whose System.Data.SqlTypes.SqlDouble.Value is equal to the System.Data.SqlTypes.SqlByte.Value of the System.Data.SqlTypes.SqlByte parameter. A System.Data.SqlTypes.SqlDouble structure.

op_Implicit
[C#] public static implicit operator SqlDouble(SqlDecimal x);
[C++] public: static SqlDouble op_Implicit(SqlDecimal x);
[VB] returnValue=SqlDouble.op_Implicit(x)
[JScript] returnValue=x;
Description
Converts the supplied System.Data.SqlTypes.SqlDecimal parameter to System.Data.SqlTypes.SqlDouble
Return Value: A new System.Data.SqlTypes.SqlDouble structure whose System.Data.SqlTypes.SqlDouble.Value is equal to the System.Data.SqlTypes.SqlDecimal.Value of the System.Data.SqlTypes.SqlDecimal parameter. A System.Data.SqlTypes.SqlDecimal structure.

op_Implicit
[C#] public static implicit operator SqlDouble(SqlInt16 x);
[C++] public: static SqlDouble op_Implicit(SqlInt16 x);
[VB] returnValue=SqlDouble.op_Implicit(x)
[JScript] returnValue=x;
Description
Converts the supplied System.Data.SqlTypes.SqlInt16 parameter to System.Data.SqlTypes.SqlDouble
Return Value: A new System.Data.SqlTypes.SqlDouble structure whose System.Data.SqlTypes.SqlDouble.Value is equal to the System.Data.SqlTypes.SqlInt16.Value of the System.Data.SqlTypes.SqlInt16 parameter. A System.Data.SqlTypes.SqlInt16 structure.

op_Implicit
[C#] public static implicit operator SqlDouble(SqlInt32 x);
[C++] public: static SqlDouble op_Implicit(SqlInt32 x);
[VB] returnValue=SqlDouble.op_Implicit(x)
[JScript] returnValue=x;
Description
Converts the supplied System.Data.SqlTypes.SqlInt32 parameter to System.Data.SqlTypes.SqlDouble
Return Value: A new System.Data.SqlTypes.SqlDouble whose System.Data.SqlTypes.SqlDouble.Value is equal to the System.Data.SqlTypes.SqlInt32.Value of the System.Data.SqlTypes.SqlInt32 parameter. A System.Data.SqlTypes.SqlInt32 structure.

op_Implicit
[C#] public static implicit operator SqlDouble(SqlInt64 x);
[C++] public: static SqlDouble op_Impicit(SqlInt64 x);
[VB] returnValue=SqlDouble.op_Implicit(x)
[JScript] returnValue=x;
Description
Converts the supplied System.Data.SqlTypes.SqlInt64 parameter to System.Data.SqlTypes.SqlDouble
Return Value: A new System.Data.SqlTypes.SqlDouble whose System.Data.SqlTypes.SqlDouble.Value is equal to the System.Data.SqlTypes.SqlInt64.Value of the System.Data.SqlTypes.SqlInt64 parameter. A System.Data.SqlTypes.SqlInt64 structure.

op_Implicit
[C#] public static implicit operator SqlDouble(SqlMoney x);
[C++] public: static SqlDouble op_Implicit(SqlMoney x);
[VB] returnValue=SqlDouble.op_Implicit(x)
[JScript] returnValue=x;

Description

Converts the supplied System.Data.SqlTypes.SqlMoney parameter to System.Data.SqlTypes.SqlDouble Return Value: A new System.Data.SqlTypes.SqlDoulble whose System.Data.SqlTypes.SqlDouble.Value is equal to the System.Data.SqlTypes.SqlMoney.Value of the System.Data.SqlTypes.SqlMoney parameter. A System.Data.SqlTypes.SqlMoney structure.

op_Implicit

[C#] public static implicit operator SqlDouble(SqlSingle x);
[C++] public: static SqlDouble op_Implicit(SqlSingle x);
[VB] returnValue=SqlDouble.op_Implicit(x)
[JScript] returnValue=x;, Description Converts the supplied System.Data.SqlTypes.SqlSingle parameter to System.Data.SqlTypes.SqlDouble Return Value: A new System.Data.SqlTypes.SqlDouble structure whose System.Data.SqlTypes.SqlDouble.Value is equal to the System.Data.SqlTypes.SqlSingle.Value of the System.Data.SqlTypes.SqlSingle parameter. A System.Data.SqlTypes.SqlSingle structure.

op_Inequality

[C#] public static SqlBoolean operator !=(SqlDouble x, SqlDouble y);
[C++] public: static SqlBoolean op_Inequality(SqlDouble x, SqlDouble y);
[VB] returnValue=SqlDouble.op_Inequality(x, y)
[JScript] returnValue=x !=y;

Description

Compares two instances of System.Data.SqlTypes.SqlDouble to determine if they are equal.

Return Value: A System.Data.SqlTypes.SqlBoolean that is System.Data.SqlTypes.SqlBoolean.True if the two instances are not equal or System.Data.SqlTypes.SqlBoolean.False if the two instances are equal. If either instance of System.Data.SqlTypes.SqlDouble is null, the System.Data.SqlTypes.SqlBoolean.Value of the System.Data.SqlTypes.SqlBoolean will be System.Data.SqlTypes.SqlBoolean.Null. A System.Data.SqlTypes.SqlDouble structure. A System.Data.SqlTypes.SqlDouble structure.

op_LessThan

[C#] public static SqlBoolean operator
[C++] public: static SqlBoolean op_LessThan(SqlDouble x, SqlDouble y);
[VB] returnValue=SqlDouble.op_LessThan(x, y)
[JScript] returnValue=x<y;

Description

Compares two instances of System.Data.SqlTypes.SqlDouble to determine if the first is less than the second.

Return Value: A System.Data.SqlTypes.SqlBoolean that is System.Data.SqlTypes.SqlBoolean.True if the first instance is less than the second instance, otherwise System.Data.SqlTypes.SqlBoolean.False. If either instance of System.Data.SqlTypes.SqlDouble is null, the System.Data.SqlTypes.SqlBoolean.Value of the System.Data.SqlTypes.SqlBoolean will be System.Data.SqlTypes.SqlBoolean.Null. A System.Data.SqlTypes.SqlDouble structure. A System.Data.SqlTypes.SqlDouble structure.

op_LessThanOrEqual

[C#] public static SqlBoolean operator<=(SqlDouble x, SqlDouble y);
[C++] public: static SqlBoolean op_LessThanOrEqual (SqlDouble x, SqlDouble y);
[VB] returnValue=SqlDouble.op_LessThanOrEqual(x, y)
[JScript] returnValue=x<=y;

Description

Compares two instances of System.Data.SqlTypes.SqlDouble to determine if the first is less than or equal to the second.

Return Value: A System.Data.SqlTypes.SqlBoolean that is System.Data.SqlTypes.SqlBoolean.True if the first instance is less than or equal to the second instance, otherwise System.Data.SqlTypes.SqlBoolean.False. If either instance of System.Data.SqlTypes.SqlDouble is null, the System.Data.SqlTypes.SqlBoolean.Value of the System.Data.SqlTypes.SqlBoolean will be System.Data.SqlTypes.SqlBoolean.Null. A System.Data.SqlTypes.SqlDouble structure. A System.Data.SqlTypes.SqlDouble structure.

op_Multiply

[C#] public static SqlDouble operator*(SqlDouble x, SqlDouble y);
[C++] public: static SqlDouble op_Multiply(SqlDouble x, SqlDouble y);
[VB] returnValue=SqlDouble.op_Multiply(x, y)
[JScript] returnValue=x*y;

Description

The multiplication operator computes the product of the two System.Data.SqlTypes.SqlDouble operands.

Return Value: The product of the two System.Data.SqlTypes.SqlDouble operands. A System.Data.SqlTypes.SqlDouble structure. A System.Data.SqlTypes.SqlDouble structure.

op_Subtraction

[C#] public static SqlDouble operator-(SqlDouble x, SqlDouble y);
[C++] public: static SqlDouble op_Subtraction(SqlDouble x, SqlDouble y);
[VB] returnValue=SqlDouble.op_Subtraction(x, y)
[JScript] returnValue=x-y;

Description

The subtraction operator the second System.Data.SqlTypes.SqlDouble operand from the first.

Return Value: The results of the subtraction operation. A System.Data.SqlTypes.SqlDouble structure. A System.Data.SqlTypes.SqlDouble structure.

op_UnaryNegation

[C#] public static SqlDouble operator-(SqlDouble x);
[C++] public: static SqlDouble op_UnaryNegation (SqlDouble x);
[VB] returnValue=SqlDouble.op_UnaryNegation(x)
[JScript] returnValue=-x;

Description

Returns the negated value of the System.Data.SqlTypes.SqlDouble operand. A System.Data.SqlTypes.SqlDouble structure.

Parse

[C#] public static SqlDouble Parse(string s);
[C++] public: static SqlDouble Parse(String* s);
[VB] Public Shared Function Parse(ByVal s As String) As SqlDouble
[JScript] public static function Parse(s: String): SqlDouble;

Description

[ . ] [ . ]

Subtract

[C#] public static SqlDouble Subtract(SqlDouble x, SqlDouble y);
[C++] public: static SqlDouble Subtract(SqlDouble x, SqlDouble y);
[VB] Public Shared Function Subtract(ByVal x As SqlDouble, ByVal y As SqlDouble) As SqlDouble
[JScript] public static function Subtract(x: SqlDouble, y: SqlDouble): SqlDouble;

Description

[ . ]

ToSqlBoolean

[C#] public SqlBoolean ToSqlBoolean( );

[C++] public: SqlBoolean ToSqlBoolean( );
[VB] Public Function ToSqlBooleani( ) As SqlBoolean
[JScript] public function ToSqlBoolean( ): SqlBoolean;
Description
[ .]
ToSqlByte
[C#] public SqlByte ToSqlByte( );
[C++] public: SqlByte ToSqlByte( );
[VB] Public Function ToSqlByte( ) As SqlByte
[JScript] public function ToSqlByte( ): SqlByte;
Description
[ .]
ToSqlDecimal
[C#] public SqlDecimal ToSqlDecimal( );
[C++] public: SqlDecimal ToSqlDecimal( );
[VB] Public Function ToSqlDecimal( ) As SqlDecimal
[JScript] public function ToSqlDecimal( ): SqlDecimal;
Description
[ .]
ToSqlInt16
[C#] public SqlInt16 ToSqlInt16( );
[C++] public: SqlInt16 ToSqlInt16( );
[VB] Public Function ToSqlInt16( ) As SqlInt16
[JScript] public function ToSqlInt16( ): SqlInt16;
Description
[ .]
ToSqlInt32
[C#] public SqlInt32 ToSqlInt32( );
[C++] public: SqlInt32 ToSqlInt32( );
[VB] Public Function ToSqlInt32( ) As SqlInt32
[JScript] public function ToSqlInt32( ): SqlInt32;
Description
[ .]
ToSqlInt64
[C#] public SqlInt64 ToSqlInt64( );
[C++] public: SqlInt64 ToSqlInt64( );
[VB] Public Function ToSqlInt64( ) As SqlInt64
[JScript] public function ToSqlInt64( ): SqlInt64;
Description
[ .]
ToSqlMoney
[C#] public SqlMoney ToSqlMoney( );
[C++] public: SqlMoney ToSqlMoney( );
[VB] Public Function ToSqlMoney( ) As SqlMoney
[JScript] public function ToSqlMoney( ): SqlMoney;
Description
[ .]
ToSqlSingle
[C#] public SqlSingle ToSqlSingle( );
[C++] public: SqlSingle ToSqlSingle( );
[VB] Public Function ToSqlSingle( ) As SqlSingle
[JScript] public function ToSqlSingle( ): SqlSingle;
Description
[ .]
ToSqlString
[C#] public SqlString ToSqlString( );
[C++] public: SqlString ToSqlString( );
[VB] Public Function ToSqlString( ) As SqlString
[JScript] public function ToSqlString( ): SqlString;
Description
[ .]
ToString
[C#] public override string ToString( );
[C++] public: String* ToString( );
[VB] Overrides Public Function ToString( ) As String
[JScript] public override function ToString( ): String; Converts a System.Data.SqlTypes.SqlDouble structure to a string.

Description
Converts this System.Data.SqlTypes.SqlDouble structure to a string.
Return Value: A string representing the System.Data.SqlTypes.SqlDouble.Value of this System.Data.SqlTypes.SqlDouble.
SqlGuid structure (System.Data.SqlTypes)
ToString
Description
Represents a globally unique identifier to be stored in or retrieved from a database.
ToString
[C#] public static readonly SqlGuid Null;
[C++] public: static SqlGuid Null;
[VB] Public Shared ReadOnly Null As SqlGuid
[JScript] public static var Null: SqlGuid;
Description
Represents a null value that can be assigned to the System.Data.SqlTypes.SqlGuid.Value property of an instance of the System.Data.SqlTypes.SqlGuid structure. System.Data.SqlTypes.SqlGuid.Null functions as a constant for the SqlGuid structure.
SqlGuid
Example Syntax:
ToString
[C#] public SqlGuid(byte[ ] value);
[C++] public: SqlGuid(unsigned char value __gc[ ]);
[VB] Public Sub New(ByVal value( ) As Byte)
[JScript] public function SqlGuid(value: Byte[ ]); Initializes a new instance of the System.Data.SqlTypes.SqlGuid structure.
Description
Initializes a new instance of the System.Data.SqlTypes.SqlGuid structure using the supplied byte array parameter. A byte array.
SqlGuid
Example Syntax:
ToString
[C#] public SqlGuid(Guid g);
[C++] public: SqlGuid(Guid g);
[VB] Public Sub New(ByVal g As Guid)
[JScript] public function SqlGuid(g: Guid);
Description
Initializes a new instance of the System.Data.SqlTypes.SqlGuid structure using the supplied System.Guid parameter. A System.Guid
SqlGuid
Example Syntax:
ToString
[C#] public SqlGuid(string s);
[C++] public: SqlGuid(String* s);
[VB] Public Sub New(ByVal s As String)
[JScript] public function SqlGuid(s: String);
Description
Initializes a new instance of the System.Data.SqlTypes.SqlGuid structure using the supplied System.String parameter. A System.String object.
SqlGuid
Example Syntax:
ToString
[C#] public SqlGuid(int a, short b, short c, byte d, byte e, byte f, byte g, byte h, byte i, byte j, byte k);
[C++] public: SqlGuid(int a, short b, short c, unsigned char d, unsigned char e, unsigned char f, unsigned char g, unsigned char h, unsigned char i, unsigned char J, unsigned char k);
[VB] Public Sub New(ByVal a As Integer, ByVal b As Short, ByVal c As Short, ByVal d As Byte, ByVal e As Byte, ByVal f As Byte, ByVal g As Byte, ByVal h As Byte, ByVal i As Byte, ByVal j As Byte, ByVal k As Byte)
[JScript] public function SqlGuid(a: int, b: Int16, c: Int16, d: Byte, e: Byte, f: Byte, g: Byte, h: Byte, i: Byte, j: Byte, k: Byte);
Description
[ . ]
IsNull
ToString
[C#] public bool IsNull {get;}
[C++] public: _property bool get_IsNull( );
[VB] Public ReadOnly Property IsNull As Boolean
[JScript] public function get IsNull( ): Boolean;
Description
    Indicates whether or not System.Data.SqlTypes.SqlGuid-.Value is null.
Value
ToString
[C#] public Guid Value {get;}
[C++] public: _property Guid get_Value( );
[VB] Public ReadOnly Property Value As Guid
[JScript] public function get Value( ): Guid;
Description
    Gets the value of the System.Data.SqlTypes.SqlGuid structure. This property is read-only.
CompareTo
[C#] public int CompareTo(object value);
[C++] public: _sealed int CompareTo(Object* value);
[VB] NotOverridable Public Function CompareTo(ByVal value As Object) As Integer
[JScript] public function CompareTo(value: Object): int;
Description
    Compares this System.Data.SqlTypes.SqlGuid structure to the supplied object and returns an indication of their relative values.
Return Value: A signed number indicating the relative values of the instance and the object. The object to be compared.
Equals
[C#] public override bool Equals(object value);
[C++] public: bool Equals(Object* value);
[VB] Overrides Public Function Equals(ByVal value As Object) As Boolean
[JScript] public override function Equals(value: Object): Boolean;
Description
    Compares the supplied object parameter to the System-.Data.SqlTypes.SqlGuid.Value property of the System-.Data.SqlTypes.SqlGuid object.
Return Value: true if object is an instance of SqlGuid and the two are equal; otherwise false. The object to be compared.
Equals
[C#] public static new SqlBoolean Equals(SqlGuid x, SqlGuid y);
[C++] public: static SqlBoolean Equals(SqlGuid x, SqlGuid y);
[VB] Shadows Public Shared Function Equals(ByVal x As SqlGuid, ByVal y As SqlGuid) As SqlBoolean
[JScript] public static hide function Equals(x: SqlGuid, y: SqlGuid): SqlBoolean;
Description
[ . ]
GetHashCode
[C#] public override int GetHashCode( );
[C++] public: int GetHashCode( );
[VB] Overrides Public Function GetHashCode( ) As Integer
[JScript] public override function GetHashCode( ): int;

Description
    Returns the hash code of this System.Data.Sql-Types.SqlGuid structure.
Return Value: A 32-bit signed integer hash code.
GreaterThan
[C#] public static SqlBoolean GreaterThan(SqlGuid x, SqlGuid y);
[C++] public: static SqlBoolean GreaterThan(SqlGuid x, SqlGuid y);
[VB] Public Shared Function GreaterThan(ByVal x As SqlGuid, ByVal y As SqlGuid) As SqlBoolean
[JScript] public static function GreaterThan(x: SqlGuid, y: SqlGuid) SqlBoolean;
Description
[ . ]
GreaterThanOrEqual
[C#] public static SqlBoolean GreaterThanOrEqual (SqlGuid x, SqlGuid y);
[C++] public: static SqlBoolean GreaterThanOrEqual (SqlGuid x, SqlGuid y);
[VB] Public Shared Function GreaterThanOrEqual(ByVal x As SqlGuid, ByVal y As SqlGuid) As SqlBoolean
[JScript] public static function GreaterThanOrEqual(x: SqlGuid, y: SqlGuid) SqlBoolean;
Description
[ . ]
LessThan
[C#] public static SqlBoolean LessThan(SqlGuid x, SqlGuid y);
[C++] public: static SqlBoolean LessThan(SqlGuid x, SqlGuid y);
[VB] Public Shared Function LessThan(ByVal x As SqlGuid, ByVal y As SqlGuid) As SqlBoolean
[JScript] public static function LessThan(x: SqlGuid, y: SqlGuid): SqlBoolean;
Description
[ . ]
LessThanOrEqual
[C#] public static SqlBoolean LessThanOrEqual(SqlGuid x, SqlGuid y);
[C++] public: static SqlBoolean LessThanOrEqual(SqlGuid x, SqlGuid y);
[VB] Public Shared Function LessThanOrEqual(ByVal x As SqlGuid, ByVal y As SqlGuid) As SqlBoolean
[JScript] public static function LessThanOrEqual(x: SqlGuid, y: SqlGuid): SqlBoolean;
Description
[ . ]
NotEquals
[C#] public static SqlBoolean NotEquals(SqlGuid x, SqlGuid y);
[C++] public: static SqlBoolean NotEquals(SqlGuid x, SqlGuid y);
[VB] Public Shared Function NotEquals(ByVal x As SqlGuid, ByVal y As SqlGuid) As SqlBoolean
[JScript] public static function NotEquals(x: SqlGuid, y: SqlGuid): SqlBoolean;
Description
[ . ]
op_Equality
[C#] public static SqlBoolean operator==(SqlGuid x, SqlGuid y);
[C++] public: static SqlBoolean op_Equality(SqlGuid x, SqlGuid y);
[VB] returnValue=SqlGuid.op_Equality(x, y)
[JScript] returnValue==xy;
Description
    Performs a logical comparison of two System.Data.Sql-Types.SqlGuid structures to determine if they are equal.

Return Value: A System.Data.SqlTypes.SqlBoolean that is System.Data.SqlTypes.SqlBoolean.True if the two instances are equal or System.Data.SqlTypes.SqlBoolean.False if the two instances are not equal. If either instance of SqlGuid is null, the System.Data.SqlTypes.SqlBoolean.Value of the SqlBoolean will be System.Data.SqlTypes.SqlBoolean.Null. A SqlGuid structure. A SqlGuid structure.
    op_Explicit
[C#] public static explicit operator SqlGuid(SqlBinary x);
[C++] public: static SqlGuid op_Explicit(SqlBinary x);
[VB] returnValue=SqlGuid.op_Explicit(x)
[JScript] returnValue=SqlGuid(x);
Description
    Converts the System.Data.SqlTypes.SqlBinary parameter to System.Data.SqlTypes.SqlGuid
Return Value: A new SqlGuid whose System.Data.SqlTypes.SqlGuid.Value is equal to the System.Data.SqlTypes.SqlBinary.Value of the SqlBinary parameter. A SqlBinary object.
    op_Explicit
[C#] public static explicit operator Guid(SqlGuid x);
[C++] public: static Guid op_Explicit( );
[VB] returnValue=SqlGuid.op_Explicit(x)
[JScript] returnValue=Guid(x);
Description
    Converts the supplied System.Data.SqlTypes.SqlGuid parameter to System.Guid
Return Value: A new Guid equal to the System.Data.SqlTypes.SqlGuid.Value of the SqlGuid. A SqlGuid structure.
    op_Explicit
[C#] public static explicit operator SqlGuid(SqlString x);
[C++] public: static SqlGuid op_Explicit(SqlString x);
[VB] returnValue=SqlGuid.op_Explicit(x)
[JScript] returnValue=SqlGuid(x);
Description
    Converts the supplied System.Data.SqlTypes.SqlString object parameter to System.Data.SqlTypes.SqlGuid
Return Value: A SqlGuid whose System.Data.SqlTypes.SqlGuid.Value equals the value represented by the String parameter. A SqlString object.
    op_GreaterThan
[C#] public static SqlBoolean operator >(SqlGuid x, SqlGuid y);
[C++] public: static SqlBoolean op_GreaterThan(SqlGuid x, SqlGuid y);
[VB] returnValue=SqlGuid.op_GreaterThan(x, y)
[JScript] returnValue=x>y;
Description
    Compares two instances of System.Data.SqlTypes.SqlGuid to determine if the first is greater than the second.
Return Value: A System.Data.SqlTypes.SqlBoolean that is System.Data.SqlTypes.SqlBoolean.True if the first instance is greater than the second instance, otherwise System.Data.SqlTypes.SqlBoolean.False. If either instance of SqlGuid is null, the System.Data.SqlTypes.SqlBoolean.Value of the SqlBoolean will be System.Data.SqlTypes.SqlBoolean.Null. A SqlGuid structure. A SqlGuid structure.
    op_GreaterThanOrEqual
[C#] public static SqlBoolean operator>=(SqlGuid x, SqlGuid y);
[C++] public: static SqlBoolean op_GreaterThanOrEqual (SqlGuid x, SqlGuid y);
[VB] returnValue=SqlGuid.op_GreaterThanOrEqual(x, y)
[JScript] returnValue=x>=y;
Description
    Compares two instances of System.Data.SqlTypes.SqlGuid to determine if the first is greater than or equal to the second.
Return Value: A System.Data.SqlTypes.SqlBoolean that is System.Data.SqlTypes.SqlBoolean.True if the first instance is greater than or equal to the second instance, otherwise System.Data.SqlTypes.SqlBoolean.False.
    If either instance of SqlGuid is null, the System.Data.SqlTypes.SqlBoolean.Value of the SqlBoolean will be System.Data.SqlTypes.SqlBoolean.Null. A SqlGuid structure. A SqlGuid structure.
    op_Implicit
[C#] public static implicit operator SqlGuid(Guid x);
[C++] public: static SqlGuid op_Implicit(Guid x);
[VB] returnValue=SqlGuid.op_Implicit(x)
[JScript] returnValue=x;
Description
    Converts the supplied System.Guid parameter to System.Data.SqlTypes.SqlGuid
Return Value: A new SqlGuid whose System.Data.SqlTypes.SqlGuid.Value is equal to the Guid parameter. A System.Guid.
    op_Inequality
[C+] public static SqlBoolean operator !=(SqlGuid x, SqlGuid y);
[C++] public: static SqlBoolean op_Inequality(SqlGuid x, SqlGuid y);
[VB] returnValue=SqlGuid.op_Inequality(x, y)
[JScript] returnValue=x !=y;
Description
    Performs a logical comparison on two System.Data.SqlTypes.SqlGuid structures to determine if they are equal.
Return Value: A System.Data.SqlTypes.SqlBoolean that is System.Data.SqlTypes.SqlBoolean.True if the two instances are not equal or System.Data.SqlTypes.SqlBoolean.False if the two instances are equal. If either instance of SqlGuid is null, the System.Data.SqlTypes.SqlBoolean.Value of the SqlBoolean will be System.Data.SqlTypes.SqlBoolean.Null. A SqlGuid structure. A SqlGuid structure.
    op_LessThan
[C#] public static SqlBoolean operator
[C++] public: static SqlBoolean op_LessThan(SqlGuid x, SqlGuid y);
[VB] returnValue=SqlGuid.op_LessThan(x, y)
[JScript] returnValue=x<y;
Description
    Compares two instances of System.Data.SqlTypes.SqlGuid to determine if the first is less than the second.
Return Value: A System.Data.SqlTypes.SqlBoolean that is System.Data.SqlTypes.SqlBoolean.True if the first instance is less than the second instance, otherwise System.Data.SqlTypes.SqlBoolean.False. If either instance of SqlGuid is null, the System.Data.SqlTypes.SqlBoolean.Value of the SqlBoolean will be System.Data.SqlTypes.SqlBoolean.Null. A SqlGuid structure. A SqlGuid structure.
    op_LessThanOrEqual
[C#] public static SqlBoolean operator <=(SqlGuid x, SqlGuid y);
[C++] public: static SqlBoolean op_LessThanOrEqual (SqlGuid x, SqlGuid y);
[VB] returnValue=SqlGuid.op_LessThanOrEqual(x, y)
[JScript] returnValue=x<=y;
Description
    Compares two instances of System.Data.SqlTypes.SqlGuid to determine if the first is less than or equal to the second.
Return Value: A System.Data.SqlTypes.SqlBoolean that is System.Data.SqlTypes.SqlBoolean.True if the first instance is less than or equal to the second instance, otherwise System.Data.SqlTypes.SqlBoolean.False. If either instance of SqlGuid is null, the System.Data.SqlTypes.SqlBoolean.Value of the SqlBoolean will be System.Data.SqlTypes.SqlBoolean.Null. A SqlGuid structure. A SqlGuid structure.
 Parse
[C#] public static SqlGuid Parse(string s);
[C++] public: static SqlGuid Parse(String* s);
[VB] Public Shared Function Parse(ByVal s As String) As SqlGuid
[JScript] public static function Parse(s: String): SqlGuid;
Description
 [ . ] [ . ]
 ToByteArray
[C#] public byte[ ] ToByteArray( );
[C++] public: unsigned char ToByteArray( ) _gc[ ];
[VB] Public Function ToByteArray( ) As Byte( )
[JScript] public function ToByteArray( ): Byte[ ];
Description
 Converts this System.Data.SqlTypes.SqlGuid structure to a byte array.
Return Value: An array of bytes representing the System.Data.SqlTypes.SqlGuid.Value of this SqlGuid structure.
 ToSqlBinary
[C#] public SqlBinary ToSqlBinary( );
[C++] public: SqlBinary ToSqlBinary( );
[VB] Public Function ToSqlBinary( ) As SqlBinary
[JScript] public function ToSqlBinary( ): SqlBinary;
Description
 [ . ]
 ToSqlString
[C#] public SqlString ToSqlString( );
[C++] public: SqlString ToSqlString( );
[VB] Public Function ToSqlString( ) As SqlString
[JScript] public function ToSqlString( ): SqlString;
Description
 [ . ]
 ToString
[C#] public override string ToString( );
[C++] public: String* ToString( );
[VB] Overrides Public Function ToString( ) As String
[JScript] public override function ToString( ): String; Converts a System.Data.SqlTypes.SqlGuid to a System.String.
Description
 Converts this System.Data.SqlTypes.SqlGuid structure to a System.String.
 SqlInt16 structure (System.Data.SqlTypes)
 ToString
Description
 Represents a 16-bit signed integer to be stored in or retrieved from a database.
 ToString
[C#] public static readonly SqlInt16 MaxValue;
[C++] public: static SqlInt16 MaxValue;
[VB] Public Shared ReadOnly MaxValue As SqlInt16
[JScript] public static var MaxValue: SqlInt16;
Description
 A constant representing the largest possible value of a System.Data.SqlTypes.SqlInt16.
 The value of this constant is 32,767.
 ToString
[C#] public static readonly SqlInt16 MinValue;
[C++] public: static SqlInt16 MinValue;
[VB] Public Shared ReadOnly MinValue As SqlInt16
[JScript] public static var MinValue: SqlInt16;
Description
 A constant representing the smallest possible value of a System.Data.SqlTypes.SqlInt16.

The value of this constant is −32,768.
 ToString
[C#] public static readonly SqlInt16 Null;
[C++] public: static SqlInt16 Null;
[VB] Public Shared ReadOnly Null As SqlInt16
[JScript] public static var Null: SqlInt16;
Description
 Represents a null value that can be assigned to the System.Data.SqlTypes.SqlInt16.Value property of an instance of the System.Data.SqlTypes.SqlInt16 structure.
 System.Data.SqlTypes.SqlInt16.Null functions as a constant for the System.Data.SqlTypes.SqlInt16 structure.
 ToString
[C#] public static readonly SqlInt16 Zero;
[C++] public: static SqlInt16 Zero;
[VB] Public Shared ReadOnly Zero As SqlInt16
[JScript] public static var Zero: SqlInt16;
Description
 Represents a zero value that can be assigned to the System.Data.SqlTypes.SqlInt16.Value property of an instance of the System.Data.SqlTypes.SqlInt16 structure.
 The System.Data.SqlTypes.SqlInt16.Zero field is a constant for the System.Data.SqlTypes.SqlInt16 structure.
 SqlInt16
 Example Syntax:
 ToString
[C#] public SqlInt16(short value);
[C++] public: SqlInt16(short value);
[VB] Public Sub New(ByVal value As Short)
[JScript] public function SqlInt16(value: Int16);
Description
 Initializes a new instance of the System.Data.SqlTypes.SqlInt16 structure using the supplied short integer parameter. A short integer.
 IsNull
 ToString
[C#] public bool IsNull {get;}
[C++] public: _property bool get_IsNull( );
[VB] Public ReadOnly Property IsNull As Boolean
[JScript] public function get IsNull( ): Boolean;
Description
 Indicates whether or not System.Data.SqlTypes.SqlInt16.Value is null.
 Value
 ToString
[C#] public short Value {get;}
[C++] public: _property short get_Value( );
[VB] Public ReadOnly Property Value As Short
[JScript] public function get Value( ): Int16;
Description
 Gets the value of this instance of System.Data.SqlTypes.SqlInt16 structure. This property is read-only.
 Add
[C#] public static SqlInt16 Add(SqlInt16 x, SqlInt16 y);
[C++] public: static SqlInt16 Add(SqlInt16 x, SqlInt16 y);
[VB] Public Shared Function Add(ByVal x As SqlInt16, ByVal y As SqlInt16) As SqlInt16
[JScript] public static function Add(x: SqlInt16, y: SqlInt16): SqlInt16;
Description
 [ . ]
 BitwiseAnd
[C#] public static SqlInt16 BitwiseAnd(SqlInt16 x, SqlInt16 y);
[C++] public: static SqlInt16 BitwiseAnd(SqlInt16 x, SqlInt16 y);
[VB] Public Shared Function BitwiseAnd(ByVal x As SqlInt16, ByVal y As SqlInt16) As SqlInt16

[JScript] public static function BitwiseAnd(x: SqlInt16, y: SqlInt16): SqlInt16;
Description
[ . ]
BitwiseOr
[C#] public static SqlInt16 BitwiseOr(SqlInt16 x, SqlInt16 y);
[C++] public: static SqlInt16 BitwiseOr(SqlInt16 x, SqlInt16 y);
[VB] Public Shared Function BitwiseOr(ByVal x As SqlInt16, ByVal y As SqlInt16) As SqlInt16
[JScript] public static function BitwiseOr(x: SqlInt16, y: SqlInt16): SqlInt16;
Description
[ . ]
CompareTo
[C#] public int CompareTo(object value);
[C++] public: _sealed int CompareTo(Object* value);
[VB] NotOverridable Public Function CompareTo(ByVal value As Object) As Integer
[JScript] public function CompareTo(value: Object): int;
Description
Compares this instance to the supplied object and returns an indication of their relative values.
Return Value: A signed number indicating the relative values of the instance and the object. The object to be compared.
Divide
[C#] public static SqlInt16 Divide(SqlInt16 x, SqlInt16 y);
[C++] public: static SqlInt16 Divide(SqlInt16 x, SqlInt16 y);
[VB] Public Shared Function Divide(ByVal x As SqlInt16, ByVal y As SqlInt16) As SqlInt16
[JScript] public static function Divide(x: SqlInt16, y: SqlInt16): SqlInt16;
Description
[ . ]
Equals
[C#] public override bool Equals(object value);
[C++] public: bool Equals(Object* value);
[VB] Overrides Public Function Equals(ByVal value As Object) As Boolean
[JScript] public override function Equals(value: Object): Boolean;
Description
Compares the supplied object parameter to the System.Data.SqlTypes.SqlInt32.Value property of the System.Data.SqlTypes.SqlInt16 object.
Return Value: true if object is an instance of System.Data.SqlTypes.SqlInt16 and the two are equal; otherwise false. The object to be compared.
Equals
[C#] public static new SqlBoolean Equals(SqlInt16 x, SqlInt16 y);
[C++] public: static SqlBoolean Equals(SqlInt16 x, SqlInt16 y);
[VB] Shadows Public Shared Function Equals(ByVal x As SqlInt16, ByVal y As SqlInt16) As SqlBoolean
[JScript] public static hide function Equals(x: SqlInt16, y: SqlInt16): SqlBoolean;
Description
[ . ]
GetHashCode
[C#] public override int GetHashCode( );
[C++] public: int GetHashCode( );
[VB] Overrides Public Function GetHashCode( ) As Integer
[JScript] public override function GetHashCode( ): int;
Description
Returns the hash code for this instance.
Return Value: A 32-bit signed integer hash code.
GreaterThan
[C#] public static SqlBoolean GreaterThan(SqlInt16 x, SqlInt16 y);
[C++] public: static SqlBoolean GreaterThan(SqlInt16 x, SqlInt16 y);
[VB] Public Shared Function GreaterThan(ByVal x As SqlInt16, ByVal y As SqlInt16) As SqlBoolean
[JScript] public static function GreaterThan(x: SqlInt16, y: SqlInt16): SqlBoolean;
Description
[ . ]
GreaterThanOrEqual
[C#] public static SqlBoolean GreaterThanOrEqual (SqlInt16 x, SqlInt16 y);
[C++] public: static SqlBoolean GreaterThanOrEqual (SqlInt16 x, SqlInt16 y);
[VB] Public Shared Function GreaterThanOrEqual(ByVal x As SqlInt16, ByVal y As SqlInt16) As SqlBoolean
[JScript] public static function GreaterThanOrEqual(x: SqlInt16, y: SqlInt16): SqlBoolean;
Description
[ . ]
LessThan
[C#] public static SqlBoolean LessThan(SqlInt16 x, SqlInt16 y);
[C++] public: static SqlBoolean LessThan(SqlInt16 x, SqlInt16 y);
[VB] Public Shared Function LessThan(ByVal x As SqlInt16, ByVal y As SqlInt16) As SqlBoolean
[JScript] public static function LessThan(x: SqlInt16, y: SqlInt16): SqlBoolean;
Description
[ . ]
LessThanOrEqual
[C#] public static SqlBoolean LessThanOrEqual(SqlInt16 x, SqlInt16 y);
[C++] public: static SqlBoolean LessThanOrEqual(SqlInt16 x, SqlInt16 y);
[VB] Public Shared Function LessThanOrEqual(ByVal x As SqlInt16, ByVal y As SqlInt16) As SqlBoolean
[JScript] public static function LessThanOrEqual(x: SqlInt16, y: SqlInt16): SqlBoolean;
Description
[ . ]
Mod
[C#] public static SqlInt16 Mod(SqlInt16 x, SqlInt16 y);
[C++] public: static SqlInt16 Mod(SqlInt16 x, SqlInt16 y);
[VB] Public Shared Function Mod(ByVal x As SqlInt16, ByVal y As SqlInt16) As SqlInt16
[JScript] public static function Mod(x: SqlInt16, y: SqlInt16): SqlInt16;
Description
[ . ]
Multiply
[C#] public static SqlInt16 Multiply(SqlInt16 x, SqlInt16 y);
[C++] public: static SqlInt16 Multiply(SqlInt16 x, SqlInt16 y);
[VB] Public Shared Function Multiply(ByVal x As SqlInt16, ByVal y As SqlInt16) As SqlInt16
[JScript] public static function Multiply(x: SqlInt16, y: SqlInt16): SqlInt16;
Description
[ . ]
NotEquals
[C#] public static SqlBoolean NotEquals(SqlInt16 x, SqlInt16 y);

[C++] public: static SqlBoolean NotEquals(SqlInt16 x, SqlInt16 y);
[VB] Public Shared Function NotEquals(ByVal x As SqlInt16, ByVal y As SqlInt16) As SqlBoolean
[JScript] public static function NotEquals(x: SqlInt16, y: SqlInt16): SqlBoolean;
Description
[.]
OnesComplement
[C#] public static SqlInt16 OnesComplement(SqlInt16 x);
[C++] public: static SqlInt16 OnesComplement(SqlInt16 x);
[VB] Public Shared Function OnesComplement(ByVal x As SqlInt16) As SqlInt16
[JScript] public static function OnesComplement(x: SqlInt16): SqlInt16;
Description
[.]
op_Addition
[C#] public static SqlInt16 operator +(SqlInt16 x, SqlInt16 y);
[C++] public: static SqlInt16 op_Addition(SqlInt16 x, SqlInt16 y);
[VB] returnValue=SqlInt16.op_Addition(x, y)
[JScript] returnValue=x+y;
Description
Computes the sum of the two System.Data.SqlTypes.SqlInt16 operands.
Return Value: A System.Data.SqlTypes.SqlInt16 structure whose System.Data.SqlTypes.SqlInt16.Value property contains the sum of the two System.Data.SqlTypes.SqlInt16 operands. A System.Data.SqlTypes.SqlInt16 structure. A System.Data.SqlTypes.SqlInt16 structure.
op_BitwiseAnd
[C#] public static SqlInt16 operator &(SqlInt16 x, SqlInt16 y);
[C++] public: static SqlInt16 op_BitwiseAnd(SqlInt16 x, SqlInt16 y);
[VB] returnValue=SqlInt16.op_BitwiseAnd(x, y)
[JScript] returnValue=x & y;
Description
Computes the bitwise AND of its System.Data.SqlTypes.SqlInt16 operands. A System.Data.SqlTypes.SqlInt16 structure. A System.Data.SqlTypes.SqlInt16 structure.
op_BitwiseOr
[C#] public static SqlInt16 operator |(SqlInt16 x, SqlInt16 y);
[C++] public: static SqlInt16 op_BitwiseOr(SqlInt16 x, SqlInt16 y);
[VB] returnValue=SqlInt16.op_BitwiseOr(x, y)
[JScript] returnValue=x|y;
Description
Computes the bitwise OR of its two System.Data.SqlTypes.SqlInt16 operands. A System.Data.SqlTypes.SqlInt16 structure. A System.Data.SqlTypes.SqlInt16 structure.
op_Division
[C#] public static SqlInt16 operator /(SqlInt16 x, SqlInt16 y);
[C++] public: static SqlInt16 op_Division(SqlInt16 x, SqlInt16 y);
[VB] returnValue=SqlInt16.op_Division(x, y)
[JScript] returnValue=x/y;
Description
The division operator divides the first System.Data.SqlTypes.SqlInt16 operand by the second.
Return Value: A System.Data.SqlTypes.SqlInt16 whose System.Data.SqlTypes.SqlInt16.Value property contains the results of the division. A System.Data.SqlTypes.SqlInt16 structure. A System.Data.SqlTypes.SqlInt16 structure.

op_Equality
[C#] public static SqlBoolean operator==(SqlInt16 x, SqlInt16 y);
[C++] public: static SqlBoolean op_Equality(SqlInt16 x, SqlInt16 y);
[VB] returnValue=SqlInt16.op_Equality(x, y)
[JScript] returnValue=x==y;
Description
Performs a logical comparison of two System.Data.SqlTypes.SqlInt16 structures to determine if they are equal.
Return Value: A System.Data.SqlTypes.SqlBoolean that is System.Data.SqlTypes.SqlBoolean.True if the two instances are equal or System.Data.SqlTypes.SqlBoolean.False if the two instances are not equal. If either instance of System.Data.SqlTypes.SqlInt16 is null, the System.Data.SqlTypes.SqlBoolean.Value of the System.Data.SqlTypes.SqlBoolean will be System.Data.SqlTypes.SqlBoolean.Null. A System.Data.SqlTypes.SqlInt16 structure. A System.Data.SqlTypes.SqlInt16 structure.
op_ExclusiveOr
[C#] public static SqlInt16 operator ^(SqlInt16 x, SqlInt16 y);
[C++] public: static SqlInt16 op_ExclusiveOr(SqlInt16 x, SqlInt16 y);
[VB] returnValue=SqlInt16.op_ExclusiveOr(x, y)
[JScript] returnValue=x ^y;
Description
Performs a bitwise exclusive-OR operation on the supplied parameters. A System.Data.SqlTypes.SqlInt16 structure. A System.Data.SqlTypes.SqlInt16 structure.
op_Explicit
[C#] public static explicit operator SqlInt16(SqlBoolean x);
[C++] public: static SqlInt16 op_Explicit(SqlBoolean x);
[VB] returnValue=SqlInt16.op_Explicit(x)
[JScript] returnValue=SqlInt16(x);
Description
Converts the supplied System.Data.SqlTypes.SqlBit structure to System.Data.SqlTypes.SqlInt16
Return Value: A new System.Data.SqlTypes.SqlInt16 structure whose System.Data.SqlTypes.SqlInt16.Value property is equal to the System.Data.SqlTypes.SqlBit.ByteValue property of the System.Data.SqlTypes.SqlBit parameter. A System.Data.SqlTypes.SqlBit structure.
op_Explicit
[C#] public static explicit operator SqlInt16(SqlDecimal x);
[C++] public: static SqlInt16 op_Explicit(SqlDecimal x);
[VB] returnValue=SqlInt16.op_Explicit(x)
[JScript] returnValue=SqlInt16(x);
Description
Converts the supplied System.Data.SqlTypes.SqlDecimal structure to System.Data.SqlTypes.SqlInt16
Return Value: A new System.Data.SqlTypes.SqlInt16 structure whose System.Data.SqlTypes.SqlInt16.Value property is equal to the System.Data.SqlTypes.SqlDecimal.Value property of the System.Data.SqlTypes.SqlDecimal parameter. A System.Data.SqlTypes.SqlDecimal structure.
op_Explicit
[C#] public static explicit operator SqlInt16(SqlDouble x);
[C++] public: static SqlInt16 op_Explicit(SqlDouble x);
[VB] returnValue=SqlInt16.op_Explicit(x)
[JScript] returnValue=SqlInt16(x);
Description
Converts the supplied System.Data.SqlTypes.SqlDouble structure to System.Data.SqlTypes.SqlInt16
Return Value: A new System.Data.SqlTypes.SqlInt16 structure whose System.Data.SqlTypes.SqlInt16.Value property is equal to the integer portion of the System.Data.Sql- Types.SqlDouble parameter. A System.Data.SqlTypes.Sql-Double structure.

op__Explicit
[C#] public static explicit operator short(SqlInt16 x);
[C++] public: static short op__Explicit( );
[VB] returnValue=SqlInt16.op__Explicit(x)
[JScript] returnValue=Int16(x);
Description
Converts the supplied System.Data.SqlTypes.SqlInt16 structure to a short integer.
Return Value: A short integer whose value is the Value of the System.Data.SqlTypes.SqlInt16 parameter. A System.Data.SqlTypes.SqlInt16 structure.

op__Explicit
[C#] public static explicit operator SqlInt16(SqlInt32 x);
[C++] public: static SqlInt16 op__Explicit(SqlInt32 x);
[VB] returnValue=SqlInt16.op__Explicit(x)
[JScript] returnValue=SqlInt16(x);
Description
Converts the supplied System.Data.SqlTypes.SqlInt32 structure to System.Data.SqlTypes.SqlInt16
Return Value: A new System.Data.SqlTypes.SqlInt16 structure whose System.Data.SqlTypes.SqlInt16.Value property is equal to the System.Data.SqlTypes.SqlInt32.Value of the supplied System.Data.SqlTypes.SqlInt32 parameter. A System.Data.SqlTypes.SqlInt32 structure.

op__Explicit
[C#] public static explicit operator SqlInt16(SqlInt64 x);
[C++] public: static SqlInt16 op__Explicit(SqlInt64 x);
[VB] returnValue=SqlInt16.op__Explicit(x)
[JScript] returnValue=SqlInt16(x);
Description
Converts the supplied System.Data.SqlTypes.SqlInt64 structure to System.Data.SqlTypes.SqlInt16
Return Value: A new System.Data.SqlTypes.SqlInt16 structure whose System.Data.SqlTypes.SqlInt16.Value property is equal to the System.Data.SqlTypes.SqlInt64.Value of the System.Data.SqlTypes.SqlInt64 parameter. A System.Data.SqlTypes.SqlInt64 structure.

op__Explicit
[C#] public static explicit operator SqlInt16(SqlMoney x);
[C++] public: static SqlInt16 op__Explicit(SqlMoney x);
[VB] returnValue=SqlInt16.op__Explicit(x)
[JScript] returnValue=SqlInt16(x);
Description
Converts the supplied System.Data.SqlTypes.SqlMoney structure to System.Data.SqlTypes.SqlInt16
Return Value: A new System.Data.SqlTypes.SqlInt16 structure whose System.Data.SqlTypes.SqlInt16.Value property is equal to the System.Data.SqlTypes.SqlMoney.Value property of the System.Data.SqlTypes.SqlMoney parameter. A System.Data.SqlTypes.SqlMoney structure.

op__Explicit
[C#] public static explicit operator SqlInt16(SqlSingle x);
[C++] public: static SqlInt16 op__Explicit(SqlSingle x);
[VB] returnValue=SqlInt16.op__Explicit(x)
[JScript] returnValue=SqlInt16(x);
Description
Converts the supplied System.Data.SqlTypes.SqlSingle structure to System.Data.SqlTypes.SqlInt16
Return Value: A new System.Data.SqlTypes.SqlInt16 structure whose System.Data.SqlTypes.SqlInt16.Value property is equal to the integer portion of the System.Data.SqlTypes.SqlSingle parameter. A System.Data.SqlTypes.SqlSingle structure.

op__Explicit
[C#] public static explicit operator SqlInt16(SqlString x);
[C++] public: static SqlInt16 op__Explicit(SqlString x);
[VB] returnValue=SqlInt16.op__Explicit(x)
[JScript] returnValue=SqlInt16(x);
Description
Converts the supplied System.Data.SqlTypes.SqlString object to System.Data.SqlTypes.SqlInt16
Return Value: A new System.Data.SqlTypes.SqlInt16 structure whose System.Data.SqlTypes.SqlInt16.Value property is equal to the value represented by the System.Data.SqlTypes.SqlString object parameter. A System.Data.SqlTypes.SqlString object.

op__GreaterThan
[C#] public static SqlBoolean operator>(SqlInt16 x, SqlInt16 y);
[C++] public: static SqlBoolean op__GreaterThan(SqlInt16 x, SqlInt16 y);
[VB] returnValue=SqlInt16.op__GreaterThan(x, y)
[JScript] returnValue=x>y;
Description
Compares two instances of System.Data.SqlTypes.SqlInt16 to determine if the first is greater than the second.
Return Value: A System.Data.SqlTypes.SqlBoolean that is System.Data.SqlTypes.SqlBoolean.True if the first instance is greater than the second instance, otherwise System.Data.SqlTypes.SqlBoolean.False. If either instance of System.Data.SqlTypes.SqlInt16 is null, the System.Data.SqlTypes.SqlBoolean.Value of the System.Data.SqlTypes.SqlBoolean will be System.Data.SqlTypes.SqlBoolean.Null. A System.Data.SqlTypes.SqlInt16 structure. A System.Data.SqlTypes.SqlInt16 structure.

op__GreaterThanOrEqual
[C#] public static SqlBoolean operator >=(SqlInt16 x, SqlInt16 y);
[C++] public: static SqlBoolean op__GreaterThanOrEqual (SqlInt16 x, SqlInt16 y);
[VB] returnValue=SqlInt16.op__GreaterThanOrEqual(x, y)
[JScript] returnValue=x>=y;
Description
Compares two System.Data.SqlTypes.SqlInt16 structures to determine if the first is greater than or equal to the second.
Return Value: A System.Data.SqlTypes.SqlBoolean that is System.Data.SqlTypes.SqlBoolean.True if the first instance is greater than or equal to the second instance, otherwise System.Data.SqlTypes.SqlBoolean.False.
If either instance of System.Data.SqlTypes.SqlInt16 is null, the System.Data.SqlTypes.SqlBoolean.Value of the System.Data.SqlTypes.SqlBoolean will be System.Data.SqlTypes.SqlBoolean.Null. A System.Data.SqlTypes.SqlInt16 structure. A System.Data.SqlTypes.SqlInt16 structure.

op__Implicit
[C#] public static implicit operator SqlInt16(short x);
[C++] public: static SqlInt16 op__Implicit(short x);
[VB] returnValue=SqlInt16.op__Implicit(x)
[JScript] returnValue=x;
Description
Converts the supplied short integer to System.Data.SqlTypes.SqlInt16. A short integer value.

op__Implicit
[C#] public static implicit operator SqlInt16(SqlByte x);
[C++] public: static SqlInt16 op__Implicit(SqlByte x);
[VB] returnValue=SqlInt16.op__Implicit(x)
[JScript] returnValue=x;
Description
Converts the supplied System.Data.SqlTypes.SqlByte structure to System.Data.SqlTypes.SqlInt16

Return Value: A new System.Data.SqlTypes.SqlInt16 structure whose System.Data.SqlTypes.SqlInt16.Value property is equal to the System.Data.SqlTypes.SqlByte.Value property of the System.Data.SqlTypes.SqlByte parameter. A System.Data.SqlTypes.SqlByte structure.

op_Inequality

[C#] public static SqlBoolean operator !=(SqlInt16 x, SqlInt16 y);

[C++] public: static SqlBoolean op_Inequality(SqlInt16 x, SqlInt16 y);

[VB] returnValue=SqlInt16.op_Inequality(x, y)

[JScript] returnValue=x !=y;

Description

Performs a logical comparison of two System.Data.SqlTypes.SqlInt16 structures to determine if they are equal.

Return Value: A System.Data.SqlTypes.SqlBoolean that is System.Data.SqlTypes.SqlBoolean.True if the two instances are not equal or System.Data.SqlTypes.SqlBoolean.False if the two instances are equal. If either instance of System.Data.SqlTypes.SqlInt16 is null, the System.Data.SqlTypes.SqlBoolean.Value of the System.Data.SqlTypes.SqlBoolean will be System.Data.SqlTypes.SqlBoolean.Null A System.Data.SqlTypes.SqlInt16 structure. A System.Data.SqlTypes.SqlInt16 structure.

op_LessThan

[C#] public static SqlBoolean operator

[C++] public: static SqlBoolean op_LessThan(SqlInt16 x, SqlInt16 y);

[VB] returnValue=SqlInt16.op_LessThan(x, y)

[JScript] returnValue=x<y;

Description

Compares two instances of System.Data.SqlTypes.SqlInt16 to determine if the first is less than the second.

Return Value: A System.Data.SqlTypes.SqlBoolean that is System.Data.SqlTypes.SqlBoolean.True if the first instance is less than the second instance, otherwise System.Data.SqlTypes.SqlBoolean.False. If either instance of System.Data.SqlTypes.SqlInt16 is null, the System.Data.SqlTypes.SqlBoolean.Value of the System.Data.SqlTypes.SqlBoolean will be System.Data.SqlTypes.SqlBoolean.Null. A System.Data.SqlTypes.SqlInt16 structure. A System.Data.SqlTypes.SqlInt16 structure.

op_LessThanOrEqual

[C#] public static SqlBoolean operator<=(SqlInt16 x, SqlInt16 y);

[C++] public: static SqlBoolean op_LessThanOrEqual(SqlInt16 x, SqlInt16 y);

[VB] returnValue=SqlInt16.op_LessThanOrEqual(x, y)

[JScript] returnValue=x<=y;

Description

Compares two System.Data.SqlTypes.SqlInt16 structures to determine if the first is less than or equal to the second.

Return Value: A System.Data.SqlTypes.SqlBoolean that is System.Data.SqlTypes.SqlBoolean.True if the first instance is less than or equal to the second instance, otherwise System.Data.SqlTypes.SqlBoolean.False. If either instance of System.Data.SqlTypes.SqlInt16 is null, the System.Data.SqlTypes.SqlBoolean.Value of the System.Data.SqlTypes.SqlBoolean will be System.Data.SqlTypes.SqlBoolean.Null. A System.Data.SqlTypes.SqlInt16 structure. A System.Data.SqlTypes.SqlInt16 structure.

op_Modulus

[C#] public static SqlInt16 operator %(SqlInt16 x, SqlInt16 y);

[C++] public: static SqlInt16 op_Modulus(SqlInt16 x, SqlInt16 y);

[VB] returnValue=SqlInt16.op_Modulus(x, y)

[JScript] returnValue=x. % y;

Description

The modulus operator computes the remainder after dividing its first System.Data.SqlTypes.SqlInt16 operand by its second.

Return Value: A System.Data.SqlTypes.SqlInt16 structure whose System.Data.SqlTypes.SqlInt16.Value contains the remainder. A System.Data.SqlTypes.SqlInt16 structure. A System.Data.SqlTypes.SqlInt16 structure.

op_Multiply

[C#] public static SqlInt16 operator *(SqlInt16 x, SqlInt16 y);

[C++] public: static SqlInt16 op_Multiply(SqlInt16 x, SqlInt16 y);

[VB] returnValue=SqlInt16.op_Multiply(x, y)

[JScript] returnValue=x*y;

Description

The multiplication operator computes the product of the two System.Data.SqlTypes.SqlInt16 parameters.

Return Value: A System.Data.SqlTypes.SqlInt16 structure whose System.Data.SqlTypes.SqlInt16.Value contains the product of the two parameters. A System.Data.SqlTypes.SqlInt16 structure. A System.Data.SqlTypes.SqlInt16 structure.

op_OnesComplement

[C#] public static SqlInt16 operator ~(SqlInt16 x);

[C++] public: static SqlInt16 op_OnesComplement (SqlInt16 x);

[VB] returnValue=SqlInt16.op_OnesComplement(x)

[JScript] returnValue=~x;

Description

The ~operator performs a bitwise one's complement operation on its System.Data.SqlTypes.SqlByte operand. A System.Data.SqlTypes.SqlInt16 structure.

op_Subtraction

[C#] public static SqlInt16 operator–(SqlInt16 x, SqlInt16 y);

[C++] public: static SqlInt16 op_Subtraction(SqlInt16 x, SqlInt16 y);

[VB] returnValue=SqlInt16.op_Subtraction(x, y)

[JScript] returnValue=x–y;

Description

Subtracts the second System.Data.SqlTypes.SqlInt16 parameter from the first.

Return Value: A System.Data.SqlTypes.SqlInt16 structure whose System.Data.SqlTypes.SqlInt16.Value property contains the results of the subtraction. A System.Data.SqlTypes.SqlInt16 structure. A System.Data.SqlTypes.SqlInt16 structure.

op_UnaryNegation

[C#] public static SqlInt16 operator–(SqlInt16 x);

[C++] public: static SqlInt16 op_UnaryNegation(SqlInt16 x);

[VB] returnValue=SqlInt16.op_UnaryNegation(x)

[JScript] returnValue=–x;

Description

The unary minus operator negates the System.Data.SqlTypes.SqlInt16.Value of the System.Data.SqlTypes.SqlInt16 operand. A System.Data.SqlTypes.SqlInt16 structure.

Parse

[C#] public static SqlInt16 Parse(string s);

[C++] public: static SqlInt16 Parse(String* s);

[VB] Public Shared Function Parse(ByVal s As String) As SqlInt16

[JScript] public static function Parse(s: String): SqlInt16;

Description
[.][.]
Subtract
[C#] public static SqlInt16 Subtract(SqlInt16 x, SqlInt16 y);
[C++] public: static SqlInt16 Substrate(SqlInt16 x, SqlInt16 y);
[VB] Public Shared Function Subtract(ByVal x As SqlInt16, ByVal y As SqlInt16) As SqlInt16
[JScript] public static function Subtract(x: SqlInt16, y: SqlInt16): SqlInt16;
Description
[.]
ToSqlBoolean
[C#] public SqlBoolean ToSqlBoolean( );
[C++] public: SqlBoolean ToSqlBoolean( );
[VB] Public Function ToSqlBoolean( ) As SqlBoolean
[JScript] public function ToSqlBoolean( ): SqlBoolean;
Description
[.]
ToSqlByte
[C#] public SqlByte ToSqlByte( );
[C++] public: SqlByte ToSqlByte( );
[VB] Public Function ToSqlByte( ) As SqlByte
[JScript] public function ToSqlByte( ): SqlByte;
Description
[.]
ToSqlDecimal
[C#] public SqlDecimal ToSqlDecimal( );
[C++] public: SqlDecimal ToSqlDecimal( );
[VB] Public Function ToSqlDecimal( ) As SqlDecimal
[JScript] public function ToSqlDecimal( ): SqlDecimal;
Description
[.]
ToSqlDouble
[C#] public SqlDouble ToSqlDouble( );
[C++] public: SqlDouble ToSqlDouble( );
[VB] Public Function ToSqlDouble( ) As SqlDouble
[JScript] public function ToSqlDouble( ): SqlDouble;
Description
[.]
ToSqlInt32
[C#] public SqlInt32 ToSqlInt32( );
[C++] public: SqlInt32 ToSqlInt32( );
[VB] Public Function ToSqlInt32( ) As SqlInt32
[JScript] public function ToSqlInt32( ): SqlInt32;
Description
[.]
ToSqlInt64
[C#] public SqlInt64 ToSqlInt64( );
[C++] public: SqlInt64 ToSqlInt64( );
[VB] Public Function ToSqlInt64( ) As SqlInt64
[JScript] public function ToSqlInt64( ): SqlInt64;
Description
[.]
ToSqlMoney
[C#] public SqlMoney ToSqlMoney( );
[C++] public: SqlMoney ToSqlMoney( );
[VB] Public Function ToSqlMoney( ) As SqlMoney
[JScript] public function ToSqlMoney( ): SqlMoney;
Description
[.]
ToSqlSingle
[C#] public SqlSingle ToSqlSingle( );
[C++] public: SqlSingle ToSqlSingle( );
[VB] Public Function ToSqlSingle( ) As SqlSingle
[JScript] public function ToSqlSingle( ): SqlSingle;

Description
[.]
ToSqlString
[C#] public SqlString ToSqlString( );
[C++] public: SqlString ToSqlString( );
[VB] Public Function ToSqlString( ) As SqlString
[JScript] public function ToSqlString( ): SqlString;
Description
ToString
[C#] public override string ToString( );
[C++] public: String* ToString( );
[VB] Overrides Public Function ToString( ) As String
[JScript] public override function ToString( ): String; Converts a System.Data.SqlTypes.SqlInt16 structure to System.String.
Description
Converts a System.Data.SqlTypes.SqlInt16 structure to System.String.
Return Value: A System.String object representing the System.Data.SqlTypes.SqlInt16.Value of this instance of System.Data.SqlTypes.SqlInt16.
Xor
[C#] public static SqlInt16 X or(SqlInt16 x, SqlInt16 y);
[C++] public: static SqlInt16 X or(SqlInt16 x, SqlInt16 y);
[VB] Public Shared Function Xor(ByVal x As SqlInt16, ByVal y As SqlInt16) As SqlInt16
[JScript] public static function Xor(x: SqlInt16, y: SqlInt16): SqlInt16;
Description
[.]
SqlInt32 structure (System.Data.SqlTypes)
Xor
Description
Represents a 32-bit signed integer to be stored in or retrieved from a database.
Xor
[C#] public static readonly SqlInt32 MaxValue;
[C++] public: static SqlInt32 MaxValue;
[VB] Public Shared ReadOnly MaxValue As SqlInt32
[JScript] public static var MaxValue: SqlInt32;
Description
A constant representing the largest possible value of a System.Data.SqlTypes.SqlInt32.
The value for this constant is 2,147,483,647.
Xor
[C#] public static readonly SqlInt32 MinValue;
[C++] public: static SqlInt32 MinValue;
[VB] Public Shared ReadOnly MinValue As SqlInt32
[JScript] public static var MinValue: SqlInt32;
Description
A constant representing the smallest possible value of a System.Data.SqlTypes.SqlInt32.
The value of this constant is −2,147,483,648.
Xor
[C#] public static readonly SqlInt32 Null;
[C++] public: static SqlInt32 Null;
[VB] Public Shared ReadOnly Null As SqlInt32
[JScript] public static var Null: SqlInt32;
Description
Represents a null value that can be assigned to the System.Data.SqlTypes.SqlInt32.Value property of an instance of the System.Data.SqlTypes.SqlInt32 structure.
System.Data.SqlTypes.SqlInt32.Null functions as a constant for the System.Data.SqlTypes.SqlInt32 structure.
Xor
[C#] public static readonly SqlInt32 Zero;
[C++] public: static SqlInt32 Zero;
[VB] Public Shared ReadOnly Zero As SqlInt32

[JScript] public static var Zero: SqlInt32;
Description
Represents a zero value that can be assigned to the System.Data.SqlTypes.SqlInt32.Value property of an instance of the System.Data.SqlTypes.SqlInt32 structure.
The System.Data.SqlTypes.SqlInt32.Zero field is a constant for the System.Data.SqlTypes.SqlInt32 structure.
SqlInt32
Example Syntax:
Xor
[C#] public SqlInt32(int value);
[C++] public: SqlInt32(int value);
[VB] Public Sub New(ByVal value As Integer)
[JScript] public function SqlInt32(value: int);
Description
Initializes a new instance of the System.Data.SqlTypes.SqlInt32 structure using the supplied integer value.
IsNull
[C#] public bool IsNull {get;}
[C++] public: __property bool get_IsNull( );
[VB] Public ReadOnly Property IsNull As Boolean
[JScript] public function get IsNull( ): Boolean;
Description
Indicates whether or not System.Data.SqlTypes.SqlInt32.Value is null.
Value
Xor
[C#] public int Value {get;}
[C++] public: __property int get_Value( );
[VB] Public ReadOnly Property Value As Integer
[JScript] public function get Value( ): int;
Description
Gets the value of this System.Data.SqlTypes.SqlInt32 structure. This property is read-only.
Add
[C#] public static SqlInt32 Add(SqlInt32 x, SqlInt32 y);
[C++] public: static SqlInt32 Add(SqlInt32 x, SqlInt32 y);
[VB] Public Shared Function Add(ByVal x As SqlInt32, ByVal y As SqlInt32) As SqlInt32
[JScript] public static function Add(x: SqlInt32, y: SqlInt32): SqlInt32;
Description
[ . ]
BitwiseAnd
[C#] public static SqlInt32 BitwiseAnd(SqlInt32 x, SqlInt32 y);
[C++] public: static SqlInt32 BitwiseAnd(SqlInt32 x, SqlInt32 y);
[VB] Public Shared Function BitwiseAnd(ByVal x As SqlInt32, ByVal y As SqlInt32) As SqlInt32
[JScript] public static function BitwiseAnd(x: SqlInt32, y: SqlInt32): SqlInt32;
Description
[ . ]
BitwiseOr
[C#] public static SqlInt32 BitwiseOr(SqlInt32 x, SqlInt32 y);
[C++] public: static SqlInt32 BitwiseOr(SqlInt32 x, SqlInt32 y);
[VB] Public Shared Function BitwiseOr(ByVal x As SqlInt32, ByVal y As SqlInt32) As SqlInt32
[JScript] public static function BitwiseOr(x: SqlInt32, y: SqlInt32): SqlInt32;
Description
[ . ]
CompareTo
[C#] public int CompareTo(object value);
[C++] public: __sealed int CompareTo(Object* value);
[VB] NotOverridable Public Function CompareTo(ByVal value As Object) As Integer
[JScript] public function CompareTo(value: Object): int;
Description
Compares this instance to the supplied object and returns an indication of their relative values.
Return Value: A signed number indicating the relative values of the instance and the object. The object to be compared.
Divide
[C#] public static SqlInt32 Divide(SqlInt32 x, SqlInt32 y);
[C++] public: static SqlInt32 Divide(SqlInt32 x, SqlInt32 y);
[VB] Public Shared Function Divide(ByVal x As SqlInt32, ByVal y As SqlInt32) As SqlInt32
[JScript] public static function Divide(x: SqlInt32, y: SqlInt32): SqlInt32;
Description
[ . ]
Equals
[C#] public override bool Equals(object value);
[C++] public: bool Equals(Object* value);
[VB] Overrides Public Function Equals(ByVal value As Object) As Boolean
[JScript] public override function Equals(value: Object): Boolean;
Description
Compares the supplied object parameter to the System.Data.SqlTypes.SqlInt32.Value property of the System.Data.SqlTypes.SqlInt32 object.
Return Value: true if object is an instance of System.Data.SqlTypes.SqlInt32 and the two are equal; otherwise false. The object to be compared.
Equals
[C#] public static new SqlBoolean Equals(SqlInt32 x, SqlInt32 y);
[C++] public: static SqlBoolean Equals(SqlInt32 x, SqlInt32 y);
[VB] Shadows Public Shared Function Equals(ByVal x As SqlInt32, ByVal y As SqlInt32) As SqlBoolean
[JScript] public static hide function Equals(x: SqlInt32, y: SqlInt32) SqlBoolean;
Description
[ . ]
GetHashCode
[C#] public override int GetHashCode( );
[C++] public: int GetHashCode( );
[VB] Overrides Public Function GetHashCode( ) As Integer
[JScript] public override function GetHashCode( ): int;
Description
Returns the hash code for this instance.
Return Value: A 32-bit signed integer hash code.
GreaterThan
[C#] public static SqlBoolean GreaterThan(SqlInt32 x, SqlInt32 y);
[C++] public: static SqlBoolean GreaterThan(SqlInt32 x, SqlInt32 y);
[VB] Public Shared Function GreaterThan(ByVal x As SqlInt32, ByVal y As SqlInt32) As SqlBoolean
[JScript] public static function GreaterThan(x: SqlInt32, y: SqlInt32): SqlBoolean;
Description
[ . ]
GreaterThanOrEqual
[C#] public static SqlBoolean GreaterThanOrEqual (SqlInt32 x, SqlInt32 y);
[C++] public: static SqlBoolean GreaterThanOrEqual (SqlInt32 x, SqlInt32 y);

[VB] Public Shared Function GreaterThanOrEqual(ByVal x As SqlInt32, ByVal y As SqlInt32) As SqlBoolean
[JScript] public static function GreaterThanOrEqual(x: SqlInt32, y: SqlInt32) SqlBoolean;
Description
[ . ]
LessThan
[C#] public static SqlBoolean LessThan(SqlInt32 x, SqlInt32 y);
[C++] public: static SqlBoolean LessThan(SqlInt32 x, SqlInt32 y);
[VB] Public Shared Function LessThan(ByVal x As SqlInt32, ByVal y As SqlInt32) As SqlBoolean
[JScript] public static function LessThan(x: SqlInt32, y: SqlInt32): SqlBoolean;
Description
[ . ]
LessThanOrEqual
[C#] public static SqlBoolean LessThanOrEqual(SqlInt32 x, SqlInt32 y);
[C++] public: static SqlBoolean LessThanOrEqual(SqlInt32 x, SqlInt32 y);
[VB] Public Shared Function LessThanOrEqual(ByVal x As SqlInt32, ByVal y As SqlInt32) As SqlBoolean
[JScript] public static function LessThanOrEqual(x: SqlInt32, y: SqlInt32) SqlBoolean;
Description
[ . ]
Mod
[C#] public static SqlInt32 Mod(SqlInt32 x, SqlInt32 y);
[C++] public: static SqlInt32 Mod(SqlInt32 x, SqlInt32 y);
[VB] Public Shared Function Mod(ByVal x As SqlInt32, ByVal y As SqlInt32) As SqlInt32
[JScript] public static function Mod(x: SqlInt32, y: SqlInt32): SqlInt32;
Description
[ . ]
Multiply
[C#] public static SqlInt32 Multiply(SqlInt32 x, SqlInt32 y);
[C++] public: static SqlInt32 Multiply(SqlInt32 x, SqlInt32 y);
[VB] Public Shared Function Multiply(ByVal x As SqlInt32, ByVal y As SqlInt32) As SqlInt32
[JScript] public static function Multiply(x: SqlInt32, y: SqlInt32): SqlInt32;
Description
[ . ]
NotEquals
[C#] public static SqlBoolean NotEquals(SqlInt32 x, SqlInt32 y);
[C++] public: static SqlBoolean NotEquals(SqlInt32 x, SqlInt32 y);
[VB] Public Shared Function NotEquals(ByVal x As SqlInt32, ByVal y As SqlInt32) As SqlBoolean
[JScript] public static function NotEquals(x: SqlInt32, y: SqlInt32): SqlBoolean;
Description
OnesComplement
[C#] public static SqlInt32 OnesComplement(SqlInt32 x);
[C++] public: static SqlInt32 OnesComplement(SqlInt32 x);
[VB] Public Shared Function OnesComplement(ByVal x As SqlInt32) As SqlInt32
[JScript] public static function OnesComplement(x: SqlInt32): SqlInt32;
Description
[ . ]
op_Addition

[C#] public static SqlInt32 operator +(SqlInt32 x, SqlInt32 y);
[C++] public: static SqlInt32 op_Addition(SqlInt32 x, SqlInt32 y);
[VB] returnValue=SqlInt32.op_Addition(x, y)
[JScript] returnValue=x+y;
Description
  The addition operator computes the sum of the two System.Data.SqlTypes.SqlInt32 operands.
Return Value: A System.Data.SqlTypes.SqlInt32 structure whose System.Data.SqlTypes.SqlInt32.Value property contains the sum of the two System.Data.SqlTypes.SqlInt32 operands. A System.Data.SqlTypes.SqlInt32 structure. A System.Data.SqlTypes.SqlInt32 structure.
  op_BitwiseAnd
[C#] public static SqlInt32 operator &(SqlInt32 x, SqlInt32 y);
[C++] public: static SqlInt32 op_BitwiseAnd(SqlInt32 x, SqlInt32 y);
[VB] returnValue=SqlInt32.op_BitwiseAnd(x, y)
[JScript] returnValue=x & y;
Description
  Computes the bitwise AND of its System.Data.SqlTypes.SqlInt32 operands. A System.Data.SqlTypes.SqlInt32 structure. A System.Data.SqlTypes.SqlInt32 structure.
  op_BitwiseOr
[C#] public static SqlInt32 operator |(SqlInt32 x, SqlInt32 y);
[C++] public: static SqlInt32 op_BitwiseOr(SqlInt32 x, SqlInt32 y);
[VB] returnValue=SqlInt32.op_BitwiseOr(x, y)
[JScript] returnValue=x|y;
Description
  Computes the bitwise OR of its two System.Data.SqlTypes.SqlInt32 operands. A System.Data.SqlTypes.SqlInt32 structure. A System.Data.SqlTypes.SqlInt32 structure.
  op_Division
[C#] public static SqlInt32 operator/(SqlInt32 x, SqlInt32 y);
[C++] public: static SqlInt32 op_Division(SqlInt32 x, SqlInt32 y);
[VB] returnValue=SqlInt32.op_Division(x, y)
[JScript] returnValue=x/y;
Description
  The division operator divides the first System.Data.SqlTypes.SqlInt32 parameter from the second.
Return Value: A System.Data.SqlTypes.SqlInt32 whose System.Data.SqlTypes.SqlInt32.Value property contains the results of the division. A System.Data.SqlTypes.SqlInt32 structure. A System.Data.SqlTypes.SqlInt32 structure.
  op_Equality
[C#] public static SqlBoolean operator==(SqlInt32 x, SqlInt32 y);
[C++] public: static SqlBoolean op_Equality(SqlInt32 x, SqlInt32 y);
[VB] returnValue=SqlInt32.op_Equality(x, y)
[JScript] returnValue=x==y;
Description
  Performs a logical comparison of the two System.Data.SqlTypes.SqlInt32 parameters to determine if they are equal.
Return Value: A System.Data.SqlTypes.SqlBoolean that is System.Data.SqlTypes.SqlBoolean.True if the two instances are equal or System.Data.SqlTypes.SqlBoolean.False if the two instances are not equal. If either instance of System.Data.SqlTypes.SqlInt32 is null, the System.Data.SqlTypes.SqlBoolean.Value of the System.Data.SqlTypes.SqlBoolean will be System.Data.SqlTypes.SqlBoolean.Null. A System.Data.SqlTypes.SqlInt32 structure. A System.Data.SqlTypes.SqlInt32 structure.

op_ExclusiveOr

[C#] public static SqlInt32 operator ^(SqlInt32 x, SqlInt32 y);
[C++] public: static SqlInt32 op_ExclusiveOr(SqlInt32 x, SqlInt32 y);
[VB] returnValue=SqlInt32.op_ExclusiveOr(x, y)
[JScript] returnValue=^y;
Description Performs a bitwise exclusive-OR operation on the supplied parameters. A System.Data.SqlTypes.SqlInt32 structure. A System.Data.SqlTypes.SqlInt32 structure.

op_Explicit

[C#] public static explicit operator SqlInt32(SqlBoolean x);
[C++] public: static SqlInt32 op_Explicit(SqlBoolean x);
[VB] returnValue=SqlInt32.op_Explicit(x)
[JScript] returnValue=SqlInt32(x);
Description Converts the supplied System.Data.SqlTypes.SqlBit to System.Data.SqlTypes.SqlInt32
Return Value: A new System.Data.SqlTypes.SqlInt32 structure whose System.Data.SqlTypes.SqlInt32.Value property is equal to the System.Data.SqlTypes.SqlBit.ByteValue property of the System.Data.SqlTypes.SqlBit parameter. A System.Data.SqlTypes.SqlBit structure.

op_Explicit

[C#] public static explicit operator SqlInt32(SqlDecimal x);
[C++] public: static SqlInt32 op_Explicit(SqlDecimal x);
[VB] returnValue=SqlInt32.op_Explicit(x)
[JScript] returnValue=SqlInt32(x);
Description Converts the supplied System.Data.SqlTypes.SqlDecimal structure to System.Data.SqlTypes.SqlInt32
Return Value: A new System.Data.SqlTypes.SqlInt32 structure whose System.Data.SqlTypes.SqlInt32.Value property equals the System.Data.SqlTypes.SqlDecimal.Value property of the System.Data.SqlTypes.SqlDecimal parameter. A System.Data.SqlTypes.SqlDecimal structure.

op_Explicit

[C#] public static explicit operator SqlInt32(SqlDouble x);
[C++] public: static SqlInt32 op_Explicit(SqlDouble x);
[VB] returnValue=SqlInt32.op_Explicit(x)
[JScript] returnValue=SqlInt32(x);
Description Converts the supplied System.Data.SqlTypes.SqlDouble to System.Data.SqlTypes.SqlInt32
Return Value: A new System.Data.SqlTypes.SqlInt32 structure whose System.Data.SqlTypes.SqlInt32.Value property equals the integer portion of the System.Data.SqlTypes.SqlDouble parameter. A System.Data.SqlTypes.SqlDouble structure.

op_Explicit

[C#] public static explicit operator int(SqlInt32 x);
[C++] public: static int op_Explicit( );
[VB] returnValue=SqlInt32.op_Explicit(x)
[JScript] returnValue=Int32(x);
Description Converts the supplied System.Data.SqlTypes.SqlInt32 structure to an integer. A System.Data.SqlTypes.SqlInt32 structure.

op_Explicit

[C#] public static explicit operator SqlInt32(SqlInt64 x);
[C++] public: static SqlInt32 op_Explicit(SqlInt64 x);
[VB] returnValue=SqlInt32.op_Explicit(x)
[JScript] returnValue=SqlInt32(x);
Description Converts the supplied System.Data.SqlTypes.SqlInt64 to System.Data.SqlTypes.SqlInt32
Return Value: A new System.Data.SqlTypes.SqlInt32 structure whose System.Data.SqlTypes.SqlInt32.Value property equals the System.Data.SqlTypes.SqlInt64.Value property of the System.Data.SqlTypes.SqlInt64 parameter. A System.Data.SqlTypes.SqlInt64 structure.

op_Explicit

[C#] public static explicit operator SqlInt32(SqlMoney x);
[C++] public: static SqlInt32 op_Explicit(SqlMoney x),
[VB] returnValue=SqlInt32.op_Explicit(x)
[JScript] returnValue=SqlInt32(x);
Description Converts the supplied System.Data.SqlTypes.SqlMoney structure to System.Data.SqlTypes.SqlInt32
Return Value: A new System.Data.SqlTypes.SqlInt32 structure whose System.Data.SqlTypes.SqlInt32.Value property equals the System.Data.SqlTypes.SqlMoney.Value property of the System.Data.SqlTypes.SqlMoney parameter. A System.Data.SqlTypes.SqlMoney structure.

op_Explicit

[C#] public static explicit operator SqlInt32(SqlSingle x);
[C++] public: static SqlInt32 op_Explicit(SqlSingle x);
[VB] returnValue=SqlInt32.op_Explicit(x)
[JScript] returnValue=SqlInt32(x);
Description Converts the supplied System.Data.SqlTypes.SqlSingle to System.Data.SqlTypes.SqlInt32
Return Value: A new System.Data.SqlTypes.SqlInt32 structure whose System.Data.SqlTypes.SqlInt32.Value property equals the integer portion of the System.Data.SqlTypes.SqlSingle parameter. A System.Data.SqlTypes.SqlSingle structure.

op_Explicit

[C#] public static explicit operator SqlInt32(SqlString x);
[C++] public: static SqlInt32 op_Explicit(SqlString x);
[VB] returnValue=SqlInt32.op_Explicit(x)
[JScript] returnValue=SqlInt32(x);
Description Converts the supplied System.Data.SqlTypes.SqlString object to System.Data.SqlTypes.SqlInt32
Return Value: A new System.Data.SqlTypes.SqlInt32 structure whose System.Data.SqlTypes.SqlInt32.Value property equals the value represented by the System.Data.SqlTypes.SqlString parameter. A System.Data.SqlTypes.SqlString object.

op_GreaterThan

[C+] public static SqlBoolean operator>(SqlInt32 x, SqlInt32 y);
[C++] public: static SqlBoolean op_GreaterThan(SqlInt32 x, SqlInt32 y);
[VB] returnValue=SqlInt32.op_GreaterThan(x, y)
[JScript] returnValue=x>y;
Description Compares the two System.Data.SqlTypes.SqlInt32 parameters to determine if the first is greater than the second.
Return Value: A System.Data.SqlTypes.SqlBoolean that is System.Data.SqlTypes.SqlBoolean.True if the first instance is greater than the second instance, otherwise System.Data.SqlTypes.SqlBoolean.False. If either instance of System.Data.SqlTypes.SqlInt32 is null, the System.Data.SqlTypes.SqlBoolean.Value of the System.Data.SqlTypes.SqlBoolean will be System.Data.SqlTypes.SqlBoolean.Null. A System.Data.SqlTypes.SqlInt32 structure. A System.Data.SqlTypes.SqlInt32 structure.

op_GreaterThanOrEqual

[C#] public static SqlBoolean operator>=(SqlInt32 x, SqlInt32 y);
[C++] public: static SqlBoolean op_GreaterThanOrEqual (SqlInt32 x, SqlInt32 y);
[VB] returnValue=SqlInt32.op_GreaterThanOrEqual(x, y)
[JScript] returnValue=x>=y;
Description
Compares the two System.Data.SqlTypes.SqlInt32 parameters to determine if the first is greater than or equal to the second.
Return Value: A System.Data.SqlTypes.SqlBoolean that is System.Data.SqlTypes.SqlBoolean.True if the first instance is greater than or equal to the second instance, otherwise System.Data.SqlTypes.SqlBoolean.False. If either instance of System.Data.SqlTypes.SqlInt32 is null, the System.Data.SqlTypes.SqlBoolean.Value of the System.Data.SqlTypes.SqlBoolean will be System.Data.SqlTypes.SqlBoolean.Null. A System.Data.SqlTypes.SqlInt32 structure. A System.Data.SqlTypes.SqlInt32 structure.
 op_Implicit
[C#] public static implicit operator SqlInt32(int x);
[C++] public: static SqlInt32 op_Implicit(int x);
[VB] returnValue=SqlInt32.op_Implicit(x)
[JScript] returnValue=x;
Description
Converts the supplied integer to System.Data.SqlTypes.SqlInt32
Return Value: A new System.Data.SqlTypes.SqlInt32 structure whose Value property is equal to the integer parameter. An integer value.
 op_Implicit
[C#] public static implicit operator SqlInt32(SqlByte x);
[C++] public: static SqlInt32 op_Implicit(SqlByte x);
[VB] returnValue=SqlInt32.op_Implicit(x)
[JScript] returnValue=x;
Description
Converts the supplied System.Data.SqlTypes.SqlByte property to System.Data.SqlTypes.SqlInt32
Return Value: A new System.Data.SqlTypes.SqlInt32 structure whose System.Data.SqlTypes.SqlInt32.Value property equals the System.Data.SqlTypes.SqlByte.Value property of the System.Data.SqlTypes.SqlByte parameter. A System.Data.SqlTypes.SqlByte structure.
 op_Implicit
[C#] public static implicit operator SqlInt32(SqlInt16 x);
[C++] public: static SqlInt32 op_Implicit(SqlInt16 x);
[VB] returnValue=SqlInt32.op_Implicit(x)
[JScript] returnValue=x;
Description
Converts the supplied System.Data.SqlTypes.SqlInt16 to System.Data.SqlTypes.SqlInt=b 32
Return Value: A new System.Data.SqlTypes.SqlInt32 structure whose System.Data.SqlTypes.SqlInt32.Value property equals the System.Data.SqlTypes.SqlInt16.Value property of the System.Data.SqlTypes.SqlInt16 parameter. A System.Data.SqlTypes.SqlInt16 structure.
 op_Inequality
[C#] public static SqlBoolean operator !=(SqlInt32 x, SqlInt32 y);
[C++] public: static SqlBoolean op_Inequality(SqlInt32 x, SqlInt32 y);
[VB] returnValue=SqlInt32.op_Inequality(x, y)
[JScript] returnValue=x !=y;
Description
Performs a logical comparison of the two System.Data.SqlTypes.SqlInt32 parameters to determine if they are equal.
Return Value: A System.Data.SqlTypes.SqlBoolean that is System.Data.SqlTypes.SqlBoolean.True if the two instances are not equal or System.Data.SqlTypes.SqlBoolean.False if the two instances are equal. If either instance of System.Data.SqlTypes.SqlInt32 is null, the System.Data.SqlTypes.SqlBoolean.Value of the System.Data.SqlTypes.SqlBoolean will be System.Data.SqlTypes.SqlBoolean.Null. A System.Data.SqlTypes.SqlInt32 structure. A System.Data.SqlTypes.SqlInt32 structure.
 op_LessThan
[C#] public static SqlBoolean operator
[C++] public: static SqlBoolean op_LessThan(SqlInt32 x, SqlInt32 y);
[VB] returnValue=SqlInt32.op_LessThan(x, y)
[JScript] returnValue=x<y;
Description
Compares the two System.Data.SqlTypes.SqlInt32 parameters to determine if the first is less than the second.
Return Value: A System.Data.SqlTypes.SqlBoolean that is System.Data.SqlTypes.SqlBoolean.True if the first instance is less than the second instance, otherwise System.Data.SqlTypes.SqlBoolean.False. If either instance of System.Data.SqlTypes.SqlInt32 is null, the System.Data.SqlTypes.SqlBoolean.Value of the System.Data.SqlTypes.SqlBoolean will be System.Data.SqlTypes.SqlBoolean.Null. A System.Data.SqlTypes.SqlInt32 structure. A System.Data.SqlTypes.SqlInt32 structure.
 op_LessThanOrEqual
[C#] public static SqlBoolean operator <=(SqlInt32 x, SqlInt32 y);
[C++] public: static SqlBoolean op_LessThanOrEqual (SqlInt32 x, SqlInt32 y);
[VB] returnValue=SqlInt32.op_LessThanOrEqual(x, y)
[JScript] returnValue=x<=y;
Description
Compares the two System.Data.SqlTypes.SqlInt32 parameters to determine if the first is less than or equal to the second.
Return Value: A System.Data.SqlTypes.SqlBoolean that is System.Data.SqlTypes.SqlBoolean.True if the first instance is less than or equal to the second instance, otherwise System.Data.SqlTypes.SqlBoolean.False. If either instance of System.Data.SqlTypes.SqlInt32 is null, the System.Data.SqlTypes.SqlBoolean.Value of the System.Data.SqlTypes.SqlBoolean will be System.Data.SqlTypes.SqlBoolean.Null. A System.Data.SqlTypes.SqlInt32 structure. A System.Data.SqlTypes.SqlInt32 structure.
 op_Modulus
[C#] public static SqlInt32 operator %(SqlInt32 x, SqlInt32 y);
[C++] public: static SqlInt32 op_Modulus(SqlInt32 x, SqlInt32 y);
[VB] returnValue=SqlInt32.op_Modulus(x, y)
[JScript] returnValue=x % y;
Description
The modulus operator computes the remainder after dividing the first System.Data.SqlTypes.SqlInt32 parameter by the second.
Return Value: A System.Data.SqlTypes.SqlInt32 structure whose System.Data.SqlTypes.SqlInt32.Value contains the remainder. A System.Data.SqlTypes.SqlInt32 structure. A System.Data.SqlTypes.SqlInt32 structure.
 op_Multiply
[C#] public static SqlInt32 operator*(SqlInt32 x, SqlInt32 y);
[C++] public: static SqlInt32 op_Multiply(SqlInt32 x, SqlInt32 y);

[VB] returnValue=SqlInt32.op_Multiply(x, y)
[JScript] returnValue=x y;
Description
　　The multiplication operator computes the product of the two System.Data.SqlTypes.SqlInt32 parameters.
Return Value: A System.Data.SqlTypes.SqlInt32 structure whose System.Data.SqlTypes.SqlInt32.Value contains the product of the two parameters. A System.Data.SqlTypes.SqlInt32 structure. A System.Data.SqlTypes.SqlInt32 structure.
　　op_OnesComplement
[C#] public static SqlInt32 operator ~(SqlInt32 x);
[C++] public: static SqlInt32 op_OnesComplement (SqlInt32 x);
[VB] returnValue=SqlInt32.op_OnesComplement(x)
[JScript] returnValue=~x;
Description
　　The~operator performs a bitwise one's complement operation on its System.Data.SqlTypes.SqlInt32 operand. A System.Data.SqlTypes.SqlInt32 structure.
　　op_Subtraction
[C#] public static SqlInt32 operator-(SqlInt32 x, SqlInt32 y);
[C++] public: static SqlInt32 op_Subtraction(SqlInt32 x, SqlInt32 y);
[VB] returnValue=SqlInt32.op_Subtraction(x, y)
[JScript] returnValue=x-y;
Description
　　The subtraction operator subtracts the second System.Data.SqlTypes.SqlInt32 parameter from the first.
Return Value: A System.Data.SqlTypes.SqlInt32 structure whose System.Data.SqlTypes.SqlInt32.Value property contains the results of the subtraction. A System.Data.SqlTypes.SqlInt32 structure. A System.Data.SqlTypes.SqlInt32 structure.
　　op_UnaryNegation
[C#] public static SqlInt32 operator-(SqlInt32 x);
[C++] public: static SqlInt32 op_UnaryNegation(SqlInt32 x);
[VB] returnValue=SqlInt32.op_UnaryNegation(x)
[JScript] returnValue=-x;
Description
　　The unary minus operator negates the System.Data.SqlTypes.SqlInt32.Value of the System.Data.SqlTypes.SqlInt32 operand. A System.Data.SqlTypes.SqlInt32 structure.
　　Parse
[C#] public static SqlInt32 Parse(string s);
[C++] public: static SqlInt32 Parse(String* s);
[VB] Public Shared Function Parse(ByVal s As String) As SqlInt32
[JScript] public static function Parse(s: String): SqlInt32;
Description
　　[ . ] [ . ]
　　Subtract
[C#] public static SqlInt32 Subtract(SqlInt32 x, SqlInt32 y);
[C++] public: static SqlInt32 Subtract(SqlInt32 x, SqlInt32 y);
[VB] Public Shared Function Subtract(ByVal x As SqlInt32, ByVal y As SqlInt32) As SqlInt32
[JScript] public static function Subtract(x: SqlInt32, y: SqlInt32): SqlInt32;
Description
　　[ . ]
　　ToSqlBoolean
[C#] public SqlBoolean ToSqlBoolean( );
[C++] public: SqlBoolean ToSqlBoolean( );
[VB] Public Function ToSqlBoolean( ) As SqlBoolean
[JScript] public function ToSqlBoolean( ): SqlBoolean;
Description
　　[ . ]
　　ToSqlByte
[C#] public SqlByte ToSqlByte( );
[C++] public: SqlByte ToSqlByte( );
[VB] Public Function ToSqlByte( ) As SqlByte
[JScript] public function ToSqlByte( ): SqlByte;
Description
　　[ . ]
　　ToSqlDecimal
[C#] public SqlDecimal ToSqlDecimal( );
[C++] public: SqlDecimal ToSqlDecimal( );
[VB] Public Function ToSqlDecimal( ) As SqlDecimal
[JScript] public function ToSqlDecimal( ): SqlDecimal;
Description
　　[ . ]
　　ToSqlDouble
[C#] public SqlDouble ToSqlDouble( );
[C++] public: SqlDouble ToSqlDouble( );
[VB] Public Function ToSqlDouble( ) As SqlDouble
[JScript] public function ToSqlDouble( ): SqlDouble;
Description
　　[ . ]
　　ToSqlInt16
[C#] public SqlInt16 ToSqlInt16( );
[C++] public: SqlInt16 ToSqlInt16( );
[VB] Public Function ToSqlInt16( ) As SqlInt16
[JScript] public function ToSqlInt16( ): SqlInt16;
Description
　　[ . ]
　　ToSqlInt64
[C#] public SqlInt64 ToSqlInt64( );
[C++] public: SqlInt64 ToSqlInt64( );
[VB] Public Function ToSqlInt64( ) As SqlInt64
[JScript] public function ToSqlInt64( ): SqlInt64;
Description
　　[ . ]
　　ToSqlMoney
[C#] public SqlMoney ToSqlMoney( );
[C++] public: SqlMoney ToSqlMoney( );
[VB] Public Function ToSqlMoney( ) As SqlMoney
[JScript] public function ToSqlMoney( ): SqlMoney;
Description
　　[ . ]
　　ToSqlSingle
[C#] public SqlSingle ToSqlSingle( );
[C++] public: SqlSingle ToSqlSingle( );
[VB] Public Function ToSqlSingle( ) As SqlSingle
[JScript] public function ToSqlSingle( ): SqlSingle;
Description
　　[ . ]
　　ToSqlString
[C#] public SqlString ToSqlString( );
[C++] public: SqlString ToSqlString( );
[VB] Public Function ToSqlString( ) As SqlString
[JScript] public function ToSqlString( ): SqlString;
Description
　　[ . ]
　　ToString
[C#] public override string ToString( );
[C++] public: String* ToString( );
[VB] Overrides Public Function ToString( ) As String
[JScript] public override function ToString( ): String; Converts a System.Data.SqlTypes.SqlInt32 structure to a System.String.

Description
Converts a System.Data.SqlTypes.SqlInt32 structure to a System.String.
Xor
[C#] public static SqlInt32 Xor(SqlInt32 x, SqlInt32 y);
[C++] public: static SqlInt32 Xor(SqlInt32 x, SqlInt32 y);
[VB] Public Shared Function Xor(ByVal x As SqlInt32, ByVal y As SqlInt32) As SqlInt32
[JScript] public static function Xor(x: SqlInt32, y: SqlInt32): SqlInt32;
Description
[ . ]
SqlInt64 structure (System.Data.SqlTypes)
Xor
Description
Represents a 64-bit signed integer to be stored in or retrieved from a database.
Xor
[C#] public static readonly SqlInt64 MaxValue;
[C++] public: static SqlInt64 MaxValue;
[VB] Public Shared ReadOnly MaxValue As SqlInt64
[JScript] public static var MaxValue: SqlInt64;
Description
A constant representing the largest possible value for a System.Data.SqlTypes.SqlInt64 structure.
The value of this constant is 2 −1.
Xor
[C#] public static readonly SqlInt64 MinValue;
[C++] public: static SqlInt64 MinValue;
[VB] Public Shared ReadOnly MinValue As SqlInt64
[JScript] public static var MinValue: SqlInt64;
Description
A constant representing the smallest possible value for a System.Data.SqlTypes.SqlInt64 structure.
The value of this constant is −2.
Xor
[C#] public static readonly SqlInt64 Null;
[C++] public: static SqlInt64 Null;
[VB] Public Shared ReadOnly Null As SqlInt64
[JScript] public static var Null: SqlInt64;
Description
Represents a null value that can be assigned to the System.Data.SqlTypes.SqlInt64.Value property of an instance of the System.Data.SqlTypes.SqlInt64 structure. System.Data.SqlTypes.SqlInt64.Null functions as a constant for the System.Data.SqlTypes.SqlInt64 structure.
Xor
[C#] public static readonly SqlInt64 Zero;
[C++] public: static SqlInt64 Zero; io [VB] Public Shared ReadOnly Zero As SqlInt64
[JScript] public static var Zero: SqlInt64;
Description
Represents a zero value that can be assigned to the System.Data.SqlTypes.SqlInt64.Value property of an instance of the System.Data.SqlTypes.SqlInt64 structure. The System.Data.SqlTypes.SqlInt64.Zero field is a constant for the System.Data.SqlTypes.SqlInt64 structure.
SqlInt64
Example Syntax:
Xor
[C#] public SqlInt64(long value);
[C++] public: SqlInt64(__int64 value);
[VB] Public Sub New(ByVal value As Long)
[JScript] public function SqlInt64(value: long);
Description
Initializes a new instance of the System.Data.SqlTypes.SqlInt64 structure using the supplied long integer. A long integer.

IsNull
Xor
[C#] public bool IsNull {get;}
[C++] public: __property bool get__IsNull( );
[VB] Public ReadOnly Property IsNull As Boolean
[JScript] public function get IsNull( ): Boolean;
Description
Indicates whether or not System.Data.SqlTypes.SqlInt64.Value is null.
Value
Xor
[C#] public long Value {get;}
[C++] public: __property __int64 get__Value( );
[VB] Public ReadOnly Property Value As Long
[JScript] public function get Value( ): long;
Description
Gets the value of this System.Data.SqlTypes.SqlInt64 structure. This property is read-only.
Add
[C#] public static SqlInt64 Add(SqlInt64 x, SqlInt64 y);
[C++] public: static SqlInt64 Add(SqlInt64 x, SqlInt64 y);
[VB] Public Shared Function Add(ByVal x As SqlInt64, ByVal y As SqlInt64) As SqlInt64
[JScript] public static function Add(x: SqlInt64, y: SqlInt64): SqlInt64;
Description
[ . ]
BitwiseAnd
[C#] public static SqlInt64 BitwiseAnd(SqlInt64 x, SqlInt64 y);
[C++] public: static SqlInt64 BitwiseAnd(SqlInt64 x, SqlInt64 y);
[VB] Public Shared Function BitwiseAnd(ByVal x As SqlInt64, ByVal y As SqlInt64) As SqlInt64
[JScript] public static function BitwiseAnd(x: SqlInt64, y: SqlInt64): SqlInt64;
Description
BitwiseOr
[C#] public static SqlInt64 BitwiseOr(SqlInt64 x, SqlInt64 y);
[C++] public: static SqlInt64 BitwiseOr(SqlInt64 x, SqlInt64 y);
[VB] Public Shared Function BitwiseOr(ByVal x As SqlInt64, ByVal y As SqlInt64) As SqlInt64
[JScript] public static function BitwiseOr(x: SqlInt64, y: SqlInt64): SqlInt64;
Description
[ . ]
CompareTo
[C#] public int CompareTo(object value);
[C++] public: __sealed int CompareTo(Object* value);
[VB] NotOverridable Public Function CompareTo(ByVal value As Object) As Integer
[JScript] public function CompareTo(value: Object): int;
Description
Compares this instance to the supplied object and returns an indication of their relative values.
Return Value: A signed number indicating the relative values of the instance and the object. The object to be compared.
Divide
[C#] public static SqlInt64 Divide(SqlInt64 x, SqlInt64 y);
[C++] public: static SqlInt64 Divide(SqlInt64 x, SqlInt64 y);
[VB] Public Shared Function Divide(ByVal x As SqlInt64, ByVal y As SqlInt64) As SqlInt64
[JScript] public static function Divide(x: SqlInt64, y: SqlInt64): SqlInt64;

Description

[.]

Equals

[C#] public override bool Equals(object value);
[C++] public: bool Equals(Object* value);
[VB] Overrides Public Function Equals(ByVal value As Object) As Boolean
[JScript] public override function Equals(value: Object): Boolean;

Description

Compares the supplied object parameter to the System.Data.SqlTypes.SqlInt64.Value property of the System.Data.SqlTypes.SqlInt64 object.

Return Value: true if object is an instance of System.Data.SqlTypes.SqlInt64 and the two are equal; otherwise false. The object to be compared.

Equals

[C#] public static new SqlBoolean Equals(SqlInt64 x, SqlInt64 y);
[C++] public: static SqlBoolean Equals(SqlInt64 x, SqlInt64 y);
[VB] Shadows Public Shared Function Equals(ByVal x As SqlInt64, ByVal y As SqlInt64) As SqlBoolean
[JScript] public static hide function Equals(x: SqlInt64, y: SqlInt64): SqlBoolean;

Description

[.]

GetHashCode

[C#] public override int GetHashCode( );
[C++] public: int GetHashCode( );
[VB] Overrides Public Function GetHashCode( ) As Integer
[JScript] public override function GetHashCode( ): int;

Description

Returns the hash code for this instance.

Return Value: A 32-bit signed integer hash code.

GreaterThan

[C#] public static SqlBoolean GreaterThan(SqlInt64 x, SqlInt64 y);
[C++] public: static SqlBoolean GreaterThan(SqlInt64 x, SqlInt64 y);
[VB] Public Shared Function GreaterThan(ByVal x As SqlInt64, ByVal y As SqlInt64) As SqlBoolean
[JScript] public static function GreaterThan(x: SqlInt64, y: SqlInt64): SqlBoolean;

Description

[.]

GreaterThanOrEqual

[C#] public static SqlBoolean GreaterThanOrEqual (SqlInt64 x, SqlInt64 y);
[C++] public: static SqlBoolean GreaterThanOrEqual (SqlInt64 x, SqlInt64 y);
[VB] Public Shared Function GreaterThanOrEqual(ByVal x As SqlInt64, ByVal y As SqlInt64) As SqlBoolean
[JScript] public static function GreaterThanOrEqual(x: SqlInt64, y: SqlInt64) SqlBoolean;

Description

[.]

LessThan

[C#] public static SqlBoolean LessThan(SqlInt64 x, SqlInt64 y);
[C++] public: static SqlBoolean LessThan(SqlInt64 x, SqlInt64 y);
[VB] Public Shared Function LessThan(ByVal x As SqlInt64, ByVal y As SqlInt64) As SqlBoolean
[JScript] public static function LessThan(x: SqlInt64, y: SqlInt64): SqlBoolean;

Description

[.]

LessThanOrEqual

[C++] public static SqlBoolean LessThanOrEqual(SqlInt64 x, SqlInt64 y);
[C++] public: static SqlBoolean LessThanOrEqual(SqlInt64 x, SqlInt64 y);
[VB] Public Shared Function LessThanOrEqual(ByVal x As SqlInt64, ByVal y As SqlInt64) As SqlBoolean
[JScript] public static function LessThanOrEqual(x: SqlInt64, y: SqlInt64) SqlBoolean;

Description

[.]

Mod

[C#] public static SqlInt64 Mod(SqlInt64 x, SqlInt64 y);.
[C++] public: static SqlInt64 Mod(SqlInt64 x, SqlInt64 y);
[VB] Public Shared Function Mod(ByVal x As SqlInt64, ByVal y As SqlInt64) As SqlInt64
[JScript] public static function Mod(x: SqlInt64, y: SqlInt64): SqlInt64;

Description

[.]

Multiply

[C#] public static SqlInt64 Multiply(SqlInt64 x, SqlInt64 y);
[C++] public: static SqlInt64 Multiply(SqlInt64 x, SqlInt64 y);
[VB] Public Shared Function Multiply(ByVal x As SqlInt64, ByVal y As SqlInt64) As SqlInt64
[JScript] public static function Multiply(x: SqlInt64, y: SqlInt64): SqlInt64;

Description

[.]

NotEquals

[C#] public static SqlBoolean NotEquals(SqlInt64 x, SqlInt64 y);
[C++] public: static SqlBoolean NotEquals(SqlInt64 x, SqlInt64 y);
[VB] Public Shared Function NotEquals(ByVal x As SqlInt64, ByVal y As SqlInt64) As SqlBoolean
[JScript] public static function NotEquals(x: SqlInt64, y: SqlInt64): SqlBoolean;

Description

[.]

OnesComplement

[C#] public static SqlInt64 OnesComplement(SqlInt64 x);
[C++] public: static SqlInt64 OnesComplement(SqlInt64 x);
[VB] Public Shared Function OnesComplement(ByVal x As SqlInt64) As SqlInt64
[JScript] public static function OnesComplement(x: SqlInt64): SqlInt64;

Description

[.]

op_Addition

[C#] public static SqlInt64 operator+(SqlInt64 x, SqlInt64 y);
[C++] public: static SqlInt64 op_Addition(SqlInt64 x, SqlInt64 y);
[VB] returnValue=SqlInt64.op_Addition(x, y)
[JScript] returnValue=x+y;

Description

The addition operator computes the sum of the two System.Data.SqlTypes.SqlInt64 parameters.

Return Value: A new System.Data.SqlTypes.SqlInt64 structure whose System.Data.SqlTypes.SqlInt64.Value is equal to the sum of the two System.Data.SqlTypes.SqlInt64 parameters. A System.Data.SqlTypes.SqlInt64 structure. A System.Data.SqlTypes.SqlInt64 structure.

op_BitwiseAnd

[C#] public static SqlInt64 operator &(SqlInt64 x, SqlInt64 y);

[C++] public: static SqlInt64 op_BitwiseAnd(SqlInt64 x, SqlInt64 y);
[VB] returnValue=SqlInt64.op_BitwiseAnd(x, y)
[JScript] returnValue=x & y;
Description
  Computes the bitwise AND of its System.Data.SqlTypes.SqlInt64 operands. A System.Data.SqlTypes.SqlInt64 structure. A System.Data.SqlTypes.SqlInt64 structure.
    op_BitwiseOr
[C#] public static SqlInt64 operator |(SqlInt64 x, SqlInt64 y);
[C++] public: static SqlInt64 op_BitwiseOr(SqlInt64 x, SqlInt64 y);
[VB] returnValue=SqlInt64.op_BitwiseOr(x, y)
[JScript] returnValue=x|y;
Description
  Computes the bitwise OR of its two System.Data.SqlTypes.SqlInt64 operands. A System.Data.SqlTypes.SqlInt64 structure. A System.Data.SqlTypes.SqlInt64 structure.
    op_Division
[C#] public static SqlInt64 operator/(SqlInt64 x, SqlInt64 y);
[C++] public: static SqlInt64 op_Division(SqlInt64 x, SqlInt64 y);
[VB] returnValue=SqlInt64.op_Division(x, y)
[JScript] returnValue=x/y;
Description
  The division operator divides the first System.Data.SqlTypes.SqlInt64 parameter by the second.
Return Value: A new System.Data.SqlTypes.SqlInt64 structure whose System.Data.SqlTypes.SqlInt64.Value property contains the results of the division operation. A System.Data.SqlTypes.SqlInt64 structure. A System.Data.SqlTypes.SqlInt64 structure.
    op_Equality
[C#] public static SqlBoolean operator==(SqlInt64 x, SqlInt64 y);
[C++] public: static SqlBoolean op_Equality(SqlInt64 x, SqlInt64 y);
[VB] returnValue=SqlInt64.op_Equality(x, y)
[JScript] returnValue==xy;
Description
  Performs a logical comparison of the two System.Data.SqlTypes.SqlInt64 parameters to determine if they are equal.
Return Value: A System.Data.SqlTypes.SqlBoolean that is System.Data.SqlTypes.SqlBoolean.True if the two instances are equal or System.Data.SqlTypes.SqlBoolean.False if the two instances are not equal. If either instance of System.Data.SqlTypes.SqlInt64 is null, the System.Data.SqlTypes.SqlBoolean.Value of the System.Data.SqlTypes.SqlBoolean will be System.Data.SqlTypes.SqlBoolean.Null. A System.Data.SqlTypes.SqlInt64 structure. A System.Data.SqlTypes.SqlInt64 structure.
    op_ExclusiveOr
[C#] public static SqlInt64 operator ^(SqlInt64 x, SqlInt64 y);
[C++] public: static SqlInt64 op_ExclusiveOr(SqlInt64 x, SqlInt64 y);
[VB] returnValue=SqlInt64.op_ExclusiveOr(x, y)
[JScript] returnValue=x ^y;
Description
  Performs a bitwise exclusive-OR operation on the supplied parameters. A System.Data.SqlTypes.SqlInt64 structure. A System.Data.SqlTypes.SqlInt64 structure.
    op_Explicit
[C#] public static explicit operator SqlInt64(SqlBoolean x);
[C++] public: static SqlInt64 op_Explicit(SqlBoolean x);
[VB] returnValue=SqlInt64.op_Explicit(x)
[JScript] returnValue=SqlInt64(x);
Description
  Converts the supplied System.Data.SqlTypes.SqlBit parameter to System.Data.SqlTypes.SqlInt64
Return Value: A new System.Data.SqlTypes.SqlInt64 structure whose System.Data.SqlTypes.SqlInt64.Value property is equal to the System.Data.SqlTypes.SqlBit.ByteValue of the System.Data.SqlTypes.SqlBit parameter. The System.Data.SqlTypes.SqlBit structure to be converted.
    op_Explicit
[C#] public static explicit operator SqlInt64(SqlDecimal x);
[C++] public: static SqlInt64 op_Explicit(SqlDecimal x);
[VB] returnValue=SqlInt64.op_Explicit(x)
[JScript] returnValue=SqlInt64(x);
Description
  Converts the supplied System.Data.SqlTypes.SqlDecimal parameter to System.Data.SqlTypes.SqlInt64
Return Value: A new System.Data.SqlTypes.SqlInt64 structure whose System.Data.SqlTypes.SqlInt64.Value is equal to the integer portion of the System.Data.SqlTypes.SqlDecimal parameter. The System.Data.SqlTypes.SqlDecimal structure to be converted.
    op_Explicit
[C#] public static explicit operator SqlInt64(SqlDouble x);
[C++] public: static SqlInt64 op_Explicit(SqlDouble x);
[VB] returnValue=SqlInt64.op_Explicit(x)
[JScript] returnValue=SqlInt64(x);
Description
  Converts the supplied System.Data.SqlTypes.SqlDouble structure to System.Data.SqlTypes.SqlInt64
Return Value: A new System.Data.SqlTypes.SqlInt64 structure whose System.Data.SqlTypes.SqlInt64.Value property equals the integer portion of the System.Data.SqlTypes.SqlDouble parameter. The System.Data.SqlTypes.SqlDouble structure to be converted.
    op_Explicit
[C#] public static explicit operator long(SqlInt64 x);
[C++] public: static __int64 op_Explicit( );
[VB] returnValue=SqlInt64.op_Explicit(x)
[JScript] returnValue Int64(x);
Description
  Converts the System.Data.SqlTypes.SqlInt64 parameter to long.
Return Value: A new long value equal to the System.Data.SqlTypes.SqlInt64Value of the System.Data.SqlTypes.SqlInt64. A System.Data.SqlTypes.SqlInt64 structure.
    op_Explicit
[C#] public static explicit operator SqlInt64(SqlMoney x);
[C++] public: static SqlInt64 op_Explicit(SqlMoney x);
[VB] returnValue=SqlInt64.op_Explicit(x)
[JScript] returnValue=SqlInt64(x);
Description
  Converts the supplied System.Data.SqlTypes.SqlMoney parameter to System.Data.SqlTypes.SqlInt64. The System.Data.SqlTypes.SqlMoney structure to be converted.
    op_Explicit
[C#] public static explicit operator SqlInt64(SqlSingle x);
[C++] public: static SqlInt64 op_Explicit(SqlSingle x);
[VB] returnValue=SqlInt64.op_Explicit(x)
[JScript] returnValue=SqlInt64(x);
Description
  Converts the supplied System.Data.SqlTypes.SqlSingle parameter to SqlInt64.
Return Value: A new System.Data.SqlTypes.SqlInt64 structure whose System.Data.SqlTypes.SqlInt64.Value property contains the integer portion of the System.Data.Sql-Types.SqlSingle parameter. The System.Data.Sql-Types.SqlSingle structure to be converted.

op_Explicit

[C#] public static explicit operator SqlInt64(SqlString x);
[C++] public: static SqlInt64 op_Explicit(SqlString x);
[VB] returnValue=SqlInt64.op_Explicit(x)
[JScript] returnValue=SqlInt64(x);
Description Converts the supplied System.Data.SqlTypes.SqlString parameter to System.Data.SqlTypes.SqlInt64

Return Value: A new System.Data.SqlTypes.SqlInt64 whose System.Data.SqlTypes.SqlInt64.Value is equal to the value represented by the System.Data.SqlTypes.SqlString parameter. The System.Data.SqlTypes.SqlString object to be converted.

op_GreaterThan

[C#] public static SqlBoolean operator >(SqlInt64 x, SqlInt64 y);
[C++] public: static SqlBoolean op_GreaterThan(SqlInt64 x, SqlInt64 y);
[VB] returnValue=SqlInt64.op_GreaterThan(x, y)
[JScript] returnValue=x>y;
Description Performs a logical comparison of the two System.Data.SqlTypes.SqlInt64 parameters to determine if the first is greater than the second.

Return Value: A System.Data.SqlTypes.SqlBoolean that is System.Data.SqlTypes.SqlBoolean.True if the first instance is greater than the second instance, otherwise System.Data.SqlTypes.SqlBoolean.False If either instance of System.Data.SqlTypes.SqlInt64 is null, the: System.Data.SqlTypes.SqlBoolean.Value of the System.Data.SqlTypes.SqlBoolean will be System.Data.SqlTypes.SqlBoolean.Null. A System.Data.SqlTypes.SqlInt64 structure. A System.Data.SqlTypes.SqlInt64 structure.

op_GreaterThanOrEqual

[C#] public static SqlBoolean operator>=(SqlInt64 x, SqlInt64 y);
[C++] public: static SqlBoolean op_GreaterThanOrEqual (SqlInt64 x, SqlInt64 y);
[VB] returnValue=SqlInt64.op_GreaterThanOrEqual(x, y)
[JScript] returnValue=x>=y;
Description Performs a logical comparison of the two System.Data.SqlTypes.SqlInt64 parameters to determine if the first is greater than or equal to the second.

Return Value: A System.Data.SqlTypes.SqlBoolean that is System.Data.SqlTypes.SqlBoolean.True if the first instance is greater than or equal to the second instance, otherwise System.Data.SqlTypes.SqlBoolean.False.

If either instance of System.Data.SqlTypes.SqlInt64 is null, the System.Data.SqlTypes.SqlBoolean.Value of the System.Data.SqlTypes.SqlBoolean will be System.Data.SqlTypes.SqlBoolean.Null. A System.Data.SqlTypes.SqlInt64 structure. A System.Data.SqlTypes.SqlInt64 structure.

op_Implicit

[C#] public static implicit operator SqlInt64(long x);
[C++] public: static SqlInt64 op_Implicit(__int64 x);
[VB] returnValue=SqlInt64.op_Implicit(x)
[JScript] returnValue=x;
Description Converts the long parameter to System.Data.Sql-Types.SqlInt64

Return Value: A new System.Data.SqlTypes.SqlInt64 structure whose System.Data.SqlTypes.SqlInt64.Value equals the value of the long parameter. A long integer value.

op_Implicit

[C#] public static implicit operator SqlInt64(SqlByte x);
[C++] public: static SqlInt64 op_Implicit(SqlByte x);
[VB] returnValue=SqlInt64.op_Implicit(x)
[JScript] returnValue=x;
Description Converts the supplied System.Data.SqlTypes.SqlByte parameter to System.Data.SqlTypes.SqlInt64

Return Value: A new System.Data.SqlTypes.SqlInt64 structure whose System.Data.SqlTypes.SqlInt64.Value property equals the System.Data.SqlTypes.SqlByte.Value property of the System.Data.SqlTypes.SqlByte parameter. The System.Data.SqlTypes.SqlByte structure to be converted.

op_Implicit

[C#] public static implicit operator SqlInt64(SqlInt16 x);
[C++] public: static SqlInt64 op_Implicit(SqlInt16 x);
[VB] returnValue=SqlInt64.op_Implicit(x)
[JScript] returnValue=x;
Description Converts the supplied System.Data.SqlTypes.SqlInt16 parameter to System.Data.SqlTypes.SqlInt64

Return Value: A new System.Data.SqlTypes.SqlInt64 structure whose System.Data.SqlTypes.SqlInt64.Value property equals the System.Data.SqlTypes.SqlInt16.Value property of the System.Data.SqlTypes.SqlInt16 parameter. The System.Data.SqlTypes.SqlInt16 structure to be converted.

op_Implicit

[C#] public static implicit operator SqlInt64(SqlInt32 x);
[C++] public: static SqlInt64 op_Implicit(SqlInt32 x);
[VB] returnValue=SqlInt64.op_Implicit(x)
[JScript] returnValue=x;
Description Converts the supplied System.Data.SqlTypes.SqlInt32 parameter to System.Data.SqlTypes.SqlInt64

Return Value: A new System.Data.SqlTypes.SqlInt64 structure whose System.Data.SqlTypes.SqlInt64.Value property equals the System.Data.SqlTypes.SqlInt32.Value property of the System.Data.SqlTypes.SqlInt32 parameter. The System.Data.SqlTypes.SqlInt32 structure to be converted.

op_Inequality

[C#] public static SqlBoolean operator !=(SqlInt64 x, SqlInt64 y);
[C++] public: static SqlBoolean op_Inequality(SqlInt64 x, SqlInt64 y);
[VB] returnValue=SqlInt64.op_Inequality(x, y)
[JScript] returnValue=x !=y;
Description Performs a logical comparison on the two SqlInt64 parameters to determine if they are equal.

Return Value: A System.Data.SqlTypes.SqlBoolean that is System.Data.SqlTypes.SqlBoolean.True if the two instances are not equal or System.Data.SqlTypes.SqlBoolean.False if the two instances are equal. If either instance of System.Data.SqlTypes.SqlInt64 is null, the System.Data.Sql-Types.SqlBoolean.Value of the System.Data.SqlTypes.SqlBoolean will be System.Data.SqlTypes.SqlBoolean.Null. A System.Data.SqlTypes.SqlInt64 structure. A System.Data.SqlTypes.SqlInt64 structure.

op_LessThan

[C#] public static SqlBoolean operator
[C++] public: static SqlBoolean op_LessThan(SqlInt64 x, SqlInt64 y);
[VB] returnValue=SqlInt64.op_LessThan(x, y)
[JScript] returnValue=x<y
Description Performs a logical comparison on the two System.Data.SqlTypes.SqlInt64 parameters to determine if the first is less than the second.

Return Value: A System.Data.SqlTypes.SqlBoolean that is System.Data.SqlTypes.SqlBoolean.True if the first instance is less than the second instance, otherwise System.Data.SqlTypes.SqlBoolean.False. If either instance of System.Data.SqlTypes.SqlInt64 is null, the System.Data.SqlTypes.SqlBoolean.Value of the System.Data.SqlTypes.SqlBoolean will be System.Data.SqlTypes.SqlBoolean.Null. A System.Data.SqlTypes.SqlInt64 structure. A System.Data.SqlTypes.SqlInt64 structure.

op_LessThanOrEqual

[C#] public static SqlBoolean operator <=(SqlInt64 x, SqlInt64 y);

[C++] public: static SqlBoolean op_LessThanOrEqual (SqlInt64 x, SqlInt64 y);

[VB] returnValue=SqlInt64.op_LessThanOrEqual(x, y)

[JScript] returnValue=x<=y;

Description

Performs a logical comparison on the two System.Data.SqlTypes.SqlInt64 parameters to determine if the first is less than or equal to the second.

Return Value: A System.Data.SqlTypes.SqlBoolean that is System.Data.SqlTypes.SqlBoolean.True if the first instance is less than or equal to the second instance, otherwise System.Data.SqlTypes.SqlBoolean.False. If either instance of System.Data.SqlTypes.SqlInt64 is null, the System.Data.SqlTypes.SqlBoolean.Value of the System.Data.SqlTypes.SqlBoolean will be System.Data.SqlTypes.SqlBoolean.Null. A System.Data.SqlTypes.SqlInt64 structure. A System.Data.SqlTypes.SqlInt64 structure.

op_Modulus

[C#] public static SqlInt64 operator %(SqlInt64 x, SqlInt64 y);

[C++] public: static SqlInt64 op_Modulus(SqlInt64 x, SqlInt64 y);

[VB] returnValue=SqlInt64.op_Modulus(x, y)

[JScript] returnValue=x % y;

Description

The modulus operator computes the remainder after dividing the first System.Data.SqlTypes.SqlInt64 parameter by the second.

Return Value: A new System.Data.SqlTypes.SqlInt64 structure whose System.Data.SqlTypes.SqlInt64.Value property contains the remainder. A System.Data.SqlTypes.SqlInt64 structure. A System.Data.SqlTypes.SqlInt64 structure.

op_Multiply

[C#] public static SqlInt64 operator*(SqlInt64 x, SqlInt64 y);

[C++] public: static SqlInt64 op_Multiply(SqlInt64 x, SqlInt64 y);

[VB] returnValue=SqlInt64.op_Multiply(x, y)

[JScript] returnValue=x*y;

Description

The multiplication operator computes the product of the two System.Data.SqlTypes.SqlInt64 parameters.

Return Value: A new System.Data.SqlTypes.SqlInt64 structure whose System.Data.SqlTypes.SqlInt64.Value is equal to the product of the two System.Data.SqlTypes.SqlInt64 parameters. A System.Data.SqlTypes.SqlInt64 structure. A System.Data.SqlTypes.SqlInt64 structure.

op_OnesComplement

[C#] public static SqlInt64 operator ~(SqlInt64 x);

[C++] public: static SqlInt64 op_OnesComplement (SqlInt64 x);

[VB] returnValue=SqlInt64.op_OnesComplement(x)

[JScript] returnValue=~x;

Description

The ~operator performs a bitwise one's complement operation on its System.Data.SqlTypes.SqlInt64 operand.

Return Value: A new System.Data.SqlTypes.SqlInt64 structure whose System.Data.SqlTypes.SqlInt64.Value is equal to the ones compliment of the System.Data.SqlTypes.SqlInt64 parameter. A System.Data.SqlTypes.SqlInt64 structure.

op_Subtraction

[C#] public static SqlInt64 operator-(SqlInt64 x, SqlInt64 y);

[C++] public: static SqlInt64 op_Subtraction(SqlInt64 x, SqlInt64 y);

[VB] returnValue=SqlInt64.op_Subtraction(x, y)

[JScript] returnValue=x-y;

Description

The subtraction operator subtracts the second System.Data.SqlTypes.SqlInt64 parameter from the first.

Return Value: A new System.Data.SqlTypes.SqlInt64 structure whose System.Data.SqlTypes.SqlInt64.Value property equals the results of the subtraction operation. A System.Data.SqlTypes.SqlInt64 structure. A System.Data.SqlTypes.SqlInt64 structure.

op_UnaryNegation

[C#] public static SqlInt64 operator -(SqlInt64 x);

[C++] public: static SqlInt64 op_UnaryNegation(SqlInt64 x);

[VB] returnValue=SqlInt64.op_UnaryNegation(x)

[JScript] returnValue=-x;

Description

The unary minus operator negates the System.Data.SqlTypes.SqlInt64.Value of the System.Data.SqlTypes.SqlInt64 operand.

Return Value: A System.Data.SqlTypes.SqlInt64 structure whose System.Data.SqlTypes.SqlInt64.Value is equal to the negated System.Data.SqlTypes.SqlInt64.Value of the System.Data.SqlTypes.SqlInt64 parameter. A System.Data.SqlTypes.SqlInt64 structure.

Parse

[C#] public static SqlInt64 Parse(string s);

[C++] public: static SqlInt64 Parse(String* s);

[VB] Public Shared Function Parse(ByVal s As String) As SqlInt64

[JScript] public static function Parse(s: String): SqlInt64;

Description

[ .][ .]

Subtract

[C#] public static SqlInt64 Substrate(SqlInt64 x, SqlInt64 y);

[C++] public: static SqlInt64 Substrate(SqlInt64 x, SqlInt64 y);

[VB] Public Shared Function Subtract(ByVal x As SqlInt64, ByVal y As SqlInt64) As SqlInt64

[JScript] public static function Subtract(x: SqlInt64, y: SqlInt64): SqlInt64;

Description

[ .]

ToSqlBoolean

[C#] public SqlBoolean ToSqlBoolean( );

[C++] public: SqlBoolean ToSqlBoolean( );

[VB] Public Function ToSqlBoolean( ) As SqlBoolean

[JScript] public function ToSqlBoolean( ): SqlBoolean;

Description

[ .]

ToSqlByte

[C#] public SqlByte ToSqlByte( );

[C++] public: SqlByte ToSqlByte( );

[VB] Public Function ToSqlByte( ) As SqlByte

[JScript] public function ToSqlByte( ): SqlByte;

Description
 [ . ]
 ToSqlDecimal
[C#] public SqlDecimal ToSqlDecimal( );
[C++] public: SqlDecimal ToSqlDecimal( );
[VB] Public Function ToSqlDecimal( ) As SqlDecimal
[JScript] public function ToSqlDecimal( ): SqlDecimal;
Description
 [ . ]
 ToSqlDouble
[C#] public SqlDouble ToSqlDouble( );
[C++] public: SqlDouble ToSqlDouble( );
[VB] Public Function ToSqlDouble( ) As SqlDouble
[JScript] public function ToSqlDouble( ): SqlDouble;
Description
 [ . ]
 ToSqlInt16
[C#] public SqlInt16 ToSqlInt16( );
[C++] public: SqlInt16 ToSqlInt16( );
[VB] Public Function ToSqlInt16( ) As SqlInt16
[JScript] public function ToSqlInt16( ): SqlInt16;
Description
 [ . ]
 ToSqlInt32
[C#] public SqlInt32 ToSqlInt32( );
[C++] public: SqlInt32 ToSqlInt32( );
[VB] Public Function ToSqlInt32( ) As SqlInt32
[JScript] public function ToSqlInt32( ): SqlInt32;
Description
 [ . ]
 ToSqlMoney
[C#] public SqlMoney ToSqlMoney( );
[C++] public: SqlMoney ToSqlMoney( );
[VB] Public Function ToSqlMoney( ) As SqlMoney
[JScript] public function ToSqlMoney( ): SqlMoney;
Description
 [ . ]
 ToSqlSingle
[C#] public SqlSingle ToSqlSingle( );
[C++] public: SqlSingle ToSqlSingle( );
[VB] Public Function ToSqlSingle( ) As SqlSingle
[JScript] public function ToSqlSingle( ): SqlSingle;
Description
 [ . ]
 ToSqlString
[C#] public SqlString ToSqlString( );
[C++] public: SqlString ToSqlString( );
[VB] Public Function ToSqlString( ) As SqlString
[JScript] public function ToSqlString( ): SqlString;
Description
 [ . ]
 ToString
[C#] public override string ToString( );
[C++] public: String* ToString( );
[VB] Overrides Public Function ToString( ) As String
[JScript] public override function ToString( ): String; Converts a System.Data.SqlTypes.SqlInt64 structure to System.String.
Description
 Converts this instance of System.Data.SqlTypes.SqlInt64 to System.String.
 Xor
[C#] public static SqlInt64 Xor(SqlInt64 x, SqlInt64 y);
[C++] public: static SqlInt64 Xor(SqlInt64 x, SqlInt64 y);
[VB] Public Shared Function Xor(ByVal x As SqlInt64, ByVal y As SqlInt64) As SqlInt64
[JScript] public static function Xor(x: SqlInt64, y: SqlInt64): SqlInt64;

Description
 [ . ]
 SqlMoney structure (System.Data.SqlTypes)
 Xor
Description
 Represents a currency value ranging from −2 (or 922,337,203,685,477.5808) to 2−1 (or +922,337,203,685,477.5807) with an accuracy to a ten-thousandth of currency unit to be stored in or retrieved from a database.
 The actual value of the System.Data.SqlTypes.SqlMoney object is stored in System.Data.SqlTypes.SqlMoney.Value.
 Xor
[C#] public static readonly SqlMoney MaxValue;
[C++] public: static SqlMoney MaxValue;
[VB] Public Shared ReadOnly MaxValue As SqlMoney
[JScript] public static var MaxValue: SqlMoney;
Description
 Represents the maximum value that can be assigned to the System.Data.SqlTypes.SqlMoney.Value property of an instance of the System.Data.SqlTypes.SqlMoney class.
 The value of this constant is 922,337,203,685,475.5807 Represents the maximum value that can be assigned to the System.Data.SqlTypes.SqlMoney.Value property of an instance of the System.Data.SqlTypes.SqlMoney class.
 Xor
[C#] public static readonly SqlMoney MinValue;
[C++] public: static SqlMoney MinValue;
[VB] Public Shared ReadOnly MinValue As SqlMoney
[JScript] public static var MinValue: SqlMoney;
Description
 Represents the minimum value that can be assigned to System.Data.SqlTypes.SqlMoney.Value property of an instance of the System.Data.SqlTypes.SqlMoney class.
 The value of this constant is −922,337,203,685,477.5808 Represents the minimum value that can be assigned to System.Data.SqlTypes.SqlMoney.Value property of an instance of the System.Data.SqlTypes.SqlMoney class.
 Xor
[C#] public static readonly SqlMoney Null;
[C++] public: static SqlMoney Null;
[VB] Public Shared ReadOnly Null As SqlMoney
[JScript] public static var Null: SqlMoney;
Description
 Represents a null value that can be assigned to the System.Data.SqlTypes.SqlMoney.Value property of an instance of the System.Data.SqlTypes.SqlMoney class.
 System.Data.SqlTypes.SqlMoney.Null functions as a constant for the System.Data.SqlTypes.SqlMoney class.
 Xor
[C#] public static readonly SqlMoney Zero;
[C++] public: static SqlMoney Zero;
[VB] Public Shared ReadOnly Zero As SqlMoney
[JScript] public static var Zero: SqlMoney;
Description
 Represents the zero value that can be assigned to the System.Data.SqlTypes.SqlMoney.Value property of an instance of the System.Data.SqlTypes.SqlMoney class.
 System.Data.SqlTypes.SqlMoney.Zero functions as a constant for the System.Data.SqlTypes.SqlMoney class.
 SqlMoney
 Example Syntax:
 Xor
[C#] public SqlMoney(decimal value);
[C++] public: SqlMoney(Decimal value);
[VB] Public Sub New(ByVal value As Decimal)
[JScript] public function SqlMoney(value: Decimal);

Description
  Initializes a new instance of the System.Data.Sql-Types.SqlMoney class with the value given. The monetary value to initialize.
  SqlMoney
  Example Syntax:
  Xor
[C#] public SqlMoney(double value);
[C++] public: SqlMoney(double value);
[VB] Public Sub New(ByVal value As Double)
[JScript] public function SqlMoney(value: double);
Description
  Initializes a new instance of the System.Data.Sql-Types.SqlMoney class with the value given. The monetary value to initialize.
  SqlMoney
  Example Syntax:
  Xor
[C#] public SqlMoney(int value);
[C++] public: SqlMoney(int value);
[VB] Public Sub New(ByVal value As Integer)
[JScript] public function SqlMoney(value: int);
Description
  Initializes a new instance of the System.Data.Sql-Types.SqlMoney class with the value given. The monetary value to initialize.
  SqlMoney
  Example Syntax:
  Xor
[C#] public SqlMoney(long value);
[C++] public: SqlMoney(__int64 value);
[VB] Public Sub New(ByVal value As Long)
[JScript] public function SqlMoney(value: long);
Description
  Initializes a new instance of the System.Data.Sql-Types.SqlMoney class with the value given. The monetary value to initialize.
  IsNull
  Xor
[C#] public bool IsNull {get;}
[C++] public: __property bool get_IsNull( );
[VB] Public ReadOnly Property IsNull As Boolean
[JScript] public function get IsNull( ): Boolean;
Description
  Returns a value indicating whether the System.Data.Sql-Types.SqlMoney.Value property is assigned to null.
  Value
  Xor
[C#] public decimal Value {get;}
[C++] public: __property Decimal get_Value( );
[VB] Public ReadOnly Property Value As Decimal
[JScript] public function get Value( ): Decimal;
Description
  Gets the monetary value of an instance of the System.Data.SqlTypes.SqlMoney structure. This property is read-only.
  Add
[C#] public static SqlMoney Add(SqlMoney x, SqlMoney y);
[C++] public: static SqlMoney Add(SqlMoney x, SqlMoney y);
[VB] Public Shared Function Add(ByVal x As SqlMoney, ByVal y As SqlMoney) As SqlMoney
[JScript] public static function Add(x: SqlMoney, y: SqlMoney): SqlMoney;
Description
  [ .]
  CompareTo
[C#] public int CompareTo(object value);
[C++] public: __sealed int CompareTo(Object* value);
[VB] NotOverridable Public Function CompareTo(ByVal value As Object) As Integer
[JScript] public function CompareTo(value: Object): int;
Description
  Compares this instance to the supplied object and returns an indication of their relative values.
  Return Value: A signed number indicating the relative values of the instance and the object. The object to be compared.
  Divide
[C#] public static SqlMoney Divide(SqlMoney x, SqlMoney y);
[C++] public: static SqlMoney Divide(SqlMoney x, SqlMoney y);
[VB] Public Shared Function Divide(ByVal x As SqlMoney, ByVal y As SqlMoney) As SqlMoney
[JScript] public static function Divide(x: SqlMoney, y: SqlMoney): SqlMoney;
Description
  [ .]
  Equals
[C#] public override bool Equals(object value);
[C++] public: bool Equals(Object* value);
[VB] Overrides Public Function Equals(ByVal value As Object) As Boolean
[JScript] public override function Equals(value: Object): Boolean;
Description
  Compares the supplied object parameter to the System.Data.SqlTypes.SqlMoney.Value property of the System.Data.SqlTypes.SqlMoney object.
  Return Value: Equals will return true if the object is an instance of System.Data.SqlTypes.SqlMoney and the two are equal; otherwise false. The object to be compared.
  Equals
[C#] public static new SqlBoolean Equals(SqlMoney x, SqlMoney y);
[C++] public: static SqlBoolean Equals(SqlMoney x, SqlMoney y);
[VB] Shadows Public Shared Function Equals(ByVal x As SqlMoney, ByVal y As SqlMoney) As SqlBoolean
[JScript] public static hide function Equals(x: SqlMoney, y: SqlMoney): SqlBoolean;
Description
  [ ]
  GetHashCode
[C#] public override int GetHashCode( );
[C++] public: int GetHashCode( );
[VB] Overrides Public Function GetHashCode( ) As Integer
[JScript] public override function GetHashCode( ): int;
Description
  Gets the hash code for this instance.
  Return Value: A 32-bit signed integer hash code.
  GreaterThan
[C#] public static SqlBoolean GreaterThan(SqlMoney x, SqlMoney y);
[C++] public: static SqlBoolean GreaterThan(SqlMoney x, SqlMoney y);
[VB] Public Shared Function GreaterThan(ByVal x As SqlMoney, ByVal y As SqlMoney) As SqlBoolean
[JScript] public static function GreaterThan(x: SqlMoney, y: SqlMoney): SqlBoolean;
Description
  [ .]
  GreaterThanOrEqual
[C#] public static SqlBoolean GreaterThanOrEqual (SqlMoney x, SqlMoney y);

[C++] public: static SqlBoolean GreaterThanOrEqual(SqlMoney x, SqlMoney y);
[VB] Public Shared Function GreaterThanOrEqual(ByVal x As SqlMoney, ByVal y As SqlMoney) As SqlBoolean
[JScript] public static function GreaterThanOrEqual(x: SqlMoney, y: SqlMoney) SqlBoolean;
Description
[ . ]
LessThan
[C#] public static SqlBoolean LessThan(SqlMoney x, SqlMoney y);
[C++] public: static SqlBoolean LessThan(SqlMoney x, SqlMoney y);
[VB] Public Shared Function LessThan(ByVal x As SqlMoney, ByVal y As SqlMoney) As SqlBoolean
[JScript] public static function LessThan(x: SqlMoney, y: SqlMoney) SqlBoolean;
Description
[ . ]
LessThanOrEqual
[C#] public static SqlBoolean LessThanOrEqual(SqlMoney x, SqlMoney y);
[C++] public: static SqlBoolean LessThanOrEqual(SqlMoney x, SqlMoney y);
[VB] Public Shared Function LessThanOrEqual(ByVal x As SqlMoney, ByVal y As SqlMoney) As SqlBoolean
[JScript] public static function LessThanOrEqual(x: SqlMoney, y: SqlMoney) SqlBoolean;
Description
[ . ]
Multiply
[C#] public static SqlMoney Multiply(SqlMoney x, SqlMoney y);
[C++] public: static SqlMoney Multiply(SqlMoney x, SqlMoney y);
[VB] Public Shared Function Multiply(ByVal x As SqlMoney, ByVal y As SqlMoney) As SqlMoney
[JScript] public static function Multiply(x: SqlMoney, y: SqlMoney)l: SqlMoney;
Description
[ . ]
NotEquals
[C#] public static SqlBoolean NotEquals(SqlMoney x, SqlMoney y);
[C++] public: static SqlBoolean NotEquals(SqlMoney x, SqlMoney y);
[VB] Public Shared Function NotEquals(ByVal x As SqlMoney, ByVal y As SqlMoney) As SqlBoolean
[JScript] public static function NotEquals(x: SqlMoney, y: SqlMoney): SqlBoolean;
Description
[ . ]
op_Addition
[C#] public static SqlMoney operator+(SqlMoney x, SqlMoney y);
[C++] public: static SqlMoney op_Addition(SqlMoney x, SqlMoney y);
[VB] returnValue=SqlMoney.op_Addition(x, y)
[JScript] returnValue=x+y;
Description
Calculates the sum of the two System.Data.SqlTypes.SqlMoney parameters.
Return Value: A new System.Data.SqlTypes.SqlMoney structure whose System.Data.SqlTypes.SqlMoney.Value contains the sum of the two System.Data.SqlTypes.SqlMoney parameters. A System.Data.SqlTypes.SqlMoney structure. A System.Data.SqlTypes.SqlMoney structure.

op_Division
[C#] public static SqlMoney operator/(SqlMoney x, SqlMoney y);
[C++] public: static SqlMoney op_Division(SqlMoney x, SqlMoney y);
[VB] returnValue=SqlMoney.op_Division(x, y)
[JScript] returnValue=x/y;
Description
The division operator divides the first System.Data.SqlTypes.SqlMoney parameter by the second.
Return Value: A new System.Data.SqlTypes.SqlMoney structure whose System.Data.SqlTypes.SqlMoney.Value contains the results of the division. A System.Data.SqlTypes.SqlMoney structure. A System.Data.SqlTypes.SqlMoney structure.
op_Equality
[C#] public static SqlBoolean operator==(SqlMoney x, SqlMoney y);
[C++] public: static SqlBoolean op_Equality(SqlMoney x, SqlMoney y);
[VB] returnValue=SqlMoney.op_Equality(x, y)
[JScript] returnValue=x==y;
Description
Performs a logical comparison of the two System.Data.SqlTypes.SqlMoney parameters to determine if they are equal.
Return Value: A System.Data.SqlTypes.SqlBoolean that is System.Data.SqlTypes.SqlBoolean.True if the two instances are equal or System.Data.SqlTypes.SqlBoolean.False if the two instances are not equal. If either instance of System.Data.SqlTypes.SqlMoney is null, the System.Data.SqlTypes.SqlBoolean.Value of the System.Data.SqlTypes.SqlBoolean will be System.Data.SqlTypes.SqlBoolean.Null. A System.Data.SqlTypes.SqlMoney structure. A System.Data.SqlTypes.SqlMoney structure.
op_Explicit
[C#] public static explicit operator SqlMoney(SqlBoolean x);
[C++] public: static SqlMoney op_Explicit(SqlBoolean x);
[VB] returnValue=SqlMoney.op_Explicit(x)
[JScript] returnValue=SqlMoney(x);
Description
This implicit operator converts the supplied System.Data.SqlTypes.SqlBit parameter to System.Data.SqlTypes.SqlMoney
Return Value: A new System.Data.SqlTypes.SqlMoney structure whose System.Data.SqlTypes.SqlMoney.Value property equals the System.Data.SqlTypes.SqlBit.ByteValue property of the System.Data.SqlTypes.SqlBit parameter. The System.Data.SqlTypes.SqlBit structure to be converted.
op_Explicit
[C#] public static explicit operator SqlMoney(SqlDecimal x);
[C++] public: static SqlMoney op_Explicit(SqlDecimal x);
[VB] returnValue=SqlMoney.op_Explicit(x)
[JScript] returnValue=SqlMoney(x);
Description
This operator converts the supplied System.Data.SqlTypes.SqlDecimal parameter to System.Data.SqlTypes.SqlMoney.
Return Value: A new System.Data.SqlTypes.SqlMoney structure whose System.Data.SqlTypes.SqlMoney.Value property equals the System.Data.SqlTypes.SqlDecimal.Value of the System.Data.SqlTypes.SqlDecimal parameter. The System.Data.SqlTypes.SqlDecimal structure to be converted.

op_Explicit
[C#] public static explicit operator SqlMoney(SqlDouble x);
[C++] public: static SqlMoney op_Explicit(SqlDouble x);
[VB] returnValue=SqlMoney.op_Explicit(x)
[JScript] returnValue=SqlMoney(x);
Description
This operator converts the supplied System.Data.Sql-Types.SqlDouble parameter to System.Data.SQLTypes.Sql-Money
Return Value: A new System.Data.SqlTypes.SqlMoney structure whose System.Data.SqlTypes.SqlMoney.Value property equals the System.Data.SqlTypes.SqlDouble.Value of the System.Data.SqlTypes.SqlDouble parameter. The System.Data.SqlTypes.SqlDouble structure to be converted.
op_Explicit
[C#] public static explicit operator decimal(SqlMoney x);
[C++] public: static Decimal op_Explicit( );
[VB] returnValue=SqlMoney.op_Explicit(x)
[JScript] returnValue Decimal(x);
Description
Converts the System.Data.SqlTypes.SqlMoney parameter to System.Decimal
Return Value: A new System.Decimal structure whose value equals the System.Data.SqlTypes.SqlMoney.Value of the System.Data.SqlTypes.SqlMoney parameter. A System.Data.SqlTypes.SqlMoney structure.
op_Explicit
[C#] public static explicit operator SqlMoney(SqlSingle x);
[C++] public: static SqlMoney op_Explicit(SqlSingle x);
[VB] returnValue=SqlMoney.op_Explicit(x)
[JScript] returnValue=SqlMoney(x);
Description
This operator converts the supplied System.Data.Sql-Types.SqlSingle parameter to System.Data.SqlTypes.Sql-Money
Return Value: A new System.Data.SqlTypes.SqlMoney structure whose System.Data.SqlTypes.SqlMoney.Value property equals the System.Data.SqlTypes.SqlSingle.Value of the System.Data.SqlTypes.SqlSingle parameter. The System.Data.SqlTypes.SqlSingle structure to be converted.
op_Explicit
[C#] public static explicit operator SqlMoney(SqlString x);
[C++] public: static SqlMoney op_Explicit(SqlString x);
[VB] returnValue=SqlMoney.op_Explicit(x)
[JScript] returnValue=SqlMoney(x);
Description
This operator converts the System.Data.SqlTypes.Sql-String parameter to System.Data.SqlTypes.SqlMoney
Return Value: A new System.Data.SqlTypes.SqlMoney structure whose System.Data.SqlTypes.SqlMoney.Value property equals the value represented by the System.Data.SqlTypes.SqlString parameter. The System.Data.Sql-Types.SqlString object to be converted.
op_GreaterThan
[C#] public static SqlBoolean operator>(SqlMoney x, SqlMoney y);
[C++] public: static SqlBoolean op_GreaterThan (SqlMoney x, SqlMoney y);
[VB] returnValue=SqlMoney.op_GreaterThan(x, y)
[JScript] returnValue=x>y;
Description
Performs a logical comparison of the two System.Data.SqlTypes.SqlMoney parameters to determine if the first is greater than the second.
Return Value: A System.Data.SqlTypes.SqlBoolean that is System.Data.SqlTypes.SqlBoolean.True if the first instance is greater than the second instance, otherwise System.Data.SqlTypes.SqlBoolean.False. If either instance of System.Data.SqlTypes.SqlMoney is null, the System.Data.Sql-Types.SqlBoolean.Value of the System.Data.SqlTypes.SqlBoolean will be System.Data.SqlTypes.SqlBoolean.Null. A System.Data.Sql-Types.SqlMoney structure. A System.Data.SqlTypes.Sql-Money structure.
op_GreaterThanOrEqual
[C#] public static SqlBoolean operator >=(SqlMoney x, SqlMoney y);
[C++] public: static SqlBoolean op_GreaterThanOrEqual (SqlMoney x, SqlMoney y);
[VB] returnValue=SqlMoney.op_GreaterThanOrEqual(x, y)
[JScript] returnValue=x>=y;
Description
Performs a logical comparison of the two System.Data.SqlTypes.SqlMoney parameters to determine if the first is greater than or equal to the second.
Return Value: A System.Data.SqlTypes.SqlBoolean that is System.Data.SqlTypes.SqlBoolean.True if the first instance is greater than or equal to the second instance, otherwise System.Data.SqlTypes.SqlBoolean.False.
If either instance of System.Data.SqlTypes.SqlMoney is null, the System.Data.SqlTypes.SqlBoolean.Value of the System.Data.SqlTypes.SqlBoolean will be System.Data.SqlTypes.SqlBoolean.Null. A System.Data.Sql-Types.SqlMoney structure. A System.Data.SqlTypes.Sql-Money structure.
op_Implicit
[C#] public static implicit operator SqlMoney(decimal x);
[C++] public: static SqlMoney op_Implicit(Decimal x);
[VB] returnValue=SqlMoney.op_Implicit(x)
[JScript] returnValue=x;
Description
Converts the System.Decimal parameter to System.Data.SqlTypes.SqlMoney
Return Value: A new System.Data.SqlTypes.SqlMoney structure whose System.Data.SqlTypes.SqlMoney.Value equals the value of the System.Decimal parameter.
op_Implicit
[C#] public static implicit operator SqlMoney(SqlByte x);
[C++] public: static SqlMoney op_Implicit(SqlByte x);
[VB] returnValue SqlMoney.op_Implicit(x)
[JScript] returnValue=x;
Description
This implicit operator converts the supplied System.Data.SqlTypes.SqlByte parameter to System.Data.Sql-Types.SqlMoney.
Return Value: A new System.Data.SqlTypes.SqlMoney structure whose System.Data.SqlTypes.SqlMoney.Value property is equal to the System.Data.SqlTypes.Sql-Byte.Value of the System.Data.SqlTypes.SqlByte parameter. The System.Data.SqlTypes.SqlByte structure to be converted.
op_Implicit
[C#] public static implicit operator SqlMoney(SqlInt16 x);
[C++] public: static SqlMoney op_Implicit(SqlInt16 x);
[VB] returnValue=SqlMoney.op_Implicit(x)
[JScript] returnValue=x;
Description
This implicit operator converts the supplied System.Data.SqlTypes.SqlInt16 parameter to System.Data.Sql-Types.SqlMoney
Return Value: A new System.Data.SqlTypes.SqlMoney structure whose System.Data.SqlTypes.SqlMoney.Value property equals the System.Data.SqlTypes.SqlInt16.Value of the System.Data.SqlTypes.SqlInt16 parameter. The System.Data.SqlTypes.SqlInt16 structure to be converted.

op_Implicit

[C#] public static implicit operator SqlMoney(SqlInt32 x);
[C++] public: static SqlMoney op_Implicit(SqlInt32 x);
[VB] returnValue=SqlMoney.op_Implicit(x)
[JScript] returnValue=x;
Description This implicit operator converts the supplied System.Data.SqlTypes.SqlInt32 parameter to System.Data.SqlTypes.SqlMoney Return Value: A new System.Data.SqlTypes.SqlMoney structure whose System.Data.SqlTypes.SqlMoney.Value property equals the System.Data.SqlTypes.SqlInt32.Value of the System.Data.SqlTypes.SqlInt32 parameter. The System.Data.SqlTypes.SqlInt32 structure to be converted.

op_Implicit

[C#] public static implicit operator SqlMoney(SqlInt64 x);
[C++] public: static SqlMoney op_Implicit(SqlInt64 x);
[VB] returnValue=SqlMoney.op_Implicit(x)
[JScript] returnValue=x;
Description This implicit operator converts the supplied System.Data.SqlTypes.SqlInt64 parameter to System.Data.SqlTypes.SqlMoney Return Value: A new System.Data.SqlTypes.SqlMoney structure whose System.Data.SqlTypes.SqlMoney.Value property equals the System.Data.SqlTypes.SqlInt64.Value of the System.Data.SqlTypes.SqlInt64 parameter. The System.Data.SqlTypes.SqlInt64 structure to be converted.

op_Inequality

[C#] public static SqlBoolean operator !=(SqlMoney x, SqlMoney y);
[C++] public: static SqlBoolean op_Inequality(SqlMoney x, SqlMoney y);
[VB] returnValue=SqlMoney.op_Inequality(x, y)
[JScript] returnValue=!=y;
Description Performs a logical comparison of the two System.Data.SqlTypes.SqlMoney parameters to determine if they are equal.

Return Value: A System.Data.SqlTypes.SqlBoolean that is System.Data.SqlTypes.SqlBoolean.True if the two instances are not equal or System.Data.SqlTypes.SqlBoolean.False if the two instances are equal. If either instance of System.Data.SqlTypes.SqlMoney is null, the System.Data.SqlTypes.SqlBoolean.Value of the System.Data.SqlTypes.SqlBoolean will be System.Data.SqlTypes.SqlBoolean.Null. A System.Data.SqlTypes.SqlMoney structure. A System.Data.SqlTypes.SqlMoney structure.

op_LessThan

[C#] public static SqlBoolean operator
[C++] public: static SqlBoolean op_LessThan(SqlMoney x, SqlMoney y);
[VB] returnValue=SqlMoney.op_LessThan(x, y)
[JScript] returnValue=x<y;
Description Performs a logical comparison of the two System.Data.SqlTypes.SqlMoney parameters to determine if the first is less than the second.

Return Value: A System.Data.SqlTypes.SqlBoolean that is System.Data.SqlTypes.SqlBoolean.True if the first instance is less than the second instance, otherwise System.Data.SqlTypes.SqlBoolean.False. If either instance of System.Data.SqlTypes.SqlMoney is null, the System.Data.SqlTypes.SqlBoolean.Value of the System.Data.SqlTypes.SqlBoolean will be System.Data.SqlTypes.SqlBoolean.Null. A System.Data.SqlTypes.SqlMoney structure. A System.Data.SqlTypes.SqlMoney structure.

op_LessThanOrEqual

[C#] public static SqlBoolean operator <=(SqlMoney x, SqlMoney y);
[C++] public: static SqlBoolean op_LessThanOrEqual(SqlMoney x, SqlMoney y);
[VB] returnValue=SqlMoney.op_LessThanOrEqual(x, y)
[JScript] returnValue=x<=y;
Description Performs a logical comparison of the two System.Data.SqlTypes.SqlMoney parameters to determine if the first is less than or equal to the second.

Return Value: A System.Data.SqlTypes.SqlBoolean that is System.Data.SqlTypes.SqlBoolean.True if the first instance is less than or equal to the second instance, otherwise System.Data.SqlTypes.SqlBoolean.False. If either instance of System.Data.SqlTypes.SqlMoney is null, the System.Data.SqlTypes.SqlBoolean.Value of the System.Data.SqlTypes.SqlBoolean will be System.Data.SqlTypes.SqlBoolean.Null. A System.Data.SqlTypes.SqlMoney structure. A System.Data.SqlTypes.SqlMoney structure.

op_Multiply

[C#] public static SqlMoney operator*(SqlMoney x, SqlMoney y);
[C++] public: static SqlMoney op_Multiply(SqlMoney x, SqlMoney y);
[VB] returnValue=SqlMoney.op_Multiply(x, y)
[JScript] returnValue=x*y;
Description The multiplicaion operator calculates the product of the two System.Data.SqlTypes.SqlMoney parameters.

Return Value: A new System.Data.SqlTypes.SqlMoney structure whose System.Data.SqlTypes.SqlMoney.Value contains the product of the multiplication. A System.Data.SqlTypes.SqlMoney structure. A System.Data.SqlTypes.SqlMoney structure.

op_Subtraction

[C#] public static SqlMoney operator −(SqlMoney x, SqlMoney y);
[C++] public: static SqlMoney op_Subtraction(SqlMoney x, SqlMoney y);
[VB] returnValue=SqlMoney.op_Subtraction(x, y)
[JScript] returnValue=x−y;
Description The subtraction operator subtracts the second System.Data.SqlTypes.SqlMoney parameter from the first.

Return Value: A new System.Data.SqlTypes.SqlMoney structure containing the results of the subtraction. A System.Data.SqlTypes.SqlMoney structure. A System.Data.SqlTypes.SqlMoney structure.

op_UnaryNegation

[C#] public static SqlMoney operator−(SqlMoney x);
[C++] public: static SqlMoney op_UnaryNegation(SqlMoney x);
[VB] returnValue=SqlMoney.op_UnaryNegation(x)
[JScript] returnValue=−x;
Description The unary minus operator negates the System.Data.SqlTypes.SqlMoney parameter.

Return Value: A System.Data.SqlTypes.SqlMoney structure whose System.Data.SqlTypes.SqlMoney.Value contains the results of the negation. The System.Data.SqlTypes.SqlMoney structure to be negated.

Parse

[C#] public static SqlMoney Parse(string s);

[C++] public: static SqlMoney Parse(String* s);
[VB] Public Shared Function Parse(ByVal s As String) As SqlMoney
[JScript] public static function Parse(s: String): SqlMoney;
Description
[ . ] [ . ]
Subtract
[C#] public static SqlMoney Subtract(SqlMoney x, SqlMoney y);
[C++] public: static SqlMoney Subtract(SqlMoney x, SqlMoney y);
[VB] Public Shared Function Subtract(ByVal x As SqlMoney, ByVal y As SqlMoney) As SqlMoney
[JScript] public static function Subtract(x: SqlMoney, y: SqlMoney): SqlMoney;
Description
[ . ]
ToDecimal
[C#] public decimal ToDecimal( );
[C++] public: Decimal ToDecimal( );
[VB] Public Function ToDecimal( ) As Decimal
[JScript] public function ToDecimal( ): Decimal;
Description
Converts the Value of this instance of System.Data.SqlTypes.SqlMoney as a System.Decimal structure.
Return Value: A System.Decimal structure whose value equals the System.Data.SqlTypes.SqlMoney.Value property of this System.Data.SqlTypes.SqlMoney structure.
ToDouble
[C#] public double ToDouble( );
[C++] public: double ToDouble( );
[VB] Public Function ToDouble( ) As Double
[JScript] public function ToDouble( ): double;
Description
Converts this System.Data.SqlTypes.SqlMoney structure to a double.
Return Value: A double with a value equal to this System.Data.SqlTypes.SqlMoney structure.
ToInt32
[C#] public int ToInt32( );
[C++] public: int ToInt32( );
[VB] Public Function ToInt32( ) As Integer
[JScript] public function ToInt32( ) int;
Description
Converts this System.Data.SqlTypes.SqlMoney structure to integer.
Return Value: A 32-bit integer whose value equals the integer portion of this System.Data.SqlTypes.SqlMoney structure.
ToInt64
[C#] public long ToInt64( );
[C++] public: __int64 ToInt64( );
[VB] Public Function ToInt64( ) As Long
[JScript] public function ToInt64( ): long;
Description
Converts the Value of this System.Data.SqlTypes.SqlMoney structure to long.
Return Value: A 64-bit integer whose value equals the integer portion of this System.Data.SqlTypes.SqlMoney structure.
ToSqlBoolean
[C#] public SqlBoolean ToSqlBoolean( );
[C++] public: SqlBoolean ToSqlBoolean( );
[VB] Public Function ToSqlBoolean( ) As SqlBoolean
[JScript] public function ToSqlBoolean( ): SqlBoolean;
Description
[ . ]
ToSqlByte
[C#] public SqlByte ToSqlByte( );
[C++] public: SqlByte ToSqlByte( );
[VB] Public Function ToSqlByte( ) As SqlByte
[JScript] public function ToSqlByte( ): SqlByte;
Description
[ . ]
ToSqlDecimal
[C#] public SqlDecimal ToSqlDecimal( );
[C++] public: SqlDecimal ToSqlDecimal( );
[VB] Public Function ToSqlDecimal( ) As SqlDecimal
[JScript] public function ToSqlDecimal( ): SqlDecimal;
Description
[ . ]
ToSqlDouble
[C#] public SqlDouble ToSqlDouble( );
[C++] public: SqlDouble ToSqlDouble( );
[VB] Public Function ToSqlDouble( ) As SqlDouble
[JScript] public function ToSqlDouble( ): SqlDouble;
Description
[ . ]
ToSqlInt16
[C#] public SqlInt16 ToSqlInt16( );
[C++] public: SqlInt16 ToSqlInt16( );
[VB] Public Function ToSqlInt16( ) As SqlInt16
[JScript] public function ToSqlInt16( ): SqlInt16;
Description
[ . ]
ToSqlInt32
[C#] public SqlInt32 ToSqlInt32( );
[C++] public: SqlInt32 ToSqlInt32( );
[VB] Public Function ToSqlInt32( ) As SqlInt32
[JScript] public function ToSqlInt32( ): SqlInt32;
Description
[ . ]
ToSqlInt64
[C#] public SqlInt64 ToSqlInt64( );
[C++] public: SqlInt64 ToSqlInt64( );
[VB] Public Function ToSqlInt64( ) As SqlInt64
[JScript] public function ToSqlInt64( ): SqlInt64;
Description
[ . ]
ToSqlSingle
[C#] public SqlSingle ToSqlSingle( );
[C++] public: SqlSingle ToSqlSingle( );
[VB] Public Function ToSqlSingle( ) As SqlSingle
[JScript] public function ToSqlSingle( ): SqlSingle;
Description
[ . ]
ToSqlString
[C#] public SqlString ToSqlString( );
[C++] public: SqlString ToSqlString( );
[VB] Public Function ToSqlString( ) As SqlString
[JScript] public function ToSqlString( ): SqlString;
Description
[ . ]
ToString
[C#] public override string ToString( );
[C++] public: String* ToString( );
[VB] Overrides Public Function ToString( ) As String
[JScript] public override function ToString( ): String; Converts a System.Data.SqlTypes.SqlMoney structure to string.
Description
Converts this instance of System.Data.SqlTypes.SqlMoney to string.
Return Value: A string whose value is the string representation of the System.Data.SqlTypes.SqlMoney.Value property of this System.Data.SqlTypes.SqlMoney structure.

SqlNullValueException class (System.Data.SqlTypes)
ToString
Description
  The exception that is thrown when the Value property of a SqlTypes structure is set to null.
  In order to avoid throwing this exception, you should always check the IsNull property of the structure before accessing the Value property.
    SqlNullValueException
    Example Syntax:
    ToString
[C#] public SqlNullValueException( );
[C++] public: SqlNullValueException( );
[VB] Public Sub New( )
[JScript] public function SqlNullValueException( ); Initializes a new instance of the System.Data.SqlTypes.SqlNullValueException class.
Description
  Initializes a new instance of the System.Data.SqlTypes.SqlNullValueException class with default properties.
    SqlNullValueException
    Example Syntax:
    ToString
[C#] public SqlNullValueException(string message);
[C++] public: SqlNullValueException(String* message);
[VB] Public Sub New(ByVal message As String)
[JScript] public function SqlNullValueException(message: String);
Description
  Initializes a new instance of the System.Data.SqlTypes.SqlNullValueException class with a specified error message. The error message that explains the reason for the exception.
    HelpLink
    HResult
    InnerException
    Message
    Source
    StackTrace
    TargetSite
    ISerializable.GetObjectData
[C#] void ISerializable.GetObjectData(SerializationInfo si, StreamingContext context);
[C++] void ISerializable::GetObjectData(SerializationInfo* si, StreamingContext context);
[VB] Sub GetObjectData(ByVal si As SerializationInfo, ByVal context As StreamingContext) Implements ISerializable.GetObjectData
[JScript] function ISerializable.GetObjectData(si: SerializationInfo, context StreamingContext);
SqlSingle structure (System.Data.SqlTypes)
ToString
Description
  Represents a floating point number within the range of −3.40E+38 through 3.40E+38 to be stored in or retrieved from a database.
    ToString
[C#] public static readonly SqlSingle MaxValue;
[C++] public: static SqlSingle MaxValue;
[VB] Public Shared ReadOnly MaxValue As SqlSingle
[JScript] public static var MaxValue: SqlSingle;
Description
  Represents the maximum value that can be assigned to the System.Data.SqlTypes.SqlSingle.Value property of an instance of the System.Data.SqlTypes.SqlSingle class.
  The value of this constant is −3.40E+38.
    ToString
[C#] public static readonly SqlSingle MinValue;
[C++] public: static SqlSingle MinValue;
[VB] Public Shared ReadOnly MinValue As SqlSingle
[JScript] public static var MinValue: SqlSingle;
Description
  Represents the minimum value that can be assigned to System.Data.SqlTypes.SqlSingle.Value property of an instance of the System.Data.SqlTypes.SqlSingle class. The value of this constant is 3.40E+38.
    ToString
[C#] public static readonly SqlSingle Null;
[C++] public: static SqlSingle Null;
[VB] Public Shared ReadOnly Null As SqlSingle
[JScript] public static var Null: SqlSingle;
Description
  [ . ]
    ToString
[C#] public static readonly SqlSingle Zero;
[C++] public: static SqlSingle Zero;
[VB] Public Shared ReadOnly Zero As SqlSingle
[JScript] public static var Zero: SqlSingle;
Description
  Represents the zero value that can be assigned to the System.Data.SqlTypes.SqlSingle.Value property of an instance of the System.Data.SqlTypes.SqlSingle class.
  System.Data.SqlTypes.SqlSingle.Zero functions as a constant for the System.Data.SqlTypes.SqlSingle class.
    SqlSingle
    Example Syntax:
    ToString
[C#] public SqlSingle(double value);
[C++] public: SqlSingle(double value);
[VB] Public Sub New(ByVal value As Double)
[JScript] public function SqlSingle(value: double);
Description
  Initializes a new instance of the System.Data.SqlTypes.SqlSingle structure using the supplied double parameter. A double value which will be used as the System.Data.SqlTypes.SqlSingle.Value of the new System.Data.SqlTypes.SqlSingle structure.
    SqlSingle
    Example Syntax:
    ToString
[C#] public SqlSingle(float value);
[C++] public: SqlSingle(float value);
[VB] Public Sub New(ByVal value As Single)
[JScript] public function SqlSingle(value: float); Initializes a new instance of the System.Data.SqlTypes.SqlSingle structure using the supplied floating point value.
Description
  Initializes a new instance of the System.Data.SqlTypes.SqlSingle structure. A floating point number which will be used as the System.Data.SqlTypes.SqlSingle.Value of the new System.Data.SqlTypes.SqlSingle structure.
    IsNull
    ToString
[C#] public bool IsNull {get;}
[C++] public: __property bool get_IsNull( );
[VB] Public ReadOnly Property IsNull As Boolean
[JScript] public function get IsNull( ): Boolean;
Description
  Returns a value indicating whether the System.Data.SqlTypes.SqlSingle.Value property is assigned to null.
    Value
    ToString
[C#] public float Value {get;}
[C++] public: __property float get_Value( );

[VB] Public ReadOnly Property Value As Single
[JScript] public function get Value( ): float;
Description
    Gets the value of this System.Data.SqlTypes.SqlSingle structure. This property is read-only.
    Add
[C#] public static SqlSingle Add(SqlSingle x, SqlSingle y);
[C++] public: static SqlSingle Add(SqlSingle x, SqlSingle y);
[VB] Public Shared Function Add(ByVal x As SqlSingle, ByVal y As SqlSingle) As SqlSingle
[JScript] public static function Add(x: SqlSingle, y: SqlSingle): SqlSingle;
Description
    [ . ]
    CompareTo
[C#] public int CompareTo(object value);
[C++] public: _sealed int CompareTo(Object* value);
[VB] NotOverridable Public Function CompareTo(ByVal value As Object) As Integer
[JScript] public function CompareTo(value: Object): int;
Description
    Compares this instance to the supplied object and returns an indication of their relative values.
Return Value: A signed number indicating the relative values of the instance and the object. The object to be compared.
    Divide
[C#] public static SqlSingle Divide(SqlSingle x, SqlSingle y);
[C++] public: static SqlSingle Divide(SqlSingle x, SqlSingle y);
[VB] Public Shared Function Divide(ByVal x As SqlSingle, ByVal y As SqlSingle) As SqlSingle
[JScript] public static function Divide(x: SqlSingle, y: SqlSingle): SqlSingle;
Description
    [ . ]
    Equals
[C#] public override bool Equals(object value);
[C++] public: bool Equals(Object* value);
[VB] Overrides Public Function Equals(ByVal value As Object) As Boolean
[JScript] public override function Equals(value: Object): Boolean;
Description
    Compares the supplied object parameter to the System.Data.SqlTypes.SqlSingle.Value property of the System.Data.SqlTypes.SqlSingle object.
Return Value: Equals will return true if the object is an instance of System.Data.SqlTypes.SqlSingle and the two are equal; otherwise false. The object to be compared.
    Equals
[C#] public static new SqlBoolean Equals(SqlSingle x, SqlSingle y);
[C++] public: static SqlBoolean Equals(SqlSingle x, SqlSingle y);
[VB] Shadows Public Shared Function Equals(ByVal x As SqlSingle, ByVal y As SqlSingle) As SqlBoolean
[JScript] public static hide function Equals(x: SqlSingle, y: SqlSingle); SqlBoolean;
Description
    [ . ]
    GetHashCode
[C#] public override int GetHashCode( );
[C++] public: int GetHashCode( );
[VB] Overrides Public Function GetHashCode( ) As Integer
[JScript] public override function GetHashCode( ): int;
Description
    Gets the hash code for this instance.
Return Value: A 32-bit signed integer hash code.
    GreaterThan
[C#] public static SqlBoolean GreaterThan(SqlSingle x, SqlSingle y);
[C++] public: static SqlBoolean GreaterThan(SqlSingle x, SqlSingle y);
[VB] Public Shared Function GreaterThan(ByVal x As SqlSingle, ByVal y As SqlSingle) As SqlBoolean
[JScript] public static function GreaterThan(x: SqlSingle, y: SqlSingle): SqlBoolean;
Description
    [ . ]
    GreaterThanOrEqual
[C#] public static SqlBoolean GreaterThanOrEqual(SqlSingle x, SqlSingle y);
[C++] public: static SqlBoolean GreaterThanOrEqual(SqlSingle x, SqlSingle y);
[VB] Public Shared Function GreaterThanOrEqual(ByVal x As SqlSingle, ByVal y As SqlSingle) As SqlBoolean
[JScript] public static function GreaterThanOrEqual(x: SqlSingle, y: SqlSingle): SqlBoolean;
Description
    [ . ]
    LessThan
[C#] public static SqlBoolean LessThan(SqlSingle x, SqlSingle y);
[C++] public: static SqlBoolean LessThan(SqlSingle x, SqlSingle y);
[VB] Public Shared Function LessThan(ByVal x As SqlSingle, ByVal y As SqlSingle) As SqlBoolean
[JScript] public static function LessThan(x: SqlSingle, y: SqlSingle): SqlBoolean;
Description
    [ . ]
    LessThanOrEqual
[C#] public static SqlBoolean LessThanOrEqual(SqlSingle x, SqlSingle y);
[C++] public: static SqlBoolean LessThanOrEqual(SqlSingle x, SqlSingle y);
[VB] Public Shared Function LessThanOrEqual(ByVal x As SqlSingle, ByVal y As SqlSingle) As SqlBoolean
[JScript] public static function LessThanOrEqual(x: SqlSingle, y: SqlSingle): SqlBoolean;
Description
    [ . ]
    Multiply
[C#] public static SqlSingle Multiply(SqlSingle x, SqlSingle y);
[C++] public: static SqlSingle Multiply(SqlSingle x, SqlSingle y);
[VB] Public Shared Function Multiply(ByVal x As SqlSingle, ByVal y As SqlSingle) As SqlSingle
[JScript] public static function Multiply(x: SqlSingle, y: SqlSingle): SqlSingle;
Description
    [ . ]
    NotEquals
[C#] public static SqlBoolean NotEquals(SqlSingle x, SqlSingle y);
[C++] public: static SqlBoolean NotEquals(SqlSingle x, SqlSingle y);
[VB] Public Shared Function NotEquals(ByVal x As SqlSingle, ByVal y As SqlSingle) As SqlBoolean
[JScript] public static function NotEquals(x: SqlSingle, y: SqlSingle): SqlBoolean;

Description
[ . ]
op_Addition
[C#] public static SqlSingle operator +(SqlSingle x, SqlSingle y);
[C++] public: static SqlSingle op_Addition(SqlSingle x, SqlSingle y);
[VB] returnValue=SqlSingle.op_Addition(x, y)
[JScript] returnValue=x+y;
Description
[ . ] [ . ] A System.Data.SqlTypes.SqlSingle structure. A System.Data.SqlTypes.SqlSingle structure.
op_Division
[C#] public static SqlSingle operator/(SqlSingle x, SqlSingle y);
[C++] public: static SqlSingle op_Division(SqlSingle y);
[VB] returnValue=SqlSingle.op_Division(x, y)
[JScript] returnValue=x/y;
Description
[ . ] [ . ] A System.Data.SqlTypes.SqlSingle structure. A System.Data.SqlTypes.SqlSingle structure.
op_Equality
[C#] public static SqlBoolean operator==(SqlSingle x, SqlSingle y);
[C++] public: static SqlBoolean op_Equality(SqlSingle x, SqlSingle y);
[VB] returnValue=SqlSingle.op_Equality(x, y)
[JScript] returnValue=x==y;
Description
Performs a logical comparison of the two SqlSingle parameters to determine if they are equal.
Return Value: A System.Data.SqlTypes.SqlBoolean that is System.Data.SqlTypes.SqlBoolean.True if the two instances are equal or System.Data.SqlTypes.SqlBoolean.False if the two instances are not equal. If either instance of System.Data.SqlTypes.SqlSingle is null, the System.Data.SqlTypes.SqlBoolean.Value of the System.Data.SqlTypes.SqlBoolean will be System.Data.SqlTypes.SqlBoolean.Null. A System.Data.SqlTypes.SqlSingle structure. A System.Data.SqlTypes.SqlSingle structure.
op_Explicit
[C#] public static explicit operator SqlSingle(SqlBoolean x);
[C++] public: static SqlSingle op_Explicit(SqlBoolean x);
[VB] returnValue=SqlSingle.op_Explicit(x)
[JScript] returnValue=SqlSingle(x);
Description
This implicit operator converts the supplied System.Data.SqlTypes.SqlBit to System.Data.SqlTypes.SqlSingle
Return Value: A new System.Data.SqlTypes.SqlSingle structure whose System.Data.SqlTypes.SqlSingle.Value is equal to the System.Data.SqlTypes.SqlBit.ByteValue of the System.Data.SqlTypes.SqlBit parameter. The System.Data.SqlTypes.SqlBit structure to be converted.
op_Explicit
[C#] public static explicit operator SqlSingle(SqlDouble x);
[C++] public: static SqlSingle op_Explicit(SqlDouble x);
[VB] returnValue=SqlSingle.op_Explicit(x)
[JScript] returnValue=SqlSingle(x);
Description
Converts the supplied System.Data.SqlTypes.SqlDouble parameter to System.Data.SqlTypes.SqlSingle
Return Value: A new System.Data.SqlTypes.SqlSingle structure whose System.Data.SqlTypes.SqlSingle.Value is equal to the System.Data.SqlTypes.SqlDouble.Value of the System.Data.SqlTypes.SqlDouble parameter. The System.Data.SqlTypes.SqlDouble parameter to be converted.
op_Explicit
[C#] public static explicit operator float(SqlSingle x);
[C++] public: static float op_Explicit( );
[VB] returnValue=SqlSingle.op_Explicit(x)
[JScript] returnValue Single(x);
Description
[ . ] [ . ]
op_Explicit, [C#] public static explicit operator SqlSingle(SqlString x);
[C++] public: static SqlSingle op_Explicit(SqlString x);
[VB] returnValue=SqlSingle.op_Explicit(x)
[JScript] returnValue=SqlSingle(x);
Description
Converts the supplied System.Data.SqlTypes.SqlString parameter to System.Data.SqlTypes.SqlSingle
Return Value: A new System.Data.SqlTypes.SqlSingle structure whose System.Data.SqlTypes.SqlSingle.Value is equal to the value represented by the System.Data.SqlTypes.SqlString parameter. The SqlString object to be converted.
op_GreaterThan
[C#] public static SqlBoolean operator >(SqlSingle x, SqlSingle y);
[C++] public: static SqlBoolean op_GreaterThan(SqlSingle x, SqlSingle y);
[VB] returnValue=SqlSingle.op_GreaterThan(x, y)
[JScript] returnValue=x>;
Description
Performs a logical comparison of the two System.Data.SqlTypes.SqlSingle operands to determine if the first is greater than the second.
Return Value: A System.Data.SqlTypes.SqlBoolean that is System.Data.SqlTypes.SqlBoolean.True if the first instance is greater than the second instance, otherwise System.Data.SqlTypes.SqlBoolean.False. If either instance of System.Data.SqlTypes.SqlSingle is null, the System.Data.SqlTypes.SqlBoolean.Value of the System.Data.SqlTypes.SqlBoolean will be System.Data.SqlTypes.SqlBoolean.Null. A System.Data.SqlTypes.SqlSingle structure. A System.Data.SqlTypes.SqlSingle structure.
op_GreaterThanOrEqual
[C#] public static SqlBoolean operator >=(SqlSingle x, SqlSingle y);
[C++] public: static SqlBoolean op_GreaterThanOrEqual (SqlSingle x, SqlSingle y);
[VB] returnValue =SqlSingle.op_GreaterThanOrEqual(x, y)
[JScript] returnValue=x>=y;
Description
Performs a logical comparison of two System.Data.SqlTypes.SqlSingle structures to determine if the first is greater than or equl to the second.
Return Value: A System.Data.SqlTypes.SqlBoolean that is System.Data.SqlTypes.SqlBoolean.True if the first instance is greater than or equal to the second instance, otherwise System.Data.SqlTypes.SqlBoolean.False. If either instance of System.Data.SqlTypes.SqlSingle is null, the System.Data.SqlTypes.SqlBoolean.Value of the System.Data.SqlTypes.SqlBoolean will be System.Data.SqlTypes.SqlBoolean.Null. A System.Data.SqlTypes.SqlSingle structure. A System.Data.SqlTypes.SqlSingle structure.
op_Implicit
[C#] public static implicit operator SqlSingle(float x);
[C++] public: static SqlSingle op_Implicit(float x);
[VB] returnValue=SqlSingle.op_Implicit(x)
[JScript] returnValue=x;
Description
[ . ] [ . ]

op_Implicit
[C#] public static implicit operator SqlSingle(SqlByte x);
[C++] public: static SqlSingle op_Implicit(SqlByte x);
[VB] returnValue=SqlSingle.op_Implicit(x)
[JScript] returnValue=x;
Description
　　This implicit operator converts the System.Data.Sql-Types.SqlByte parameter to System.Data.SqlTypes.SqlSingle
　　Return Value: A new System.Data.SqlTypes.SqlSingle structure whose System.Data.SqlTypes.SqlSingle.Value property equals the System.Data.SqlTypes.SqlByte.Value of the System.Data.SqlTypes.SqlByte parameter. The System.Data.SqlTypes.SqlByte to be converted.
　　op_Implicit
[C#] public static implicit operator SqlSingle(SqlDecimal x);
[C++] public: static SqlSingle op_Implicit(SqlDecimal x);
[VB] returnValue=SqlSingle.op_Implicit(x)
[JScript] returnValue=x;
Description
　　Converts the supplied System.Data.SqlTypes.SqlDecimal parameter to System.Data.SqlTypes.SqlSingle
　　Return Value: A new System.Data.SqlTypes.SqlSingle structure whose System.Data.SqlTypes.SqlSingle.Value is equal to the System.Data.SqlTypes.SqlDecimal.Value of the System.Data.SqlTypes.SqlDecimal parameter. The System.Data.SqlTypes.SqlDecimal structure to be converted.
　　op_Implicit
[C#] public static implicit operator SqlSingle(SqlInt16 x);
[C++] public: static SqlSingle op_Implicit(SqlInt16 x);
[VB] returnValue=SqlSingle.op_Implicit(x)
[JScript] returnValue=x;
Description
　　Converts the supplied System.Data.SqlTypes.SqlInt16 parameter to System.Data.SqlTypes.SqlSingle
　　Return Value: A new System.Data.SqlTypes.SqlSingle structure whose System.Data.SqlTypes.SqlSingle.Value is equal to the System.Data.SqlTypes.SqlInt16.Value of the System.Data.SqlTypes.SqlInt16 parameter. The System.Data.SqlTypes.SqlInt16 structure to be converted.
　　op_Implicit
[C#] public static implicit operator SqlSingle(SqlInt32 x);
[C++] public: static SqlSingle op_Implicit(SqlInt32 x);
[VB] returnValue=SqlSingle.op_Implicit(x)
[JScript] returnValue=x;
Description
　　Converts the supplied System.Data.SqlTypes.SqlInt32 structure to System.Data.SqlTypes.SqlSingle
　　Return Value: A new System.Data.SqlTypes.SqlSingle structure whose System.Data.SqlTypes.SqlSingle.Value is equal to the System.Data.SqlTypes.SqlInt32.Value of the System.Data.SqlTypes.SqlInt32 parameter. The System.Data.SqlTypes.SqlInt32 structure to be converted.
　　op_Implicit
[C#] public static implicit operator SqlSingle(SqlInt64 x);
[C++] public: static SqlSingle op_Implicit(SqlInt64 x);
[VB] returnValue=SqlSingle.op_Implicit(x)
[JScript] returnValue=x;
Description
　　Converts the supplied System.Data.SqlTypes.SqlInt64 parameter to System.Data.SqlTypes.SqlSingle
　　Return Value: A new System.Data.SqlTypes.SqlSingle structure whose System.Data.SqlTypes.SqlSingle.Value is equal to the System.Data.SqlTypes.SqlInt64.Value of the System.Data.SqlTypes.SqlInt64 parameter. The System.Data.SqlTypes.SqlInt64 structure to be converted.

op_Implicit
[C#] public static implicit operator SqlSingle(SqlMoney x);
[C++] public: static SqlSingle op_Implicit(SqlMoney x);
[VB] returnValue=SqlSingle.op_Implicit(x)
[JScript] returnValue=x;
Description
　　Converts the supplied System.Data.SqlTypes.SqlMoney structure to System.Data.SqlTypes.SqlSingle.
　　Return Value: A new System.Data.SqlTypes.SqlSingle structure whose System.Data.SqlTypes.SqlSingle.Value is equal to the System.Data.SqlTypes.SqlMoney.Value of the System.Data.SqlTypes.SqlMoney parameter. The System.Data.SqlTypes.SqlMoney structure to be converted.
　　op_Inequality
[C#] public static SqlBoolean operator !=(SqlSingle x, SqlSingle y);
[C++] public: static SqlBoolean op_Inequality(SqlSingle x, SqlSingle y);
[VB] returnValue=SqlSingle.op_Inequality(x, y)
[JScript] returnValue=x !=y;
Description
　　Performs a logical comparison of the two System.Data.SqlTypes.SqlSingle parameters to determine if they are equal.
　　Return Value: A System.Data.SqlTypes.SqlBoolean that is System.Data.SqlTypes.SqlBoolean.True if the two instances are not equal or System.Data.SqlTypes.SqlBoolean.False if the two instances are equal. If either instance of System.Data.SqlTypes.SqlSingle is null, the System.Data.SqlTypes.SqlBoolean.Value of the System.Data.SqlTypes.SqlBoolean will be System.Data.SqlTypes.SqlBoolean.Null. A System.Data.SqlTypes.SqlSingle structure. A System.Data.SqlTypes.SqlSingle structure.
　　op_LessThan
[C#] public static SqlBoolean operator
[C++] public: static SqlBoolean op_LessThan(SqlSingle x, SqlSingle y);
[VB] returnValue=SqlSingle.op_LessThan(x, y)
[JScript] returnValue=x<y;
Description
　　Performs a logical comparison of the two System.Data.SqlTypes.SqlSingle parameters to determine if the first is less than the second.
　　Return Value: A System.Data.SqlTypes.SqlBoolean that is System.Data.SqlTypes.SqlBoolean.True if the first instance is less than the second instance, otherwise System.Data.SqlTypes.SqlBoolean.False. If either instance of System.Data.SqlTypes.SqlSingle is null, the System.Data.SqlTypes.SqlBoolean.Value of the System.Data.SqlTypes.SqlBoolean will be System.Data.SqlTypes.SqlBoolean.Null. A System.Data.SqlTypes.SqlSingle structure. A System.Data.SqlTypes.SqlSingle structure.
　　op_LessThanOrEqual
[C#] public static SqlBoolean operator<=(SqlSingle x, SqlSingle y);
[C++] public: static SqlBoolean op_LessThanOrEqual (SqlSingle x, SqlSingle y);
[VB] returnValue=SqlSingle.op_LessThanOrEqual(x, y)
[JScript] returnValue=x<=y;
Description
　　Performs a logical comparison of the two System.Data.SqlTypes.SqlSingle parameters to determine if the first is less than or equal to the second.
　　Return Value: A System.Data.SqlTypes.SqlBoolean that is System.Data.SqlTypes.SqlBoolean.True if the first instance is less than or equal to the second instance, otherwise System.Data.SqlTypes.SqlBoolean.False. If either instance of System.Data.SqlTypes.SqlSingle is null, the System.Data.SqlTypes.SqlBoolean.Value of the System.Data.SqlTypes.SqlBoolean will be System.Data.SqlTypes.SqlBoolean.Null. A System.Data.SqlTypes.SqlSingle structure. A System.Data.SqlTypes.SqlSingle structure.

op_Multiply
[C#] public static SqlSingle operator*(SqlSingle x, SqlSingle y);
[C++] public: static SqlSingle op_Multiply(SqlSingle x, SqlSingle y);
[VB] returnValue=SqlSingle.op_Multiply(x, y)
[JScript] returnValue=x*y;
Description
[ .] [ .] A System.Data.SqlTypes.SqlSingle structure. A System.Data.SqlTypes.SqlSingle structure.

op_Subtraction
[C#] public static SqlSingle operator-(SqlSingle x, SqlSingle y);
[C++] public: static SqlSingle op_Subtraction(SqlSingle x, SqlSingle y);
[VB] returnValue=SqlSingle.op_Subtraction(x, y)
[JScript] returnValue=x-y;
Description
[ .] [ .] A System.Data.SqlTypes.SqlSingle structure. A System.Data.SqlTypes.SqlSingle structure.

op_UnaryNegation
[C#] public static SqlSingle operator-(SqlSingle
[C++] public: static SqlSingle op_UnaryNegation (SqlSingle x);
[VB] returnValue=SqlSingle.op_UnaryNegation(x)
[JScript] returnValue=-x;
Description
[ .] [ .] A System.Data.SqlTypes.SqlSingle structure.

Parse
[C#] public static SqlSingle Parse(string s);
[C++] public: static SqlSingle Parse(String* s);
[VB] Public Shared Function Parse(ByVal s As String) As SqlSingle
[JScript] public static function Parse(s: String): SqlSingle;
Description
[ .] [ .]

Subtract
[C#] public static SqlSingle Subtract(SqlSingle x, SqlSingle y);
[C++] public: static SqlSingle Subtract(SqlSingle x, SqlSingle y);
[VB] Public Shared Function Subtract(ByVal x As SqlSingle, ByVal y As SqlSingle) As SqlSingle
[JScript] public static function Subtract(x: SqlSingle, y: SqlSingle): SqlSingle;
Description
[ .]

ToSqlBoolean
[C#] public SqlBoolean ToSqlBoolean( );
[C++] public: SqlBoolean ToSqlBoolean( );
[VB] Public Function ToSqlBoolean( ) As SqlBoolean
[JScript] public function ToSqlBoolean( ): SqlBoolean;
Description
[ .]

ToSqlByte
[C#] public SqlByte ToSqlByte( );
[C++] public: SqlByte ToSqlByte( );
[VB] Public Function ToSqlByte( ) As SqlByte
[JScript] public function ToSqlByte( ): SqlByte;
Description
[ .]

ToSqlDecimal
[C#] public SqlDecimal ToSqlDecimal( );
[C++] public: SqlDecimal ToSqlDecimal( );
[VB] Public Function ToSqlDecimal( ) As SqlDecimal
[JScript] public function ToSqlDecimal( ): SqlDecimal;
Description
[ .]

ToSqlDouble
[C#] public SqlDouble ToSqlDouble( );
[C++] public: SqlDouble ToSqlDouble( );
[VB] Public Function ToSqlDouble( ) As SqlDouble
[JScript] public function ToSqlDouble( ): SqlDouble;
Description
[ .]

ToSqlInt16
[C#] public SqlInt16 ToSqlInt16( );
[C++] public: SqlInt16 ToSqlInt16( );
[VB] Public Function ToSqlInt16( ) As SqlInt16
[JScript] public function ToSqlInt16( ): SqlInt16;
Description
[ .]

ToSqlInt32.
[C#] public SqlInt32 ToSqlInt32( );
[C++] public: SqlInt32 ToSqlInt32( );
[VB] Public Function ToSqlInt32( ) As SqlInt32
[JScript] public function ToSqlInt32( ): SqlInt32;
Description
[ .]

ToSqlInt64
[C#] public SqlInt64 ToSqlInt64( );
[C++] public: SqlInt64 ToSqlInt64( );
[VB] Public Function ToSqlInt64( ) As SqlInt64
[JScript] public function ToSqlInt64( ): SqlInt64;
Description
[ .]

ToSqlMoney
[C#] public SqlMoney ToSqlMoney( );
[C++] public: SqlMoney ToSqlMoney( );
[VB] Public Function ToSqlMoney( ) As SqlMoney
[JScript] public function ToSqlMoney( ): SqlMoney;
Description.

ToSqlString
[C#] public SqlString ToSqlString( );
[C++] public: SqlString ToSqlString( );
[VB] Public Function ToSqlString( ) As SqlString
[JScript] public function ToSqlString( ): A SqlString;
Description
[ .]

ToString
[C#] public override string ToString( );
[C++] public: String* ToString( );
[VB] Overrides Public Function ToString( ) As String
[JScript] public override function ToString( ): String;
Description
[ .] [ .]
SqlString structure (System.Data.SqlTypes)
ToString
Description
Represents a variable-length stream of characters to be stored in or retrieved from the database.
ToString
[C#] public static readonly int BinarySort;
[C++] public: static int BinarySort;
[VB] Public Shared ReadOnly BinarySort As Integer
[JScript] public static var BinarySort: int;
Description
Specifies that sorts should be based on a characters numeric value rather than its alphabetic value.

System.Data.SqlTypes.SqlString.BinarySort functions as a constant for the System.Data.SqlTypes.SqlString class.
ToString
[C#] public static readonly int IgnoreCase;
[C++] public: static int IgnoreCase;
[VB] Public Shared ReadOnly IgnoreCase As Integer
[JScript] public static var IgnoreCase: int;
Description
Specifies that SqlString comparisons should ignore case.
System.Data.SqlTypes.SqlString.IgnoreCase functions as a constant for the System.Data.SqlTypes.SqlString class.
ToString
[C#] public static readonly int IgnoreKanaType;
[C++] public: static int IgnoreKanaType;
[VB] Public Shared ReadOnly IgnoreKanaType As Integer
[JScript] public static var IgnoreKanaType: int;
Description
Specifies that the string comparison must ignore the Kana type. Kana type refers to Japanese hiragana and katakana characters, which represent phonetic sounds in the Japanese language. Hiragana is used for native Japanese expressions and words, while katakana is used for words borrowed from other languages, such as "computer" or "internet". A phonetic sound can be expressed in both hiragana and katakana. If this value is selected, the hiragana character for one sound is considered equal to the katakana character for the same sound.
System.Data.SqlTypes.SqlString.IgnoreKanaType functions as a constant for the System.Data.SqlTypes.SqlString class.
ToString
[C#] public static readonly int IgnoreNonSpace;
[C++] public: static int IgnoreNonSpace;
[VB] Public Shared ReadOnly IgnoreNonSpace As Integer
[JScript] public static var IgnoreNonSpace: int;
Description
Specifies that the string comparison must ignore nonspace combining characters, such as diacritics. The Unicode Standard defines combining characters as characters that are combined with base characters to produce a new character. Non-space combining characters do not take up character space by themselves when rendered. For more information on non-space combining characters, see the Unicode Standard at http://www.unicode.org.
System.Data.SqlTypes.SqlString.IgnoreNonSpace functions as a constant for the System.Data.SqlTypes.SqlString class.
ToString
[C#] public static readonly int IgnoreWidth;
[C++] public: static int IgnoreWidth;
[VB] Public Shared ReadOnly IgnoreWidth As Integer
[JScript] public static var IgnoreWidth: int;
Description
Specifies that the string comparison must ignore the character width. For example, Japanese katakana characters can be written as full-width or half-width and, if this value is selected, the katakana characters written as full-width are considered equal to the same characters written in half-width.
System.Data.SqlTypes.SqlString.IgnoreWidth functions as a constant for the System.Data.SqlTypes.SqlString class.
ToString
[C#] public static readonly SqlString Null;
[C++] public: static SqlString Null;
[VB] Public Shared ReadOnly Null As SqlString
[JScript] public static var Null: SqlString;
Description
Represents a null value that can be assigned to the System.Data.SqlTypes.SqlString.Value property of an instance of the System.Data.SqlTypes.SqlString structure.
Null functions as a constant for the SqlString structure.
SqlString
Example Syntax:
ToString
[C#] public SqlString(string data);
[C++] public: SqlString(String* data);
[VB] Public Sub New(ByVal data As String)
[JScript] public function SqlString(data: String);
Description
Initializes a new instance of the System.Data.SqlTypes.SqlString structure using the specified string. The string to store.
SqlString
Example Syntax:
ToString
[C#] public SqlString(string data, int lcid);
[C++] public: SqlString(String* data, int lcid);
[VB] Public Sub New(ByVal data As String, ByVal lcid As Integer)
[JScript] public function SqlString(data: String, lcid: int);
Description
Initializes a new instance of the System.Data.SqlTypes.SqlString structure using the specified string and locale id values. The string to store. Specifies the geographical locale and language for the new SqlString structure.
SqlString
Example Syntax:
ToString
[C#] public SqlString(int lcid, SqlCompareOptions compareOptions, byte[ ] data);
[C++] public: SqlString(int lcid, SqlCompareOptions compareOptions, unsigned char data _gc[ ]);
[VB] Public Sub New(ByVal lcid As Integer, ByVal compareOptions As SqlCompareOptions, ByVal data( ) As Byte)
[JScript] public function SqlString(lcid: int, compareOptions: SqlCompareOptions, data: Byte[ ]);
Description
Initializes a new instance of the System.Data.SqlTypes.SqlString structure using the specified locale id, compare options, and data. Specifies the geographical locale and language for the new SqlString structure. Specifies the compare options for the new SqlString structure. The data array to store.
SqlString
Example Syntax:
ToString
[C#] public SqlString(string data, int lcid, SqlCompareOptions compareOptions);
[C++] public: SqlString(String* data, int lcid, SqlCompareOptions compareOptions);
[VB] Public Sub New(ByVal data As String, ByVal lcid As Integer, ByVal compareOptions As SqlCompareOptions)
[JScript] public function SqlString(data: String, lcid: int, compareOptions SqlCompareOptions);
Description
Initializes a new instance of the System.Data.SqlTypes.SqlString structure using the specified string, locale id, and compare option values. The string to store. Specifies the geographical locale and language for the new SqlString structure. Specifies the compare options for the new SqlString structure.
SqlString
Example Syntax:

ToString
[C#] public SqlString(int lcid, SqlCompareOptions compareOptions, byte[ ] data, bool fUnicode);
[C++] public: SqlString(int lcid, SqlCompareOptions compareOptions, unsigned char data __gc[ ], bool fUnicode);
[VB] Public Sub New(ByVal lcid As Integer, ByVal compareOptions As SqlCompareOptions, ByVal data( ) As Byte, ByVal fUnicode As Boolean)
[JScript] public function SqlString(lcid: int, compareOptions: SqlCompareOptions, data: Byte[ ], fUnicode: Boolean);
Description
Initializes a new instance of the System.Data.SqlTypes.SqlString class. Specifies the geographical locale and language for the new SqlString structure. Specifies the compare options for the new SqlString structure. The data array to store true if Unicode encoded, otherwise false.
SqlString
Example Syntax:
ToString
[C#] public SqlString(int lcid, SqlCompareOptions compareOptions, byte[ ] data, int index, int count);
[C++] public: SqlString(int lcid, SqlCompareOptions compareOptions, unsigned char data __gc[ ], int index, int count);
[VB] Public Sub New(ByVal lcid As Integer, ByVal compareOptions As SqlCompareOptions, ByVal data( ) As Byte, ByVal index As Integer, ByVal count As Integer)
[JScript] public function SqlString(lcid: int, compareOptions SqlCompareOptions, data: Byte[ ], index: int, count: int); Initializes a new instance of the System.Data.SqlTypes.SqlString class.
Description
Initializes a new instance of the System.Data.SqlTypes.SqlString class. Specifies the geographical locale and language for the new SqlString structure. Specifies the compare options for the new SqlString structure. The data array to store. The starting index within the array. The number of characters from index to copy.
SqlString
Example Syntax:
ToString
[C#] public SqlString(int lcid, SqlCompareOptions compareOptions, byte[ ] data, int index, int count, bool fUnicode);
[C++] public: SqlString(int lcid, SqlCompareOptions compareOptions, unsigned char data __gc[ ], int index, int count, bool fUnicode);
[VB] Public Sub New(ByVal lcid As Integer, ByVal compareOptions As SqlCompareOptions, ByVal data( ) As Byte, ByVal index As Integer, ByVal count As Integer, ByVal fUnicode As Boolean)
[JScript] public function SqlString(lcid: int, compareOptions: SqlCompareOptions, data: Byte[ ], index: int, count: int, fUnicode: Boolean);
Description
Initializes a new instance of the System.Data.SqlTypes.SqlString class. Specifies the geographical locale and language for the new SqlString structure. Specifies the compare options for the new SqlString structure. The data array to store. The starting index within the array. The number of characters from index to copy.true if Unicode encoded, otherwise false.
CompareInfo
ToString
[C#] public CompareInfo CompareInfo {get;}
[C++] public: __property CompareInfo* get__CompareInfo( );
[VB] Public ReadOnly Property CompareInfo As CompareInfo
[JScript] public function get CompareInfo( ): CompareInfo;
Description
[ . ] [ . ]
CultureInfo
ToString
[C#] public CultureInfo CultureInfo {get;}
[C++] public: __property CultureInfo* get__CultureInfo( );
[VB] Public ReadOnly Property CultureInfo As CultureInfo
[JScript] public function get CultureInfo( ): CultureInfo;
Description
[ . ] [ . ]
IsNull
ToString
[C#] public bool IsNull {get;}
[C++] public: __property bool get__IsNull( );
[VB] Public ReadOnly Property IsNull As Boolean
[JScript] public function get IsNull( ): Boolean;
Description
Indicates whether the System.Data.SqlTypes.SqlString.Value of the System.Data.SqlTypes.SqlString is System.Data.SqlTypes.SqlString.Null.
LCID
ToString
[C#] public int LCID {get;}
[C++] public: __property int get__LCID( );
[VB] Public ReadOnly Property LCID As Integer
[JScript] public function get LCID( ): int;
Description
Specifies the geographical locale and language for the SqlString structure.
SqlCompareOptions
ToString
[C#] public SqlCompareOptions SqlCompareOptions {get;}
[C++] public: __property SqlCompareOptions get__SqlCompareOptions( );
[VB] Public ReadOnly Property SqlCompareOptions As SqlCompareOptions
[JScript] public function get SqlCompareOptions( ): SqlCompareOptions;
Description
[ . ] [ . ]
Value
ToString
[C#] public string Value {get;}
[C++] public: __property String* get__Value( );
[VB] Public ReadOnly Property Value As String
[JScript] public function get Value( ): String;
Description
Gets the string that is stored in this System.Data.SqlTypes.SqlString structure. This property is read-only.
Clone
[C#] public SqlString Clone( );
[C++] public: SqlString Clone( );
[VB] Public Function Clone( ) As SqlString
[JScript] public function Clone( ): SqlString;
Description
Creates a copy of this System.Data.SqlTypes.SqlString object.
Return Value: A new System.Data.SqlTypes.SqlString object in which all property values are the same as the original.
CompareOptionsFromSqlCompareOptions
[C#] public static CompareOptions CompareOptionsFromSqlCompareOptions (SqlCompareOptions compareOptions);

[C++] public: static CompareOptions CompareOptionsFromSqlCompareOptions (SqlCompareOptions compareOptions);
[VB] Public Shared Function CompareOptionsFromSqlCompareOptions(ByVal compareOptions As SqlCompareOptions) As CompareOptions
[JScript] public static function CompareOptionsFromSqlCompareOptions (compareOptions: SqlCompareOptions): CompareOptions;
Description
[ .]
CompareTo
[C#] public int CompareTo(object value);
[C++] public: _sealed int CompareTo(Object* value);
[VB] NotOverridable Public Function CompareTo(ByVal value As Object) As Integer
[JScript] public function CompareTo(value: Object): int;
Description
Compares this instance of System.Data.SqlTypes.SqlString to the supplied object and returns an indication of their relative values.
Return Value: A signed number indicating the relative values of the instance and the object. The object to be compared.
Concat
[C#] public static SqlString Concat(SqlString x, SqlString y);
[C++] public: static SqlString Concat(SqlString x, SqlString y);
[VB] Public Shared Function Concat(ByVal x As SqlString, ByVal y As SqlString) As SqlString
[JScript] public static function Concat(x: SqlString, y: SqlString): SqlString;
Description
[ .]
Equals
[C#] public override bool Equals(object value);
[C++] public: bool Equals(Object* value);
[VB] Overrides Public Function Equals(ByVal value As Object) As Boolean
[JScript] public override function Equals(value: Object): Boolean;
Description
Compares the supplied object parameter to the System.Data.SqlTypes.SqlString.Value property of the System.Data.SqlTypes.SqlString object.
Return Value: Equals will return true if the object is an instance of System.Data.SqlTypes.SqlString and the two are equal; otherwise false. The object to be compared.
Equals
[C#] public static new SqlBoolean Equals(SqlString x, SqlString y);
[C++] public: static SqlBoolean Equals(SqlString x, SqlString y);
[VB] Shadows Public Shared Function Equals(ByVal x As SqlString, ByVal y As SqlString) As SqlBoolean
[JScript] public static hide function Equals(x: SqlString, y: SqlString) SqlBoolean;
Description
[ .]
GetHashCode
[C#] public override int GetHashCode( );
[C++] public: int GetHashCode( );
[VB] Overrides Public Function GetHashCode( ) As Integer
[JScript] public override function GetHashCode( ): int;
Description
Gets the hash code for this instance.
Return Value: A 32-bit signed integer hash code.
GetNonUnicodeBytes
[C#] public byte[ ] GetNonUnicodeBytes( );
[C++] public: unsigned char GetNonUnicodeBytes( ) _gc[ ];
[VB] Public Function GetNonUnicodeBytes( ) As Byte( )
[JScript] public function GetNonUnicodeBytes( ): Byte[ ];
Description
Returns an array of bytes, containing the contents of the System.Data.SqlTypes.SqlString in ANSI format.
Return Value: An byte array, containing the contents of the System.Data.SqlTypes.SqlString in ANSI format.
GetUnicodeBytes
[C#] public byte[ ] GetUnicodeBytes( );
[C++] public: unsigned char GetUnicodeBytes( ) _gc[ ];
[VB] Public Function GetUnicodeBytes( ) As Byte( )
[JScript] public function GetUnicodeBytes( ): Byte[ ];
Description
Returns an array of bytes, containing the contents of the System.Data.SqlTypes.SqlString in Unicode format.
Return Value: An byte array, containing the contents of the System.Data.SqlTypes.SqlString in Unicode format.
GreaterThan
[C#] public static SqlBoolean GreaterThan(SqlString x, SqlString y);
[C++] public: static SqlBoolean GreaterThan(SqlString x, SqlString y);
[VB] Public Shared Function GreaterThan(ByVal x As SqlString, ByVal y As SqlString) As SqlBoolean
[JScript] public static function GreaterThan(x: SqlString, y: SqlString) SqlBoolean;
Description
[ .]
GreaterThanOrEqual
[C#] public static SqlBoolean GreaterThanOrEqual (SqlString x, SqlString y);
[C++] public: static SqlBoolean GreaterThanOrEqual (SqlString x, SqlString y);
[VB] Public Shared Function GreaterThanOrEqual(ByVal x As SqlString, ByVal y As SqlString) As SqlBoolean
[JScript] public static function GreaterThanOrEqual(x: SqlString, y: SqlString): SqlBoolean;
Description
[ .]
LessThan
[C#] public static SqlBoolean LessThan(SqlString x, SqlString y);
[C++] public: static SqlBoolean LessThan(SqlString x, SqlString y);
[VB] Public Shared Function LessThan(ByVal x As SqlString, ByVal y As SqlString) As SqlBoolean
[JScript] public static function LessThan(x: SqlString, y: SqlString): SqlBoolean;
Description
[ .]
LessThanOrEqual
[C#] public static SqlBoolean LessThanOrEqual(SqlString x, SqlString y);
[C++] public: static SqlBoolean LessThanOrEqual (SqlString x, SqlString y);
[VB] Public Shared Function LessThanOrEqual(ByVal x As SqlString, ByVal y As SqlString) As SqlBoolean
[JScript] public static function LessThanOrEqual(x: SqlString, y: SqlString): SqlBoolean;
Description
[ .]

NotEquals
[C#] public static SqlBoolean NotEquals(SqlString x, SqlString y);
[C++] public: static SqlBoolean NotEquals(SqlString x, SqlString y);
[VB] Public Shared Function NotEquals(ByVal x As SqlString, ByVal y As SqlString) As SqlBoolean
[JScript] public static function NotEquals(x: SqlString, y: SqlString): SqlBoolean;
Description
[.]
op_Addition
[C#] public static SqlString operator+(SqlString x, SqlString y);
[C++] public: static SqlString op_Addition(SqlString x, SqlString y);
[VB] returnValue=SqlString.op_Addition(x, y)
[JScript] returnValue=x+y;
Description
Concatenates the two System.Data.SqlTypes.SqlString operands.
Return Value: A System.Data.SqlTypes.SqlString containing the newly concatenated value representing the contents of the two System.Data.SqlTypes.SqlString parameters. A System.Data.SqlTypes.SqlString. A System.Data.SqlTypes.SqlString.
op_Equality
[C#] public static SqlBoolean operator==(SqlString x, SqlString y);
[C++] public: static SqlBoolean op_Equality(SqlString x, SqlString y);
[VB] returnValue=SqlString.op_Equality(x, y)
[JScript] returnValue=x==y;
Description
Performs a logical comparison of the two System.Data.SqlTypes.SqlString operands to determine if they are equal.
Return Value: A System.Data.SqlTypes.SqlBoolean that is System.Data.SqlTypes.SqlBoolean.True if the two instances are equal or System.Data.SqlTypes.SqlBoolean.False if the two instances are not equal. If either instance of System.Data.SqlTypes.SqlString is null, the System.Data.SqlTypes.SqlBoolean.Value of the System.Data.SqlTypes.SqlBoolean will be System.Data.SqlTypes.SqlBoolean.Null. A System.Data.SqlTypes.SqlString. A System.Data.SqlTypes.SqlString.
op_Explicit
[C#] public static explicit operator SqlString(SqlBoolean x);
[C++] public: static SqlString op_Explicit(SqlBoolean x);
[VB] returnValue=SqlString.op_Explicit(x)
[JScript] returnValue=SqlString(x);
Description
Converts the System.Data.SqlTypes.SqlBit parameter to System.Data.SqlTypes.SqlString
Return Value: A new System.Data.SqlTypes.SqlString containing the string representation of the System.Data.SqlTypes.SqlBit parameter. The System.Data.SqlTypes.SqlBit structure to be converted.
op_Explicit
[C#] public static explicit operator SqlString(SqlByte x);
[C++] public: static SqlString op_Explicit(SqlByte x);
[VB] returnValue=SqlString.op_Explicit(x)
[JScript] returnValue=SqlString(x);
Description
Converts the supplied System.Data.SqlTypes.SqlByte structure to System.Data.SqlTypes.SqlString
Return Value: A new System.Data.SqlTypes.SqlString object containing the string representation of the System.Data.SqlTypes.SqlByte parameter. The System.Data.SqlTypes.SqlByte structure to be converted.
op_Explicit
[C#] public static explicit operator SqlString(SqlDateTime x);
[C++] public: static SqlString op_Explicit(SqlDateTime x);
[VB] returnValue=SqlString.op_Explicit(x)
[JScript] returnValue=SqlString(x);
Description
Converts the supplied System.Data.SqlTypes.SqlDateTime parameter to System.Data.SqlTypes.SqlString
Return Value: A new System.Data.SqlTypes.SqlString containing the string representation of the System.Data.SqlTypes.SqlDateTime parameter. The System.Data.SqlTypes.SqlDateTime structure to be converted.
op_Explicit
[C#] public static explicit operator SqlString(SqlDecimal x);
[C++] public: static SqlString op_Explicit(SqlDecimal x);
[VB] returnValue=SqlString.op_Explicit(x)
[JScript] returnValue=SqlString(x);
Description
Converts the supplied System.Data.SqlTypes.SqlDecimal parameter to System.Data.SqlTypes.SqlString
Return Value: A new System.Data.SqlTypes.SqlString containing the string representation of the System.Data.SqlTypes.SqlDecimal parameter.
op_Explicit
[C#] public static explicit operator SqlString(SqlDouble x);
[C++] public: static SqlString op_Explicit(SqlDouble x);
[VB] returnValue=SqlString.op_Explicit(x)
[JScript] returnValue=SqlString(x);
Description
Converts the supplied System.Data.SqlTypes.SqlDouble parameter to System.Data.SqlTypes.SqlString
Return Value: A new System.Data.SqlTypes.SqlString containing the string representation of the System.Data.SqlTypes.SqlDouble parameter. The System.Data.SqlTypes.SqlDouble structure to be converted.
op_Explicit
[C#] public static explicit operator SqlString(SqlGuid x);
[C++] public: static SqlString op_Explicit(SqlGuid x);
[VB] returnValue=SqlString.op_Explicit(x)
[JScript] returnValue=SqlString(x);
Description
Converts the supplied System.Data.SqlTypes.SqlGuid parameter to System.Data.SqlTypes.SqlString. The System.Data.SqlTypes.SqlGuid structure to be converted.
op_Explicit
[C#] public static explicit operator SqlString(SqlInt16 x);
[C++] public: static SqlString op_Explicit(SqlInt16 x);
[VB] returnValue=SqlString.op_Explicit(x)
[JScript] returnValue=SqlString(x);
Description
Converts the supplied System.Data.SqlTypes.SqlInt16 parameter to System.Data.SqlTypes.SqlString
Return Value: A new System.Data.SqlTypes.SqlString object containing the string representation of the System.Data.SqlTypes.SqlInt16 parameter. The System.Data.SqlTypes.SqlInt16 structure to be converted.
op_Explicit
[C#] public static explicit operator SqlString(SqlInt32 x);
[C++] public: static SqlString op_Explicit(SqlInt32 x);
[VB] returnValue=SqlString.op_Explicit(x)
[JScript] returnValue=SqlString(x);
Description
Converts the supplied System.Data.SqlTypes.SqlInt32 parameter to System.Data.SqlTypes.SqlString Return Value: A new System.Data.SqlTypes.SqlString object containing the string representation of the System.Data.SqlTypes.SqlInt32 parameter. The SqlInt32 structure to be converted.

op_Explicit

[C#] public static explicit operator SqlString(SqlInt64 x);
[C++] public: static SqlString op_Explicit(SqlInt64 x);
[VB] returnValue=SqlString.op_Explicit(x)
[JScript] returnValue=SqlString(x);

Description

Converts the supplied System.Data.SqlTypes.SqlInt64 parameter to System.Data.SqlTypes.SqlString Return Value: A new System.Data.SqlTypes.SqlString object containing the string representation of the System.Data.SqlTypes.SqlInt64 parameter. The System.Data.SqlTypes.SqlInt64 structure to be converted.

op_Explicit

[C#] public static explicit operator SqlString(SqlMoney x);
[C++] public: static SqlString op_Explicit(SqlMoney x);
[VB] returnValue=SqlString.op_Explicit(x)
[JScript] returnValue=SqlString(x);

Description

Converts the supplied System.Data.SqlTypes.SqlMoney parameter to System.Data.SqlTypes.SqlString Return Value: A new System.Data.SqlTypes.SqlString containing the string representation of the System.Data.SqlTypes.SqlMoney parameter. The System.Data.SqlTypes.SqlMoney structure to be converted.

op_Explicit

[C#] public static explicit operator SqlString(SqlSingle x);
[C++] public: static SqlString op_Explicit(SqlSingle x);
[VB] returnValue=SqlString.op_Explicit(x)
[JScript] returnValue=SqlString(x);

Description

Converts the supplied System.Data.SqlTypes.SqlSingle parameter to System.Data.SqlTypes.SqlString Return Value: A new System.Data.SqlTypes.SqlString containing the string representation of the System.Data.SqlTypes.SqlSingle parameter. The System.Data.SqlTypes.SqlSingle structure to be converted.

op_Explicit

[C#] public static explicit operator string(SqlString x);
[C++] public: static String* op_Explicit( );
[VB] returnValue=SqlString.op_Explicit(x)
[JScript] returnValue String(x);

Description

Converts a System.Data.SqlTypes.SqlString to a System.String

Return Value: A System.String, whose contents are the same as the System.Data.SqlTypes.SqlString.Value property of the System.Data.SqlTypes.SqlString parameter. The System.Data.SqlTypes.SqlString to be converted.

op_GreaterThan

[C#] public static SqlBoolean operator >(SqlString x, SqlString y);
[C++] public: static SqlBoolean op_GreaterThan(SqlString x, SqlString y);
[VB] returnValue=SqlString.op_GreaterThan(x, y)
[JScript] returnValue=x>y;

Description

Performs a logical comparison of the two System.Data.SqlTypes.SqlString operands to determine if the first is greater than the second.

Return Value: A System.Data.SqlTypes.SqlBoolean that is System.Data.SqlTypes.SqlBoolean.True if the first instance is greater than the second instance, otherwise System.Data.SqlTypes.SqlBoolean.False. If either instance of System.Data.SqlTypes.SqlString is null, the System.Data.SqlTypes.SqlBoolean.Value of the System.Data.SqlTypes.SqlBoolean will be System.Data.SqlTypes.SqlBoolean.Null. A System.Data.SqlTypes.SqlString. A System.Data.SqlTypes.SqlString.

op_GreaterThanOrEqual

[C#] public static SqlBoolean operator>=(SqlString x, SqlString y);
[C++] public: static SqlBoolean op_GreaterThanOrEqual (SqlString x, SqlString y);
[VB] returnValue=SqlString.op_GreaterThanOrEqual(x, y)
[JScript] returnValue=x>=y;

Description

Performs a logical comparison of the two System.Data.SqlTypes.SqlString operands to determine if the first is greater than or equal to the second.

Return Value: A System.Data.SqlTypes.SqlBoolean that is System.Data.SqlTypes.SqlBoolean.True if the first instance is greater than or equal to the second instance, otherwise System.Data.SqlTypes.SqlBoolean.False If either instance of System.Data.SqlTypes.SqlString is null, the System.Data.SqlTypes.SqlBoolean.Value of the System.Data.SqlTypes.SqlBoolean will be System.Data.SqlTypes.SqlBoolean.Null. A System.Data.SqlTypes.SqlString. A System.Data.SqlTypes.SqlString.

op_Implicit

[C#] public static implicit operator SqlString(string x);
[C++] public: static SqlString op_Implicit(String* x)
[VB] returnValue=SqlString.op_Implicit(x)
[JScript] returnValue=x;

Description

Converts the System.String parameter to a System.Data.SqlTypes.SqlString. The System.String to be converted.

op_Inequality

[C#] public static SqlBoolean operator !=(SqlString x, SqlString y);
[C++] public: static SqlBoolean op_Inequality(SqlString x, SqlString y);
[VB] returnValue=SqlString.op_Inequality(x, y)
[JScript] returnValue=x !=y;

Description

Performs a logical comparison of the two System.Data.SqlTypes.SqlString operands to determine if they are equal.

Return Value: A System.Data.SqlTypes.SqlBoolean that is System.Data.SqlTypes.SqlBoolean.True if the two instances are not equal or System.Data.SqlTypes.SqlBoolean.False if the two instances are equal. If either instance of System.Data.SqlTypes.SqlString is null, the System.Data.SqlTypes.SqlBoolean.Value of the System.Data.SqlTypes.SqlBoolean will be System.Data.SqlTypes.SqlBoolean.Null. A System.Data.SqlTypes.SqlString. A System.Data.SqlTypes.SqlString.

op_LessThan

[C#] public static SqlBoolean operator
[C++] public: static SqlBoolean op_LessThan(SqlString x, SqlString y);
[VB] returnValue=SqlString.op_LessThan(x, y)
[JScript] returnValue=x<y;

Description

Performs a logical comparison of the two System.Data.SqlTypes.SqlString operands to determine if the first is less than the second.

Figure 4:
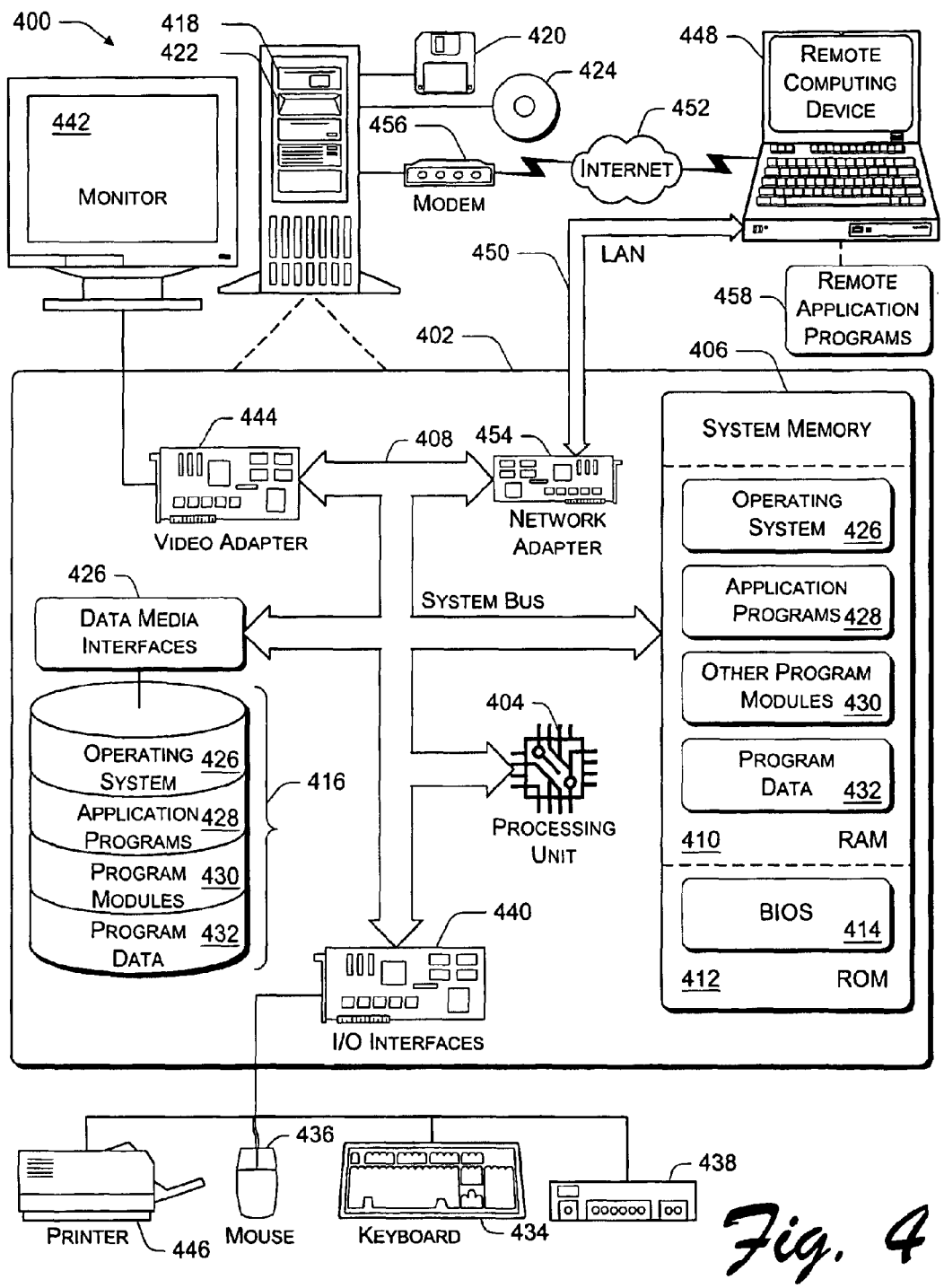
FIG. 4 is a block diagram of an exemplary computer that may execute all or part of the software architecture.

Return Value: A System.Data.SqlTypes.SqlBoolean that is System.Data.SqlTypes.SqlBoolean.True if the first instance is less than the second instance, otherwise System.Data.Sql- Types.SqlBoolean.False. If either instance of System.Data.SqlTypes.SqlString is null, the System.Data.SqlTypes.SqlBoolean.Value of the System.Data.SqlTypes.SqlBoolean will be System.Data.SqlTypes.SqlBoolean.Null. A System.Data.SqlTypes.SqlString. A System.Data.SqlTypes.SqlString.
op_LessThanOrEqual
[C#] public static SqlBoolean operator<=(SqlString x, SqlString y);
[C++] public: static SqlBoolean op_LessThanOrEqual (SqlString x, SqlString y);
[VB] returnValue=SqlString.op_LessThanOrEqual(x, y)
[JScript] returnValue=x<=y;
Description
    Performs a logical comparison of the two System.Data.SqlTypes.SqlString operands to determine if the first is less than or equal to the second.
Return Value: A System.Data.SqlTypes.SqlBoolean that is System.Data.SqlTypes.SqlBoolean.True if the first instance is less than or equal to the second instance, otherwise System.Data.SqlTypes.SqlBoolean.False. If either instance of System.Data.SqlTypes.SqlString is null, the System.Data.SqlTypes.SqlBoolean.Value of the System.Data.SqlTypes.SqlBoolean will be System.Data.SqlTypes.SqlBoolean.Null. A System.Data.SqlTypes.SqlString. A System.Data.SqlTypes.SqlString.
ToSqlBoolean
[C#] public SqlBoolean ToSqlBoolean( );
[C++] public: SqlBoolean ToSqlBoolean( );
[VB] Public Function ToSqlBoolean( ) As SqlBoolean
[JScript] public function ToSqlBoolean( ): SqlBoolean;
Description
    [ .]
    ToSqlByte
[C#] public SqlByte ToSqlByte( );
[C++] public: SqlByte ToSqlByte( );
[VB] Public Function ToSqlByte( ) As SqlByte
[JScript] public function ToSqlByte( ): SqlByte;
Description
    [ .]
    ToSqlDateTime
[C#] public SqlDateTime ToSqlDateTime( );
[C++] public: SqlDateTime ToSqlDateTime( );
[VB] Public Function ToSqlDateTime( ) As SqlDateTime
[JScript] public function ToSqlDateTime( ): SqlDateTime;
Description
    [ .]
    ToSqlDecimal
[C#] public SqlDecimal ToSqlDecimal( );
[C++] public: SqlDecimal ToSqlDecimal( );
[VB] Public Function ToSqlDecimal( ) As SqlDecimal
[JScript] public function ToSqlDecimal( ): SqlDecimal;
Description
    [ .]
    ToSqlDouble
[C#] public SqlDouble ToSqlDouble( );
[C++] public: SqlDouble ToSqlDouble( );
[VB] Public Function ToSqlDouble( ) As SqlDouble
[JScript] public function ToSqlDouble( ): SqlDouble;
Description
    [ .]
    ToSqlGuid
[Cπ] public SqlGuid ToSqlGuid( );
[C++] public: SqlGuid ToSqlGuid( );
[VB] Public Function ToSqlGuid( ) As SqlGuid
[JScript] public function ToSqlGuid( ): SqlGuid;

Description
    [ .]
    ToSqlInt16
[C#] public SqlInt16 ToSqlInt16( );
[C++] public: SqlInt16 ToSqlInt16( );
[VB] Public Function ToSqlInt16( ) As SqlInt16
[JScript] public function ToSqlInt16( ): SqlInt16;
Description
    [ .]
    ToSqlInt32
[C#] public SqlInt32 ToSqlInt32( );
[C++] public: SqlInt32 ToSqlInt32( );
[VB] Public Function ToSqlInt32( ) As SqlInt32
[JScript] public function ToSqlInt32( ): SqlInt32;
Description
    [ .]
    ToSqlInt64
[C#] public SqlInt64 ToSqlInt64( );
[C++] public: SqlInt64 ToSqlInt64( );
[VB] Public Function ToSqlInt64( ) As SqlInt64
[JScript] public function ToSqlInt64( ): SqlInt64;
Description
    [ .]
    ToSqlMoney
[C#] public SqlMoney ToSqlMoney( );
[C++] public: SqlMoney ToSqlMoney( );
[VB] Public Function ToSqlMoney( ) As SqlMoney
[JScript] public function ToSqlMoney( ): A SqlMoney;
Description
    ToSqlSingle
[C#] public SqlSingle ToSqlSingle( );
[C++] public: SqlSingle ToSqlSingle( );
[VB] Public Function ToSqlSingle( ) As SqlSingle
[JScript] public function ToSqlSingle( ): SqlSingle;
Description
    [ .]
    ToString
[C#] public override string ToString( );
[C++] public: String* ToString( );
[VB] Overrides Public Function ToString( ) As String
[JScript] public override function ToString( ): String; Converts a System.Data.SqlTypes.SqlString object to a System.String.
Description
    Converts a System.Data.SqlTypes.SqlString object to a System.String.
    SqlTruncateException class (System.Data.SqlTypes)
    ToString
Description
    The exception that is thrown when setting a value into a SqlType structure would truncate that value.
    SqlTruncateException
    Example Syntax:
    ToString
[C#] public SqlTruncateException( );
[C++] public: SqlTruncateException( );
[VB] Public Sub New( )
[JScript] public function SqlTruncateException( ); Initializes a new instance of the System.Data.SqlTypes.SqlTruncateException class.
Description
    Initializes a new instance of the System.Data.SqlTypes.SqlTruncateException class with default properties.
    SqlTruncateException
    Example Syntax:
    ToString
[C#] public SqlTruncateException(string message);
[C++] public: SqlTruncateException(String* message);

[VB] Public Sub New(ByVal message As String)
[JScript] public function SqlTruncateException(message A String);
Description
   Initializes a new instance of the System.Data.Sql-Types.SqlTruncateException class with a specified error message. The error message that explains the reason for the exception.
   HelpLink
   HResult
   InnerException
   Message
   Source
   StackTrace
   TargetSite
   ISerializable.GetObjectData
[C#] void ISerializable.GetObjectData(SerializationInfo si, StreamingContext context);
[C++] void ISerializable::GetObjectData(SerializationInfo* si, StreamingContext context);
[VB] Sub GetObjectData(ByVal si As SerializationInfo, ByVal context As StreamingContext) Implements ISerializable.GetObjectData
[JScript] function ISerializable.GetObjectData(si: SerializationInfo, context: StreamingContext);
SqlTypeException class (System.Data.SqlTypes)
   ToString
Description
   The base exception class for the System.Data.SqlTypes.
   SqlTypeException
   Example Syntax:
   ToString
[C#] public SqlTypeException(string message);
[C++] public: SqlTypeException(String* message);
[VB] Public Sub New(ByVal message As String)
[JScript] public function SqlTypeException(message: String);
Description
   Initializes a new instance of the System.Data.SqlTypes.SqlTypeException Exemplary Computing System and Environment FIG. 4 illustrates an example of a suitable computing environment 400 within which the programming framework 132 may be implemented (either filly or partially). The computing environment 400 may be utilized in the computer and network architectures described herein.

The exemplary computing environment 400 is only one example of a computing environment and is not intended to suggest any limitation as to the scope of use or functionality of the computer and network architectures. Neither should the computing environment 400 be interpreted as having any dependency or requirement relating to any one or combination of components illustrated in the exemplary computing environment 400.

The framework 132 may be implemented with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as cellular phones, personal digital assistants, handheld computers, or other communication/computing devices.

The framework 132 may be described in the general context of computer-executable instructions, such as program modules, being executed by one or more computers or other devices. Generally, program modules include routines, programs, objects, components, data structures, etc. that perform particular tasks or implement particular abstract data types. The framework 132 may also be practiced in distributed computing environments where tasks are performed by remote processing devices that are linked through a communications network. In a distributed computing environment, program modules may be located in both local and remote computer storage media including memory storage devices.

The computing environment 400 includes a general-purpose computing device in the form of a computer 402. The components of computer 402 can include, by are not limited to, one or more processors or processing units 404, a system memory 406, and a system bus 408 that couples various system components including the processor 404 to the system memory 406.

The system bus 408 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable; volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide nonvolatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of the operating system 426, one or more application programs 428, other program modules 430, and program data 432 (or some combination thereof) may include elements of the programming framework 132.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and so on. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, internets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

An implementation of the framework 132, and particularly, the API 142 or calls made to the API 142, may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer system including one or more microprocessors and one or more software programs, the one or more software programs utilizing an application program interface to request services from an operating system, the application program interface including separate computer-executable commands to request services consisting of the following groups of services:

a first group of services related to sharing data among a plurality of data providers;

a second group of services related to utilizing data stored in an object-oriented database;

a third group of services related to data used by a database client; and a fourth group of services related to data types used by a database server.

2. An application program interface embodied on one or more computer readable media, comprising:
  a first namespace related to data shared by a plurality of data providers;
  a second namespace related to data used in an object-oriented database;
  a third namespace related to data used by an SQL client;
  a fourth namespace related to native data types within an SQL server; and
  wherein the namespaces support managing data from various data providers.

3. An application program interface as recited in claim 2, wherein the SQL server is a Microsoft SQL Server.

4. An application program interface as recited in claim 2, wherein the first namespace includes a data adapter class to exchange data between a data source and a data set.

5. An application program interface as recited in claim 2, wherein the first namespace includes a data column mapping class to map column names from a data source to column names in a data table.

6. An application program interface as recited in claim 2, wherein the first namespace includes a data table mapping class to map data returned from a query of a data source and a data table.

7. An application program interface as recited in claim 2, wherein the first namespace includes a row update class to indicate when an update to a row is started.

8. An application program interface as recited in claim 2, wherein the first namespace includes a row update class to indicate when an update to a row is completed.

9. An application program interface as recited in claim 2, wherein the second namespace includes a command builder class to automatically generate SQL statements for data table updates.

10. An application program interface as recited in claim 2, wherein the second namespace includes a connection class to enable a connection to a data source.

11. An application program interface as recited in claim 2, wherein the third namespace includes a command builder class to automatically generate SQL statements for data table updates.

12. An application program interface as recited in claim 2, wherein the third namespace includes a connection class to represent a unique session to an SQL server data source.

13. An application program interface as recited in claim 2, wherein the third namespace includes a data adapter class to exchange data between a data set and an SQL server for retrieving and saving data.

14. A network software architecture comprising the application program interface as recited in claim 2.

15. An application program interface embodied on one or more computer readable media, comprising:
  a first group of services related to sharing data among a plurality of data providers;
  a second group of services related to using data in an object-oriented database;
  a third group of services related to data used by a database client; and
  a fourth group of services related to data types used by a database server.

16. An application program interface as recited in claim 15, further comprising a constraint class to maintain the integrity of data in a data table.

17. An application program interface as recited in claim 15, further comprising a data column class to create a data table.

18. An application program interface as recited in claim 15, further comprising a data column collection class to identify the type of data each data column in a data table can contain.

19. An application program interface as recited in claim 15, further comprising a data relation class to relate two data table objects to each other.

20. An application program interface as recited in claim 15, further comprising a data row collection class to identify data stored in a data table.

21. An application program interface as recited in claim 15, further comprising a property collection class to add custom properties to a data table.

22. A network software architecture comprising the application program interface as recited in claim 15.

23. A computer-implemented method comprising:
  managing network and computing resources for a distributed computing system; and
  exposing a set of functions that enable developers to access the network and computing resources of the distributed computing system, the set of functions comprising first functions to facilitate data sharing, second functions to facilitate accessing object-oriented databases, third functions to facilitate SQL client operations, and fourth functions to facilitate SQL server operations.

24. A computer-implemented method comprising:
  creating a common namespace related to data shared by a plurality of data providers;
  creating an object-oriented namespace related to data used in object-oriented databases;
  creating an SQL client namespace related to data used by SQL clients; and
  creating an SQL types namespace related to native data types in an SQL server.

25. A computer-implemented method as recited in claim 24, wherein the common namespace includes:
  a data adapter class to exchange data between a data source and a data set;
  a data column mapping class to map column names from a data source to column names in a data table;
  a data table mapping class to map data returned from a query of a data source and a data table; and
  a row update class to indicate when an update to a row in a data table is completed.

26. A computer-implemented method as recited in claim 24, wherein the object-oriented namespace includes:
  a command builder class to generate SQL statements for data table updates; and
  a connection class to enable a connection to a data source.

27. A computer-implemented method as recited in claim 24, wherein the SQL client namespace includes:
  a command builder class to generate SQL statements for data table updates;
  a connection class to represent a unique session to an SQL server data source; and
  a data adapter class to exchange data between a data set and an SQL server for retrieving and saving data.

28. A computer-implemented method comprising:
  calling one or more first functions to facilitate sharing of data among multiple data providers;
  calling one or more second functions to facilitate accessing object-oriented databases;
  calling one or more third functions to facilitate SQL client operations; and
  calling one or more fourth functions to facilitate SQL server operations.

29. A computer-implemented method as recited in claim 28, wherein the first functions comprise functions for exchanging data between a data source and a data set, mapping column names from a data source to column names in a data table, and indicating when an update to a row is completed.

30. A computer-implemented method as recited in claim 28, wherein the second functions comprise functions for generating SQL statements for data table updates and enabling a connection to a data source.

31. A computer-implemented method as recited in claim 28, wherein the third features comprise functions for generating SQL statements for data table updates and representing a unique session to an SQL server data source.

* * * * *